US012406194B1

(12) United States Patent
Cosic

(10) Patent No.: US 12,406,194 B1

(45) Date of Patent: Sep. 2, 2025

(54) DEVICES, SYSTEMS, AND METHODS FOR MACHINE CONSCIOUSNESS

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 1110 days.

(21) Appl. No.: 17/197,039

(22) Filed: Mar. 10, 2021

(51) Int. Cl.

| | |
|---|---|
| ***G06N 5/04*** | (2023.01) |
| ***G06N 20/00*** | (2019.01) |
| ***G06T 7/20*** | (2017.01) |
| ***G06T 13/20*** | (2011.01) |
| ***G06T 13/40*** | (2011.01) |

(52) U.S. Cl.

CPC ............... *G06N 5/04* (2013.01); *G06N 20/00* (2019.01); *G06T 13/20* (2013.01); *G06T 13/40* (2013.01); *G06T 7/20* (2013.01)

(58) Field of Classification Search

CPC .......... G06N 5/04; G06N 5/046; G06N 20/00; G06N 20/10; G06N 20/20; G06N 7/04; G06N 7/06; G06T 13/20; G06T 13/40; G06T 7/20

See application file for complete search history.

(56) References Cited

U.S. PATENT DOCUMENTS

| | | | |
|---|---|---|---|
| 4,370,707 | A | 1/1983 | Phillips et al. |
| 4,730,315 | A | 3/1988 | Saito et al. |
| 4,860,203 | A | 8/1989 | Corrigan et al. |
| 5,560,011 | A | 9/1996 | Uyama |
| 5,592,661 | A | 1/1997 | Eisenberg et al. |
| 5,602,982 | A | 2/1997 | Judd et al. |
| 5,758,333 | A | 5/1998 | Bauer et al. |
| 5,874,834 | A | 2/1999 | New |
| 5,983,232 | A | 11/1999 | Zhang |
| 6,026,234 | A | 2/2000 | Hanson et al. |
| 6,088,731 | A | 7/2000 | Kiraly et al. |
| 6,106,299 | A | 8/2000 | Ackermann et al. |
| 6,126,330 | A | 10/2000 | Knight |
| 6,314,558 | B1 | 11/2001 | Angel et al. |
| 6,408,262 | B1 | 6/2002 | Leerberg et al. |
| 6,643,842 | B2 | 11/2003 | Angel et al. |
| 6,728,689 | B1 | 4/2004 | Drissi et al. |
| 6,735,632 | B1 | 5/2004 | Kiraly et al. |
| 6,754,631 | B1 | 6/2004 | Din |
| 6,801,912 | B2 | 10/2004 | Moskowitz et al. |

(Continued)

OTHER PUBLICATIONS

About | OpenCV, retrieved from <URL: http://opencv.org/about.html> on Dec. 13, 2014, 1 pages.

(Continued)

*Primary Examiner* — Shane D Woolwine

(57) ABSTRACT

Certain aspects of the disclosure generally relate to devices, systems, applications, and/or objects of applications, and may be generally directed to artificial learning and/or use of artificial knowledge. Other aspects of the disclosure generally relate to consciousness, and may be generally directed to learning and/or implementing one or more purposes. One or more purposes may drive the use of artificial knowledge in implementing the one or more purposes. Therefore, in some aspects, a conscious device, system, application, and/or object of application may include one or more purposes and artificial knowledge so that the device, system, application, and/or object of application can act upon a world in implementing the one or more purposes. The disclosure also describes other functionalities.

20 Claims, 77 Drawing Sheets

(56) References Cited

U.S. PATENT DOCUMENTS

| | | | |
|---|---|---|---|
| 6,842,877 | B2 | 1/2005 | Robarts et al. |
| 6,850,942 | B2 | 2/2005 | Cotner et al. |
| 6,915,105 | B2 | 7/2005 | Masuda |
| 6,973,446 | B2 | 12/2005 | Mamitsuka et al. |
| 6,996,758 | B1 | 2/2006 | Herron et al. |
| 7,017,153 | B2 | 3/2006 | Gouriou et al. |
| 7,052,277 | B2 | 5/2006 | Kellman |
| 7,082,435 | B1 | 7/2006 | Guzman et al. |
| 7,113,946 | B2 | 9/2006 | Cosic |
| 7,117,225 | B2 | 10/2006 | Cosic |
| 7,222,127 | B1 | 5/2007 | Bem et al. |
| 7,240,335 | B2 | 7/2007 | Angel et al. |
| 7,249,349 | B2 | 7/2007 | Hundt et al. |
| 7,395,255 | B2 | 7/2008 | Li |
| 7,409,401 | B2 | 8/2008 | Hansen et al. |
| 7,424,705 | B2 | 9/2008 | Lewis et al. |
| 7,444,338 | B1 | 10/2008 | Fisher |
| 7,478,371 | B1 | 1/2009 | Gove |
| 7,484,205 | B2 | 1/2009 | Venkatapathy |
| 7,533,128 | B1 | 5/2009 | Sanchez et al. |
| 7,565,340 | B2 | 7/2009 | Herlocker et al. |
| 7,721,218 | B2 | 5/2010 | Awe et al. |
| 7,765,537 | B2 | 7/2010 | Havin et al. |
| 7,797,259 | B2 | 9/2010 | Jiang et al. |
| 7,831,564 | B1 | 11/2010 | Wei et al. |
| 7,840,060 | B2 | 11/2010 | Podilchuk |
| 7,849,114 | B2 | 12/2010 | Boss et al. |
| 7,925,984 | B2 | 4/2011 | Awe et al. |
| 7,987,144 | B1 | 7/2011 | Drissi et al. |
| 8,005,828 | B2 | 8/2011 | Buchner et al. |
| 8,019,699 | B2 | 9/2011 | Baxter |
| 8,078,556 | B2 | 12/2011 | Adi et al. |
| 8,090,669 | B2 | 1/2012 | Shahani et al. |
| 8,137,112 | B2 | 3/2012 | Woolf et al. |
| 8,166,463 | B2 | 4/2012 | Gill et al. |
| 8,195,674 | B1 | 6/2012 | Bem et al. |
| 8,196,119 | B2 | 6/2012 | Gill et al. |
| 8,244,730 | B2 | 8/2012 | Gupta |
| 8,251,704 | B2 | 8/2012 | Woolf et al. |
| 8,261,199 | B2 | 9/2012 | Cradick et al. |
| 8,266,608 | B2 | 9/2012 | Hecht et al. |
| 8,335,805 | B2 | 12/2012 | Cosic |
| 8,356,026 | B2 | 1/2013 | Heimendinger |
| 8,364,612 | B2 | 1/2013 | Van Gael et al. |
| 8,386,401 | B2 | 2/2013 | Virkar et al. |
| 8,397,227 | B2 | 3/2013 | Fan et al. |
| 8,417,740 | B2 | 4/2013 | Cosic |
| 8,464,225 | B2 | 6/2013 | Greifeneder |
| 8,549,359 | B2 | 10/2013 | Zheng |
| 8,572,035 | B2 | 10/2013 | Cosic |
| 8,589,414 | B2 | 11/2013 | Waite et al. |
| 8,595,154 | B2 | 11/2013 | Breckenridge et al. |
| 8,655,260 | B2 | 2/2014 | Yueh et al. |
| 8,655,900 | B2 | 2/2014 | Cosic |
| 8,667,472 | B1 | 3/2014 | Molinari |
| 8,762,428 | B2 | 6/2014 | Kulack et al. |
| 8,949,186 | B1 | 2/2015 | Yueh et al. |
| 8,996,432 | B1 | 3/2015 | Fu |
| 9,047,324 | B2 | 6/2015 | Cosic |
| 9,158,813 | B2 | 10/2015 | Ntoulas et al. |
| 9,268,454 | B2 | 2/2016 | Hamilton, II et al. |
| 9,282,309 | B1 | 3/2016 | Cosic |
| 9,298,749 | B2 | 3/2016 | Cosic |
| 9,305,216 | B1 | 4/2016 | Mishra |
| 9,325,314 | B2 | 4/2016 | Shin |
| 9,367,806 | B1 | 6/2016 | Cosic |
| 9,443,192 | B1 | 9/2016 | Cosic |
| 9,488,984 | B1 | 11/2016 | Williams et al. |
| 9,582,762 | B1 | 2/2017 | Cosic |
| 9,595,294 | B2 | 3/2017 | Cosic |
| 9,697,869 | B2 | 7/2017 | Cosic |
| 9,864,933 | B1 | 1/2018 | Cosic |
| 9,928,256 | B2 | 3/2018 | Cosic |
| 10,102,226 | B1 | 10/2018 | Cosic |
| 10,102,449 | B1 | 10/2018 | Cosic |
| 10,162,740 | B1 | 12/2018 | Setty et al. |
| 10,210,434 | B1 | 2/2019 | Cosic |
| 10,223,621 | B1 | 3/2019 | Cosic |
| 10,255,302 | B1 | 4/2019 | Cosic |
| 10,353,901 | B2 | 7/2019 | Cosic |
| 10,402,731 | B1 | 9/2019 | Cosic |
| 10,452,974 | B1 | 10/2019 | Cosic |
| 10,474,934 | B1 | 11/2019 | Cosic |
| 10,528,570 | B2 | 1/2020 | Cosic |
| 10,534,779 | B2 | 1/2020 | Cosic |
| 10,573,348 | B1 | 2/2020 | Cosic |
| 10,579,921 | B1 | 3/2020 | Cosic |
| 10,592,822 | B1 | 3/2020 | Cosic |
| 10,607,134 | B1 | 3/2020 | Cosic |
| 10,885,106 | B1 | 1/2021 | Cosic |
| 2002/0019822 | A1 | 2/2002 | Seki et al. |
| 2003/0026588 | A1 | 2/2003 | Elder et al. |
| 2003/0065662 | A1 | 4/2003 | Cosic |
| 2003/0122578 | A1 | 7/2003 | Masui et al. |
| 2004/0117771 | A1 | 6/2004 | Venkatapathy |
| 2004/0194017 | A1 | 9/2004 | Cosic |
| 2004/0249774 | A1 | 12/2004 | Caid et al. |
| 2004/0267521 | A1 | 12/2004 | Cutler et al. |
| 2005/0149517 | A1 | 7/2005 | Cosic |
| 2005/0149542 | A1 | 7/2005 | Cosic |
| 2005/0154745 | A1 | 7/2005 | Hansen et al. |
| 2005/0240412 | A1 | 10/2005 | Fujita |
| 2005/0245303 | A1 | 11/2005 | Graepel et al. |
| 2005/0289105 | A1 | 12/2005 | Cosic |
| 2006/0047612 | A1 | 3/2006 | Stanley et al. |
| 2006/0184410 | A1 | 8/2006 | Ramamurthy et al. |
| 2006/0190930 | A1 | 8/2006 | Hecht et al. |
| 2006/0259466 | A1 | 11/2006 | Bilotti |
| 2006/0265406 | A1 | 11/2006 | Chkodrov et al. |
| 2007/0006159 | A1 | 1/2007 | Hecht et al. |
| 2007/0050606 | A1 | 3/2007 | Ferren et al. |
| 2007/0050719 | A1 | 3/2007 | Lui et al. |
| 2007/0058856 | A1 | 3/2007 | Boregowda et al. |
| 2007/0061735 | A1 | 3/2007 | Hoffberg et al. |
| 2007/0106633 | A1 | 5/2007 | Reiner |
| 2008/0071770 | A1 | 3/2008 | Schloter et al. |
| 2008/0144893 | A1 | 6/2008 | Guo et al. |
| 2008/0215508 | A1 | 9/2008 | Hanneman et al. |
| 2008/0254429 | A1 | 10/2008 | Woolf et al. |
| 2008/0281764 | A1 | 11/2008 | Baxter |
| 2008/0288259 | A1 | 11/2008 | Chambers et al. |
| 2009/0044113 | A1 | 2/2009 | Jones et al. |
| 2009/0067727 | A1 | 3/2009 | Hirohata |
| 2009/0070337 | A1 | 3/2009 | Romem et al. |
| 2009/0110061 | A1 | 4/2009 | Lee et al. |
| 2009/0131152 | A1 | 5/2009 | Busse |
| 2009/0136095 | A1 | 5/2009 | Marcon et al. |
| 2009/0141969 | A1 | 6/2009 | Yu et al. |
| 2009/0222388 | A1 | 9/2009 | Hua et al. |
| 2009/0287643 | A1 | 11/2009 | Corville et al. |
| 2009/0324010 | A1 | 12/2009 | Hou |
| 2010/0023541 | A1 | 1/2010 | Cosic |
| 2010/0033780 | A1 | 2/2010 | Gitter |
| 2010/0063949 | A1 | 3/2010 | Eaton et al. |
| 2010/0082536 | A1 | 4/2010 | Cosic |
| 2010/0114746 | A1 | 5/2010 | Bobbitt et al. |
| 2010/0138370 | A1 | 6/2010 | Wu et al. |
| 2010/0241595 | A1 | 9/2010 | Felsher |
| 2010/0278420 | A1 | 11/2010 | Shet et al. |
| 2011/0004586 | A1 | 1/2011 | Cherryholmes et al. |
| 2011/0007079 | A1 | 1/2011 | Perez et al. |
| 2011/0030031 | A1 | 2/2011 | Lussier et al. |
| 2011/0085734 | A1 | 4/2011 | Berg et al. |
| 2011/0093435 | A1 | 4/2011 | Zha et al. |
| 2011/0218672 | A1 | 9/2011 | Maisonnier et al. |
| 2011/0270794 | A1 | 11/2011 | Drory et al. |
| 2012/0089570 | A1 | 4/2012 | Zha et al. |
| 2012/0150773 | A1 | 6/2012 | DiCorpo et al. |
| 2012/0167057 | A1 | 6/2012 | Schmich et al. |
| 2012/0192096 | A1 | 7/2012 | Bowman et al. |
| 2012/0284026 | A1 | 11/2012 | Cardillo et al. |
| 2012/0290347 | A1 | 11/2012 | Elazouni et al. |
| 2013/0007532 | A1 | 1/2013 | Miller et al. |
| 2013/0047049 | A1 | 2/2013 | Chen et al. |

(56) References Cited

U.S. PATENT DOCUMENTS

| | | | |
|---|---|---|---|
| 2013/0156345 A1 | 6/2013 | Shmunk | |
| 2013/0159021 A1 | 6/2013 | Felsher | |
| 2013/0204907 A1 | 8/2013 | Alonso Alarcon et al. | |
| 2013/0218932 A1 | 8/2013 | Cosic | |
| 2013/0226974 A1 | 8/2013 | Cosic | |
| 2013/0238533 A1 | 9/2013 | Mrkar et al. | |
| 2013/0278501 A1 | 10/2013 | Bulzacki | |
| 2013/0278631 A1 | 10/2013 | Border et al. | |
| 2013/0329946 A1 | 12/2013 | Archibald et al. | |
| 2014/0052717 A1 | 2/2014 | Franks et al. | |
| 2014/0075249 A1 | 3/2014 | Sato et al. | |
| 2014/0143276 A1 | 5/2014 | Rogers et al. | |
| 2014/0161250 A1 | 6/2014 | Leeds et al. | |
| 2014/0164430 A1 | 6/2014 | Hadjieleftheriou et al. | |
| 2014/0177946 A1 | 6/2014 | Lim et al. | |
| 2014/0207580 A1 | 7/2014 | Minnis et al. | |
| 2014/0211988 A1 | 7/2014 | Fan et al. | |
| 2014/0278754 A1 | 9/2014 | Cronin et al. | |
| 2015/0006171 A1 | 1/2015 | Westby et al. | |
| 2015/0023186 A1 | 1/2015 | Vasseur et al. | |
| 2015/0023205 A1 | 1/2015 | Vasseur et al. | |
| 2015/0039304 A1 | 2/2015 | Wein | |
| 2015/0055821 A1 | 2/2015 | Fotland | |
| 2015/0089081 A1 | 3/2015 | Thubert et al. | |
| 2015/0264306 A1 | 9/2015 | Marilly et al. | |
| 2015/0269156 A1 | 9/2015 | Awadallah et al. | |
| 2015/0269415 A1 | 9/2015 | Gelbman | |
| 2015/0310041 A1 | 10/2015 | Kier et al. | |
| 2015/0324685 A1 | 11/2015 | Bohn et al. | |
| 2015/0339213 A1 | 11/2015 | Lee et al. | |
| 2016/0063118 A1 | 3/2016 | Campbell et al. | |
| 2016/0077166 A1 | 3/2016 | Morozov et al. | |
| 2016/0140999 A1 | 5/2016 | Cosic | |
| 2016/0142650 A1 | 5/2016 | Cosic | |
| 2016/0167226 A1 | 6/2016 | Schnittman | |
| 2016/0243701 A1 | 8/2016 | Gildert et al. | |
| 2016/0246819 A1 | 8/2016 | Cosic | |
| 2016/0246850 A1 | 8/2016 | Cosic | |
| 2016/0246868 A1 | 8/2016 | Cosic | |
| 2016/0274187 A1 | 9/2016 | Menon et al. | |
| 2016/0292185 A1 | 10/2016 | Cosic | |
| 2016/0328480 A1 | 11/2016 | Owens et al. | |
| 2017/0161958 A1 | 6/2017 | Eilat | |
| 2018/0017791 A1 | 1/2018 | Beckman | |
| 2018/0060144 A1 | 3/2018 | Capobianco et al. | |
| 2018/0068564 A1 | 3/2018 | Tanigawa et al. | |
| 2018/0096261 A1 | 4/2018 | Chu et al. | |
| 2018/0101146 A1 | 4/2018 | Hariharan et al. | |
| 2018/0120813 A1 | 5/2018 | Coffman et al. | |
| 2018/0174207 A1 | 6/2018 | Potucek et al. | |
| 2018/0210899 A1 | 7/2018 | Cosic | |
| 2018/0375720 A1 | 12/2018 | Yang et al. | |
| 2019/0028545 A1 | 1/2019 | Yang et al. | |
| 2019/0034765 A1 | 1/2019 | Kaehler et al. | |
| 2019/0096503 A1 | 3/2019 | Chakravarty et al. | |
| 2019/0102049 A1* | 4/2019 | Anzures | G06F 3/0488 |
| 2019/0107839 A1 | 4/2019 | Parashar et al. | |
| 2019/0213446 A1 | 7/2019 | Tsou et al. | |
| 2020/0334853 A1* | 10/2020 | Ciuc | G06T 7/246 |

OTHER PUBLICATIONS

Andrej Karpathy, Thomas Leung, George Toderici, Rahul Sukthankar, Sanketh Shetty, Li Fei-Fei, Large-scale Video Classification with Convolutional Neural Networks, Apr. 14, 2014, 8 pages, Stanford University.

Karen Simonyan, Andrew Zisserman, Two-Stream Convolutional Networks for Action Recognition in Videos, Nov. 13, 2014, 11 pages, University of Oxford.

Chen et al. Case-Based Reasoning System and Artificial Neural Networks: A Review Neural Comput & Applic (2001) 10: pp. 264-276, 13 pages.

John J. Grefenstette, Connie Loggia Ramsey, Alan C. Schultz, Learning Sequential Decision Rules Using Simulation Models and Competition, 1990, Navy Center for Applied Research in Artificial Intelligence, Naval Research Laboratory, Washington, DC, 27 pages.

Alan C. Schultz, John J. Grefenstette, Using a Genetic Algorithm to Learn Behaviors for Autonomous Vehicles, 1992, Navy Center for Applied Research in Artificial Intelligence, Naval Research Laboratory, Washington, DC, 12 pages.

Koppula et al., "Anticipating human activities using object affordances for reactive robotic response", IEEE Trami 2016, published May 5, 2015, 16 pages.

Orme, "System design tips for entry level smartphones—part 3", found online at "https://community.arm.com/processors/b/blog/posts/system-design-tips-for-entry-level-smartphones---part-3", Oct. 21, 2013, 12 pages.

Nowostawski, Mariusz et al., "Dynamic Demes Parallel Genetic Algorithm", May 13, 1999, 6 pages.

Stack Overflow, How can I quantify difference between two images?, accessed Aug. 2, 2017 at https://stackoverflow.com/questions/189943/how-can-i-quantify-difference-between-two-images, 8 pages.

Skolicki, Zbigniew et al., "The Influence of Migration Sizes and Intervals on Island Models", Jun. 29, 2005, 8 pages.

Vahid Lari, et al., "Decentralized dynamic resource management support for massively parallel processor arrays", Sep. 11, 2011, 8 pages.

Vahid Lari, et al., "Distributed resource reservation in massively parallel processor arrays", May 16, 2011, 4 pages.

Mohsen Hayati and Yazdan Shirvany, "Artificial Neural Network Approach for Short Term Load Forecasting for Illam Region", Jan. 2007, 5 pages.

Hasim Sak, Andrew Senior, and Francoise Beaufays, "Long Short-Term Memory Recurrent Neural Network Architectures for Large Scale Acoustic Modeling", Jan. 2014, 5 pages.

Jorg Walter and Klaus Schulten, "Implementation of self-organizing neural networks for visuo-motor control of an industrial robot", Jan. 1993, 10 pages.

Heikki Hyotyniemi and Aarno Lehtola, "A Universal Relation Database Interface for Knowledge Based Systems", Apr. 1991, 5 pages.

Mrissa, Michael, et al. "An avatar architecture for the web of things." IEEE Internet Computing 19.2 (2015): 30-38., 9 pages.

Luck, Michael, and Ruth Aylett. "Applying artificial intelligence to virtual reality: Intelligent virtual environments." Applied Artificial Intelligence 14.1 (2000): 3-32., 30 pages.

Terdjimi, Mehdi, et al. "An avatar-based adaptation workflow for the web of things." Enabling Technologies: Infrastructure for Collaborative Enterprises (WETICE), 2016 IEEE 25th International Conference on. IEEE, 2016., 6 pages.

Bogdanovych, Anton, et al. "Authentic interactive reenactment of cultural heritage with 3D virtual worlds and artificial Intelligence." Applied Artificial Intelligence 24.6 (2010): 617-647., 32 pages.

Hernandez, Marco E. Perez, and Stephan Reiff-Marganiec. "Autonomous and self controlling smart objects for the future internet." Future internet of things and cloud (FiCloud), 2015 3rd international conference on. IEEE, 2015., 8 pages.

Medini et al., "Building a Web of Things with Avatars", Managing the Web of Things (2017), 30 pages.

Zhang, Yiying, Lei Guo, and Nicolas D. Georganas. "AGILE: An architecture for agent-based collaborative and interactive virtual environments." Proc. Workshop on Application Virtual Reality Technologies for Future Telecommunication System, IEEE Globecom 2000 Conference. 2000. (Year: 2000), 9 pages.

Eladhari, Mirjam P., "Semi-Autonomous Avatars in Virtual Game Worlds," Pre-conference to the ECREA 2010—3rd European Communication Conference, Avatars and Humans. Representing Users in Digital Games, Hamburg, Germany, Oct. 2010, Available from: Jan. 21, 2012 (Year. 2012), 8 pages.

Tracing (software), retrieved from <URL: http://wikipedia.com> on Jan. 10, 2014, 3 pages.

Younghoon Jung, Java Dynamics Reflection and a lot more, Oct. 10, 2012, 55 pages, Columbia University.

Amitabh Srivastava, Alan Eustace, ATOM A System for Building Customized Program Analysis Tools, May 3, 2004, 12 pages.

(56) References Cited

OTHER PUBLICATIONS

Mathew Smithson, Kapil Anand, Aparna Kotha, Khaled Elwazeer, Nathan Giles, Rajeev Barua, Binary Rewriting without Relocation Information, Nov. 10, 2010, 11 pages, University of Maryland.
Marek Olszewski, Keir Mierte, Adam Czajkowski, Angela Demle Brown, Jit Instrumentation—A Novel Approach to Dynamically Instrument Operating Systems, Feb. 12, 2007, 14 pages, University of Toronto.
About Event Tracing, retrieved from <URL: http://msdn.microsoft.com/en-us/library/aa363668(d=default,l=en-us,v=vs.85).aspx> on Jan. 12, 2014, 2 pages.
Eval( ), retrieved from <URL: https://developer.mozilla.org/en-US/docs/Web/JavaScript/Reference/Global_Objects/eval> on May 7, 2014, 13 pages.
Function, retrieved from <URL: https://developer.mozilla.org/en-US/docs/Web/JavaScript/Reference/Global_Objects/Function> on May 7, 2014, 11 pages.
Function Enter2 Function, retrieved from <URL: https://msdn.microsoft.com/en-us/library/aa964981(d=default,l=en-us,v=vs.110).aspx> on Mar. 19, 2014, 2 pages.
FunctionLeave2 Function, retrieved from <URL: https://msdn.microsoft.com/en-us/library/aa964942(d=default,l=en-us,v=vs.110).aspx> on Mar. 19, 2014, 1 pages.
Heuristic, retrieved from <URL: http://wikipedia.com> on May 22, 2014, 5 pages.
How to: Configure Trace Switches, retrieved from <URL: https://msdn.microsoft.com/en-us/library/vstudio/t06xyy08(d=default,l=en-us,v=vs.100).aspx> on Mar. 19, 2014, 3 pages.
Indirect branch, retrieved from <URL: http://wikipedia.com> on May 5, 2014, 1 pages.
Instruction cycle, retrieved from <URL: http://wikipedia.com> on Apr. 30, 2014, 2 pages.
Instruction set, retrieved from <URL: http://wikipedia.com> on Apr. 29, 2014, 6 pages.
Interrupt, retrieved from <URL: http://wikipedia.com> on May 15, 2014, 5 pages.
Introduction to Instrumentation and Tracing, retrieved from <URL: http://msdn.microsoft.com/en-us/library/aa983649(d=default,l=en-us,v=vs.71).aspx> on Jan. 10, 2014, 2 pages.
Java bytecode, retrieved from <URL: http://wikipedia.com> on May 27, 2014, 4 pages.
Package java.util.logging, retrieved from <URL: http://docs.oracle.com/javase/1.5.0/docs/api/java/util/logging/package-summary.html> on Mar. 19, 2014, 2 pages.
Javac—Java programming language compiler, retrieved from <URL: http://docs.oracle.com/javase/7/docs/technotes/tools/windows/javac.html> on May 13, 2014, 12 pages.
Interface JavaCompiler, retrieved from <URL: http://wikipedia.com> on May 13, 2014, 4 pages.
Javassist, retrieved from <URL: http://wikipedia.com> on May 13, 2014, 2 pages.
Just-in-time compilation, retrieved from <URL: http://wikipedia.com> on May 19, 2014, 5 pages.
JVM Tool Interface, retrieved from <URL: http://docs.oracle.com/javase/7/docs/platform/jvmti/jvmti.html> on Apr. 26, 2014, 127 pages.
Machine code, retrieved from <URL: http://wikipedia.com> on Apr. 30, 2014, 3 pages.
Metaprogramming, retrieved from <URL: http://wikipedia.com> on May 8, 2014, 3 pages.
Microsoft.VisualBasic.Logging Namespace, retrieved from <URL: http://msdn.microsoft.com/en-us/library/ms128122(d=default,l=en-us,v=vs.110).aspx> on Jan. 13, 2014, 1 pages.
Pin (computer program), retrieved from <URL: http://wikipedia.com> on May 6, 2014, 3 pages.
Processor register, retrieved from <URL: http://wikipedia.com> on Apr. 29, 2014, 4 pages.
Profiling (computer programming), retrieved from <URL: http://wikipedia.com> on Jan. 10, 2014, 4 pages.
Profiling Overview, retrieved from <URL: http://msdn.microsoft.com/en-us/library/bb384493(d=default,l=en-us,v=vs.110).aspx> on Jan. 12, 2014, 6 pages.
Program counter, retrieved from <URL: http://wikipedia.com> on Apr. 24, 2014, 2 pages.
Ptrace, retrieved from <URL: http://wikipedia.com> on Apr. 24, 2014, 2 pages.
Reflection (computer programming), retrieved from <URL: http://wikipedia.com> on May 7, 2014, 5 pages.
Class Runtime, retrieved from <URL: http://docs.oracle.com/javase/7/docs/api/java/lang/Runtime.html> on Jan. 10, 2014, 10 pages.
Self-modifying code, retrieved from <URL: http://wikipedia.com> on Jan. 12, 2014, 6 pages.
Subjective logic, retrieved from <URL: http://wikipedia.com> on May 22, 2014, 5 pages.
System.CodeDom.Compiler Namespace, retrieved from <URL: http://msdn.microsoft.com/en-us/library/z6b99ydt(d=default,l=en-us,v=vs.110).aspx> on May 13, 2014, 2 pages.
System.Reflection.Emit Namespace, retrieved from <URL: http:/msdn.microsoft.com/en-us/library/xd5fw18y(d=default,l=en-us,v=vs.110).aspx> on May 13, 2014, 2 pages.
2D computer graphics, retrieved from <URL: http://wikipedia.com> on Nov. 9, 2014, 7 pages.

* cited by examiner

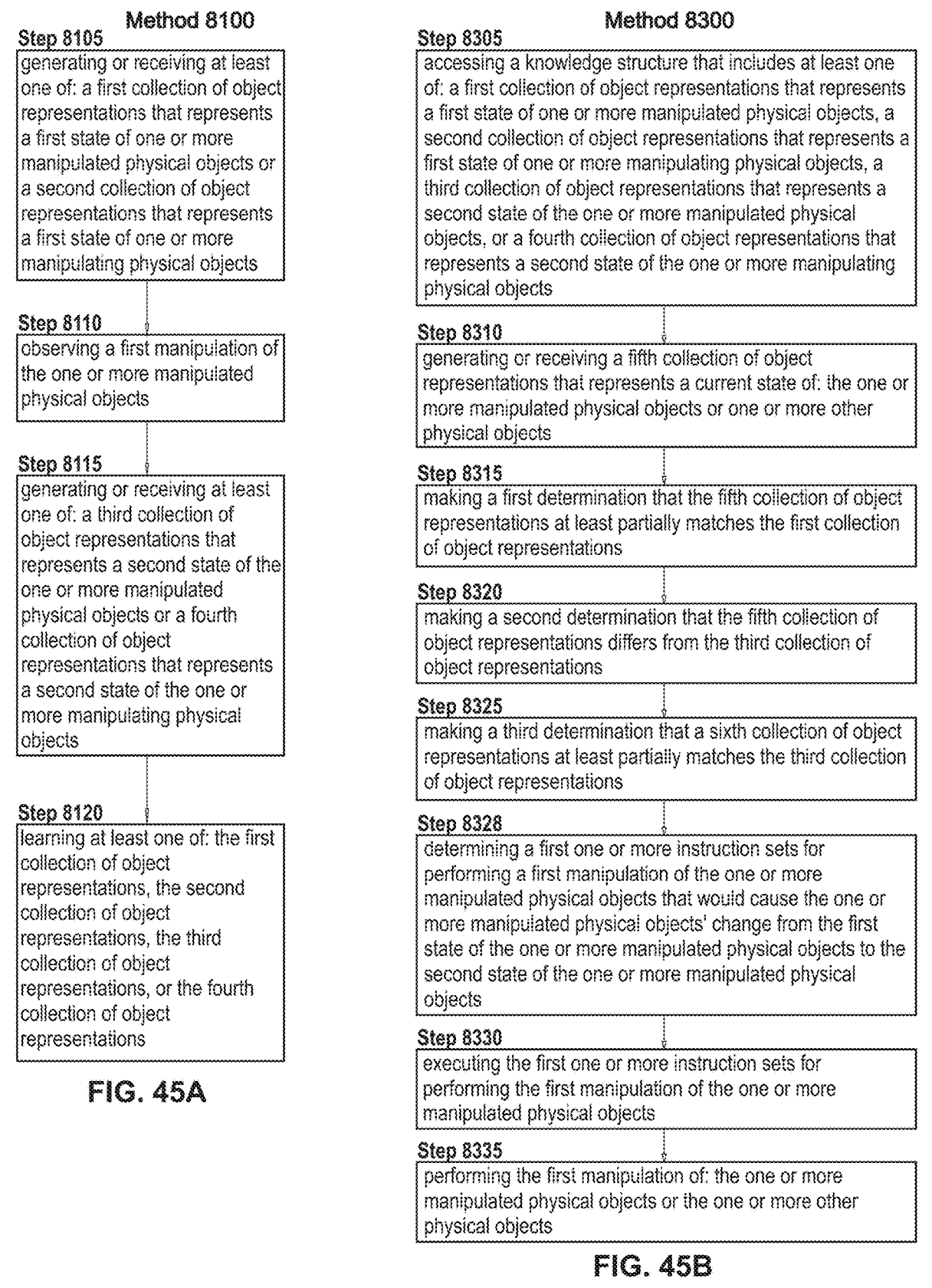

Method 8100

Step 8105
generating or receiving at least one of: a first collection of object representations that represents a first state of one or more manipulated physical objects or a second collection of object representations that represents a first state of one or more manipulating physical objects

Step 8110
observing a first manipulation of the one or more manipulated physical objects

Step 8115
generating or receiving at least one of: a third collection of object representations that represents a second state of the one or more manipulated physical objects or a fourth collection of object representations that represents a second state of the one or more manipulating physical objects

Step 8120
learning at least one of: the first collection of object representations, the second collection of object representations, the third collection of object representations, or the fourth collection of object representations

FIG. 45A

Method 8300

Step 8305
accessing a knowledge structure that includes at least one of: a first collection of object representations that represents a first state of one or more manipulated physical objects, a second collection of object representations that represents a first state of one or more manipulating physical objects, a third collection of object representations that represents a second state of the one or more manipulated physical objects, or a fourth collection of object representations that represents a second state of the one or more manipulating physical objects

Step 8310
generating or receiving a fifth collection of object representations that represents a current state of: the one or more manipulated physical objects or one or more other physical objects

Step 8315
making a first determination that the fifth collection of object representations at least partially matches the first collection of object representations

Step 8320
making a second determination that the fifth collection of object representations differs from the third collection of object representations

Step 8325
making a third determination that a sixth collection of object representations at least partially matches the third collection of object representations

Step 8328
determining a first one or more instruction sets for performing a first manipulation of the one or more manipulated physical objects that would cause the one or more manipulated physical objects' change from the first state of the one or more manipulated physical objects to the second state of the one or more manipulated physical objects

Step 8330
executing the first one or more instruction sets for performing the first manipulation of the one or more manipulated physical objects

Step 8335
performing the first manipulation of: the one or more manipulated physical objects or the one or more other physical objects

FIG. 45B

DEVICES, SYSTEMS, AND METHODS FOR MACHINE CONSCIOUSNESS

FIELD

The disclosure generally relates to computing.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Most devices, systems, and applications such as appliances, electronics, toys, some software, etc. can only perform specific operations that a user directs them to perform. Automated devices, systems, and applications such as robots, industrial machines, some software, etc. can only perform specific operations that they are programmed to perform. Artificially intelligent devices, systems, and/or applications such as self-driving cars, some software, etc. can only perform specific operations that they are trained to perform. Current devices, systems, and/or applications are limited to specific predefined operations. Devices, systems, and/or applications lack a way to learn on their own and become conscious.

SUMMARY

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: generating or receiving a first collection of object representations that represents a first state of one or more objects. The operations may further comprise: selecting or determining, using curiosity, a first one or more instruction sets for performing a first manipulation of the one or more objects. The operations may further comprise: executing the first one or more instruction sets for performing the first manipulation of the one or more objects. The operations may further comprise: performing the first manipulation of the one or more objects. The operations may further comprise: generating or receiving a second collection of object representations that represents a second state of the one or more objects. The operations may further comprise: learning the first one or more instruction sets for performing the first manipulation of the one or more objects correlated with at least one of: the first collection of object representations or the second collection of object representations.

In certain embodiments, the one or more objects are one or more physical objects, and the first manipulation of the one or more objects is performed by a device. The one or more objects may be detected at least in part by one or more sensors. At least one sensor of one or more sensors that at least in part detected the first state of the one or more physical objects may not be the same as at least one sensor of one or more sensors that at least in part detected the second state of the one or more physical objects. The executing the first one or more instruction sets for performing the first manipulation of the one or more objects may include causing: the device, a device control program, or an application to execute the first one or more instruction sets for performing the first manipulation of the one or more objects.

In some embodiments, the one or more objects are one or more computer generated objects, and the first manipulation of the one or more objects is performed by an avatar. The one or more objects may be detected at least in part by one or more simulated sensors. The avatar may include a computer generated object. The executing the first one or more instruction sets for performing the first manipulation of the one or more objects may include causing: the avatar, an avatar control program, or an application to execute the first one or more instruction sets for performing the first manipulation of the one or more objects. The one or more computer generated objects may be one or more objects of an application. The avatar may be an object of an application.

In certain embodiments, the first state of the one or more objects is a state of the one or more objects before the first manipulation of the one or more objects. In further embodiments, the second state of the one or more objects is a state of the one or more objects after the first manipulation of the one or more objects. In further embodiments, the second state of the one or more objects is caused by the first manipulation of the one or more objects. In further embodiments, the first state of the one or more objects is detected or obtained at a first time or over a first time period. In further embodiments, the second state of the one or more objects is detected or obtained at a second time or over a second time period. In further embodiments, the first collection of object representations represents the first state of the one or more objects at a first time or over a first time period. In further embodiments, the second collection of object representations represents the second state of the one or more objects at a second time or over a second time period. In further embodiments, the second state of the one or more objects is unknown prior to the first manipulation of the one or more objects. In further embodiments, the second state of the one or more objects is not the same as the first state of the one or more objects. In further embodiments, the second state of the one or more objects is the same as the first state of the one or more objects. In further embodiments, the first collection of object representations includes a stream of collections of object representations. In further embodiments, the first collection of object representations includes a stream of object representations. In further embodiments, the first collection of object representations includes a plurality of object representations. In further embodiments, the first collection of object representations includes a single object representation. In further embodiments, the second collection of object representations includes a stream of collections of object representations. In further embodiments, the second collection of object representations includes a stream of object representations. In further embodiments, the second collection of object representations includes a plurality of object representations. In further embodiments, the second collection of object representations includes a single object representation.

In some embodiments, the first manipulation of the one or more objects includes one or more manipulations of the one or more objects. In further embodiments, an instruction set of the first one or more instruction sets for performing the first manipulation of the one or more objects includes one or more instructions for performing the first manipulation of the one or more objects. In further embodiments, the selecting or determining, using curiosity, the first one or more instruction sets for performing the first manipulation of the one or more objects includes selecting or determining the first one or more instruction sets for performing a first a curious, an experimental, or an inquisitive manipulation of the one or more objects. In further embodiments, the selecting or determining, using curiosity, the first one or more instruction sets for performing the first manipulation of the one or more objects includes selecting or determining randomly, in an order, or in a pattern the first one or more instruction sets for performing the first manipulation of the one or more objects. In further embodiments, the selecting or determining, using curiosity, the first one or more instruction sets for performing the first manipulation of the one or more objects includes selecting or determining the first one or more instruction sets for performing the first manipulation of the one or more objects that is not pre-determined or programmed to be performed on the one or more objects. In further embodiments, the selecting or determining, using curiosity, the first one or more instruction sets for performing the first manipulation of the one or more objects includes selecting or determining the first one or more instruction sets for performing the first manipulation of the one or more objects to discover an unknown state of the one or more objects. The unknown state of the one or more objects may be the second state of the one or more objects.

In certain embodiments, the first one or more instruction sets for performing the first manipulation of the one or more objects temporally correspond to at least the first collection of object representations or the second collection of object representations. In further embodiments, the learning the first one or more instruction sets for performing the first manipulation of the one or more objects correlated with at least the first collection of object representations or the second collection of object representations includes storing the first one or more instruction sets for performing the first manipulation of the one or more objects correlated with at least the first collection of object representations or the second collection of object representations into a knowledge structure, or into a neuron, a node, a vertex, a knowledge cell, a correlation, or an element of a knowledge structure. The knowledge structure may include an artificial intelligence system for knowledge structuring, storing, or representation. The artificial intelligence system for knowledge structuring, storing, or representation may include at least one of: a hierarchical system, a symbolic system, a sub-symbolic system, a deterministic system, a probabilistic system, a statistical system, a supervised learning system, an unsupervised learning system, a neural network-based system, a search-based system, an optimization-based system, a logic-based system, a fuzzy logic-based system, a tree-based system, a graph-based system, a sequence-based system, a deep learning system, an evolutionary system, a genetic system, or a multi-agent system. In further embodiments, the knowledge cell is a data structure for storing, structuring, and/or organizing at least one of: the first one or more instruction sets for performing the first manipulation of the one or more objects, the first collection of object representations, or the second collection of object representations.

In some embodiments, the operations may further comprise: selecting or determining, using curiosity, a second one or more instruction sets for performing a second manipulation of the one or more objects. The operations may further comprise: executing the second one or more instruction sets for performing the second manipulation of the one or more objects. The operations may further comprise: performing the second manipulation of the one or more objects. The operations may further comprise: generating or receiving a third collection of object representations that represents a third state of the one or more objects. The operations may further comprise: learning the second one or more instruction sets for performing the second manipulation of the one or more objects correlated with at least one of: the second collection of object representations or the third collection of object representations. In further embodiments, the third state of the one or more objects is caused at least in part by the second manipulation of the one or more objects. In further embodiments, the learning the first one or more instruction sets for performing the first manipulation of the one or more objects correlated with at least the first collection of object representations or the second collection of object representations includes storing the first one or more instruction sets for performing the first manipulation of the one or more objects correlated with at least the first collection of object representations or the second collection of object representations into a first a neuron, a node, a vertex, a knowledge cell, a correlation, or an element of a knowledge structure, and wherein the learning the second one or more instruction sets for performing the second manipulation of the one or more objects correlated with at least the second collection of object representations or the third collection of object representations includes storing the second one or more instruction sets for performing the second manipulation of the one or more objects correlated with at least the second collection of object representations or the third collection of object representations into a second a neuron, a node, a vertex, a knowledge cell, a correlation, or an element of the knowledge structure. The first the neuron, the node, the vertex, the knowledge cell, the correlation, or the element of the knowledge structure may be connected by a connection with the second the neuron, the node, the vertex, the knowledge cell, the correlation, or the element of the knowledge structure.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: generating or receiving a first collection of object representations that represents a first state of one or more objects. The operations may further comprise: observing a first manipulation of the one or more objects. The operations may further comprise: generating or receiving a second collection of object representations that represents a second state of the one or more objects. The operations may further comprise: determining a first one or more instruction sets for performing the first manipulation of the one or more objects. The operations may further comprise: learning the first one or more instruction sets for performing the first manipulation of the one or more objects correlated with at least one of: the first collection of object representations or the second collection of object representations.

In certain embodiments, the one or more objects are one or more physical objects, and wherein the first manipulation of the one or more objects is performed by another one or more physical objects. The first manipulation of the one or more objects may be detected at least in part by one or more sensors. The observing the first manipulation of the one or more objects may include causing a device's one or more sensors to observe the first manipulation of the one or more objects.

In some embodiments, the one or more objects are one or more computer generated objects, and wherein the first manipulation of the one or more objects is performed by another one or more computer generated objects. The first manipulation of the one or more objects may be detected at least in part by one or more simulated sensors. The observing the first manipulation of the one or more objects may include causing one or more simulated sensors to observe the first manipulation of the one or more objects.

In certain embodiments, the observing the first manipulation of the one or more objects includes causing a device or an observation point to observe the first manipulation of the one or more objects. In further embodiments, the observing the first manipulation of the one or more objects includes: determining a location that optimizes the observing of the first manipulation of the one or more objects; and positioning a device or an observation point at the location. In further embodiments, the observing the first manipulation of the one or more objects includes: determining a location that maximizes an accuracy of a physical sensor or a simulated sensor used in the observing of the first manipulation of the one or more objects; and positioning a device or an observation point at the location. In further embodiments, the observing the first manipulation of the one or more objects includes: determining a location that maximizes an accuracy of a measurement used in the observing of the first manipulation of the one or more objects; and positioning a device or an observation point at the location. In further embodiments, the observing the first manipulation of the one or more objects includes: determining a location that maximizes an accuracy of a measurement used in the determining the first one or more instruction sets for performing the first manipulation of the one or more objects; and positioning a device or an observation point at the location.

In some embodiments, the first manipulation of the one or more objects is performed by another one or more objects. In further embodiments, the one or more objects include one or more manipulated objects, and wherein the another one or more objects include one or more manipulating objects. In further embodiments, the observing the first manipulation of the one or more objects includes observing at least one of: the one or more objects, or the another one or more objects. In further embodiments, the observing the first manipulation of the one or more objects includes identifying one or more objects of interest that are in a manipulating relationship or are to enter into a manipulating relationship, wherein the one or more objects of interest include at least one of: the one or more objects, or the another one or more objects. In further embodiments, the observing the first manipulation of the one or more objects includes identifying one or more objects that are in contact or one or more objects that are to come in contact, wherein the one or more objects that are in contact or the one or more objects that are to come in contact include the one or more objects and the another one or more objects. In further embodiments, the observing the first manipulation of the one or more objects includes identifying the one or more objects as inactive one or more objects and identifying the another one or more objects as moving, transforming, or changing one or more objects prior to a contact between the one or more objects and the another one or more objects. In further embodiments, the observing the first manipulation of the one or more objects includes identifying the one or more objects and the another one or more objects using: the one or more objects' affordances, and the another one or more objects' affordances. In further embodiments, the observing the first manipulation of the one or more objects includes causing a device or an observation point to traverse a physical or computer generated space to find at least one of: the one or more objects, or the another one or more objects. In further embodiments, the observing the first manipulation of the one or more objects includes causing a device or an observation point to position itself to observe at least one of: the one or more objects, or the another one or more objects. In further embodiments, the observing the first manipulation of the one or more objects includes causing a device or an observation point to follow at least one of: the one or more objects, or the another one or more objects. In further embodiments, the observing the first manipulation of the one or more objects includes: determining a location at an equal distance from the one or more objects and the another one or more objects; and positioning a device or an observation point at the location. In further embodiments, the observing the first manipulation of the one or more objects includes: determining a location on a first line, wherein the first line is at an angle to a second line, and wherein the second line runs from the one or more objects to the another one or more objects, and wherein the first line and the second line intersect at: a point within the one or more objects, a point within the another one or more objects, or a point between the one or more objects and the another one or more objects; and positioning a device or an observation point at the location. The angle may be a ninety degrees angle. In further embodiments, the observing the first manipulation of the one or more objects includes: determining, estimating, or projecting a trajectory of at least one of: the one or more objects, or the another one or more objects; determining a location relative to a point on the trajectory; and positioning a device or an observation point at the location. In further embodiments, the observing the first manipulation of the one or more objects is performed by the another one or more objects. In further embodiments, the first manipulation of the one or more objects is performed by the one or more objects.

In certain embodiments, the determining the first one or more instruction sets for performing the first manipulation of the one or more objects includes determining one or more instruction sets for performing, by a device or by an avatar, the first manipulation of the one or more objects. In further embodiments, the determining the first one or more instruction sets for performing the first manipulation of the one or more objects includes determining one or more instruction sets for replicating the first manipulation of the one or more objects. In further embodiments, the first manipulation of the one or more objects is performed by another one or more objects. The determining the first one or more instruction sets for performing the first manipulation of the one or more objects may include observing or examining the another one or more objects' operations in performing the first manipulation of the one or more objects. The determining the first one or more instruction sets for performing the first manipulation of the one or more objects may include determining one or more instruction sets for replicating the another one or more objects' operations in performing the first manipulation of the one or more objects. The determining the first one or more instruction sets for performing the first manipulation of the one or more objects may include: determining a location of the another one or more objects; and determining one or more instruction sets for moving a device or an avatar into the location. The determining the first one or more instruction sets for performing the first manipulation of the one or more objects may include: determining a point of contact between the one or more objects and the another one or more objects; and determining one or more instruction sets for moving a device, a portion of a device, an avatar, or a portion of an avatar to the point of contact. In further embodiments, the determining the first one or more instruction sets for performing the first manipulation of the one or more objects includes determining one or more instruction sets for replicating the one or more objects' change of states. In further embodiments, the determining the first one or more instruction sets for performing the first manipulation of the one or more objects includes determining one or more instruction sets for replicating at least one of: the one or more objects' starting state, or the one or more objects' ending state. In further embodiments, the determining the first one or more instruction sets for performing the first manipulation of the one or more objects includes: determining a reach point where the one or more objects are within reach of: a device, a portion of a device, an avatar, or a portion of an avatar; and determining one or more instruction sets for moving the device or the avatar into the reach point. In further embodiments, the determining the first one or more instruction sets for performing the first manipulation of the one or more objects includes: recognizing the first manipulation of the one or more objects; and finding, in a collection of instruction sets associated with references to manipulations of objects, the first one or more instruction sets for performing the first manipulation of the one or more objects using a reference to the recognized first manipulation of the one or more objects.

In some embodiments, the operations may further comprise: observing a second manipulation of the one or more objects. The operations may further comprise: generating a third collection of object representations that represents a third state of the one or more objects. The operations may further comprise: determining a second one or more instruction sets for performing the second manipulation of the one or more objects. The operations may further comprise: learning the second one or more instruction sets for performing the second manipulation of the one or more objects correlated with at least one of: the second collection of object representations or the third collection of object representations.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: accessing a knowledge structure that includes a first one or more instruction sets for performing a first manipulation of one or more objects correlated with at least one of: a first collection of object representations that represents a first state of the one or more objects, or a second collection of object representations that represents a second state of the one or more objects. The operations may further comprise: generating or receiving a third collection of object representations that represents: a third state of the one or more objects, or a first state of another one or more objects. The operations may further comprise: making a first determination that the third collection of object representations at least partially matches the first collection of object representations. The operations may further comprise: at least in response to the making the first determination, executing the first one or more instruction sets for performing the first manipulation of the one or more objects. The operations may further comprise: performing the first manipulation of: the one or more objects, or the another one or more objects.

In certain embodiments, the one or more objects are one or more physical objects, and wherein the first manipulation of the one or more objects is performed by a device. In further embodiments, the one or more objects are one or more computer generated objects, and wherein the first manipulation of the one or more objects is performed by an avatar. In further embodiments, the another one or more objects are one or more physical objects, and wherein the first manipulation of the another one or more objects is performed by a device. In further embodiments, the another one or more objects are one or more computer generated objects, and wherein the first manipulation of the another one or more objects is performed by an avatar.

In some embodiments, the operations may further comprise: generating or receiving a fourth collection of object representations that represents a fourth state of: the one or more objects, the another one or more objects, or an additional one or more objects. The operations may further comprise: making a second determination that the fourth collection of object representations at least partially matches the first collection of object representations. The operations may further comprise: at least in response to the making the fourth determination, executing the first one or more instruction sets for performing the first manipulation of the one or more objects. The operations may further comprise: performing, by a device or by an avatar, the first manipulation of the one or more objects, the another one or more objects, or the additional one or more objects.

In certain embodiments, at least the first one or more instruction sets for performing the first manipulation of the one or more objects are learned at least in part using curiosity. The first manipulation of the one or more objects that may be performed in a learning of the first one or more instruction sets for performing the first manipulation of the one or more objects may be performed by: a device, or an avatar. The first one or more instruction sets for performing the first manipulation of the one or more objects may include one or more information about one or more states of a device or an avatar that performs the first manipulation of the one or more objects. The first one or more instruction sets for performing the first manipulation of the one or more objects may include one or more information about one or more states of a device or an avatar that performs the first manipulation of the one or more objects. In some embodiments, at least the first one or more instruction sets for performing the first manipulation of the one or more objects are learned at least in part by observing the first manipulation of the one or more objects. The first manipulation of the one or more objects that may be performed in a learning of the first one or more instruction sets for performing the first manipulation of the one or more objects may be performed by: the one or more objects, the another one or more objects, or an additional one or more objects. The first one or more instruction sets for performing the first manipulation of the one or more objects may include one or more information about one or more states of: the one or more objects, the another one or more objects, or an additional one or more objects that perform the first manipulation of the one or more objects.

In some embodiments, the third state of the one or more objects is detected or obtained at a third time or over a third time period. In further embodiments, the third collection of object representations represents: the third state of the one or more objects at a third time or over a third time period, or the first state of the another one or more objects at a fourth time or over a fourth time period. In further embodiments, the third collection of object representations includes a stream of collections of object representations. In further embodiments, the third collection of object representations includes a stream of object representations. In further embodiments, the third collection of object representations includes a plurality of object representations. In further embodiments, the third collection of object representations includes a single object representation.

In certain embodiments, the making the first determination that the third collection of object representations at least partially matches the first collection of object representations includes: determining that a number of at least partially matching portions of the third collection of object representations and portions of the first collection of object representations exceeds a threshold number, or determining that a percentage of at least partially matching portions of the third collection of object representations and portions of the first collection of object representations exceeds a threshold percentage. In further embodiments, the making the first determination that the third collection of object representations at least partially matches the first collection of object representations includes determining that a similarity between the third collection of object representations and the first collection of object representations exceeds: a threshold number, a threshold percentage, a similarity threshold, or a threshold.

In certain embodiments, the operations may further comprise: making a second determination that the third collection of object representations differs from the second collection of object representations, wherein the executing the first one or more instruction sets for performing the first manipulation of the one or more objects is performed at least in response to the making the first determination and the making the second determination. The making the second determination that the third collection of object representations differs from the second collection of object representations may includes determining that a number of different portions of the third collection of object representations and portions of the second collection of object representations exceeds a threshold number, or determining that a percentage of different portions of the third collection of object representations and portions of the second collection of object representations exceeds a threshold percentage. The making the second determination that the third collection of object representations differs from the second collection of object representations may include determining that a difference between the third collection of object representations and the second collection of object representations exceeds: a threshold number, a threshold percentage, a difference threshold, or a threshold.

In certain embodiments, the operations may further comprise: making a third determination that a fourth collection of object representations at least partially matches the second collection of object representations, wherein the executing the first one or more instruction sets for performing the first manipulation of the one or more objects is performed at least in response to the making the first determination and the making the third determination. In further embodiments, the making the third determination that the fourth collection of object representations at least partially matches the second collection of object representations includes: determining that a number of at least partially matching portions of the fourth collection of object representations and portions of the second collection of object representations exceeds a threshold number, or determining that a percentage of at least partially matching portions of the fourth collection of object representations and portions of the second collection of object representations exceeds a threshold percentage. In further embodiments, the making the third determination that the fourth collection of object representations at least partially matches the second collection of object representations includes determining that a similarity between the fourth collection of object representations and the second collection of object representations exceeds: a threshold number, a threshold percentage, a similarity threshold, or a threshold. In further embodiments, the fourth collection of object representations represents a fourth state or a beneficial state of: the one or more objects, the another one or more objects, or an additional one or more objects. In further embodiments, the fourth collection of object representations represents a state of: the one or more objects, the another one or more objects, or an additional one or more objects that advances an operation. In further embodiments, the fourth state of the one or more objects is detected or obtained at a fourth time or over a fourth time period. In further embodiments, the fourth collection of object representations represents: a fourth state of the one or more objects at a fourth time or over a fourth time period, or a second state of the another one or more objects at a fifth time or over a fifth time period. In further embodiments, the fourth collection of object representations includes a stream of collections of object representations. In further embodiments, the fourth collection of object representations includes a stream of object representations. In further embodiments, the fourth collection of object representations includes a plurality of object representations. In further embodiments, the fourth collection of object representations includes a single object representation.

In some embodiments, the knowledge structure includes a second one or more instruction sets for performing a second manipulation of the one or more objects correlated with at least a second collection of object representations or a fourth collection of object representations, wherein the fourth collection of object representations represents a fourth state of the one or more objects. In further embodiments, the knowledge structure includes a second one or more instruction sets for performing a second manipulation of: the one or more objects, the another one or more objects, or an additional one or more objects correlated with at least a fourth collection of object representations or a fifth collection of object representations, and wherein the fourth collection of object representations represents a fourth state of: the one or more objects, the another one or more objects, or an additional one or more objects, and wherein the fifth collection of object representations represents a fifth state of: the one or more objects, the another one or more objects, or an additional one or more objects. In further embodiments, the knowledge structure further includes a second one or more instruction sets for performing a second manipulation of: the one or more objects, the another one or more objects, or an additional one or more objects correlated with at least one of: a fourth collection of object representations or a fifth collection of object representations, wherein the fourth collection of object representations represents a fourth state of: the one or more objects, the another one or more objects, or the additional one or more objects, and wherein the fifth collection of object representations represents a fifth state of: the one or more objects, the another one or more objects, or the additional one or more objects. In further embodiments, the knowledge structure includes a second one or more instruction sets for performing a second manipulation of the one or more objects, the another one or more objects, or an additional one or more objects correlated with at least one of: a fourth collection of object representations or a fifth collection of object representations, wherein the at least the first one or more instruction sets for performing the first manipulation of the one or more objects are learned at least in part in a first learning process, and wherein the at least the second one or more instruction sets for performing the second manipulation of the one or more objects, the another one or more objects, or the additional one or more objects are learned at least in part in a second learning process. In further embodiments, at least a portion of the first one or more instruction sets for performing the first manipulation of the one or more objects, at least a portion of the first collection of object representations, or at least a portion of the second collection of object representations is: deleted, modified, or manipulated. In further embodiments, an element is inserted into at least a portion of: the first one or more instruction sets for performing the first manipulation of the one or more objects, the first collection of object representations, or the second collection of object representations.

In certain embodiments, the operations may further comprise: modifying: the first one or more instruction sets for performing the first manipulation of the one or more objects, or a copy of the first one or more instruction sets for performing the first manipulation of the one or more objects, and wherein the executing the first one or more instruction sets for performing the first manipulation of the one or more objects includes executing: the modified the first one or more instruction sets for performing the first manipulation of the one or more objects, or the modified the copy of the first one or more instruction sets for performing the first manipulation of the one or more objects, and wherein the performing the first manipulation of the one or more objects or the another one or more objects includes performing a manipulation of the one or more objects or the another one or more objects defined by: the modified the first one or more instruction sets for performing the first manipulation of the one or more objects, or the modified the copy of the first one or more instruction sets for performing the first manipulation of the one or more objects. In further embodiments, an instruction set of the first one or more instruction sets includes at least one of: only one instruction, a plurality of instructions, one or more inputs, one or more commands, one or more computer commands, one or more keywords, one or more symbols, one or more operators, one or more variables, one or more values, one or more objects, one or more object references, one or more data structures, one or more data structure references, one or more functions, one or more function references, one or more parameters, one or more signals, one or more characters, one or more digits, one or more numbers, one or more binary bits, one or more assembly language commands, one or more states, one or more state representations, one or more codes, one or more data, or one or more information.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: accessing a knowledge structure that includes a first one or more instruction sets for performing a first manipulation of one or more computer generated objects correlated with at least one of: a first collection of object representations that represents a first state of the one or more computer generated objects or a second collection of object representations that represents a second state of the one or more computer generated objects. The operations may further comprise: generating or receiving a third collection of object representations that represents a first state of one or more physical objects. The operations may further comprise: making a first determination that the third collection of object representations at least partially matches the first collection of object representations. The operations may further comprise: converting the first one or more instruction sets for performing the first manipulation of the one or more computer generated objects into a first one or more instruction sets for performing a first manipulation of the one or more physical objects. The operations may further comprise: at least in response to the making the first determination, executing the first one or more instruction sets for performing the first manipulation of the one or more physical objects. The operations may further comprise: performing the first manipulation of the one or more physical objects.

In certain embodiments, the converting the first one or more instruction sets for performing the first manipulation of the one or more computer generated objects into the first one or more instruction sets for performing the first manipulation of the one or more physical objects includes replacing a reference for an avatar in the first one or more instruction sets for performing the first manipulation of the one or more computer generated objects with a reference for a device. In further embodiments, the converting the first one or more instruction sets for performing the first manipulation of the one or more computer generated objects into the first one or more instruction sets for performing the first manipulation of the one or more physical objects includes replacing a reference for an element of an avatar in the first one or more instruction sets for performing the first manipulation of the one or more computer generated objects with a reference for an element of a device. In further embodiments, the converting the first one or more instruction sets for performing the first manipulation of the one or more computer generated objects into the first one or more instruction sets for performing the first manipulation of the one or more physical objects includes modifying the first one or more instruction sets for performing the first manipulation of the one or more computer generated objects to account for a difference between an avatar and a device. In further embodiments, the converting the first one or more instruction sets for performing the first manipulation of the one or more computer generated objects into the first one or more instruction sets for performing the first manipulation of the one or more physical objects includes modifying the first one or more instruction sets for performing the first manipulation of the one or more computer generated objects to account for a difference between a situation when the first manipulation of the one or more computer generated objects is performed and a situation when the first manipulation of the one or more physical objects is performed.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: accessing a knowledge structure that includes a first one or more instruction sets for performing a first manipulation of one or more physical objects correlated with at least one of: a first collection of object representations that represents a first state of the one or more physical objects or a second collection of object representations that represents a second state of the one or more physical objects. The operations may further comprise: generating or receiving a third collection of object representations that represents a first state of one or more computer generated objects. The operations may further comprise: making a first determination that the third collection of object representations at least partially matches the first collection of object representations. The operations may further comprise: converting the first one or more instruction sets for performing the first manipulation of the one or more physical objects into a first one or more instruction sets for performing a first manipulation of the one or more computer generated objects. The operations may further comprise: at least in response to the making the first determination, executing the first one or more instruction sets for performing the first manipulation of the one or more computer generated objects. The operations may further comprise: performing the first manipulation of the one or more computer generated objects.

In some embodiments, the converting the first one or more instruction sets for performing the first manipulation of the one or more physical objects into the first one or more instruction sets for performing the first manipulation of the one or more computer generated objects includes replacing a reference for a device in the first one or more instruction sets for performing the first manipulation of the one or more physical objects with a reference for an avatar. In further embodiments, the converting the first one or more instruction sets for performing the first manipulation of the one or more physical objects into the first one or more instruction sets for performing the first manipulation of the one or more computer generated objects includes replacing a reference for an element of a device in the first one or more instruction sets for performing the first manipulation of the one or more physical objects with a reference for an element of an avatar. In further embodiments, the converting the first one or more instruction sets for performing the first manipulation of the one or more physical objects into the first one or more instruction sets for performing the first manipulation of the one or more computer generated objects includes modifying the first one or more instruction sets for performing the first manipulation of the one or more physical objects to account for a difference between a device and an avatar. In further embodiments, the converting the first one or more instruction sets for performing the first manipulation of the one or more physical objects into the first one or more instruction sets for performing the first manipulation of the one or more computer generated objects includes modifying the first one or more instruction sets for performing the first manipulation of the one or more physical objects to account for a difference between a situation when the first manipulation of the one or more physical objects is performed and a situation when the first manipulation of the one or more computer generated objects is performed.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: generating or receiving at least one of: a first collection of object representations that represents a first state of one or more manipulated objects, or a second collection of object representations that represents a first state of one or more manipulating objects. The operations may further comprise: observing a first manipulation of the one or more manipulated objects. The operations may further comprise: generating or receiving at least one of: a third collection of object representations that represents a second state of the one or more manipulated objects, or a fourth collection of object representations that represents a second state of the one or more manipulating objects. The operations may further comprise: learning at least one of: the first collection of object representations, the second collection of object representations, the third collection of object representations, or the fourth collection of object representations.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: accessing a knowledge structure that includes at least one of: a first collection of object representations that represents a first state of one or more manipulated objects, a second collection of object representations that represents a first state of one or more manipulating objects, a third collection of object representations that represents a second state of the one or more manipulated objects, or a fourth collection of object representations that represents a second state of the one or more manipulating objects. The operations may further comprise: generating or receiving a fifth collection of object representations that represents: a third state of the one or more manipulated objects, or a first state of one or more other objects. The operations may further comprise: making a first determination that the fifth collection of object representations at least partially matches the first collection of object representations. The operations may further comprise: at least in response to the making the first determination: determining a first one or more instruction sets for performing a first manipulation of the one or more manipulated objects that would cause the one or more manipulated objects' change from the first state of the one or more manipulated objects to the second state of the one or more manipulated objects; executing the first one or more instruction sets for performing the first manipulation of the one or more manipulated objects; and performing the first manipulation of the one or more manipulated objects or the one or more other objects.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: generating or receiving a first collection of object representations that represents a first state of one or more objects. The operations may further comprise: determining that the first state of the one or more objects is a preferred state of the one or more objects. The operations may further comprise: learning the first collection of object representations.

In some embodiments, the one or more objects are one or more physical objects. In further embodiments, the one or more objects are one or more computer generated objects.

In certain embodiments, the determining that the first state of the one or more objects is the preferred state of the one or more objects includes receiving an indication that the first state of the one or more objects is the preferred state of the one or more objects. The indication may be received from another object. The indication may include: a gesture, a physical movement, or a physical indication. The indication may include: a sound, a speech, or an audio indication. The indication may include: an electrical indication, a magnetic indication, or an electromagnetic indication. The indication may include: a positive reinforcement, or a negative reinforcement.

In some embodiments, the determining that the first state of the one or more objects is the preferred state of the one or more objects includes determining that the first state of the one or more objects occurs with a frequency that exceeds a threshold. In further embodiments, the determining that the first state of the one or more objects is the preferred state of the one or more objects includes determining that the first state of the one or more objects is caused by another object. The another object may include: a trusted object, or an object that occurs with a frequency that exceeds a threshold. In further embodiments, the first collection of object representations includes an object representation that represents an object, wherein the object includes one or more object representations that represent the first state of the one or more objects, wherein the determining that the first state of the one or more objects is the preferred state of the one or more objects includes determining that the first state of the one or more objects is the preferred state of the one or more objects based on the first state of the one or more objects represented in the one or more object representations.

In certain embodiments, the learning the first collection of object representations includes storing the first collection of object representations into a purpose structure. In further embodiments, the purpose structure includes a sequence. The learning the first collection of object representations may include positioning the first collection of object representation within the sequence based on a priority of the first collection of object representations relative to priorities of collections of object representations in the sequence. In further embodiments, the purpose structure includes a graph or a neural network. The learning the first collection of object representations may include: storing the first collection of object representations in the graph or the neural network; and connecting the first collection of object representations to one or more collections of object representations using connections. In further embodiments, the purpose structure includes one or more purposes of at least one of: a device, an avatar, a system, or an application. In further embodiments, the purpose structure includes an artificial intelligence system for purpose structuring, storing, or representation. The artificial intelligence system for purpose structuring, storing, or representation may include at least one of: a a hierarchical system, a symbolic system, a sub-symbolic system, a deterministic system, a probabilistic system, a statistical system, a supervised learning system, an unsupervised learning system, a neural network-based system, a search-based system, an optimization-based system, a logic-based system, a fuzzy logic-based system, a tree-based system, a graph-based system, a sequence-based system, a deep learning system, an evolutionary system, a genetic system, or a multi-agent system. In further embodiments, the learning the first collection of object representations includes storing the first collection of object representations or a reference to the first collection of object representations into a neuron, a node, a vertex, a purpose representation, or an element of a purpose structure. In further embodiments, the purpose representation is a data structure for storing, structuring, and/or organizing at least the first collection of object representations.

In certain embodiments, the operations may further comprise: generating or receiving a second collection of object representations that represents a second state of the one or more objects or a first state of another one or more objects. The operations may further comprise: determining that the second state of the one or more objects or the first state of the another one or more objects is a preferred state of the one or more objects or the another one or more objects. The operations may further comprise: learning the second collection of object representations.

In some aspects, the disclosure relates to (i) a system including one or more processors configured to perform at least the following operations: (ii) a method comprising at least the following operations: and/or (iii) one or more non-transitory machine readable media storing machine readable code that, when executed by one or more processors, causes the one or more processors to perform at least the following operations: accessing a knowledge structure that includes a first one or more instruction sets for performing a first manipulation of one or more objects correlated with at least one of: a first collection of object representations that represents a first state of the one or more objects or a second collection of object representations that represents a second state of the one or more objects. The operations may further comprise: accessing a purpose structure that includes a third collection of object representations that represents a preferred state of: the one or more objects or another one or more objects. The operations may further comprise: generating or receiving a fourth collection of object representations that represents a current state of: the one or more objects or another one or more objects. The operations may further comprise: making a first determination that there is at least partial match between the fourth collection of object representations and the first collection of object representations. The operations may further comprise: making a second determination that there is at least partial match between the third collection of object representations and the second collection of object representations. The operations may further comprise: making a third determination of the first one or more instruction sets in a path between the first collection of object representations and the second collection of object representations. The operations may further comprise: executing the first one or more instruction sets for performing the first manipulation of the one or more objects, wherein the executing is performed in response to at least one of: the first determination, the second determination, or the third determination. The operations may further comprise: performing the first manipulation of: the one or more objects or the another one or more objects.

In certain embodiments, the one or more objects are one or more physical objects, and wherein the another one or more objects are one or more physical objects, and wherein the first manipulation of the one or more objects or the another one or more objects is performed by a device. In further embodiments, the one or more objects are one or more computer generated objects, and wherein the another one or more objects are one or more computer generated objects, and wherein the first manipulation of the one or more objects or the another one or more objects is performed by an avatar.

In some embodiments, the making the third determination of the one or more instruction sets in the path between the first collection of object representations and the second collection of object representations includes determining instruction sets correlated with at least one of: the first collection of object representations, or the second collection of object representations. The instruction sets correlated with the at least one of the first collection of object representations or the second collection of object representations may include first one or more instruction sets for performing a first manipulation of one or more objects. In further embodiments, the performing the first manipulation of the one or more objects or the another one or more objects causes the current state of the one or more objects or the another one or more objects to change to the preferred state of the one or more objects or the another one or more objects.

In certain embodiments, the knowledge structure further includes a second one or more instruction sets for performing a second manipulation of: the one or more objects, the another one or more objects, or an additional one or more objects correlated with at least a fifth collection of object representations that represents: a third state of the one or more objects, a first state of the another one or more objects, or a first state of the additional one or more objects, and wherein the making the third determination of the one or more instruction sets in the path between the first collection of object representations and the second collection of object representations includes determining instruction sets correlated with at least one of: the first collection of object representations, the second collection of object representations, or the fifth collection of object representations. In further embodiments, the knowledge structure includes: a graph, a neural network, or a connected data structure, and wherein the first collection of object representations is connected, by a first one or more connections, with the fifth collection of object representations, and wherein the fifth collection of object representations is connected, by a second one or more connections, with the second collection of object representations. The first one or more connections may include outgoing connections, and wherein the second one or more connections include outgoing connections. The first one or more connections may include incoming connections, and wherein the second one or more connections include incoming connections. In further embodiments, the knowledge structure includes: a sequence, or a sequentially ordered data structure, and wherein the fifth collection of object representations is positioned between the first collection of object representations and the second collection of object representations.

In certain embodiments, the operations may further comprise: making a fourth determination of additional one or more instruction sets for performing an additional manipulation of the one or more objects or the another one or more objects, wherein the additional manipulation bridges a difference between: a state of the one or more objects or the another one or more objects after the first manipulation of the one or more objects or the another one or more objects, and the preferred state of the one or more objects or the another one or more objects. The operations may further comprise: executing the additional one or more instruction sets. The operations may further comprise: performing the additional manipulation of the one or more objects or the another one or more objects.

Other features and advantages of the disclosure will become apparent from the following description, including the claims and drawings.

BRIEF DESCRIPTION OF THE DRAWINGS

FIG. 20F-201 illustrate some embodiments of Extra Information 527.

FIG. 45A illustrates an embodiment of method 8100.

FIG. 45B illustrates an embodiment of method 8300.

Figure 1:
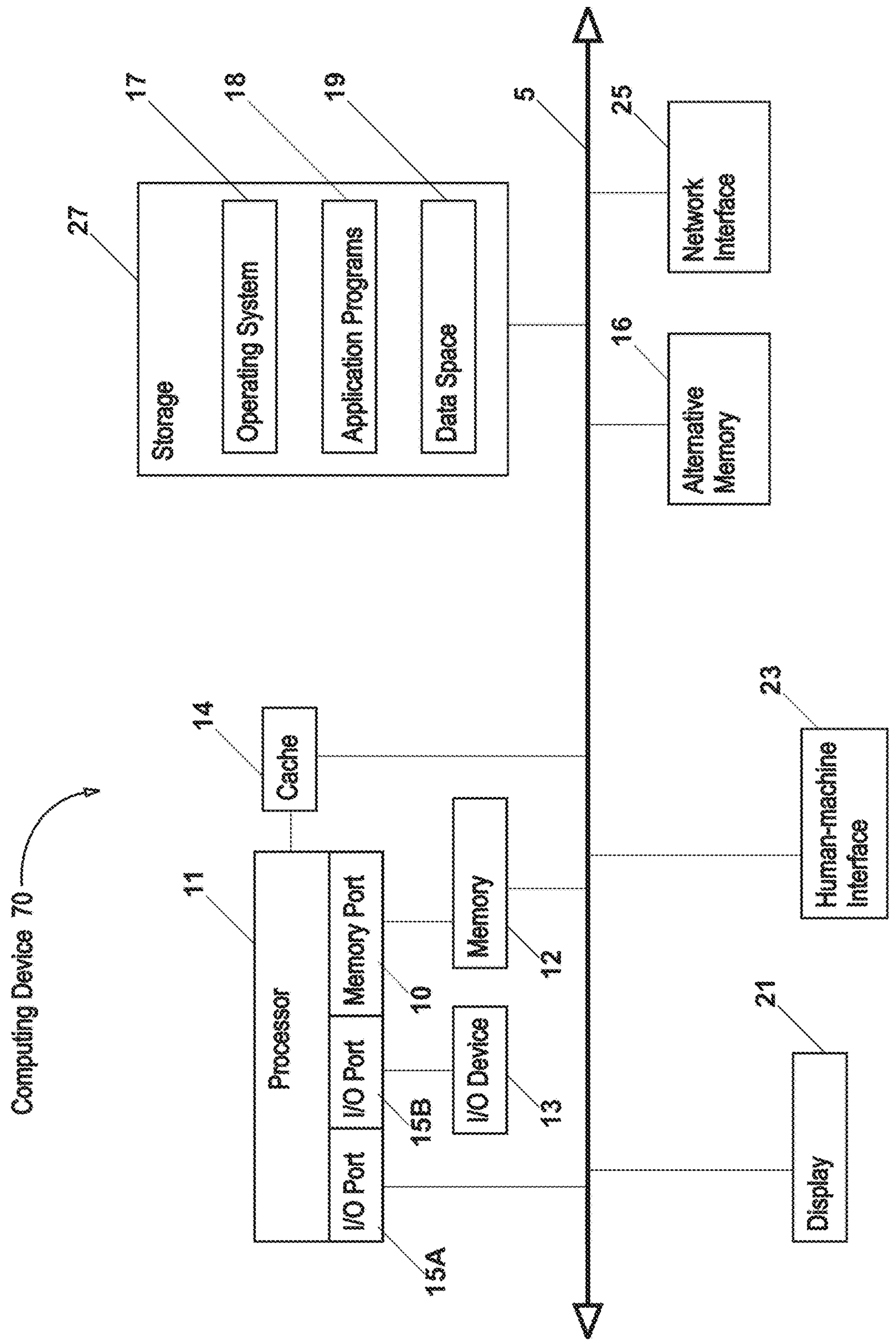
FIG. 1 illustrates a block diagram of an embodiment of Computing Device 70.

Like reference numerals in different figures may indicate like elements. Horizontal or vertical " . . . " or other such indicia may be used to indicate a possibility of additional instances of similar elements. n, m, x, or other such letters or indicia may represent integers or other sequential numbers that follow the sequence where they are indicated. It should be noted that n, m, x, or other such letters or indicia may represent different numbers in different elements even where the elements are depicted in a same figure. Any of these or other such letters or indicia may be used interchangeably depending on context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements.

DETAILED DESCRIPTION

Referring now to FIG. 1, an embodiment is illustrated of Computing Device 70 (also may be referred to as computing device, computing system, or other suitable name or reference, etc.) that can provide processing capabilities used in some embodiments of the forthcoming disclosure. Later described devices, systems, and methods, in combination with processing capabilities of Computing Device 70 or elements thereof, enable functionalities described herein. Various embodiments of the disclosed systems, devices, and methods include hardware, programs, functions, logic, and/or combination thereof. Various embodiments of the disclosed systems, devices, and methods can be implemented using any type or form of computing, computing enabled, or other device or system such as a computer, a computing enabled telephone, a server, a supercomputer, a gaming device, a television device, a digital camera, a navigation device, a media device, a mobile device, a wearable device, an implantable device, an embedded device, a robot, or any other type or form of computing, computing enabled, or other device or system capable of performing the operations described herein.

In some designs, Computing Device 70 and/or its elements comprise hardware, processing techniques or capabilities, programs, and/or combination thereof. Some embodiments of Computing Device 70 may include connected Processor 11, Memory 12, I/O Device 13, Cache 14, Display 21, Human-machine Interface 23, Storage 27, Alternative Memory 16, and Network Interface 25. Processor 11 may include Memory Port 10 and/or one or more I/O Ports 15, such as I/O ports 15A and 15B. Storage 27 can provide Operating System 17, Application Programs 18, and/or Data Space 19. Data Space 19 can be used to store any data or information. Elements of Computing Device 70 can be connected and/or communicate with each other via Bus 5 or via any direct or operative connection or interface known in art, or combination thereof. Other additional elements can be included as needed, or some of the disclosed ones can be excluded or altered, or a combination thereof can be utilized in alternate embodiments of Computing Device 70. It should be noted that any element of Computing Device 70 may include any hardware, programs, or combination thereof that enable the element's functionalities.

Processor 11 (also referred to as processor circuit, central processing unit, and/or other suitable name or reference, etc.) may include one or more devices or circuits capable of executing instructions, and/or other functionalities. Processor 11 may include any combination of hardware and/or processing techniques or capabilities for executing or implementing logic functions and/or programs. Processor 11 may be a single core or multi core processor. Processor 11 may be a special or general purpose processor. Processor 11 may include the functionality for loading Operating System 17 and operating any Application Programs 18 thereon. In some embodiments, Processor 11 can be provided in a microprocessing or processing unit such as Qualcomm, Intel, Motorola, Transmeta, International Business Machines, Advanced Micro Devices, or other lines of microprocessing or processing units. In other embodiments, Processor 11 can be provided in a graphics processing unit (GPU), visual processing unit (VPU), or other similar processing circuit or device such as nVidia GeForce line of GPUs, AMD Radeon line of GPUs, and/or others. Such GPUs or other highly parallel processing circuits or devices may provide superior performance in processing operations involving neural networks, graphs, and/or other data structures. In further embodiments, Processor 11 can be provided in a microcontroller such as Texas Instruments, Atmel, Microchip Technology, ARM, Silicon Labs, Intel, and/or other lines of microcontrollers. In further embodiments, Processor 11 can be provided in a tensor processing unit (i.e. TPU, etc.) such as Google and/or other lines of TPUs. In further embodiments, Processor 11 can be provided in a neuromorphic processor or chip such as IBM, Samsung, Intel, and/or other lines of neuromorphic processors or chips. In further embodiments, Processor 11 can be provided in a quantum processor such as D-Wave Systems, Microsoft, Intel, International Business Machines, Google, Toshiba, and/or other lines of quantum processors. In further embodiments, Processor 11 can be provided in a biocomputer such as DNA-based computer, protein-based computer, molecule-based computer, and/or others. In further embodiments, Processor 11 may include any circuit or device for performing logic operations. Processor 11 can be based on any of the aforementioned or other available processors capable of operating as described herein.

Memory 12 (also may be referred to as memory, memory unit, and/or other suitable name or reference, etc.) may include one or more devices or circuits capable of storing data, and/or other functionalities. In some embodiments, Memory 12 can be provided in a semiconductor or electronic memory chip such as static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), and/or others. In other embodiments, Memory 12 includes any volatile memory. In general, Memory 12 can be based on any of the aforementioned or other available memories capable of operating as described herein.

Storage 27 (also may be referred to as storage and/or other suitable name or reference, etc.) may include one or more devices or mediums capable of storing data, and/or other functionalities. In some embodiments, Storage 27 can be provided in a device or medium such as a hard drive, flash drive, optical disk, and/or others. In other embodiments, Storage 27 can be provided in a biological storage device such as DNA-based storage device, protein-based storage device, molecule-based storage device, and/or others. In further embodiments, Storage 27 can be provided in an optical storage device such as holographic storage, and/or others. In further embodiments, Storage 27 includes any non-volatile memory. In general, Storage 27 can be based on any of the aforementioned or other available storage devices or mediums capable of operating as described herein. In some aspects, Storage 27 includes any features, functionalities, and/or embodiments of Memory 12, and vice versa, as applicable. Alternative Memory 16 may include one or more devices or mediums capable of storing data, and/or other functionalities. In some embodiments, Alternative Memory 16 can be provided in a device or medium such as a flash memory, USB memory stick, micro SD card, optical drive (i.e. CD-ROM drive, CD-RW drive, DVD-ROM drive, DVD-RW drive, BlueRay drive, etc.), hard drive, and/or others. In general, Alternative Memory 16 can be based on any of the aforementioned or other available devices or mediums capable of operating as described herein. In some aspects, Alternative Memory 16 includes any features, functionalities, and/or embodiments of Storage 27, and vice versa, as applicable.

Application Program 18 (also may be referred to as program, computer program, application, script, code, or other suitable name or reference, etc.) may provide various functionalities when executed. For example, Application Program 18 can be executed on/by Processor 11, Computing Device 70 or any of its elements, or any device that can execute application programs. Application Program 18 can be implemented in a high-level procedural or object-oriented programming language, low-level machine or assembly language, and/or other language. In some aspects, any language used can be compiled, interpreted, or translated into machine language. Application Program 18 can be deployed in any form including as a stand-alone program or as a module, component, subroutine, or other unit suitable for use in a computing system. Application Program 18 does not necessarily correspond to a file in a file system. Application Program 18 can be stored in a portion of a file that may hold other programs or data, in a single file dedicated to the program, or in multiple files (i.e. files that store one or more modules, sub programs, or portions of code, etc.). Application Program 18 can be delivered in various forms such as, for example, executable file, library, script, plugin, addon, applet, interface, console application, web application, application service provider (ASP)-type application, cloud application, operating system, and/or other forms. Application Program 18 can be deployed to be executed on one computing device or on multiple computing devices (i.e. cloud, distributed, or parallel computing, etc.), or at one site or distributed across multiple sites connected by a network or an interface. Examples of Application Program 18 include a simulation application, a video game, a virtual world application, a graphics application, a media application, a word processing application, a spreadsheet application, a database application, a web browser, a forms-based application, a global positioning system (GPS) application, a 2D application, a 3D application, an operating system, a factory automation application, a device control application, an avatar control application, a vehicle control application, a machine/computer recollection application, a machine/computer imagination application, a machine/computer imagined scenarios application, a machine/computer planning application, and/or other application. In some aspects, Application Program 18 includes one or more versions of Application Program 18, one or more upgrades of Application Program 18, one or more sequels of Application Program 18, one or more instances of Application Program 18, and/or one or more variations of Application Program 18. In some embodiments, Application Program 18 can be used to operate or control a device or system. In some embodiments, Application Program 18 may be or include a 3D Application Program 18 (i.e. 3D simulation, 3D video game, 3D virtual world application, 3D imagination application, 3D planning application, etc.). 3D Application Program 18 may include a 3D space (i.e. also may be referred to as 3D scene, 3D environment, 3D setting, 3D site, 3D computer generated space, 3D computer generated environment, and/or other suitable name a reference, etc.) comprising Avatar 605 (later described), one or more Objects 616 (later described), and/or other objects or elements. 3D space may include attributes or properties such as shape, size, origin, and/or other attributes or properties. In one example, 3D space may be a rectangular 3D space having dimensions of width, height, and depth. In another example, 3D space may be a cylindrical 3D space having dimensions of radius and height. In a further example, 3D space may be a spherical 3D space including dimensions defined by a radius. The initial shape, size, and/or other attributes or properties of 3D space may be changed manually or programmatically at any time during the system's operation.

In some embodiments, 3D Application Program 18 can utilize a 3D engine, a graphics engine, a simulation engine, a game engine, or other such tool to implement generation of 3D space and/or Avatar 605, Objects 616, and/or other elements. Examples of such engines or tools include Unreal Engine, Quake Engine, Unity Engine, jMonkey Engine, Microsoft XNA, Torque 3D, Crystal Space, Genesis3D, Irrlicht, Truevision3D, Vision, Second Life, Open Wonderland, 3D ICC Terf, and/or other engines or tools. Such engines or tools may typically provide functionalities such as physics engine (including gravity engine, motion engine, radio/light/sound signal propagation engine, etc.), collision detection and handling, event detection and handling, scripting/programming capabilities, interface for loading/positioning/resizing/rotating/moving/transforming 3D models or objects, and/or other functionalities. Such engines or tools may provide a rendering engine such as Direct3D, OpenGL, Mantle, derivatives thereof, and/or other systems for processing 3D space and/or objects therein for visual display or for other purposes. Such engines or tools may provide the functionality for loading of 3D models (i.e. 3D model of Avatar 605, 3D models of Objects 616, etc.) into 3D space. 3D models may include polygonal models, subdivision surface models, curve models, digital sculpting models, level set models, particle system models, NURBS models, CAD models, voxel models, point clouds, and/or other computer generated models. Each loaded object (i.e. Avatar 605, Object 616, etc.) may have its location at specific coordinates within 3D space. The loaded or generated 3D models (i.e. model of Avatar 605, models of Objects 616, etc.) may then be moved, transformed, or animated using any of the herein-described and/or other techniques, and/or those known in art. A 3D engine, a graphics engine, a simulation engine, a game engine, or other such tool may provide functions that define mechanics of 3D space and/or its objects (i.e. Avatar 605, Objects 616, etc.), interactions among objects (i.e. Avatar 605, Objects 616, etc.) in 3D space, and/or other functions. Such engines or tools may implement 3D space and/or its objects (i.e. Avatar 605, Objects 616, etc.) using a scene graph, tree, and/or other data structure. A scene graph, for example, may be an object-oriented representation of a 3D space and or its objects. Specifically, a scene graph may include a network of connected nodes where each node may represent an object (i.e. Avatar 605, Object 616, etc.) in 3D space. Also, each node includes its own attributes, dependencies, and/or other properties. Nodes may be added, managed, and/or manipulated at runtime using scripting or programming functionalities of the engine or tool used. Such scripting or programming functionalities may enable defining the mechanics, behavior, transformation, interactivity, actions, and/or other properties of objects (i.e. Avatar 605, Objects 616, etc.) in 3D space at or prior to runtime. Examples of such scripting or programming functionalities include Lua, UnrealScript, QuakeC, UnityScript, TorqueScript, Linden Scripting Language, C#, Python, JavaScript, and/or other scripting or programming functionalities. In other embodiments, in addition to the full featured 3D engines, graphics engines, simulation engines, game engines, or other such tools, 3D Application Program 18 may utilize a tool native to or built on/for a particular programming language or platform. Examples of such tools include any Java graphics API or SDK such as jReality, Java 3D, JavaFX, etc., any.NET graphics API or SDK such as Visual3D.NET, etc., any Python API or SDK such as Panda3D, etc., and/or other API or SDK for another language or platform. Such tools may provide 2D and 3D drawing, rendering, and/or other capabilities leaving to the programmer to implement some high-level functionalities such as physics simulation, collision detection, animation, networking, and/or other high-level functionalities. In yet other embodiments, 3D Application Program 18 may utilize any programming language's general programming capabilities or APIs to implement generation of 3D space and/or its objects (i.e. Avatar 605, Objects 616, etc.). Utilizing general programming capabilities or APIs of a programming language may require a programmer to implement some high-level functionalities from scratch, but gives the programmer full freedom of customization. In general, 3D Application Program 18 can utilize any programming language, platform, and/or tool that supports 3D computer generated environments. One of ordinary skill in art will recognize that while all the engines, APIs, SDKs, or other such tools that may be utilized in 3D Application Program 18 may be too voluminous to list, all of these engines, APIs, SDKs, or such other tools, whether known publically or proprietary, are within the scope of this disclosure.

In some embodiments, Avatar 605, Objects 616, and/or other elements in 3D Application Program 18 may simulate physical objects and/or their properties in the physical world. In one example, Avatar 605 that simulates or represents a robot includes a 3D, polygonal, voxel, or other model of a rigid (i.e. made of metal, etc.) device comprising movement elements (i.e. wheels, legs, etc.), manipulation elements (i.e. robotic arm, antenna, etc.), body, and/or other elements that simulates or represents the device's properties (i.e. rigidness, shape, weight, movement, etc.). In another example, Avatar 605 that simulates or represents a human includes a 3D, polygonal, voxel, or other model of a semi-soft or semi-rigid (i.e. made of bone and live tissue, etc.) person comprising movement elements (i.e. legs, etc.), manipulation elements (i.e. arms, etc.), torso, and/or other elements that simulates or represents the person's properties (i.e. softness/rigidness, shape, weight, movement, etc.). In a further example, Object 616 that simulates or represents a bush includes a 3D, polygonal, voxel, or other model of a flexible branched (i.e. made of branches, etc.) plant in a fixed location comprising branch elements, leaf elements, and/or other elements that simulates or represents the plant's properties (i.e. fixed location, shape, weight, movement of branches/leaves, etc.). In a further example, Object 616 that simulates or represents a pillow includes a 3D, polygonal, voxel, or other model of a flexible shape (i.e. made of feathers, etc.) object comprising flexible shape that simulates or represents the pillow's properties (i.e. changeable/flexible shape, weight, movement, etc.). In a further example, Object 616 that simulates or represents a gate includes a 3D, polygonal, voxel, or other model of a swiveling rigid (i.e. made of wood, metal, etc.) object in a fixed location comprising a slab element, lever element, frame element, and/or other elements that simulates or represents the gate's properties (i.e. fixed location, shape, weight, swiveling to open and close, etc.). In a further example, Object 616 that simulates or represents a wall includes a 3D, polygonal, voxel, or other model of a rigid (i.e. made of wood, brick, concrete, etc.) object in a fixed location that simulates or represents the wall's properties (i.e. rigidness, fixed location, shape, weight, etc.). In general, Avatar 605, Objects 616, and/or other objects or elements within 3D Application Program 18 may simulate any physical objects (i.e. robot, vehicle, human, animal, ball, wall, door, furniture, building, bush, rock, pillow, etc.) and/or their properties, and/or any other objects (i.e. imaginary object, imaginary robot, imaginary vehicle, imaginary human, imaginary animal, imaginary ball, imaginary wall, imaginary door, imaginary furniture, imaginary building, imaginary bush, imaginary rock, imaginary pillow, dragon, unicorn, zombie, etc.) and/or their properties.

In some embodiments, Avatar 605, Objects 616, and/or other elements in 3D Application Program 18 may simulate physical objects' behaviors in the physical world. In one example, Avatar 605 that simulates or represents a robot will be stopped if it hits Object 616 that simulates or represents a wall based on a detection of a touch (i.e. collision, intersection, etc.) between Avatar 605 and Object 616, and based on Avatar's 605 simulated rigidness (i.e. rigid mesh model, rigid voxel model, etc.) and Object's 616 simulated rigidness (i.e. rigid mesh model, rigid voxel model, etc.). In another example, Object 616 that simulates or represents a wall will not move if pushed by Avatar 605 that simulates or represents a robot based on a detection of a touch (i.e. collision, intersection, etc.) between Avatar 605 and Object 616, and based on Avatar's 605 simulated rigidness (i.e. rigid mesh model, rigid voxel model, etc.) and Object's 616 simulated rigidness (i.e. rigid mesh model, rigid voxel model, etc.). In a further example, Object 616 that simulates or represents a toy will move if pushed by Avatar 605 that simulates or represents a robot based on a detection of a touch (i.e. collision, intersection, etc.) between Avatar 605 and Object 616, based on a detection that Avatar 605 and/or its element moved into the space of Object 616, and based on Avatar's 605 simulated rigidness (i.e. rigid mesh model, rigid voxel model, etc.) and weight and Object's 616 simulated rigidness (i.e. rigid mesh model, rigid voxel model, etc.), smaller than Avatar's 605 weight, and friction with the floor. In a further example, Object 616 that simulates or represents a ball will roll if pushed or kicked by Avatar 605 that simulates or represents a person based on a detection of a touch (i.e. collision, intersection, etc.) between Avatar 605 and Object 616, based on a detection that Avatar 605 and/or its element moved into the space of Object 616, and based on Avatar's 605 simulated rigidness (i.e. rigid mesh model, rigid voxel model, etc.) and weight and Object's 616 simulated round shape (i.e. round mesh model, round voxel model, etc.), smaller than Avatar's 605 weight, and friction with the floor. In a further example, Object 616 that simulates or represents a pillow will deform if pushed by Avatar 605 that simulates or represents a person based on a detection of a touch (i.e. collision, intersection, etc.) between Avatar 605 and Object 616, based on a detection that Avatar 605 and/or its element moved into the space of Object 616, and based on Avatar's 605 simulated rigidness (i.e. rigid mesh model, rigid voxel model, etc.) and Object's 616 simulated flexibility (i.e. flexible mesh model, flexible voxel model, etc.). In a further example, Object 616 that simulates or represents a gate will open if its lever is pulled down and if it is pushed by Avatar 605 that simulates or represents a person based on a detection of a touch (i.e. collision, intersection, etc.) between Avatar 605 and Object 616, based on a detection of Avatar's 605 simulated griping a lever sub-object of Object 616, based on a detection of the lever sub-object being pulled down, based on a detection that Avatar 605 and/or its element pushed Object 616, based on Avatar's 605 simulated rigidness (i.e. rigid mesh model, rigid voxel model, etc.) and Object's 616 simulated rigidness (i.e. rigid mesh model, rigid voxel model, etc.), and based on Object's 616 simulated swiveling. In general, any other interaction, effect, and resulting behavior of any object can be simulated in 3D Application Program 18. Any of the aforementioned simulations, interactions, manipulations, effects, and/or behaviors can be implemented in/by any of the aforementioned 3D engines (i.e. Unreal Engine, Unity Engine, Torque 3D, etc.), graphics engines, simulation engines, game engines, or other such tools using their native functionalities (i.e. physics engine, gravity engine, collision engine, motion engine, push engine, etc.), using their APIs or SDKs for particular simulations, interactions, manipulations, effects, and/or behaviors, and/or by custom programming particular simulations, interactions, manipulations, effects, and/or behaviors. In some aspects, simulations, manipulations, effects, and/or behaviors that involve interactions among Avatar 605, Objects 616, and/or other elements may use event handlers such as collision or intersection event handler, movement event handler, push event handler, and/or others.

In some embodiments, using simulated objects in 3D Application Program 18 to simulate physical objects and/or their behaviors in the physical world enables artificial knowledge learned with respect to a simulated object in 3D Application Program 18 to be used on/with a physical object in the physical world. For example, Avatar 605 may be a model, simulation, or representation of Device 98 so that artificial knowledge learned from Avatar's 605 manipulations of one or more Objects 616 (i.e. computer generated objects, etc.) in 3D Application Program 18 can be used in Device's 98 manipulations of Objects 615 (i.e. physical objects, etc.) in the physical world. In other words, in such examples, since Avatar 605 may be a simulation or representation of Device 98 and since one or more Objects 616 (i.e. computer generated objects, etc.) may be a simulation or representation of one or more Objects 615 (i.e. physical objects, etc.), Avatar's 605 manipulations of one or more Objects 616 in 3D Application Program 18 may be a simulation or representation of Device's 98 manipulations of one or more Objects 615 in the physical world. In other embodiments, using physical objects in the physical world to physically simulate objects in 3D Application Program 18 enables artificial knowledge learned with respect to a physical object in the physical world to be used on/with a simulated object in 3D Application Program 18. For example, Device 98 may be a physical model, physical simulation, or physical representation of Avatar 605 so that artificial knowledge learned from Device's 98 manipulations of Objects 615 (i.e. physical objects, etc.) in the physical world can be used in Avatar's 605 manipulations of one or more Objects 616 (i.e. computer generated objects, etc.) in 3D Application Program 18. In other words, in such examples, since Device 98 may be a physical simulation or representation of Avatar 605 and since one or more Objects 615 (i.e. physical objects, etc.) may be a physical simulation or representation of one or more Objects 616 (i.e. computer generated objects, etc.), Device's 98 manipulations of one or more Objects 615 in the physical world may be a physical simulation or representation of Avatar's 605 manipulations of one or more Objects 616 in 3D Application Program 18.

Network Interface 25 may include any hardware, programs, or combination thereof capable of interfacing Computing Device 70 or its elements with other devices via a network. Examples of a network include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), a virtual network, a virtual private network (VPN), a Bluetooth network, a wireless network, a wired network, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or others. A network can be facilitated by a variety of connections including telephone lines, LAN or WAN links (i.e. 802.11, T1, T3, 56 kb, X.25, etc.), broadband connections (i.e. ISDN, DSL, Frame Relay, ATM, etc.), any wired or wireless connections, or combination thereof. Network Interface 25 may include a built-in network adapter, a network interface card, a PCMCIA network card, a card bus network adapter, a Bluetooth network adapter, a WiFi network adapter, a USB network adapter, a modem, a wireless network adapter, a wired network adapter, and/or any other device or system suitable for interfacing Computing Device 70 or its elements with any type of network.

I/O Device 13 may include a device capable of input and/or output, and/or other functionalities. Examples of I/O Device 13 capable of input include a joystick, a keyboard, a mouse, a trackpad, a trackpoint, a touchscreen, a trackball, a microphone, a drawing tablet, a glove, a tactile input device, a still or video camera, and/or other input device. Examples of I/O Device 13 capable of output include a display, a touchscreen, a projector, a glasses, a speaker, a tactile output device, and/or other output device. Examples of I/O Device 13 capable of input and output include a hard drive, an optical storage device, a modem, a network card, and/or other input/output device. In some aspects, I/O Device 13 can be interfaced with Processor 11 via I/O port 15.

Display 21 may include a device capable of displaying data or information, and/or other functionalities. In some embodiments, Display 21 can be provided in a device such as a monitor, a projector (i.e. video projector, holographic projector, etc.), a glasses, and/or other display device.

Human-machine Interface 23 may include a device capable of receiving user input, and/or other functionalities. In some embodiments, Human-machine Interface 23 can be provided in a device such as a keyboard, a pointing device, a mouse, a touchscreen, a joystick, a remote controller, and/or other interface or input device. Operating System 17 may include a program capable of enabling or supporting Computing Device's 70 basic functions, interfacing with and managing hardware resources, interfacing with and managing peripherals, providing common services for application programs, scheduling tasks, and/or performing other functionalities. A modern operating system enables the use of features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, sound player, video player, near field communication, personal digital assistant (PDA), and/or other features, functionalities, or applications. Operating System 17 can be provided in any conventional operating system, any embedded operating system, any real-time operating system, any open source operating system, any video gaming operating system, any proprietary operating system, any online operating system, any operating system for mobile computing devices, or any other operating system capable of facilitating functionalities described herein. Examples of operating systems include Windows XP, Windows 7, Windows 8, Windows 10, etc. manufactured by Microsoft; Mac OS, iPhone OS, etc. manufactured by Apple Computer; Android OS manufactured by Google; OS/2 manufactured by International Business Machines; Linux, a freely-available operating system distributed by a variety of distributors; any type or form of Unix operating system; and/or others.

Computing Device 70 can be implemented as or be part of various model architectures such as web service, distributed computing, grid computing, cloud computing, and/or other architectures. For example, in addition to the traditional desktop, server, or mobile architectures, a cloud-based architecture can be utilized to provide the structure on which embodiments of the disclosure can be implemented. Other aspects of Computing Device 70 can also be implemented in the cloud without departing from the spirit and scope of the disclosure. For example, memory, storage, processing, and/or other elements can be hosted in the cloud. In some aspects, Computing Device 70 can be implemented on multiple devices. For example, a portion of Computing Device 70 can be implemented on a mobile device and another portion can be implemented on wearable electronics.

Computing Device 70 can be or include a mobile device, a mobile phone, a smartphone (i.e. iPhone, Windows phone, Blackberry phone, Android phone, etc.), a tablet, a personal digital assistant (PDA), wearable electronics, implantable electronics, and/or other mobile device capable of implementing the functionalities described herein. Computing Device 70 can also be or include an embedded device or system, which can be any device or system with a dedicated function within another device or system. An embedded device can operate under the control of an operating system for embedded devices such as MicroC/OS-II, QNX, VxWorks, eCos, TinyOS, Windows Embedded, Embedded Linux, and/or others.

Computing Device 70 may include or be interfaced with a computer program comprising instructions or logic encoded on a computer-readable medium. Such instructions or logic, when executed, may configure or cause one or more Processors 11 to perform the operations and/or functionalities disclosed herein. For example, a computer program can be provided on a computer-readable medium such as an optical medium (i.e. DVD-ROM, CD-ROM, etc.), a flash drive, a hard drive, any memory, a firmware, and/or others. In some aspects, computer-readable medium includes any apparatus, device, or product that can provide instructions and/or data to one or more programmable processors. In other aspects, computer-readable medium includes any medium that can send and/or receive instructions and/or data as a computer-readable signal. Examples of a computer-readable medium include a volatile medium, a non-volatile medium, a removable medium, a non-removable medium, a communication medium, a storage medium, and/or others. In some designs, a computer-readable medium can utilize a modulated signal such as a carrier wave or other transport technique to transmit instructions and/or data. A non-transitory computer-readable medium comprises all computer-readable media except for a transitory, propagating signal. Computer-readable medium may include or be referred to as machine-readable medium or other similar name or reference. Therefore, these terms may be used interchangeably herein depending on context.

In some embodiments, the disclosed systems, devices, and methods, or elements thereof, can be realized in digital electronic circuitry, integrated circuitry, logic gates, application specific integrated circuits (ASICs), field programmable gate arrays (FPGAs), computer hardware, firmware, programs, virtual machines, and/or combination thereof including their structural, logical, and/or physical equivalents. In other embodiments, the disclosed systems, devices, and methods, or elements thereof, may include clients and servers. A client and server are generally, but not always, remote from each other and typically, but not always, interact via a network or an interface. For example, the relationship of a client and server may arise by virtue of computer programs running on their respective computers and having a client-server relationship to each other. In further embodiments, the disclosed systems, devices, and methods, or elements thereof, can be implemented in a computing system that includes a back end component, a middleware component, a front end component, or any combination thereof. The components of the system can be connected by any form or medium of digital data communication such as, for example, a network. In some embodiments, the disclosed systems, devices, and methods, or elements thereof, can be implemented entirely or in part in a device (i.e. microchip, circuitry, logic gates, electronic device, computing device, special or general purpose processor, etc.) or system that comprises (i.e. hard coded, internally stored, etc.) or is provided with (i.e. externally stored, etc.) instructions for implementing functionalities discloses herein. As such, the disclosed systems, devices, and methods, or elements thereof, may include the processing, memory, storage, and/or other features, functionalities, and/or embodiments of Computing Device 70 or elements thereof. Such device or system can operate on its own (i.e. standalone device or system, etc.), be embedded in another device or system (i.e. an industrial machine, a robot, a vehicle, a toy, a smartphone, a television device, an appliance, etc.), work in combination with other devices or systems, or be available in any other configuration. In other embodiments, the disclosed systems, devices, and methods, or elements thereof, may include or be coupled to Alternative Memory 16 that provides instructions for implementing functionalities discloses herein to one or more Processors 11. In further embodiments, the disclosed systems, devices, and methods, or elements thereof, can be implemented entirely or in part as a computer program and executed by one or more Processors 11. Such program can be implemented in one or more modules or units of a single or multiple computer programs. In further embodiments, the disclosed systems, devices, and methods, or elements thereof, can be implemented as a network, web, distributed, cloud, or other such application accessed on one or more remote computing devices (i.e. servers, cloud, etc.) via Network Interface 25, such remote computing devices including processing capabilities and instructions for implementing functionalities discloses herein. In further embodiments, the disclosed systems, devices, and methods, or elements thereof, can be (i) attached to or interfaced with any computing device or application program, (ii) included as a feature of an operating system, (ii) built (i.e. hard coded, etc.) into any computing device or application program, and/or (iv) available in any other configuration to provide their functionalities.

In some embodiments, the disclosed systems, devices, and methods, or elements thereof, can be implemented at least in part in a computer program such as Java application or program. Java provides a robust and flexible environment for application programs including flexible user interfaces, robust security, built-in network protocols, powerful application programming interfaces, database or DBMS connectivity and interfacing functionalities, file manipulation capabilities, support for networked applications, and/or other features or functionalities. Application programs based on Java can be portable across many devices, yet leverage each device's native capabilities. Java supports the feature sets of most smartphones and a broad range of connected devices while still fitting within their resource constraints. Various Java platforms include virtual machine features comprising a runtime environment for application programs. One of ordinary skill in art will understand that the disclosed systems, devices, and methods, or elements thereof, are programming language, platform, and operating system independent. Examples of programming languages that can be used instead of or in addition to Java include C, C++, Cobol, Python, Java Script, Tcl, Visual Basic, Pascal, VB Script, Perl, PHP, Ruby, and/or other programming languages or platforms capable of implementing the functionalities described herein.

Figure 2:
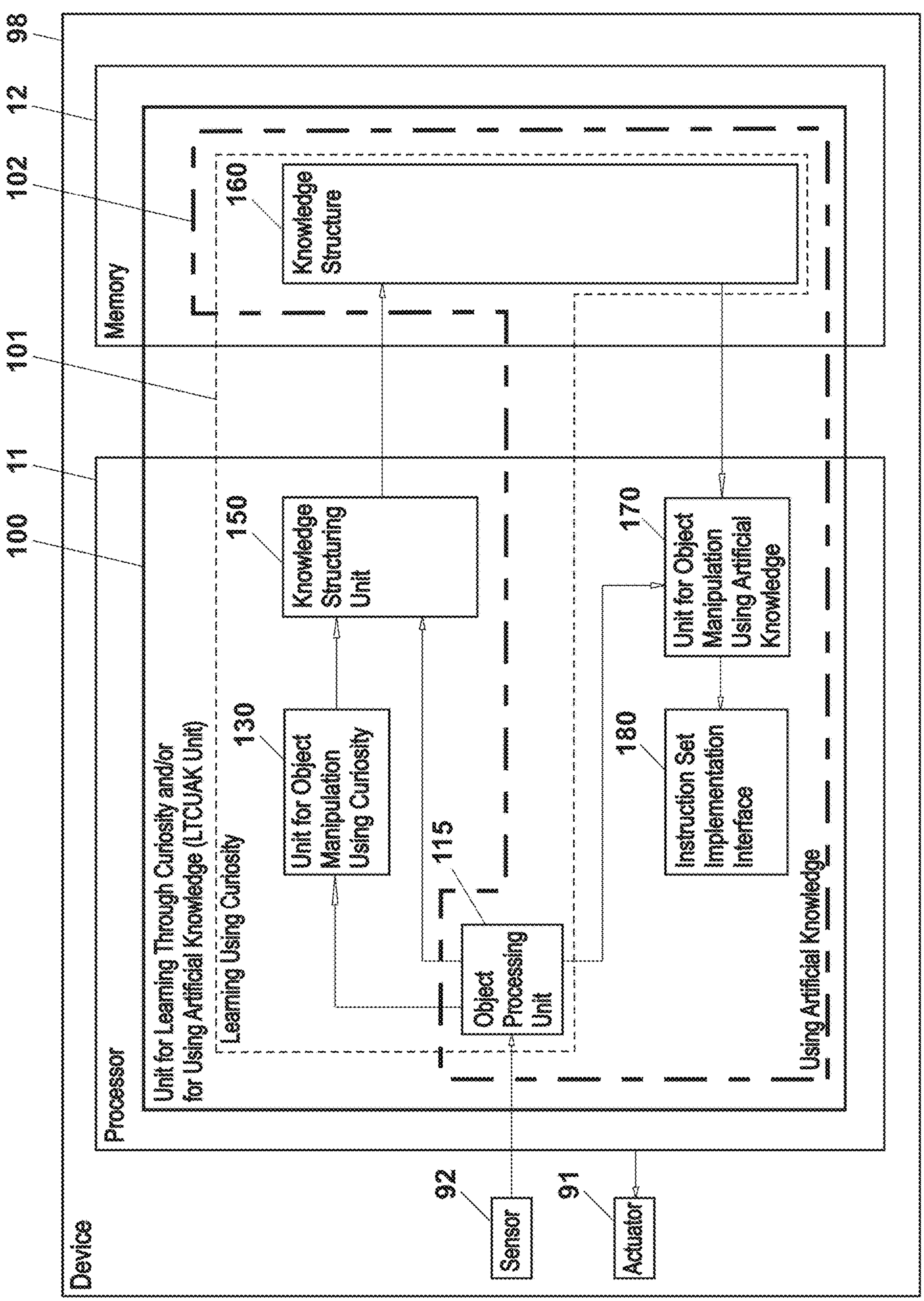
FIG. 2 illustrates an embodiment of Unit for Learning Through Curiosity and/or for Using Artificial Knowledge 100 providing its functionalities to Device 98.

Referring to FIG. 2, an embodiment of Device 98 comprising Unit for Learning Through Curiosity and/or for Using Artificial Knowledge 100 (also may be referred to as LTCUAK Unit 100, LTCUAK, artificial intelligence unit, and/or other suitable name or reference, etc.) is illustrated. LTCUAK Unit 100 comprises functionality for causing Device's 98 manipulations of one or more Objects 615 (i.e. physical objects, etc.; later described) using curiosity. LTCUAK Unit 100 comprises functionality for learning Device's 98 manipulations of one or more Objects 615 using curiosity. LTCUAK Unit 100 comprises functionality for causing Device's 98 manipulations of one or more Objects 615 using the learned knowledge (i.e. artificial knowledge, etc.). LTCUAK Unit 100 may comprise other functionalities. In some designs, LTCUAK Unit 100 comprises connected Object Processing Unit 115, Unit for Object Manipulation Using Curiosity 130, Knowledge Structuring Unit 150, Knowledge Structure 160, Unit for Object Manipulation Using Artificial Knowledge 170, and Instruction Set Implementation Interface 180. Other additional elements can be included as needed, or some of the disclosed ones can be excluded or altered, or a combination thereof can be utilized in alternate embodiments. In some aspects and only for illustrative purposes, Learning Using Curiosity 101 grouping may include elements indicated in the thin dotted line and/or other elements that may be used in the learning using curiosity functionalities of LTCUAK Unit 100. In other aspects and only for illustrative purposes, Using Artificial Knowledge 102 grouping may include elements indicated in the thick dotted line and/or other elements that may be used in the using artificial knowledge functionalities of LTCUAK Unit 100. Any combination of Learning Using Curiosity 101 grouping or elements thereof and Using Artificial Knowledge 102 grouping or elements thereof, and/or other elements, can be used in various embodiments. LTCUAK Unit 100 and/or its elements comprise any hardware, programs, or a combination thereof.

Device 98 (also may be referred to as device, physical device, and/or other suitable name or reference, etc.) comprises any hardware, programs, or combination thereof. Although, Device 98 is referred to as a device herein, Device 98 may be or include a system as a system can be embodied in Device 98. Device 98 may include any features, functionalities, and/or embodiments of Computing Device 70 or elements thereof, as applicable. In some embodiments, Device 98 includes a computing enabled device for performing physical or mechanical operations (i.e. via actuators, etc.). In other embodiments, Device 98 includes a computing enabled device for performing non-physical, non-mechanical, and/or other operations. Examples of Device 98 include an industrial machine, a toy, a robot, a vehicle, an appliance, a control device, a smartphone or other mobile computer, any computer, and/or other computing enabled device or machine. In general, Device 98 may be or include any device or machine built for any function or purpose some examples of which are described later. One of ordinary skill in art will understand that Device 98 may be or include any device that can implement and/or benefit from the functionalities described herein. While Device 98 itself may be Object 615 (later described) and may include any features, functionalities, and embodiments of Object 615, Device 98 is distinguished herein to portray the relationships and/or interactions between Device 98 and other Objects 615. In some aspects, Device 98 is Object 615 that manipulates other Objects 615. In some designs, a reference to Object 615 includes a reference to Device 98, and vice versa, depending on context. In other designs, a reference to one or more Objects 615 includes a reference to Device 98 depending on context.

Actuator 91 (also may be referred to as actuator or other suitable name or reference, etc.) comprises functionality for implementing Device's 98 physical or mechanical operations. As such, one or more Actuators 91 can be utilized to implement Device's 98 physical or mechanical manipulations of one or more Objects 615 (i.e. physical objects, etc.; later described). Actuator 91 can be controlled at least in part by Processor 11, Microcontroller 250 (later described), LTCUAK Unit 100 or elements thereof, LTOUAK Unit 105 or elements thereof, Consciousness Unit 110, Application Program 18 (i.e. Device Control Program 18*a* [later described], etc.), and/or other processing elements. Examples of Actuator 91 or elements that can be used in Actuator 91 include a motor, a linear motor, a servomotor, a hydraulic element, a pneumatic element, an electro-magnetic element, a spring element, and/or others. Any Actuator 91 or element thereof can be rotary, linear, and/or other type of actuator or element thereof. Specifically, for instance, Actuator 91 may be or include a wheel, a robotic arm, and/or other element that enables Device 98 to perform motions, maneuvers, manipulations, and/or other actions upon one or more Objects 615 or the environment. A reference to Actuator 91 herein includes a reference to one or more actuators as applicable.

Figure 3:
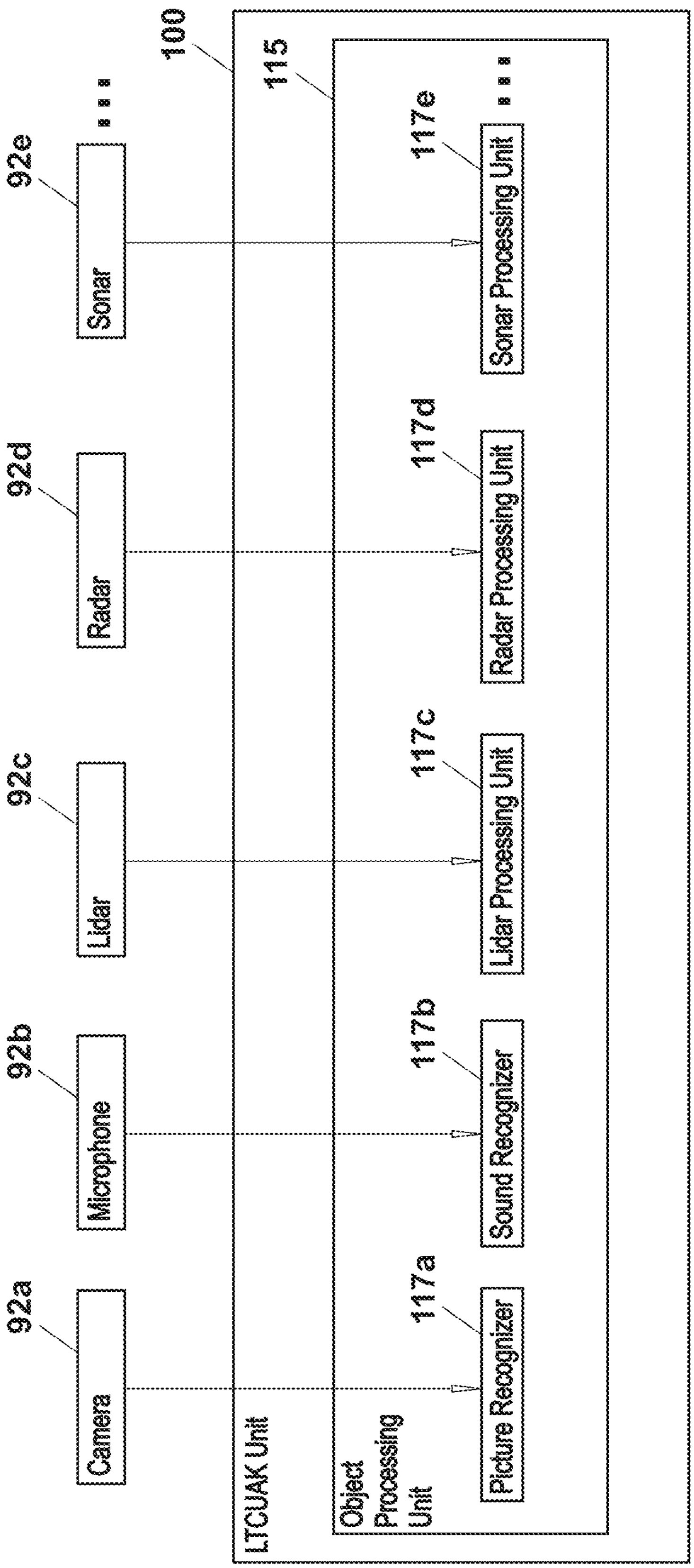
FIG. 3 illustrates some embodiments of Sensors 92 and elements of Object Processing Unit 115.

Referring to FIG. 3, various embodiments of Sensors 92 and elements of Object Processing Unit 115 are illustrated.

Sensor 92 (also may be referred to as sensor or other suitable name or reference, etc.) comprises functionality for obtaining or detecting information about its environment, and/or other functionalities. As such, one or more Sensors 92 can be used at least in part to detect Objects 615 (i.e. physical objects, etc.; later described), their states, and/or their properties in Device's 98 surrounding. In some aspects, Device's 98 surrounding may include exterior of Device 98. In other aspects, Device's 98 surrounding may include interior of Device 98 in case of hollow Device 98, Device 98 comprising compartments or openings, and/or other variously shaped Device 98. In further aspects, Device's 98 surrounding may include or be defined by an area of interest, which enables focusing on Objects 615 in Device's 98 immediate or other surrounding, thereby avoiding extraneous Objects 615 or detail in the rest of the surrounding. In one example, an area of interest may include an area defined by a threshold distance from Device 98. In another example, an area of interest may include a radial, circular, elliptical, triangular, rectangular, octagonal, or other such area around Device 98. In a further example, an area of interest may include a spherical, cubical, pyramid-like, or other such area around Device 98 as applicable to 3D space. Any other area of interest shape or no area of interest can be utilized depending on implementation. The shape and/or size of an area of interest can be defined by a user, by a system administrator, or automatically by the system based on experience, learning, testing, inquiry, analysis, synthesis, or other techniques, knowledge, or input. Examples of aspects of an environment that Sensor 92 can measure or be sensitive to include light (i.e. camera, lidar, etc.), electromagnetism/electromagnetic field (i.e. radar, etc.), sound (i.e. microphone, sonar, etc.), physical contact (i.e. tactile sensor, etc.), magnetism/magnetic field (i.e. compass, etc.), electricity/electric field, temperature, gravity, vibration, pressure, and/or others. In some aspects, a passive sensor (i.e. camera, microphone, etc.) measures signals or radiation emitted or reflected by an object. In other aspects, an active sensor (i.e. lidar, radar, sonar, etc.) emits signals or radiation and measures the signals or radiation reflected or backscattered from an object. In some designs, a plurality of Sensors 92 can be used to detect Objects 615, their states, and/or their properties from different angles or sides of Device 98. For example, four Cameras 92*a* can be placed on four corners of Device 98 to cover 360 degrees of view of Device's 98 surrounding. In other designs, a plurality of different types of Sensors 92 can be used to detect different types of Objects 615, their states, and/or their properties. For example, one or more Cameras 92*a* can be used to detect and identify Object 615, Radar 92*d* can be used to detect distance and bearing/angle of the Object 615 relative to Device 98, and Lidar 92*c* can be used to detect shape of the Object 615. In further designs, a signal-emitting element can be placed within or onto Object 615 and Sensor 92 can detect the signal from the signal-emitting element, thereby detecting the Object 615, its states, and/or its properties. For example, a radio-frequency identification (RFID) emitter may be placed within Object 615 to help Sensor 92 detect, identify, and/or obtain other information about the Object 615. A reference to Sensor 92 herein includes a reference to one or more sensors as applicable. A reference to detecting an Object 615 herein includes a reference to detecting a state of Object 615, detecting properties of Object 615, and/or detecting other information about Object 615 as applicable, and vice versa.

In some embodiments, Sensor 92 may be or include Camera 92*a*. Camera 92*a* comprises functionality for capturing one or more pictures, and/or other functionalities. As such, Camera 92*a* can be used to capture pictures of Device's 98 surrounding. Camera 92*a* may be useful in detecting existence of Object 615, type of Object 615, identity of Object 615, distance of Object 615, bearing/angle of Object 615, location of Object 615, condition of Object 615, shape/size of Object 615, activity of Object 615, and/or other properties or information about Object 615. In some aspects, Camera 92*a* may be or comprise a video camera, a still picture camera, a stereo camera (i.e. camera with multiple lenses, etc.), and/or other camera. In general, Camera 92*a* can capture any light (i.e. visible light, infrared light, ultraviolet light, x-ray light, etc.) across the electromagnetic spectrum onto a light-sensitive material. In one example, a digital Camera 92*a* can utilize a charge coupled device (CCD), a complementary metal-oxide-semiconductor (CMOS) sensor, and/or other electronic image sensor to capture digital pictures. A digital picture may include a collection of color encoded pixels or dots. Examples of file formats that can be utilized to store a digital picture include JPEG, GIF, TIFF, PNG, PDF, and/or other digitally encoded picture formats. A video may include a stream of digital pictures. Examples of file formats that can be utilized to store a video include MPEG, AVI, FLV, MOV, RM, SWF, WMV, DivX, and/or other digitally encoded video formats. Any other techniques known in art can be utilized to facilitate Camera 92*a* functionalities.

In other embodiments, Sensor 92 may be or include Microphone 92*b*. Microphone 92*b* comprises functionality for capturing one or more sounds, and/or other functionalities. As such, Microphone 92*b* can be used to capture sounds from Device's 98 surrounding. Microphone 92*b* may be useful in detecting existence of Object 615, type of Object 615, identity of Object 615, bearing/angle of Object 615, activity of Object 615, and/or other properties or information about Object 615. In some aspects, Microphone 92*b* may be omnidirectional microphone that enables capturing sounds from any direction. In other aspects, Microphone 92*b* may be a directional (i.e. unidirectional, bidirectional, etc.) microphone that enables capturing sounds from one or more directions while ignoring or being insensitive to sounds from other directions. In general, Microphone 92*b* can utilize a membrane sensitive to air pressure and produce electrical signal based on air pressure variations. Samples of the electrical signal can then be read to produce a stream of digital sound samples. In one example, a digital Microphone 92*b* may include an integrated analog-to-digital converter to capture a stream of digital sound samples. In some embodiments, where used in a liquid, Microphone 92*b* may be or include a hydrophone. Examples of file formats that can be utilized to store a stream of digital sound samples include WAV, WMA, AIFF, MP3, RA, OGG, and/or other digitally encoded sound formats. Any other techniques known in art can be utilized to facilitate Microphone 92*b* functionalities. In further embodiments, Sensor 92 may be or include Lidar 92*c*. Lidar 92*c* may be useful in detecting existence of Object 615, type of Object 615, identity of Object 615, distance of Object 615, bearing/angle of Object 615, location of Object 615, condition of Object 615, shape/size of Object 615, activity of Object 615, and/or other properties or information about Object 615. In some aspects, Lidar 92*c* may emit one or more light signals (i.e. laser beams, scattered light, etc.) and listen for one or more signals reflected or backscattered from Object 615. Any other techniques known in art can be utilized to facilitate Lidar 92*c* functionalities.

In further embodiments, Sensor 92 may be or include Radar 92*d*. Radar 92*d* may be useful in detecting existence of Object 615, type of Object 615, distance of Object 615, bearing/angle of Object 615, location of Object 615, condition of Object 615, shape/size of Object 615, activity of Object 615, and/or other properties or information about Object 615. In some aspects, Radar 92*d* may emit one or more radio signals (i.e. radio waves, etc.) and listen for one or more signals reflected or backscattered from Object 615. Any other techniques known in art can be utilized to facilitate Radar 92*d* functionalities.

In further embodiments, Sensor 92 may be or include Sonar 92*e*. Sonar 92*e* may be useful in detecting existence of Object 615, type of Object 615, distance of Object 615, bearing/angle of Object 615, location of Object 615, condition of Object 615, shape/size of Object 615, activity of Object 615, and/or other properties or information about Object 615. In some aspects, Sonar 92*e* may emit one or more sound signals (i.e. sound pulses, sound waves, etc.) and listen for one or more signals reflected or backscattered from Object 615. Any other techniques known in art can be utilized to facilitate Sonar 92*e* functionalities.

In further embodiments, Sensor 92 may be or include any combination of the aforementioned and/or other sensors. For example, Microsoft Kinect includes an RGB camera, a depth sensor/3D scanner, and a microphone array to enable object recognition, 3D object model capture, 3D object motion capture, action/gesture recognition, facial recognition, voice recognition, and/or other functionalities. Examples of similar sensors from other manufacturers include Wii Remote Plus, PlayStation Move/Eye/Camera, and/or others. Sensor 92 may include any of these and/or other sensors from various manufacturers.

One of ordinary skill in art will understand that the aforementioned Sensors 92 are described merely as examples of a variety of possible implementations, and that while all possible Sensors 92 are too voluminous to describe, other sensors, and/or those known in art, that can facilitate detection of Objects 615, their states, and/or their properties are within the scope of this disclosure. Any one or combination of the aforementioned and/or other sensors can be used in various embodiments.

Object Processing Unit 115 comprises functionality for processing output from one or more Sensors 92 to obtain information of interest, and/or other functionalities. As such, Object Processing Unit 115 can be used at least in part to detect Objects 615 (i.e. physical objects, etc.; later described), their states, and/or their properties. Object Processing Unit 115 can also be used at least in part to detect Device 98, its states, and/or its properties. In some aspects, one or more Objects 615 may be detected in Device's 98 surrounding. Device's 98 surrounding may include or be defined by an area of interest, which enables focusing on Objects 615 in Device's 98 immediate or other surrounding, thereby avoiding extraneous Objects 615 or detail in the rest of the surrounding. In one example, an area of interest may include an area defined by a threshold distance from Device 98. In another example, an area of interest may include a radial, circular, elliptical, triangular, rectangular, octagonal, or other such area around Device 98. In a further example, an area of interest may include a spherical, cubical, pyramid-like, or other such area around Device 98. Any other area of interest shape or no area of interest can be utilized depending on implementation. The shape and/or size of an area of interest can be defined by a user, by system administrator, or automatically by the system based on experience, learning, testing, inquiry, analysis, synthesis, or other techniques, knowledge, or input. In some embodiments, Object Processing Unit 115 can generate or create Collection of Object Representations 525 (also may be referred to as collection of object representations, Coll of Obj Reps, or other suitable name or reference, etc.) and store one or more Object Representations 625 (also may be referred to as object representations, representations of objects, or other suitable name or reference, etc.) and/or other elements or information into the Collection of Object Representations 525. As such, Collection of Object Representations 525 comprises functionality for storing one or more Object Representations 625 and/or other elements or information. In other embodiments, Object Processing Unit 115 can generate or create Collection of Object Representations 525 and store one or more references (i.e. pointers, etc.) to one or more Object Representations 625, and/or other elements or information into the Collection of Object Representations 525. As such, Collection of Object Representations 525 comprises functionality for storing one or more references to one or more Object Representations 625, and/or other elements or information. In further embodiments, Object Processing Unit 115 can generate or create a reference to an existing Collection of Object Representations 525. In some aspects, Object Representation 625 may include one or more Object Properties 630, and/or other elements or information. In other aspects, Object Representation 625 may include one or more references to one or more Object Properties 630, and/or other elements or information. In one example, Object Representation 625 may include an electronic representation of Object 615 or state of Object 615. In another example, Object Representation 625 may include an electronic representation of Device 98 or state of Device 98. Hence, Collection of Object Representations 525 may include an electronic representation of one or more Objects 615 or state of one or more Objects 615, and/or Device 98 or state of Device 98. In some aspects, Collection of Object Representations 525 includes one or more Object Representations 625 and/or one or more references to one or more Object Representations 625, and/or other elements or information related to one or more Objects 615 and/or Device 98 at a particular time. As such, Collection of Object Representations 525 may represent one or more Objects 615 or state of one or more Objects 615, and/or Device 98 or state of Device 98 at a particular time. Collection of Object Representations 525 may, therefore, include knowledge (i.e. unit of knowledge, etc.) of one or more Objects 615 or state of one or more Objects 615, and/or Device 98 or state of Device 98 at a particular time. In some designs, a Collection of Object Representations 525 may include or be associated with a time stamp (not shown), order (not shown), or other time related information. For example, one Collection of Object Representations 525 may be associated with time stamp t1, another Collection of Object Representations 525 may be associated with time stamp t2, and so on. Time stamps t1, t2, etc. may indicate the times of generating Collections of Object Representations 525, for instance. In some designs where a representation of a single Object 615 at a particular time is needed, Object Processing Unit 115 can generate or create Object Representation 625 instead of Collection of Object Representations 525. Any features, functionalities, operations, and/or embodiments described with respect to Collection of Object Representations 525 may similarly apply to Object Representation 625. In other embodiments, Object Processing Unit 115 can generate or create a stream of Collections of Object Representations 525. A stream of Collections of Object Representations 525 may include one Collection of Object Representations 525 and/or a reference to one Collection of Object Representations 525, or a group, sequence, or other plurality of Collections of Object Representations 525 and/or references to a group, sequence, or other plurality of Collections of Object Representations 525. In some aspects, a stream of Collections of Object Representations 525 includes one or more Collections of Object Representations 525 and/or one or more references to one or more Collections of Object Representations 525, and/or other elements or information related to one or more Objects 615 and/or Device 98 over time or during a time period. As such, a stream of Collections of Object Representations 525 may represent one or more Objects 615 or state of one or more Objects 615, and/or Device 98 or state of Device 98 over time or during a time period. A stream of Collections of Object Representations 525 may, therefore, include knowledge (i.e. unit of knowledge, etc.) of one or more Objects 615 or state of one or more Objects 615, and/or Device 98 or state of Device 98 over time or during a time period. As one or more Objects 615 and/or Device 98 change (i.e. their states and/or their properties change, move, act, transform, etc.) over time or during a time period, this change may be captured in a stream of Collections of Object Representations 525. In some designs, each Collection of Object Representations 525 in a stream may include or be associated with the aforementioned time stamp, order, or other time related information. For example, one Collection of Object Representations 525 in a stream may be associated with order 1, a next Collection of Object Representations 525 in the stream may be associated with order 2, and so on. Orders 1, 2, etc. may indicate the orders or places of Collections of Object Representations 525 within a stream (i.e. sequence, etc.), for instance. Ignoring all other differences, a stream of Collections of Object Representations 525 may, in some aspects, be similar to a stream of pictures (i.e. video, etc.) where a stream of pictures may include a sequence of pictures and a stream of Collections of Object Representations 525 may include a sequence of Collections of Object Representations 525. In some designs where a representation of a single Object 615 over time is needed, Object Processing Unit 115 can generate or create a stream of Object Representations 625 instead of a stream of Collections of Object Representations 525. Any features, functionalities, operations, and/or embodiments described with respect to a stream of Collections of Object Representations 525 may similarly apply to a stream of Object Representations 625.

Object 615 (also may be referred to as object, physical object, and/or other suitable name or reference, etc.) may be or comprise a physical object. Object 615 may exist in the physical world. Further, a reference to manipulations or other operations performed on Object 615 includes a reference to physical manipulations or other operations, hence, these terms may be used interchangeably herein depending on context. Examples of Objects 615 include biological objects (i.e. persons, animals, vegetation, etc.), nature objects (i.e. rocks, bodies of water, etc.), manmade objects (i.e. buildings, streets, ground/aerial/aquatic vehicles, robots, devices, etc.), and/or others. In some aspects, any part of Object 615 may be detected as Object 615 itself or sub-Object 615. For instance, instead of or in addition to detecting a vehicle as Object 615, a wheel and/or other parts of the vehicle may be detected as Objects 615 or sub-Objects 615. In general, Object 615 may include any Object 615 or sub-Object 615 that can be detected. Examples of object properties include existence of Object 615, type of Object 615 (i.e. person, cat, vehicle, robot, building, street, tree, rock, etc.), identity of Object 615 (i.e. name, identifier, etc.), location of Object 615 (i.e. distance and bearing/angle from a known/reference point or object, relative or absolute coordinates, etc.), condition of Object 615 (i.e. open, closed, 34% open, 0.34, 73 cm open, 73, 69% full, 0.69, switched on, 1, switched off, 0, etc.), shape/size of Object 615 (i.e. height, width, depth, model [i.e. 3D model, 2D model, etc.], bounding box, point cloud, picture, etc.), activity of Object 615 (i.e. motion, gestures, etc.), orientation of Object 615 (i.e. East, West, North, South, SSW, 9.3 degrees NE, relative orientation, absolute orientation, etc.), sound of Object 615 (i.e. human voice or other human sound, animal sound, machine/device sound, etc.), speech of Object 615 (i.e. human speech recognized from sound object property, etc.), and/or other properties of Object 615. Type of Object 615, for example, may include any classification of Objects 615 ranging from detailed such as person, cat, vehicle, robot, building, street, tree, rock, etc. to generalized such as biological Object 615, nature Object 615, manmade/artificial Object 615, and/or others including their sub-types. Location of Object 615, for example, can include a relative location such as one defined by distance and bearing/angle from a known/reference point or object (i.e. Device 98, etc.) or one defined by relative coordinates from a known/reference point or object (i.e. Device 98, etc.). Location of Object 616, for example, can also include absolute location such as one defined by absolute coordinates. Other properties may include relative and/or absolute properties or values. In general, an object property may include any attribute of Object 615 (i.e. existence of Object 615, type of Object 615, identity of Object 615, shape/size of Object 615, etc.), any relationship of Object 615 with Device 98, other Objects 615, or the environment (i.e. location of Object 615 [i.e. distance and bearing/angle from Device 98, relative coordinates relative to Device 98, absolute coordinates, etc.], friend/foe relationship, etc.), and/or other information related to Object 615.

In some aspects, a reference to one or more Collections of Object Representations 525 may include a reference to one or more Objects 615 or state of one or more Objects 615 that the one or more Collections of Object Representations 525 represent. Also, a reference to one or more Objects 615 or state of one or more Objects 615 may include a reference to the corresponding one or more Collections of Object Representations 525. Therefore, one or more Collections of Object Representations 525 and one or more Objects 615 or state of one or more Objects 615 may be used interchangeably herein. In other aspects, state of Object 615 includes the Object's 615 mode of being. As such, state of Object 615 may include or be defined at least in part by one or more properties of the Object 615 such as existence, location, shape, condition, and or other properties or attributes. Object Representation 625 that represents Object 615 or state of Object 615, hence, includes one or more Object Properties 630. In further aspects, Object Processing Unit 115 and/or any of its elements or functionalities can be included in Sensor 92. In further aspects, Object Processing Unit 115 may include any signal processing techniques or elements, and/or those known in art, as applicable. In general, Object Processing Unit 115 can be provided in any suitable configuration. One of ordinary skill in art will understand that the aforementioned Collection of Object Representations 525 and/or elements thereof are described merely as examples of a variety of possible implementations, and that while all possible implementations of Collection of Object Representations 525 and/or elements thereof are too voluminous to describe, other implementations of Collection of Object Representations 525 and/or elements thereof are within the scope of this disclosure. Generally, any representation of one or more Objects 615 can be utilized herein. Object Processing Unit 115 may include any hardware, programs, or combination thereof.

In some embodiments, Object Processing Unit 115 may include Picture Recognizer 117*a*. Picture Recognizer 117*a* comprises functionality for detecting or recognizing Objects 615, their states, and/or their properties in visual data, and/or other functionalities. Visual data includes digital motion pictures, digital still pictures, and/or other visual data. Examples of file formats that can be utilized to store visual data include AVI, Divx, MPEG, JPEG, GIF, TIFF, PNG, PDF, and/or other file formats. For example, Picture Recognizer 117*a* can be used for detecting or recognizing Objects 615, their states, and/or their properties in one or more digital pictures captured by Camera 92*a*. Picture Recognizer 117*a* can be used in detecting or recognizing existence of Object 615, type of Object 615, identity of Object 615, distance of Object 615, bearing/angle of Object 615, location of Object 615, condition of Object 615, shape/size of Object 615, activity of Object 615, and/or other properties or information about Object 615. In general, Picture Recognizer 117*a* can be used for any operation supported by Picture Recognizer 117*a*. Picture Recognizer 117*a* may detect or recognize Object 615, its states, and/or its properties as well as track the Object 615, its states, and/or its properties in one or more digital pictures or streams of digital pictures (i.e. motion pictures, video, etc.). In the case of a person, Picture Recognizer 117*a* may detect or recognize a human head or face, upper body, full body, or portions/combinations thereof. In some aspects, Picture Recognizer 117*a* may detect or recognize Object 615, its states, and/or its properties from a digital picture by comparing a collection of pixels from the digital picture with collections of pixels comprising known objects, their states, and/or their properties. The collections of pixels comprising known objects, their states, and/or their properties can be learned or manually, programmatically, or otherwise defined. The collections of pixels comprising known objects, their states, and/or their properties can be stored in any data structure or repository (i.e. one or more files, database, etc.) that resides locally on Device 98, or remotely on a remote computing device (i.e. server, cloud, etc.) accessible over a network or an interface. In other aspects, Picture Recognizer 117*a* may detect or recognize Object 615, its states, and/or its properties from a digital picture by comparing features (i.e. lines, edges, ridges, corners, blobs, regions, etc.) in the digital picture with features of known objects, their states, and/or their properties. The features of known objects, their states, and/or their properties can be learned or manually, programmatically, or otherwise defined. The features of known objects and/or their properties can be stored in any data structure or repository (i.e. neural network, one or more files, database, etc.) that resides locally on Device 98, or remotely on a remote computing device (i.e. server, cloud, etc.) accessible over a network or an interface. Typical steps or elements in a feature oriented picture recognition include pre-processing, feature extraction, detection/segmentation, decision-making, and/or others, or combination thereof, each of which may include its own sub-steps or sub-elements depending on the application. In further aspects, Picture Recognizer 117*a* may detect or recognize multiple Objects 615, their states, and/or their properties from a digital picture using the aforementioned pixel or feature comparisons, and/or other detection or recognition techniques. For example, a picture may depict two Objects 615 in two of its regions both of which Picture Recognizer 117*a* can detect simultaneously. In further aspects, where Objects 615, their states, and/or their properties span multiple pictures, Picture Recognizer 117*a* may detect or recognize Objects 615, their states, and/or their properties by applying the aforementioned pixel or feature comparisons and/or other detection or recognition techniques over a stream of digital pictures (i.e. motion picture, video, etc.). For example, once Object 615 is detected in a digital picture (i.e. frame, etc.) of a stream of digital pictures (i.e. motion picture, video, etc.), the region of pixels comprising the detected Object 615 or the Object's 615 features can be searched in other pictures of the stream of digital pictures, thereby tracking the Object 615 through the stream of digital pictures. In further aspects, Picture Recognizer 117*a* may detect or recognize an Object's 615 activities by identifying and/or analyzing differences between a detected region of pixels of one picture (i.e. frame, etc.) and detected regions of pixels of other pictures in a stream of digital pictures. For example, a region of pixels comprising a person's face can be detected in multiple consecutive pictures of a stream of digital pictures (i.e. motion picture, video, etc.). Differences among the detected regions of the consecutive pictures may be identified in the mouth part of the person's face to indicate smiling or speaking activity. In further aspects, Picture Recognizer 117*a* may detect or recognize Objects 615, their states, and/or their properties using one or more artificial neural networks, which may include statistical techniques. Examples of artificial neural networks that can be used in Picture Recognizer 117*a* include a convolutional neural network (CNN), a time delay neural network (TDNN), a deep neural network, and/or others. In one example, picture recognition techniques and/or tools involving a convolutional neural network may include identifying and/or analyzing tiled and/or overlapping regions or features of a digital picture, which may then be used to search for pictures with matching regions or features. In another example, features of different convolutional neural networks responsible for spatial and temporal streams can be fused to detect Objects 615, their states, and/or their properties in streams of digital pictures (i.e. motion pictures, videos, etc.). In general, Picture Recognizer 117*a* may include any machine learning, deep learning, and/or other artificial intelligence techniques. In further aspects, Picture Recognizer 117*a* can detect distance of a recognized Object 615 in a picture captured by a camera using structured light, sheet of light, or other lighting schemes, and/or by using phase shift analysis, time of flight, interferometry, or other techniques. In further aspects, Picture Recognizer 117*a* may detect distance of a recognized Object 615 in a picture captured by a stereo camera by using triangulation and/or other techniques. In further aspects, Picture Recognizer 117*a* may detect bearing/angle of a recognized Object 615 relative to the camera-facing direction by measuring the distance from the vertical centerline of the picture to a pixel in the recognized Object 615 based on known picture resolution and camera's angle of view. Any other techniques, and/or those known in art, can be utilized in Picture Recognizer 117*a*. For example, thresholds for similarity, statistical techniques, and/or optimization techniques can be utilized to determine a match in any of the aforementioned detection or recognition techniques. In some exemplary embodiments, object recognition techniques and/or tools such as OpenCV (Open Source Computer Vision) library, CamFind API, Kooaba, 6px API, Dextro API, and/or others can be utilized for detecting or recognizing Objects 615, their states, and/or their properties in digital pictures. For example, OpenCV library can detect Object 615 (i.e. person, animal, vehicle, rock, etc.), its state, and/or its properties in one or more digital pictures captured by Camera 92*a* or stored in an electronic repository, which can then be utilized in LTC-UAK Unit 100 and/or other elements. In other exemplary embodiments, facial recognition techniques and/or tools such as OpenCV (Open Source Computer Vision) library, Animetrics FaceR API, Lambda Labs Facial Recognition API, Face++SDK, Neven Vision (also known as N-Vision) Engine, and/or others can be utilized for detecting or recognizing faces in digital pictures. Picture Recognizer 117*a* may include any features, functionalities, and/or embodiments of Comparison 725 (later described) as related to picture comparison.

In other embodiments, Object Processing Unit 115 may include Sound Recognizer 117*b*. Sound Recognizer 117*b* comprises functionality for detecting or recognizing Objects 615, their states, and/or their properties in audio data, and/or other functionalities. Audio data includes digital sound and/or other audio data. Examples of file formats that can be utilized to store audio data include WAV, WMA, AIFF, MP3, RA, OGG, and/or other file formats. For example, Sound Recognizer 117*b* can be used for detecting or recognizing Objects 615, their states, and/or their properties in a stream of digital sound samples captured by Microphone 92*b*. In the case of a person, Sound Recognizer 117*b* can detect or recognize speech, voice, and/or other human sounds. Any speech recognition technique can be used in such detecting or recognizing. Sound Recognizer 117*b* can be utilized in detecting or recognizing existence of Object 615, type of Object 615, identity of Object 615, bearing/angle of Object 615, activity of Object 615, sound of Object 615, speech of Object 615, and/or other properties or information about Object 615. In some aspects, Sound Recognizer 117*b* can utilize intensity and/or directionality of sound and align them with known locations of Objects 615 to determine to which Object 615 the sound belongs or to determine the source of the sound. In general, Sound Recognizer 117*b* can be used for any operation supported by Sound Recognizer 117*b*. In some aspects, Sound Recognizer 117*b* may detect or recognize Object 615, its states, and/or its properties from a stream of digital sound samples by comparing a collection of sound samples from the stream of digital sound samples with collections of sound samples of known objects, their states, and/or their properties. The collections of sound samples of known objects, their states, and/or their properties can be learned, or manually, programmatically, or otherwise defined. The collections of sound samples of known objects, their states, and/or their properties can be stored in any data structure or repository (i.e. one or more files, database, etc.) that resides locally on Device 98, or remotely on a remote computing device (i.e. server, cloud, etc.) accessible over a network or an interface. In other aspects, Sound Recognizer 117*b* may detect or recognize Object 615, its states, and/or its properties from a stream of digital sound samples by comparing features from the stream of digital sound samples with features of sounds of known objects, their states, and/or their properties. The features of sounds of known objects, their states, and/or their properties can be learned, or manually, programmatically, or otherwise defined. The features of sounds of known objects, their states, and/or their properties can be stored in any data structure or repository (i.e. one or more files, database, neural network, etc.) that resides locally on Device 98, or remotely on a remote computing device (i.e. server, cloud, etc.) accessible over a network or an interface. Typical steps or elements in a feature oriented sound recognition include pre-processing, feature extraction, acoustic modeling, language modeling, and/or others, or combination thereof, each of which may include its own sub-steps or sub-elements depending on the application. In further aspects, Sound Recognizer 117*b* may detect or recognize a variety of sounds from a stream of digital sound samples using the aforementioned sound sample or feature comparisons, and/or other detection or recognition techniques. For example, sound of a person, animal, vehicle, and/or other sounds can be detected by Sound Recognizer 117*b*. In further aspects, Sound Recognizer 117*b* may detect or recognize sounds using a Hidden Markov Model (HMM), an artificial neural network, a dynamic time warping (DTW), a Gaussian mixture model (GMM), and/or other models or techniques, or combination thereof. Some or all of these models or techniques may include statistical techniques. Examples of artificial neural networks that can be used in Sound Recognizer 117*b* include a recurrent neural network, a time delay neural network (TDNN), a deep neural network, a convolutional neural network, and/or others. In general, Sound Recognizer 117*b* may include any machine learning, deep learning, and/or other artificial intelligence techniques. In further aspects, Sound Recognizer 117*b* can detect bearing/angle of a recognized Object 615 by measuring the direction in which Microphone 92*b* is pointing when sound of a maximum strength is received, by analyzing amplitude of the sound, by performing phase analysis (i.e. with microphone array, etc.) of the sound, and/or by utilizing other techniques. Any other techniques, and/or those known in art, can be utilized in Sound Recognizer 117*b*. For example, thresholds for similarity, statistical techniques, and/or optimization techniques can be utilized to determine a match in any of the aforementioned detection or recognition techniques. In some exemplary embodiments, operating system's sound recognition functionalities such as iOS's Voice Services, Siri, and/or others can be utilized in Sound Recognizer 117*b*. For example, iOS Voice Services can detect Object 615 (i.e. person, etc.), its state, and/or its properties in a stream of digital sound samples captured by Microphone 92*b* or stored in an electronic repository, which can then be utilized in LTCUAK Unit 100 and/or other elements. In other exemplary embodiments, Java Speech API (JSAPI) implementation such as The Cloud Garden, Sphinx, and/or others can be utilized in Sound Recognizer 117*b*. For example, Cloud Garden JSAPI can detect Object 615 (i.e. person, animal, vehicle, etc.), its state, and/or its properties in a stream of digital sound samples captured by Microphone 92*b* or stored in an electronic repository, which can then be utilized in LTCUAK Unit 100 and/or other elements. Any other programming language's or platform's speech or sound processing API can similarly be utilized. In further exemplary embodiments, applications or engines providing sound recognition functionalities such as HTK (Hidden Markov Model Toolkit), Kaldi, OpenEars, Dragon Mobile, Julius, iSpeech, CeedVocal, and/or others can be utilized in Sound Recognizer 117*b*. For example, Kaldi SDK can detect Object 615 (i.e. person, animal, vehicle, etc.), its state, and/or its properties in a stream of digital sound samples captured by Microphone 92*b* or stored in an electronic repository, which can then be utilized in LTCUAK Unit 100 and/or other elements.

In further embodiments, Object Processing Unit 115 may include Lidar Processing Unit 117*c*. Lidar Processing Unit 117*c* comprises functionality for detecting or recognizing Objects 615, their states, and/or their properties using light, and/or other functionalities. As such, Lidar Processing Unit 117*c* can be used in detecting existence of Object 615, type of Object 615, identity of Object 615, distance of Object 615, bearing/angle of Object 615, location of Object 615, condition of Object 615, shape/size of Object 615, activity of Object 615, and/or other properties or information about Object 615. In general, Lidar Processing Unit 117*c* can be used for any operation supported by Lidar Processing Unit 117*c*. In one example, Lidar Processing Unit 117*c* may detect distance of Object 615 by measuring time delay between emission of a light signal (i.e. laser beam, etc.) and return of the light signal reflected from the Object 615 based on known speed of light. In another example, Lidar Processing Unit 117*c* may detect bearing/angle of Object 615 by analyzing the amplitudes of one or more light signals received by an array of detectors (i.e. detectors arranged into a quadrant or other arrangement, etc.). In a further example, Lidar Processing Unit 117*c* may detect existence, type, identity, condition, shape/size, activity, and/or other properties of Object 615 by illuminating the Object 615 with light and acquiring an image of the object, which can then be processed using the functionalities of Picture Recognizer 117*a*. In a further example, Lidar Processing Unit 117*c* may detect existence, type, identity, condition, shape/size, activity, and/or other properties of Object 615 by illuminating the Object 615 with laser beams and acquiring a point cloud representation of the Object 615. A point cloud representation of Object 615 may optionally be further processed to generate a 3D model (i.e. polygonal model, NURBS model, or CAD model, etc.), voxel model, and/or other computer model or representation of the Object 615. 3D reconstruction and/or other techniques can be used in such processing. For instance, Lidar Processing Unit 117*c* may detect or recognize Object 615, its state, and/or its properties by comparing point cloud, 3D model, voxel model, or other model of the recognized Object 615 with collection of point clouds, 3D models, voxel models, or other models of known objects, their states, and/or their properties. Lidar Processing Unit 117*c* may include any features, functionalities, and/or embodiments of Comparison 725 (later described) as related to model comparison. Lidar Processing Unit 117*c* may detect Objects 615, their states, and/or their properties by using any lidar or light-related techniques, and/or those known in art.

In further embodiments, Object Processing Unit 115 may include Radar Processing Unit 117*d*. Radar Processing Unit 117*d* comprises functionality for detecting or recognizing Objects 615, their states, and/or their properties using radio waves, and/or other functionalities. As such, Radar Processing Unit 117*d* can be used in detecting existence of Object 615, type of Object 615, distance of Object 615, bearing/angle of Object 615, location of Object 615, condition of Object 615, shape/size of Object 615, activity of Object 615, and/or other properties or information about Object 615. In general, Radar Processing Unit 117*d* can be used for any operation supported by Radar Processing Unit 117*d*. In one example, Radar Processing Unit 117*d* may detect existence of Object 615 by emitting a radio signal and listening for the radio signal reflected from the Object 615. In another example, Radar Processing Unit 117*d* may detect distance of Object 615 by measuring time delay between emission of a radio signal and return of the radio signal reflected from the Object 615 based on known speed of the radio signal. In a further example, Radar Processing Unit 117*d* may detect bearing/angle of Object 615 by measuring the direction in which the antenna is pointing when the return signal of a maximum strength is received, by analyzing amplitude of the return signal, by performing phase analysis (i.e. with antenna array, etc.) of the return signal, and/or by utilizing any amplitude, phase, or other techniques. In a further example, Radar Processing Unit 117*d* may detect existence, type, identity, condition, shape/size, activity, and/or other properties of Object 615 by illuminating the Object 615 with radio waves and acquiring an image of the Object 615, which can then be processed using the functionalities of Picture Recognizer 117*a*. Radar Processing Unit 117*d* may detect Objects 615, their states, and/or their properties by using any radar or radio-related techniques, and/or those known in art.

In further embodiments, Object Processing Unit 115 may include Sonar Processing Unit 117*e*. Sonar Processing Unit 117*e* comprises functionality for detecting or recognizing Objects 615, their states, and/or their properties using sound, and/or other functionalities. As such, Sonar Processing Unit 117*e* can be used in detecting existence of Object 615, type of Object 615, distance of Object 615, bearing/angle of Object 615, location of Object 615, condition of Object 615, shape/size of Object 615, activity of Object 615, and/or other properties or information about Object 615. In general, Sonar Processing Unit 117*e* can be used for any operation supported by Sonar Processing Unit 117*e*. In one example, Sonar Processing Unit 117*e* may detect existence of Object 615 by emitting a sound signal and listening for the sound signal reflected from the Object 615. In another example, Sonar Processing Unit 117*e* may detect distance of Object 615 by measuring time delay between emission of a sound signal and return of the sound signal reflected from the Object 615 based on known speed of the sound signal. In a further example, Sonar Processing Unit 117*e* may detect bearing/angle of Object 615 by measuring the direction in which the microphone is pointing when the return signal of a maximum strength is received, by analyzing amplitude of the return signal, by performing phase analysis (i.e. with microphone array, etc.) of the return signal, and/or by utilizing any amplitude, phase, or other techniques. In a further example, Sonar Processing Unit 117*e* may detect existence, type, identity, condition, shape/size, activity, and/or other properties of Object 615 by illuminating the Object 615 with sound pulses/waves and acquiring an image of the Object 615, which can then be processed using the functionalities of Picture Recognizer 117*a*. Sonar Processing Unit 117*e* may detect Objects 615, their states, and/or their properties by utilizing any sonar or sound-related techniques, and/or those known in art.

One of ordinary skill in art will understand that the aforementioned techniques for detecting or recognizing Objects 615, their states, and/or their properties are described merely as examples of a variety of possible implementations, and that while all possible techniques for detecting or recognizing Objects 615, their states, and/or their properties are too voluminous to describe, other techniques, and/or those known in art, for detecting or recognizing Objects 615, their states, and/or their properties are within the scope of this disclosure. Any combination of the aforementioned and/or other sensors, object detecting or recognizing techniques, signal processing techniques, and/or other elements or techniques can be used in various embodiments.

Figure 4B:
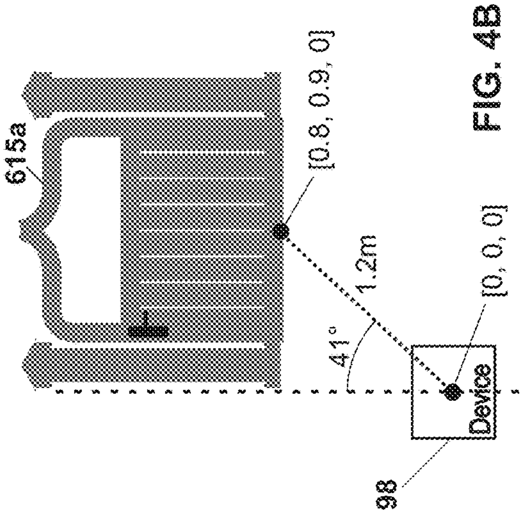
FIG. 4B-4D illustrate an exemplary embodiment of a single Object 615 detected in Device's 98 surrounding and corresponding embodiments of Collections of Object Representations 525.
Figure 4A:
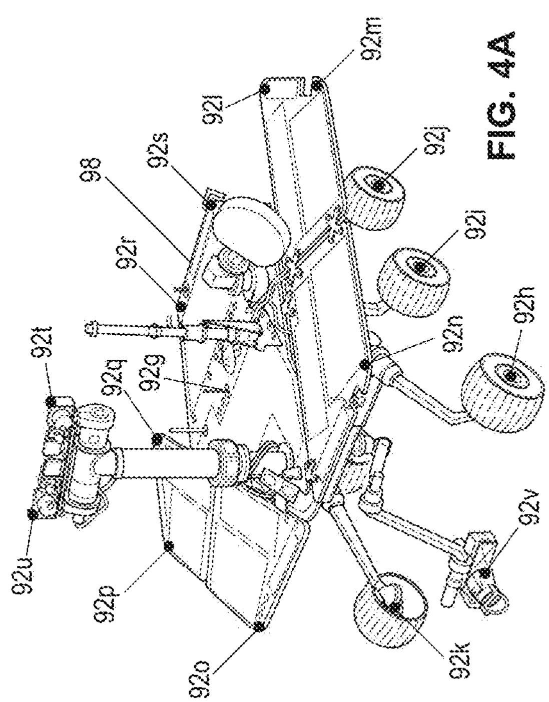
FIG. 4A illustrates an exemplary embodiment of Device 98.

Referring to FIG. 4A, an exemplary embodiment of Device 98 (also may be referred to as device, system, or other suitable name or reference, etc.) is illustrated. In some aspects, in order to be aware of other Objects 615, Device 98 may use Sensors 92*a*-92*e*, etc. and/or other techniques to detect Objects 615, states of Objects 615, properties of Objects 615, and/or other information about Objects 615 as previously described. In order to be aware of itself (i.e. self-aware, etc.), Device 98 may use Sensors 92*g*-92*v* and/or other techniques to detect Device 98, states of Device 98, properties of Device 98, and/or other information about Device 98. For example, in order to be self-aware, Device 98 may need to know one or more of the following: its location, its condition, its shape, its elements, its orientation, its identification, time, and/or other information.

In some embodiments, Device's 98 location may be obtained or determined from Sensor 92*g*. Sensor 92*g* may be or include a location sensor (also may be referred to as position sensor, locator, or other suitable name or reference, etc.) that comprises functionality for determining its location or position, and/or other functionalities. As such, Sensor 92*g* can be used in determining a location of Device 98 or Device's 98 element on which Sensor 92*g* is attached. In one example, Sensor 92*g* may be or include a global positioning system (GPS, i.e. a system that determines location by measuring time of travel of a signal from one or more satellites based on known speed of the signal, etc.). In another example, Sensor 92*g* may be or include a signal triangulation system (i.e. a system that determines location by triangulating signals from multiple signal sources, etc.). In a further example, Sensor 92*g* may be or include any geo-location sensor. In a further example, Sensor 92*g* may be or include a location sensor suitable for attachment on Device 98 or Device's 98 element. In a further example, Sensor 92*g* may be or include a capacitive displacement sensor, Eddy-current sensor, Hall effect sensor, inductive sensor, laser doppler vibrometer (i.e. optical, etc.), linear variable differential transformer (LVDT), photodiode array, piezo-electric transducer, position encoder (i.e. absolute encoder, incremental encoder, linear encoder, rotary encoder, etc.), proximity sensor (i.e. optical, etc.), string potentiometer (also known as string pot., string encoder, cable position transducer, etc.), ultrasonic sensor (i.e. transmitter, receiver, transceiver, etc.), and/or others. In general, Sensor 92*g* may be or include any location determination device, system, or technique, and/or those known in art. Location may be represented by coordinates (i.e. absolute coordinates, relative coordinates, etc.), distance and bearing/angle from a reference point/object, or others, and/or those known in art.

In other embodiments, Device's 98 condition can be obtained or determined from Sensors 92*g*-92*v* placed on Device's 98 condition-changing and/or other elements. In one example, one or more Sensors 92*h*-92*k* placed on Device's 98 wheels to determine whether Device's 98 wheels' condition is rotating, angle of Device's 98 wheels' rotation, speed of Device's 98 wheels' rotation, and/or other rotation related information. One or more Sensors 92*h*-92*k* may also be useful in detecting location of Device 98, speed of Device 98, condition of Device 98, activity of Device 98, and/or other properties or information of Device 98. One or more Sensors 92*h*-92*k* may be or include a rotation sensor that comprises functionality for determining rotation, and/or other functionalities. One or more Sensors 92*h*-92*k* may be or include an optical rotation sensor (i.e. reflective optical sensor, optical interrupter sensor, optical encoder, etc.), a magnetic rotation sensor (i.e. variable-reluctance [VR] sensor, eddy-current killed oscillator [ECKO], Wiegand sensor, Hall-effect sensor, etc.), a rotary position sensor that can measure rotational angle (i.e. using motion of a slider to cause changes in resistance, which the sensor circuit converts into changes in output voltage using encoder, etc.), a tachometer, and/or others. In general, one or more Sensors 92*h*-92*k* may be or include any rotation determination device, system, or technique, and/or those known in art. A rotation may be represented by 0 (not rotating) or 1 (rotating), angle of rotation, speed of rotation, or others, and/or those known in art. In another example, Sensors 921-92*q* that may include contact sensors that can be used to determine whether the condition of Device's 98 solar charging cells and/or other elements are deployed or folded.

In further embodiments, Device's 98 shape can be obtained or determined from one or more Sensors 92*g*-92*v* placed on Device's 98 extremities and/or major elements. In some aspects, such one or more Sensors 92*g*-92*v* may include location sensors (i.e. previously described with respect to Sensor 92*g*, etc.). In one example, one or more Sensors 92*g*-92*v* may each include a location sensor that provides absolute coordinates for each of the Sensors 92*g*-92*v* effectively generating a point cloud of absolute coordinates of Sensors 92*g*-92*v*. The point cloud of absolute coordinates of protruded points on Device 98 can then be used to generate a representation of Device's 98 shape such as a bounding box, 3D model, and/or others as previously described. In another example, one or more Sensors 92*g*-92*v* may include transmitters or beacons that transmit an ultrasonic, radio, optical, electrical, magnetic, electromagnetic, and/or other signal that can be received by a receiver (i.e. near the middle of Device 98, etc.) that measures the strength and angel/bearing of the received signal and determines coordinates of each of the one or more Sensors 92*g*-92*v*. The distance of the transmitter/beacon can be measured by any signal amplitude measuring sensor known in art and the angle/bearing of the signal can be measured by a sensor array, and/or other techniques known in art. Distance and angle/bearing for each of the Sensors 92*g*-92*v* can then be converted into coordinates relative to the receiver effectively generating a point cloud of relative coordinates of Sensors 92*g*-92*v*. The point cloud of relative coordinates of protruded points on Device 98 can then be used to generate a representation of Device's 98 shape such as a bounding box, 3D model, and/or others as previously described. In further aspects, Device's 98 shape can be obtained or determined from a lidar, radar, sonar, and/or other active imaging sensor installed on Device 98 and configured to illuminate Device 98 and/or its elements with light, radio signals, or sound to obtain a point cloud, image, or other representation of Device 98 its elements that can then be used to generate a representation of Device's 98 shape such as a bounding box, 3D model, and/or others as previously described. In further aspects, Device's 98 shape can be obtained or determined by conducting a constant electrical current through Device 98 and/or its elements and measuring the intensity/strength of a magnetic field from a fixed one or more points on Device 98. The intensity/strength of the magnetic field is higher for closer parts of Device 98 and lower for farther parts of Device 98, thereby enabling a generation of a representation of Device's 98 shape such as a bounding box, 3D model, and/or others. In further aspects, Device's 98 shape can be obtained or determined from Device's 98 own internal representation of itself included (i.e. stored in memory, provided by the device's manufacturer, hardcoded, etc.) in Device 98 such as dimensions of Device 98 or its elements, point cloud, a bounding box, 3D model, and/or other representation of Device 98 and/or its elements. Similar techniques as the above-described ones with respect to Device's 98 shape can be used obtained or determined Device's 98 elements.

In further embodiments, Device's 98 orientation and or direction can be obtained or determined from one or more Sensors 92*g*-92*v* that may include a gyroscope, compass, and/or other orientation or direction sensor.

In further embodiments, Device's 98 identification can be obtained or determined from Device's 98 own internal representation of itself included (i.e. stored in memory, provided by the device's manufacturer, hardcoded, etc.) in Device 98 such as a serial number, name, ID, and/or others.

In further embodiments, time can be obtained or determined from a system clock, online clock, oscillator, or other time source.

In further embodiments, other information about Device 98, its elements, and/or other relevant information for Device's 98 self-awareness can be obtained or determined from the disclosed sensors or other elements, and/or those known in art.

In some embodiments where Device 98 is or includes a system (i.e. distributed devices, connected devices, etc.), the techniques for detecting or recognizing states and/or properties of a single Device 98 can similarly be used for detecting or recognizing states and/or properties of multiple Devices 98 in the system, and, therefore, states or properties of the system itself. One of ordinary skill in art will understand that the aforementioned techniques for detecting, obtaining, and/or recognizing Device 98, Device's 98 states, and/or Device's 98 properties are described merely as examples of a variety of possible implementations, and that while all possible techniques for detecting, obtaining, and/or recognizing Device 98, Device's 98 states, and/or Device's 98 properties are too voluminous to describe, other techniques, and/or those known in art, are within the scope of this disclosure. Any combination of the aforementioned and/or other sensors, object detecting or recognizing techniques, signal processing techniques, and/or other elements or techniques can be used in various embodiments.

Figure 4D:
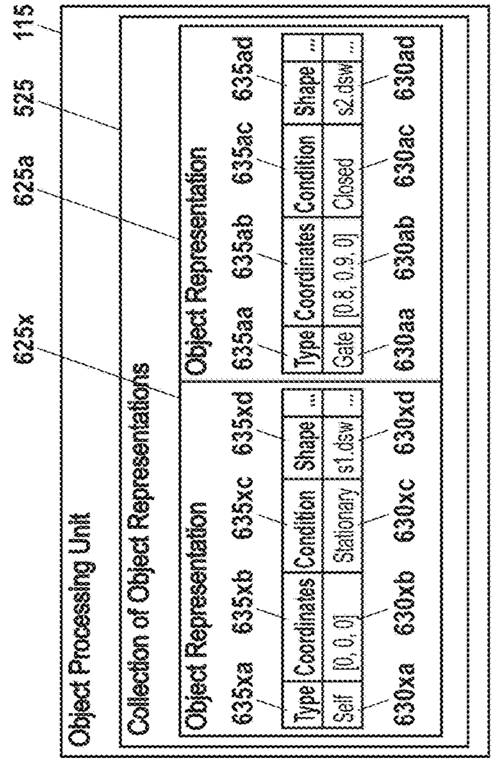
Figure 4C:
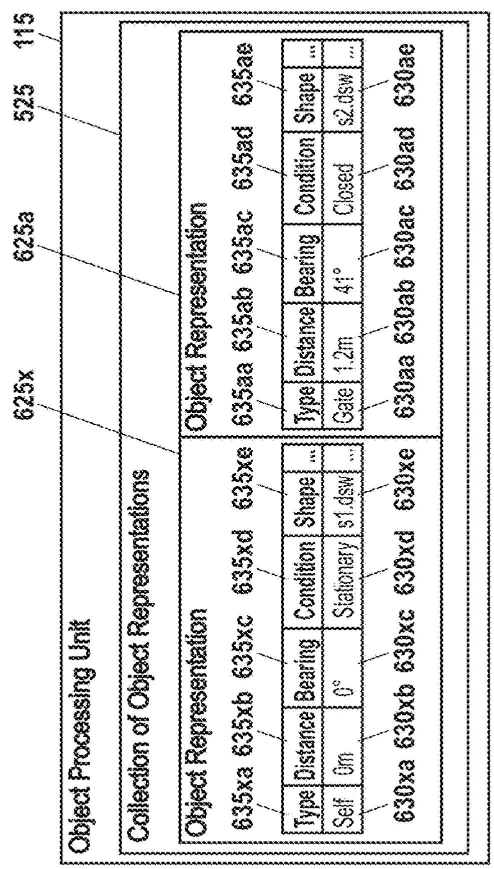

Referring to FIG. 4B-4D, an exemplary embodiment of a single Object 615 detected in Device's 98 surrounding and corresponding embodiments of Collections of Object Representations 525 are illustrated.

As shown for example in FIG. 4B, Device 98 may detect Object 615*a*. Device 98 may be defined to be relative origin at a distance of Om from Device 98 and at a bearing/angle of 0° from Device's 98 centerline, which if needed may be converted, calculated, determined, or estimated as Device's 98 coordinates of [0, 0, 0]. Device's 98 condition may be detected or determined as stationary. Device's 98 shape may be detected or determined and stored in file s1.dsw. Object 615*a* may be detected as a gate. Object 615*a* may be detected at a distance of 1.2 m from Device 98 and at a bearing/angle of 41° from Device's 98 centerline, which if needed may be converted, calculated, determined, or estimated as Object's 615 relative coordinates of [0.8, 0.9, 0]. Object's 615*a* condition may be detected as closed. Object's 615*a* shape may be detected and stored in file s2.dsw.

As shown for example in FIG. 4C, Object Processing Unit 115 may generate or create Collection of Object Representations 525 including Object Representation 625*x* representing Device 98 or state of Device 98, and Object Representation 625*a* representing Object 615*a* or state of Object 615*a*. For instance, Object Representation 625*x* may include Object Property 630*xa* "Self" in Field 635*xa* "Type", Object Property 630*xb* "Om" in Field 635*xb* "Distance", Object Property 630*xc* "0°" in Field 635*xc* "Bearing", Object Property 630*xd* "Stationary" in Field 635*xd* "Condition", Object Property 630*xe* "s1.dsw" in Field 635*xe* "Shape", etc. Also, Object Representation 625*a* may include Object Property 630*aa* "Gate" in Field 635*aa* "Type", Object Property 630*ab* "1.2 m" in Field 635*ab* "Distance", Object Property 630*ac* "41°" in Field 635*ac* "Bearing", Object Property 630*ad* "Closed" in Field 635*ad* "Condition", Object Property 630*ae* "s2.dsw" in Field 635*ae* "Shape", etc. Concerning distance, any unit of linear measure (i.e. inches, feet, yards, etc.) can be used instead of or in addition to meters. Concerning bearing/angle, any unit of angular measure (i.e. radian, etc.) can be used instead of or in addition to degrees. Furthermore, the aforementioned bearing/angle measurement where the bearing/angle starts from the forward of Device's 98 centerline and advances clockwise (as shown) is described merely as an example of a variety of possible implementations, and other bearing/angle measurements such as starting at right of Device's 98 lateral centerline and advancing counter clockwise (not shown), dividing the space into quadrants of 0°-90° and measuring angles in the quadrants (not shown), and/or others can be utilized in alternate implementations. Concerning condition, any symbolic, numeric, and/or other representation of a condition of Object 615 and/or Device 98 can be used. In one example, a condition of a gate Object 615*a* may be detected and stored as closed, open, partially open, 20% open, 0.2, 55% open, 0.55, 78% open, 0.78, 15 cm open, 15, 39 cm open, 39, 85 cm open, 85, etc. In another example, a condition of Device 98 may be detected and stored as stationary/still, 0, moving, 1, moving at 4 m/hr speed, 4, moving 85 cm, 85, open, closed, etc. In some aspects, condition of Object 615*a* and/or Device 98 may be represented or implied in the Object's 615*a* and/or Device's 98 shape or model (i.e. 3D model, 2D model, etc.), in which case condition as a distinct object property can be optionally omitted. Concerning shape, any symbolic, numeric, mathematical, modeled, pictographic, computer, and/or other representation of a shape of Object 615*a* and/or Device 98 can be used. In one example, shape of a gate Object 615*a* can be detected and stored as a 3D or 2D model of the gate Object 615*a*. In another example, shape of a gate Object 615*a* can be detected and stored as a digital picture of the gate Object 615*a*. In one example, shape of Device 98 can be detected and stored as a 3D or 2D model of Device 98. In another example, shape of Device 98 can be detected and stored as a digital picture of Device 98. In general, Collection of Object Representations 525 may include one or more Object Representations 625 (i.e. one for each Object 615 and/or Device 98, etc.) or one or more references to one or more Object Representations 625 (i.e. one for each Object 615 and/or Device 98, etc.), and/or other elements or information. It should be noted that Object Representation 625 representing Device 98 or state of Device 98 may not be needed in some embodiments and can be optionally omitted from Collection of Object Representations 525 in any embodiment that does not need it, as applicable. In some designs where Collection of Object Representations 525 includes a single Object Representation 625 or a single reference to Object Representation 625 (i.e.

in a case where Device 98 manipulates a single Object 615, etc.), Collection of Object Representations 525 as an intermediary holder can optionally be omitted, in which case any features, functionalities, and/or embodiments described with respect to Collection of Object Representation 525 can be used on/by/with/in Object Representation 625. In general, Object Representation 625 may include one or more Object Properties 630 or one or more references to one or more Object Properties 630, and/or other elements or information. Any features, functionalities, and/or embodiments of Camera 92*a*/Picture Recognizer 117*a*, Microphone 92*b*/Sound Recognizer 117*b*, Lidar 92*c*/Lidar Processing Unit 117*c*, Radar 92*d*/Radar Processing Unit 117*d*, Sonar 92*e*/Sonar Processing Unit 117*e*, their combinations, and/or other elements or techniques, and/or those known in art, can be utilized for detecting or recognizing Object 615*a*, its states, and/or its properties (i.e. location [i.e. distance and bearing/angle, coordinates, etc.], condition, shape, etc.) and/or Device 98, its states, and/or its properties. Any other Objects 615, their states, and/or their properties can be detected and stored.

As shown for example in FIG. 4D, Object Processing Unit 115 may generate or create Collection of Object Representations 525 including Object Representation 625*x* representing Device 98 or state of Device 98, and Object Representation 625*a* representing Object 615*a* or state of Object 615*a*. For instance, Object Representation 625*x* may include Object Property 630*xa* "Self" in Field 635*xa* "Type", Object Property 630*xb* "[0, 0, 0]" in Field 635*xb* "Coordinates", Object Property 630*xc* "Stationary" in Field 635*xc* "Condition", Object Property 630*xd* "s1.dsw" in Field 635*xd* "Shape", etc. Also, Object Representation 625*a* may include Object Property 630*aa* "Gate" in Field 635*aa* "Type", Object Property 630*ab* "[0.8, 0.9, 0]" in Field 635*ab* "Coordinates", Object Property 630*ac* "Closed" in Field 635*ac* "Condition", Object Property 630*ad* "s2.dsw" in Field 635*ad* "Shape", etc.

In some embodiments, Object's 615*a* location may be defined by distance and bearing/angle from Device 98, coordinates (i.e. relative coordinates relative to Device 98, absolute coordinates, etc.), and/or other techniques. For physical objects, Object's 615*a* location may be readily obtained by obtaining Object's 615*a* distance and bearing/angle from Sensors 92 and/or Object Processing Unit 115 as previously described. It should be noted that, in some embodiments, Object's 615*a* location defined by distance and bearing/angle can be converted into Object's 615*a* location defined by coordinates (i.e. relative coordinates relative to Device 98, absolute coordinates, etc.), and vice versa, as these are different techniques for representing a same location. Therefore, in some aspects, Object's 615*a* location defined by distance and bearing/angle and Object's 615*a* location defined by coordinates are logical equivalents. As such, they may be used interchangeably herein depending on context. For example, Object's 615*a* distance of 1.2 m and bearing/angle of 41° relative to Device 98 can be converted, calculated, determined, or estimated to be Object's 615*a* coordinates [0.8, 0.9, 0] relative to Device 98 using trigonometry, Pythagorean theorem, linear algebra, geometry, and/or other techniques. It should also be noted that the disclosed systems, devices, and methods are independent of the technique used to represent location of Device 98, Objects 615, and or other elements. In some embodiments, Object's 615*a* distance and bearing/angle from Device 98 detected using various Sensors 92 and/or Object Processing Unit 115 can be stored as Object Properties 630 in Object Representation 625*a* and used for location and/or spatial processing. In other embodiments, Object's 615*a* distance and bearing/angle from Device 98 detected using various Sensors 92 and/or Object Processing Unit 115 can be converted into Object's 615*a* relative coordinates relative to Device 98, stored as Object Property 630 in Object Representation 625*a*, and used for location and/or spatial processing. In further embodiments, both Object's 615*a* distance and bearing/angle as well as Object's 615*a* coordinates can be used. In further embodiments, Object's 615*a* absolute coordinates detected by Object's 615*a* GPS or other geo-location device/system can be stored as Object Property 630 in Object Representation 625*a*, and used for location and/or spatial processing. In further embodiments, concerning location (i.e. whether defined by distance and bearing/angle, or coordinates, etc.), Object's 615*a* location can be defined using the lowest point on Object's 615*a* centerline and/or using any point on or within Object 615*a*. In general, any location representation or technique, and/or those known in art, can be included as Object Properties 630 in Object Representations 625 and/or used for location and/or spatial processing. The aforementioned location techniques similarly apply to Device 98 and its location Object Property 630.

In some embodiments, Collection of Object Representations 525 does not need to include Object Representations 625 of all detected Objects 615. In other embodiments, Collection of Object Representations 525 does not need to include Object Representation 625 of Device 98. In some aspects, Collection of Object Representations 525 may include Object Representations 625 representing significant Objects 615, Objects 615 needed for the learning process, Objects 615 needed for the use of artificial knowledge process, Objects 615 that the system is focusing on, and/or other Objects 615. In one example, Collection of Object Representations 525 includes a single Object Representation 625 representing a manipulated Object 615. In another example, Collection of Object Representations 525 includes two Object Representations 625, one representing Device 98 and the other representing a manipulated Object 615. In a further example, Collection of Object Representations 525 includes two Object Representations 625, one representing a manipulating Object 615 and the other representing a manipulated Object 615. In general, Collection of Object Representations 525 may include any number of Object Representations 625 representing any number of Objects 615, Device 98, and/or other elements or information. In some designs, Object Representation 625 can be used instead of Collection of Object Representations 525 (i.e. where representation of a single Object 615 or Device 98 is needed, etc.). In further embodiments, a stream of Collections of Object Representations 525 can be used instead of Collection of Object Representations 525. In further embodiments, a stream of Object Representations 625 can be used instead of Collection of Object Representations 525. Any features, functionalities, operations, and/or embodiments described with respect to Collection of Object Representations 525 may similarly apply to Object Representation 625, stream of Collections of Object Representations 525, or stream of Object Representations 625.

Figure 5A:
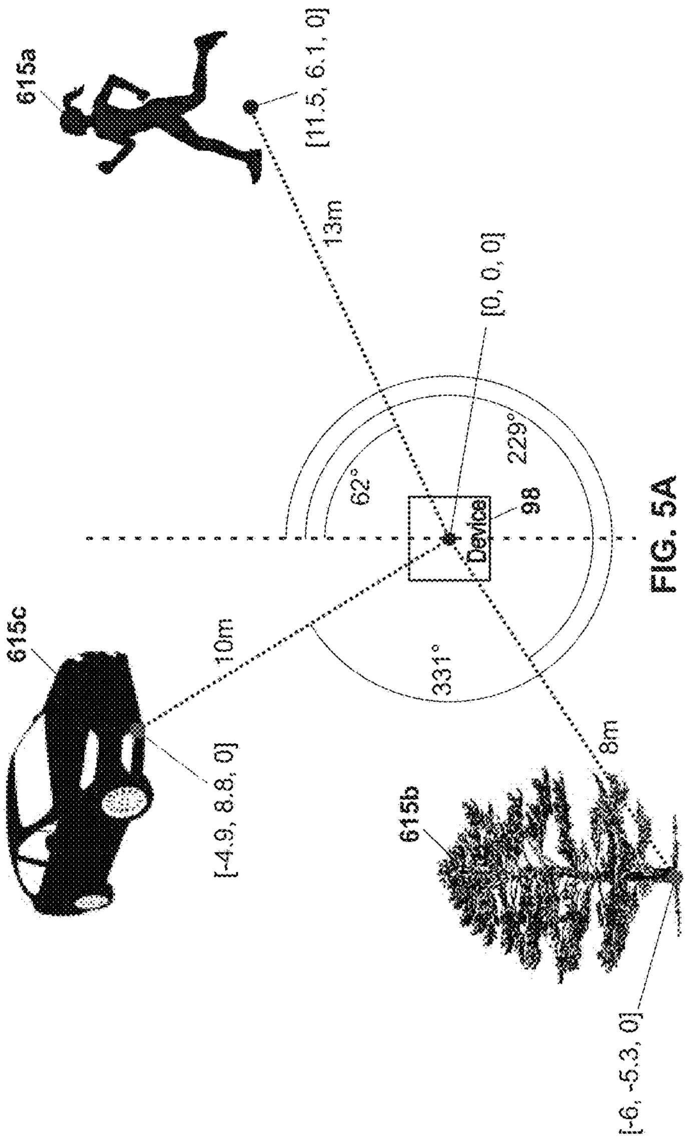
FIG. 5A-5B illustrate an exemplary embodiment of a plurality of Objects 615 detected in Device's 98 surrounding and corresponding embodiment of Collection of Object Representations 525.
Figure 5B:
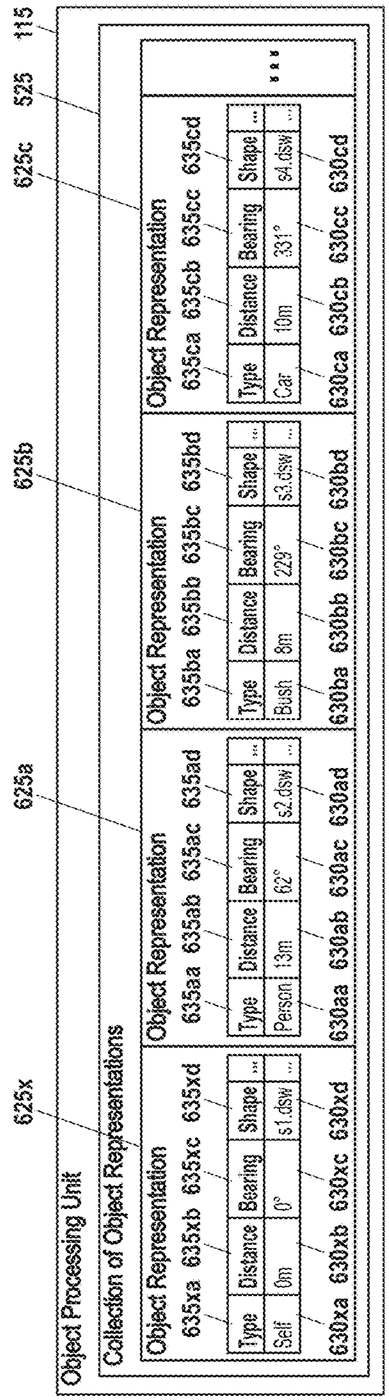

Referring to FIG. 5A-5B, an exemplary embodiment of a plurality of Objects 615 detected in Device's 98 surrounding and corresponding embodiment of Collection of Object Representations 525 are illustrated.

As shown for example in FIG. 5A, Device 98 detects Object 615*a*. Device 98 may be defined to be relative origin at a distance of 0m from Device 98 and at a bearing/angle of 0° from Device's 98 centerline, which if needed may be converted, calculated, determined, or estimated as Device's 98 coordinates of [0, 0, 0]. Device's 98 shape may be detected or determined and stored in file s1.dsw. Object 615*a* may be detected as a person. Object 615*a* may be detected at a distance of 13 m from Device 98. Object 615*a* may be detected at a bearing/angle of 62° from Device's 98 centerline. Object's 615*a* shape may be detected and stored in file s2.dsw. Furthermore, Device 98 detects Object 615*b*. Object 615*b* may be detected as a bush. Object 615*b* may be detected at a distance of 8 m from Device 98. Object 615*b* may be detected at a bearing/angle of 229° from Device's 98 centerline. Object's 615*b* shape may be detected and stored in file s3.dsw. Furthermore, Device 98 detects Object 615*c*. Object 615*c* may be detected as a car. Object 615*c* may be detected at a distance of 10 m from Device 98. Object 615*c* may be detected at a bearing/angle of 331° from Device's 98 centerline. Object's 615*c* shape may be detected and stored in file s4.dsw.

As shown for example in FIG. 5B, Object Processing Unit 115 may generate or create Collection of Object Representations 525 including Object Representation 625*x* representing Device 98 or state of Device 98, Object Representation 625*a* representing Object 615*a* or state of Object 615*a*, Object Representation 625*b* representing Object 615*b* or state of Object 615*b*, and Object Representation 625*c* representing Object 615*c* or state of Object 615*c*. For instance, Object Representation 625*x* may include Object Property 630*xa* "Self" in Field 635*xa* "Type", Object Property 630*xb* "0m" in Field 635*xb* "Distance", Object Property 630*xc* "0°" in Field 635*xc* "Bearing", Object Property 630*xd* "s1.dsw" in Field 635*xd* "Shape", etc. Also, Object Representation 625*a* may include Object Property 630*aa* "Person" in Field 635*aa* "Type", Object Property 630*ab* "13 m" in Field 635*ab* "Distance", Object Property 630*ac* "62°" in Field 635*ac* "Bearing", Object Property 630*ad* "s2.dsw" in Field 635*ad* "Shape", etc. Also, Object Representation 625*b* may include Object Property 630*ba* "Bush" in Field 635*ba* "Type", Object Property 630*bb* "8 m" in Field 635*bb* "Distance", Object Property 630*bc* "229°" in Field 635*bc* "Bearing", Object Property 630*bd* "s3.dsw" in Field 635*bd* "Shape", etc. Also, Object Representation 625*c* may include Object Property 630*ca* "Car" in Field 635*ca* "Type", Object Property 630*cb* "10 m" in Field 635*cb* "Distance", Object Property 630*cc* "331°" in Field 635*cc* "Bearing", Object Property 630*cd* "s4.dsw" in Field 635*cd* "Shape", etc. It should be noted that, although, Objects' 615 locations defined by relative coordinates relative to Device 98 and/or Objects' 615 locations defined by absolute coordinates may not be shown in this and at least some of the remaining figures nor recited in at least some of the remaining text for clarity, Objects' 615 locations defined by relative coordinates relative to Device 98 and/or Objects' 615 locations defined by absolute coordinates can be included in Object Properties 630 and/or used instead of, in addition to, or in combination with Objects' 615 locations defined by distance and bearing/angle relative to Device 98.

In some embodiments, one or more digital pictures of one or more Objects 615 may solely be used as one or more Object Representations 625 in which case Object Representations 625 as the intermediary holder can be optionally omitted. In other embodiments, one or more digital pictures of one or more Objects 615 may be used as one or more Object Properties 630 in one or more Object Representations 625.

Figure 6:
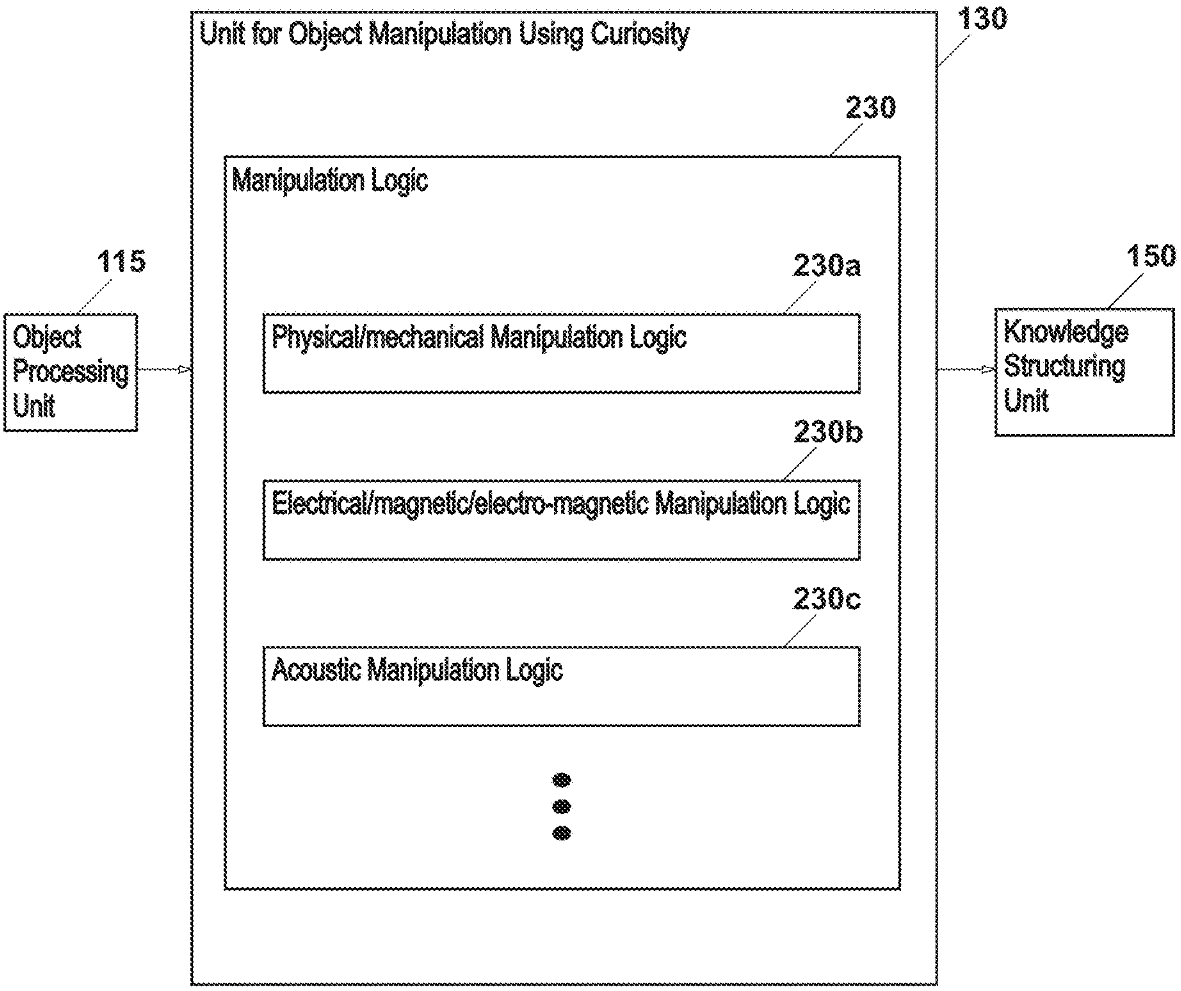
FIG. 6 illustrates an embodiment of Unit for Object Manipulation Using Curiosity 130.

Referring to FIG. 6, an embodiment of Unit for Object Manipulation Using Curiosity 130 is illustrated. Unit for Object Manipulation Using Curiosity 130 comprises functionality for causing Device's 98 manipulations of one or more Objects 615 (i.e. physical objects, etc.) using curiosity, and/or other functionalities. As curiosity includes an interest or desire to learn or know about something (i.e. as defined in English dictionary, etc.), Unit for Object Manipulation Using Curiosity 130 enables Device 98 with an interest or desire to learn its surrounding including Objects 615 in the surrounding. In some embodiments, one or more Objects 615, their states, and/or their properties can be detected by Sensor 92 and/or Object Processing Unit 115, and provided as one or more Collections of Object Representations 525 to Unit for Object Manipulation Using Curiosity 130. Unit for Object Manipulation Using Curiosity 130 may then select or determine Instruction Sets 526 to be used or executed in Device's 98 manipulations of the one or more detected Objects 615 using curiosity. In some aspects, Unit for Object Manipulation Using Curiosity 130 may provide such Instruction Sets 526 to Instruction Set Implementation Interface 180 for execution or implementation. In other aspects, Unit for Object Manipulation Using Curiosity 130 may include any features, functionalities, and/or embodiments of Instruction Set Implementation Interface 180, in which case Unit for Object Manipulation Using Curiosity 130 can execute or implement such Instruction Sets 526. Unit for Object Manipulation Using Curiosity 130 may provide such Instruction Sets 526 to Knowledge Structuring Unit 150 for knowledge structuring. Therefore, Unit for Object Manipulation Using Curiosity 130 can utilize curiosity to enable Device's 98 manipulations of one or more Objects 615 and/or learning knowledge related thereto. Unit for Object Manipulation Using Curiosity 130 may include any hardware, programs, or combination thereof.

Unit for Object Manipulation Using Curiosity 130 may include one or more Manipulation Logics 230 such as Physical/mechanical Manipulation Logic 230*a*, Electrical/magnetic/electro-magnetic Manipulation Logic 230*b*, Acoustic Manipulation Logic 230*c*, and/or others. Manipulation Logic 230 comprises functionality for selecting or determining Instruction Sets 526 to be used or executed in Device's 98 manipulations of one or more Objects 615 using curiosity, and/or other functionalities. In some designs, Manipulation Logic 230 may include or be provided with Instruction Sets 526 for operating Device 98 and/or elements thereof. Manipulation Logic 230 may select or determine one or more of such Instruction Sets 526 to be used or executed in Device's 98 manipulations of one or more Objects 615 using curiosity. Such Instruction Sets 526 may provide control over Device's 98 elements such as movement elements (i.e. legs, wheels, etc.), manipulation elements (i.e. robotic arm Actuator 91, etc.), transmitters (i.e. radio transmitter, light transmitter, horn, etc.), sensors (i.e. Camera 92*a*, Microphone 92*b*, Lidar 92*c*, Radar 92*d*, Sonar 92*e*, etc.), and/or others. Hence, such Instruction Sets 526 may enable Device 98 to perform various operations such as movements, manipulations, transmissions, detections, and/or others that may facilitate herein-disclosed functionalities. In some aspects, such Instruction Sets 526 may be part of or be stored (i.e. hardcoded, etc.) in Manipulation Logic 230. In other aspects, such Instruction Sets 526 may be stored in Memory 12 or other repository where Manipulation Logic 230 can access the Instruction Sets 526. In further aspects, such Instruction Sets 526 may be stored in other elements where Manipulation Logic 230 can access the Instruction Sets 526 or that can provide the Instruction Sets 526 to Manipulation Logic 230. In some aspects, Manipulation Logic's 230 selecting or determining Instruction Sets 526 to be used or executed in Device's 98 manipulations of one or more Objects 615 using curiosity may include selecting or determining Instruction Sets 526 that can cause Device 98 to perform curious, experimental, inquisitive, and/or other manipulations of the one or more Objects 615. Such selecting/determining and/or manipulations may include an approach similar to an experiment (i.e. trial and analysis, etc.), inquiry, and/or other approach. In other aspects, Manipulation Logic's 230 selecting or determining Instruction Sets 526 to be used or executed in Device's 98 manipulations of one or more Objects 615 using curiosity may include selecting or determining Instruction Sets 526 randomly, in some order (i.e. Instruction Sets 526 stored/received first are used first, Instruction Sets 526 for physical/mechanical manipulations are used first, etc.), in some pattern, or using other techniques. In further aspects, Manipulation Logic's 230 selecting or determining Instruction Sets 526 to be used or executed in Device's 98 manipulations of one or more Objects 615 using curiosity may include selecting or determining Instruction Sets 526 that can cause Device 98 to perform manipulations of the one or more Objects 615 that are not programmed or pre-determined to be performed on the one or more Objects 615. In further aspects, Manipulation Logic's 230 selecting or determining Instruction Sets 526 to be used or executed in Device's 98 manipulations of one or more Objects 615 using curiosity may include selecting or determining Instruction Sets 526 that can cause Device 98 to perform manipulations of the one or more Objects 615 to discover an unknown state of the one or more Objects 615. In general, Manipulation Logic's 230 selecting or determining Instruction Sets 526 to be used or executed in Device's 98 manipulations of one or more Objects 615 using curiosity may include selecting or determining Instruction Sets 526 that can cause Device 98 to perform manipulations of the one or more Objects 615 to enable learning of how one or more Objects 615 can be used, how one or more Objects 615 can be manipulated, how one or more Objects 615 react to manipulations, and/or other aspects or information related to one or more Objects 615. Therefore, Manipulation Logic's 230 selecting or determining Instruction Sets 526 to be used or executed in Device's 98 manipulations of one or more Objects 615 using curiosity enables learning Device's 98 manipulations of one or more Objects 615 using curiosity. Manipulation Logic 230 may include any logic, functions, algorithms, and/or other elements that enable selecting or determining Instruction Sets 526 to be used or executed in Device's 98 manipulations of one or more Objects 615 using curiosity. Since Device 98 and Objects 615 may exist in the physical world, a reference to Device 98 includes a reference to a physical device and a reference to Object 615 includes a reference to a physical object.

In one example, Physical/mechanical Manipulation Logic 230*a* may include or be provided with Instruction Sets 526 for touching, pushing, pulling, lifting, dropping, gripping, twisting/rotating, squeezing, moving, and/or performing other physical or mechanical manipulations. Physical/mechanical Manipulation Logic 230*a* may select or determine any one or more of the Instruction Sets 526 to enable Device's 98 physical or mechanical manipulations of one or more Objects 615 using curiosity. Specifically, for instance, Physical/mechanical Manipulation Logic 230*a* may include the following code:

```
detectedObjects=detectObjects ( )//detect objects in the
   surrounding and store them in detectedObjects array
   doPhysicalMechanicalManipulations (detectedObjects) {//manipulate objects in detectedObjects array
   for (int i=0; i<detectedObjects. length; i++) {
   Device.approachObjectAtDistance (detectedObjects
      [i], 0.3);//approach object at 0.3 meters
   Device.Arm.touch (detectedObjects [i]);//instruction
      set for a touch manipulation
   Device.Arm.push (detectedObjects [i]);//instruction set
      for a push manipulation
   Device.Arm.pull (detectedObjects [i]);//instruction set
      for a pull manipulation
   Device.Arm. lift (detectedObjects [i]);//instruction set
      for a lift manipulation
   Device.Arm.drop (detectedObjects [i]);//instruction set
      for a drop manipulation
   Device.Arm.grip (detectedObjects [i]);//instruction set
      for a grip manipulation
   Device.Arm.twist (detectedObjects [i]);//instruction set
      for a twist manipulation
   Device.Arm.squeeze (detectedObjects [i]);//instruction
      set for a squeeze manipulation
   Device.Arm.move (detectedObjects [i]);//instruction
      set for a move manipulation
   . . .
   }
}
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

In another example, Electrical/magnetic/electro-magnetic Manipulation Logic 230*b* may include or be provided with Instruction Sets 526 for stimulating with an electric charge, stimulating with a magnetic field, stimulating may select or determine any one or more of the Instruction Sets 526 to enable Device's 98 electrical, magnetic, or electro-magnetic manipulations of one or more Objects 615 using curiosity. Specifically, for instance, Electrical/magnetic/electro-magnetic Manipulation Logic 230*b* may include the following code:

```
detectedObjects=detectObjects ( )//detect objects in the
   surrounding and store them in detectedObjects array do
   ElectricalMagneticManipulations (detectedObjects)
   {//manipulate objects in detectedObjects array for (int
   i=0; i<detectedObjects.length; i++) {
   Device.ETransmitter.stimulate (detectedObjects [i]);//
      instruction set for an electrical manipulation
   Device.MTransmitter.stimulate (detectedObjects [i]);//
      instruction set for a magnetic manipulation
   Device.EMTransmitter.stimulate (detectedObjects
      [i]);//instruction set for an electro-magnetic manipulation
   Device.RTransmitter.stimulate (detectedObjects [i]);//
      instruction set for a radio manipulation
   Device.Light.stimulate (detectedObjects [i]);//instruction set for a manipulation with light
   . . .
   }
}
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

In a further example, Acoustic Manipulation Logic 230*c* may include or be provided with Instruction Sets 526 for stimulating with sound and/or performing other acoustic manipulations. Acoustic Manipulation Logic 230*c* may select or determine any one or more of the Instruction Sets 526 to enable Device's 98 acoustic manipulations of one or more Objects 615 using curiosity. Specifically, for instance, Acoustic Manipulation Logic 230*c* may include the following code:

```
detectedObjects=detectObjects ( )//detect objects in the surrounding and store them in detectedObjects array
  doAcousticManipulations (detectedObjects) {//manipulate objects in detectedObjects array for (int i=0; i<detectedObjects.length; i++) {
  Device.Horn.stimulate (detectedObjects [i]);//instruction set for an acoustic manipulation
  . . .
  }
}
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

One of ordinary skill in art will understand that the aforementioned codes are provided merely as examples of a variety of possible implementations of Manipulation Logics 230, and that while all possible implementations of Manipulation Logics 230 are too voluminous to describe, other implementations of Manipulation Logics 230 are within the scope of this disclosure. For example, other additional functions or code can be included as needed, or some of the disclosed ones can be excluded or altered, or a combination thereof can be utilized in alternate implementations. One or ordinary skill in art will also understand that any of the aforementioned codes can be implemented in programs, hardware, or combination of programs and hardware. In some aspects, Instruction Sets 526 for manipulating Objects 615 in the aforementioned codes include references to functions that may include more detailed Instruction Sets 526, code or functions for implementing a particular manipulation. For instance, Instruction Set 526 Device. Arm.touch (detectedObjects [i]) for touching a detected Object 615 may include the following detailed Instruction Sets 526, which one of ordinary skill in art understands how to implement:

```
distance ToObject=detectDistance ToObject (detectedObjects [i]);
bearing ToObject=detectBearing ToObject (detectedObjects [i]);
Device.Arm.move ToPoint (distance ToObject, bearing ToObject);
. . .
```

In other aspects, Instruction Sets 526 for manipulating Objects 615 in the aforementioned codes can be selected or determined randomly, in some order (i.e. first ones listed are selected first, etc.), or in some pattern (i.e. every third one is select first, etc.). For instance, random selection of Instruction Sets 526 for physical or mechanical manipulations of one or more Objects 615 may include the following code:

```
int randomIndex=new Random ( ) nextInt (9)+1;
switch (randomIndex)
{
case 1: Device.Arm.touch (detectedObjects [i]); break;//instruction set for a touch manipulation
case 2: Device.Arm.push (detectedObjects [i]); break;//instruction set for a push manipulation
case 3: Device.Arm.pull (detectedObjects [i]); break;//instruction set for a pull manipulation
case 4: Device.Arm. lift (detectedObjects [i]); break;//instruction set for a lift manipulation
case 5: Device.Arm.drop (detectedObjects [i]); break;//instruction set for a drop manipulation
case 6: Device.Arm.grip (detectedObjects [i]); break;//instruction set for a grip manipulation
case 7: Device.Arm.twist (detectedObjects [i]); break;//instruction set for a twist manipulation
case 8: Device.Arm.squeeze (detectedObjects [i]); break;//instruction set for a squeeze manipulation
case 9: Device.Arm.move (detectedObjects [i]); break;//instruction set for a move manipulation
}
. . .
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

In further aspects, any of the Instruction Sets 526 or functions for performing specific manipulation (i.e. touch, push, radio manipulation, acoustic manipulation, etc.) may include code for performing variations of the specific manipulation (i.e. touching in various places, pushing to various distances, stimulating with various radio frequencies, stimulating with various sounds, etc.). One of ordinary skill in art understands that such variations of a specific manipulation may be implemented by changing one or more parameters and/or other aspects of a manipulation function, relocating Device 98, and/or using other techniques. In further aspects, although, the aforementioned manipulations are described with respect to manipulating single Objects 615 at a time, similar manipulations can be performed on more than one Object 615 at a time (i.e. pushing multiple Objects 615, stimulating multiple Objects 615 with light, stimulating multiple Objects 615 with sound, etc.). In general, any of the aforementioned or other Manipulation Logics 230 may include or be provided with any Instruction Sets 526 for performing any manipulations of one or more Objects 615 and Manipulation Logics 230 may select or determine any one or more of the Instruction Sets 526. In some designs, Manipulation Logic 230 can generate, infer by reasoning, learn, and/or attain by other techniques Instruction Sets 526 to be used or executed in Device's 98 manipulations of one or more Objects 615 using curiosity. Any of the disclosed example code applicable to Device 98, Objects 615, and/or other elements may similarly by used as example code applicable to Avatar 605, Objects 616, and/or other elements. For instance, references to Device in any of the disclosed example code applicable to Device 98, Objects 615, and/or other elements may be replaced with references to Avatar to implement code for use with respect to Avatar 605, Objects 616, and/or other elements. Manipulation Logic 230 may include any hardware, programs, or combination thereof.

In some embodiments, Unit for Object Manipulation Using Curiosity 130 may cause Device 98 to perform physical or mechanical manipulations of one or more Objects 615 using curiosity examples of which include touching, pushing, pulling, lifting, dropping, gripping, twisting/rotating, squeezing, moving, and/or others. Unit for Object Manipulation Using Curiosity 130 may also cause Device 98 to perform a combination of the aforementioned and/or other manipulations. It should be noted that a manipulation may include one or more manipulations as, in some designs, the manipulation may be a combination of simpler or other manipulations. In some aspects, Device's 98 physical or mechanical manipulations may be implemented by one or more Actuators 91 controlled by Unit for Object Manipulation Using Curiosity 130, and/or other processing elements. For example, Unit for Object Manipulation Using Curiosity 130 may cause Processor 11, Microcontroller 250, and/or other processing element to execute one or more Instruction Sets 526 responsive to which one or more Actuators 91 may implement Device's 98 physical or mechanical manipulations of the one or more Objects 615. Specifically, for instance, Sensor 92 may detect a gate Object 615 at a distance of 0.5 meters in front of Device 98. Physical/mechanical Manipulation Logic 230*a* may select or determine one or more Instruction Sets 526 (i.e. Device.Arm.touch (0.5, forward), etc.) to cause Device's 98 robotic arm Actuator 91 to extend forward (i.e. zero degrees bearing, etc.) 0.5 meters to touch the gate Object 615. Any push, pull, and/or other physical or mechanical manipulations of the gate Object 615 can similarly be implemented by selecting or determining one or more Instruction Sets 526 corresponding to the desired manipulation. Any Instruction Sets 526 can also be selected or determined to cause Device 98 or Device's 98 robotic arm Actuator 91 to move or adjust so that the gate Object 615 is in the range or otherwise convenient for Device's 98 robotic arm Actuator 91. Any other physical, mechanical, and/or other manipulations of the gate Object 615 or any other one or more Objects 615 can be implemented using similar approaches. In other embodiments, Unit for Object Manipulation Using Curiosity 130 may cause Device 98 to perform electrical, magnetic, or electro-magnetic manipulations of one or more Objects 615 using curiosity examples of which include stimulating with an electric charge, stimulating with a magnetic field, stimulating with an electro-magnetic signal, stimulating with a radio signal, illuminating with light, and/or others. Unit for Object Manipulation Using Curiosity 130 may also cause Device 98 to perform a combination of the aforementioned and/or other manipulations. In some aspects, Device's 98 electrical, magnetic, electro-magnetic, and/or other manipulations may be implemented by one or more transmitters (i.e. electric charge transmitter, electromagnet, radio transmitter, laser or other light transmitter, etc.; not shown) or other elements controlled by Unit for Object Manipulation Using Curiosity 130, and/or other processing elements. For example, Unit for Object Manipulation Using Curiosity 130 may cause Processor 11, Microcontroller 250, and/or other processing element to execute one or more Instruction Sets 526 responsive to which one or more transmitters may implement Device's 98 electrical, magnetic, electro-magnetic, and/or other manipulations of the one or more Objects 615. Specifically, for instance, Sensor 92 may detect a cat Object 615 in Device's 98 surrounding. Electrical/magnetic/electro-magnetic Manipulation Logic 230*b* may select or determine one or more Instruction Sets 526 (i.e. Device.light.activate (8), etc.) to cause Device's 98 light transmitter (i.e. flash light, laser array, etc.; not shown) to illuminate the cat Object 615 with light. Any Instruction Sets 526 can also be selected or determined to cause Device 98 or Device's 98 light transmitter to move or adjust so that the cat Object 615 is in the range or otherwise convenient for Device's 98 light transmitter. Any other electrical, magnetic, electro-magnetic, and/or other manipulations of the cat Object 615 or other one or more Objects 615 can be implemented using similar approaches. In further embodiments, Unit for Object Manipulation Using Curiosity 130 may cause Device 98 to perform acoustic manipulations of one or more Objects 615 using curiosity examples of which include stimulating with a sound signal, and/or others. Unit for Object Manipulation Using Curiosity 130 may also cause Device 98 to perform a combination of the aforementioned and/or other manipulations. In some aspects, Device's 98 acoustic, and/or other manipulations may be implemented by one or more transmitters (i.e. speaker, horn, etc.; not shown) or other elements controlled by Unit for Object Manipulation Using Curiosity 130, and/or other processing elements. For example, Unit for Object Manipulation Using Curiosity 130 may cause Processor 11, Microcontroller 250, and/or other processing element to execute one or more Instructions Sets 526 responsive to which one or more sound transmitters (not shown) may implement Device's 98 acoustic and/or other manipulations of the one or more Objects 615. Specifically, for instance, Sensor 92 may detect a person Object 615 in Device's 98 path. Acoustic Manipulation Logic 230*c* may select or determine one or more Instruction Sets 526 (i.e. Device.horn.activate (3), etc.) to cause Device's 98 sound transmitter (i.e. speaker, horn, etc.) to stimulate the person Object 615 with a sound. Any Instruction Sets 526 can also be selected or determined to cause Device 98 or Device's 98 sound transmitter to move or adjust so that the person Object 615 is in the range or otherwise convenient for Device's 98 sound transmitter. Any other acoustic and/or other manipulations of the person Object 615 or other one or more Objects 615 can be implemented using similar approaches. In yet further embodiments, simply approaching, retreating, relocating, or moving relative to one or more Objects 615 is considered manipulation of the one or more Objects 615. In general, manipulation includes any manipulation, operation, stimulus, and/or effect on any one or more Objects 615 or the environment.

In some aspects, Unit for Object Manipulation Using Curiosity 130 may include or be provided with no information on how one or more Objects 615 can be used and/or manipulated. For example, not knowing anything about one or more detected Objects 615, Unit for Object Manipulation Using Curiosity 130 can cause Device 98 to perform any of the aforementioned manipulations of the one or more Objects 615. Specifically, for instance, after a gate Object 615 is detected, Physical/mechanical Manipulation Logic 230*a* can select or determine Instruction Sets 526 randomly, in some order (i.e. one or more touches first, one or more pushes second, one or more pulls third, etc.), in some pattern, or using other techniques to cause Device's 98 robotic arm Actuator 91 to manipulate the gate Object 615. Furthermore, Unit for Object Manipulation Using Curiosity 130 can exhaust using one type of manipulation before implementing another type of manipulation. For example, Unit for Object Manipulation Using Curiosity 130 can cause Device 98 or its Actuator 91 to touch an Object 615 in a variety of or all possible places before implementing one or more push manipulations. In other aspects, Unit for Object Manipulation Using Curiosity 130 may include or be provided with some information on how certain Objects 615 can be used and/or manipulated. For example, when an Object 615 is detected, Unit for Object Manipulation Using Curiosity 130 can use any available information on the detected Object 615 such as object affordances, object conditions, consequential object elements (i.e. sub-objects, etc.), and/or others in deciding which manipulations to implement. Specifically, for instance, after a gate Object 615 is detected, information may be available that one of the gate Object's 615 affordances is opening and that such opening can be effected at least in part by twisting/rotating the gate Object's 615 knob, hence, Physical/mechanical Manipulation Logic 230*a* can use this information to select or determine Instructions Sets 526 to cause Device's 98 robotic arm Actuator 91 to twist/rotate the gate Object's 615 knob in opening the gate Object 615. In further aspects, Unit for Object Manipulation Using Curiosity 130 may include or be provided with general information on how certain types of Objects 615 can be used and/or manipulated. For example, when an Object 615 is detected, Unit for Object Manipulation Using Curiosity 130 can use any available general information on the Object 615 such as shape, size, and/or others in deciding which manipulations to implement. Specifically, for instance, after a circular knob on a gate Object 615 is detected, general information may be available that any circular Object 615 can be twisted/rotated, hence, Physical/mechanical Manipulation Logic 230*a* can use this information to select or determine Instructions Sets 526 to cause Device's 98 robotic arm Actuator 91 to twist/rotate the gate Object's 615 knob. In general, Unit for Object Manipulation Using Curiosity 130 may include or be provided with any information that can help Unit for Object Manipulation Using Curiosity 130 to decide which manipulations to implement. This way, Unit for Object Manipulation Using Curiosity 130 can cause Device 98 to manipulate one or more Objects 615 in a more focused manner and save time or other resources that would otherwise be spent on insignificant manipulations.

In some aspects, Unit's for Object Manipulation Using Curiosity 130 causing Device 98 to manipulate one or more Objects 615 using curiosity may resemble curious object manipulations of a child. A newborn child is genetically programmed to be curious and, instead of ignoring them, the child wants to learn his/her surrounding including objects in the surrounding. In one example, the child may grip, touch, push, or pull a closet door or parts thereof to learn that it can open the closet door by performing one or more of the attempted manipulations. In another example, the child may produce various sounds and learn that a person approaches and feeds the child. In a further example, the child may touch or push a wall to learn that the wall is solid and does not change state in response to physical manipulations. In general, the child can perform any manipulations of objects in its surrounding to learn how an object can be used, how an object can be manipulated, how an object reacts to manipulations, and/or other aspects or information related to an object. Once the knowledge is learned, it can be used by the child for accomplishing various goals or purposes. In some aspects, similar to a child being genetically programmed to be curious, an interest or desire to learn its surrounding including Objects 615 in the surrounding (i.e. curiosity, etc.) can be programmed or configured into Unit for Object Manipulation Using Curiosity 130 and/or other elements. Therefore, in some aspects, instead of ignoring one or more Objects 615, Unit for Object Manipulation Using Curiosity 130 may be configured to deliberately cause Device 98 to perform manipulations of the one or more Objects 615 with a purpose of learning related knowledge. For example, Unit for Object Manipulation Using Curiosity 130 may include the following code:

```
detectedObjects=detectObjects ( )//detect objects in the surrounding and store them in detectedObjects array if (detectedObjects.length>0) {//there is at least one object in detectedObjects array
    Device.learnUsingCuriosity (detectedObjects);//perform and learn manipulations of detected objects using curiosity
    . . .
}
learnUsingCuriosity (Object detectedObjects) {
    doPhysicalMechanicalManipulations (detectedObjects);
    do ElectricalMagneticManipulations (detectedObjects);
    doAcousticManipulations (detectedObjects);
    . . .
    }
. . .
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

One of ordinary skill in art will understand that the aforementioned code is provided merely as an example of a variety of possible implementations of code for an interest or desire to learn (i.e. curiosity, etc.), and that while all possible implementations of code for an interest or desire to learn are too voluminous to describe, other implementations of code for an interest or desire to learn are within the scope of this disclosure. For example, other additional functions or code can be included as needed, or some of the disclosed ones can be excluded or altered, or a combination thereof can be utilized in alternate implementations.

In some embodiments where multiple Objects 615 are detected, Unit for Object Manipulation Using Curiosity 130 can cause manipulations of the Objects 615 one at a time by random selection, in some order (i.e. first detected Object 615 gets manipulated first, etc.), in some pattern (i.e. large Objects 615 get manipulated first, etc.), and/or using other techniques. In other embodiments where multiple Objects 615 are detected, Unit for Object Manipulation Using Curiosity 130 can focus manipulations on one Object 615 or a group of Objects 615, and ignore other detected Objects 615. This way, learning of Device's 98 manipulations of one or more Objects 615 using curiosity can focus on one or more Objects 615 of interest. Any logic, functions, algorithms, and/or other techniques can be used in deciding which Objects 615 are of interest. For example, after detecting a gate Object 615, a bush Object 615, and a rock Object 615, Unit for Object Manipulation Using Curiosity 130 may focus on manipulations of the gate Object 615. In further embodiments, any part of Object 615 can be recognized as Object 615 itself or sub-Object 615 and Unit for Object Manipulation Using Curiosity 130 can cause Device 98 to manipulate it individually or as part of a main Object 615. In some designs, Unit for Object Manipulation Using Curiosity 130 may be configured to give higher priority to manipulations of such sub-Objects 615 as the sub-Objects 615 may be consequential in manipulating the main Object 615. In some aspects, any protruded part of a main Object 615 may be recognized as sub-Object 615 of the main Object 615 that can be manipulated with priority. For example, a knob or lever sub-Object 615 of a gate Object 615 may be manipulated with priority. In further embodiments, Unit for Object Manipulation Using Curiosity 130 may cause Device 98 to manipulate one or more Objects 615 that can result in the one or more Objects 615 manipulating another one or more Objects 615. For example, Unit for Object Manipulation Using Curiosity 130 may cause Device 98 to emit a sound signal that can result in a person or other Object 615 coming and opening a gate Object 615 so Device 98 can go through it (i.e. similar to a cat meowing to have someone come and open a door for the cat, etc.). In further embodiments, as some manipulations of one or more Objects 615 using curiosity may not result in changing a state of the one or more Objects 615, the system may be configured to focus on learning manipulations of one or more Objects 615 using curiosity that result in changing a state of the one or more Objects 615. Still, knowledge of some or all manipulations of one or more Objects 615 using curiosity that do not result in changing a state of the one or more Objects 615 may be useful and can be learned by the system. In further embodiments, Unit for Object Manipulation Using Curiosity 130 or elements thereof (i.e. Manipulation Logics 230, etc.) may select or determine Instruction Sets 526 for Device's 98 manipulations of one or more Objects 615 using curiosity and cause Device Control Program **18*a* (later described) to implement or execute the Instruction Sets 526. Any features, functionalities, and/or embodiments of Instruction Set Implementation Interface 180 can be used in such causing of implementation or execution. In some aspects, as learning Device's 98 manipulation of one or more Objects 615 using curiosity may include various elements and/or steps (i.e. selecting or determining Instruction Sets 526 for performing the manipulation, executing Instruction Sets 526 for performing the manipulation, performing the manipulation by Device 98, and/or others, etc.), the elements and/or steps utilized in learning Device's 98 manipulation of one or more Objects 615 using curiosity may also use curiosity. Also, in some aspects, a manipulation may include not only the act of manipulating, but also, a state of one or more Objects 615 before the manipulation and a state of one or more Objects 615 after the manipulation. In further aspects, any of the functionalities of Unit for Object Manipulation Using Curiosity 130 may be performed autonomously and/or proactively. One of ordinary skill in art will understand that the aforementioned elements and/or techniques related to Unit for Object Manipulation Using Curiosity 130 are described merely as examples of a variety of possible implementations, and that while all possible elements and/or techniques related to Unit for Object Manipulation Using Curiosity 130 are too voluminous to describe, other elements and/or techniques are within the scope of this disclosure. For example, other additional elements and/or techniques can be included as needed, or some of the disclosed ones can be excluded or altered, or a combination thereof can be utilized in alternate embodiments of Unit for Object Manipulation Using Curiosity 130**.

Contrasting a device that does not use curiosity and LTCUAK-enabled Device 98 that uses curiosity may be helpful in understanding the disclosed systems, devices, and methods. In some aspects of contrasting the two, a device that does not use curiosity is programmed to ignore certain Objects 615 and simply does not have an interest or desire to learn about the Objects 615. For example, an automatic lawn mower that does not use curiosity may detect a gate Object 615 and not have any interest or desire to learn about the gate Object 615 since it is not programmed to perform any operations on/with the gate Object 615, let alone learn about the gate Object 615. Conversely, LTCUAK-enabled Device 98 that uses curiosity is enabled with an interest or desire to learn its surrounding including Objects 615 in the surrounding. For example, LTCUAK-enabled lawn mower Device 98 may detect a gate Object 615 and perform curious, inquisitive, experimental, and/or other manipulations of the gate Object 615 (i.e. use curiosity, etc.) to learn how the gate Object 615 can be used, learn how the gate Object 615 can be manipulated, learn how the gate Object 615 reacts to manipulations, and/or learn other aspects or information related to the gate Object 615. Once learned, any device can use such knowledge (i.e. artificial knowledge) to enable additional functionalities that the device did not have or was not programmed to have. In other aspects of contrasting a device that does not use curiosity and LTCUAK-enabled Device 98 that uses curiosity, a device that does not use curiosity is programmed to perform a specific operation on/with a specific Object 615. Since it is programmed to perform a specific operation on a specific Object 615, the device knows what can be done on/with the Object 615, knows how the Object 615 can be operated, and knows/expects subsequent/resulting state of the Object 615 following an operation. For example, an automatic lawn mower that does not use curiosity may detect a gate Object 615, know that the gate Object 615 can be opened (i.e. known use, etc.), know how to open the gate Object 615 (i.e. known operation, etc.), and know/expect the subsequent/resulting open state (i.e. known subsequent/resulting state, etc.) of the gate Object 615 following an opening operation. Therefore, the automatic lawn mower does not use curiosity and no learning results from its opening of the gate Object 615 (i.e. it simply does what it is programmed to do). Conversely, LTCUAK-enabled Device 98 that uses curiosity is enabled with an interest or desire to learn its surrounding including Objects 615 in the surrounding. Since it is enabled with an interest or desire to learn about an Object 615, LTCUAK-enabled Device 98 may not know what can be done on/with the Object 615, may not know how the Object 615 can be manipulated, and may not know subsequent/resulting state of the Object 615 following a manipulation. For example, LTCUAK-enabled lawn mower Device 98 that uses curiosity may detect a gate Object 615, not know that the gate Object 615 can be opened (i.e. unknown use, etc.), not know how to open the gate Object 615 (i.e. unknown manipulation, etc.), and not know the subsequent/resulting open state (i.e. unknown subsequent/resulting state, etc.) of the gate Object 615 following an opening manipulation. Therefore, the LTCUAK-enabled lawn mower Device 98 may perform curious, inquisitive, experimental, and/or other manipulations of the gate Object 615 (i.e. use curiosity, etc.) to learn how the gate Object 615 can be used, learn how the gate Object 615 can be manipulated, learn how the gate Object 615 reacts to manipulations, and/or learn other aspects or information related to the gate Object 615.

Figure 7:
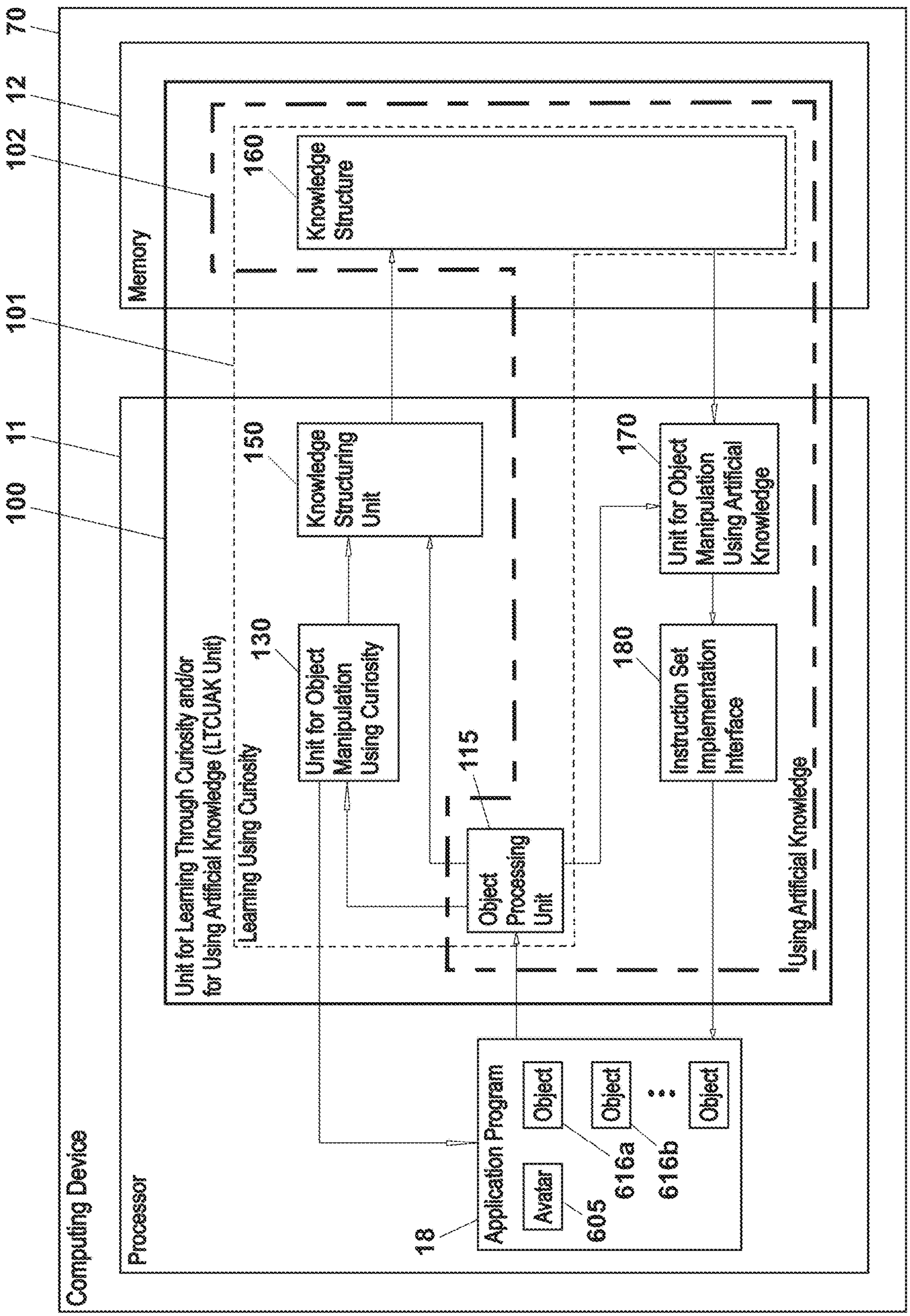
FIG. 7 illustrates an embodiment of Unit for Learning Through Curiosity and/or for Using Artificial Knowledge 100 providing its functionalities to Application Program 18 and/or elements (i.e. Avatar 605, etc.) thereof.

Referring to FIG. 7, an embodiment of Computing Device 70 comprising Unit for Learning Through Curiosity and/or for Using Artificial Knowledge (LTCUAK Unit 100) is illustrated. Computing Device 70 further comprises Processor 11 and Memory 12. Processor 11 includes or executes Application Program 18 comprising Avatar 605 and/or one or more Objects 616 (i.e. computer generated objects, etc.; later described). Although not shown for clarity of illustration, any portion of Application Program 18, Avatar 605, Objects 616, and/or other elements can be stored in Memory 12. LTCUAK Unit 100 comprises functionality for causing Avatar's 605 manipulations of one or more Objects 616 (i.e. computer generated objects, etc.; later described) using curiosity. LTCUAK Unit 100 comprises functionality for learning Avatar's 605 manipulations of one or more Objects 616 using curiosity. LTCUAK Unit 100 comprises functionality for causing Avatar's 605 manipulations of one or more Objects 616 using the learned knowledge (i.e. artificial knowledge, etc.). LTCUAK Unit 100 may comprise other functionalities.

Avatar 605 (also may be referred to as avatar, computer generated avatar, avatar of an application, avatar of an application program, and/or other suitable name or reference, etc.) may be or comprise an object generated by a computer or machine. Avatar 605 may be or comprise an object of Application Program 18. Since Avatar 605 may exist in Application Program 18, a reference to Avatar 605 includes a reference to a computer generated or simulated avatar, hence, these terms may be used interchangeably herein. Further, a reference to Avatar's 605 manipulations or other operations includes a reference to computer generated or simulated manipulations or other operations, hence, these terms may be used interchangeably herein depending on context. In some designs, Avatar 605 includes a 2D model, a 3D model, a 2D shape (i.e. point, line, square, rectangle, circle, triangle, etc.), a 3D shape (i.e. cube, sphere, irregular shape, etc.), a graphical user interface (GUI) element, a picture, and/or other models, shapes, elements, or objects. Avatar 605 may perform one or more operations within Application Program 18. In one example, Avatar 605 may perform operations including touching, pushing, pulling, lifting, dropping, gripping, twisting/rotating, squeezing, moving, and/or others, or a combination thereof in a simulation Application Program 18. In another example, Avatar 605 may perform operations including moving, maneuvering, jumping, running, opening, shooting, and/or others in a video game or virtual world Application Program 18. While all possible variations of operations on/by/with Avatar 605 are too voluminous to list and limited only by Avatar's 605 and/or Application Program's 18 design, other operations on/by/with Avatar 605 are within the scope of this disclosure. One of ordinary skill in art will understand that Avatar 605 may be or include any avatar that can implement and/or benefit from the functionalities described herein. Avatar 605 may include any hardware, programs, and/or combination thereof. While Avatar 605 itself may be Object 616 (later described) and may include any features, functionalities, and embodiments of Object 616, Avatar 605 is distinguished herein to portray the relationships and/or interactions between Avatar 605 and other Objects 616. In some aspects, Avatar 605 is Object 616 that manipulates other Objects 616. In some designs, a reference to Object 616 includes a reference to Avatar 605, and vice versa, depending on context. In other designs, a reference to one or more Objects 616 includes a reference to Avatar 605 depending on context.

Object Processing Unit 115 comprises functionality for obtaining information of interest in/from Application Program 18, and/or other functionalities. As such, Object Processing Unit 115 can be used at least in part to detect or obtain Objects 616, their states, and/or their properties. Object Processing Unit 115 can also be used at least in part to detect or obtain Avatar 605, its states, and/or its properties. In some aspects, one or more Objects 616 may be detected in Avatar's 605 surrounding. Avatar's 605 surrounding may include or be defined by an area of interest, which enables focusing on Objects 616 in Avatar's 605 immediate or other surrounding, thereby avoiding extraneous Objects 616 or detail in the rest of the surrounding. In one example, an area of interest may include an area defined by a threshold distance from Avatar 605. In another example, an area of interest may include a radial, circular, elliptical, triangular, rectangular, octagonal, or other such area around Avatar 605. In a further example, an area of interest may include a spherical, cubical, pyramid-like, or other such area around Avatar 605 as applicable to 3D space. In a further example, an area of interest may include a part of Application Program 18 that is shown (i.e. on a display, via a graphical user interface, etc.), any part of Application Program 18, and/or the entire Application Program 18. Any other area of interest shape or no area of interest can be utilized depending on implementation. The shape and/or size of an area of interest can be defined by a user, by system administrator, or automatically by the system based on experience, learning, testing, inquiry, analysis, synthesis, or other techniques, knowledge, or input. In some embodiments, Object Processing Unit 115 can generate or create Collection of Object Representations 525 and store one or more Object Representations 625 and/or other elements or information into the Collection of Object Representations 525. As such, Collection of Object Representations 525 comprises functionality for storing one or more Object Representations 625 and/or other elements or information. In other embodiments, Object Processing Unit 115 can generate or create Collection of Object Representations 525 and store one or more references (i.e. pointers, etc.) to one or more Object Representations 625, and/or other elements or information into the Collection of Object Representations 525. As such, Collection of Object Representations 525 comprises functionality for storing one or more references to one or more Object Representations 625, and/or other elements or information. In further embodiments, Object Processing Unit 115 can generate or create a reference to an existing Collection of Object Representations 525. In some aspects, Object Representation 625 may include one or more Object Properties 630, and/or other elements or information. In other aspects, Object Representation 625 may include one or more references to one or more Object Properties 630, and/or other elements or information. In one example, Object Representation 625 may include an electronic representation of Object 616 or state of Object 616. In another example, Object Representation 625 may include an electronic representation of Avatar 605 or state of Avatar 605. Hence, Collection of Object Representations 525 may include an electronic representation of one or more Objects 616 or state of one or more Objects 616, and/or Avatar 605 or state of Avatar 605. In some aspects, Collection of Object Representations 525 includes one or more Object Representations 625 and/or one or more references to one or more Object Representations 625, and/or other elements or information related to one or more Objects 616 and/or Avatar 605 at a particular time. As such, Collection of Object Representations 525 may represent one or more Objects 616 or state of one or more Objects 616, and/or Avatar 605 or state of Avatar 605 at a particular time. Collection of Object Representations 525 may, therefore, include knowledge (i.e. unit of knowledge, etc.) of one or more Objects 616 or state of one or more Objects 616, and/or Avatar 605 or state of Avatar 605 at a particular time. In some designs, a Collection of Object Representations 525 may include or be associated with a time stamp (not shown), order (not shown), or other time related information. For example, one Collection of Object Representations 525 may be associated with time stamp t1, another Collection of Object Representations 525 may be associated with time stamp t2, and so on. Time stamps t1, t2, etc. may indicate the times of generating Collections of Object Representations 525, for instance. In some designs where a representation of a single Object 616 at a particular time is needed, Object Processing Unit 115 can generate or create Object Representation 625 instead of Collection of Object Representations 525. Any features, functionalities, operations, and/or embodiments described with respect to Collection of Object Representations 525 may similarly apply to Object Representation 625. In other embodiments, Object Processing Unit 115 can generate or create a stream of Collections of Object Representations 525. A stream of Collections of Object Representations 525 may include one Collection of Object Representations 525 and/or a reference (i.e. pointer, etc.) to one Collection of Object Representations 525, or a group, sequence, or other plurality of Collections of Object Representations 525 and/or references (i.e. pointers, etc.) to a group, sequence, or other plurality of Collections of Object Representations 525. In some aspects, a stream of Collections of Object Representations 525 includes one or more Collections of Object Representations 525 and/or one or more references to one or more Collections of Object Representations 525, and/or other elements or information related to one or more Objects 616 and/or Avatar 605 over time or during a time period. As such, a stream of Collections of Object Representations 525 may represent one or more Objects 616 or state of one or more Objects 616, and/or Avatar 605 or state of Avatar 605 over time or during a time period. A stream of Collections of Object Representations 525 may, therefore, include knowledge (i.e. unit of knowledge, etc.) of one or more Objects 616 or state of one or more Objects 616, and/or Avatar 605 or state of Avatar 605 over time or during a time period. As one or more Objects 616 and/or Avatar 605 change (i.e. their states and/or their properties change, move, act, transform, etc.) over time or during a time period, this change may be captured in a stream of Collections of Object Representations 525. In some designs, each Collection of Object Representations 525 in a stream may include or be associated with the aforementioned time stamp, order, or other time related information. For example, one Collection of Object Representations 525 in a stream may be associated with order 1, a next Collection of Object Representations 525 in the stream may be associated with order 2, and so on. Orders 1, 2, etc. may indicate the orders or places of Collections of Object Representations 525 within a stream (i.e. sequence, etc.), for instance. Ignoring all other differences, a stream of Collections of Object Representations 525 may, in some aspects, be similar to a stream of pictures (i.e. video, etc.) where a stream of pictures may include a sequence of pictures and a stream of Collections of Object Representations 525 may include a sequence of Collections of Object Representations 525. In some designs where a representation of a single Object 616 over time is needed, Object Processing Unit 115 can generate or create a stream of Object Representations 625 instead of a stream of Collections of Object Representations 525. Any features, functionalities, operations, and/or embodiments described with respect to a stream of Collections of Object Representations 525 may similarly apply to a stream of Object Representations 625.

Object 616 (also may be referred to as object, computer generated object, simulated object, object of an application, object of an application program, and/or other suitable name or reference, etc.) may be or comprise an object generated by a computer or machine. Object 616 may be or comprise an object of Application Program 18. Since Object 616 may exist in Application Program 18, a reference to Object 616 may include a reference to a computer generated or simulated object, hence, these terms may be used interchangeably herein depending on context. Further, a reference to manipulations or other operations performed on Object 616 includes a reference to computer generated or simulated manipulations or other operations, hence, these terms may be used interchangeably herein depending on context. Examples of Objects 616 include computer generated biological objects (i.e. persons, animals, vegetation, etc.), computer generated nature objects (i.e. rocks, bodies of water, etc.), computer generated manmade objects (i.e. buildings, streets, ground/aerial/aquatic vehicles, robots, devices, etc.), and/or others in a context of a simulation Application Program 18, video game Application Program 18, virtual world Application Program 18, 3D or 2D Application Program 18, and/or others. More generally, examples of Objects 616 include a 2D model, a 3D model, a 2D shape (i.e. point, line, square, rectangle, circle, triangle, etc.), a 3D shape (i.e. cube, sphere, irregular shape, etc.), a graphical user interface (GUI) element, a form element (i.e. text field, radio button, push button, check box, etc.), a data or database element, a spreadsheet element, a link, a picture, a text (i.e. character, word, etc.), a number, and/or others in a context of a web browser Application Program 18, a media Application Program 18, a word processing Application Program 18, a spreadsheet Application Program 18, a database Application Program 18, a forms-based Application Program 18, an operating system Application Program 18, a device/system control Application Program 18, and/or others. Object 616 may perform operations within Application Program 18. In one example, a gate Object 616 may perform operations including opening, closing, swiveling, and/or other operations within a simulation Application Program 18, video game Application Program 18, virtual world Application Program 18, and/or 3D or 2D Application Program 18. In another example, a vehicle Object 616 may perform operations including moving, maneuvering, stopping, and/or other operations within a simulation Application Program 18, video game Application Program 18, virtual world Application Program 18, and/or 3D or 2D Application Program 18. In a further example, a person Object 616 may perform operations including moving, maneuvering, jumping, running, shooting, and/or other operations within a simulation Application Program 18, video game Application Program 18, virtual world Application Program 18, and/or 3D or 2D Application Program 18. In another example, a character Object 616 may perform operations including appearing (i.e. when typed, etc.), disappearing (i.e. when deleted, etc.), formatting (i.e. bolding, italicizing, underlining, coloring, resizing, etc.), and/or other operations within a word processing Application Program 18. In a further example, a picture Object 616 may perform operations including resizing, repositioning, rotating, deforming, and/or other operations within a graphics Application Program 18. While all possible variations of operations on/by/with Object 616 are too voluminous to list and limited only by Object's 616 and/or Application Program's 18 design, other operations on/by/with Object 616 are within the scope of this disclosure. In some aspects, any part of Object 616 may be detected or obtained as Object 616 itself or sub-Object 616. For instance, instead of or in addition to detecting or obtaining a vehicle as Object 616, a wheel and/or other parts of the vehicle may be detected or obtained as Objects 616 or sub-Objects 616. In general, Object 616 may include any Object 616 or sub-Object 616 that can be detected or obtained. Object 616 may include any hardware, programs, and/or combination thereof.

Examples of object properties include existence of Object 616, type of Object 616 (i.e. computer generated person, computer generated cat, computer generated vehicle, computer generated building, computer generated street, computer generated tree, computer generated rock, etc.), identity of Object 616 (i.e. name, identifier, etc.), location of Object 616 (i.e. distance and bearing/angle from a known/reference point or object, relative or absolute coordinates, etc.), condition of Object 616 (i.e. open, closed, 34% open, 0.34, 73 cm open, 73, 69% full, 0.69, switched on, 1, switched off, 0, etc.), shape/size of Object 616 (i.e. height, width, depth, model [i.e. 3D model, 2D model, etc.], bounding box, point cloud, picture, etc.), activity of Object 616 (i.e. motion, gestures, etc.), orientation of Object 616 (i.e. East, West, North, South, SSW, 9.3 degrees NE, relative orientation, absolute orientation, etc.), sound of Object 616 (i.e. simulated human voice or other human sound, simulated animal sound, machine/device sound, etc.), speech of Object 616 (i.e. human speech recognized from simulated sound object property, etc.), and/or other properties of Object 616. Type of Object 616, for example, may include any classification of Objects 616 ranging from detailed such as computer generated person, computer generated cat, computer generated vehicle, computer generated building, computer generated street, computer generated tree, computer generated rock, etc. to generalized such as computer generated biological object, computer generated nature object, computer generated manmade object, and/or others including their sub-types. Location of Object 616, for example, can include a relative location such as one defined by distance and bearing/angle from a known/reference point or object (i.e. Avatar 605, etc.) or one defined by relative coordinates from a known/reference point or object (i.e. Avatar 605, etc.). Location of Object 616, for example, can also include absolute location such as one defined by absolute coordinates. Other properties may include relative and/or absolute properties or values. In general, an object property may include any attribute of Object 616 (i.e. existence of Object 616, type of Object 616, identity of Object 616, shape/size of Object 616, etc.), any relationship of Object 616 with Avatar 605, other Objects 616, or the environment (i.e. location of Object 616, friend/foe relationship, etc.), and/or other information related to Object 616.

In some aspects, a reference to one or more Collections of Object Representations 525 may include a reference to one or more Objects 616 or state of one or more Objects 616 that the one or more Collections of Object Representations 525 represent. Also, a reference to one or more Objects 616 or state of one or more Objects 616 may include a reference to the corresponding one or more Collections of Object Representations 525. Therefore, one or more Collections of Object Representations 525 and one or more Objects 616 or state of one or more Objects 616 may be used interchangeably herein depending on context. In other aspects, state of Object 616 includes the Object's 616 mode of being. As such, state of Object 616 may include or be defined at least in part by one or more properties of the Object 616 such as existence, location, shape, condition, and or other properties or attributes. Object Representation 625 that represents Object 616 or state of Object 616, hence, includes one or more Object Properties 630. In further aspects, Object Processing Unit 115 may include any signal processing techniques or elements, and/or those known in art, as applicable. One of ordinary skill in art will understand that the aforementioned Collection of Object Representations 525 and/or elements thereof are described merely as examples of a variety of possible implementations, and that while all possible implementations of Collection of Object Representations 525 and/or elements thereof are too voluminous to describe, other implementations of Collection of Object Representations 525 and/or elements thereof are within the scope of this disclosure. Generally, any representation of one or more Objects 616 can be utilized herein. In some implementations, Object Processing Unit 115 and/or any of its elements or functionalities can be included or embedded in Computing Device 70, Processor 11, Application Program 18, and/or other elements. In other implementations, Collections of Object Representations 525 or streams of Collections of Object Representations 525 may be provided by another element, in which case Object Processing Unit 115 can be optionally omitted. Object Processing Unit 115 may include any hardware, programs, or combination thereof. Object Processing Unit 115 can be provided in any suitable configuration.

In some embodiments, an engine, environment, or other system (not shown) that may be used to implement Application Program 18 includes functions for providing properties or other information about Objects 616. Object Processing Unit 115 can obtain object properties by utilizing these functions. In some aspects, existence of Object 616 in a 2D or 3D engine or environment can be obtained by utilizing functions such as GameObject.FindObjectsOfType (GameObject), GameObject. FindGameObjectsWithTag ("TagN"), or GameObject.Find ("ObjectN") in Unity 3D Engine; GetAllActorsOfClass ( ) or IsActorInitialized ( ) in Unreal Engine; and/or other functions, procedures, or methods in other 2D or 3D engines or environments. In other aspects, type or other classification (i.e. person, animal, tree, rock, building, vehicle, etc.) of Object 616 in a 2D or 3D engine or environment can be obtained by utilizing functions such as GetClassName (ObjectN) or ObjectN.getType ( ) in Unity 3D Engine; ActorN.GetClass ( ) in Unreal Engine; ObjectN.getClassName ( ) or ObjectN.getType ( ) in Torque 3D Engine; and/or other functions, procedures, or methods in other 2D or 3D engines or environments. In further aspects, identity of Object 616 in a 2D or 3D engine or environment can be obtained by utilizing functions such as ObjectN.name or ObjectN.GetInstanceID ( ) in Unity 3D Engine; ActorN.GetObjectName ( ) or ActorN.GetUniqueID ( ) in Unreal Engine; ObjectN.getName ( ) or ObjectN.getID ( ) in Torque 3D Engine; and/or other functions, procedures, or methods in other 2D or 3D engines or environments. In further aspects, distance of Object 616 relative to Avatar 605 in a 2D or 3D engine or environment can be obtained by utilizing functions such as VectorN.Distance (Object A.transform.position, ObjectB.transform.position) in Unity 3D Engine; GetDistance To (ActorA, ActorB) in Unreal Engine; Vector Dist (VectorA, VectorB) or VectorDist (ObjectA.getPosition ( ) ObjectB.getPosition ( ) in Torque 3D Engine; and/or other functions, procedures, or methods in other 2D or 3D engines or environments. In further aspects, angle, bearing, or direction of Object 616 relative to Avatar 605 in a 2D or 3D engine or environment can be obtained by utilizing functions such as ObjectB.transform.position-ObjectA.transform.position in Unity 3D Engine; FindLookAtRotation (TargetVector, StartVector) or ActorB→GetActorLocation ( )-ActorA→GetActorLocation ( ) in Unreal Engine; ObjectB→getPosition ( )-ObjectA→getPosition ( ) in Torque 3D Engine; and/or other functions, procedures, or methods in other 2D or 3D engines or environments. In further aspects, location of Object 616 in a 2D or 3D engine or environment can be obtained by utilizing functions such as ObjectN.transform.position in Unity 3D Engine; ActorN. GetActorLocation ( ) in Unreal Engine; ObjectN.getPosition ( ) in Torque 3D Engine; and/or other similar functions, procedures, or methods in other 2D or 3D engines or environments. In another example, location (i.e. coordinates, etc.) of Object 616 on a screen can be obtained by utilizing WorldToScreen ( ) or other similar function or method in various 2D or 3D engines or environments. In some designs, distance, angle/bearing, and/or other properties of Object 616 relative to Avatar 605 can then be calculated, inferred, derived, or estimated from Object's 616 and Avatar's 605 location information. Object Processing Unit 115 may include computational functionalities to perform such calculations, inferences, derivations, or estimations by utilizing, for example, geometry, trigonometry, Pythagorean theorem, and/or other theorems, formulas, or disciplines. In further aspects, shape/size of Object 616 in a 2D or 3D engine or environment can be obtained by utilizing functions such as Bounds.size, ObjectN.transform.localScale, or ObjectN.transform.lossyScale in Unity 3D Engine; ActorN.GetActorBounds ( ) ActorN. GetActorScale ( ) or ActorN.GetActorScale3D ( ) in Unreal Engine; ObjectN.getObjectBox ( ) or ObjectN.getScale ( ) in Torque 3D Engine; and/or other similar functions, procedures, or methods in other 2D or 3D engines or environments. In some designs, detailed shape of Object 616 can be obtained by accessing the object's mesh or computer model. In general, any of the aforementioned and/or other properties of Object 616 can be obtained by accessing a scene graph or other data structure used for organizing objects in a particular engine or environment, finding a specific Object 616, and obtaining or reading any property from the Object 616. Such accessing can be performed by using the engine's or environment's functions for accessing objects in the scene graph or other data structure or by directly accessing the scene graph or other data structure. In some designs, functions and/or other instructions for obtaining properties or other information about Objects 616 of Application Program 18 can be inserted or utilized in Application Program's 18 source code. In other designs, functions and/or other instructions for obtaining properties or other information about Objects 616 of Application Program 18 can be inserted into Application Program 18 through manual, automatic, dynamic, or just-in-time (JIT) instrumentation (later described). In further designs, functions and/or other instructions for providing properties or other information about Objects 616 of Application Program 18 can be inserted into Application Program 18 through utilizing dynamic code, dynamic class loading, reflection, and/or other functionalities of a programming language or platform; utilizing dynamic, interpreted, and/or scripting programming languages; utilizing metaprogramming; and/or utilizing other techniques (later described). Object Processing Unit 115 may include any features, functionalities, and embodiments of Unit for Object Manipulation Using Curiosity 130, Instruction Set Implementation Interface 180, and/or other elements. One of ordinary skill in art will understand that the aforementioned techniques for obtaining objects and/or their properties are described merely as examples of a variety of possible implementations, and that while all possible techniques for obtaining objects and/or their properties are too voluminous to describe, other techniques for obtaining objects and/or their properties known in art are within the scope of this disclosure. It should be noted that Unity 3D Engine, Unreal Engine, and Torque 3D Engine are used merely as examples of a variety of engines, environments, or systems that can be used to implement Application Program 18 and any of the aforementioned functionalities may be provided in other engines, environments, or systems. Also, in some embodiments, Application Program 18 may not use any engine, environment, or system for its implementation, in which case the aforementioned functionalities can be implemented within Application Program 18. In general, the disclosed devices, systems, and methods are independent of the engine, environment, or system that can be used to implement Application Program 18.

In some embodiments of Application Programs 18 that do not comprise Avatar 605, Object Processing Unit 115 can create or generate Collections of Object Representations 525 or streams of Collections of Object Representations 525 comprising knowledge of Application Program's 18 manipulations of one or more Objects 616 using curiosity. Therefore, any features, functionalities, and/or embodiments described with respect to Avatar's 605 manipulations of one or more Objects 616 can similarly be applied to Application Program's 18 manipulation of one or more Objects 616.

Figure 8:
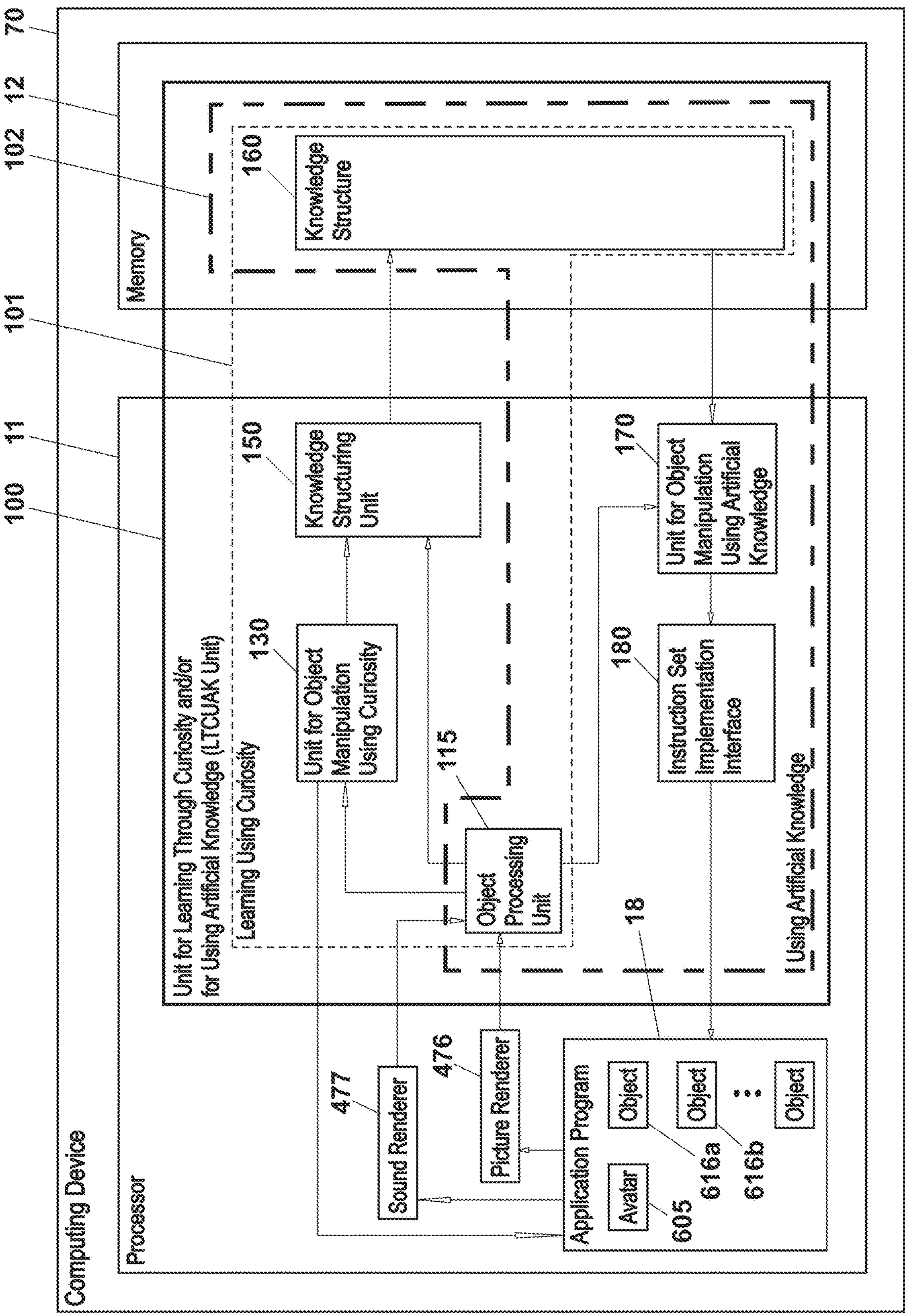
FIG. 8 illustrates embodiments of Picture Renderer 476 and Sound Renderer 477.

Referring to FIG. 8, an embodiment of including Picture Renderer 476 and/or Sound Renderer 477 is illustrated.

Picture Renderer 476 comprises functionality for rendering or generating one or more digital pictures, and/or other functionalities. Picture Renderer 476 comprises functionality for rendering or generating one or more digital pictures of Application Program 18. In some aspects, as a camera (i.e. Camera 92*a*, etc.) is used to capture pictures of the physical world, Picture Renderer 476 can be used to render or generate pictures of a computer generated environment. As such, Picture Renderer 476 can be used to render or generate views of Application Program 18. In some designs, Picture Renderer 476 can be used to render or generate one or more digital pictures depicting a view of Avatar's 605 visual surrounding in a 3D Application Program 18 (i.e. 3D simulation, 3D video game, 3D virtual world application, 3D CAD application, etc.). In one example, a view may include a first-person view or perspective such as a view through Avatar's 605 eyes that shows objects around Avatar's 605, but does not typically show Avatar's 605 itself. First-person view may sometimes include Avatar's 605 hands, feet, arm (i.e. simulated robotic arm, etc.), other parts, and/or objects that Avatar's 605 is holding. In another example, a view may include a third-person view or perspective such as a view that shows Avatar 605 as well as objects around Avatar 605 from an observer's point of view. In a further example, a view may include a view from a front of Avatar's 605. In a further example, a view may include a view from a side of Avatar's 605. In a further example, a view may include any stationary or movable view such as a view through a simulated camera in a 3D Application Program 18. In other designs, Picture Renderer 476 can be used to render or generate one or more digital pictures depicting a view of a 2D Application Program 18. In one example, a view may include a screenshot or portion thereof of a 2D Application Program 18. In a further example, a view may include an area of interest of a 2D Application Program 18. In a further example, a view may include a top-down view of a 2D Application Program 18. In a further example, a view may include a side-on view of a 2D Application Program 18. Any other view can be utilized in alternate designs. Any view utilized in a 3D Application Program 18 can similarly be utilized in a 2D Application Program 18 as applicable, and vice versa. In some implementations, Picture Renderer 476 may include any graphics processing device, apparatus, system, or application that can render or generate one or more digital pictures from a computer (i.e. 3D, 2D, etc.) model or representation. In some aspects, rendering, when used casually, may refer to rendering or generating one or more digital pictures from a computer model or representation, providing the one or more digital pictures to a display device, and/or displaying of the one or more digital pictures on a display device. In some embodiments, Picture Renderer 476 can be a program executing or operating on Processor 11. In one example, Picture Renderer 476 can be provided in a rendering engine such as Direct3D, OpenGL, Mantle, and/or other programs or systems for rendering or processing 3D or 2D graphics. In other embodiments, Picture Renderer 476 can be part of, embedded into, or built into Processor 11. In further embodiments, Picture Renderer 476 can be a hardware element coupled to Processor 11 and/or other elements. In further embodiments, Picture Renderer 476 can be a program or hardware element that is part of or embedded into another element. In one example, a graphics card and/or its graphics processing unit (i.e. GPU, etc.) may typically include Picture Renderer 476. In another example, LTCUAK Unit 100 may include Picture Renderer 476. In a further example, Application Program 18, Avatar Control Program 18*b* (later described), and/or other application program may include Picture Renderer 476. In a further example, Object Processing Unit 115 may include Picture Renderer 476. In general, Picture Renderer 476 can be implemented in any suitable configuration to provide its functionalities. Picture Renderer 476 may render or generate one or more digital pictures or streams of digital pictures (i.e. motion pictures, video, etc.) in various formats examples of which include JPEG, GIF, TIFF, PNG, PDF, MPEG, AVI, FLV, MOV, RM, SWF, WMV, DivX, and/or others. In some implementations of non-graphical Application Programs 18 such as simulations, calculations, and/or others, Picture Renderer 476 may render or generate one or more digital pictures of Avatar's 605 visual surrounding or of views of Application Program 18 to facilitate object recognition functionalities herein where the one or more digital pictures are never displayed. In some aspects, instead of or in addition to Picture Renderer 476, one or more digital pictures of Avatar's 605 visual surrounding or of views of Application Program 18 can be obtained from any element of a computing device or system that can provide such digital pictures. Examples of such elements include a graphics circuit, a graphics system, a graphics driver, a graphics interface, and/or others. One of ordinary skill in art will understand that the aforementioned Picture Renderers 476 are described merely as examples of a variety of possible implementations, and that while all possible Picture Renderers 476 are too voluminous to describe, other renderers, and/or those known in art, that can render or generate one or more digital pictures are within the scope of this disclosure.

In some embodiments, Picture Recognizer 117*a* (previously described) can be used for detecting or recognizing Objects 616, their states, and/or their properties in one or more digital pictures rendered or generated by Picture Renderer 476. Picture Recognizer 117*a* can be used in detecting or recognizing existence of Object 616, type of Object 616, identity of Object 616, distance of Object 616, bearing/angle of Object 616, location of Object 616, condition of Object 616, shape/size of Object 616, activity of Object 616, and/or other properties or information about Object 616.

Sound Renderer 477 comprises functionality for rendering or generating digital sound, and/or other functionalities. Sound Renderer 477 comprises functionality for rendering or generating digital sound of Application Program 18. In some aspects, as a microphone (i.e. Microphone 92*b*, etc.) is used to capture sound of the physical world, Sound Renderer 477 can be used to render or generate sound of a computer generated environment. In some designs, Sound Renderer 477 can be used to render or generate digital sound from Avatar's 605 surrounding in a 3D Application Program 18 (i.e. 3D simulation, 3D video game, 3D virtual world application, 3D CAD application, etc.). For example, emission of a sound from a sound source may be simulated/modeled in a computer generated space of a 3D Application Program 18, propagation of the sound may be simulated/modeled through the computer generated space including any scattering, reflections, refractions, diffractions, and/or other effects, and the sound may be rendered or generated as perceived by a listener (i.e. Avatar 605, etc.). In other designs, Sound Renderer 477 can be used to render or generate digital sound of a 2D Application Program 18 which may include any of the aforementioned and/or other sound simulation/modeling as applicable to 2D spaces. In further designs, Sound Renderer 477 can be optionally omitted in a simple Application Program 18 where no sound simulation/modeling is needed or where sounds may simply not be played. In some implementations, Sound Renderer 477 may include any sound processing device, apparatus, system, or application that can render or generate digital sound. In some aspects, rendering, when used casually, may refer to rendering or generating digital sound from a computer model or representation, providing digital sound to a speaker or headphones, and/or producing the sound by a speaker or headphones. In some embodiments, Sound Renderer 477 can be a program executing or operating on Processor 11. In one example, Sound Renderer 477 can be provided in a rendering engine such as SoundScape Renderer, SLAB Spatial Audio Renderer, Uni-Verse Sound Renderer, Crepo Sound Renderer, and/or other programs or systems for rendering or processing sound. In another example, various engines or environments such as Unity 3D Engine, Unreal Engine, Torque 3D Engine, and/or others provide built-in sound renderers. In other embodiments, Sound Renderer 477 can be part of, embedded into, or built into Processor 11. In further embodiments, Sound Renderer 477 can be a hardware element coupled to Processor 11 and/or other elements. In further embodiments, Sound Renderer 477 can be a program or hardware element that is part of or embedded into another element. In one example, a sound card and/or its processing unit may include Sound Renderer 477. In another example, LTCUAK Unit 100 may include Sound Renderer 477. In a further example, Application Program 18, Avatar Control Program 18*b* (later described), and/or other application program may include Sound Renderer 477. In a further example, Object Processing Unit 115 may include Sound Renderer 477. In general, Sound Renderer 477 can be implemented in any suitable configuration to provide its functionalities. Sound Renderer 477 may render or generate digital sound in various formats examples of which include WAV, WMA, AIFF, MP3, RA, OGG, and/or others. In some implementations of non-acoustic Application Programs 18 such as simulations, calculations, and/or others, Sound Renderer 477 may render or generate digital sound as perceived by Avatar 605 to facilitate object recognition functionalities herein where the sound is never produced on a speaker or headphones. In some aspects, instead of or in addition to Sound Renderer 477, digital sound perceived by Avatar 605 can be obtained from any element of a computing device or system that can provide such digital sound. Examples of such elements include an audio circuit, an audio system, an audio driver, an audio interface, and/or others. One of ordinary skill in art will understand that the aforementioned Sound Renderers 477 are described merely as examples of a variety of possible implementations, and that while all possible Sound Renderers 477 are too voluminous to describe, other renderers, and/or those known in art, that can render or generate digital sound are within the scope of this disclosure.

In some embodiments, Sound Recognizer 117*b* (previously described) can be used for detecting or recognizing Objects 616, their states, and/or their properties in a stream of digital sound samples rendered or generated by Sound Renderer 477. Sound Recognizer 117*b* can be utilized in detecting or recognizing existence of Object 616, type of Object 616, identity of Object 616, bearing/angle of Object 616, activity of Object 616, and/or other properties or information about Object 616.

In some designs, Picture Renderer 476/Picture Recognizer 117*a* and/or Sound Renderer 477/Sound Recognizer 117*b* can optionally be used to detect Objects 616, their states, and/or their properties that cannot be obtained from Application Program 18 or from an engine, environment, or system that is used to implement Application Program 18. In other designs, Picture Renderer 476/Picture Recognizer 117*a* and/or Sound Renderer 477/Sound Recognizer 117*b* can also optionally be used where Picture Renderer 476/ Picture Recognizer 117*a* and/or Sound Renderer 477/Sound Recognizer 117*b* offer superior performance in detecting Objects 616, their states, and/or their properties. Picture Renderer 476/Picture Recognizer 117*a* and/or Sound Renderer 477/Sound Recognizer 117*b* can be optionally omitted depending on implementation.

In some embodiments, the disclosed systems, devices, and/or methods include a simulated lidar (not shown) that may emit one or more simulated light signals (i.e. laser beams, scattered light, etc.) and listen for one or more simulated signals reflected or backscattered from Object 616. For example, emission of light from a light source may be simulated/modeled in a computer generated space of a 3D Application Program 18 by propagating the light through the computer generated space including any scattering, reflections, refractions, diffractions, and/or other effects or techniques. Any other technique known in art can be utilized to facilitate simulated lidar functionalities. Simulated lidar may simulate Lidar 92*c* and may include any of Lidar's 92*c* features, functionalities, and/or embodiments as applicable in a computer generated space. In some designs, Lidar Processing Unit 117*c* (previously described) can be used for detecting or recognizing Objects 616, their states, and/or their properties using simulated light generated by a simulated lidar. Lidar Processing Unit 117*c* can be used in detecting existence of Object 616, type of Object 616, identity of Object 616, distance of Object 616, location of Object 616 (i.e. bearing/angle, coordinates, etc.), condition of Object 616, shape/size of Object 616, activity of Object 616, and/or other properties or information about Object 616.

In some embodiments, the disclosed systems, devices, and/or methods include a simulated radar (not shown) that may emit one or more simulated radio signals (i.e. radio waves, etc.) and listen for one or more signals reflected or backscattered from Object 616. For example, emission of a radio signal from a radio source may be simulated/modeled in a computer generated space of a 3D Application Program 18 by propagating the radio signal through the computer generated space including any scattering, reflections, refractions, diffractions, and/or other effects or techniques. Any other technique known in art can be utilized to facilitate simulated radar functionalities. Simulated radar may simulate Radar 92*d* and may include any of Radar's 92*d* features, functionalities, and/or embodiments as applicable in a computer generated space. In some designs, Radar Processing Unit 117*d* (previously described) can be used for detecting or recognizing Objects 616, their states, and/or their properties using simulated radio signals/waves generated by a simulated radar. Radar Processing Unit 117*d* can be used in detecting existence of Object 616, type of Object 616, distance of Object 616, location of Object 616 (i.e. bearing/angle, coordinates, etc.), condition of Object 616, shape/size of Object 616, activity of Object 616, and/or other properties or information about Object 616.

In some embodiments, the disclosed systems, devices, and/or methods include a simulated sonar (not shown) that may emit one or more simulated sound signals (i.e. sound pulses, sound waves, etc.) and listen for one or more signals reflected or backscattered from Object 616. For example, emission of sound from a sound source may be simulated/modeled in a computer generated space of a 3D Application Program 18 by propagating the sound through the computer generated space including any scattering, reflections, refractions, diffractions, and/or other effects or techniques. Any other technique known in art can be utilized to facilitate simulated sonar functionalities. Simulated sonar may simulate Sonar 92*e* and may include any of Sonar's 92*e* features, functionalities, and/or embodiments as applicable in a computer generated space. In some designs, Sonar Processing Unit 117*e* (previously described) can be used for detecting or recognizing Objects 616, their states, and/or their properties using simulated sound signals/waves generated by a simulated sonar. Sonar Processing Unit 117*e* can be used in detecting existence of Object 616, type of Object 616, distance of Object 616, location of Object 616 (i.e. bearing/angle, coordinates, etc.), condition of Object 616, shape/size of Object 616, activity of Object 616, and/or other properties or information about Object 616.

One of ordinary skill in art will understand that the aforementioned techniques for detecting or recognizing Objects 616, their states, and/or their properties are described merely as examples of a variety of possible implementations, and that while all possible techniques for detecting or recognizing Objects 616, their states, and/or their properties are too voluminous to describe, other techniques, and/or those known in art, for detecting or recognizing Objects 616, their states, and/or their properties are within the scope of this disclosure. Any combination of the aforementioned and/or other renderers, object detecting or recognizing techniques, signal processing techniques, and/or other elements or techniques can be used in various embodiments.

Figure 9A:
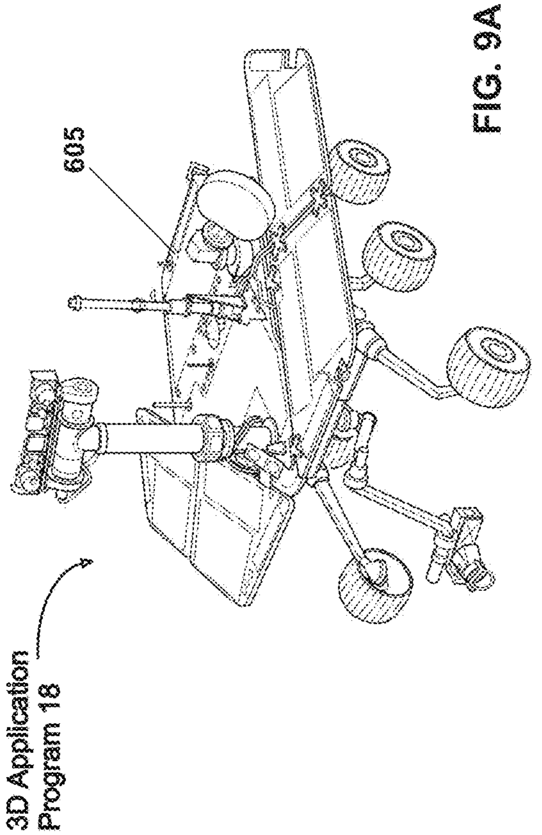
FIG. 9A illustrates an exemplary embodiment of Avatar 605.

Referring to FIG. 9A, an exemplary embodiment of Avatar 605 (also may be referred to as avatar, or other suitable name or reference, etc.) is illustrated. In some aspects, in order to be aware of other Objects 616, Avatar 605 may detect or obtain Objects 616, states of Objects 616, properties of Objects 616, and/or other information about Objects 616: (i) from Application Program 18, (ii) from engines, environments, or systems that are used to implement Application Program 18, (ii) using Picture Renderer 476, Sound Renderer 477, or other simulated sensors (i.e. simulated lidar, simulated radar, simulated sonar, etc.), and/ or (iv) using other techniques as previously described. In some aspects, in order to be aware of itself, Avatar 605 may detect or obtain Avatar 605, states of Avatar 605, properties of Avatar 605, and/or other information about Avatar 605: (i) from Application Program 18, (ii) from engines, environments, or systems that are used to implement Application Program 18, (ii) simulated sensors (i.e. simulated location sensors, simulated rotation sensors, simulated orientation sensor, simulated lidar, simulated radar, simulated sonar, etc.), and/or (iv) using other techniques as previously described. For example, in order to be self-aware, Avatar 605 may need to know one or more of the following: its location, its condition, its shape, its elements, its orientation, its identification, time, and/or other information. In one instance, Avatar's 605 location, condition, shape, elements, orientation, and/or identification may be obtained or determined from 3D Application Program 18 by accessing Avatar's 605 object in 3D Application Program 18 and obtaining Avatar's 605 coordinates (i.e. location, etc.), condition, 3D model (i.e. shape, etc.), elements, orientation, and/or identification respectively as previously described. In another instance, time can be obtained or determined from 3D Application Program 18 clock, system clock, online clock, or other time source. In a further instance, information about Avatar 605, its elements, and/or other relevant information for Avatar's 605 self-awareness can be obtained or determined from any simulated one or more sensors simulating any of the previously described physical sensors.

One of ordinary skill in art will understand that the aforementioned techniques for detecting, obtaining, and/or recognizing Avatar 605, Avatar's 605 states, and/or Avatar's 605 properties are described merely as examples of a variety of possible implementations, and that while all possible techniques for detecting, obtaining, and/or recognizing Avatar 605, Avatar's 605 states, and/or Avatar's 605 properties are too voluminous to describe, other techniques, and/or those known in art, are within the scope of this disclosure. Any combination of the aforementioned and/or other simulated sensors, object detecting or recognizing techniques, signal processing techniques, and/or other elements or techniques can be used in various embodiments.

Figure 9B:
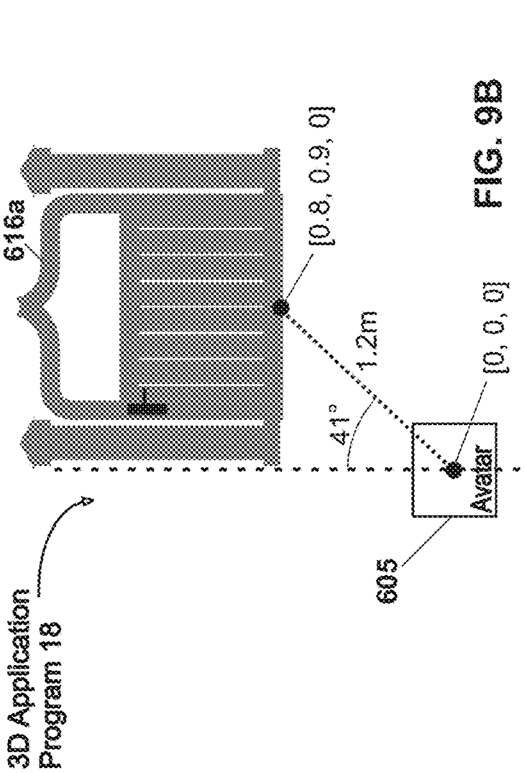
FIG. 9B-9D illustrate an exemplary embodiment of a single Object 616 detected or obtained in Avatar's 605 surrounding and corresponding embodiments of Collections of Object Representations 525.
Figure 9C:
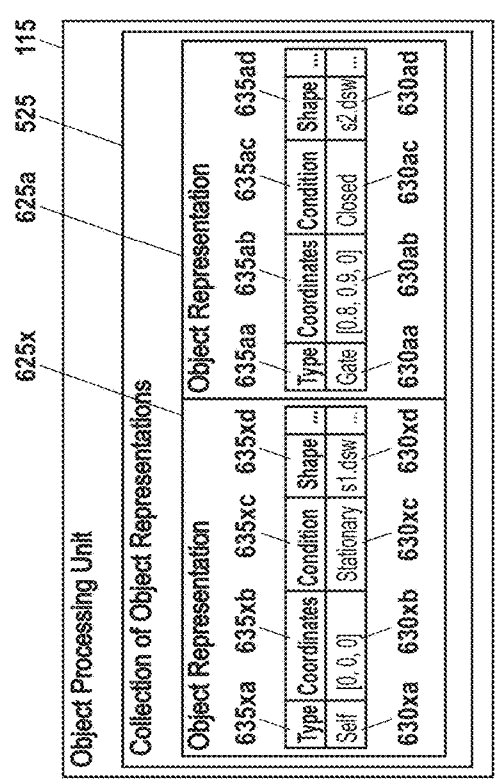
Figure 9D:
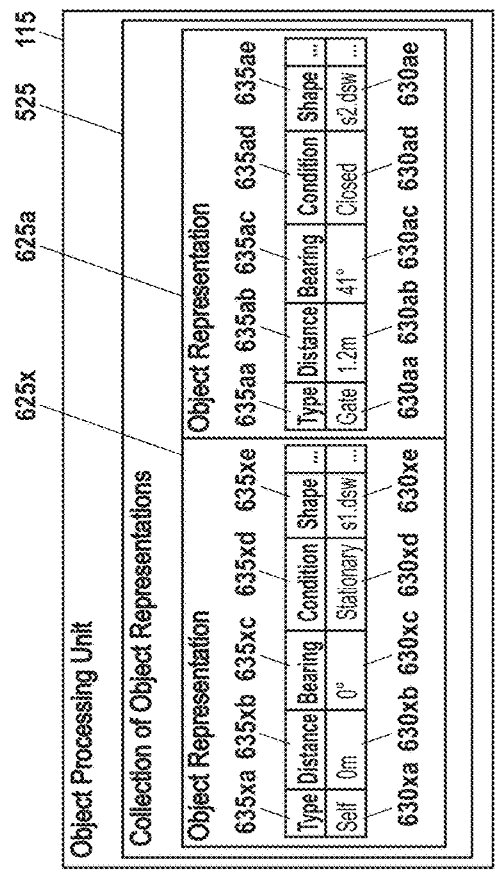

Referring to FIG. 9B-9D, an exemplary embodiment of a single Object 616 detected or obtained in Avatar's 605 surrounding in 3D Application Program 18 and corresponding embodiments of Collections of Object Representations 525 are illustrated.

As shown for example in FIG. 9B, Avatar 605 may be detected or obtained. Avatar 605 may be defined to be relative origin at coordinates of [0, 0, 0], which if needed may be converted, calculated, determined, or estimated as Avatar's 605 distance of Om from Avatar 605 and Avatar's 605 bearing/angle of 0° from Avatar's 605 centerline. Avatar's 605 condition may be detected, obtained, or determined as stationary. Avatar's 605 shape may be detected or obtained and stored in file s1.dsw. Object 616*a* may be detected or obtained. Object 616*a* may be detected or obtained as a gate. Object's 616*a* relative coordinates may be detected or obtained as [0.8, 0.9, 0], which if needed may be converted, calculated, determined, or estimated as Object's 616*a* distance of 1.2 m from Avatar 605 and Object's 616*a* bearing/angle of 41° from Avatar's 605 centerline. Object's 616*a* condition may be detected or obtained as closed. Object's 616*a* shape may be detected or obtained, and stored in file s2.dsw.

As shown for example in FIG. 9C, Object Processing Unit 115 may generate or create Collection of Object Representations 525 including Object Representation 625*x* representing Avatar 605 or state of Avatar 605, and Object Representation 625*a* representing Object 616*a* or state of Object 616*a*. For instance, Object Representation 625*x* may include Object Property 630*xa* "Self" in Field 635*xa* "Type", Object Property 630*xb* "[0, 0, 0]" in Field 635*xb* "Coordinates", Object Property 630*xc* "Stationary" in Field 635*xc* "Condition", Object Property 630*xd* "s1.dsw" in Field 635*xd* "Shape", etc. Also, Object Representation 625*a* may include Object Property 630*aa* "Gate" in Field 635*aa* "Type", Object Property 630*ab* "[0.8, 0.9, 0]" in Field 635*ab* "Coordinates", Object Property 630*ac* "Closed" in Field 635*ac* "Condition", Object Property 630*ad* "s2.dsw" in Field 635*ad* "Shape", etc. Concerning distance, any unit of linear measure (i.e. inches, feet, yards, etc.) can be used instead of or in addition to meters. Concerning bearing/angle, any unit of angular measure (i.e. radian, etc.) can be used instead of or in addition to degrees. Furthermore, the aforementioned bearing/angle measurement where the bearing/angle starts from the forward of Avatar's 605 centerline and advances clockwise (as shown) is described merely as an example of a variety of possible implementations, and other bearing/angle measurements such as starting at right of Avatar's 605 lateral centerline and advancing counter clockwise (not shown), dividing the space into quadrants of 0°-90° and measuring angles in the quadrants (not shown), and/or others can be utilized in alternate implementations. Concerning condition, any symbolic, numeric, and/or other representation of a condition of Object 616 can be used. For example, a condition of a gate Object 616*a* may be detected or obtained, and stored as closed, open, partially open, 20% open, 0.2, 55% open, 0.55, 78% open, 0.78, 15 cm open, 15, 39 cm open, 39, 85 cm open, 85, etc. In another example, a condition of Avatar 605 may be detected and stored as stationary/still, 0, moving, 1, moving at 4 m/hr speed, 4, moving 85 cm, 85, open, closed, etc. In some aspects, condition of Object 616*a* may be represented or implied in the Object's 616*a* shape or model (i.e. 3D model, 2D model, etc.), in which case condition as a distinct object property can be optionally omitted. Concerning shape, any symbolic, numeric, mathematical, modeled, pictographic, computer, and/or other representation of a shape of Object 616*a* can be used. In one example, shape of a gate Object 616*a* can be detected or obtained, and stored as a 3D or 2D model of the gate Object 616*a*. In another example, shape of a gate Object 616*a* can be detected or obtained, and stored as a digital picture of the gate Object 616*a*. In general, Collection of Object Representations 525 may include one or more Object Representations 625 (i.e. one for each Object 616 and/or Avatar 605, etc.) or one or more references to one or more Object Representations 625 (i.e. one for each Object 616 and/or Avatar 605, etc.), and/or other elements or information. It should be noted that Object Representation 625 representing Avatar 605 may not be needed in some embodiments and that it can be optionally omitted from Collection of Object Representations 525 in any embodiment that does not need it, as applicable. In some designs where Collection of Object Representations 525 includes a single Object Representation 625 or a single reference to Object Representation 625 (i.e. in a case where Avatar 605 manipulates a single Object 616, etc.), Collection of Object Representations 525 as an intermediary holder can optionally be omitted, in which case any features, functionalities, and/or embodiments described with respect to Collection of Object Representation 525 can be used on/by/with/in Object Representation 625. In general, Object Representation 625 may include one or more Object Properties 630 or one or more references to one or more Object Properties 630, and/or other elements or information. Any features, functionalities, and/or embodiments of Picture Renderer 476/Picture Recognizer 117*a*, Sound Renderer 477/Sound Recognizer 117*b*, aforementioned simulated lidar/Lidar Processing Unit 117*c*, aforementioned simulated radar/Radar Processing Unit 117*d*, aforementioned simulated sonar/Sonar Processing Unit 117*e*, their combinations, and/or other elements or techniques, and/or those known in art, can be utilized for detecting or recognizing Object 616*a*, its states, and/or its properties (i.e. location [i.e. coordinates, distance and bearing/angle, etc.], condition, shape, etc.) and/or Avatar 605, its states, and/or its properties. Any other Objects 616, their states, and/or their properties can be detected or obtained, and stored.

As shown for example in FIG. 9D, Object Processing Unit 115 may generate or create Collection of Object Representations 525 including Object Representation 625*x* representing Avatar 605 or state of Avatar 605, and Object Representation 625*a* representing Object 616*a* or state of Object 616*a*. For instance, Object Representation 625*x* may include Object Property 630*xa* "Self" in Field 635*xa* "Type", Object Property 630*xb* "Om" in Field 635*xb* "Distance", Object Property 630*xc* "0°" in Field 635*xc* "Bearing", Object Property 630*xd* "Stationary" in Field 635*xd* "Condition", Object Property 630*xe* "s1.dsw" in Field 635*xe* "Shape", etc. Also, Object Representation 625*a* may include Object Property 630*aa* "Gate" in Field 635*aa* "Type", Object Property 630*ab* "1.2 m" in Field 635*ab* "Distance", Object Property 630*ac* "41°" in Field 635*ac* "Bearing", Object Property 630*ad* "Closed" in Field 635*ad* "Condition", Object Property 630*ae* "s2.dsw" in Field 635*ae* "Shape", etc.

In some embodiments, Object's 616*a* location may be defined by coordinates (i.e. absolute coordinates, relative coordinates relative to Avatar 605, etc.), distance and bearing/angle from Avatar 605, and/or other techniques. For computer generated objects, Object's 616*a* location in Application Program 18 may be readily obtained by obtaining Object's 616*a* coordinates from Application Program 18 and/or elements (i.e. 3D engine, graphics engine, simulation engine, game engine, or other such tool, etc.) thereof as previously described. It should be noted that, in some embodiments, Object's 616*a* location defined by coordinates can be converted into Object's 616*a* location defined by distance and bearing/angle, and vice versa, as these are different techniques to represent a same location. Therefore, in some aspects, Object's 616*a* location defined by coordinates and Object's 616*a* location defined by distance and bearing/angle are logical equivalents. As such, they may be used interchangeably herein depending on context. For example, Object's 616*a* coordinates [0.8, 0.9, 0] relative to Avatar 605 can be converted, calculated, or estimated to be Object's 616*a* distance of 1.2 m and bearing/angle of 41° relative to Avatar 605 using trigonometry, Pythagorean theorem, linear algebra, geometry, and/or other techniques. It should be noted that, the disclosed systems, devices, and methods are independent of the technique used to represent locations of Avatar 605, Objects 616, and/or other elements. In some embodiments, Object's 616*a* absolute coordinates obtained from Application Program 18 and/or elements thereof can be stored as Object Property 630 in Object Representation 625*a* and used for location and/or spatial processing. In other embodiments, Object's 616*a* absolute coordinates obtained from Application Program 18 and/or elements thereof can be converted into Object's 616*a* relative coordinates relative to Avatar 605, stored as Object Property 630 in Object Representation 625*a*, and used for location and/or spatial processing. In further embodiments, Object's 616*a* coordinates obtained from Application Program 18 and/or elements thereof can be converted into Object's 616*a* distance and bearing/angle from Avatar 605, stored as Object Properties 630 in Object Representation 625*a*, and used for location and/or spatial processing. In further embodiments, both Object's 616*a* coordinates as well as Object's 616*a* distance and bearing/angle can be used. In further embodiments, concerning location (i.e. whether defined by coordinates, distance and bearing/angle, etc.), Object's 616*a* location can be defined using the lowest point on Object's 616*a* centerline and/or using any point on or within Object 616*a*. In general, any location representation or technique, or a combination thereof, and/or those known in art, can be included as Object Properties 630 in Object Representations 625 and/or used for location and/or spatial processing. The aforementioned location techniques similarly apply to Avatar 605 and its location Object Property 630.

In some embodiments, Collection of Object Representations 525 does not need to include Object Representations 625 of all detected or obtained Objects 616. In other embodiments, Collection of Object Representations 525 does not need to include Object Representation 625 of Avatar 605. In some aspects, Collection of Object Representations 525 may include Object Representations 625 representing significant Objects 616, Objects 616 needed for the learning process, Objects 616 needed for the use of artificial knowledge process, Objects 616 that the system is focusing on, and/or other Objects 616. In one example, Collection of Object Representations 525 includes a single Object Representation 625 representing a manipulated Object 616. In another example, Collection of Object Representations 525 includes two Object Representations 625, one representing Device 98 and the other representing a manipulated Object 616. In a further example, Collection of Object Representations 525 includes two Object Representations 625, one representing a manipulating Object 616 and the other representing a manipulated Object 616. In general, Collection of Object Representations 525 may include any number of Object Representations 625 representing any number of Objects 616, Avatar 605, and/or other elements or information.

Figure 10A:
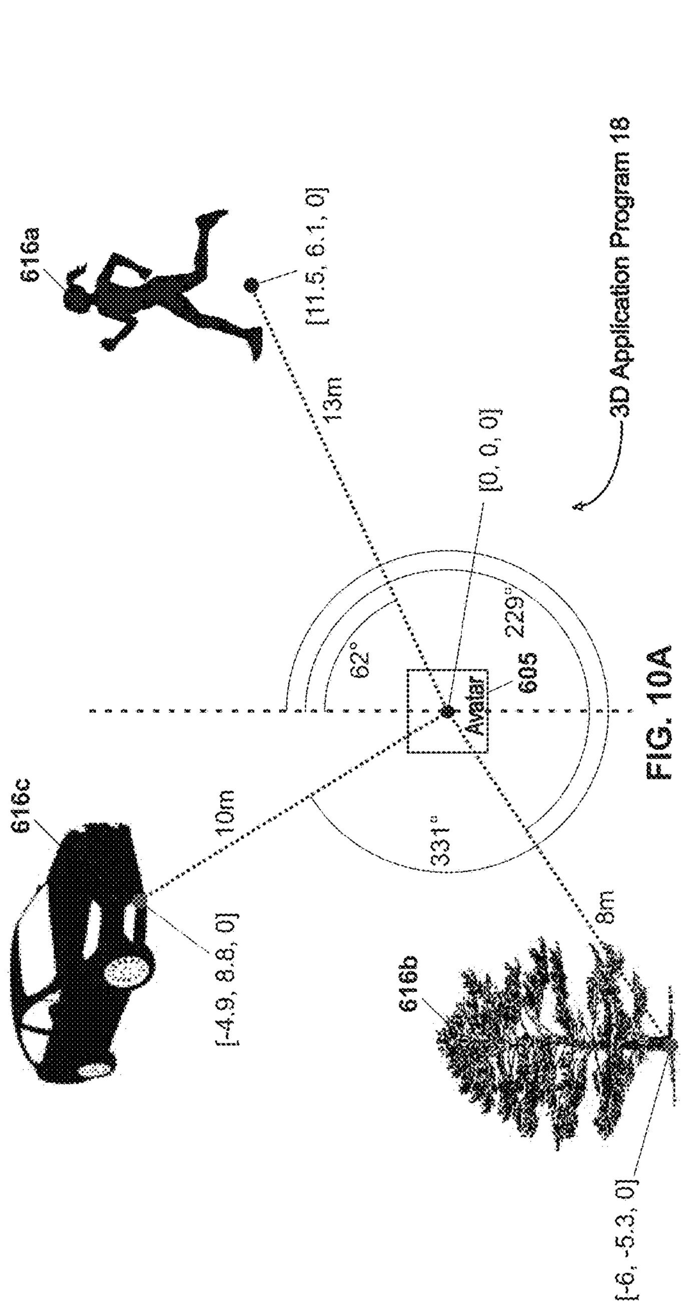
FIG. 10A-10B illustrate an exemplary embodiment of a plurality of Objects 616 detected or obtained in Avatar's 605 surrounding and corresponding embodiment of Collection of Object Representations 525.
Figure 10B:
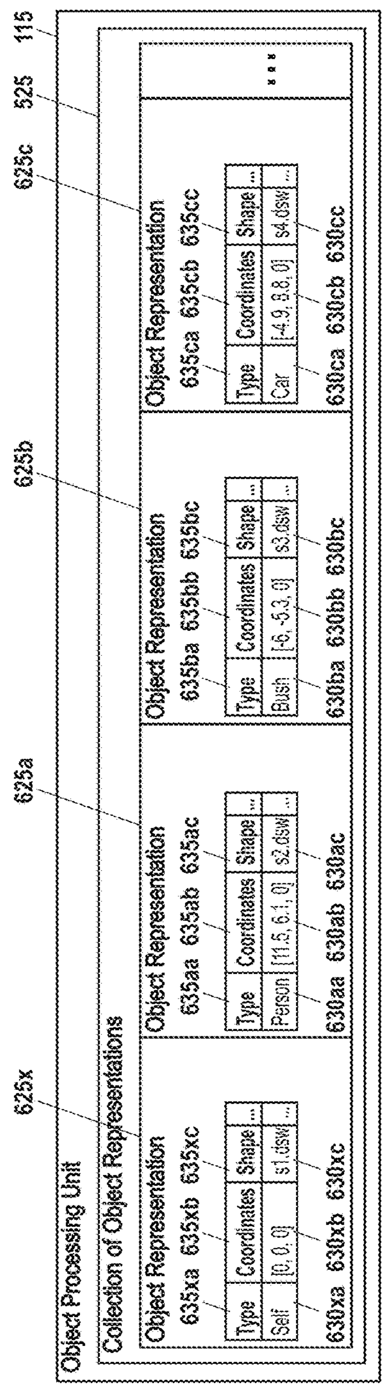

Referring to FIG. 10A-10B, an exemplary embodiment of a plurality of Objects 616 detected or obtained in Avatar's 605 surrounding and corresponding embodiment of Collection of Object Representations 525 are illustrated.

As shown for example in FIG. 10A, Avatar 605 may be detected or obtained. Avatar 605 may be defined to be relative origin at coordinates of [0, 0, 0], which if needed may be converted, calculated, determined, or estimated as Avatar's 605 distance of Om from Avatar 605 and Avatar's 605 bearing/angle of 0° from Avatar's 605 centerline. Avatar's 605 shape may be detected or obtained and stored in file s1.dsw. Object 616*a* is detected or obtained. Object 616*a* may be detected or obtained as a person. Object's 616*a* coordinates may be detected, obtained, determined, or calculated to be [11.5, 6.1, 0]. Object's 616*a* shape may be detected and stored in file s2.dsw. Furthermore, Object 616*b* is also detected or obtained. Object 616*b* may be detected or obtained as a bush. Object's 616*b* coordinates may be detected, obtained, determined, or calculated to be [−6,−5.3, 0]. Object's 616*b* shape may be detected and stored in file s3.dsw. Furthermore, Object 616*c* is also detected or obtained. Object 616*c* may be detected or obtained as a car. Object's 616*c* coordinates may be detected, obtained, determined, or calculated to be [−4.9, 8.8, 0]. Object's 616*c* shape may be detected and stored in file s4.dsw.

As shown for example in FIG. 10B, Object Processing Unit 115 may generate or create Collection of Object Representations 525 including Object Representation 625*x* representing Avatar 605 or state of Avatar 605, Object Representation 625*a* representing Object 616*a* or state of Object 616*a*, Object Representation 625*b* representing Object 616*b* or state of Object 616*b*, and Object Representation 625*c* representing Object 616*c* or state of Object 616*c*. For instance, Object Representation 625*x* may include Object Property 630*xa* "Self" in Field 635*xa* "Type", Object Property 630*xb* "[0, 0, 0]" in Field 635*xb* "Coordinates", Object Property 630*xc* "s1.dsw" in Field 635*xc* "Shape", etc. Also, Object Representation 625*a* may include Object Property 630*aa* "Person" in Field 635*aa* "Type", Object Property

630*ab* "[11.5, 6.1, 0]" in Field 635*ab* "Coordinates", Object Property 630*ac* "s2.dsw" in Field 635*ac* "Shape", etc. Also, Object Representation 625*b* may include Object Property 630*ba* "Bush" in Field 635*ba* "Type", Object Property 630*bb* "[−6,−5.3, 0]" in Field 635*bb* "Coordinates", Object Property 630*bc* "s3.dsw" in Field 635*bc* "Shape", etc. Also, Object Representation 625*c* may include Object Property 630*ca* "Car" in Field 635*ca* "Type", Object Property 630*cb* "[−4.9, 8.8, 0]" in Field 635*cb* "Coordinates", Object Property 630*cc* "s4.dsw" in Field 635*cc* "Shape", etc. It should be noted that, although, Objects' 616 locations defined by distance and bearing/angle from Avatar 605 and/or Objects' 616 locations defined by absolute coordinates may not be shown in this and at least some of the remaining figures nor recited in at least some of the remaining text for clarity, Objects' 616 locations defined by distance and bearing/angle from Avatar 605 and/or Objects' 616 locations defined by absolute coordinates can be included in Object Properties 630 and/or used instead of, in addition to, or in combination with Objects' 616 locations defined by relative coordinates relative to Avatar 605.

In some embodiments, one or more digital pictures of one or more Objects 616 may solely be used as one or more Object Representations 625 in which case Object Representations 625 as the intermediary holder can be optionally omitted. In other embodiments, one or more digital pictures of one or more Objects 616 may be used as one or more Object Properties 630 in one or more Object Representations 625.

One of ordinary skill in art will understand that the aforementioned data structures or arrangements are described merely as examples of a variety of possible implementations of Collections of Object Representations 525, Object Representations 625, Object Properties 630, other elements, and/or references thereto and that other data structures or arrangements can be utilized in alternate implementations. For example, other additional Collections of Object Representations 525, Object Representations 625, Object Properties 630, other elements, and/or references thereto can be included as needed, or some of the disclosed ones can be excluded or altered, or combination thereof can be utilized in alternate embodiments. In general, any data structure or arrangement can be utilized for implementing the described elements and/or functionalities. In some aspects, the use of references enables the system to use existing available Collections of Object Representations 525, Object Representations 625, Object Properties 630, and/or other elements that then do not need to be created, generated, or duplicated.

Figure 11:
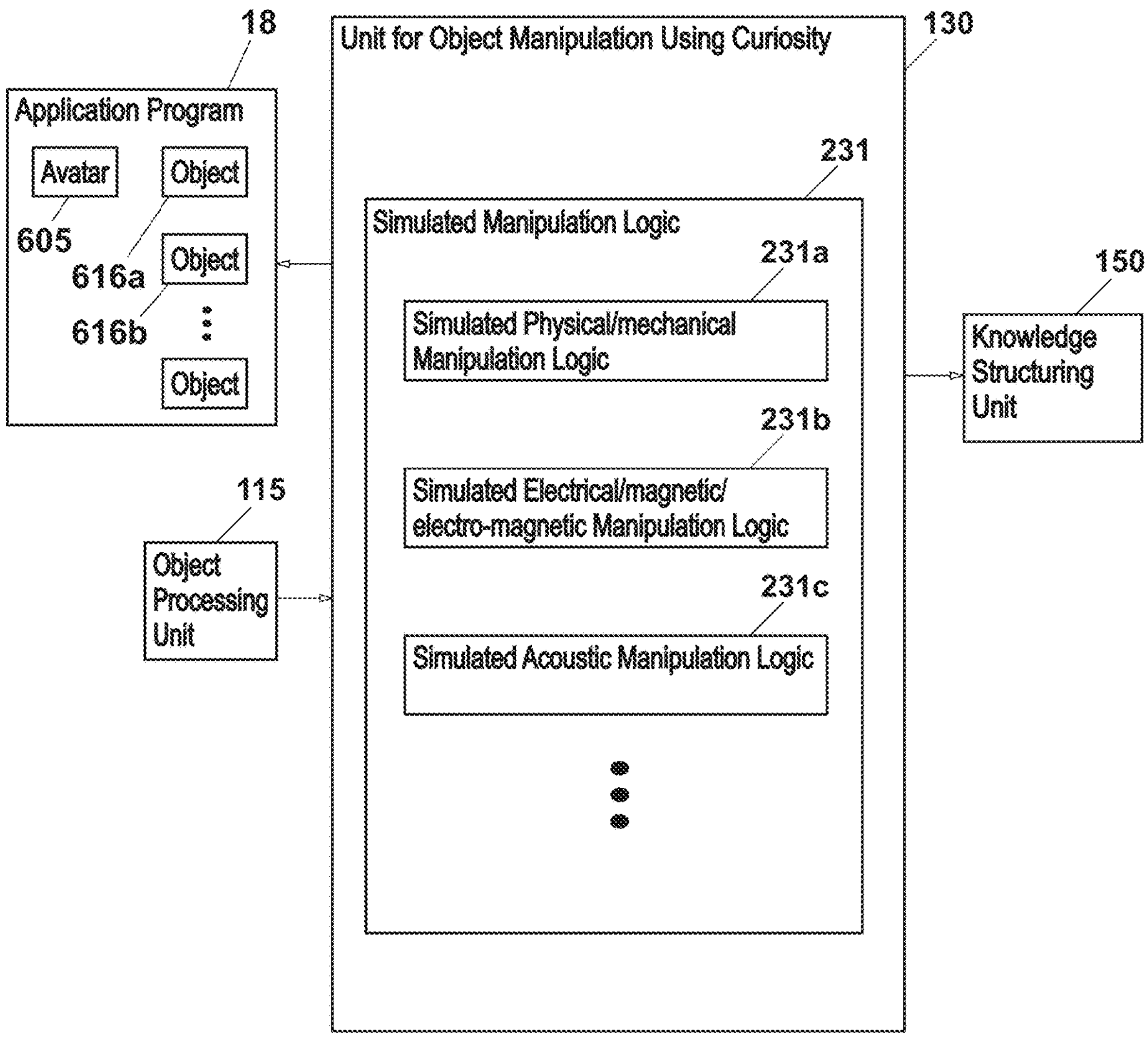
FIG. 11 illustrates an embodiment of Unit for Object Manipulation Using Curiosity 130.

Referring to FIG. 11, an embodiment of Unit for Object Manipulation Using Curiosity 130 is illustrated. Unit for Object Manipulation Using Curiosity 130 comprises functionality for causing Avatar's 605 manipulations of one or more Objects 616 (i.e. computer generated objects, etc.) using curiosity, and/or other functionalities. As curiosity includes an interest or desire to learn or know about something (i.e. as defined in English dictionary, etc.), Unit for Object Manipulation Using Curiosity 130 enables Avatar 605 with an interest or desire to learn its surrounding including Objects 616 in the surrounding. In some embodiments, one or more Objects 616, their states, and/or their properties can be detected or obtained by Object Processing Unit 115 and/or other elements, and provided as one or more Collections of Object Representations 525 to Unit for Object Manipulation Using Curiosity 130. Unit for Object Manipulation Using Curiosity 130 may then select or determine Instruction Sets 526 to be used or executed in Avatar's 605 manipulations of the one or more detected or obtained Objects 616 using curiosity. In some aspects, Unit for Object Manipulation Using Curiosity 130 may provide such Instruction Sets 526 to Application Program 18, Avatar 605, and/or other elements for execution or implementation. In other aspects, Unit for Object Manipulation Using Curiosity 130 may provide such Instruction Sets 526 to Instruction Set Implementation Interface 180 for execution or implementation. In further aspects, Unit for Object Manipulation Using Curiosity 130 may include any features, functionalities, and/or embodiments of Instruction Set Implementation Interface 180, in which case Unit for Object Manipulation Using Curiosity 130 can execute or implement such Instruction Sets 526. Unit for Object Manipulation Using Curiosity 130 may also provide such Instruction Sets 526 to Knowledge Structuring Unit 150 for knowledge structuring. Therefore, Unit for Object Manipulation Using Curiosity 130 can utilize curiosity to enable Avatar's 605 manipulations of one or more Objects 616 and/or learning knowledge related thereto. Unit for Object Manipulation Using Curiosity 130 may include any hardware, programs, or combination thereof.

Unit for Object Manipulation Using Curiosity 130 may include one or more Simulated Manipulation Logics 231 such as Simulated Physical/mechanical Manipulation Logic 231*a*, Simulated Electrical/magnetic/electro-magnetic Manipulation Logic 231*b*, Simulated Acoustic Manipulation Logic 231*c*, and/or others. Simulated Manipulation Logic 231 comprises functionality for selecting or determining Instruction Sets 526 to be used or executed in Avatar's 605 manipulations of one or more Objects 616 using curiosity, and/or other functionalities. In some designs, Simulated Manipulation Logic 231 may include or be provided with Instruction Sets 526 for operating Avatar 605 and/or elements thereof. Simulated Manipulation Logic 231 may select or determine one or more such Instruction Sets 526 to be used or executed in Avatar's 605 manipulations of one or more Objects 616 using curiosity. Such Instruction Sets 526 may provide control over Avatar's 605 elements such as movement elements (i.e. legs, wheels, etc.), manipulation elements (i.e. arm, etc.), transmitters (i.e. simulated radio transmitter, simulated light transmitter, simulated horn, etc.), sensors (i.e. Picture Renderer 476, Sound Renderer 477, simulated lidar, simulated radar, simulated sonar, etc.), and/or others. Hence, such Instruction Sets 526 may enable Avatar 605 to perform various operations such as movements, manipulations, transmissions, detections, and/or others that may facilitate herein-disclosed functionalities. In some aspects, such Instruction Sets 526 may be part of or be stored (i.e. hardcoded, etc.) in Simulated Manipulation Logic 231. In other aspects, such Instruction Sets 526 may be stored in Memory 12 or other repository where Simulated Manipulation Logic 231 can access the Instruction Sets 526. In further aspects, such Instruction Sets 526 may be stored in other elements where Simulated Manipulation Logic 231 can access the Instruction Sets 526 or that can provide the Instruction Sets 526 to Simulated Manipulation Logic 231. In some aspects, Simulated Manipulation Logic's 231 selecting or determining Instruction Sets 526 to be used or executed in Avatar's 605 manipulations of one or more Objects 616 using curiosity may include selecting or determining Instruction Sets 526 that can cause Avatar 605 to perform curious, experimental, inquisitive, and/or other manipulations of the one or more Objects 616. Such selecting/determining and/or manipulations may include an approach similar to an experiment (i.e. trial and analysis, etc.), inquiry, and/or other approach. In other aspects, Simulated Manipulation Logic's 231 selecting or determining Instruction Sets 526 to be used or executed in Avatar's 605 manipulations of one or more Objects 616 using curiosity may include selecting or determining Instruction Sets 526 randomly, in some order (i.e. Instruction Sets 526 stored/received first are used first, Instruction Sets 526 for simulated physical/mechanical manipulations are used first, etc.), in some pattern, or using other techniques. In further aspects, Simulated Manipulation Logic's 231 selecting or determining Instruction Sets 526 to be used or executed in Avatar's 605 manipulations of one or more Objects 616 using curiosity may include selecting or determining Instruction Sets 526 that can cause Avatar 605 to perform manipulations of the one or more Objects 616 that are not programmed or pre-determined to be performed on the one or more Objects 616. In further aspects, Simulated Manipulation Logic's 231 selecting or determining Instruction Sets 526 to be used or executed in Avatar's 605 manipulations of one or more Objects 616 using curiosity may include selecting or determining Instruction Sets 526 that can cause Avatar 605 to perform manipulations of the one or more Objects 616 to discover an unknown state of the one or more Objects 616. In general, Simulated Manipulation Logic's 231 selecting or determining Instruction Sets 526 to be used or executed in Avatar's 605 manipulations of one or more Objects 616 using curiosity may include selecting or determining Instruction Sets 526 that can cause Avatar 605 to perform manipulations of the one or more Objects 616 to enable learning of how one or more Objects 616 can be used, how one or more Objects 616 can be manipulated, how one or more Objects 616 react to manipulations, and/or other aspects or information related to one or more Objects 616. Therefore, Simulated Manipulation Logic's 231 selecting or determining Instruction Sets 526 to be used or executed in Avatar's 605 manipulations of one or more Objects 616 using curiosity enables learning Avatar's 605 manipulations of one or more Objects 616 using curiosity. Simulated Manipulation Logic 231 may include any logic, functions, algorithms, and/or other elements that enable selecting or determining Instruction Sets 526 to be used or executed in Avatar's 605 manipulations of one or more Objects 616 using curiosity. Since Avatar 605 and Objects 616 may exist in Application Program 18, a reference to Avatar 605 includes a reference to a computer generated or simulated avatar, a reference to Object 616 includes a reference to a computer generated or simulated object, and a reference to a manipulation includes a reference to a computer generated or simulated manipulation depending on context.

In one example, Simulated Physical/mechanical Manipulation Logic 231*a* may include or be provided with Instruction Sets 526 for simulated touching, simulated pushing, simulated pulling, simulated lifting, simulated dropping, simulated gripping, simulated twisting/rotating, simulated squeezing, simulated moving, and/or performing other simulated physical or mechanical manipulations of one or more Objects 616. Simulated Physical/mechanical Manipulation Logic 231*a* may select or determine any one or more of the Instruction Sets 526 to enable Avatar's 605 simulated physical or mechanical manipulations of one or more Objects 616 using curiosity.

Simulated Physical/mechanical Manipulation Logic 231*a* may include any features, functionalities, and embodiments of Physical/mechanical Manipulation Logic 230*a*, and/or other elements, and vice versa. Implementation of Simulated Physical/mechanical Manipulation Logic's 231*a* selected or determined Instruction Sets 526 and related manipulations may include any features, functionalities, and embodiments of the previously described 3D Application Program 18 and/or elements (i.e. 3D engine, graphics engine, simulation engine, game engine, or other such tool, etc.) thereof, and/or other elements.

In another example, Simulated Electrical/magnetic/electro-magnetic Manipulation Logic 231*b* may include or be provided with Instruction Sets 526 for stimulating with a simulated electric charge, stimulating with a simulated magnetic field, stimulating with a simulated electro-magnetic signal, stimulating with a simulated radio signal, illuminating with simulated light, and/or performing other simulated electrical, magnetic, or electro-magnetic manipulations of one or more Objects 616. Simulated Electrical/magnetic/electro-magnetic Manipulation Logic 231*b* may select or determine any one or more of the Instruction Sets 526 to enable Avatar's 605 simulated electrical, simulated magnetic, or simulated electro-magnetic manipulations of one or more Objects 616 using curiosity.

Simulated Electrical/magnetic/electro-magnetic Manipulation Logic 231*b* may include any features, functionalities, and embodiments of Electrical/magnetic/electro-magnetic Manipulation Logic 230*b*, and/or other elements, and vice versa. Implementation of Simulated Electrical/magnetic/electro-magnetic Manipulation Logic's 231*b* selected or determined Instruction Sets 526 and related manipulations may include any features, functionalities, and embodiments of the previously described 3D Application Program 18 and/or elements (i.e. 3D engine, graphics engine, simulation engine, game engine, or other such tool, etc.) thereof, aforementioned simulated lidar and/or Lidar Processing Unit 117*c*, aforementioned simulated radar and/or Radar Processing Unit 117*d*, Picture Renderer 476 and/or Picture Recognizer 117*a*, and/or other elements.

In a further example, Simulated Acoustic Manipulation Logic 231*c* may include or be provided with Instruction Sets 526 for stimulating with simulated sound, and/or performing other simulated acoustic manipulations of one or more Objects 616. Simulated Acoustic Manipulation Logic 231*c* may select or determine any one or more of the Instruction Sets 526 to enable Avatar's 605 simulated acoustic manipulations of one or more Objects 616 using curiosity.

Simulated Acoustic Manipulation Logic 231*c* may include any features, functionalities, and embodiments of Acoustic Manipulation Logic 230*c*, and/or other elements, and vice versa. Implementation of Simulated Acoustic Manipulation Logic's 231*c* selected or determined Instruction Sets 526 and related manipulations may include any features, functionalities, and embodiments of the previously described 3D Application Program 18 and/or elements (i.e. 3D engine, graphics engine, simulation engine, game engine, or other such tool, etc.) thereof, aforementioned simulated sonar and/or Sonar Processing Unit 117*e*, Sound Renderer 477 and/or Sound Recognizer 117*b*, and/or other elements.

In some embodiments, Unit for Object Manipulation Using Curiosity 130 may cause Avatar 605 to perform simulated physical or mechanical manipulations of one or more Objects 616 using curiosity examples of which include simulated touching, simulated pushing, simulated pulling, simulated lifting, simulated dropping, simulated gripping, simulated twisting/rotating, simulated squeezing, simulated moving, and/or others. Unit for Object Manipulation Using Curiosity 130 may also cause Avatar 605 to perform a combination of the aforementioned and/or other manipulations. It should be noted that a manipulation may include one or more manipulations as, in some designs, the manipulation may be a combination of simpler or other manipulations. In some aspects, Avatar's 605 simulated physical or mechanical manipulations may be implemented by one or more portions or elements of Avatar 605 controlled by Unit for Object Manipulation Using Curiosity 130, and/or other processing elements. For example, Unit for Object Manipulation Using Curiosity 130 may cause Processor 11, Application Program 18, and/or other processing element to execute one or more Instruction Sets 526 responsive to which one or more portions or elements of Avatar 605 may implement Avatar's 605 simulated physical or mechanical manipulations of the one or more Objects 616. Such Avatar's 605 simulated physical or mechanical manipulations of one or more Objects 616 may include any features, functionalities, and/or embodiments of the previously described 3D Application Program 18 and/or elements (i.e. 3D engine, graphics engine, simulation engine, game engine, or other such tool, etc.) thereof, and/or other elements that describe the simulated physics, mechanics, and/or other aspects of Avatar 605, Objects 616, and/or other objects or elements in 3D Application Program 18. Specifically, for instance, a gate Object 616 may be detected or obtained at a distance of 0.5 meters in front of Avatar 605. Simulated Physical/mechanical Manipulation Logic 231*a* may select or determine one or more Instruction Sets 526 (i.e. Avatar.Arm.touch (0.5, forward), etc.) to cause Avatar's 605 arm to extend forward (i.e. zero degrees bearing, etc.) 0.5 meters to touch the gate Object 616. Any simulated push, simulated pull, and/or other simulated physical or mechanical manipulations of the gate Object 616 can similarly be implemented by selecting or determining one or more Instruction Sets 526 corresponding to the desired manipulation. Any Instruction Sets 526 can also be selected or determined to cause Avatar 605 or Avatar's 605 arm to move or adjust so that the gate Object 616 is in the range or otherwise convenient for Avatar's 605 arm. Any other simulated physical, mechanical, and/or other simulated manipulations of the gate Object 616 or any other one or more Objects 616 can be implemented using similar approaches. In other embodiments, Unit for Object Manipulation Using Curiosity 130 may cause Avatar 605 to perform simulated electrical, magnetic, or electro-magnetic manipulations of one or more Objects 616 using curiosity examples of which include stimulating with a simulated electric charge, stimulating with a simulated magnetic field, stimulating with a simulated electro-magnetic signal, stimulating with a simulated radio signal, illuminating with simulated light, and/or others. Unit for Object Manipulation Using Curiosity 130 may also cause Avatar 605 to perform a combination of the aforementioned and/or other manipulations. In some aspects, Avatar's 605 simulated electrical, magnetic, electro-magnetic, and/or other manipulations may be implemented by one or more simulated transmitters (i.e. simulated electric charge transmitter, simulated electromagnet, simulated radio transmitter, simulated laser or other light transmitter, etc.; not shown) or other elements controlled by Unit for Object Manipulation Using Curiosity 130, and/or other processing elements. Such simulated transmitters may include any features, functionalities, and/or embodiments of the previously described 3D Application Program 18 and/or elements (i.e. 3D engine, graphics engine, simulation engine, game engine, or other such tool, etc.) thereof, simulated lidar and/or Lidar Processing Unit 117*c*, simulated radar and/or Radar Processing Unit 117*d*, and/or other elements that describe simulated/modeled emission and propagation of various signals (i.e. electric, magnetic, electro-magnetic, radio, light, etc.) in a computer generated space of a 3D Application Program 18 including utilizing of any scattering, reflections, refractions, diffractions, and/or other effects or techniques. For example, Unit for Object Manipulation Using Curiosity 130 may cause Processor 11, Application Program 18, and/or other processing element to execute one or more Instruction Sets 526 responsive to which one or more simulated transmitters may implement Avatar's 605 simulated electrical, magnetic, electro-magnetic, and/or other manipulations of the one or more Objects 616. Specifically, for instance, a cat Object 616 may be detected or obtained in Avatar's 605 surrounding. Simulated Electrical/magnetic/electro-magnetic Manipulation Logic 231*b* may select or determine one or more Instruction Sets 526 (i.e. Avatar.light.activate (8), etc.) to cause Avatar's 605 simulated light transmitter (i.e. simulated flash light, simulated laser array, etc.; not shown) to illuminate the cat Object 616 with simulated light. Any Instruction Sets 526 can also be selected or determined to cause Avatar 605 or Avatar's 605 simulated light transmitter to move or adjust so that the cat Object 616 is in the range or otherwise convenient for Avatar's 605 simulated light transmitter. Any other simulated electrical, magnetic, electro-magnetic, and/or other manipulations of the cat Object 616 or other one or more Objects 616 can be implemented using similar approaches. In further embodiments, Unit for Object Manipulation Using Curiosity 130 may cause Avatar 605 to perform simulated acoustic manipulations of one or more Objects 616 using curiosity examples of which include stimulating with a simulated sound, and/or others. Unit for Object Manipulation Using Curiosity 130 may also cause Avatar 605 to perform a combination of the aforementioned and/or other manipulations. In some aspects, Avatar's 605 simulated acoustic, and/or other manipulations may be implemented by one or more simulated transmitters (i.e. simulated speaker, simulated horn, etc.; not shown) or other elements controlled by Unit for Object Manipulation Using Curiosity 130, and/or other processing elements. Such simulated transmitters may include any features, functionalities, and/or embodiments of the previously described 3D Application Program 18 and/or elements (i.e. 3D engine, graphics engine, simulation engine, game engine, or other such tool, etc.) thereof, simulated sonar and/or Sonar Processing Unit 117*e*, and/or other elements that describe emission and propagation of sound simulated/modeled in a computer generated space of a 3D Application Program 18 including utilizing of any scattering, reflections, refractions, diffractions, and/or other effects or techniques. For example, Unit for Object Manipulation Using Curiosity 130 may cause Processor 11, Application Program 18, and/or other processing element to execute one or more Instructions Sets 526 responsive to which one or more simulated sound transmitters (not shown) may implement Avatar's 605 simulated acoustic and/or other manipulations of the one or more Objects 616. Specifically, for instance, a person Object 616 may be detected or obtained in Avatar's 605 path. Simulated Acoustic Manipulation Logic 231*c* may select or determine one or more Instruction Sets 526 (i.e. Avatar.horn.activate (3), etc.) to cause Avatar's 605 simulated sound transmitter (i.e. simulated speaker, simulated horn, etc.) to stimulate the person Object 616 with simulated sound. Any Instruction Sets 526 can also be selected or determined to cause Avatar 605 or Avatar's 605 simulated sound transmitter to move or adjust so that the person Object 616 is in the range or otherwise convenient for Avatar's 605 simulated sound transmitter. Any other simulated acoustic and/or other manipulations of the person Object 616 or other one or more Objects 616 can be implemented using similar approaches. In yet further embodiments, simulated approaching, simulated retreating, simulated relocating, or simulated moving relative to one or more Objects 616 is considered a manipulation of the one or more Objects 616. In general, simulated manipulation includes any simulated manipulation, simulated operation, simulated stimulus, and/or simulated effect on any one or more Objects 616 or the environment.

In some aspects, Unit for Object Manipulation Using Curiosity 130 may include or be provided with no information on how one or more Objects 616 can be used and/or manipulated. For example, not knowing anything about one or more detected or obtained Objects 616, Unit for Object Manipulation Using Curiosity 130 can cause Avatar 605 to perform any of the aforementioned manipulations of the one or more Objects 616. Specifically, for instance, after a gate Object 616 is detected or obtained, Simulated Physical/mechanical Manipulation Logic 231*a* can select or determine Instruction Sets 526 randomly, in some order (i.e. one or more simulated touches first, one or more simulated pushes second, one or more simulated pulls third, etc.), in some pattern, or using other techniques to cause Avatar's 605 arm to manipulate the gate Object 616. Furthermore, Unit for Object Manipulation Using Curiosity 130 can exhaust using one type of manipulation before implementing another type of manipulation. For example, Unit for Object Manipulation Using Curiosity 130 can cause Avatar 605 or its elements to perform a simulated touch of an Object 616 in a variety of or all possible places before implementing one or more simulated push manipulations. In other aspects, Unit for Object Manipulation Using Curiosity 130 may include or be provided with some information on how certain Objects 616 can be used and/or manipulated. For example, when an Object 616 is detected or obtained, Unit for Object Manipulation Using Curiosity 130 can use any available information on the Object 616 such as object affordances, object conditions, consequential object elements (i.e. sub-objects, etc.), and/or others in deciding which manipulations to implement. Specifically, for instance, after a gate Object 616 is detected or obtained, information may be available that one of the gate Object's 616 affordances is opening and that such opening can be effected at least in part by pulling down the gate Object's 616 lever, hence, Simulated Physical/mechanical Manipulation Logic 231*a* can use this information to select or determine Instructions Sets 526 to cause Avatar's 605 arm to simulate pulling down the gate Object's 616 lever in simulated opening of the gate Object 616. In further aspects, Unit for Object Manipulation Using Curiosity 130 may include or be provided with general information on how certain types of Objects 616 can be used and/or manipulated. For example, when an Object 616 is detected or obtained, Unit for Object Manipulation Using Curiosity 130 can use any available general information on the Object 616 such as shape, size, and/or others in deciding which manipulations to implement. Specifically, for instance, after a circular knob on a gate Object 616 is detected, general information may be available that any circular Object 616 can be twisted/rotated, hence, Simulated Physical/mechanical Manipulation Logic 231*a* can use this information to select or determine Instructions Sets 526 to cause Avatar's 605 arm to perform a simulated twist/rotatation of the gate Object's 616 knob. In general, Unit for Object Manipulation Using Curiosity 130 may include or be provided with any information that can help Unit for Object Manipulation Using Curiosity 130 to decide which manipulations to implement. This way, Unit for Object Manipulation Using Curiosity 130 can cause Avatar 605 to perform manipulations of one or more Objects 616 in a more focused manner and save time or other resources that would otherwise be spent on insignificant manipulations.

In some aspects, Unit's for Object Manipulation Using Curiosity 130 causing Avatar 605 to perform manipulations of one or more Objects 616 using curiosity may resemble curious object manipulations of a child where a child can perform any manipulations of objects in its surrounding to learn how an object can be used, how an object can be manipulated, how an object reacts to manipulations, and/or other aspects or information related to an object as previously described. In some aspects, similar to a child being genetically programmed to be curious, an interest or desire to learn its surrounding including Objects 616 in the surrounding (i.e. curiosity, etc.) can be programmed or configured into Unit for Object Manipulation Using Curiosity 130 and/or other elements. Therefore, in some aspects, instead of ignoring one or more Objects 616, Unit for Object Manipulation Using Curiosity 130 may be configured to deliberately cause Avatar 605 to perform manipulations of the one or more Objects 616 with a purpose of learning related knowledge.

In some embodiments where multiple Objects 616 are detected or obtained, Unit for Object Manipulation Using Curiosity 130 can cause manipulations of the Objects 616 one at a time by random selection, in some order (i.e. first detected or obtained Object 616 gets manipulated first, etc.), in some pattern (i.e. large Objects 616 get manipulated first, etc.), and/or using other techniques. In other embodiments where multiple Objects 616 are detected or obtained, Unit for Object Manipulation Using Curiosity 130 can focus manipulations on one Object 616 or a group of Objects 616, and ignore other detected or obtained Objects 616. This way, learning of Avatar's 605 manipulations of one or more Objects 616 using curiosity can focus on one or more Objects 616 of interest. Any logic, functions, algorithms, and/or other techniques can be used in deciding which Objects 616 are of interest. For example, after detecting or obtaining a gate Object 616, a bush Object 616, and a rock Object 616, Unit for Object Manipulation Using Curiosity 130 may focus on manipulations of the gate Object 616. In further embodiments, any part of Object 616 can be recognized as Object 616 itself or sub-Object 616 and Unit for Object Manipulation Using Curiosity 130 can cause Avatar 605 to perform simulated manipulations of it individually or as part of a main Object 616. In some designs, Unit for Object Manipulation Using Curiosity 130 may be configured to give higher priority to manipulations of such sub-Objects 616 as the sub-Objects 616 may be consequential in manipulating of the main Object 616. In some aspects, any protruded part of a main Object 616 may be recognized as sub-Object 616 of the main Object 616 that can be manipulated with priority. For example, a knob or lever sub-Object 616 of a gate Object 616 may be manipulated with priority. In further embodiments, Unit for Object Manipulation Using Curiosity 130 may cause Avatar 605 to perform manipulations of one or more Objects 616 that can result in the one or more Objects 616 manipulating of another one or more Objects 616. For example, Unit for Object Manipulation Using Curiosity 130 may cause Avatar 605 to emit a simulated sound signal that can result in a person or other Object 616 coming and opening a gate Object 616 so Avatar 605 can go through it (i.e. similar to a cat meowing to have someone come and open a door for the cat, etc.). In further embodiments, as some manipulations of one or more Objects 616 using curiosity may not result in changing a state of the one or more Objects 616, the system may be configured to focus on learning manipulations of one or more Objects 616 using curiosity that result in changing a state of the one or more Objects 616. Still, knowledge of some or all manipulations of one or more Objects 616 using curiosity that do not result in changing a state of the one or more Objects 616 may be useful and can be learned by the system. In further embodiments, Unit for Object Manipulation Using Curiosity 130 or elements thereof (i.e. Simulated Manipulation Logics 231, etc.) may select or determine Instruction Sets 526 for Avatar's 605 manipulations of one or more Objects 616 using curiosity and cause Avatar Control Program 18*b* (later described) to implement or execute the Instruction Sets 526. Any features, functionalities, and/or embodiments of Instruction Set Implementation Interface 180 can be used in such causing of implementation or execution. In some aspects, as learning Avatar's 605 manipulation of one or more Objects 616 using curiosity may include various elements and/or steps (i.e. selecting or determining Instruction Sets 526 for performing the manipulation, executing Instruction Sets 526 for performing the manipulation, performing the manipulation by Avatar 605 and/or its portions/elements, and/or others, etc.), the elements and/or steps utilized in learning Avatar's 605 manipulation of one or more Objects 616 using curiosity may also use curiosity. Also, in some aspects, a manipulation may include not only the act of manipulating, but also, a state of one or more Objects 616 before the manipulation and a state of one or more Objects 616 after the manipulation. In further aspects, any of the functionalities of Unit for Object Manipulation Using Curiosity 130 may be performed autonomously and/or proactively. One of ordinary skill in art will understand that the aforementioned elements and/or techniques related to Unit for Object Manipulation Using Curiosity 130 are described merely as examples of a variety of possible implementations, and that while all possible elements and/or techniques related to Unit for Object Manipulation Using Curiosity 130 are too voluminous to describe, other elements and/or techniques are within the scope of this disclosure. For example, other additional elements and/or techniques can be included as needed, or some of the disclosed ones can be excluded or altered, or a combination thereof can be utilized in alternate embodiments of Unit for Object Manipulation Using Curiosity 130.

Contrasting an avatar that does not use curiosity and LTCUAK-enabled Avatar 605 that uses curiosity may be helpful in understanding the disclosed systems, devices, and methods. In some aspects of contrasting the two, an avatar that does not use curiosity is programmed to ignore certain Objects 616 and simply does not have an interest or desire to learn about the Objects 616. For example, a simulated automatic lawn mower avatar that does not use curiosity may detect a gate Object 616 and not have any interest or desire to learn about the gate Object 616 since it is not programmed to perform any operations on/with the gate Object 616, let alone learn about the gate Object 616. Conversely, LTCUAK-enabled Avatar 605 that uses curiosity is enabled with an interest or desire to learn its surrounding including Objects 616 in the surrounding. For example, LTCUAK-enabled lawn mower Avatar 605 may detect a gate Object 616 and perform curious, inquisitive, experimental, and/or other manipulations of the gate Object 616 (i.e. use curiosity, etc.) to learn how the gate Object 616 can be used, learn how the gate Object 616 can be manipulated, learn how the gate Object 616 reacts to manipulations, and/or learn other aspects or information related to the gate Object 616. Once learned, any avatar or device can use such artificial knowledge to enable additional functionalities that the avatar or device did not have or was not programmed to have. In other aspects of contrasting an avatar that does not use curiosity and LTCUAK-enabled Avatar 605 that uses curiosity, an avatar that does not use curiosity is programmed to perform a specific operation on/with a specific Object 616. Since it is programmed to perform a specific operation on a specific Object 616, the avatar knows what can be done on/with the Object 616, knows how the Object 616 can be operated, and knows/expects subsequent/resulting state of the Object 616 following the operation. For example, a simulated automatic lawn mower avatar that does not use curiosity may detect a gate Object 616, know that the gate Object 616 can be opened (i.e. known use, etc.), know how to open the gate Object 616 (i.e. known operation, etc.), and know/expect the subsequent/resulting open state (i.e. known subsequent/resulting state, etc.) of the gate Object 616 following an opening operation. Therefore, the simulated automatic lawn mower avatar does not use curiosity and no learning results from its opening of the gate Object 616 (i.e. it simply does what it is programmed to do). Conversely, LTCUAK-enabled Avatar 605 that uses curiosity is enabled with an interest or desire to learn its surrounding including Objects 616 in the surrounding. Since it is enabled with an interest or desire to learn about an Object 616, LTCUAK-enabled Avatar 605 may not know what can be done on/with the Object 616, may not know how the Object 616 can be manipulated, and may not know subsequent/resulting state of the Object 616 following a manipulation. For example, LTCUAK-enabled lawn mower Avatar 605 that uses curiosity may detect a gate Object 616, not know that the gate Object 616 can be opened (i.e. unknown use, etc.), not know how to open the gate Object 616 (i.e. unknown simulated manipulation, etc.), and not know the subsequent/resulting open state (i.e. unknown subsequent/resulting state, etc.) of the gate Object 616 following an opening manipulation. Therefore, the LTCUAK-enabled lawn mower Avatar 605 may perform curious, inquisitive, experimental, and/or other manipulations of the gate Object 616 (i.e. use curiosity, etc.) to learn how the gate Object 616 can be used, learn how the gate Object 616 can be manipulated, learn how the gate Object 616 reacts to manipulations, and/or learn other aspects or information related to the gate Object 616.

Figure 12:
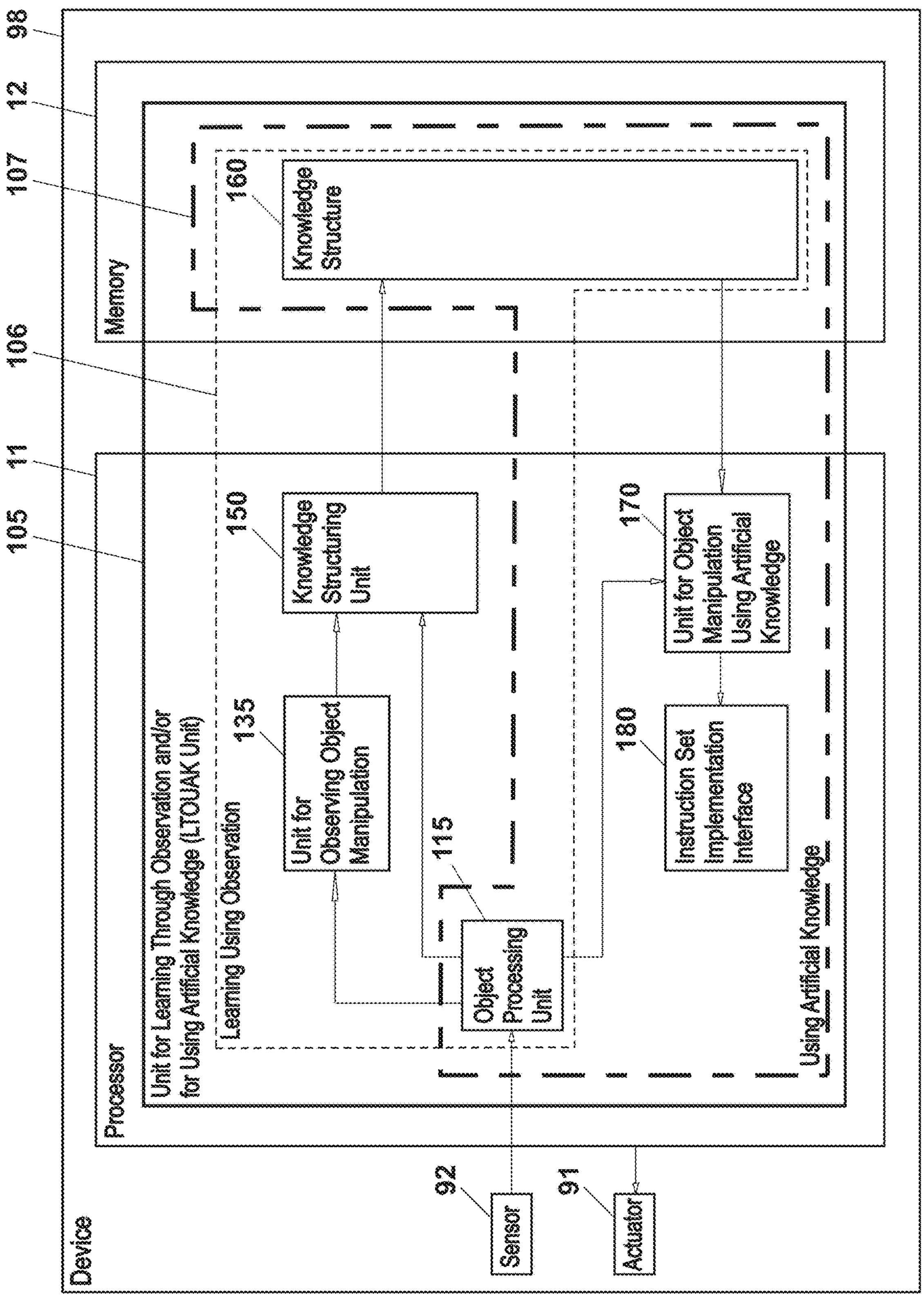
FIG. 12 illustrates an embodiment of Unit for Learning Through Observation and/or for Using Artificial Knowledge 105 providing its functionalities to Device 98.

Referring to FIG. 12, an embodiment of Device 98 comprising Unit for Learning Through Observation and/or for Using Artificial Knowledge 105 (also referred to as LTOUAK Unit 105, LTOUAK, artificial intelligence unit, and/or other suitable name or reference, etc.) is illustrated. LTOUAK Unit 105 comprises functionality for learning observed manipulations of one or more Objects 615 (i.e. manipulated physical objects, etc.; later described). LTOUAK Unit 105 comprises functionality for causing Device's 98 manipulations of one or more Objects 615 using the learned knowledge (i.e. artificial knowledge, etc.). LTOUAK Unit 105 may comprise other functionalities. In some designs, LTOUAK Unit 105 comprises connected Object Processing Unit 115, Unit for Observing Object Manipulation 135, Knowledge Structuring Unit 150, Knowledge Structure 160, Unit for Object Manipulation Using Artificial Knowledge 170, and Instruction Set Implementation Interface 180. Other additional elements can be included as needed, or some of the disclosed ones can be excluded or altered, or a combination thereof can be utilized in alternate embodiments. In some aspects and only for illustrative purposes, Learning Using Observation 106 grouping may include elements indicated in the thin dotted line and/or other elements that may be used in the learning using observation functionalities of LTOUAK Unit 105. In other aspects and only for illustrative purposes, Using Artificial Knowledge 107 grouping may include elements indicated in the thick dotted line and/or other elements that may be used in the using artificial knowledge functionalities of LTOUAK Unit 105. Any combination of Learning Using Observation 106 grouping or elements thereof and Using Artificial Knowledge 107 grouping or elements thereof, and/or other elements, can be used in various embodiments. LTOUAK Unit 105 and/or its elements comprise any hardware, programs, or a combination thereof.

Figure 13:
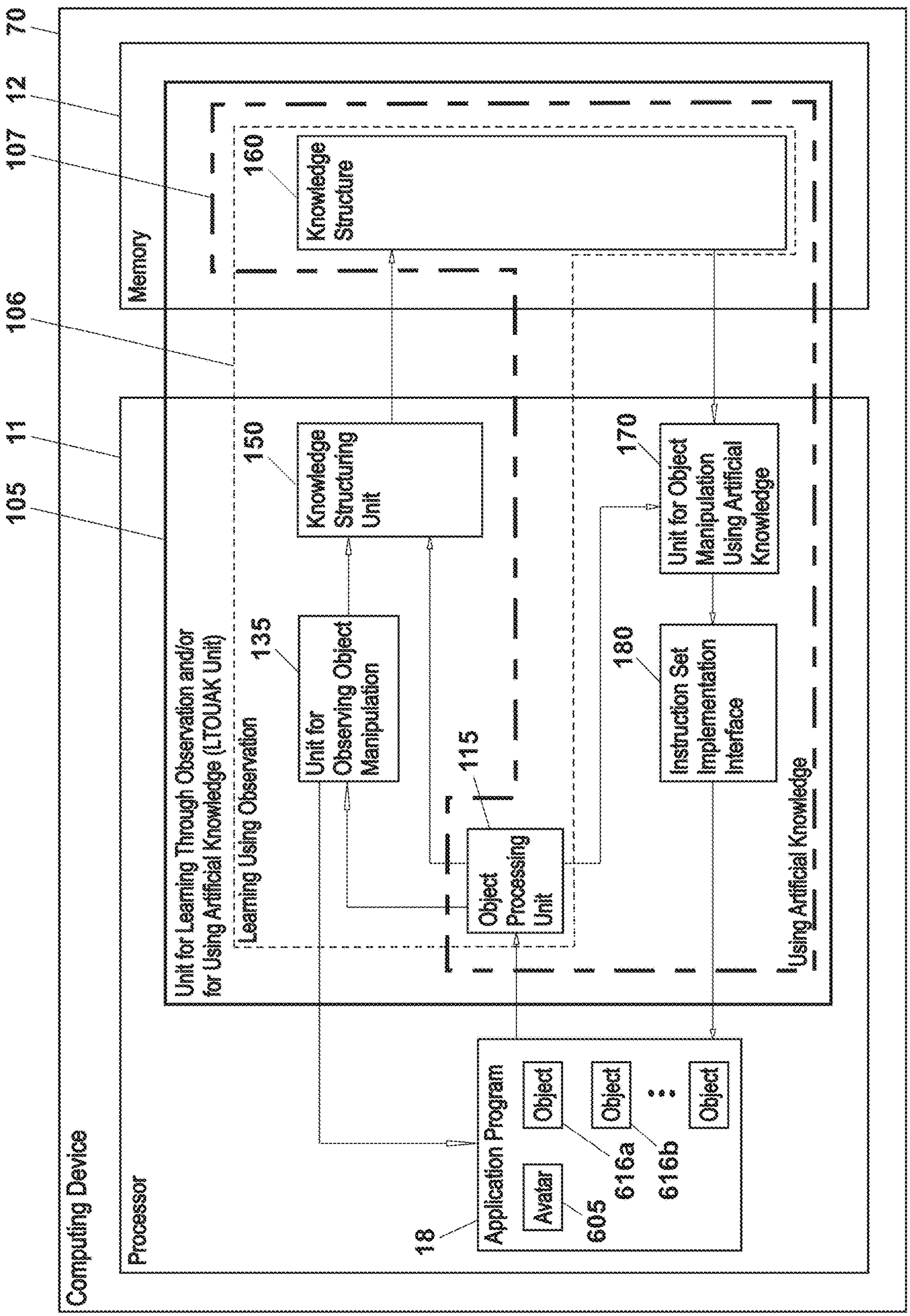
FIG. 13 illustrates an embodiment of Unit for Learning Through Observation and/or for Using Artificial Knowledge 105 providing its functionalities to Application Program 18 and/or elements (i.e. Avatar 605, etc.) thereof.

Referring to FIG. 13, an embodiment of Computing Device 70 comprising Unit for Learning Through Observation and/or for Using Artificial Knowledge 105 (LTOUAK Unit 105) is illustrated. Computing Device 70 further comprises Processor 11 and Memory 12. Processor 11 includes or executes Application Program 18 comprising Avatar 605 and/or one or more Objects 616 (i.e. computer generated objects, etc.; later described). Although not shown for clarity of illustration, any portion of Application Program 18, Avatar 605, Objects 616, and/or other elements can be stored in Memory 12. LTOUAK Unit 105 comprises functionality for learning observed manipulations of one or more Objects 616 (i.e. manipulated computer generated objects, etc.; later described). LTOUAK Unit 105 comprises functionality for causing Avatar's 605 manipulations of one or more Objects 616 using the learned knowledge (i.e. artificial knowledge, etc.). LTOUAK Unit 105 may comprise other functionalities. For example, one Object 616 (i.e. manipulating Object 616, etc.) may be configured or programmed (i.e. in a simulation, in a video game, in a virtual world, using any algorithm, etc.) to manipulate other one or more Objects 616 (i.e. manipulated Objects 616, etc.) in Application Program 18 where LTOUAK Unit 105 or elements thereof can observe and learn the Object's 616 manipulations of the other one or more Objects 616. In another example, LTOUAK Unit 105 or elements thereof can cause Avatar 605 in Application Program 18 to manipulate one or more Objects 616 using the learned knowledge (i.e. artificial knowledge, etc.).

Figure 14A:
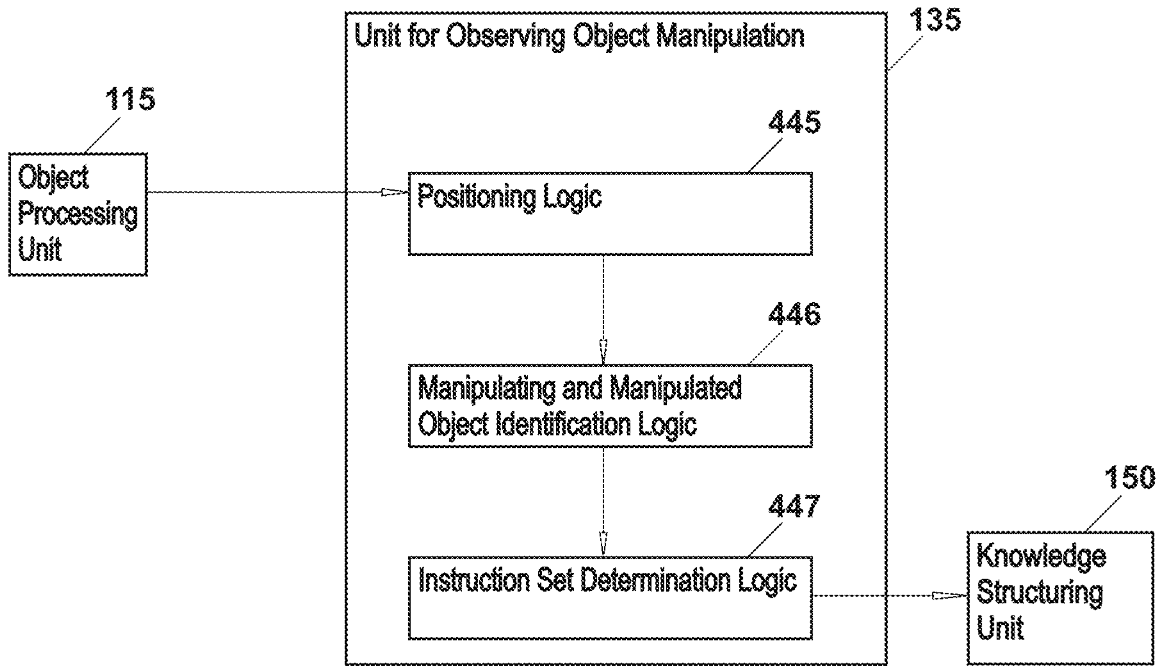
FIG. 14A-14B illustrate some embodiments of Unit for Observing Object Manipulation 135.

Referring to FIG. 14A, an embodiment of Unit for Observing Object Manipulation 135 is illustrated. Unit for Observing Object Manipulation 135 comprises functionality for causing Device 98 to observe manipulations of one or more Objects 615 (i.e. manipulated Objects 615, manipulated physical objects, etc.). Unit for Observing Object Manipulation 135 comprises functionality for determining Instruction Sets 526 that would cause Device 98 to perform observed manipulations of one or more Objects 615. Unit for Observing Object Manipulation 135 may comprise other functionalities. In some designs, Unit for Observing Object Manipulation 135 may include connected Positioning Logic 445, Manipulating and Manipulated Object Identification Logic 446, and Instruction Set Determination Logic 447. Other additional elements can be included as needed, or some of the disclosed ones can be excluded or altered, or a combination thereof can be utilized in alternate embodiments. For example, a manipulating Object 615 and a manipulated Object 615, their states, and/or their properties can be detected by Sensor 92, processed by Object Processing Unit 115, and provided as one or more Collections of Object Representations 525 to Unit for Observing Object Manipulation 135. Unit for Observing Object Manipulation 135 may cause Device 98 to observe the manipulating Object's 615 manipulations of the manipulated Object 615 to enable learning of how Device 98 can manipulate the manipulated Object 615. Unit for Observing Object Manipulation 135 and/or elements thereof may include any hardware, programs, or combination thereof.

Positioning Logic 445 comprises functionality for causing Device 98 and/or its one or more Sensors 92 to position itself/themselves to observe manipulations of one or more Objects 615 (i.e. manipulated Objects 615, etc.), and/or other functionalities.

In some embodiments, Positioning Logic 445 may cause Device 98 to move to facilitate finding one or more Objects 615 of interest. Object 615 of interest may include Object 615 that is in a manipulating relationship or may potentially enter into a manipulating relationship with another Object 615 (i.e. a manipulating Object 615 manipulates a manipulated Object 615, etc.). In some aspects, Positioning Logic 445 may cause Device 98 to traverse its surrounding to find one or more Objects 615 of interest. Any traversal or movement patterns or techniques can be utilized such as linear, circular, elliptical, rectangular, triangular, octagonal, zig-zag, spherical, cubical, pyramid-like, and/or others. Any object avoidance algorithms or techniques can also be utilized to avoid collisions of Device 98 and Objects 615 in Device's 98 traversal or movement. In general, any techniques, algorithms, and/or patterns, and/or those known in art, can be utilized in Device's 98 traversal or movement. In other embodiments, Device 98 and/or its one or more Sensors 92 may be stationary in which case Positioning Logic 445 can be optionally omitted. Such stationary Device 98 can observe its surrounding from a single location and process Objects 615 in its surrounding without proactively moving to facilitate finding one or more Objects 615 of interest. In further embodiments, causing Device 98 to move and to stop can be used in combination. For example, Positioning Logic 445 may cause Device 98 to move in order to find one or more Objects 615 of interest at which point Positioning Logic 445 can cause Device 98 to stop to observe the one or more Objects 615 of interest.

In some embodiments, Positioning Logic 445 can identify one or more Objects 615 of interest. In some aspects, Object 615 and/or part thereof in a manipulating relationship with another Object 615 may move and/or transform (i.e. a person Object 615 and/or part thereof may move and/or transform to open a door Object 615, etc.). Positioning Logic 445 may, therefore, look for moving and/or transforming Objects 615 in Device's 98 surrounding (i.e. similar to a person or animal directing his/her/its attention to moving and/or transforming objects, etc.). In one example, a moving Object 615 can be identified by processing a stream of Collections of Object Representations 525 (i.e. from Object Processing Unit 115, etc.) and identifying Object Representation 625 whose coordinates Object Property 630 changes. In another example, a transforming Object 615 can be determined by processing a stream of Collections of Object Representations 525 and identifying Object Representation 625 whose shape Object Property 630 changes. Similarly, in a further example, an inactive Object 615 can be determined by processing a stream of Collections of Object Representations 525 and identifying Object Representation 625 whose coordinate Object Property 630 and/or shape Object Property 630 do not change. In other aspects, Object 615 and/or part thereof in a manipulating relationship with another Object 615 may produce sound (i.e. a door Object 615 squeaks while being opened by a person Object 615 or part thereof, etc.). Positioning Logic 445 may, therefore, look for Objects 615 and/or parts thereof in Device's 98 surrounding that produce sound (i.e. similar to a person or animal directing his/her/its attention to objects that produce sound, etc.). In one example, Object 615 and/or part thereof that produces sound can be determined by processing a stream of Collections of Object Representations 525 and identifying Object Representation 625 that includes any sound related Object Property 630. In another example, Object 615 and/or part thereof that produces sound can be determined by processing a stream of sound samples from Microphone 92*b* as previously described, by using directionality of one or more Microphones 92*b* as previously described, and/or by using any features, functionalities, or embodiments of Microphone 92*b* and/or Sound Recognizer 117*b*. In such examples, Positioning Logic 445 may receive input (not shown) from Microphone 92*b* and/or Sound Recognizer 117*b*. In general, one or more Objects 615 of interest can be identified using any technique, and/or those known in art. In some implementations, Objects 615 in a certain vicinity (i.e. threshold radius or other shape area can be used for vicinity, etc.) from identified one or more Objects 615 of interest can also be regarded as Objects 615 of interest and considered by Positioning Logic 445. In some aspects, Positioning Logic 445 may include any features, functionalities, and/or embodiments of Manipulating and Manipulated Object Identification Logic 446 (later described), while, in other aspects, Positioning Logic 445 may work in combination with Manipulating and Manipulated Object Identification Logic 446.

In some embodiments, once one or more Objects 615 of interest are identified, Positioning Logic 445 may cause Device 98 and/or its one or more Sensors 92 to perform various movements, actions, and/or operations relative to the one or more Objects 615 of interest to optimize observation of the one or more Objects 615 of interest. In some aspects, Positioning Logic 445 can cause Device 98 to move to a location at an optimal observing distance from the one or more Objects 615 of interest. A value for optimal observing distance can be utilized such as 0.27 meters, 2.3 meters, 16.8 meters, and/or others. In other aspects, Positioning Logic 445 can cause Device 98 to move to a location relative to the one or more Objects 615 of interest that provides an optimal observing angle. A value for optimal observing angle can be utilized such as 90° (i.e. perpendicular, etc.), 29.6°, 148.1°, 303.9°, and/or others. One of ordinary skill in art will understand that values for optimal observing distance and/or angle can be defined by a user, by system administrator, or automatically by the system based on experience, learning, testing, inquiry, analysis, synthesis, and/or other techniques, knowledge, or input. In one example, Positioning Logic 445 can cause Device 98 to move to a location at an equal distance relative to two Objects 615 of interest. In another example, Positioning Logic 445 can cause Device 98 to move to a location on a line (i.e. Line 705 between Device 98 and manipulating Object 615 [later described], etc.) that is at a desired angle (i.e. 90°, any angle, etc.) to a line (i.e. Line 720 between manipulating Object 615 and manipulated Object 615 [later described], etc.) between two Objects 615 of interest and that intersects the line between the two Objects 615 of interest at location coordinates of one (i.e. manipulating Object 615, etc.) of the two Objects 615 of interest. In a further example, Positioning Logic 445 can cause Device 98 to move to a location on a line (i.e. Line 710 between Device 98 and manipulated Object 615 [later described], etc.) that is at a desired angle (i.e. 90°, any angle, etc.) to a line (i.e. Line 720 between manipulating Object 615 and manipulated Object 615, etc.) between two Objects 615 of interest and that intersects the line between the two Objects 615 of interest at location coordinates of the other (i.e. manipulated Object 615, etc.) of the two Objects 615 of interest. In a further example, Positioning Logic 445 can cause Device 98 to move to a location on a line that is at a desired angle (i.e. 90°, any angle, etc.) to a line (i.e. Line 720 between manipulating Object 615 and manipulated Object 615, etc.) between two Objects 615 of interest and that intersects the line between the two Objects 615 of interest at a midpoint between the two Objects 615 of interest. In further aspects, Positioning Logic 445 can cause Device 98 to move to a location that maximizes a view of one or more Objects 615 of interest (i.e. Camera's 92*a* field of view has one or more Objects 615 of interest of maximum size, etc.). In further aspects, Positioning Logic 445 can cause Device 98 to move to a location that maximizes an amount of detail of one or more Objects 615 of interest (i.e. Camera's 92*a* field of view has one or more Objects 615 of interest of maximum size, maximum clarity, and/or least obstructed, etc.). In further aspects, Positioning Logic 445 can cause Device 98 to move to a location that maximizes accuracy of one or more measurements used in observing one or more Objects 615 of interest or used in other functionalities described herein (i.e. accuracy of distance measurement between Device 98 and one or more Objects 615 of interest, etc.). In further aspects, Positioning Logic 445 can cause Device 98 to move to a location that maximizes an accuracy of one or more Sensors 92 used in observing one or more Objects 615 of interest or used in other functionalities described herein (i.e. accuracy of Lidar 92*c*, Radar 92*d*, Sonar 92*e*, etc.). In further aspects, Positioning Logic 445 can determine, estimate, and/or project a trajectory (later described) of one or more moving Objects 615 of interest and cause Device 98 to move to a location relative to a point on or near the trajectory. Such determining, estimating, and/or projecting one or more moving Objects' 615 trajectory can be facilitated using coordinates Object Properties 630 of Object Representations 625 representing the one or more moving Objects' 615 recent motion and using mathematical or computational techniques such as best fit, trend, curve fitting, linear least squares, non-linear least squares, and/or others. Such techniques produce a mathematical function that can then be used to project or extrapolate the one or more Object's 615 motion into the future. In one example, Positioning Logic 445 can cause Device 98 to move to a location on a line that is at a desired angle (i.e. 90°, any angle, etc.) to a line tangent to one or more Objects' 615 trajectory and that intersects the line tangent to the one or more Objects' 615 trajectory at the point of tangency. In further aspects, Positioning Logic 445 may cause Device 98 to simply follow one or more Objects 615 of interest at a desired distance and angle. In the aforementioned and/or other examples, an Instruction Set 526 such as Device.move (X, Y, Z) can be executed to move Device 98 to a determined location. In further aspects, Positioning Logic 445 may cause Device's 98 Sensor 92 (i.e. Camera 92*a*, Lidar 92*c*, Radar 92*d*, etc.) to point toward one or more Objects 615 of interest. In further aspects, Positioning Logic 445 may cause Device's 98 Camera's 92*a* lens to zoom and/or focus on one or more Objects 615 of interest. In general, Positioning Logic 445 may cause Device 98 and/or its one or more Sensors 92 to perform any movements, actions, and/or operations to observe one or more Objects 615 of interest. The aforementioned positions/locations and/or other elements can be calculated, determined, or estimated using trigonometry, Pythagorean theorem, linear algebra, geometry, and/or other techniques. Any features, functionalities, and/or embodiments of Device Control Program 18*a* (later described) can be used in causing Device 98 and/or its one or more Sensors 92 to perform various movements, actions, and/or operations relative to one or more Objects 615 of interest.

Positioning Logic 445 may include any logic, functions, algorithms, code, and/or other elements to enable its functionalities. An example of Position Logic's 445 code for causing Device 98 to traverse its surrounding, finding a moving Object 615 of interest, finding the closest Object 615 to the moving Object 615, causing Device 98 to move to a certain distance and angle relative to the moving Object 615 and the closest Object 615, and causing Device's 98 Camera 92*a* to point toward the moving Object 615 and the closest Object 615 may include the following code:

```
Device.traverseSurrounding("circular"); //traverse the surrounding in circular pattern
detectedObjects = detectObjects( ); //detect objects in the surrounding and store them in detectedObjects array
for (int i = 0; i < detectedObjects.length; i++) { //process each object in detectedObjects array
  if (detectedObjects[i].isMoving = true) { //determine if detectedObjects[i] object is moving
    closestObject = findClosestObject(detectedObjects[i], detectedObjects); /*find closest object to
                                                        detectedObjects[i] object in detectedObjects array*/
                    Device.moveAtDistanceAndAngle(detectedObjects[i], closestObject, 2, 90); /*move at 2m and 90° relative
                                                        to detectedObjects[i] object and closestObject object */
                    Device.Camera.pointToward(detectedObjects[i], closestObject); /*point camera toward detectedObjects[i]
                                                        object and closestObject object */
    Break; //stop the for loop
  }
}
...
```

Figure 14B:
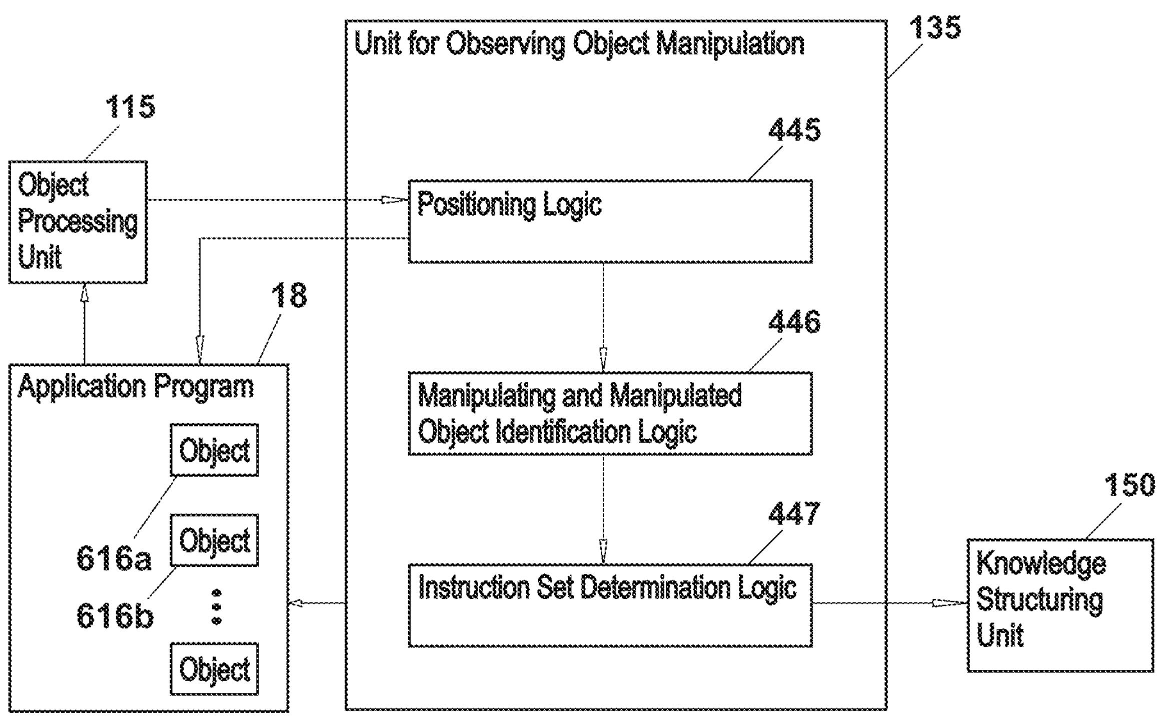

The foregoing code applicable to Device 98, Objects 615, and/or other elements may similarly be used as an example code applicable to Avatar 605, observation point, Objects 616, and/or other elements. For instance, references to Device in the foregoing code may be replaced with references to Avatar or ObservationPoint to implement code for use with respect to Avatar 605, observation point, Objects 616, and/or other elements. Referring to FIG. 14B, an embodiment of Unit for Observing Object Manipulation 135 is illustrated. Unit for Observing Object Manipulation 135 comprises functionality for causing observation point or Avatar 605 to observe manipulations of one or more Objects 616 (i.e. manipulated Objects 616, manipulated computer generated objects, etc.). Unit for Observing Object Manipulation 135 comprises functionality for determining Instruction Sets 526 that would cause Avatar 605 to perform observed manipulations of one or more Objects 616. Unit for Observing Object Manipulation 135 may comprise other functionalities. For example, a manipulating Object 616 and a manipulated Object 616, their states, and/or their properties, can be detected or obtained by Object Processing Unit 115 and provided as one or more Collections of Object Representations 525 to Unit for Observing Object Manipulation 135. Unit for Observing Object Manipulation 135 may observe the manipulating Object's 616 manipulations of the manipulated Object 616 to enable learning of how the manipulating Object 616 can manipulate the manipulated Object 616.

Positioning Logic 445 comprises functionality for positioning an observation point for observing manipulations of one or more Objects 616 (i.e. manipulated Objects 616, manipulated computer generated objects, etc.), and/or other functionalities.

In some embodiments, Positioning Logic 445 may facilitate finding one or more Objects 616 of interest. Object 616 of interest may include Object 616 that is in a manipulating relationship or may potentially enter into a manipulating relationship with another Object 616 (i.e. a manipulating Object 616 manipulates a manipulated Object 616, etc.). In some aspects, Positioning Logic 445 may cause an observation point to traverse 3D Application Program 18 or a portion thereof to find one or more Objects 616 of interest. Any traversal or movement patterns or techniques can be utilized such as linear, circular, elliptical, rectangular, triangular, octagonal, zig-zag, spherical, cubical, pyramid-like, and/or others. In general, any techniques, algorithms, and/or patterns, and/or those known in art, can be utilized in a traversal. In other embodiments, an observation point may be stationary in which case Positioning Logic 445 can be optionally omitted. Such stationary observation point can observe its surrounding from a single location and process Objects 616 in its surrounding without proactively moving to facilitate finding one or more Objects 616 of interest. In further embodiments, causing an observation point to move and to stop can be used in combination. For example, Positioning Logic 445 may cause observation point to move in order to find one or more Objects 616 of interest at which point Positioning Logic 445 can cause observation point to stop to observe the one or more Objects 616 of interest.

In some embodiments, Positioning Logic 445 can identify one or more Objects 616 of interest. In some aspects, Object 616 and/or part thereof in a manipulating relationship with another Object 616 may move and/or transform (i.e. a person Object 616 and/or part thereof may move and/or transform to open a door Object 616, etc.). Positioning Logic 445 may, therefore, look for moving and/or transforming Objects 616 (i.e. similar to a person or animal directing his/her/its attention to moving and/or transforming objects, etc.). In one example, a moving Object 616 can be identified by processing a stream of Collections of Object Representations 525 (i.e. from Object Processing Unit 115, etc.) and identifying Object Representation 625 whose coordinates Object Property 630 changes. In another example, a transforming Object 616 can be determined by processing a stream of Collections of Object Representations 525 and identifying Object Representation 625 whose shape Object Property 630 changes. Similarly, in a further example, an inactive Object 616 can be determined by processing a stream of Collections of Object Representations 525 and identifying Object Representation 625 whose coordinate Object Property 630 and/or shape Object Property 630 do not change. In other aspects, Object 616 and/or part thereof in a manipulating relationship with another Object 616 may produce simulated sound (i.e. a door Object 616 squeaks while being opened by a person Object 616 or part thereof, etc.). Positioning Logic 445 may, therefore, look for Objects 616 and/or parts thereof that produce simulated sound (i.e. similar to a person or animal directing his/her/its attention to objects that produce sound, etc.). In one example, Object 616 and/or part thereof that produce simulated sound can be determined by processing a stream of Collections of Object Representations 525 and identifying Object Representation 625 that includes any sound related Object Property 630. In another example, Object 616 and/or part thereof that produces simulated sound can be determined by processing a stream of sound samples from a simulated microphone, by using directionality of one or more simulated microphones, and/or by using any features, functionalities, or embodiments of Sound Renderer 477 and/or Sound Recognizer 117*b*. In such examples, Positioning Logic 445 may receive input (not shown) from Sound Renderer 477 and/or Sound Recognizer 117*b*. In general, one or more Objects 616 of interest can be identified using any technique, and/or those known in art. In some implementations, Objects 616 in a certain vicinity (i.e. threshold radius or other shape area can be used for vicinity, etc.) from identified one or more Objects 616 of interest can also be regarded as Objects 616 of interest and considered by Positioning Logic 445. In some aspects, Positioning Logic 445 may include any features, functionalities, and/or embodiments of Manipulating and Manipulated Object Identification Logic 446, while, in other aspects, Positioning Logic 445 may work in combination with Manipulating and Manipulated Object Identification Logic 446.

In some embodiments, once one or more Objects 616 of interest are identified, Positioning Logic 445 may position observation point in various locations relative to the one or more Objects 616 of interest to optimize observation of the one or more Objects 616 of interest. In some aspects, Positioning Logic 445 can position observation point in a location at an optimal observing distance from the one or more Objects 616 of interest. A value for optimal observing distance can be utilized such as 0.27 meters, 2.3 meters, 16.8 meters, and/or others. In other aspects, Positioning Logic 445 can position observation point in a location relative to the one or more Objects 616 of interest that provides an optimal observing angle. A value for optimal observing angle can be utilized such as 90° (i.e. perpendicular, etc.), 29.6°, 148.1°, 303.9°, and/or others. One of ordinary skill in art will understand that values for optimal observing distance and/or angle can be defined by a user, by system administrator, or automatically by the system based on experience, learning, testing, inquiry, analysis, synthesis, and/or other techniques, knowledge, or input. In one example, Positioning Logic 445 can position observation point in a location at an equal distance relative to two Objects 616 of interest. In another example, Positioning Logic 445 can position observation point in a location on a line (i.e. Line 705 between an observation point and manipulating Object 616, etc.) that is at a desired angle (i.e. 90°, any angle, etc.) to a line (i.e. Line 720 between manipulating Object 616 and manipulated Object 616, etc.) between two Objects 616 of interest and that intersects the line between the two Objects 616 of interest at location coordinates of one (i.e. manipulating Object 616, etc.) of the two Objects 616 of interest. In a further example, Positioning Logic 445 can position observation point in a location on a line (i.e. Line 710 between an observation point and manipulated Object 616, etc.) that is at a desired angle (i.e. 90°, any angle, etc.) to a line (i.e. Line 720 between manipulating Object 616 and manipulated Object 616, etc.) between two Objects 616 of interest and that intersects the line between the two Objects 616 of interest at location coordinates of the other (i.e. manipulated Object 616, etc.) of the two Objects 616 of interest. In a further example, Positioning Logic 445 can position observation point in a location on a line that is at a desired angle (i.e. 90°, any angle, etc.) to a line (i.e. Line 720 between manipulating Object 616 and manipulated Object 616, etc.) between two Objects 616 of interest and that intersects the line between the two Objects 616 of interest at a midpoint between the two Objects 616 of interest. In further aspects, Positioning Logic 445 can position observation point in a location that maximizes a view of one or more Objects 616 of interest (i.e. virtual camera's field of view has one or more Objects 616 of interest of maximum size, etc.). In further aspects, Positioning Logic 445 can position observation point in a location that maximizes an amount of detail of one or more Objects 616 of interest (i.e. virtual camera's field of view has one or more Objects 616 of interest of maximum size, maximum clarity, and/or least obstructed, etc.). In further aspects, Positioning Logic 445 can position observation point in a location that maximizes accuracy of one or more measurements used in observing one or more Objects 616 of interest or used in other functionalities described herein (i.e. accuracy of distance measurement between an observation point and one or more Objects 616 of interest, etc.). In further aspects, Positioning Logic 445 can position observation point in a location that maximizes an accuracy of one or more simulated sensors used in observing one or more Objects 616 of interest or used in other functionalities described herein (i.e. accuracy of simulated lidar, simulated radar, simulated sonar, etc.). In further aspects, Positioning Logic 445 can determine, estimate, and/or project a trajectory (previously described) of one or more moving Objects 616 of interest and position observation point in a location relative to a point on or near the trajectory. Such determining, estimating, and/or projecting one or more moving Objects' 616 trajectory can be facilitated using coordinates Object Properties 630 of Object Representations 625 representing the one or more moving Objects' 616 recent motion and using mathematical or computational techniques such as best fit, trend, curve fitting, linear least squares, non-linear least squares, and/or others. Such techniques produce a mathematical function that can then be used to project or extrapolate the one or more Objects' 616 motion into the future. In one example, Positioning Logic 445 can position observation point in a location on a line that is at a desired angle (i.e. 90°, any angle, etc.) to a line tangent to one or more Objects' 616 trajectory and that intersects the line tangent to the one or more Objects' 616 trajectory at the point of tangency. In further aspects, Positioning Logic 445 may cause observation point to simply follow one or more Objects 616 of interest at a desired distance and angle. In the aforementioned and/or other examples, an Instruction Set 526 such as ObservationPoint.move (X, Y, Z) can be executed to move an observation point to a determined location. In further aspects, Positioning Logic 445 may cause a simulated sensor (i.e. virtual camera, virtual microphone, simulated lidar, simulated radar, simulated sonar, etc.) in an observation point to point toward one or more Objects 616 of interest. In further aspects, Positioning Logic 445 may cause a virtual camera's lens in an observation point to zoom and/or focus on one or more Objects 616 of interest. In general, Positioning Logic 445 may position observation point in any location or cause an observation point to perform any movements, actions, and/or operations for observing one or more Objects 616 of interest. The aforementioned positions/locations and/or other elements can be calculated, determined, or estimated using trigonometry, Pythagorean theorem, linear algebra, geometry, and/or other techniques.

In some aspects, LTOUAK Unit 105 or elements thereof may observe a manipulating Object's 616 manipulations of one or more manipulated Objects 616 from an observation point in Application Program 18. In one example, an observation point may be or include an optimal point in 3D Application Program 18 for observing a manipulating Object's 616 manipulations of one or more manipulated Objects 616 as previously described with respect to positioning Device 98 into optimal observation position. In another example, an observation point may be or include any point in 3D Application Program 18 suitable for observing a manipulating Object's 616 manipulations of one or more manipulated Objects 616. In general, an observation may be or include any point in 3D Application Program 18. In some designs, an observation point may be defined to be relative origin and assigned coordinates [0, 0, 0], such observation point serving as a reference location/point for one or more Objects 616. In other designs, an observation point may serve as a point of view in Application Program 18, such observation point serving as a point (i.e. virtual camera, etc.) from which Picture Renderer 476 can render one or more digital pictures or a stream of digital pictures for further processing. In further designs, an observation point can serve as a point (i.e. virtual microphone, etc.) from which Sound Renderer 477 can render one or more digital sound samples or a stream of digital sound samples for further processing. In yet further designs, an observation point can serve as a point from which simulated lidar, simulated radar, simulated sonar, and/or other simulated sensors can perform their simulated detection functionalities.

Manipulating and Manipulated Object Identification Logic 446 comprises functionality for identifying a manipulating Object 615 (i.e. physical object, etc.) and/or a manipulated Object 615, and/or other functionalities. In some embodiments, since a manipulating Object 615 and a manipulated Object 615 may be in contact with one another (i.e. a person Object 615 needs to come in contact with a door Object 615 to open the door Object 615, etc.), Manipulating and Manipulated Object Identification Logic 446 may look among detected Objects 615 (i.e. Objects 615 of interest, etc.) for Objects 615 that are in contact or may potentially come in contact with one another. In some aspects, Objects 615 that are in contact with one another can be identified by determining contact among the Objects 615. In one example, determining contact among Objects 615 can be facilitated by processing one or more Digital Pictures 750 depicting the Objects 615 as later described. Specifically, for instance, contact between two Objects 615 can be determined if a coordinate of a pixel (i.e. on a boundary, etc.) of Collection of Pixels 617 representing one Object 615 equals or is adjacent to a coordinate of a pixel (i.e. on a boundary, etc.) of Collection of Pixels 617 representing another Object 615 as later described in more detail. In another example, determining contact among Objects 615 can be facilitated by processing 3D Application Program 18 including representations of the Objects 615. Specifically, for instance, contact between two Objects 615 can be determined if Object Model 619 representing one Object 615 intersects or touches Object Model 619 representing another Object 615 as later described in more detail. In general, determining contact among Objects 615 can be facilitated by any technique, and/or those known in art. In other aspects, Objects 615 that may potentially come in contact with one another can be identified by identifying an Object 615 (i.e. moving Object 615, sound emitting Object 615, etc.) and identifying other Objects 615 in a certain vicinity (i.e. threshold radius or other shape area can be used for vicinity, etc.) from the Object 615. In one example, the closest Object 615 in the vicinity can be regarded as Object 615 that may potentially come in contact with the Object 615. In another example, any one or more Objects 615 in the vicinity can be regarded as Objects 615 that may potentially come in contact with the Object 615. Specifically, for instance, Manipulating and Manipulated Object Identification Logic 446 may identify a moving Object 615 as previously described and identify another Object 615 within 1.1 meters threshold (i.e. any other threshold value can be used, etc.) radius (i.e. vicinity, etc.) from the moving Object 615, and Manipulating and Manipulated Object Identification Logic 446 may identify the another Object 615 as Object 615 that may potentially come in contact with the moving Object 615. In further aspects, a moving Object 615 that may potentially come in contact with other Objects 615 can be identified by determining, estimating, and/or projecting the moving Object's 615 trajectory as previously described and identifying other Objects 615 on or near (i.e. a threshold for nearness can be utilized herein, etc.) the moving Object's 615 trajectory. For example, Manipulating and Manipulated Object Identification Logic 446 may identify a moving Object 615 as previously described, estimate its trajectory as previously described, and identify another Object 615 on or near the trajectory, and Manipulating and Manipulated Object Identification Logic 446 may identify the another Object 615 as Object 615 that may potentially come in contact with the moving Object 615. In general, Objects 615 that are in contact or may potentially come in contact with one another can be identified using any technique, and/or those known in art. Any features, functionalities, and/or embodiments of Sensor 92, Object Processing Unit 115, and/or Positioning Logic 445 can be used in such identifying.

In some embodiments, once Objects 615 that are in contact or may potentially come in contact with one another are identified, Manipulating and Manipulated Object Identification Logic 446 may determine a manipulating Object 615 and/or a manipulated Object 615. In some aspects, determining a manipulating Object 615 and/or a manipulated Object 615 can be facilitated by identifying a moving Object 615 and identifying an inactive Object 615 prior to contact (i.e. identifying a moving Object 615 and an inactive/stationary Object 615 are previously described, etc.). In one example, Manipulating and Manipulated Object Identification Logic 446 may regard a moving Object 615 to be a manipulating Object 615 and regard an inactive Object 615 to be a manipulated Object 615 (i.e. a person Object 615 moves to open an inactive door Object 615, etc.). In other aspects, determining a manipulating Object 615 and/or a manipulated Object 615 can be facilitated by identifying a transforming Object 615 and identifying an inactive Object 615 prior to contact (i.e. identifying a transforming Object 615 and an inactive/stationary Object 615 are previously described, etc.). For example, Manipulating and Manipulated Object Identification Logic 446 may regard a transforming Object 615 to be a manipulating Object 615 and regard an inactive Object 615 to be a manipulated Object 615 (i.e. a person Object 615 extends his/her hand [i.e. transforms, etc.] to open an inactive door Object 615, etc.). In further aspects, determining a manipulating Object 615 and/or a manipulated Object 615 can be facilitated by identifying Object 615 that moved the most, transformed the most, changed speed the most, changed trajectory the most, changed condition the most, and/or changed other properties the most relative to another Object 615 after a contact (i.e. determining movement, transformation, trajectory, and/or other properties of Object 615 are previously described, etc.). For example, Manipulating and Manipulated Object Identification Logic 446 may regard Object 615 that transformed the most after a contact with another Object 615 to be a manipulated Object 615 and regard the another Object 615 to be a manipulating Object 615 (i.e. a door Object 615 transforms the most when opened by a person Object 615, etc.). In further aspects, determining a manipulating Object 615 and/or a manipulated Object 615 can be facilitated by using Object 615 affordances. Object 615 affordances can be available in Object Processing Unit 115 or provided by an external system/element, and associated with Object 615 (i.e. included as Object Property 630, included as Extra Info 527, etc.) when Object Processing Unit 115 recognizes the Object 615. For example, Manipulating and Manipulated Object Identification Logic 446 may regard Object 615 to be a manipulated Object 615 if the Object's 615 affordances define the Object 615 as one that can be manipulated (i.e. a door Object 615 can be opened or closed, opening and closing being door Object's 615 affordances, etc.). In general, a manipulating Object 615 and/or a manipulated Object 615 can be determined using any technique, and/or those known in art. Any features, functionalities, and/or embodiments of Sensor 92, Object Processing Unit 115, and/or Positioning Logic 445 can be used in such determining.

Manipulating and Manipulated Object Identification Logic 446 may include any logic, functions, algorithms, code, and/or other elements to enable its functionalities. An example of Manipulating and Manipulated Object Identification Logic's 446 code for finding a moving Object 615 in Device's 98 surrounding, finding the closest Object 615 to the moving Object 615, and determining a manipulating Object 615 and a manipulated Object 615 may include the following code:

```
detectedObjects=detectObjects ( )//detect objects in the
  surrounding and store them in detectedObjects array for
  (int i=0; i<detectedObjects.length; i++) {//process each
  object in detectedObjects array
  if (detectedObjects [i].isMoving=true) {//determine if
    detectedObjects [i] object is moving
    closestObject=findClosestObject (detectedObjects
      [i], detectedObjects [ ]);/*find closest object from
      detectedObjects [ ] array to detectedObjects [i]
      object*/
    manipulatingObject=detectedObjects [i];
    manipulatedObject=closestObject;
    Break;//stop the for loop
  }
}
. . .
```

The foregoing code applicable to Device 98, Objects 615, and/or other elements may similarly be used as an example code applicable to Avatar 605, observation point, Objects 616, and/or other elements.

Manipulating and Manipulated Object Identification Logic 446 comprises functionality for identifying a manipulating Object 616 (i.e. computer generated object, etc.) and/or a manipulated Object 616, and/or other functionalities.

In some embodiments, since a manipulating Object 616 and a manipulated Object 616 may be in contact with one another (i.e. a person Object 616 needs to come in contact with a door Object 616 to open the door Object 616, etc.), Manipulating and Manipulated Object Identification Logic 446 may look among detected or obtained Objects 616 (i.e. Objects 616 of interest, etc.) for Objects 616 that are in contact or may potentially come in contact with one another. In some aspects, Objects 616 that are in contact with one another can be identified by determining contact among the Objects 616. In one example, determining contact among Objects 616 can be facilitated by processing one or more Digital Pictures 750 depicting the Objects 616 as later described. Specifically, for instance, contact between two Objects 616 can be determined if a coordinate of a pixel (i.e. on a boundary, etc.) of Collection of Pixels 617 representing one Object 616 equals or is adjacent to a coordinate of a pixel (i.e. on a boundary, etc.) of Collection of Pixels 617 representing another Object 616 as later described in more detail. In another example, determining contact among Objects 616 can be facilitated by processing 3D Application Program 18 including Objects 616. Specifically, for instance, contact between two Objects 616 can be determined if one Object 616 intersects or touches another Object 616 as later described in more detail. In general, determining contact among Objects 616 can be facilitated by any technique, and/or those known in art. In other aspects, Objects 616 that may potentially come in contact with one another can be identified by identifying an Object 616 (i.e. moving Object 616, sound emitting Object 616, etc.) and identifying other Objects 616 in a certain vicinity (i.e. threshold radius or other shape area can be used for vicinity, etc.) from the Object 616. In one example, the closest Object 616 in the vicinity can be regarded as Object 616 that may potentially come in contact with the Object 616. In another example, any one or more Objects 616 in the vicinity can be regarded as Objects 616 that may potentially come in contact with the Object 616. Specifically, for instance, Manipulating and Manipulated Object Identification Logic 446 may identify a moving Object 616 as previously described and identify another Object 616 within 1.1 meters threshold (i.e. any other threshold value can be used, etc.) radius (i.e. vicinity, etc.) from the moving Object 616, and Manipulating and Manipulated Object Identification Logic 446 may identify the another Object 616 as Object 616 that may potentially come in contact with the moving Object 616. In further aspects, a moving Object 616 that may potentially come in contact with other Objects 616 can be identified by determining, estimating, and/or projecting the moving Object's 616 trajectory as previously described and identifying other Objects 616 on or near (i.e. a threshold for nearness can be utilized herein, etc.) the moving Object's 616 trajectory. For example, Manipulating and Manipulated Object Identification Logic 446 may identify a moving Object 616 as previously described, estimate its trajectory as previously described, and identify another Object 616 on or near the trajectory, and Manipulating and Manipulated Object Identification Logic 446 may identify the another Object 616 as Object 616 that may potentially come in contact with the moving Object 616. In general, Objects 616 that are in contact or may potentially come in contact with one another can be identified using any technique, and/or those known in art. Any features, functionalities, and/or embodiments of Picture Renderer 476/Picture Recognizer 117*a*, Sound Renderer 477/Sound Recognizer 117*b*, aforementioned simulated lidar/Lidar Processing Unit 117*c*, aforementioned simulated radar/Radar Processing Unit 117*d*, aforementioned simulated sonar/Sonar Processing Unit 117*e*, Object Processing Unit 115, and/or Positioning Logic 445 can be used in such identifying.

In some embodiments, once Objects 616 that are in contact or may potentially come in contact with one another are identified, Manipulating and Manipulated Object Identification Logic 446 may determine a manipulating Object 616 and/or a manipulated Object 616. In some aspects, determining a manipulating Object 616 and/or a manipulated Object 616 can be facilitated by identifying a moving Object 616 and identifying an inactive Object 616 prior to contact (i.e. identifying a moving Object 616 and an inactive/stationary Object 616 are previously described, etc.). In one example, Manipulating and Manipulated Object Identification Logic 446 may regard a moving Object 616 to be a manipulating Object 616 and regard an inactive Object 616 to be a manipulated Object 616 (i.e. a person Object 616 moves to open an inactive door Object 616, etc.). In other aspects, determining a manipulating Object 616 and/or a manipulated Object 616 can be facilitated by identifying a transforming Object 616 and identifying an inactive Object 616 prior to contact (i.e. identifying a transforming Object 616 and an inactive/stationary Object 616 are previously described, etc.). For example, Manipulating and Manipulated Object Identification Logic 446 may regard a transforming Object 616 to be a manipulating Object 616 and regard an inactive Object 616 to be a manipulated Object 616 (i.e. a person Object 616 extends his/her hand [i.e. transforms, etc.] to open an inactive door Object 616, etc.). In further aspects, determining a manipulating Object 616 and/or a manipulated Object 616 can be facilitated by identifying Object 616 that moved the most, transformed the most, changed speed the most, changed trajectory the most, changed condition the most, and/or changed other properties the most relative to another Object 616 after a contact (i.e. determining movement, transformation, trajectory, and/or other properties of Object 616 are previously described, etc.). For example, Manipulating and Manipulated Object Identification Logic 446 may regard Object 616 that transformed the most after a contact with another Object 616 to be a manipulated Object 616 and regard the another Object 616 to be a manipulating Object 616 (i.e. a door Object 616 transforms the most when opened by a person Object 616, etc.). In further aspects, determining a manipulating Object 616 and/or a manipulated Object 616 can be facilitated by using Object 616 affordances. Object 616 affordances can be available in Object Processing Unit 115 or provided by an external system/element, and associated with Object 616 (i.e. included as Object Property 630, included as Extra Info 527, etc.) when Object Processing Unit 115 recognizes the Object 616. For example, Manipulating and Manipulated Object Identification Logic 446 may regard Object 616 to be a manipulated Object 616 if the Object's 616 affordances define the Object 616 as one that can be manipulated (i.e. a door Object 616 can be opened or closed, opening and closing being door Object's 616 affordances, etc.). In general, a manipulating Object 616 and/or a manipulated Object 616 can be determined using any technique, and/or those known in art. Any features, functionalities, and/or embodiments of Sensor 92, Object Processing Unit 115, and/or Positioning Logic 445 can be used in such determining.

Instruction Set Determination Logic 447 comprises functionality for determining Instruction Sets 526 that would cause Device 98 to perform observed manipulations of one or more Objects 615 (i.e. manipulated Objects 615, manipulated physical objects, etc.), and/or other functionalities. In some embodiments, Instruction Set Determination Logic 447 can observe or examine a manipulating Object's 615 operations in determining Instruction Sets 526 that would cause Device 98 to perform the manipulating Object's 615 manipulations of a manipulated Object 615. In such embodiments, Instruction Set Determination Logic 447 can determine Instruction Sets 526 that would cause Device 98 to replicate the manipulating Object's 615 operations in performing manipulations of the manipulated Object 615.

Instruction Set Determination Logic 447 comprises functionality for determining Instruction Sets 526 that would cause Avatar 605 to perform observed manipulations of one or more Objects 616 (i.e. manipulated Objects 616, manipulated computer generated objects, etc.), and/or other functionalities. In some embodiments, Instruction Set Determination Logic 447 can observe or examine a manipulating Object's 616 operations in determining Instruction Sets 526 that would cause Avatar 605 to perform the manipulating Object's 616 manipulations of a manipulated Object 616. In such embodiments, Instruction Set Determination Logic 447 can determine Instruction Sets 526 that would cause Avatar 605 to replicate the manipulating Object's 616 operations in performing manipulations of the manipulated Object 616.

Figure 15A:
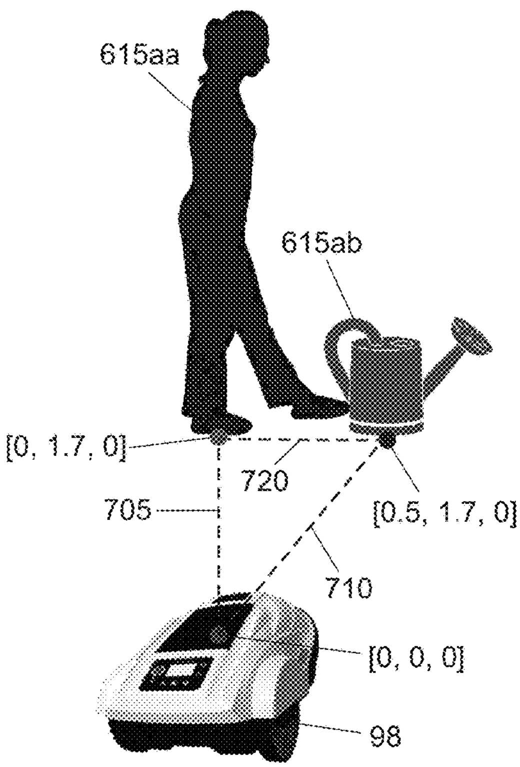
FIG. 15A illustrates an exemplary embodiment of Instruction Set Determination Logic's 447 determining Instruction Sets 526 that would cause Device 98 to move into location of manipulating Object 615*aa.*

Referring to FIG. 15A, an exemplary embodiment of Instruction Set Determination Logic's 447 determining Instruction Sets 526 that would cause Device 98 to move into location of manipulating Object 615*aa* is illustrated. In some designs, location of the manipulating Object 615*aa* can be determined or estimated using detected spatial relationships among Device 98, manipulating Object 615*aa*, manipulated Object 615*ab*, and/or other Objects 615. Coordinates [0, 1.7, 0] of manipulating Object 615*aa* and coordinates [0.5, 1.7, 0] of manipulated Object 615*ab* may be provided by Object Processing Unit 115 in coordinates Object Properties 630 of Object Representations 625 representing manipulating Object 615*aa* and manipulated Object 615*ab* as previously described. Coordinates [0,0,0] of Device 98 may be considered a relative origin. Therefore, in one example, Instruction Set Determination Logic 447 can determine that Instruction Set 526 that would cause Device 98 to move into location of manipulating Object 615*aa* may include Device.move (0, 1.7, 0), which can be used for learning functionalities later in the process. In some aspects, Instruction Set Determination Logic 447 can determine or estimate Distance 705 (i.e. also referred to as Line 705, etc.) between Device 98 and manipulating Object 615*aa* to be 1.7 meters using the aforementioned coordinates, for example. Instruction Set Determination Logic 447 can also determine or estimate Distance 710 (i.e. also referred to as Line 710, etc.) between Device 98 and manipulated Object 615*ab* to be 1.77 meters using the aforementioned coordinates, for example. Instruction Set Determination Logic 447 can further determine or estimate Distance 720 (i.e. also referred to as Line 720, etc.) between manipulating Object 615*aa* and manipulated Object 615*ab* to be 0.5 meters using the aforementioned coordinates, for example. These and/or other factors can be determined or estimated using Euclidean distance formula, Pythagorean theorem, trigonometry, linear algebra, geometry, and/or other techniques.

Figure 15B:
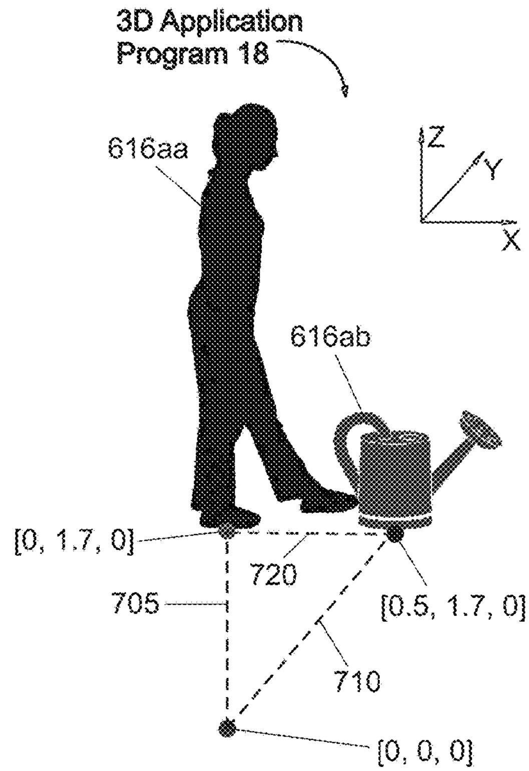
FIG. 15B illustrates an exemplary embodiment of 3D Application Program 18 that includes manipulating Object 616*aa* and manipulated Object 616*ab*.

Referring to FIG. 15B, an exemplary embodiment of 3D Application Program 18 that includes Object 616*aa* and Object 616*ab* is illustrated. In some aspects, Object 616*aa* (i.e. computer generated object, etc.) represents manipulating Object 615*aa* (i.e. physical object, etc.) and Object 616*ab* (i.e. computer generated object, etc.) represents manipulated Object 615*ab* (i.e. physical object, etc.) in 3D Application Program 18. Instruction Set Determination Logic 447 can utilize 3D Application Program 18 in determining Instruction Sets 526 that would cause Device 98 to perform observed manipulations of manipulated Object 615*ab*. Once 3D Application Program 18 is generated, Instruction Set Determination Logic 447 can load Object 616*aa* representing manipulating Object 615*aa* and Object 616*ab* representing manipulated Object 615*ab* into 3D Application Program 18. Object 616*aa* and Object 616*ab* may be provided by Object Processing Unit 115 in shape (i.e. model, etc.) Object Properties 630 of Object Representations 625 representing manipulating Object 615*aa* and manipulated Object 615*ab* as previously described. Object 616*aa* and Object 616*ab* may include 3D models (i.e. polygonal models, NURBS models, CAD models, etc.), voxel models, point clouds, and/or other computer models or representations of Object 615*aa* and Object 615*ab* as previously described. Since 3D Application Program 18 approximates at least some of Device's 98 physical surrounding, physical location coordinates and/or other information about Object 615*aa* and Object 615*ab* can be used for Object 616*aa* and Object 616*ab* in 3D Application Program 18. Physical location coordinates of manipulating Object 615*aa* and manipulated Object 615*ab* may be provided by Object Processing Unit 115 in coordinates Object Properties 630 of Object Representations 625 representing manipulating Object 615*aa* and manipulated Object 615*ab* as previously described. For example, location coordinates of Object 616*aa* in 3D Application Program 18 may be [0, 1.7, 0] and location coordinates of Object 616*ab* in 3D Application Program 18 may be [0.5, 1.7, 0] as shown. Therefore, in one example, Instruction Set Determination Logic 447 can determine that Instruction Set 526 that would cause Device 98 to move into location of manipulating Object 615*aa* may include Device.move (0, 1.7, 0), which can be used for learning functionalities later in the process. In another example, Instruction Set Determination Logic 447 can determine that Instruction Set 526 that would cause Avatar 605 to move into location of manipulating Object 616*aa* may include Avatar.move (0, 1.7, 0), which can be used for learning functionalities later in the process. It should be noted that the aforementioned coordinates of point of contact in 3D Application Program 18 and physical point of contact are absolute coordinates used in this and/or other examples, and that relative coordinates (i.e. relative to the location of Object 616*aa*, relative to the location of Object 615*aa*, relative to other suitable objects, etc.) can be used where practical and/or applicable depending on design. It should be noted that Instruction Set Determination Logic 447 can reposition, resize, rotate, and/or otherwise transform Objects 616 in 3D Application Program 18. It should be noted that some techniques described with respect to 3D Application Program 18 or 3D computer generated space can similarly be used with 2D computer generated space (i.e. 2D or vector models, etc.).

Figure 15C:
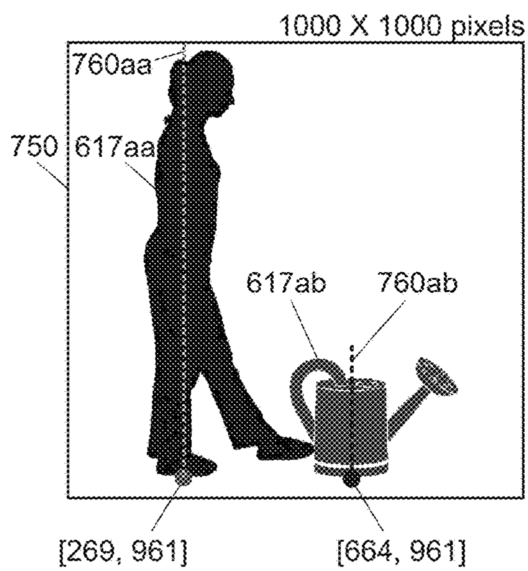
FIG. 15C illustrates an exemplary embodiment of Digital Picture 750 that includes Collection of Pixels 617*aa* representing a manipulating Object 615*aa* or Object 616*aa*, and Collection of Pixels 617*ab* representing a manipulated Object 615*ab* or Object 616*ab*.

Referring to FIG. 15C, an exemplary embodiment of Digital Picture 750 that includes Collection of Pixels 617*aa* representing a manipulating Object 615*aa* or Object 616*aa*, and Collection of Pixels 617*ab* representing a manipulated Object 615*ab* or Object 616*ab* is illustrated. Instruction Set Determination Logic 447 can utilize one or more Digital Pictures 750 in determining Instruction Sets 526 that would cause Device 98 to perform observed manipulations of manipulated Object 615*ab* or Instruction Sets 526 that would cause Avatar 605 to perform observed manipulations of manipulated Object 616*ab*. One or more Digital Pictures 750 may be part of a stream of Digital Pictures 750. A stream of Digital Pictures 750 can be captured by Camera 92*a* or rendered by Picture Renderer 476, and provided by Object Processing Unit 115 in or associated with a stream of Collections of Object Representations 525 as previously described. In some aspects, using one or more Digital Pictures 750 (i.e. of a stream of Digital Pictures 750, etc.), Instruction Set Determination Logic 447 can determine or estimate length-to-pixel ratio, which approximates physical (i.e. in physical world, etc.) or simulated (i.e. in 3D space of 3D application program, etc.) length represented by a pixel at a certain depth. In one example, length-to-pixel ratio can be determined or estimated by dividing Distance 720 between a manipulating Object 615*aa* or Object 616*aa* and a manipulated Object 615*ab* or Object 616*ab* with a number of pixels on a line between coordinates [269, 961] of a pixel representing location of manipulating Object 615*aa* or Object 616*aa* in Digital Picture 750 and coordinates [664, 961] of a pixel representing location of manipulated Object 615*ab* or Object 616*ab* in Digital Picture 750 (i.e. 0.5/(664-269)=0.001266 meters per pixel, etc.). As each Object 615 or Object 616 in Digital Picture 750 is represented by Collection of Pixels 617, coordinates of a pixel representing location of manipulating Object 615*aa* or Object 616*aa* in Digital Picture 750 can be determined or estimated as coordinates of the lowest pixel on Centerline 760*aa* of Collection of Pixels 617*aa* (i.e. [269, 961], etc.). Similarly, coordinates of a pixel representing location of manipulated Object 615*ab* or Object 616*ab* in Digital Picture 750 can be determined or estimated as coordinates of the lowest pixel on Centerline 760*ab* of Collection of Pixels 617*ab* (i.e. [664, 961], etc.). Coordinates of other pixels can be used to represent locations of manipulating Object 615*aa* or Object 616*aa* and manipulated Object 615*ab* or Object 616*ab* in Digital Picture 750 in alternate implementations. In another example, length-to-pixel ratio can be determined or estimated by dividing Distance 720 between manipulating Object 615*aa* or Object 616*aa* and manipulated Object 615*ab* or Object 616*ab* with a number of pixels on a line between Centerline 760*aa* of Collection of Pixels 617*aa* and Centerline 760*ab* of Collection of Pixels 617*ab*. In a further example, length-to-pixel ratio can be determined or estimated by dividing Distance 720 between manipulating Object 615*aa* or Object 616*aa* and manipulated Object 615*ab* or Object 616*ab* with a number of pixels on a line between coordinates of the lowest pixel of Collection of Pixels 617*aa* and coordinates of the lowest pixel of Collection of Pixels 617*ab*. In a further example, length-to-pixel ratio can be determined or estimated by dividing Distance 720 between manipulating Object 615*aa* or Object 616*aa* and manipulated Object 615*ab* or Object 616*ab* with a number of pixels on a line between coordinates of any suitable pixel of Collection of Pixels 617*aa* and coordinates of any suitable pixel of Collection of Pixels 617*ab*. In general, length-to-pixel ratio can be determined or estimated by any technique, and/or those known in art. Such length-to-pixel ratio can then be used in processing Digital Pictures 750 for determining or estimating other needed lengths or information as later described. In some aspects, length-to-pixel ratio may be best determined or estimated by positioning Device 98 or observation point at or near perpendicular observing angle relative to manipulating Object 615*aa* or Object 616*aa* and/or manipulated Object 615*ab* or Object 616*ab*. It should be noted that actual pixels of Digital Picture 750 are not shown for clarity of illustration. It should also be noted that coordinates (i.e. pixel coordinates, etc.) used with respect to pixels of Digital Picture 750 refer to coordinates of pixels in the matrix of pixels of Digital Picture 750, which are different than physical and 3D coordinates used with respect to physical and 3D computer generated space in 3D Application Program 18.

Figure 16A:
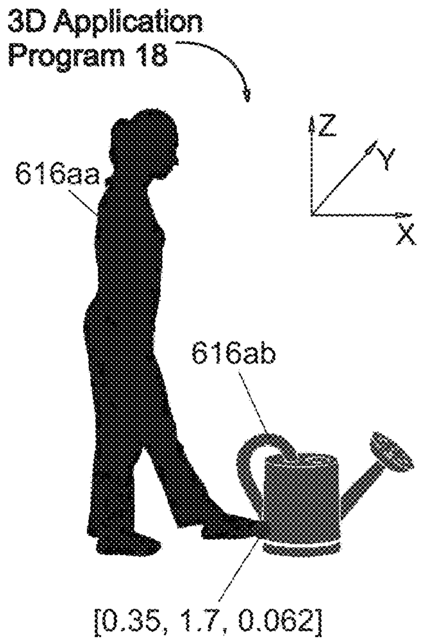
FIG. 16A-16B illustrate exemplary embodiments of Instruction Set Determination Logic's 447 determining Instruction Sets 526 for moving to a point of contact.

Referring to FIG. 16A, an exemplary embodiment of Instruction Set Determination Logic's 447 determining Instruction Sets 526 that would cause Device 98 and/or its Actuator 91 (i.e. robotic arm Actuator 91, etc.) to move to a point of contact between manipulating Object 615*aa* and manipulated Object 615*ab*, or Instruction Sets 526 that would cause Avatar 605 and/or its part (i.e. arm, etc.) to move to a point of contact between manipulating Object 616*aa* and manipulated Object 616*ab* is illustrated. In some designs, a point of contact (i.e. initial point of contact, etc.) between manipulating Object 615*aa* and manipulated Object 615*ab* can be determined or estimated using 3D Application Program 18 that includes Object 616*aa* representing manipulating Object 615*aa* and Object 616*ab* representing manipulated Object 615*ab*. In some aspects, Instruction Set Determination Logic 447 may determine or estimate a point of contact between manipulating Object 615*aa* or Object 616*aa* and manipulated Object 615*ab* or Object 616*ab* by determining intersection or collision of Object 616*aa* and Object 616*ab*. In one example where a 3D engine is used to implement 3D Application Program 18, such determination can be made by the 3D engine's collision detection capabilities (i.e. collision engine, etc.) that may provide coordinates of the collision point. In another example where other ways are used to implement 3D Application Program 18, such determination can be made by determining an intersection point between a polygon of a collection of polygons in Object 616*aa* and a polygon of a collection of polygons in Object 616*ab* (i.e. using mathematical functions defining the polygons and solving for intersections, etc.). Once such coordinates of an intersection or collision point is found (i.e. [0.35, 1.7, 0.062], etc.), coordinates of physical point of contact can be determined or estimated to be same or similar since 3D Application Program 18 may approximate at least some physical relationships in Device's 98 surrounding. Therefore, in one example, Instruction Set Determination Logic 447 can determine that Instruction Set 526 that would cause Device 98 and/or its Actuator 91 (i.e. robotic arm Actuator 91, etc.) to move to the point of contact between manipulating Object 615*aa* and manipulated Object 615*ab* includes Device.Arm.move (0.35, 1.7, 0.062), which can be used for learning functionalities later in the process. In another example, Instruction Set Determination Logic 447 can determine that Instruction Set 526 that would cause Avatar 605 and/or its part (i.e. arm, etc.) to move to the point of contact between manipulating Object 616*aa* and manipulated Object 616*ab* includes Avatar.Arm.move (0.35, 1.7, 0.062), which can be used for learning functionalities later in the process. It should be noted that other geometric shapes can be used in Objects 616 instead of or in addition to polygons to represent surfaces of Objects 615. In general, a point of contact between manipulating Object 615*aa* and manipulated Object 615*ab* using 3D Application Program 18 can be determined or estimated by any technique, and/or those known in art.

Figure 16B:
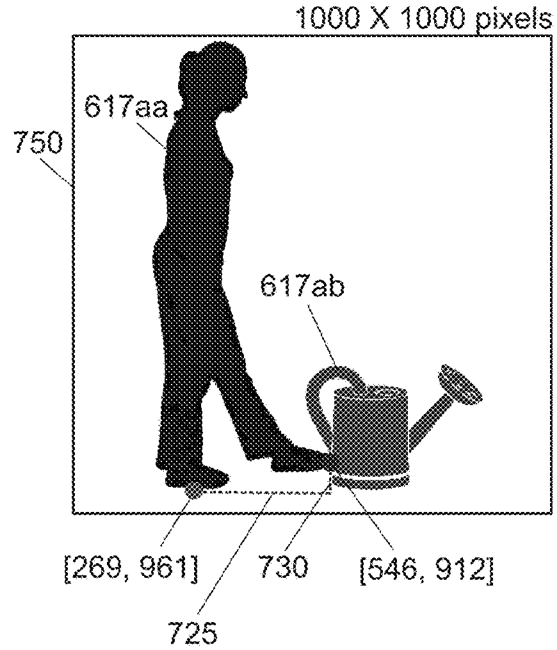

Referring to FIG. 16B, an exemplary embodiment of Instruction Set Determination Logic's 447 determining Instruction Sets 526 that would cause Device 98 and/or its Actuator 91 (i.e. robotic arm Actuator 91, etc.) to move to a point of contact between manipulating Object 615*aa* and manipulated Object 615*ab*, or Instruction Sets 526 that would cause Avatar 605 and/or its part (i.e. arm, etc.) to move to a point of contact between manipulating Object 616*aa* and manipulated Object 616*ab* is illustrated. In some designs, a point of contact (i.e. initial point of contact, etc.) between manipulating Object 615*aa* or Object 616*aa* and manipulated Object 615*ab* or Object 616*ab* can be determined or estimated using Digital Picture 750 depicting manipulating Object 615*aa* or Object 616*aa* and manipulated Object 615*ab* or Object 616*ab*. Such Digital Picture 750 may include Collection of Pixels 617*aa* representing manipulating Object 615*aa* or Object 616*aa* and Collection of Pixels 617*ab* representing manipulated Object 615*ab* or Object 616*ab*. A stream of Digital Pictures 750 can be captured by Camera 92*a* or rendered by Picture Renderer 476, and provided by Object Processing Unit 115 in or associated with a stream of Collections of Object Representations 525 as previously described. In some aspects, Instruction Set Determination Logic 447 may determine or estimate a point of contact between manipulating Object 615*aa* or Object 616*aa* and manipulated Object 615*ab* or Object 616*ab* by determining that coordinates of a pixel of Collection of Pixels 617 *aa* and coordinates of a pixel of Collection of Pixels 617*ab* are equal or adjacent to one another. For example, such determination can be made by comparing coordinates of pixels of Collection of Pixels 617*aa* and coordinates of pixels of Collection of Pixels 617*ab*. Alternatively, Instruction Set Determination Logic 447 can compare coordinates of pixels on boundaries of Collection of Pixels 617*aa* and Collection of Pixels 617*ab* to speed up the comparison. Once such one or more pixels with equal or adjacent coordinates are found, X (i.e. lateral, etc.) coordinate of point of contact between manipulating Object 615*aa* or Object 616*aa* and manipulated Object 615*ab* or Object 616*ab* can be determined or estimated using Distance 725 while Z (i.e. vertical, etc.) coordinate of point of contact between manipulating Object 615*aa* or Object 616*aa* and manipulated Object 615*ab* or Object 616*ab* can be determined or estimated using Distance 730. Distance 725 can be determined or estimated as a difference in X coordinates of pixel representing point of contact between Collection of Pixels 617*aa* and Collection of Pixels 617*ab* (i.e. [546, 912]) and pixel representing location of manipulating Object 615*aa* or Object 616*aa* (i.e. [269, 961]), the difference then multiplied by length-to-pixel ratio (i.e. (546-269) *0.001266=0.35 meters, etc.). Distance 730 can be determined or estimated as a difference in Y coordinates of pixel representing point of contact between Collection of Pixels 617*aa* and Collection of Pixels 617*ab* (i.e. [546, 912]) and pixel representing location of manipulating Object 615*aa* or Object 616*aa* (i.e. [269, 961], etc.), the difference then multiplied by length-to-pixel ratio (i.e. (961-912)*0.001266=0.062 meters, etc.). Y (i.e. horizontal, depth, etc.) coordinate of point of contact between manipulating Object 615*aa* or Object 616*aa* and manipulated Object 615*ab* or Object 616*ab* can be determined or estimated to be 1.7 or near 1.7 using the Y coordinate of manipulating Object's 615*aa* or Object's 616*aa* location coordinates (i.e. [0, 1.7, 0], etc.) and/or using the Y coordinate of manipulated Object's 615*ab* or Object's 616*ab* location coordinates (i.e. [0.5, 1.7, 0], etc.) as previously shown. Alternatively, Y (i.e. horizontal, depth, etc.) coordinate of point of contact between manipulating Object 615*aa* or Object 616*aa* and manipulated Object 615*ab* or Object 616*ab* can be determined or estimated by determining or estimating the depth of manipulated Object 615*ab* or Object 616*ab* at or around the point of contact with manipulating Object 615*aa* or Object 616*aa*. Alternatively, coordinates of point of contact between manipulating Object 615*aa* or Object 616*aa* and manipulated Object 615*ab* or Object 616*ab* can be determined or estimated using known or determinable/estimable information and using Euclidean distance formula, Pythagorean theorem, trigonometry, linear algebra, geometry, and/or other theorems, formulas, or techniques. Coordinates of point of contact between manipulating Object 615*aa* or Object 616*aa* and manipulated Object 615*ab* or Object 616*ab* can then be determined or estimated to be [0.35, 1.7, 0.062], for example. Therefore, in one example, Instruction Set Determination Logic 447 can determine that Instruction Set 526 that would cause Device 98 and/or its Actuator 91 (i.e. robotic arm Actuator 91, etc.) to move to the point of contact between manipulating Object 615*aa* and manipulated Object 615*ab* includes Device.Arm.move (0.35, 1.7, 0.062), which can be used for learning functionalities later in the process. In another example, Instruction Set Determination Logic 447 can determine that Instruction Set 526 that would cause Avatar 605 and/or its part (i.e. arm, etc.) to move to the point of contact between manipulating Object 616*aa* and manipulated Object 616*ab* includes Avatar.Arm.move (0.35, 1.7, 0.062), which can be used for learning functionalities later in the process. It should be noted that the aforementioned coordinates of physical point of contact are absolute coordinates used in this example, and that relative coordinates (i.e. relative to the location of manipulating Object 615*aa* or Object 616*aa*, relative to other suitable objects, etc.) can be used where practical and/or applicable depending on design. In some implementations, insignificant content (i.e. background, collections of pixels representing insignificant objects, etc.) can be removed or suppressed from Digital Picture 750 by changing pixels of Digital Picture 750 other than Collection of Pixels 617*aa* and Collection of Pixels 617*ab* into a uniform color (i.e. white, blue, gray, etc.) so that point of contact processing can focus on Collection of Pixels 617*aa* and Collection of Pixels 617*ab*. In other implementations, Collection of Pixels 617*aa* and Collection of Pixels 617*ab* can be extracted out of Digital Picture 750 and placed in an empty canvas so that point of contact processing can focus on Collection of Pixels 617*aa* and Collection of Pixels 617*ab*. Any picture segmentation techniques (i.e. thresholding, clustering, region-growing, edge detection, curve propagation, level sets, graph partitioning, model-based segmentation, trainable segmentation [i.e. artificial neural networks, etc.], etc.), and/or those known in art, can be utilized in removing or suppressing insignificant content and/or extracting Collections of Pixels 617 from Digital Picture 750. In some designs, bitmap collision detection, per-pixel collision detection, and/or other similar techniques can be utilized in determining point of contact in Digital Pictures 750. In general, a point of contact between manipulating Object 615*aa* or Object 616*aa* and manipulated Object 615*ab* or Object 616*ab* using Digital Picture 750 can be determined or estimated by any technique, and/or those known in art.

Referring now to Instruction Set Determination Logic's 447 determining Instruction Sets 526 that would cause Device 98 to perform observed manipulations of a manipulated Object 615, or Instruction Sets 526 that would cause Avatar 605 to perform observed manipulations of a manipulated Object 616.

In some embodiments, Instruction Set Determination Logic 447 can determine manipulations of a manipulated Object 615 or Object 616 by observing or examining a manipulating Object's 615 or Object's 616 operations after and/or prior to an initial point of contact between the manipulating Object 615 or Object 616 and the manipulated Object 615 or Object 616. Instruction Set Determination Logic 447 can then determine Instruction Sets 526 that would cause Device 98 to perform or replicate the manipulating Object's 615 operations in manipulating the manipulated Object 615, or Instruction Sets 526 that would cause Avatar 605 to perform or replicate the manipulating Object's 616 operations in manipulating the manipulated Object 616. In some aspects, once a manipulation of the manipulated Object 615 or Object 616 is determined or recognized as later described, Instruction Set Determination Logic 447 can utilize a lookup table or other lookup mechanism/technique to determine Instruction Sets 526 that would cause Device 98 to perform the manipulation (i.e. after an initial point of contact, etc.), or Instruction Sets 526 that would cause Avatar 605 to perform the manipulation (i.e. after an initial point of contact, etc.). Such lookup table or other lookup mechanism/technique may include a collection of references to manipulations associated with Instruction Sets 526 for performing the manipulation. Instruction Set Determination Logic 447 may change the Instruction Sets' 526 parameters with parameters (i.e. coordinates of a move point, coordinates of a push point, etc.) determined to be used in various situations as later described. The lookup table or other lookup mechanism/technique may include a reference to any manipulation or operation that can be recognized by any technique, and/or those known in art. For example, a lookup table may include the following:

| Manipulation Reference | Instruction Set |
|---|---|
| Brief Touch | Device.Arm.move(X, Y, Z); //[X, Y, Z] are coordinates of a retreat point<br>OR<br>Avatar.Arm.move(X, Y, Z); //[X, Y, Z] are coordinates of a retreat point |
| Push | Device.Arm.move(X, Y, Z); //[X, Y, Z] are coordinates of a push point<br>OR<br>Avatar.Arm.move(X, Y, Z); //[X, Y, Z] are coordinates of a push point |
| Grip/Attach/Grasp | Device.Arm.grip( ); OR Device.Arm.attach( ); OR Device.Arm.grasp( );<br>OR<br>Avatar.Arm.grip( ); OR Avatar.Arm.attach( ); OR Avatar.Arm.grasp( ); |
| Move/Pull/Lift, etc. | Device.Arm.grip( ); OR Device.Arm.attach( ); OR Device.Arm.grasp( );<br>AND<br>Device.Arm.move(X, Y, Z); //[X, Y, Z] are coordinates of a move/pull/lift point<br>AND/OR Device.move(X, Y, Z); //[X, Y, Z] are coordinates of a move point<br>OR<br>Avatar.Arm.grip( ); OR Avatar.Arm.attach( ); OR Avatar.Arm.grasp( );<br>AND<br>Avatar.Arm.move(X, Y, Z); //[X, Y, Z] are coordinates of a move/pull/lift point<br>AND/OR Avatar.move(X, Y, Z); //[X, Y, Z] are coordinates of a move point |
| Squeeze | Device.Arm.squeeze( );<br>OR<br>Avatar.Arm.squeeze( ); |
| Rotate/Twist | Device.Arm.rotate(A); //A is angle of rotation<br>OR<br>Avatar.Arm.rotate(A); //A is angle of rotation |
| . . . | . . . |

In some exemplary embodiments, Instruction Set Determination Logic 447 can determine, using 3D Application Program 18, Instruction Sets 526 that would cause Device 98 and/or its Actuator 91 (i.e. robotic arm Actuator 91, etc.) to perform a continuous touch manipulation of manipulated Object 615*ab*, or Instruction Sets 526 that would cause Avatar 605 and/or its part (i.e. arm, etc.) to perform a continuous touch manipulation of manipulated Object 616*ab*. 3D Application Program 18 may include Object 616*aa* representing manipulating Object 615*aa* and Object 616*ab* representing manipulated Object 615*ab* as previously shown. Instruction Set Determination Logic 447 can determine that manipulating Object 615*aa* or Object 616*aa* performed a continuous touch manipulation of manipulated Object 615*ab* or Object 616*ab* by determining a continuous contact between manipulating Object 615*aa* or Object 616*aa* or part thereof and manipulated Object 615*ab* or Object 616*ab* after an initial point of contact. For example, such continuous contact can be determined by determining contact between Object 616*aa* and Object 616*ab* in multiple successive time frames of 3D Application Program 18 as previously described with respect to determining a point of contact in a single time frame of 3D Application Program 18. In some cases of a continuous touch, Instruction Set Determination Logic 447 may not need to determine Instruction Sets 526 that would cause Device 98 and/or a part thereof to perform any operations (i.e. retreat, etc.), or Instruction Sets 526 that would cause Avatar 605 and/or part thereof to perform any operations (i.e. retreat, etc.) after an initial point of contact since manipulating Object 615*aa* or Object 616*aa* may not move in a continuous touch manipulation. In other exemplary embodiments, Instruction Set Determination Logic 447 can determine, using 3D Application Program 18, Instruction Sets 526 that would cause Device 98 and/or its Actuator 91 (i.e. robotic arm Actuator 91, etc.) to perform a brief touch manipulation (not shown) of manipulated Object 615*ab*, or Instruction Sets 526 that would cause Avatar 605 and/or its part (i.e. arm, etc.) to perform a brief touch manipulation (not shown) of manipulated Object 616*ab*. Instruction Set Determination Logic 447 can determine that manipulating Object 615*aa* or Object 616*aa* performed a brief touch manipulation of manipulated Object 615*ab* or Object 616*ab* by determining that manipulating Object 615*aa* or Object 616*aa* or part thereof is no longer in contact with manipulated Object 615*ab* or Object 616*ab* after an initial point of contact with manipulated Object 615*ab* or Object 616*ab*. For example, such lack of contact can be determined by determining no contact between Object 616*aa* and Object 616*ab* (i.e. no polygon of Object 616*aa* intersects or touches a polygon of Object 616*ab*, etc.) in a time frame of 3D Application Program 18 after the time frame where the initial point of contact was determined. In some cases of a brief touch, Instruction Set Determination Logic 447 may determine Instruction Sets 526 that would cause Device 98 and/or a part thereof to perform or replicate manipulating Object's 615*aa* retreat from manipulated Object 615*ab* after an initial point of contact, or Instruction Sets 526 that would cause Avatar 605 and/or part thereof to perform or replicate manipulating Object's 616*aa* retreat from manipulated Object 616*ab* after an initial point of contact. Instruction Set Determination Logic 447 can determine a retreat point (not shown), which indicates where manipulating Object 615*aa* or Object 616*aa*, or part thereof, retreated after an initial point of contact with manipulated Object 615*ab* or Object 616*ab*. For example, such retreat point can be determined by finding coordinates of a point of Object 616*aa* (i.e. point on a polygon of Object 616*aa*, etc.) that is closest to Object 616*ab* from a time frame of 3D Application Program 18 in which the coordinates of the closest point stopped changing (i.e. manipulating Object 615*aa* or Object 616*aa*, or part thereof, stopped moving, etc.). Such 3D coordinates may be equal to or approximate physical coordinates of the retreat point as 3D Application Program 18 approximates at least some of Device's 98 physical surrounding. Instruction Set Determination Logic 447 can further determine whether manipulating Object 615*aa* or Object 616*aa* retreated by moving itself (i.e. determine that coordinates of manipulating Object's 615*aa* or Object's 616*aa* physical and/or 3D location changed, etc.) and/or by moving its part (i.e. determine that coordinates of manipulating Object's 615*aa* or Object's 616*aa* physical and/or 3D location did not change, etc.). Therefore, in one example, Instruction Set 526 that would cause Device 98 or Avatar 605 to retreat from manipulated Object 615*ab* or Object 616*ab* after an initial point of contact may include Device.move (X, Y, Z) or Avatar.move (X, Y, Z), where [X, Y, Z] are physical or 3D coordinates of the retreat point. In another example, Instruction Set 526 that would cause Device's 98 robotic arm Actuator 91 or Avatar's 605 arm to retreat from manipulated Object 615*ab* or Object 616*ab* after an initial point of contact may include Device.Arm.move (X, Y, Z) or Avatar.Arm.move (X, Y, Z), where [X, Y, Z] are physical or 3D coordinates of the retreat point. Such Instruction Sets 526 can be used in combination in cases where manipulating Object 615*aa* or Object 616*aa* performed a retreat operation by moving itself and by moving its part. In other cases of a brief touch, it may not be necessary for Device 98 or Avatar 605 to perform or replicate manipulating Object's 615*aa* or Object's 616*aa* operations after an initial point of contact with manipulated Object 615*ab* or Object 616*ab*. In such cases, Instruction Set Determination Logic 447 may determine or select generic Instruction Sets 526 for some form of retreating from manipulated Object 615*ab* or Object 616*ab* after an initial point of contact. In one example, Instruction Set Determination Logic 447 may select Instruction Set 526 for causing Device 98 or Avatar 605 to retreat from manipulated Object 615*ab* or Object 616*ab* such as Device.move (X, Y, Z) or Avatar.move (X, Y, Z), where [X, Y, Z] are coordinates of any point away from manipulated Object 615*ab* or Object 616*ab*. In another example, Instruction Set Determination Logic 447 may select Instruction Set 526 for causing Device's 98 robotic arm Actuator 91 or Avatar's 605 arm to retreat from manipulated Object 615*ab* or Object 616*ab* such as Device.Arm.move (X, Y, Z) or Avatar.Arm.move (X, Y, Z), where [X, Y, Z] are coordinates of any point away from manipulated Object 615*ab* or Object 616*ab*. In a further example, Instruction Set Determination Logic 447 may select Instruction Sets 526 for causing Device 98 and/or part (i.e. robotic arm Actuator 91, etc.) thereof or Avatar 605 and/or part (i.e. arm, etc.) thereof to move into a default position/state (i.e. Device.move (defaultPosition), Device.Arm.move (defaultPosition), Avatar.move (defaultPosition), Avatar.Arm.move (defaultPosition), etc.), move into a previous position/state (i.e. Device.move (lastPosition), Device.Arm.move (lastPosition), Avatar.move (lastPosition), Avatar.Arm.move (lastPosition), etc.), and/or perform other operations. In general, continuous touch, brief touch, retreating, retreat point, and/or other aspects of a touch manipulation can be determined or estimated by any technique, and/or those known in art.

In some exemplary embodiments, Instruction Set Determination Logic 447 can determine, using one or more Digital Pictures 750, Instruction Sets 526 that would cause Device 98 and/or its Actuator 91 (i.e. robotic arm Actuator 91, etc.) to perform a continuous touch manipulation of manipulated Object 615*ab*, or Instruction Sets 526 that would cause Avatar 605 and/or its part (i.e. arm, etc.) to perform a continuous touch manipulation of manipulated Object 616*ab*. The one or more Digital Pictures 750 may be part of a stream of Digital Pictures 750 and may include Collection of Pixels 617*aa* representing manipulating Object 615*aa* or Object 616*aa* and Collection of Pixels 617*ab* representing manipulated Object 615*ab* or Object 616*ab* as previously shown. A stream of Digital Pictures 750 can be captured by Camera 92*a* or rendered by Picture Renderer 476, and provided by Object Processing Unit 115 in or associated with one or more Collections of Object Representations 525 as previously described. Instruction Set Determination Logic 447 can determine that manipulating Object 615*aa* or Object 616*aa* performed a continuous touch manipulation of manipulated Object 615*ab* or Object 616*ab* by determining a continuous contact between manipulating Object 615*aa* or Object 616*aa*, or part thereof, and manipulated Object 615*ab* or Object 616*ab* after an initial point of contact. For example, such continuous contact can be determined by determining contact between Collection of Pixels 617*aa* and Collection of Pixels 617*ab* in multiple successive Digital Pictures 750 of a stream of Digital Pictures 750 as previously described with respect to determining a point of contact in a single Digital Picture 750. In some cases of a continuous touch, Instruction Set Determination Logic 447 may not need to determine Instruction Sets 526 that would cause Device 98 and/or part thereof to perform any operations (i.e. retreat, etc.), or Instruction Sets 526 that would cause Avatar 605 and/or part thereof to perform any operations (i.e. retreat, etc.) after an initial point of contact since the manipulating Object 615*aa* or Object 616*aa* may not move in a continuous touch manipulation. In other exemplary embodiments, Instruction Set Determination Logic 447 can determine, using one or more Digital Pictures 750, Instruction Sets 526 that would cause Device 98 and/or its Actuator 91 (i.e. robotic arm Actuator 91, etc.) to perform a brief touch manipulation (not shown) of manipulated Object 615*ab*, or Instruction Sets 526 that would cause Avatar 605 and/or its part (i.e. arm, etc.) to perform a brief touch manipulation (not shown) of manipulated Object 616*ab*. Instruction Set Determination Logic 447 can determine that manipulating Object 615*aa* or Object 616*aa* performed a brief touch manipulation of manipulated Object 615*ab* or Object 616*ab* by determining that manipulating Object 615*aa* or Object 616*aa*, or part thereof, is no longer in contact with manipulated Object 615*ab* or Object 616*ab* after an initial point of contact with manipulated Object 615*ab* or Object 616*ab*. For example, such lack of contact can be determined by determining no contact between Collection of Pixels 617*aa* and Collection of Pixels 617*ab* (i.e. coordinates of no pixel of Collection of Pixels 617*aa* are equal or adjacent to coordinates of a pixel of Collection of Pixels 617*ab*, etc.) from Digital Picture 750 of a stream of Digital Pictures 750 after Digital Picture 750 where the initial point of contact was determined. In some cases of a brief touch, Instruction Set Determination Logic 447 may determine Instruction Sets 526 that would cause Device 98 and/or part thereof to perform or replicate manipulating Object's 615*aa* retreat from manipulated Object 615*ab* after an initial point of contact, or Instruction Sets 526 that would cause Avatar 605 and/or part thereof to perform or replicate manipulating Object's 616*aa* retreat from manipulated Object 616*ab* after an initial point of contact. Instruction Set Determination Logic 447 can determine a retreat point (not shown), which indicates where manipulating Object 615*aa* or Object 616*aa* or part thereof retreated after the initial point of contact with manipulated Object 615*ab* or Object 616*ab*. For example, such retreat point can be determined by finding coordinates of a pixel of Collection of Pixels 617*aa* that is closest to Collection of Pixels 617*ab* from Digital Picture 750 of a stream of Digital Pictures 750 in which the coordinates of the closest pixel stopped changing (i.e. manipulating Object 615*aa* or Object 616*aa*, or part thereof, stopped moving, etc.). Such pixel coordinates can then be converted into physical or 3D coordinates of the retreat point using length-to-pixel ratio as previously described. Instruction Set Determination Logic 447 can further determine whether manipulating Object 615*aa* or Object 616*aa* retreated by moving itself (i.e. determine that coordinates of manipulating Object's 615*aa* or Object's 616*aa* physical or 3D location changed, etc.) and/or by moving its part (i.e. determine that coordinates of manipulating Object's 615*aa* or Object's 616*aa* physical or 3D location did not change, etc.). Therefore, in one example, Instruction Set 526 that would cause Device 98 or Avatar 605 to retreat from manipulated Object 615*ab* or Object 616*ab* after an initial point of contact may include Device.move (X, Y, Z) or Avatar.move (X, Y, Z), where [X, Y, Z] are physical or 3D coordinates of the retreat point. In another example, Instruction Set 526 that would cause Device's 98 robotic arm Actuator 91 or Avatar's 605 arm to retreat from manipulated Object 615*ab* or Object 616*ab* after an initial point of contact may include Device.Arm.move (X, Y, Z) or Avatar.Arm.move (X, Y, Z), where [X, Y, Z] are physical or 3D coordinates of the retreat point. Such Instruction Sets 526 can be used in combination in cases where manipulating Object 615*aa* or Object 616*aa* performed a retreat operation by moving itself and by moving its part. In other cases of a brief touch, it may not be necessary for Device 98 or Avatar 605 to perform or replicate manipulating Object's 615*aa* or Object's 616*aa* operations after an initial point of contact with manipulated Object 615*ab* or Object 616*ab*. In such cases, Instruction Set Determination Logic 447 may determine or select generic Instruction Sets 526 for some form of retreating from manipulated Object 615*ab* or Object 616*ab* after an initial point of contact. In one example, Instruction Set Determination Logic 447 may select Instruction Set 526 for causing Device 98 or Avatar 605 to retreat from manipulated Object 615*ab* or Object 616*ab* such as Device.move (X, Y, Z) or Avatar.move (X, Y, Z), where [X, Y, Z] are coordinates of any point away from manipulated Object 615*ab* or Object 616*ab*. In another example, Instruction Set Determination Logic 447 may select Instruction Set 526 for causing Device's 98 robotic arm Actuator 91 or Avatar's 605 arm to retreat from manipulated Object 615*ab* or Object 616*ab* such as Device.Arm.move (X, Y, Z) or Avatar.Arm.move (X, Y, Z), where [X, Y, Z] are coordinates of any point away from manipulated Object 615*ab* or Object 616*ab*. In a further example, Instruction Set Determination Logic 447 may select Instruction Sets 526 for causing Device98 and/or part (i.e. robotic arm Actuator 91, etc.) thereof or Avatar 605 and/or part (i.e. arm, etc.) thereof to move into a default position/state (i.e. Device.move (defaultPosition), Device.Arm.move (defaultPosition), Avatar.move (defaultPosition), Avatar.Arm.move (defaultPosition), etc.), move into a previous position/state (i.e. Device.move (lastPosition), Device.Arm.move (lastPosition), Avatar.move (lastPosition), Avatar.Arm.move (lastPosition), etc.), and/or perform other operations. In general, continuous touch, brief touch, retreating, retreat point, and/ or other aspects of a touch manipulation can be determined or estimated by any technique, and/or those known in art.

Figure 16C:
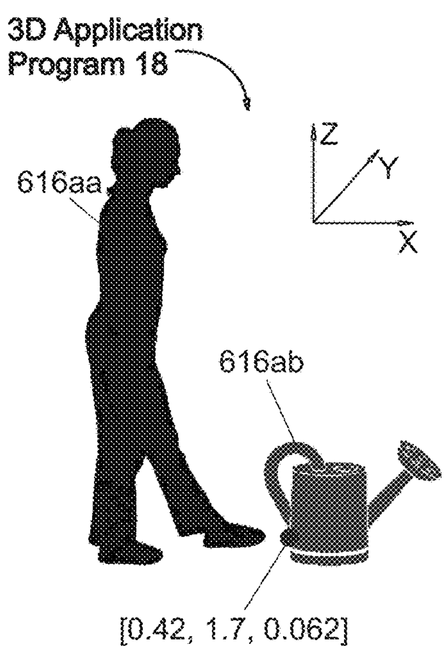
FIG. 16C-16D illustrate exemplary embodiments of Instruction Set Determination Logic's 447 determining Instruction Sets 526 for performing a push manipulation.

Referring to FIG. 16C, an exemplary embodiment of Instruction Set Determination Logic's 447 determining, using 3D Application Program 18, Instruction Sets 526 that would cause Device 98 and/or its Actuator 91 (i.e. robotic arm Actuator 91, etc.) to perform a push manipulation of manipulated Object 615*ab*, or Instruction Sets 526 that would cause Avatar 605 and/or its part (i.e. arm, etc.) to perform a push manipulation of manipulated Object 616*ab* is illustrated. Instruction Set Determination Logic 447 can determine that manipulating Object 615*aa* or Object 616*aa* performed a push manipulation of manipulated Object 615*ab* or Object 616*ab* by determining a continuous contact between manipulating Object 615*aa* or Object 616*aa*, or part thereof, and manipulated Object 615*ab* or Object 616*ab* after an initial point of contact and determining that the point of contact moved inside manipulated Object's 615*ab* or Object's 616*ab* space. For example, such continuous contact can be determined by determining contact between Object 616*aa* and Object 616*ab* in multiple successive time frames of 3D Application Program 18 as previously described with respect to determining a point of contact in a single time frame of 3D Application Program 18. Furthermore, for example, that the point of contact moved inside manipulated Object's 615*ab* or Object's 616*ab* space can be determined by determining that coordinates of the point of contact from a successive time frame of 3D Application Program 18 are equal to coordinates of a point inside Object's 616*ab* space from the time frame of 3D Application Program 18 where the initial point of contact was determined. Alternatively, for example, that the point of contact moved inside manipulated Object's 615*ab* or Object's 616*ab* space can be determined by determining that coordinates of the point of contact from a successive time frame of 3D Application Program 18 moved in the direction of Object 616*ab* from time frame of 3D Application Program 18 where the initial point of contact was determined. Instruction Set Determination Logic 447 can further determine a push point (i.e. [0.42, 1.7, 0.062], etc.), which indicates how far manipulating Object 615*aa* or Object 616*aa* or part thereof pushed manipulated Object 615*ab* or Object 616*ab* after an initial point of contact with manipulated Object 615*ab* or Object 616*ab*. For example, such push point can be determined by finding coordinates of the point of contact from a time frame of 3D Application Program 18 in which the coordinates of the point of contact stopped changing (i.e. the point of contact stopped moving, etc.). Such 3D coordinates equal or approximate physical coordinates of the push point as 3D Application Program 18 approximates at least some of Device's 98 physical surrounding. Instruction Set Determination Logic 447 can further determine whether manipulating Object 615*aa* or Object 616*aa* performed a push manipulation by moving itself (i.e. determine that coordinates of manipulating Object's 615*aa* or Object's 616*aa* physical and/or 3D location changed, etc.) and/or by moving its part (i.e. determine that coordinates of manipulating Object's 615*aa* or Object's 616*aa* physical and/or 3D location did not change, etc.). Therefore, in one example, Instruction Set 526 that would cause Device 98 or Avatar 605 to push manipulated Object 615*ab* or Object 616*ab* after an initial point of contact may include Device.move (X, Y, Z) or Avatar.move (X, Y, Z), where [X, Y, Z] are physical or 3D coordinates of the push point. In another example, Instruction Set 526 that would cause Device's 98 robotic arm Actuator 91 or Avatar's 605 arm to push manipulated Object 615*ab* or Object 616*ab* after an initial point of contact may include Device.Arm.move (X, Y, Z) or Avatar.Arm.move (X, Y, Z), where [X, Y, Z] are physical or 3D coordinates of the push point. Such Instruction Sets 526 can be used in combination in cases where manipulating Object 615*aa* or Object 616*aa* performed a push manipulation by moving itself and by moving its part. In general, pushing, push point, and/or other aspects of a push manipulation can be determined or estimated by any technique, and/or those known in art.

Figure 16D:
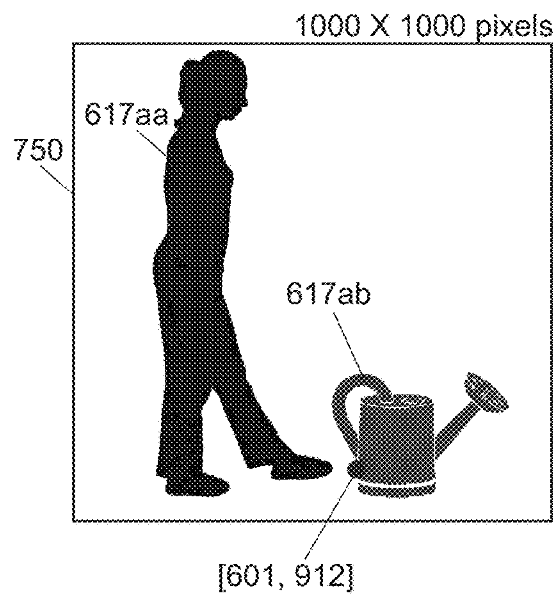

Referring to FIG. 16D, an exemplary embodiment of Instruction Set Determination Logic's 447 determining, using one or more Digital Pictures 750, Instruction Sets 526 that would cause Device 98 and/or its Actuator 91 (i.e. robotic arm Actuator 91, etc.) to perform a push manipulation of manipulated Object 615*ab*, or Instruction Sets 526 that would cause Avatar 605 and/or its part (i.e. arm, etc.) to perform a push manipulation of manipulated Object 616*ab* is illustrated. One or more Digital Pictures 750 may be part of a stream of Digital Pictures 750 that can be captured by Camera 92*a* or rendered by Picture Renderer 476, and provided by Object Processing Unit 115 in or associated with one or more Collections of Object Representations 525 as previously described. Instruction Set Determination Logic 447 can determine that manipulating Object 615*aa* or Object 616*aa* performed a push manipulation of manipulated Object 615*ab* or Object 616*ab* by determining a continuous contact between manipulating Object 615*aa* or Object 616*aa*, or part thereof, and manipulated Object 615*ab* or Object 616*ab* after an initial point of contact and determining that the point of contact moved inside manipulated Object's 615*ab* or Object's 616*ab* space. For example, such continuous contact can be determined by determining contact between Collection of Pixels 617*aa* and Collection of Pixels 617*ab* in multiple successive Digital Pictures 750 of a stream of Digital Pictures 750 as previously described with respect to determining a point of contact in a single Digital Picture 750. Furthermore, for example, that the point of contact moved inside manipulated Object's 615*ab* or Object's 616*ab* space can be determined by determining that coordinates of the point of contact from a successive Digital Picture 750 are equal to coordinates of a pixel inside Collection of Pixels 617*ab* from Digital Picture 750 where the initial point of contact was determined. Alternatively, for example, that the point of contact moved inside manipulated Object 615*ab* or Object 616*ab* space can be determined by determining that coordinates of the point of contact from a successive Digital Picture 750 moved in the direction of Collection of Pixels 617*ab* from Digital Picture 750 where the initial point of contact was determined. Instruction Set Determination Logic 447 can further determine a push point (i.e. [601, 912], etc.), which indicates how far manipulating Object 615*aa* or Object 616*aa* or part thereof pushed manipulated Object 615*ab* or Object 616*ab* after an initial point of contact. For example, such push point can be determined by finding coordinates of the point of contact from Digital Picture 750 of a stream of Digital Pictures 750 in which the coordinates of the point of contact stopped changing (i.e. the point of contact stopped moving, etc.). Such pixel coordinates can then be converted into physical or 3D coordinates of the push point using length-to-pixel ratio as previously described with respect to determining coordinates of a physical or 3D point of contact using pixel coordinates from Digital Picture 750. Instruction Set Determination Logic 447 can further determine whether manipulating Object 615*aa* or Object 616*aa* performed a push manipulation by moving itself (i.e. determine that coordinates of manipulating Object's 615*aa* or Object's 616*aa* physical or 3D location changed, etc.) and/or by moving its part (i.e. determine that coordinates of manipulating Object's 615*aa* or Object's 616*aa* physical or 3D location did not change, etc.). Therefore, in one example, Instruction Set 526 that would cause Device 98 or Avatar 605 to push manipulated Object 615*ab* or Object 616*ab* after an initial point of contact may include Device.move (X, Y, Z) or Avatar.move (X, Y, Z), where [X, Y, Z] are physical or 3D coordinates of the push point. In another example, Instruction Set 526 that would cause Device's 98 robotic arm Actuator 91 or Avatar's 605 arm to push manipulated Object 615*ab* or Object 616*ab* after an initial point of contact may include Device.Arm.move (X, Y, Z) or Avatar.Arm.move (X, Y, Z), where [X, Y, Z] are physical or 3D coordinates of the push point. Such Instruction Sets 526 can be used in combination in cases where manipulating Object 615*aa* or Object 616*aa* performed a push manipulation by moving itself and by moving its part. In general, pushing, push point, and/or other aspects of a push manipulation can be determined or estimated by any technique, and/or those known in art.

Figure 17A:
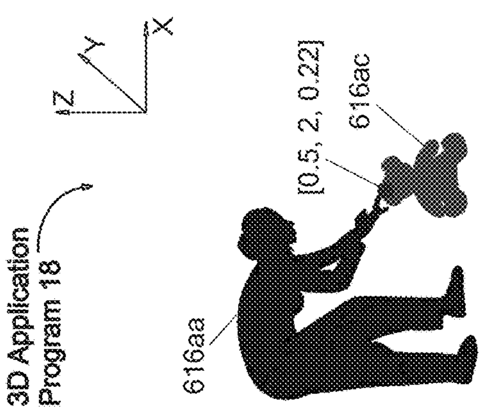
FIG. 17A-17F illustrate exemplary embodiments of Instruction Set Determination Logic's 447 determining Instruction Sets 526 for performing grip/attach/grasp, move, and release manipulations.
Figure 17B:
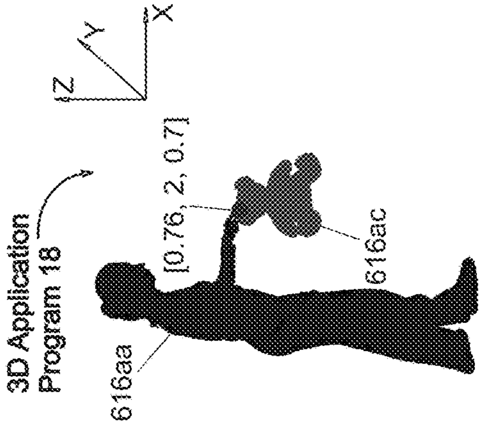
Figure 17C:
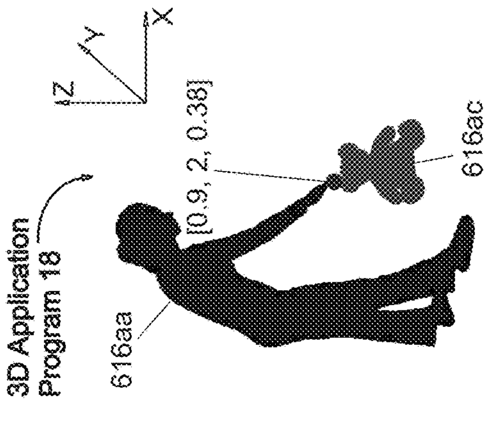

Referring to FIG. 17A-17C, an exemplary embodiment of Instruction Set Determination Logic's 447 determining, using 3D Application Program 18, Instruction Sets 526 that would cause Device 98 and/or its Actuator 91 (i.e. robotic arm Actuator 91, etc.) to perform grip/attach/grasp, move, and release manipulations of manipulated Object 615*ac*, or Instruction Sets 526 that would cause Avatar 605 and/or its part (i.e. arm, etc.) to perform grip/attach/grasp, move, and release manipulations of manipulated Object 616*ac* is illustrated. In some aspects, Instruction Set Determination Logic 447 can determine that manipulating Object 615*aa* or Object 616*aa* performed grip/attach/grasp, move, and release manipulations of manipulated Object 615*ac* or Object 616*ac* by determining that manipulating Object 615*aa* or Object 616*aa* or part thereof gripped/attached to/grasped manipulated Object 615*ac* or Object 616*ac* after an initial point of contact with manipulated Object 615*ac* or Object 616*ac*, determining that the area of contact (i.e. area where two objects touch, etc.) moved, and determining that manipulating Object 615*aa* or Object 616*aa* or part thereof released (i.e. ungripped/detached from/let go, etc.) manipulated Object 615*ac* or Object 616*ac*. Instruction Set Determination Logic 447 can determine that manipulating Object 615*aa* or Object 616*aa*, or part thereof, gripped/attached to/grasped manipulated Object 615*ac* or Object 616*ac* after an initial point of contact (i.e. [0.5, 2, 0.22], etc.) with manipulated Object 615*ac* or Object 616*ac*. For example, such grip/attachment/grasp can be determined by determining one or more points of contact between Object 616*aa* and Object 616*ac* (i.e. one or more polygons of Object 616*aa* intersect or touch one or more polygons of Object 616*ac*, etc.) in multiple successive time frames of 3D Application Program 18 after a time frame where an initial point of contact was determined. In some designs, such one or more points of contact between Object 616*aa* and Object 616*ac* may define an area of contact. Hence, a prolonged contact (i.e. a threshold for contact duration can be used herein, etc.) at any one or more points of contact or at an area of contact may be considered a grip/attachment/grasp. Therefore, for example, Instruction Set 526 that would cause Device 98 or Avatar 605 to grip/attach to/grasp manipulated Object 615*ac* or Object 616*ac* after an initial point of contact may include Device.Arm.grip ( ) Device.Arm.attach ( ) or Device. Arm.grasp ( ) OR Avatar.Arm.grip ( ) Avatar.Arm.attach ( ) or Avatar.Arm.grasp ( ) Instruction Set Determination Logic 447 can further determine that the area of contact moved. For example, that the area of contact moved can be determined by determining that coordinates of one or more points (i.e. central point or centroid, etc.) of the area of contact from a later time frame of 3D Application Program 18 differ from coordinates of one or more points (i.e. central point or centroid, etc.) of the area of contact from a time frame where the area of contact was initially detected. Instruction Set Determination Logic 447 can also determine one or more move points (i.e. [0.76, 2, 0.7], [0.9, 2, 0.38], etc.), which indicate where manipulating Object 615*aa* or Object 616*aa*, or part thereof, moved manipulated Object 615*ac* or Object 616*ac* after an initial point of contact with manipulated Object 615*ac* or Object 616*ac*. For example, such move point can be determined by finding coordinates of one or more points (i.e. central point or centroid, any one or more points, etc.) of the area of contact from a time frame of 3D Application Program 18 after a time frame where the area of contact was initially determined. Such 3D coordinates equal or approximate physical coordinates of the move point as 3D Application Program 18 approximates at least some of Device's 98 physical surrounding. Instruction Set Determination Logic 447 can also determine whether manipulating Object 615*aa* or Object 616*aa* performed the move manipulation by moving itself (i.e. determine that coordinates of manipulating Object's 615*aa* or Object's 616*aa* physical and/or 3D location changed, etc.) and/or by moving its part (i.e. determine that coordinates of manipulating Object's 615*aa* or Object's 616*aa* physical and/or 3D location did not change, etc.). Therefore, in one example, Instruction Set 526 that would cause Device 98 or Avatar 605 to move manipulated Object 615*ac* or Object 616*ac* after a grip/attach/grasp manipulation may include Device.move (X, Y, Z) or Avatar.move (X, Y, Z), where [X, Y, Z] are physical or 3D coordinates of the move point. In another example, Instruction Set 526 that would cause Device's 98 robotic arm Actuator 91 or Avatar's 605 arm to move manipulated Object 615*ac* or Object 616*ac* after a grip/attach/grasp manipulation may include Device.Arm.move (X, Y, Z) or Avatar.Arm.move (X, Y, Z), where [X, Y, Z] are physical or 3D coordinates of the move point. Such Instruction Sets 526 can be used in combination in cases where manipulating Object 615*aa* or Object 616*aa* performed a move manipulation by moving itself and by moving its part. Instruction Set Determination Logic 447 can further determine that manipulating Object 615*aa* or Object 616*aa* or part thereof released manipulated Object 615*ac* or Object 616*ac*. For example, such release can be determined by determining no contact between Object 616*aa* and Object 616*ac* (i.e. no polygon of Object 616*aa* intersects or touches a polygon of Object 616*ac*, etc.) in a time frame of 3D Application Program 18 after a time frame where the initial point of contact was determined. In some aspects, if release coordinates are needed, a release point, which indicates where manipulating Object 615*aa* or Object 616*aa* or part thereof released manipulated Object 615*ac* or Object 616*ac*, can be determined in the last move point (i.e. [0.9, 2, 0.38], etc.) before determining no contact between Object 616*aa* and Object 616*ac*, for example. Such 3D coordinates equal or approximate physical coordinates of the release point as 3D Application Program 18 may approximate at least some of Device's 98 physical surrounding. Therefore, for example, Instruction Set 526 that would cause Device 98 or Avatar 605 to release manipulated Object 615*ac* or Object 616*ac* after a move manipulation may include Device.Arm.release ( ) or Avatar.Arm.release ( ) In general, gripping/attaching/grasping, moving, move point, releasing, release point, and/or other aspects of grip/attach/grasp, move, and/or release manipulations can be determined or estimated by any technique, and/or those known in art.

Figure 17D:
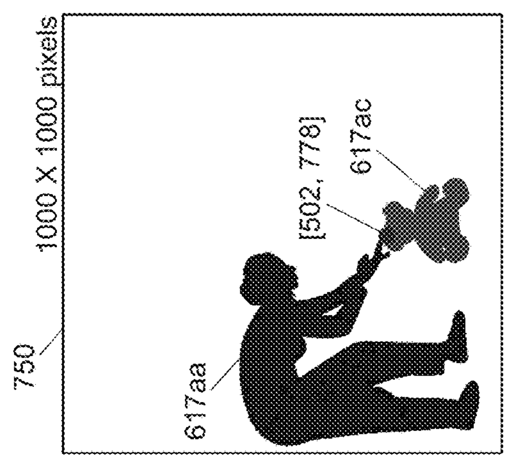
Figure 17E:
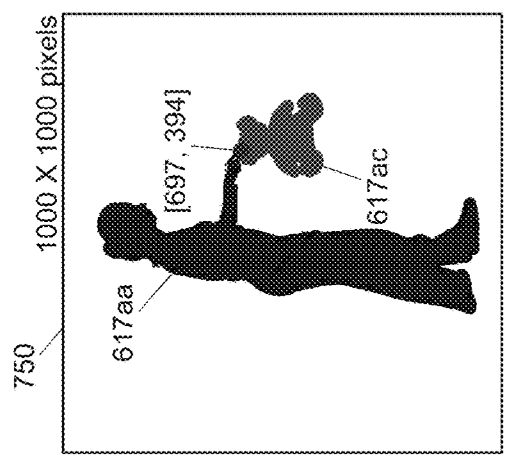
Figure 17F:
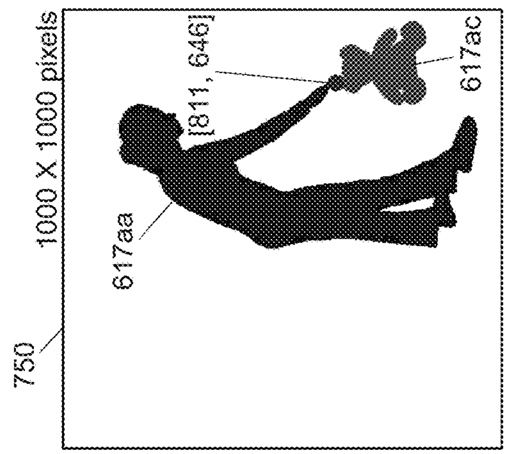

Referring to FIG. 17D-17F, an exemplary embodiment of Instruction Set Determination Logic's 447 determining, using one or more Digital Pictures 750, Instruction Sets 526 that would cause Device 98 and/or its Actuator 91 (i.e. robotic arm Actuator 91, etc.) to perform grip/attach/grasp, move, and release manipulations of manipulated Object 615*ac*, or Instruction Sets 526 that would cause Avatar 605 and/or its part (i.e. arm, etc.) to perform grip/attach/grasp, move, and release manipulations of manipulated Object 616*ac* is illustrated. One or more Digital Pictures 750 may be part of a stream of Digital Pictures 750 that can be captured by Camera 92*a* or rendered by Picture Renderer 476, and provided by Object Processing Unit 115 in or associated with one or more Collections of Object Representations 525 as previously described. In some aspects, Instruction Set Determination Logic 447 can determine that manipulating Object 615*aa* or Object 616*aa* performed grip/attach/grasp, move, and release manipulations of manipulated Object 615*ac* or Object 616*ac* by determining that manipulating Object 615*aa* or Object 616*aa* or part thereof gripped/attached to/grasped manipulated Object 615*ac* or Object 616*ac* after an initial point of contact, determining that the area of contact (i.e. area where two objects touch, etc.) moved, and determining that manipulating Object 615*aa* or Object 616*aa* or part thereof released (i.e. ungripped/detached from/let go, etc.) manipulated Object 615*ac* or Object 616*ac*. Instruction Set Determination Logic 447 can determine that manipulating Object 615*aa* or Object 616*aa*, or part thereof, gripped/attached to/grasped manipulated Object 615*ac* or Object 616*ac* after an initial point of contact (i.e. [502, 778], etc.) with manipulated Object 615*ac* or Object 616*ac*. For example, such grip/attachment/grasp can be determined by determining one or more points of contact between Collection of Pixels 617*aa* and Collection of Pixels 617*ac* (i.e. one or more pixels of Collection of Pixels 617*aa* equal, overlap, or adjoin one or more pixels of Collection of Pixels 617*ac*, etc.) in multiple successive Digital Pictures 750 of a stream of Digital Pictures 750 after Digital Picture 750 where an initial point of contact was determined. In some designs, such one or more points of contact between Collection of Pixels 617*aa* and Collection of Pixels 617*ac* may define an area of contact. Hence, a prolonged contact (i.e. a threshold for contact duration can be used herein, etc.) at any one or more points of contact or at an area of contact may be considered a grip/attachment/grasp. Therefore, for example, Instruction Set 526 that would cause Device 98 or Avatar 605 to grip/attach to/grasp manipulated Object 615*ac* or Object 616*ac* after an initial point of contact may include Device.Arm.grip ( ) Device.Arm.attach ( ) or Object. Arm.grasp ( ) OR Avatar.Arm.grip ( ) Avatar.Arm.attach ( ) or Avatar.Arm.grasp ( ) Instruction Set Determination Logic 447 can further determine that the area of contact moved. For example, that the area of contact moved can be determined by determining that coordinates of one or more pixels (i.e. central point or centroid, etc.) of the area of contact from a later Digital Picture 750 of a stream of Digital Pictures 750 differ from coordinates of one or more pixels (i.e. central point or centroid, etc.) of the area of contact from Digital Picture 750 where the area of contact was initially determined. Instruction Set Determination Logic 447 can also determine one or more move points (i.e. [697, [811, 646], etc.), which indicate where manipulating Object 615*aa* or Object 616*aa* or part thereof moved manipulated Object 615*ac* or Object 616*ac* after the initial point of contact. For example, such move point can be determined by finding coordinates of one or more pixels (i.e. central point or centroid, any one or more points, etc.) of the area of contact from Digital Picture 750 of a stream of Digital Pictures 750 after Digital Picture 750 where the area of contact was initially determined. Such pixel coordinates can then be converted into physical or 3D coordinates of a move point using length-to-pixel ratio as previously described with respect to determining coordinates of a physical point of contact using pixel coordinates from Digital Picture 750. Instruction Set Determination Logic 447 can also determine whether manipulating Object 615*aa* or Object 616*aa* performed the move manipulation by moving itself (i.e. determine that coordinates of manipulating Object's 615*aa* or Object's 616*aa* physical or 3D location changed, etc.) and/or by moving its part (i.e. determine that coordinates of manipulating Object's 615*aa* or Object's 616*aa* physical or 3D location did not change, etc.). Therefore, in one example, Instruction Set 526 that would cause Device 98 or Avatar 605 to move manipulated Object 615*ac* or Object 616*ac* after a grip/attach/grasp manipulation may include Device.move (X, Y, Z) or Avatar.move (X, Y, Z), where [X, Y, Z] are physical or 3D coordinates of the move point. In another example, Instruction Set 526 that would cause Device's 98 robotic arm Actuator 91 or Avatar's 605 arm to move manipulated Object 615*ac* or Object 616*ac* after a grip/attach/grasp manipulation may include Device.Arm.move (X, Y, Z) or Avatar.Arm.move (X, Y, Z), where [X, Y, Z] are physical or 3D coordinates of the move point. Such Instruction Sets 526 can be used in combination in cases where manipulating Object 615*aa* or Object 616*aa* performed a move manipulation by moving itself and by moving its part. Instruction Set Determination Logic 447 can further determine that manipulating Object 615*aa* or Object 616*aa* or part thereof released manipulated Object 615*ac* or Object 616*ac*. For example, such release can be determined by determining no contact between Collection of Pixels 617*aa* and Collection of Pixels 617*ac* (i.e. coordinates of no pixel of Collection of Pixels 617*aa* equal or adjoin coordinates of a pixel of Collection of Pixels 617*ac*, etc.) in Digital Picture 750 of a stream of Digital Pictures 750 after Digital Picture 750 where the initial point of contact was determined. In some aspects, if release coordinates are needed, a release point, which indicates where manipulating Object 615*aa* or Object 616*aa*, or part thereof, released manipulated Object 615*ac* or Object 616*ac*, can be determined in the last move point (i.e. [811, 646],etc.) before determining no contact between Collection of Pixels 617*aa* and Collection of Pixels 617*ac*, for example. Such pixel coordinates can then be converted into physical coordinates of a release point using length-to-pixel ratio as previously described with respect to determining coordinates of a physical or 3D point of contact using pixel coordinates from Digital Picture 750. Therefore, for example, Instruction Set 526 that would cause Device 98 or Avatar 605 to release manipulated Object 615*ac* or Object 616*ac* may include Device.Arm.release ( ) or Avatar. Arm.release ( ) In general, gripping/attaching/grasping, moving, move point, releasing, release point, and/or other aspects of grip/attach/grasp, move, and/or release manipulations can be determined or estimated by any technique, and/or those known in art.

In some embodiments, grip/attach/grasp, move, and release manipulations can be used in a variety of situations or manipulations such as pulling (i.e. gripping/attaching/grasping, moving back, and releasing, etc.), lifting (i.e. gripping/attaching/grasping, moving up, and releasing, etc.), pushing (i.e. gripping/attaching/grasping, moving forward, and releasing, etc.), moving (i.e. gripping/attaching/grasping, moving anywhere, and releasing, etc.), and/or others, and Instruction Sets 526 that would cause Device 98 and/or its Actuator 91 (i.e. robotic arm Actuator 91, etc.) or Avatar 605 and/or its arm to perform any of them can be determined using the aforementioned and/or other techniques. In other embodiments, Instruction Set Determination Logic 447 may determine, using 3D Application Program 18 and/or one or more Digital Pictures 750, Instruction Sets 526 that would cause Device 98 and/or its Actuator 91 (i.e. robotic arm Actuator 91, etc.) or Avatar 605 and/or its arm to perform other manipulations using the aforementioned and/or other techniques. In some aspects, Instruction Set Determination Logic 447 may determine, using 3D Application Program 18 and/or one or more Digital Pictures 750, Instruction Sets 526 that would cause Device 98 and/or its Actuator 91 (i.e. robotic arm Actuator 91, etc.) or Avatar 605 and/or its arm to perform a squeeze manipulation of a manipulated Object 615 or Object 616 by determining that parts of a manipulating Object 615 or Object 616 moved toward each other after initial points of contact with a manipulated Object 615 or Object 616. In other aspects, Instruction Set Determination Logic 447 may determine, using 3D Application Program 18 or one or more Digital Pictures 750, Instruction Sets 526 that would cause Device 98 and/or its Actuator 91 (i.e. robotic arm Actuator 91, etc.) or Avatar 605 and/or its arm to perform a twist/rotate manipulation of a manipulated Object 615 or Object 616 by determining that a manipulating Object 615 or Object 616 or parts thereof and/or the manipulated Object 615 or Object 616 or parts thereof moved helically relative to each other after an initial point of contact. In other embodiments, Instruction Set Determination Logic 447 can utilize any features, functionalities, and/or embodiments of Object Processing Unit 115 and/or other elements to determine a manipulation of Object 615 or Object 616 as Object Processing Unit 115 can recognize not only Objects 615 or Objects 616, but also their movements, operations, actions, and/or other activities. In general, manipulations and/or aspects thereof can be determined by any technique, and/or those known in art. The aforementioned and/or other techniques for determining manipulations of Object 615 or Object 616 can be similarly performed on a sub-object of Object 615 or Object 616.

Instruction Set Determination Logic 447 may include any logic, functions, algorithms, code, and/or other elements to enable its functionalities. An example of Instruction Set Determination Logic's 447 code for determining Instruction Sets 526 that would cause Device 98 to move into a manipulating Object's 615 location, cause Device's 98 robotic arm Actuator 91 to extend to a point of contact between the manipulating Object 615 and a manipulated Object 615, and cause Device 98 and/or Device's 98 robotic arm Actuator 91 to perform grip/attach/grasp, move, and release manipulations of Object 615 may include the following code:

```
instSets = “”; //variable holding Instruction Set Determination Logic’s 447 determined instruction sets
if(manipulationDetermined(manipulatingObject, manipulatedObject)=“grip”) { //determined manip. is grip
   instSets = instSets & “Device.move(manipulatingObject.coord)”; /*include Device.move(manipulatingObject.coord)
                                                                                                          in instSets*/
   pointOfContact = determinePointOfContact(manipulatingObject, manipulatedObject); /*determine point of contact
                                                                  between manipulatingObject and manipulatedObject*/
   instSets = instSets & “Device.Arm.move(pointOfContact)”; //include Device.Arm.move(pointOfContact) in instSets
   instSets = instSets & “Device.Arm.grip( )”; //include Device.Arm.grip( ) in instSets
   while (isGripped(manipulatingObject, manipulatedObject)=true); /*while manipulatingObject grips
                                                                                              manipulatedObject*/
   do {
      if (areaOfContact(manipulatingObject, manipulatedObject).isMoving=true) { //if area of contact is moving
               instSets = instSets & “Device.Arm.move(areaOfContact(manipulatingObject, manipulatedObject).coord)”;
                /*include Device.Arm.move(areaOfContact(manipulatingObject, manipulatedObject).coord) in instSets*/
      }
   }
   instSets = instSets & “Device.Arm.release( )”; //include Device.Arm.release( ) in instSets
}
...
```

The foregoing code applicable to Device 98, Objects 615, and/or other elements may similarly be used as an example code applicable to Avatar 605, observation point, Objects 616, and/or other elements. For instance, references to Device in the foregoing code may be replaced with references to Avatar to implement code for use with respect to Avatar 605, observation point, Objects 616, and/or other elements.

In some embodiments, Instruction Set Determination Logic 447 can observe or examine a manipulated Object's 615 or Object's 616 change of states (i.e. movement [i.e. change of location, etc.], change of condition, transformation [i.e. change of shape or form, etc.], etc.) in determining Instruction Sets 526 that would cause Device 98 or Avatar 605 to perform manipulations of the manipulated Object 615 or Object 616. In such embodiments, Instruction Set Determination Logic 447 can determine Instruction Sets 526 that would cause Device 98 or Avatar 605 to perform operations that replicate the manipulated Object's 615 or Object's 616 change of states. In some aspects, by observing or examining the manipulated Object's 615 or Object's 616 change of states, Instruction Set Determination Logic 447 can focus on the manipulated Object 615 or Object 616. This functionality enables Instruction Set Determination Logic 447 to determine Instruction Sets 526 that would cause Device 98 or Avatar 605 to perform manipulations of a manipulated Object 615 or Object 616 that manipulates itself (i.e. moves on its own, transforms on its own, etc.) without being manipulated by a manipulating Object 615 or Object 616. Therefore, a reference to a manipulation of Object 615 (i.e. manipulated Object 615, etc.) herein includes a reference to a manipulation of Object 615 performed by another Object 615 (i.e. manipulating Object 615, etc.) or a reference to a manipulation of Object 615 performed by itself depending on context. Also, a reference to a manipulation of Object 616 (i.e. manipulated Object 616, etc.) herein includes a reference to a manipulation of Object 616 performed by another Object 616 (i.e. manipulating Object 616, etc.) or a reference to a manipulation of Object 616 performed by itself depending on context.

Figure 18A:
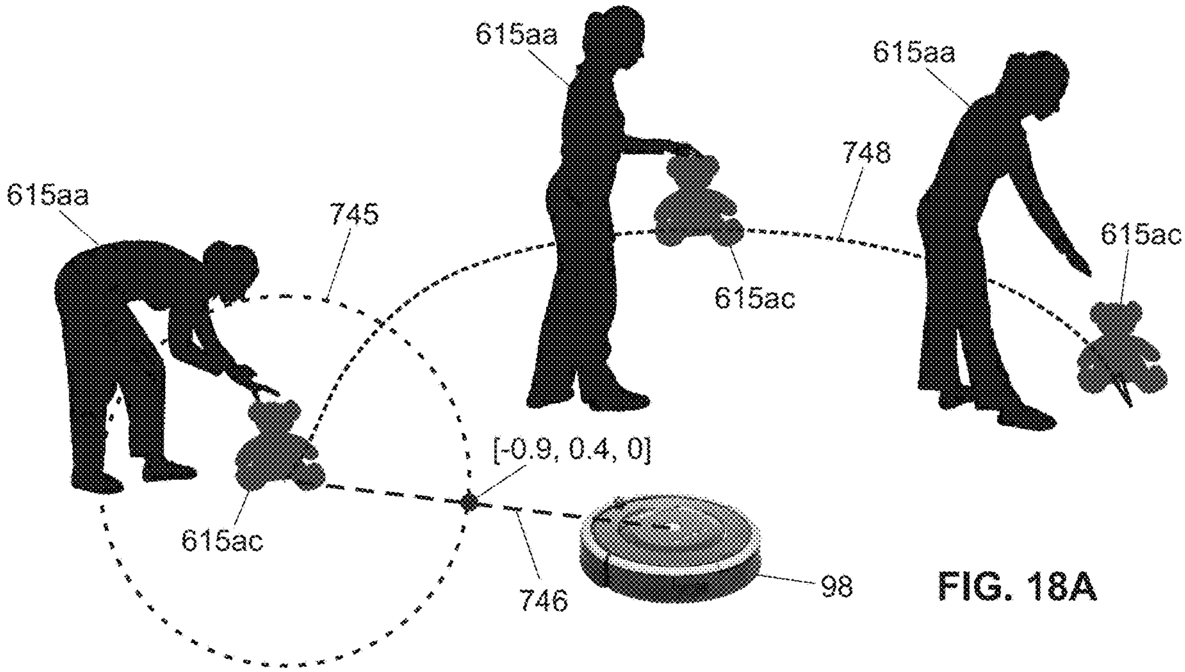
FIG. 18A illustrates an exemplary embodiment of Instruction Set Determination Logic's 447 determining Instruction Sets 526 for performing a move manipulation of Object 615*ac*.
Figure 18B:
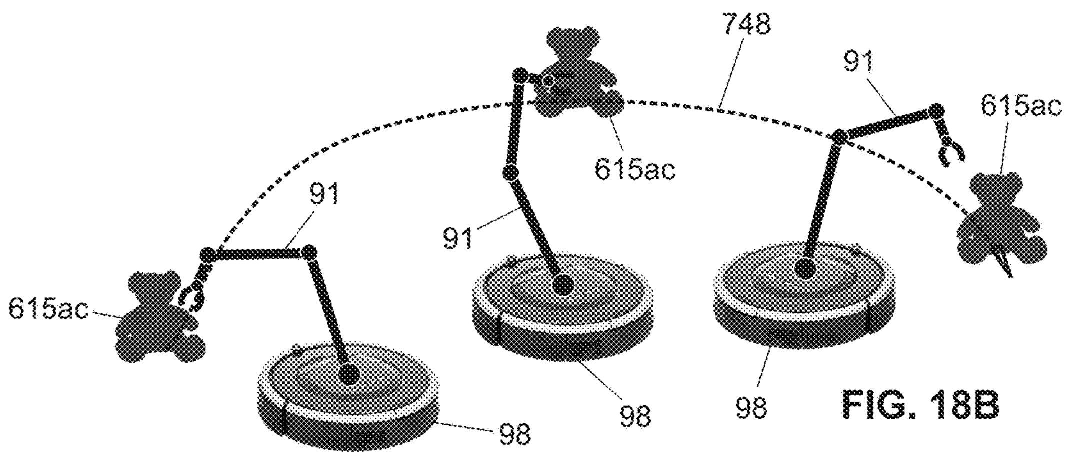
FIG. 18B illustrates an exemplary embodiment of moving manipulated Object 615*ac* in observed Trajectory 748.
Figure 19A:
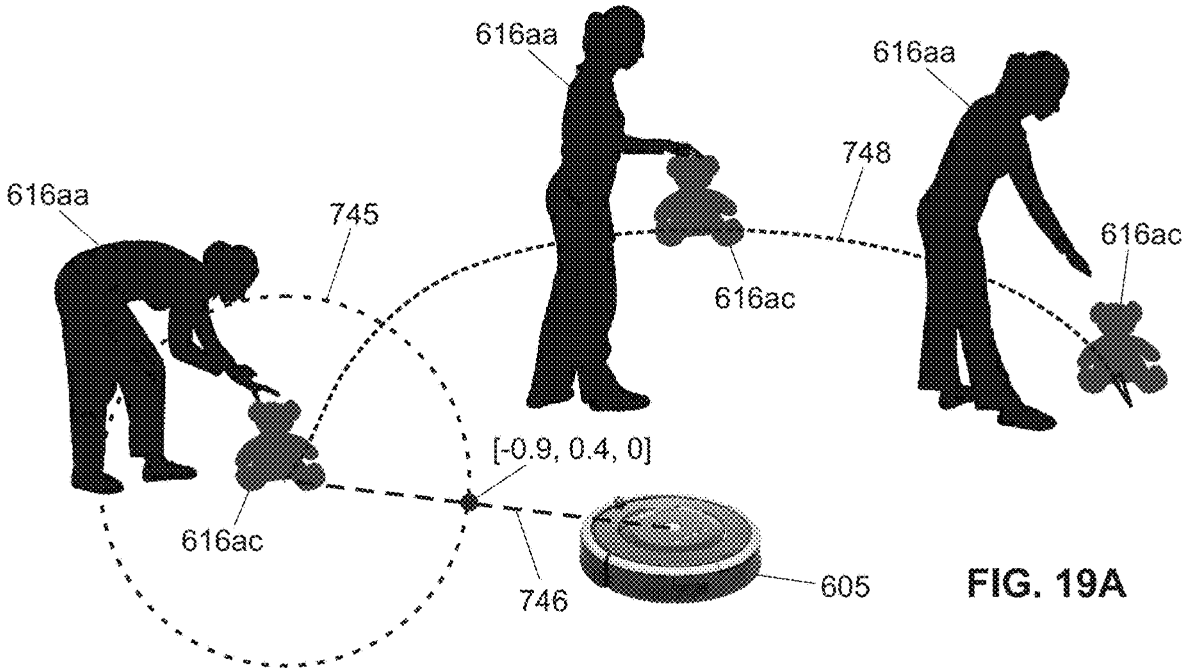
FIG. 19A illustrates an exemplary embodiment of Instruction Set Determination Logic's 447 determining Instruction Sets 526 for performing a move manipulation of Object 616*ac*.
Figure 19B:
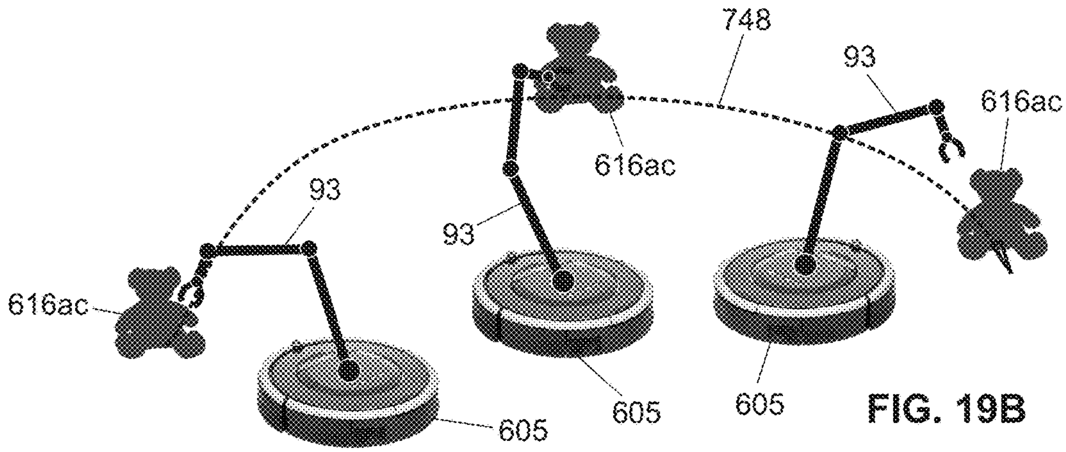
FIG. 19B illustrates an exemplary embodiment of moving manipulated Object 616*ac* in observed Trajectory 748.

Referring to FIGS. 18A and 19A, an exemplary embodiment of Instruction Set Determination Logic's 447 determining Instruction Sets 526 that would cause Device 98 and/or its Actuator 91 (i.e. robotic arm Actuator 91, etc.) to perform a move manipulation of manipulated Object 615*ac*, or Instruction Sets 526 that would cause Avatar 605 and/or its Arm 93 to perform a move manipulation of manipulated Object 616*ac* is illustrated. In some designs, any movement of manipulated Object 615*ac* or Object 616*ac* can be performed or replicated by Device's 98 or Avatar's 605 gripping/attaching to/grasping manipulated Object 615*ac* or Object 616*ac* (i.e. at a starting position, etc.), moving manipulated Object 615*ac* or Object 616*ac* in an observed or detected trajectory, and releasing manipulated Object 615*ac* or Object 616*ac* (i.e. at an ending position, etc.). Instruction Set Determination Logic 447 can determine Instruction Sets 526 that would cause Device 98 or Avatar 605 to move into a reach point so that manipulated Object 615*ac* or Object 616*ac* is within reach of Device's 98 robotic arm Actuator 91 or Avatar's 605 Arm 93. For example, coordinates of such reach point (i.e. [−0.9, 0.4, 0], etc.) can be determined or estimated by finding an intersection of Reach Circle 745 and Line 746 between location coordinates of Device 98 or Avatar 605 and location coordinates of manipulated Object 615*ac* or Object 616*ac*. Mathematical formulas or functions of Reach Circle 745 and Line 746 can be determined, computed, or estimated using location coordinates of Device 98 or Avatar 605, location coordinates of manipulated Object 615*ac* or Object 616*ac*, reach radius of Device's 98 robotic arm Actuator 91 or Avatar's 605 Arm 93, and/or other known information, and using Pythagorean theorem, trigonometry, linear algebra, geometry, and/or other theorems, formulas, or techniques. Reach Circle 745 may be centered at location coordinates of manipulated Object 615*ac* or Object 616*ac* and have radius equal to or less than the reach of Device's 98 robotic arm Actuator 91 or Avatar's 605 Arm 93. Therefore, for example, Instruction Set 526 that would cause Device 98 or Avatar 605 to move into a reach point so that manipulated Object 615*ac* or Object 616*ac* is within reach of Device's 98 robotic arm Actuator 91 or Avatar's 605 Arm 93 may include Device.move (X, Y, Z) or Avatar.move (X, Y, Z), where [X, Y, Z] are physical coordinates of the reach point. Instruction Set Determination Logic 447 can further determine Instruction Sets 526 that would cause Device's 98 robotic arm Actuator 91 or Avatar's 605 Arm 93 to extend to an initial point of contact with manipulated Object 615*ac* or Object 616*ac*. In some aspects, such initial point of contact can be determined by selecting any point (i.e. preferably a point in the direction of the reach point, etc.) on the surface of manipulated Object 615*ac* or Object 616*ac*. In one example, an initial point of contact can be determined by selecting any pixel on a boundary of Collection of Pixels 617 representing manipulated Object 615*ac* or Object 616*ac* in Digital Picture 750. Coordinates of such pixel can then be converted into physical or 3D coordinates of the initial point of contact using length-to-pixel ratio as previously described. In another example, an initial point of contact can be determined by selecting a point on Object 616*ac* (i.e. a point of a polygon of Object 616*ac*, etc.) in 3D Application Program 18. Therefore, for example, Instruction Set 526 that would cause Device's 98 robotic arm Actuator 91 or Avatar's 605 Arm 93 to extend to an initial point of contact with manipulated Object 615*ac* or Object 616*ac* may include Device.Arm.move (X, Y, Z) or Avatar.Arm.move (X, Y, Z), where [X, Y, Z] are coordinates of the physical or 3D point of contact. In other aspects, an initial point of contact may not need to be determined in advance. For example, Device 98 and/or its robotic arm Actuator 91 or Avatar 605 and/or its Arm 93 may include a tactile sensor (not shown) that can detect a contact or collision with manipulated Object 615*ac* or Object 616*ac* when Device's 98 robotic arm Actuator 91 or Avatar's 605 Arm 93 extends toward manipulated Object 615*ac* or Object 616*ac*. Therefore, for example, Instruction Set 526 that would cause Device's 98 robotic arm Actuator 91 or Avatar's 605 Arm 93 to extend to a point of contact with manipulated Object 615*ac* or Object 616*ac* may include Device.Arm.moveUntilCollision (X, Y, Z) or Avatar.Arm.moveUntilCollision (X, Y, Z), where [X, Y, Z] are coordinates of manipulated Object 615*ac* or Object 616*ac* or coordinates of any point inside or on the surface of manipulated Object 615*ac* or Object 616*ac*. Instruction Set Determination Logic 447 can further determine Instruction Sets 526 that would cause Device's 98 robotic arm Actuator 91 or Avatar's 605 Arm 93 to grip/attach to/grasp manipulated Object 615*ac* or Object 616*ac* at the initial point of contact. Therefore, for example, Instruction Set 526 that would cause Device's 98 robotic arm Actuator 91 or Avatar's 605 Arm 93 to grip/attach to/grasp manipulated Object 615*ac* or Object 616*ac* at an initial point of contact may include Device.Arm.grip ( ) Device.Arm.attach ( ) or Device.Arm.grasp ( ) OR Avatar.Arm.grip ( ) Avatar.Arm.attach ( ) or Avatar.Arm.grasp ( ) If the grip/attachment/grasp is not successful (i.e. due to shape or other properties of manipulated Object 615*ac* or Object 616*ac* at the point of contact, etc.), selecting another point of contact and reattempting the grip/attachment/grasp can be performed repeatedly until the grip/attachment/grasp is successful. Instruction Set Determination Logic 447 can further determine Instruction Sets 526 that would cause Device 98 and/or its robotic arm Actuator 91 or Avatar 605 and/or its Arm 93 to move manipulated Object 615*ac* or Object 616*ac*. In some aspects, Instruction Set Determination Logic 447 can determine manipulated Object's 615*ac* or Object's 616*ac* Trajectory 748 of movement. Such Trajectory 748 can be curved, straight, and/or other shape. Manipulated Object's 615*ac* or Object's 616*ac* Trajectory 748 may include move points that manipulated Object 615*ac* or Object 616*ac* traveled from starting to ending positions. For example, determination of manipulated Object's 615*ac* or Object's 616*ac* Trajectory 748 can be made by retrieving coordinates of manipulated Object's 615*ac* or Object's 616*ac* physical or 3D locations available in coordinates Object Properties 630 of manipulated Object's 615*ac* or Object's 616*ac* Object Representations 625. In some aspects, move points on manipulated Object's 615*ac* or Object's 616*ac* Trajectory 748 can be adjusted for the size of manipulated Object 615*ac* or Object 616*ac*, shape of manipulated Object 615*ac* or Object 616*ac*, difference in coordinates of the area of contact (i.e. centroid or other point of the area of contact, etc.) and location coordinates of manipulated Object 615*ac* or Object 616*ac*, and/or other factors. Move points (i.e. adjusted or unadjusted, etc.) on manipulated Object's 615*ac* or Object's 616*ac* Trajectory 748 can later be implemented by moving Device 98 and/or its robotic arm Actuator 91 as shown in FIG. 18B or by moving Avatar 605 and/or its Arm 93 as shown in FIG. 19B. Therefore, in one example, Instruction Set 526 that would cause Device 98 or Avatar 605 to move manipulated Object 615*ac* or Object 616*ac* may include Device.move (X, Y, Z) or Avatar.move (X, Y, Z), where [X, Y, Z] are physical coordinates of a location that Device 98 or Avatar 605 needs to be in to implement manipulated Object's 615*ac* or Object's 616*ac* move point (i.e. adjusted or unadjusted, etc.) on Trajectory 748. In another example, Instruction Set 526 that would cause Device's 98 robotic arm Actuator 91 or Avatar's 605 Arm 93 to move manipulated Object 615*ac* or Object 616*ac* may include Device.Arm.move (X, Y, Z) or Avatar.Arm.move (X, Y, Z), where [X, Y, Z] are physical or 3D coordinates of manipulated Object's 615*ac* or Object's 616*ac* move point (i.e. adjusted or unadjusted, etc.) on Trajectory 748. Such Instruction Sets 526 can be used in combination in cases where moving manipulated Object 615*ac* or Object 616*ac* can be implemented by moving Device 98 and/or its robotic arm Actuator 91, or Avatar 605 and/or its Arm 93. Instruction Set Determination Logic 447 can further determine Instruction Sets 526 that would cause Device's 98 robotic arm Actuator 91 or Avatar's 605 Arm 93 to release (i.e. ungrip/detach from/let go, etc.) manipulated Object 615*ac* or Object 616*ac*. For example, such release can be performed when manipulated Object 615*ac* or Object 616*ac* reaches its ending position. Therefore, for example, Instruction Set 526 that would cause Device 98 or Avatar 605 to release manipulated Object 615*ac* or Object 616*ac* at the ending position may include Device.Arm.release ( ) or Avatar.Arm.release ( ) In general, reach point, gripping/attaching/grasping, moving, move points, releasing, and/or other aspects of move manipulations can be implemented by any technique, and/or those known in art. In some designs, a combination of grip/attach/grasp, move, and release manipulations can be used in a variety of situations or manipulations such as pulling, lifting, pushing, moving, and/or others, and Instruction Sets 526 that would cause Device 98 and/or its Actuator 91 (i.e. robotic arm Actuator 91, etc.) or Avatar 605 and/or its Arm 93 to perform any of them can be determined using the aforementioned and/or other techniques. Also, Instruction Set Determination Logic 447 can determine Instruction Sets 526 that would cause Device 98 and/or its Actuator 91 (i.e. robotic arm Actuator 91, etc.) or Avatar 605 and/or its Arm 93 to perform any manipulation of manipulated Object 615*ac* or Object 616*ac* by observing or examining manipulated Object's 615*ac* or Object's 616*ac* change of states.

An example of Instruction Set Determination Logic's 447 code for determining Instruction Sets 526 that would cause Device 98 and/or its Actuator 91 (i.e. robotic arm Actuator 91, etc.) to perform operations to replicate a manipulated Object's 615 movement by observing or examining the manipulated Object's 615 change of states may include the following code:

```
instSets= ";//variable holding Instruction Set Determination Logic's 447 determined instruction sets if (manipulatedObject.isMoving=true) {//if manipulatedObject is moving
  reachPoint=determineReachPoint (Device.coord, Device.Arm.reachRadius, manipulatedObject.PrevLoc.coord); /*determine reach point*/instSets
  =instSets & "Device.move (reachPoint)";//include Device.move (reachPoint) in instSets
  pointOfContact=selectPointOfContact (manipulatedObject);/*select point of contact on manipulatedObject*/
  instSets=instSets & "Device.Arm.move (pointOfContact)";//include Device.Arm.move (pointOfContact) in instSets
  instSets=instSets & "Device.Arm.grip ( );/include Device.Arm.grip ( ) in instSets
}
while (manipulatedObject.isMoving=true)/*while manipulatedObject is moving*/
do{
  instSets=instSets & "Device.Arm.move (adjust (manipulatedObject.coord))";/*include
    Device.Arm.move (adjust (manipulatedObject.coord) in instSets*/
}
instSets=instSets & "Device.Arm.release ( );//include Device.Arm.release ( ) in instSets
. . .
```

The foregoing code applicable to Device 98, Objects 615, and/or other elements may similarly be used as an example code applicable to Avatar 605, observation point, Objects 616, and/or other elements. For instance, references to Device in the foregoing code may be replaced with references to Avatar to implement code for use with respect to Avatar 605, observation point, Objects 616, and/or other elements.

In some embodiments, Instruction Set Determination Logic 447 can observe or examine a manipulated Object's 615 or Object's 616 starting and/or ending states in determining Instruction Sets 526 that would cause Device 98 or Avatar 605 to perform manipulations of the manipulated Object 615 or Object 616. In such embodiments, Instruction Set Determination Logic 447 can determine Instruction Sets 526 that would cause Device 98 or Avatar 605 to perform operations that replicate the manipulated Object's 615 or Object's 616 starting and/or ending states. In some aspects, by observing or examining the manipulated Object's 615 or Object's 616 starting and/or ending states, Instruction Set Determination Logic 447 can focus on the manipulated Object 615 or Object 616. This functionality enables Instruction Set Determination Logic 447 to determine Instruction Sets 526 that would cause Device 98 or Avatar 605 to perform manipulations of a manipulated Object 615 or Object 616 that manipulates itself (i.e. moves on its own, transforms on its own, etc.) without being manipulated by a manipulating Object 615 or Object 616.

Figure 18C:
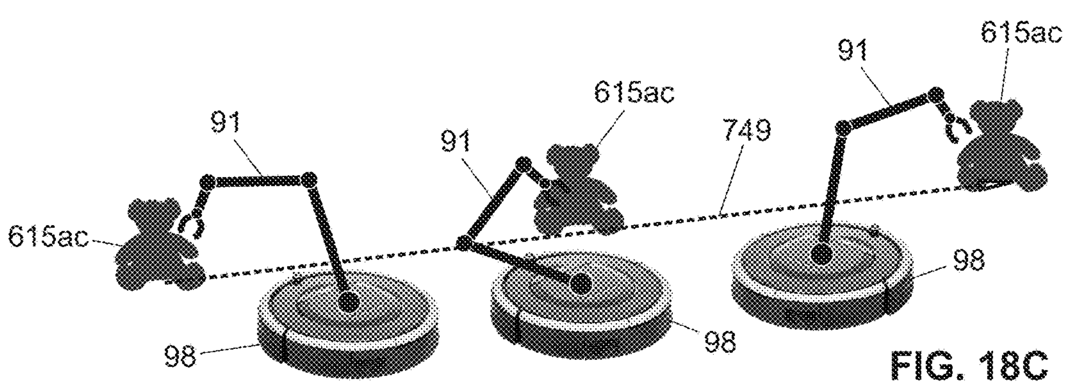
FIG. 18C illustrates an exemplary embodiment of moving manipulated Object 615*ac* in reasoned Trajectory 749.
Figure 19C:
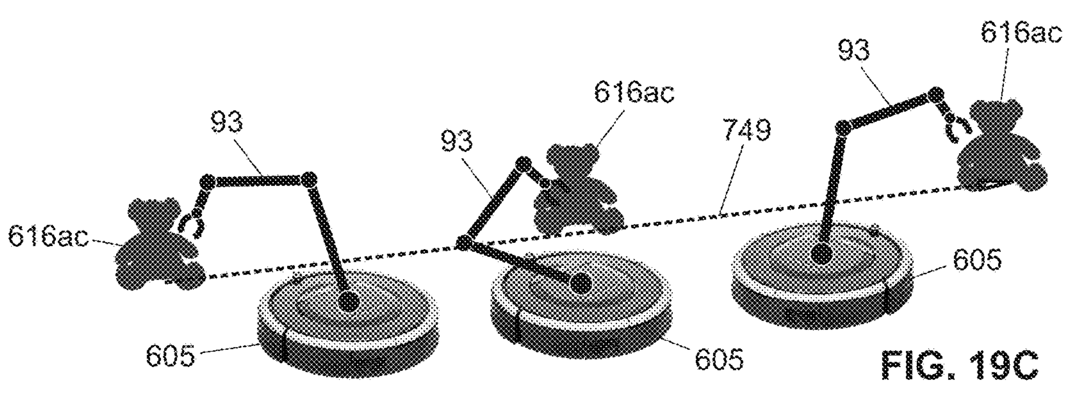
FIG. 19C illustrates an exemplary embodiment of moving manipulated Object 616*ac* in reasoned Trajectory 749.

Referring to FIGS. 18C and 19C, an exemplary embodiment of moving manipulated Object 615*ac* or Object 616*ac* in reasoned Trajectory 749 by Device 98 and/or its Actuator 91 (i.e. robotic arm Actuator 91, etc.) or Avatar 605 and/or its Arm 93 is illustrated. In some designs, any movement of manipulated Object 615*ac* or Object 616*ac* can be performed or replicated by Device's 98 or Avatar's 605 gripping/attaching to/grasping manipulated Object 615*ac* or Object 616*ac* (i.e. at a starting position, etc.), moving manipulated Object 615*ac* or Object 616*ac* in a reasoned trajectory (i.e. straight line, curved line, etc.), and releasing manipulated Object 615*ac* or Object 616*ac* (i.e. at an ending position, etc.). For example, Instruction Set Determination Logic 447 can (i) determine Instruction Sets 526 that would cause Device 98 or Avatar 605 to move into a reach point so that manipulated Object 615*ac* or Object 616*ac* is within reach of Device's 98 robotic arm Actuator 91 or Avatar's 605 Arm 93, (ii) determine Instruction Sets 526 that would cause Device's 98 robotic arm Actuator 91 or Avatar's 605 Arm 93 to extend to an initial point of contact with manipulated Object 615*ac* or Object 616*ac*, and (ii) determine Instruction Sets 526 that would cause Device's 98 robotic arm Actuator 91 or Avatar's 605 Arm 93 to grip/attach to/grasp manipulated Object 615*ac* or Object 616*ac* at the initial point of contact as previously described. Instruction Set Determination Logic 447 can further determine Instruction Sets 526 that would cause Device 98 and/or its robotic arm Actuator 91 or Avatar 605 and/or its Arm 93 to move manipulated Object 615*ac* or Object 616*ac* in a reasoned Trajectory 749 from a starting position to an ending position. Such reasoned Trajectory 749 can be straight, curved, and/or other shape. Reasoned Trajectory 749 may include move points that manipulated Object 615*ac* or Object 616*ac* may need to travel from a starting position to an ending position. In one example, reasoned Trajectory 749 may be or include a straight line between coordinates of manipulated Object's 615*ac* or Object's 616*ac* starting and ending positions. In another example, reasoned Trajectory 749 may be or include a curved line between coordinates of manipulated Object's 615*ac* or Object's 616*ac* starting and ending positions determined so that reasoned Trajectory 749 avoids obstacles between manipulated Object's 615*ac* or Object's 616*ac* starting and ending positions (not shown). Any obstacle avoidance and/or other technique, and/or those known in art, can be utilized to determine or calculate such curved Trajectory 749. Reasoned Trajectory 749 may also include a vertical rise at/near a starting position to lift manipulated Object 615*ac* or Object 616*ac* off the ground and a vertical drop at/near an ending position to lower manipulated Object 615*ac* or Object 616*ac* on the ground (not shown). In some aspects, coordinates of move points on reasoned Trajectory 749 can be calculated using mathematical formula or function of the reasoned Trajectory 749. For example, mathematical formula or function of a straight line Trajectory 749 can be determined, computed, or estimated using coordinates of manipulated Object's 615*ac* or Object's 616*ac* starting position, coordinates of manipulated Object's 615*ac* or Object's 616*ac* ending position, and/or other known information, and using Pythagorean theorem, trigonometry, linear algebra, geometry, and/or other theorems, formulas, or techniques. In some implementations, move points on reasoned Trajectory 749 can be adjusted for the size of manipulated Object 615*ac* or Object 616*ac*, shape of manipulated Object 615*ac* or Object 616*ac*, difference in coordinates of the area of contact (i.e. centroid or other point of the area of contact, etc.) and location coordinates of manipulated Object 615*ac* or Object 616*ac*, and/or other factors. Move points (i.e. adjusted or unadjusted, etc.) on reasoned Trajectory 749 can later be implemented by moving Device 98 and/or its robotic arm Actuator 91 or moving Avatar 605 and/or its Arm 93. Therefore, in one example, Instruction Set 526 that would cause Device 98 or Avatar 605 to move manipulated Object 615*ac* or Object 616*ac* may include Device.move (X, Y, Z) or Avatar.move (X, Y, Z), where [X, Y, Z] are physical or 3D coordinates of a location that Device 98 or Avatar 605 needs to be in to implement a move point (i.e. adjusted or unadjusted, etc.) on reasoned Trajectory 749. In another example, Instruction Set 526 that would cause Device's 98 robotic arm Actuator 91 or Avatar's 605 Arm 93 to move manipulated Object 615*ac* or Object 616*ac* may include Device.Arm.move (X, Y, Z) or Avatar.Arm.move (X, Y, Z), where [X, Y, Z] are physical or 3D coordinates of a move point (i.e. adjusted or unadjusted, etc.) on reasoned Trajectory 749. Such Instruction Sets 526 can be used in combination in cases where moving manipulated Object 615*ac* or Object 616*ac* can be implemented by moving Device 98 and/or its robotic arm Actuator 91 or by moving Avatar 605 and/or its Arm 93. Instruction Set Determination Logic 447 can further determine Instruction Sets 526 that would cause Device's 98 robotic arm Actuator 91 or Avatar's 605 Arm 93 to release (i.e. ungrip/detach from/let go, etc.) manipulated Object 615*ac* or Object 616*ac* as previously described. In general, reach point, gripping/attaching/grasping, moving, move points, releasing, and/or other aspects of move manipulations can be implemented by any technique, and/or those known in art. In some designs, a combination of grip/attach/grasp, move, and release manipulations can be used in a variety of situations or manipulations such as pulling, lifting, pushing, moving, opening/closing a door (i.e. closed and open states, etc.), opening/closing a faucet, turning a switch on/off (i.e. on and off states, etc.), and/or others, and Instruction Sets 526 that would cause Device 98 and/or its Actuator 91 (i.e. robotic arm Actuator 91, etc.) or Avatar 605 and/or its Arm 93 to perform any of them can be determined using the aforementioned and/or other techniques. Also, Instruction Set Determination Logic 447 can determine Instruction Sets 526 that would cause Device 98 and/or its Actuator 91 (i.e. robotic arm Actuator 91, etc.) or Avatar 605 and/or its Arm 93 to perform any manipulation of manipulated Object 615*ac* or Object 616*ac* by observing or examining manipulated Object's 615*ac* or Object's 616*ac* starting and/or ending states.

An example of Instruction Set Determination Logic's 447 code for determining Instruction Sets 526 that would cause Device 98 and/or its Actuator 91 (i.e. robotic arm Actuator 91, etc.) to move manipulated Object 615 in a reasoned trajectory by observing or examining manipulated Object's 615 starting and/or ending positions may include the following code:

```
instSets = ""; //variable holding Instruction Set Determination Logic's 447 determined instruction sets
if (manipulatedObject.isMoving=true) { //if manipulatedObject is moving
   reachPoint = determineReachPoint(Device.coord, Device.Arm.reachRadius, manipulatedObject.PrevLoc.coord);
                                                                                  /*determine reach point*/
   instSets = instSets & "Device.move(reachPoint)"; //include Device.move(reachPoint) in instSets
   pointOfContact = selectPointOfContact(manipulatedObject); /*select point of contact on manipulatedObject*/
   instSets = instSets & "Device.Arm.move(pointOfContact)"; //include Device.Arm.move(pointOfContact) in instSets
   instSets = instSets & "Device.Arm.grip( )"; //include Device.Arm.grip( ) in instSets
}
manipulatedObjectStartPosition = manipulatedObject.PrevLoc.coord; /*manipulatedObject's location coord.
                                                                                  prior to moving*/
manipulatedObjectEndPosition = determineEndPosition(manipulatedObject); /*determine manipulatedObject's
                                                                  location coord. when no longer moving*/
reasonedTrajectory = determine Trajectory(manipulatedObjectStartPosition, manipulatedObjectEndPosition);
movePointsOn Trajectory = determineMovePointsOn Trajectory(reasonedTrajectory); /*array of move points
                                                                                  on reasoned trajectory*/
```

-continued

```
for (int j = 0; j < movePointsOnTrajectory.length; j++) { /*process move points in movePointsOnTrajectory array*/
   instSets = instSets & "Device.Arm.move(adjust(movePointsOnTrajectory [j]))"; /*include
                        Device.Arm.move(adjust(movePointsOnTrajectory[j])) in instSets*/
   }
instSets = instSets & "Device.Arm.release( )"; //include Device.Arm.release( ) in instSets
...
```

The foregoing code applicable to Device 98, Objects 615, and/or other elements may similarly be used as an example code applicable to Avatar 605, observation point, Objects 616, and/or other elements. For instance, references to Device in the foregoing code may be replaced with references to Avatar to implement code for use with respect to Avatar 605, observation point, Objects 616, and/or other elements.

In some embodiments, Instruction Set Determination Logic 447 can determine Instruction Sets 526 that would cause Device 98 and/or its Actuator 91 (i.e. robotic arm Actuator 91, etc.) or Avatar 605 and/or its Arm 93 to perform a manipulation of a manipulated Object 615 or Object 616 using a combination of observing or examining manipulating Object's 615 or Object's 616 operations, observing or examining manipulated Object's 615 or Object's 616 change of states (i.e. movement, change of condition, transformation, etc.), observing or examining manipulated Object's 615 or Object's 616 starting and/or ending states, and/or other techniques. In one example of a move manipulation, Instruction Set Determination Logic 447 can determine, by observing or examining manipulating Object's 615 or Object's 616 operations, Instruction Sets 526 that would cause Device 98 or Avatar 605 to move into location of manipulating Object 615 or Object 616 and cause Device's 98 robotic arm Actuator 91 or Avatar's 605 Arm 93 to move to an initial point of contact with manipulated Object 615 or Object 616, at which point Instruction Set Determination Logic 447 can determine, by observing or examining manipulated Object's 615 or Object's 616 change of states, Instruction Sets 526 that would cause Device 98 and/or its Actuator 91 or Avatar 605 and/or its Arm 93 to move manipulated Object 615 or Object 616 in a detected or reasoned trajectory and cause Device's 98 robotic arm Actuator 91 or Avatar's 605 Arm 93 to release manipulated Object 615 or Object 616 at an ending position. One of ordinary skill in art will understand that the aforementioned person Object 615*aa*, watering can Object 615*ab*, toy Object 615*ac*, simulated person Object 616*aa*, simulated watering can Object 616*ab*, and simulated toy Object 616*ac* are described merely as examples of a variety of Objects 615 or Objects 616, and that other Objects 615 or Objects 616 can be used instead of or in addition to Object 615*aa*, Object 615*ab*, Object 615*ac*, Object 616*aa*, Object 616*ab*, and Object 616*ac* in alternate embodiments. Also, any features, functionalities, operations, and/or manipulations described with respect to Object 615*aa*, Object 615*ab*, Object 615*ac*, Object 616*aa*, Object 616*ab*, and Object 616*ac* are described merely as examples, and that the features, functionalities, operations, and/or manipulations can be implemented with other Objects 615 and/or Objects 616 in alternate embodiments. In some aspects, a single manipulation may include multiple manipulations (i.e. simpler, shorter, or other manipulations, etc.). In other aspects, multiple manipulations may be viewed as a single manipulation (i.e. more complex, longer, or other manipulation, etc.). Therefore, a reference to a single manipulation may include a reference to multiple manipulations and a reference to multiple manipulations may include a reference to a single manipulation depending on context. It should be noted that the aforementioned gripping/attaching/grasping may include any gripping/attaching/grasping techniques, and/or those known in art. For example, gripping/attaching/grasping techniques include gripping by a robotic arm (i.e. similar to gripping by a hand, etc.), attaching by a clamp-like element, attaching by a hook-like element, attaching by a penetrating element, attaching by a suction element, attaching by a magnetic element, attaching by an adhesive element, and/or others. Instruction Sets 526 that implement any of these techniques can be used herein. In some aspects, any features, functionalities, and/or embodiments described with respect to Avatar 605 may similarly apply to observation point (later described), and vice versa.

Some of the foregoing exemplary embodiments comprise 3D Application Program 18 that includes a manipulating Object 616 (i.e. computer generated object, etc.) whose behaviors represent observed manipulating Object's 615 (i.e. physical object's, etc.) behaviors as well as a manipulated Object 616 (i.e. computer generated object, etc.) whose behaviors represent observed manipulated Object's 615 (i.e. physical object's, etc.) behaviors. In different embodiments, 3D Application Program 18 may include a manipulating Object 616 (i.e. computer generated object, etc.) and a manipulated Object 616 (i.e. computer generated object, etc.) whose behaviors are configured, programmed, or simulated (i.e. using any algorithm, etc.). Instruction Set Determination Logic 447 can utilize such 3D Application Program 18 in determining Instruction Sets 526 that would cause Device 98 or Avatar 605 to perform manipulating Object's 616 observed manipulations of manipulated Object 616. Such determination can be made using similar techniques as described with respect to 3D Application Program 18 in which Objects 616 (i.e. computer generated objects, etc.) represent Objects 615 (i.e. physical objects, etc.). Instruction Set Determination Logic's 447 determining Instruction Sets 526 using 3D Application Program 18 where Objects 616 (i.e. computer generated objects, etc.) are configured, programmed, or simulated includes any features, functionalities, and/or embodiments of Instruction Set Determination Logic's 447 determining Instruction Sets 526 using 3D Application Program 18 where Objects 616 (i.e. computer generated objects, etc.) represent Objects 615 (i.e. physical objects, etc.), and vice versa. Referring to FIG. 20A-20E, some embodiments of Instruction Set 526 (also may be referred to as instruction set, instruction, or other suitable name or reference, etc.) are illustrated. Instruction Set 526 may include one or more instructions. An instruction may be or include a command, a function (i.e. Object.Function1 (Parameter1, Parameter2, . . . ), etc.), a keyword, a value, a parameter, a variable, a signal, an input, an output, an operator (i.e. =, <, >, etc.), a character, a digit, a symbol (i.e. parenthesis, bracket, comma, semicolon, etc.), a bit, an object, a data structure, a state, a reference thereto, and/or others. In some aspects, any part of an instruction can be an instruction itself. In some designs, Instruction Set 526 may include machine code used or executed in a lowest level processing element such as Processor 11 or Microcontroller 250. In other designs, Instruction Set 526 may include bytecode used or executed in a middle level processing element such as a virtual machine or runtime environment. In further designs, Instruction Set 526 may include source code used or executed in a highest level processing element such as an application program. In general, Instruction Set 526 may include code used or executed in any abstraction layer of a computing system. Instruction Set 526 may be used for performing one or more operations. As such, Instruction Set 526 may be used or executed in Device's 98 manipulations of one or more Objects 615 (i.e. physical objects, etc.) and/or Avatar's 605 manipulations of one or more Objects 616 (i.e. computer generated objects, etc.). In an embodiment shown in FIG. 20A, Instruction Set 526 includes code of a high-level programming language (i.e. Java, C++, etc.) using the following function call construct: Function1 (Parameter1, Parameter2, Parameter3, . . . ). An example of a function call applying this construct includes the following Instruction Set 526: Device.Arm.push (forward, 0.3), which may direct Device's 98 arm to push forward 0.3 meters. Another example of a function call applying this construct includes the following Instruction Set 526: Avatar.Arm.push (forward, 0.3), which may direct Avatar's 605 arm to push forward 0.3 meters. In another embodiment shown in FIG. 20B, Instruction Set 526 includes structured query language (SQL). In a further embodiment shown in FIG. 20C, Instruction Set 526 includes bytecode (i.e. Java bytecode, Python bytecode, CLR bytecode, etc.). In a further embodiment shown in FIG. 20D, Instruction Set 526 includes assembly code. In a further embodiment shown in FIG. 20E, Instruction Set 526 includes machine code.

Figure 20A:
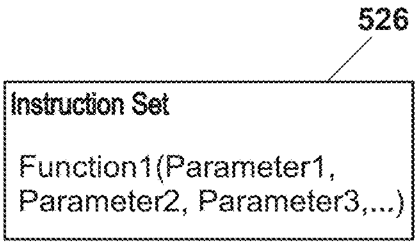
FIG. 20A-20E illustrate some embodiments of Instruction Set 526.
Figure 20B:
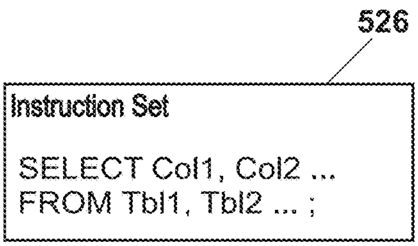
Figure 20C:
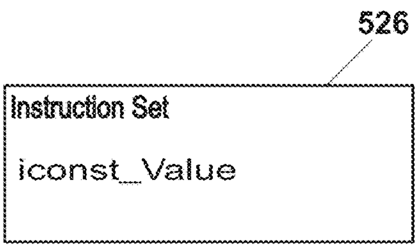
Figure 20D:
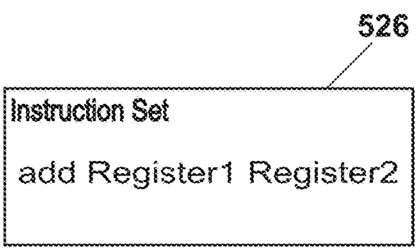
Figure 20E:
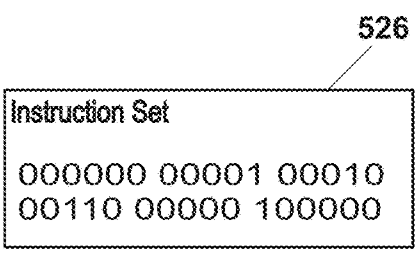
Figure 20F:
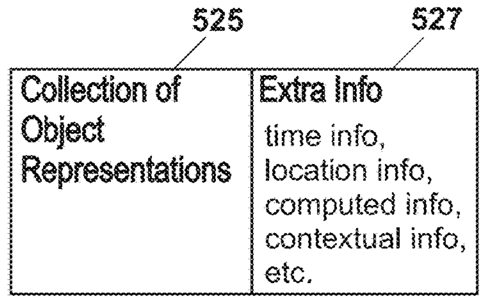
Figure 20G:
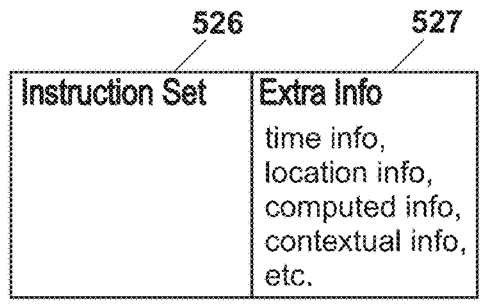
Figure 20H:
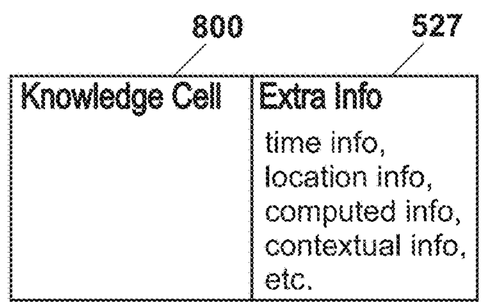
Figure 20I:
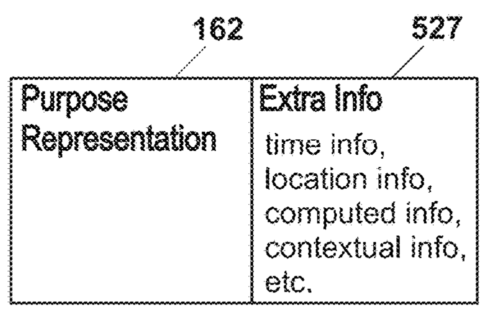

Referring to FIG. 20F-201, some embodiments of Extra Information 527 (also referred to as extra information, Extra Info 527, and/or other suitable name or reference, etc.) are illustrated. In an embodiment shown in FIG. 20F, Collection of Object Representations 525 may include or be associated with Extra Info 527. In an embodiment shown in FIG. 20G, Instruction Set 526 may include or be associated with Extra Info 527. In an embodiment shown in FIG. 20H, Knowledge Cell 800 may include or be associated with Extra Info 527. In an embodiment shown in FIG. 201, Purpose Representation 162 may include or be associated with Extra Info 527. In further embodiments, Object Representation 625 may include or be associated with Extra Info 527 (not shown). In further embodiments, Extra Info 527 may be included as Object Property 630 in Object Representation 625 (not shown). In general, any element may include or be associated with Extra Info 527.

Extra Info 527 comprises functionality for storing any information that can be useful in LTCUAK Unit 100, LTOUAK Unit 105, Consciousness Unit 110, and/or other elements or functionalities herein. In some aspects, the system can obtain Extra Info 527 at a time of generating or creating Collection of Object Representations 525. In other aspects, the system can obtain Extra Info 527 at a time of acquiring Instruction Set 526. In other aspects, the system can obtain Extra Info 527 at a time of generating or creating Knowledge Cell 800. In further aspects, the system can obtain Extra Info 527 at a time of generating or creating Purpose Representation 162. In general, Extra Info 527 can be obtained at any suitable time. Examples of Extra Info 527 include time information, location information, computed information, contextual information, and/or other information. Which information is utilized and/or stored in Extra Info 527 can be set by a user, by system administrator, or automatically by the system. Extra Info 527 may include or be referred to as contextual information, and vice versa. Therefore, these terms may be used interchangeably herein depending on context.

In some embodiments, time information (i.e. time stamp, etc.) can be utilized and/or stored in Extra Info 527. Time information can be useful in Device's 98 manipulations of one or more Objects 615 or Avatar's 605 manipulations of one or more Objects 616 related to a time as Device 98 and/or Avatar 605 may be required to perform certain manipulations at certain parts of day, month, year, and/or other times. Time information can be obtained from the system clock, online clock, oscillator, or other time source. In other embodiments, location information (i.e. coordinates, distance/angle from a known point, address, etc.) can be utilized and/or stored in Extra Info 527. Location information can be useful in Device's 98 manipulations of one or more Objects 615 or Avatar's 605 manipulations of one or more Objects 616 related to a place as Device 98 and/or Avatar 605 may be required to perform certain manipulations at certain places. Location information for physical devices and objects can be obtained from a positioning system (i.e. radio signal triangulation system, GPS, etc.), sensors, and/or other location system. Location information for computer generated avatar and objects can be obtained from a location function within Application Program 18 and/or elements (i.e. 3D engine, graphics engine, simulation engine, game engine, or other such tool, etc.) thereof. In further embodiments, computed information can be utilized and/or stored in Extra Info 527. Computed information can be useful in Device's 98 manipulations of one or more Objects 615 or Avatar's 605 manipulations of one or more Objects 616 where information can be calculated, inferred, or derived from other available information. The system may include computational functionalities to create Extra Info 527 by performing calculations or inferences using other information. In one example, Device's 98 or Avatar's 605 speed can be computed or estimated from Device's 98 or Avatar's 605 location and time information. In another example, Device's 98 or Avatar's 605 direction/bearing can be computed or estimated from Device's 98 or Avatar's 605 location information by utilizing Pythagorean theorem, trigonometry, and/or other theorems, formulas, or techniques. In a further example, speeds, directions/bearings, distances, and/or other properties of Objects 615 around Device 98 or Objects 616 around Avatar 605 can similarly be computed or inferred using known information. In further embodiments, any observed information can be utilized and/or stored in Extra Info 527. In further embodiments, pictures, models (i.e. 3D models, 2D models, etc.), and/or other information can be utilized and/or stored in Extra Info 527. In general, any information can be utilized and/or stored in Extra Info 527.

Referring now to Knowledge Structuring Unit 150. Knowledge Structuring Unit 150 comprises functionality for structuring knowledge of Device's 98 manipulations of one or more Objects 615 (i.e. physical objects, etc.) using curiosity. Knowledge Structuring Unit 150 comprises functionality for structuring knowledge of Avatar's 605 manipulations of one or more Objects 616 (i.e. computer generated objects, etc.) using curiosity. Knowledge Structuring Unit 150 comprises functionality for structuring knowledge of observed manipulations of one or more Objects 615 (i.e. manipulated physical objects, etc.). Knowledge Structuring Unit 150 comprises functionality for structuring knowledge of observed manipulations of one or more Objects 616 (i.e. manipulated computer generated objects, etc.). Knowledge Structuring Unit 150 comprises functionality for generating or creating Knowledge Cells 800 and storing one or more Collections of Object Representations 525, any Instruction Sets 526, any Extra Info 527, and/or other elements, or references thereto, into a Knowledge Cell 800. As such, Knowledge Cell 800 comprises functionality for storing one or more Collections of Object Representations 525, any Instruction Sets 526, any Extra Info 527, and/or other elements, or references thereto. Knowledge Cell 800 may include any data structure that can facilitate such storing. Knowledge Structuring Unit 150 may comprise other functionalities. In some aspects, Knowledge Cell 800 may include knowledge (i.e. unit of knowledge, etc.) of how Device 98 manipulated one or more Objects 615 using curiosity. In other aspects, Knowledge Cell 800 may include knowledge (i.e. unit of knowledge, etc.) of how Avatar 605 manipulated one or more Objects 616 using curiosity. In further aspects, Knowledge Cell 800 includes knowledge (i.e. unit of knowledge, etc.) of how Device 98 can perform an observed manipulation of one or more Objects 615. In further aspects, Knowledge Cell 800 includes knowledge (i.e. unit of knowledge, etc.) of how Avatar 605 can perform an observed manipulation of one or more Objects 616. Once generated or created, Knowledge Cells 800 can be used in/as neurons, nodes, vertices, or other elements in Knowledge Structure 160 (i.e. Collection of Sequences **160*a*, Graph or Neural Network 160*b*, Collection of Knowledge Cells [not shown], etc.), thereby facilitating learning functionalities herein. Knowledge Structuring Unit 150** may include any hardware, programs, or combination thereof.

In some designs, Knowledge Structuring Unit 150 may receive one or more Collections of Object Representations 525 from Object Processing Unit 115 and one or more Instruction Sets 526 from Unit for Object Manipulation Using Curiosity 130, in which case Unit for Observing Object Manipulation 135 can be omitted as indicated by its outgoing dashed arrow. In other designs, Knowledge Structuring Unit 150 may receive one or more Collections of Object Representations 525 from Object Processing Unit 115 and one or more Instruction Sets 526 from Unit for Observing Object Manipulation 135, in which case Unit for Object Manipulation Using Curiosity 130 can be omitted indicated by its outgoing dashed arrow.

In some embodiments, Knowledge Structuring Unit 150 may receive: (i) one or more Instruction Sets 526 used or executed in Device's 98 manipulations of one or more Objects 615 using curiosity (i.e. from Unit for Object Manipulation Using Curiosity 130, etc.), (ii) one or more Instruction Sets 526 used or executed in Avatar's 605 manipulations of one or more Objects 616 using curiosity (i.e. from Unit for Object Manipulation Using Curiosity 130, etc.), (ii) one or more Instruction Sets 526 that would cause Device 98 to perform observed manipulations of one or more Objects 615 (i.e. from Unit for Observing Object Manipulation 135, etc.), or (iv) one or more Instruction Sets 526 that would cause Avatar 605 to perform observed manipulations of one or more Objects 616 (i.e. from Unit for Observing Object Manipulation 135, etc.). Knowledge Structuring Unit 150 may also receive (i.e. from Object Processing Unit 115, etc.) one or more Collections of Object Representations 525 representing the one or more Objects 615 or one or more Objects 616 as the manipulations occur. Knowledge Structuring Unit 150 may correlate one or more Collections of Object Representations 525 with any (i.e. zero, one, or more, etc.) Instruction Sets 526. Knowledge Structuring Unit 150 may generate or create one or more Knowledge Cells 800 each including one or more Collections of Object Representations 525 correlated with any Instruction Sets 526. It should be noted that one or more Collections of Object Representations 525 correlated with any Instruction Sets 526 may be referred to as a correlation. Similarly, Knowledge Cell 800 comprising one or more Collections of Object Representations 525 correlated with any Instruction Sets 526 may be referred to as a correlation.

In some designs, Knowledge Structuring Unit 150 may correlate one or more Collections of Object Representations 525 with one or more temporally corresponding Instruction Sets 526. In some aspects, Knowledge Structuring Unit 150 may receive a stream of Instruction Sets 526 (i.e. from Unit for Object Manipulation Using Curiosity 130, from Unit for Observing Object Manipulation 135, etc.) and a stream of Collections of Object Representations 525 (i.e. from Object Processing Unit 115, etc.) over time. Knowledge Structuring Unit 150 can then correlate one or more Collections of Object Representations 525 from the stream of Collections of Object Representations 525 with any temporally corresponding Instruction Sets 526 from the stream of Instruction Sets 526. One or more Collections of Object Representations 525 without a temporally corresponding Instruction Set 526 may be uncorrelated. In some aspects, Instruction Sets 526 that temporally correspond to one or more Collections of Object Representations 525 may include Instruction Sets 526 used or executed from the time of generating a prior one or more Collections of Object Representations 525 to the time of generating the one or more Collections of Object Representations 525. In other aspects, Instruction Sets 526 that temporally correspond to a pair of one or more Collections of Object Representations 525 may include Instruction Sets 526 used or executed between generating the one or more Collections of Object Representations 525 of the pair. In some implementations, any threshold time periods can be utilized in determining temporal relationship between Collections of Object Representations 525 and Instruction Sets 526 such as 50 milliseconds, 1 second, 3 seconds, 20 seconds, 1 minute, 13 minutes, or any other time period depending on implementation. Such time periods can be defined by a user, by system administrator, or automatically by the system based on experience, learning, testing, inquiry, analysis, synthesis, or other techniques, knowledge, or input. It should be noted that a reference to one or more Collections of Object Representations 525 includes a reference to one Collection of Object Representations 525 or a plurality (i.e. stream, etc.) of Collections of Object Representations 525 depending on context.

In some embodiments, Knowledge Structuring Unit 150 can structure the knowledge into any number of Knowledge Cells 800. In some aspects, Knowledge Structuring Unit 150 can structure into Knowledge Cell **800*a* single Collection of Object Representations 525 correlated with any Instruction Sets 526. In other aspects, Knowledge Structuring Unit 150 can structure into Knowledge Cell 800 any number (i.e. 1, 2, 3, 4, 7, 17, 29, 87, 1415, 23891, etc.) of Collections of Object Representations 525 correlated with any number (i.e. including zero [uncorrelated], etc.) of Instruction Sets 526. In some designs, Knowledge Structuring Unit 150 can structure all Collections of Object Representations 525 correlated with any Instruction Sets 526 into a single long Knowledge Cell 800. In other designs, Knowledge Structuring Unit 150 can store periodic streams of Collections of Object Representations 525 correlated with any Instruction Sets 526 into a plurality of Knowledge Cells 800 such as hourly, daily, weekly, monthly, yearly, or other periodic Knowledge Cells 800**.

Figure 21:
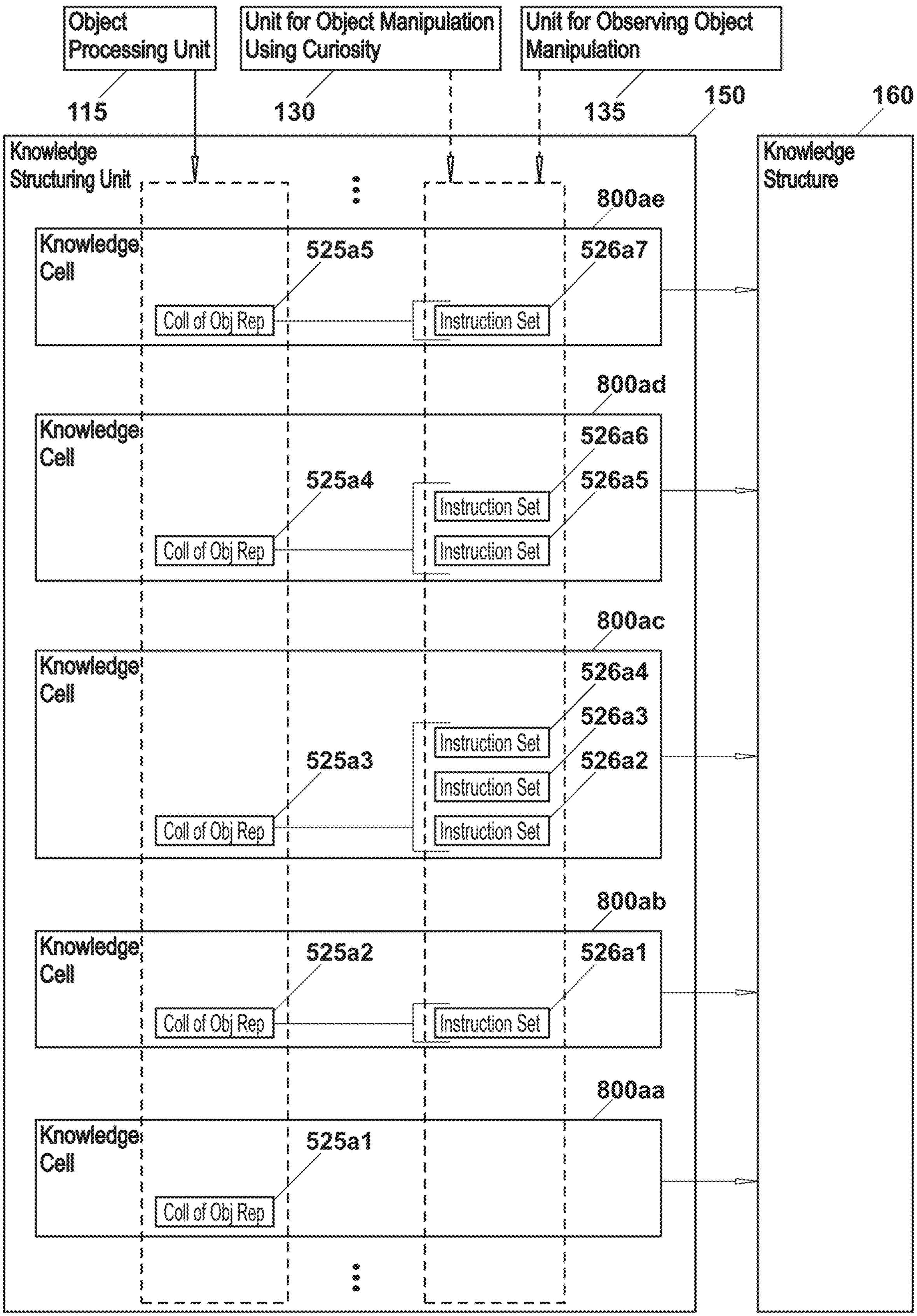
FIG. 21-26 illustrate some embodiments of Knowledge Structuring Unit 150.

Referring to FIG. 21, an embodiment of Knowledge Structuring Unit 150 providing Knowledge Cells 800 each including a single Collection of Object Representations 525 correlated with any Instruction Sets 526 is illustrated. Knowledge Cells 800 can be used in/as neurons, nodes, vertices, or other elements in Knowledge Structure 160. In some aspects, a Collection of Object Representations 525 in a Knowledge Cell 800 may represent one or more Objects 615 or one or more Objects 616 in one state, a Collection of Object Representations 525 in a subsequent Knowledge Cell 800 may represent the one or more Objects 615 or one or more Objects 616 in a subsequent state, and any Instruction Sets 526 correlated with the Collection of Object Representations 525 in the subsequent Knowledge Cell 800 may be or include Instruction Sets 526 that would cause the subsequent state of the one or more Objects 615 or one or more Objects 616. For example, Knowledge Structuring Unit 150 may generate Knowledge Cell 800*aa* including Collection of Object Representations 525*a*1, and provide Knowledge Cell 800*aa* to Knowledge Structure 160. Knowledge Structuring Unit 150 may further generate Knowledge Cell 800*ab* including Collection of Object Representations 525*a*2 correlated with Instruction Set 526*a*1, and provide Knowledge Cell 800*ab* to Knowledge Structure 160. Knowledge Structuring Unit 150 may further generate Knowledge Cell 800*ac* including Collection of Object Representations 525*a*3 correlated with Instruction Sets 526*a*2-526*a*4, and provide Knowledge Cell 800*ac* to Knowledge Structure 160. Knowledge Structuring Unit 150 may further generate Knowledge Cell 800*ad* including Collection of Object Representations 525*a*4 correlated with Instruction Sets 526*a*5-526*a*6, and provide Knowledge Cell 800*ad* to Knowledge Structure 160. Knowledge Structuring Unit 150 may further generate Knowledge Cell 800*ae* including Collection of Object Representations 525*a*5 correlated with Instruction Set 526*a*7, and provide Knowledge Cell 800*ae* to Knowledge Structure 160. Knowledge Structuring Unit 150 may generate and provide any number of Knowledge Cells 800 by following similar logic as described above.

Figure 22:
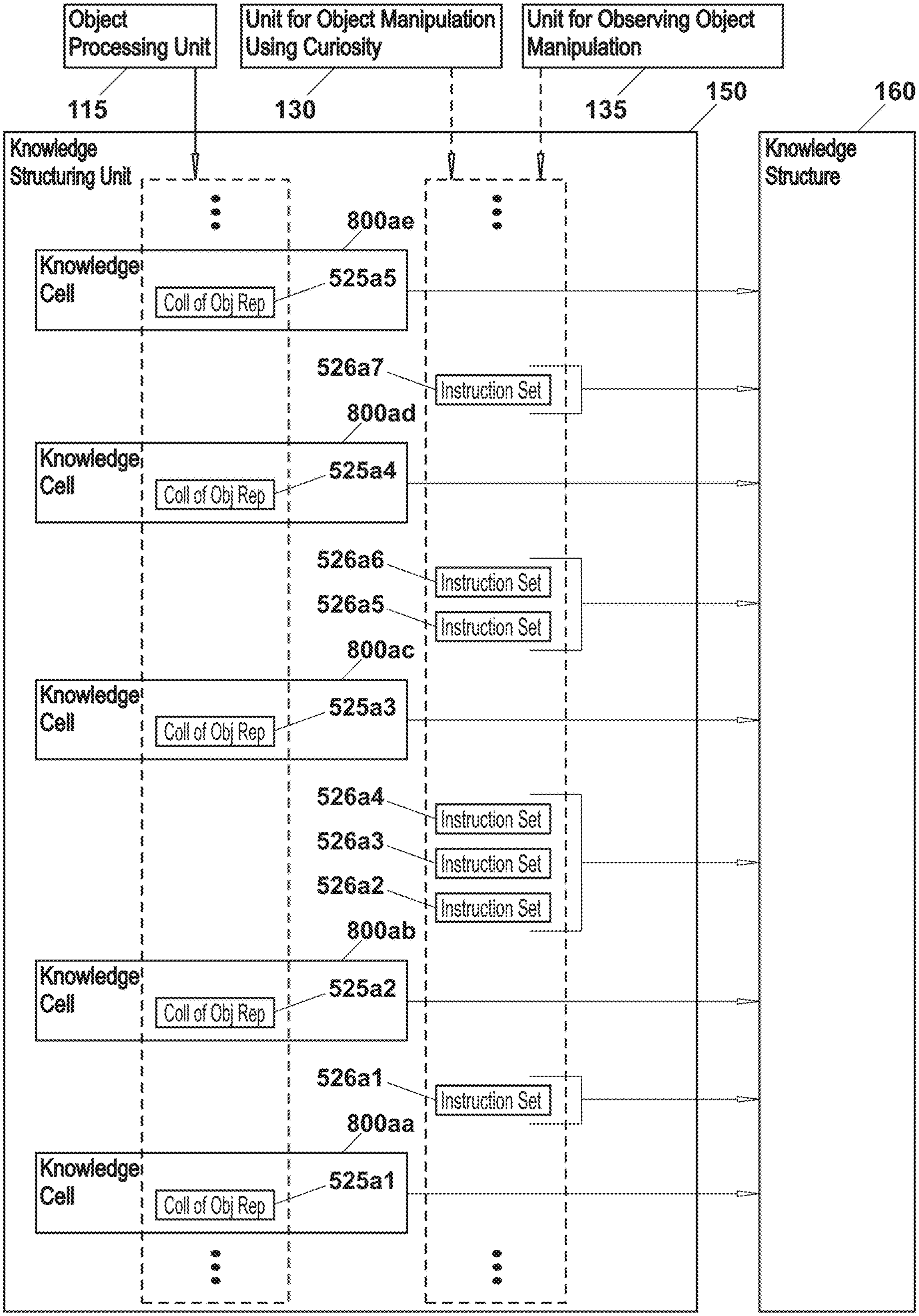

Referring to FIG. 22, an embodiment of Knowledge Structuring Unit 150 providing Knowledge Cells 800 each including a single Collection of Object Representations 525 and providing any Instruction Sets 526 is illustrated. Knowledge Cells 800 can be used in/as neurons, nodes, vertices, or other elements in Knowledge Structure 160 whereas Instruction Sets 526 can be used in or associated with connections or other elements in Knowledge Structure 160. In some aspects, a Collection of Object Representations 525 in a Knowledge Cell 800 may represent one or more Objects 615 or one or more Objects 616 in one state, a Collection of Object Representations 525 in a subsequent Knowledge Cell 800 may represent the one or more Objects 615 or one or more Objects 616 in a subsequent state, and any Instruction Sets 526 used or executed between the Collection of Object Representations 525 in the Knowledge Cell 800 and the Collection of Object Representations 525 in the subsequent Knowledge Cell 800 may be or include Instruction Sets 526 that would cause the subsequent state of the one or more Objects 615 or one or more Objects 616. For example, Knowledge Structuring Unit 150 may generate Knowledge Cell 800*aa* including Collection of Object Representations 525*a*1, and provide Knowledge Cell 800*aa* to Knowledge Structure 160. Knowledge Structuring Unit 150 may further provide Instruction Set 526*a*1 to Knowledge Structure 160. Knowledge Structuring Unit 150 may further generate Knowledge Cell 800*ab* including Collection of Object Representations 525*a*2, and provide Knowledge Cell 800*ab* to Knowledge Structure 160. Knowledge Structuring Unit 150 may further provide Instruction Sets 526*a*2-526*a*4 to Knowledge Structure 160. Knowledge Structuring Unit 150 may further generate Knowledge Cell 800*ac* including Collection of Object Representations 525*a*3, and provide Knowledge Cell 800*ac* to Knowledge Structure 160. Knowledge Structuring Unit 150 may further provide Instruction Sets 526*a*5-526*a*6 to Knowledge Structure 160. Knowledge Structuring Unit 150 may further generate Knowledge Cell 800*ad* including Collection of Object Representations 525*a*4, and provide Knowledge Cell 800*ad* to Knowledge Structure 160. Knowledge Structuring Unit 150 may further provide Instruction Set 526*a*7 to Knowledge Structure 160. Knowledge Structuring Unit 150 may further generate Knowledge Cell 800*ae* including Collection of Object Representations 525*a*5, and provide Knowledge Cell 800*ae* to Knowledge Structure 160. Knowledge Structuring Unit 150 may provide any number of Knowledge Cells 800 and any number of Instruction Sets 526 by following similar logic as described above.

Figure 23:
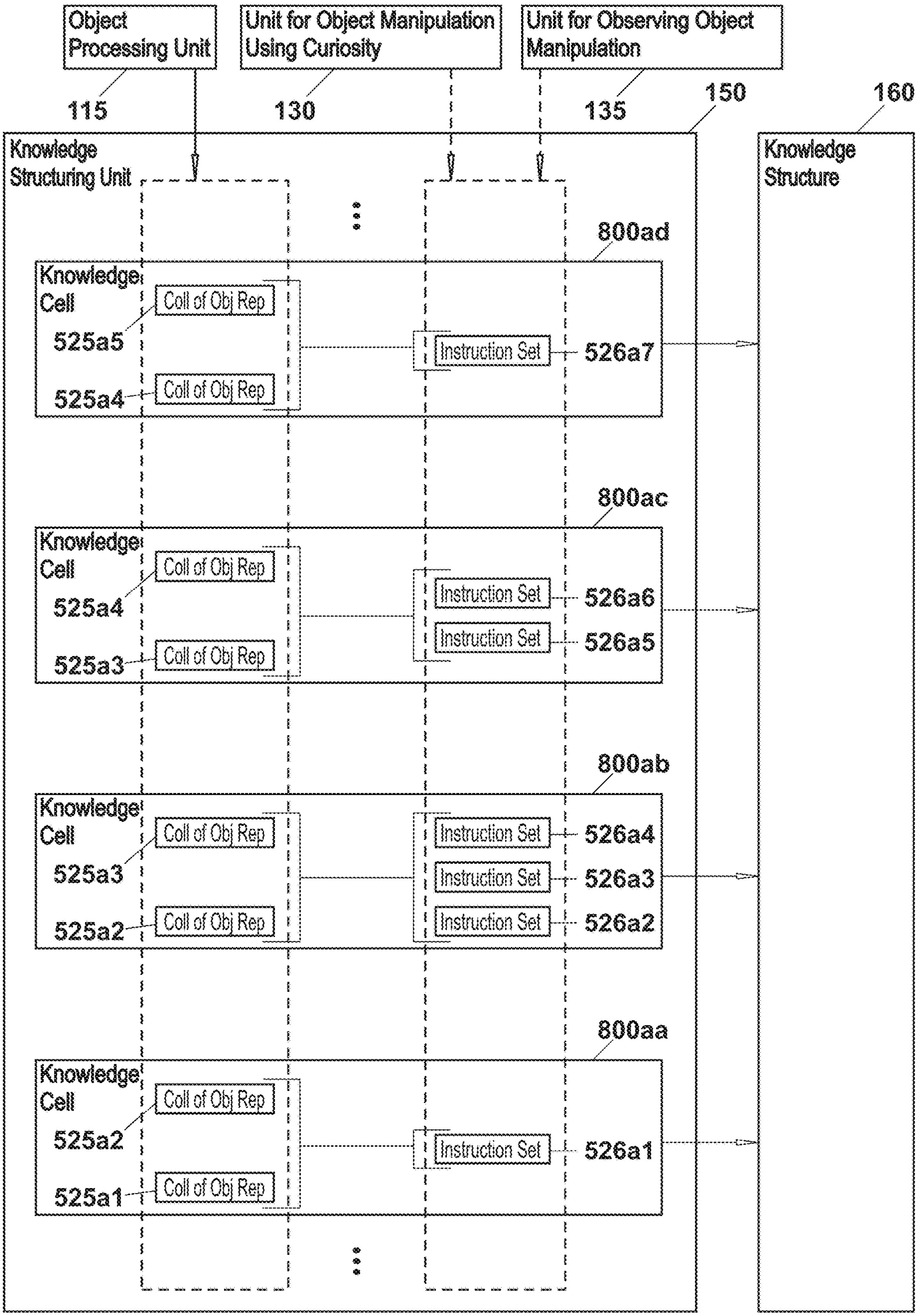

Referring to FIG. 23, an embodiment of Knowledge Structuring Unit 150 providing Knowledge Cells 800 each including a pair of Collections of Object Representations 525 correlated with any Instruction Sets 526 is illustrated. Knowledge Cells 800 can be used in/as neurons, nodes, vertices, or other elements in Knowledge Structure 160. In some aspects, a Collection of Object Representations 525 of a pair of Collections of Object Representations 525 in a Knowledge Cell 800 may represent one or more Objects 615 or one or more Objects 616 in one state, a subsequent Collection of Object Representations 525 of the pair of Collections of Object Representations 525 in the Knowledge Cell 800 may represent one or more Objects 615 or one or more Objects 616 in a subsequent state, and any Instruction Sets 526 correlated with the pair of Collections of Object Representations 525 in the Knowledge Cell 800 may be or include Instruction Sets 526 that would cause the subsequent state of the one or more Objects 615 or one or more Objects 616. For example, Knowledge Structuring Unit 150 may generate Knowledge Cell 800*aa* including a pair of Collections of Object Representations 525*a*1 and 525*a*2 correlated with Instruction Set 526*a*1, and provide Knowledge Cell 800*aa* to Knowledge Structure 160. Knowledge Structuring Unit 150 may further generate Knowledge Cell 800*ab* including a pair of Collections of Object Representations 525*a*2 and 525*a*3 correlated with Instruction Sets 526*a*2-526*a*4, and provide Knowledge Cell 800*ab* to Knowledge Structure 160. Knowledge Structuring Unit 150 may further generate Knowledge Cell 800*ac* including a pair of Collections of Object Representations 525*a*3 and 525*a*4 correlated with Instruction Sets 526*a*5-526*a*6, and provide Knowledge Cell 800*ac* to Knowledge Structure 160. Knowledge Structuring Unit 150 may further generate Knowledge Cell 800*ad* including a pair of Collections of Object Representations 525*a*4 and 525*a*5 correlated with Instruction Set 526*a*7, and provide Knowledge Cell 800*ad* to Knowledge Structure 160. Knowledge Structuring Unit 150 may provide any number of Knowledge Cells 800 by following similar logic as described above. In some aspects, Knowledge Structuring Unit 150 may structure within a Knowledge Cell 800 any number of pairs of Collections of Object Representations 525 correlated with any number (including zero [i.e. uncorrelated]) of Instruction Sets 526.

Figure 24:
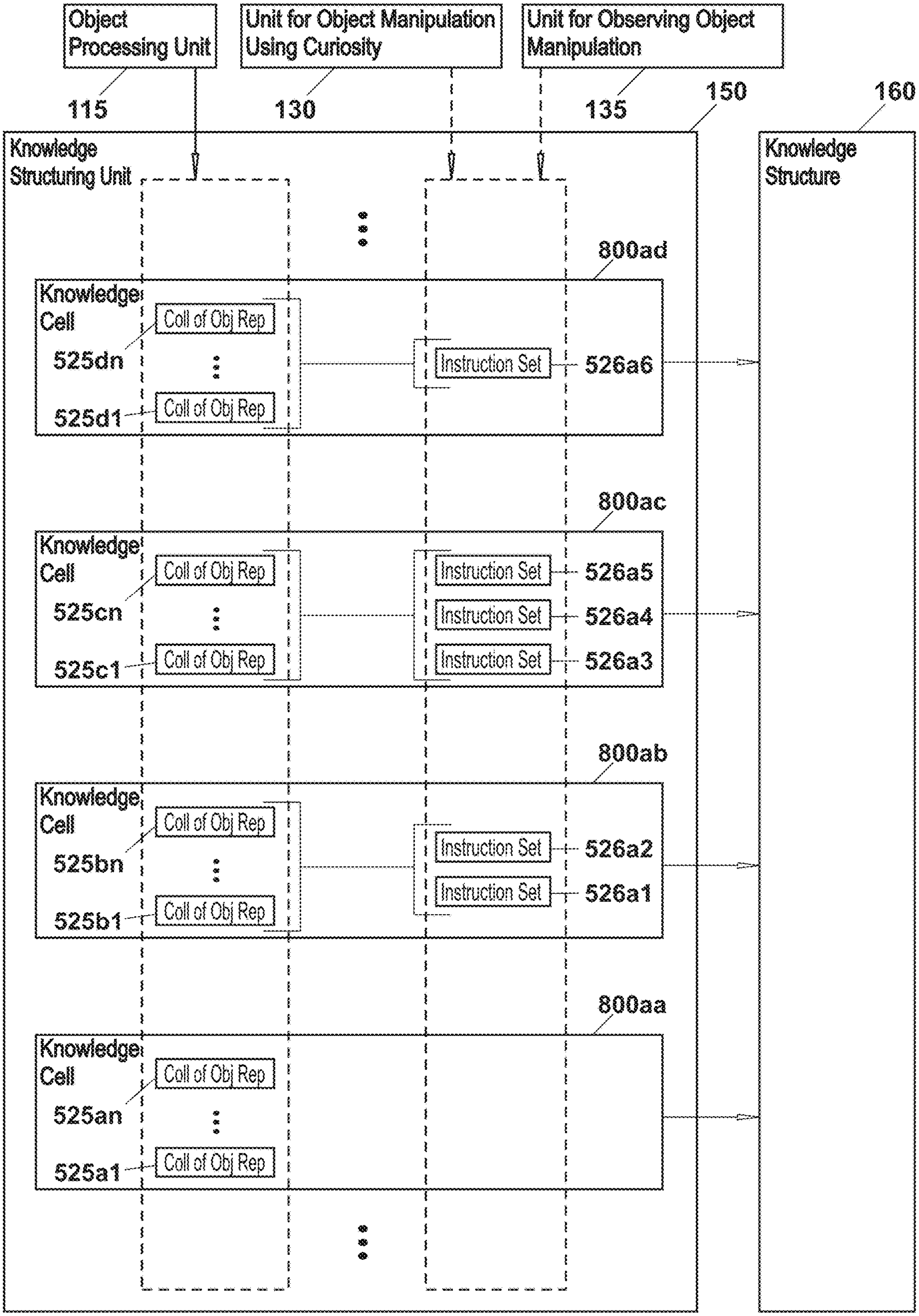

Referring to FIG. 24, an embodiment of Knowledge Structuring Unit 150 providing Knowledge Cells 800 each including a single stream of Collections of Object Representations 525 correlated with any Instruction Sets 526 is illustrated. Knowledge Cells 800 can be used in/as neurons, nodes, vertices, or other elements in Knowledge Structure 160. In some aspects, a stream of Collections of Object Representations 525 in a Knowledge Cell 800 may represent one or more Objects 615 or one or more Objects 616 in one state, a stream of Collections of Object Representations 525 in a subsequent Knowledge Cell 800 may represent the one or more Objects 615 or one or more Objects 616 in a subsequent state, and any Instruction Sets 526 correlated with the stream of Collections of Object Representations 525 in the subsequent Knowledge Cell 800 may be or include Instruction Sets 526 that would cause the subsequent state of the one or more Objects 615 or one or more Objects 616. For example, Knowledge Structuring Unit 150 may generate Knowledge Cell 800*aa* including a stream of Collections of Object Representations 525*a*1-525*an*, and provide Knowledge Cell 800*aa* to Knowledge Structure 160. Knowledge Structuring Unit 150 may further generate Knowledge Cell 800*ab* including a stream of Collections of Object Representations 525*b*1-525*bn* correlated with Instruction Sets 526*a*1-526*a*2, and provide Knowledge Cell 800*ab* to Knowledge Structure 160. Knowledge Structuring Unit 150 may further generate Knowledge Cell 800*ac* including a stream of Collections of Object Representations 525*c*1-525*cn* correlated with Instruction Sets 526*a*3-526*a*5, and provide Knowledge Cell 800*ac* to Knowledge Structure 160. Knowledge Structuring Unit 150 may further generate Knowledge Cell 800*ad* including a stream of Collections of Object Representations 525*d*1-525*dn* correlated with Instruction Set 526*a*6, and provide Knowledge Cell 800*ad* to Knowledge Structure 160. Knowledge Structuring Unit 150 may provide any number of Knowledge Cells 800 by following similar logic as described above.

Figure 25:
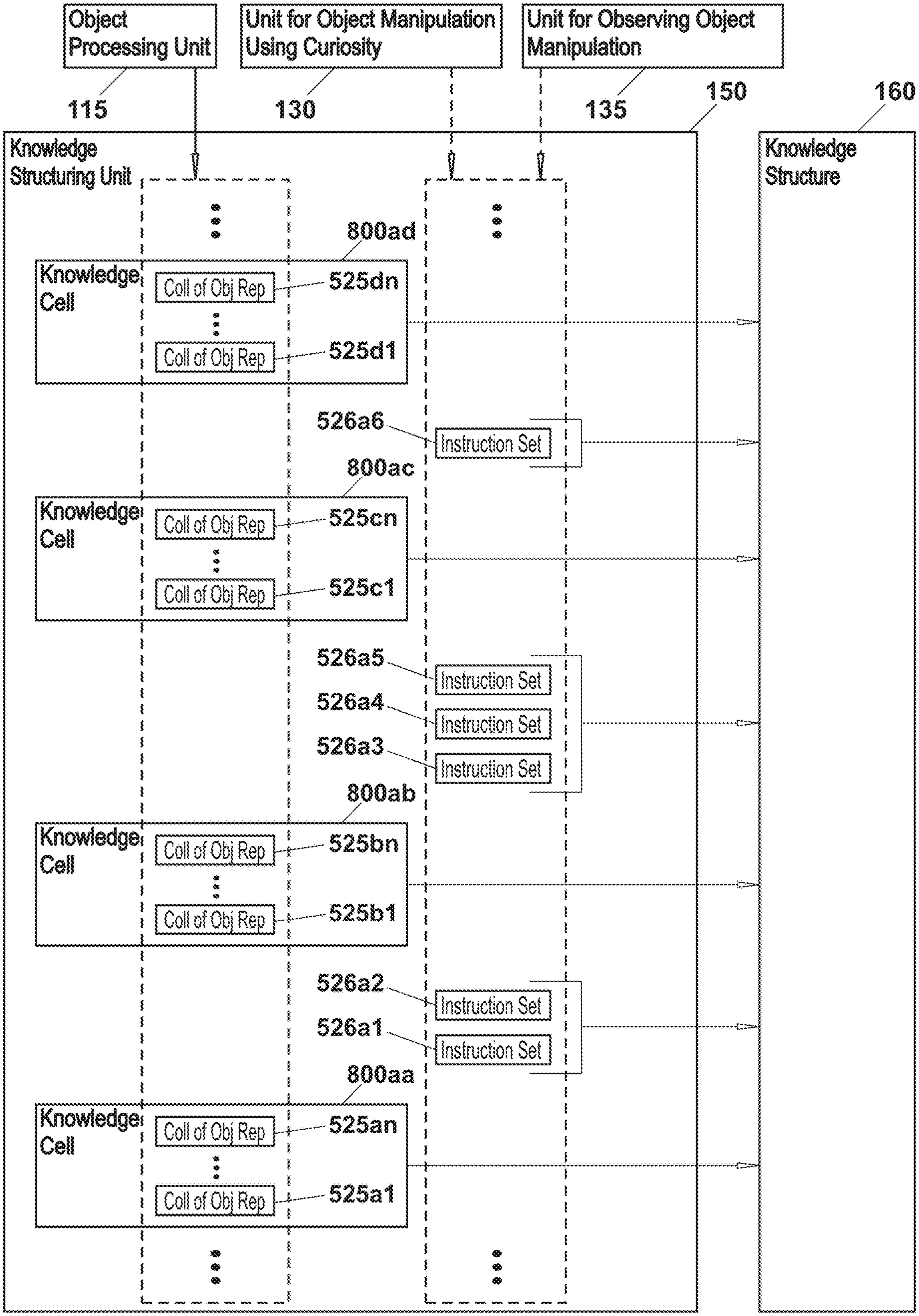

Referring to FIG. 25, an embodiment of Knowledge Structuring Unit 150 providing Knowledge Cells 800 each including a single stream of Collections of Object Representations 525 and providing any Instruction Sets 526 is illustrated. Knowledge Cells 800 can be used in/as neurons, nodes, vertices, or other elements in Knowledge Structure 160 whereas Instruction Sets 526 can be used in or associated with connections or other elements in Knowledge Structure 160. In some aspects, a stream of Collections of Object Representations 525 in a Knowledge Cell 800 may represent one or more Objects 615 or one or more Objects 616 in one state, a stream of Collections of Object Representations 525 in a subsequent Knowledge Cell 800 may represent the one or more Objects 615 or one or more Objects 616 in a subsequent state, and any Instruction Sets 526 used or executed between the stream of Collections of Object Representations 525 in the Knowledge Cell 800 and the stream of Collections of Object Representations 525 in the subsequent Knowledge Cell 800 may be or include Instruction Sets 526 that would cause the subsequent state of the one or more Objects 615 or one or more Objects 616. For example, Knowledge Structuring Unit 150 may generate Knowledge Cell 800*aa* including a stream of Collections of Object Representations 525*a*1-525*an*, and provide Knowledge Cell 800*aa* to Knowledge Structure 160. Knowledge Structuring Unit 150 may further provide Instruction Sets 526*a*1-526*a*2 to Knowledge Structure 160. Knowledge Structuring Unit 150 may further generate Knowledge Cell 800*ab* including a stream of Collections of Object Representations 525*b*1-525*bn*, and provide Knowledge Cell 800*ab* to Knowledge Structure 160. Knowledge Structuring Unit 150 may further provide Instruction Sets 526*a*3-526*a*5 to Knowledge Structure 160. Knowledge Structuring Unit 150 may further generate Knowledge Cell 800*ac* including a stream of Collections of Object Representations 525*c*1-525*cn*, and provide Knowledge Cell 800*ac* to Knowledge Structure 160. Knowledge Structuring Unit 150 may further provide Instruction Set 526*a*6 to Knowledge Structure 160. Knowledge Structuring Unit 150 may further generate Knowledge Cell 800*ad* including a stream of Collections of Object Representations 525*d*1-525*dn*, and provide Knowledge Cell 800*ad* to Knowledge Structure 160. Knowledge Structuring Unit 150 may provide any number of Knowledge Cells 800 and any number of Instruction Sets 526 by following similar logic as described above.

Figure 26:
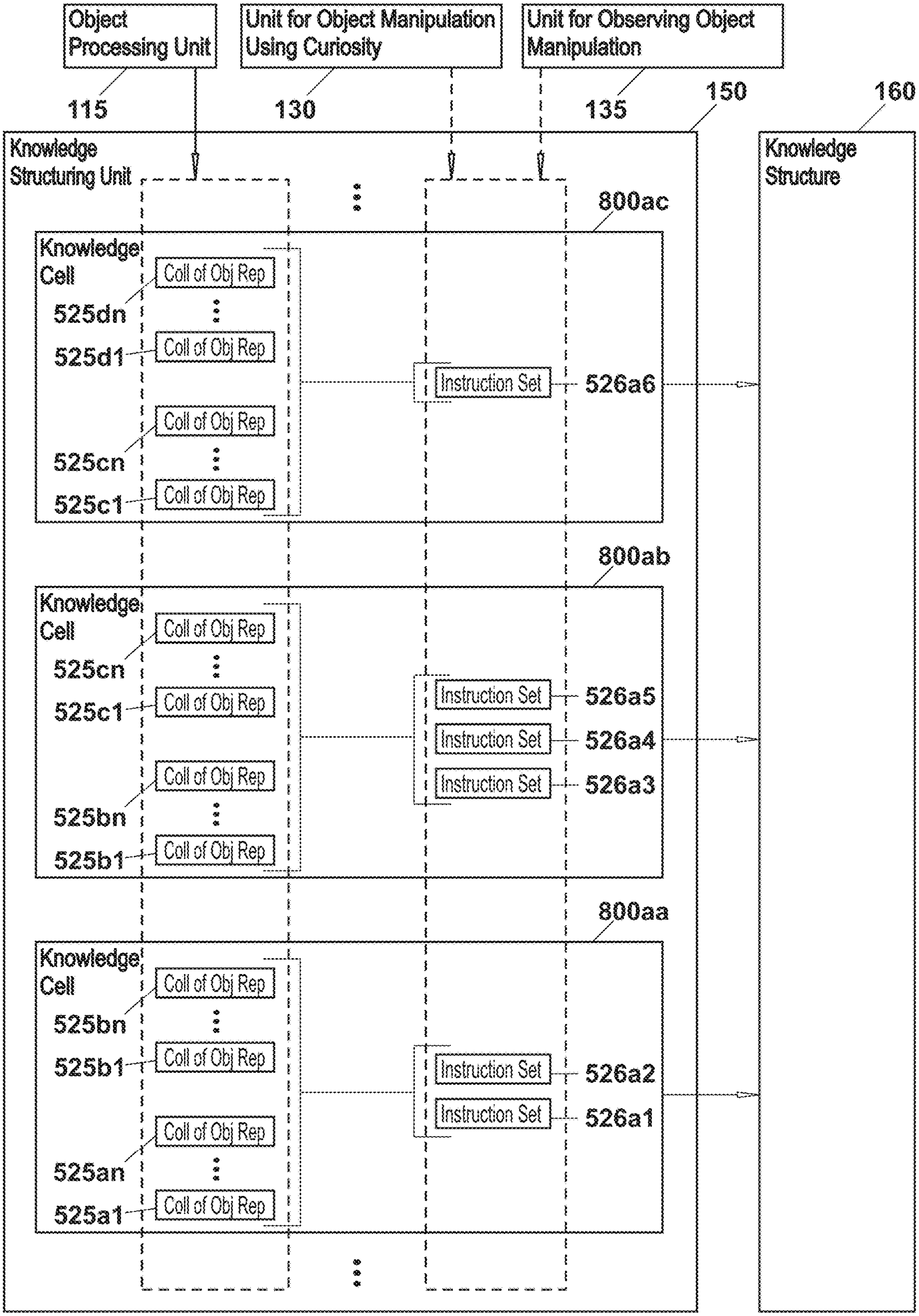

Referring to FIG. 26, an embodiment of Knowledge Structuring Unit 150 providing Knowledge Cells 800 each including a pair of streams of Collections of Object Representations 525 correlated with any Instruction Sets 526 is illustrated. Knowledge Cells 800 can be used in/as neurons, nodes, vertices, or other elements in Knowledge Structure 160. In some aspects, a stream of Collections of Object Representations 525 of a pair of streams of Collections of Object Representations 525 in a Knowledge Cell 800 may represent one or more Objects 615 or one or more Objects 616 in one state, a subsequent stream of Collections of Object Representations 525 of the pair of streams of Collections of Object Representations 525 in the Knowledge Cell 800 may represent one or more Objects 615 or one or more Objects 616 in a subsequent state, and any Instruction Sets 526 correlated with the pair of streams of Collections of Object Representations 525 in the Knowledge Cell 800 may be or include Instruction Sets 526 that would cause the subsequent state of the one or more Objects 615 or one or more Objects 616. For example, Knowledge Structuring Unit 150 may generate Knowledge Cell 800*aa* including a pair of streams of Collections of Object Representations 525*a*1-525*an* and 525*b*1-525*bn* correlated with Instruction Sets 526*a*1-526*a*2, and provide Knowledge Cell 800*aa* to Knowledge Structure 160. Knowledge Structuring Unit 150 may further generate Knowledge Cell 800*ab* including a pair of streams of Collections of Object Representations 525*b*1-525*bn* and 525*c*1-525*cn* correlated with Instruction Sets 526*a*3-526*a*5, and provide Knowledge Cell 800*ab* to Knowledge Structure 160. Knowledge Structuring Unit 150 may further generate Knowledge Cell 800*ac* including a pair of streams of Collections of Object Representations 525*c*1-525*cn* and 525*d*1-525*dn* correlated with Instruction Set 526*a*6, and provide Knowledge Cell 800*ac* to Knowledge Structure 160. Knowledge Structuring Unit 150 may provide any number of Knowledge Cells 800 by following similar logic as described above. In some aspects, Knowledge Structuring Unit 150 may structure within a Knowledge Cell 800 any number of pairs of streams of Collections of Object Representations 525 correlated with any number (including zero [i.e. uncorrelated]) of Instruction Sets 526.

The foregoing embodiments of Knowledge Structuring Unit 150 provide some examples of various data structures or arrangements of elements that can be used including Collections of Object Representations 525, streams of Collections of Object Representations 525, Instruction Sets 526, Knowledge Cells 800, and/or others. One of ordinary skill in art will understand that the aforementioned data structures or arrangements of elements are described merely as examples of a variety of possible implementations, and that while all possible data structures or arrangements of elements are too voluminous to describe, other data structures or arrangements of elements are within the scope of this disclosure. For example, some of the elements can be omitted, used in a different arrangement, or used in combination with other elements. In other aspects, elements within Knowledge Cells 800 can be used in/as neurons, nodes, vertices, or other elements in Knowledge Structure 160, in which case Knowledge Cells 800 as intermediary holders can be omitted. In further aspects, some Collections of Object Representations 525 or streams of Collections of Object Representations 525 may be without a correlated Instruction Set 526 (i.e. uncorrelated, etc.). In further aspects, any stream of Collections of Object Representations **525*a*1-525*an*, 525*b*1-525*bn*, 525*c*1-525*cn*, 525*d*1-525*dn*, etc. may include one Collection of Object Representations 525 or a plurality (i.e. stream, etc.) of Collections of Object Representations 525, and the number of Collections of Object Representations 525 in some or all streams of Collections of Object Representations 525*a*1-525*an*, 525*b*1-525*bn*, 525*c*1-525*cn*, 525*d*1-525*dn*, etc. may be equal or different. In further aspects, Object Representation 625 can be used instead of Collection of Object Representations 525. Any features, functionalities, operations, and/or embodiments described with respect to Collection of Object Representations 525 may similarly apply to Object Representation 625. In further aspects, a stream of Object Representations 625 can be used instead of a stream of Collections of Object Representations 525. Any features, functionalities, operations, and/or embodiments described with respect to a stream of Collections of Object Representations 525 may similarly apply to a stream of Object Representations 625**.

Knowledge Structure 160 comprises functionality for storing knowledge of manipulations of one or more Objects 615 (i.e. physical objects, etc.) and/or manipulations of one or more Objects 616 (i.e. computer generated objects, etc.), and/or other functionalities. Knowledge Structure 160 comprises functionality for storing knowledge of manipulations of one or more Objects 615 (i.e. physical objects, etc.) using curiosity and/or manipulations of one or more Objects 616 (i.e. computer generated objects, etc.) using curiosity, and/or other functionalities. Knowledge Structure 160 comprises functionality for storing knowledge of observed manipulations of one or more Objects 615 (i.e. physical objects, etc.) and/or observed manipulations of one or more Objects 616 (i.e. computer generated objects, etc.), and/or other functionalities. Knowledge Structure 160 comprises functionality for storing Knowledge Cells 800, Collections of Object Representations 525, Object Representations 625, Instruction Sets 526, Extra Info 527, and/or other elements or combination thereof. Such elements may be connected within Knowledge Structure 160. In some designs, Knowledge Structure 160 may store connected Knowledge Cells 800 each including one or more Collections of Object Representations 525, any (i.e. zero, one, or more, etc.) Instruction Sets 526, and/or other elements. In other designs, Collections of Object Representations 525, Instruction Sets 526, and/or other elements of Knowledge Cells 800 can be stored directly within Knowledge Structure 160 without using Knowledge Cells 800 as the intermediary holders, in which case Knowledge Cells 800 can be optionally omitted. In some embodiments, Knowledge Structure 160 may be or include Collection of Sequences **160*a* (later described). In other embodiments, Knowledge Structure 160 may be or include Graph or Neural Network 160*b* (later described). In further embodiments, Knowledge Structure 160 may be or include Collection of Knowledge Cells (not shown, later described). In further embodiments, any Knowledge Structure 160 (i.e. Collection of Sequences 160*a*, Graph or Neural Network 160*b*, Collection of Knowledge Cells, etc.) can be used alone, in combination with other Knowledge Structures 160, or in combination with other elements. In one example, a path in Graph or Neural Network 160*b* may include its own separate sequence of Knowledge Cells 800 that are not connected with Knowledge Cells 800 in other paths. In another example, a part of a path in Graph or Neural Network 160*b* may include a sequence of Knowledge Cells 800 connected with Knowledge Cells 800 in other paths, whereas, another part of the path may include its own separate sequence of Knowledge Cells 800 that are not connected with Knowledge Cells 800 in other paths. In general, Knowledge Structure 160 may be or include any data structure or data arrangement that can enable storing the knowledge of: (i) Device's 98 manipulations of one or more Objects 615 using curiosity, (ii) Avatar's 605 manipulations of one or more Objects 616 using curiosity, (ii) observed manipulations of one or more Objects 615, (iv) observed manipulations of one or more Objects 616, and/or (v) other information. Knowledge Structure 160 may reside locally on Device 98, Computing Device 70, or other local element, or remotely (i.e. remote Knowledge Structure 160, etc.) on a remote computing device (i.e. server, cloud, etc.) accessible over a network or interface. In some aspects, knowledge stored in Knowledge Structure 160 may be referred to as knowledge, artificial knowledge, or other suitable name or reference. In some aspects, Knowledge Cell 800 may be referred to as node, vertex, element, or other similar name, and vice versa, therefore, the two may be used interchangeably herein depending on context. Knowledge Structure 160** may include any hardware, programs, or combination thereof.

In some embodiments, Knowledge Structure 160 and/or other disclosed elements enable imagination (i.e. machine imagination, artificial imagination, etc.). In one example, consideration of multiple connected Knowledge Cells 800 and/or elements thereof enables imagining various states or outcomes. In another example, consideration of multiple paths of connected Knowledge Cells 800 and/or elements thereof beyond the immediate connected Knowledge Cells 800 and/or elements thereof enables imagining various futures or scenarios. In a further example, using coordinates or other location Object Properties 630 of Object Representations 625 representing one or more Objects' 615 or one or more Objects' 616 recent motion in multiple Knowledge Cells 800 and using predictive mathematical or computational techniques such as best fit, trend, curve fitting, linear least squares, non-linear least squares, and/or others enables imagining the one or more Object's 615 or one or more Objects' 616 motions into the future. Similarly, in a further example, using shape, condition, orientation, and/or other Object Properties 630 of Object Representations 625 representing one or more Objects' 615 or one or more Objects' 616 recent transformations in multiple Knowledge Cells 800 and using predictive mathematical or computational techniques enables imagining the one or more Object's 615 or one or more Objects' 616 transformations into the future. In a further example, creation of new Knowledge Cells 800 by modifying (i.e. randomly, in a pattern, using any modification algorithm, etc.) one or more of Collections of Object Representations 525, Object Representations 625, Object Properties 630, Instruction Sets 526, and/or other elements in learned Knowledge Cells 800 enables creation of new imagined knowledge from existing knowledge. In general, Knowledge Structure 160 and/or other disclosed elements enable any type or form of imagination.

In other embodiments, in addition to learned knowledge, Knowledge Structure 160 may include knowledge derived from the learned knowledge using inference, reasoning, and/or other techniques. In one example, inference and/or reasoning may apply mathematical formulas or theorems, estimation/approximation functions, optimization functions, and/or other techniques to existing Knowledge Cells 800 or elements thereof to create derived Knowledge Cells 800. In general, Knowledge Structure 160 may include any learned, imagined, derived, and/or other knowledge. A reference to learned knowledge may include a reference to imagined, derived, and/or other knowledge. Any of the imagined, derived, and/or other knowledge can be used for any of the disclosed and/or other functionalities. In some embodiments, as manipulations of one or more Objects 615 or one or more Objects 616 occur over time and states of the one or more Objects 615 or one or more Objects 616 change over time, Knowledge Structure 160 enables storing such knowledge over time. For example, Collections of Object Representations 525 from at least some consecutive Knowledge Cells 800 in Knowledge Structure 160 may represent chronological states of one or more Objects 615 or one or more Objects 616. In some designs, a chronological order of at least some Knowledge Cells 800 or elements thereof in Knowledge Structure 160 may be indicated by directions of Connections 853 among Knowledge Cells 800 in Graph or Neural Network 160*b* and/or other Knowledge Structures 160. In other designs, a chronological order of at least some Knowledge Cells 800 or elements thereof in Knowledge Structure 160 may be indicated by sequential order of Knowledge Cells 800 implied in the structure of Sequences 163 of Collection of Sequences 160*a*. In further designs, a chronological order of at least some Knowledge Cells 800 or elements thereof in Knowledge Structure 160 can be explicitly recorded in time stamps (not shown), orders (not shown), or other time related information that can be included or associated with Knowledge Cells 800 or elements thereof. Other techniques can also be used to indicate a chronological order of at least some Knowledge Cells 800 or elements thereof in Knowledge Structure 160.

In some embodiments, Knowledge Structure 160 from one Device 98, Avatar 605, LTCUAK Unit 100, or LTOUAK Unit 105 can be used by one or more other Devices 98, Avatars 605, LTCUAK Units 100, or LTOUAK Units 105. Therefore, the knowledge of: (i) Device's 98 manipulations of one or more Objects 615 using curiosity, (ii) Device's 98 observed manipulations of one or more Objects 615, (ii) Avatar's 605 manipulations of one or more Objects 616 using curiosity, and/or (iv) Avatar's 605 observed manipulations of one or more Objects 616 from one Device 98, Avatar 605, LTCUAK Unit 100, or LTOUAK Unit 105 can be transferred to one or more other Devices 98, Avatars 605, LTCUAK Units 100, or LTOUAK Units 105. In one example, Knowledge Structure 160 can be copied or downloaded to a file or other repository from one Device 98, Avatar 605, LTCUAK Unit 100, or LTOUAK Unit 105 and used in/by another Device 98, Avatar 605, LTCUAK Unit 100, or LTOUAK Unit 105. In a further example, Knowledge Structure 160 or knowledge therein from one or more Devices 98, Avatars 605, LTCUAK Units 100, or LTOUAK Units 105 can be available on a server, cloud, or other system accessible by other Devices 98, Avatars 605, LTCUAK Units 100, and/or LTOUAK Units 105 over a network or interface. Once loaded into or accessed by a receiving Device 98, Avatar 605, LTCUAK Unit 100, or LTOUAK Unit 105, the receiving Device 98, Avatar 605, LTCUAK Unit 100, or LTOUAK Unit 105 can then implement the knowledge of: (i) Device's 98 manipulations of one or more Objects 615 using curiosity, (ii) Device's 98 observed manipulations of one or more Objects 615, (ii) Avatar's 605 manipulations of one or more Objects 616 using curiosity, and/or (iv) Avatar's 605 observed manipulations of one or more Objects 616 from the originating Device 98, Avatar 605, LTCUAK Unit 100, or LTOUAK Units 105. In some designs, Knowledge Structure 160 or knowledge therein from one or more Avatars 605 in one Application Program 18 can be used by one or more Avatars 605 or other objects in another Application Program 18. In one example, Knowledge Structure 160 or knowledge therein from one or more Avatars 605 in one video game (i.e. Fortnite, etc.) can be used by one or more Avatars 605 or other objects in another video game (i.e. Half-Life, etc.). In another example, Knowledge Structure 160 or knowledge therein from one or more Avatars 605 in one version of a video game (i.e. Half-Life, etc.) can be used by one or more Avatars 605 or other objects in another version of a video game (i.e. Half-Life 2, etc.).

In some embodiments, multiple Knowledge Structures 160 from multiple different Devices 98, Avatars 605, LTCUAK Units 100, LTOUAK Units 105, and/or other elements can be combined to accumulate collective knowledge. In one example, one Knowledge Structure 160 can be appended to another Knowledge Structure 160 such as appending one Collection of Sequences 160*a* (later described) to another Collection of Sequences 160*a*, appending one Sequence 163 (later described) to another Sequence 163, appending one Collection of Knowledge Cells (not shown, later described) to another Collection of Knowledge Cells, and/or appending other data structures or elements thereof. In another example, one Knowledge Structure 160 can be copied into another Knowledge Structure 160 such as copying one Collection of Sequences 160*a* into another Collection of Sequences 160*a*, copying one Collection of Knowledge Cells into another Collection of Knowledge Cells, and/or copying other data structures or elements thereof. In a further example, in the case of Knowledge Structure 160 being or including Graph or Neural Network 160*b* or graph-like data structure (i.e. neural network, tree, etc.), a union can be utilized to combine two or more Graphs or Neural Networks 160*b* or graph-like data structures. For instance, a union of two Graphs or Neural Networks 160*b* or graph-like data structures may include a union of their vertex (i.e. node, etc.) sets and their edge (i.e. connection, etc.) sets. Any other operations or combination thereof on graphs or graph-like data structures can be utilized to combine Graphs or Neural Networks 160*b* or graph-like data structures. In a further example, one Knowledge Structure 160 can be combined with another Knowledge Structure 160 through later described learning processes where Knowledge Cells 800 or elements thereof from Knowledge Structuring Unit 150 may be applied onto Knowledge Structure 160. In such implementations, instead of Knowledge Cells 800 or elements thereof provided by Knowledge Structuring Unit 150, the learning process may utilize Knowledge Cells 800 or elements thereof from one Knowledge Structure 160 to apply them onto another Knowledge Structure 160. Any other techniques known in art including custom techniques for combining data structures can be utilized for combining Knowledge Structures 160 in alternate implementations. In any of the aforementioned and/or other combining techniques, determining at least partial match of elements (i.e. nodes/vertices, edges/connections, etc.) can be utilized in determining whether an element from one Knowledge Structure 160 matches an element from another Knowledge Structure 160, and at least partially matching or otherwise acceptably similar elements may be considered a match for combining purposes in some designs. Any features, functionalities, and/or embodiments of Comparison 725 (later described) can be used in such match determinations. A combined Knowledge Structure 160 can be offered as a network service (i.e. online application, cloud application, etc.), downloadable file, or other repository to all Devices 98, Avatars 605, LTCUAK Units 100, LTOUAK Units 105, and/or other devices or applications configured to utilize the combined Knowledge Structure 160. In one example, a Device 98 including or interfaced with LTCUAK Unit 100 or LTOUAK Unit 105 having access to a combined Knowledge Structure 160 can use the collective knowledge learned from multiple Devices 98, Avatars 605, LTCUAK Units 100, and/or LTOUAK Units 105 for the Device's 98 manipulations of one or more Objects 615 using the combined knowledge. In another example, an Avatar 605 including or interfaced with LTCUAK Unit 100 or LTOUAK Unit 105 having access to a combined Knowledge Structure 160 can use the collective knowledge learned from multiple Avatars 605, Devices 98, LTCUAK Units 100, and/or LTOUAK Units 105 for the Avatar's 605 manipulations of one or more Objects 616 using the combined knowledge.

Figure 27:
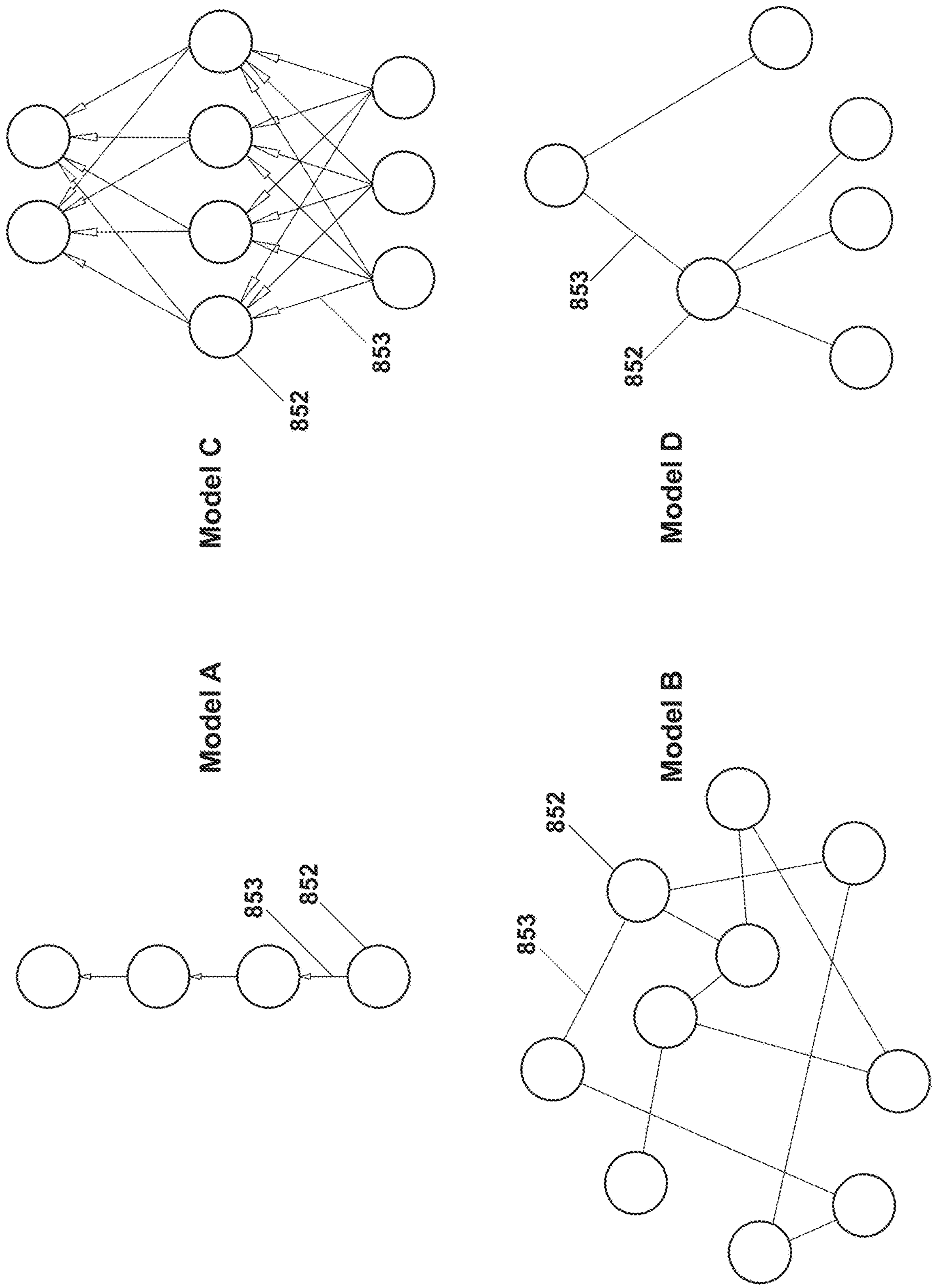
FIG. 27 illustrates various artificial intelligence models and/or techniques that can be utilized.

Referring to FIG. 27, the disclosed systems, devices, and methods may include various artificial intelligence models and/or techniques.

In one example shown in Model A, the disclosed systems, devices, and methods may include a sequence or sequence-like data structure. As such, machine learning, knowledge structuring, knowledge representation, purpose representation, decision making, reasoning, and/or other artificial intelligence functionalities may include a structure of Nodes 852 and/or Connections 853 organized as a sequence. Node 852 may include any data, object, data structure, and/or other item, or reference thereto. In some aspects, Connections 853 may be optionally omitted from a sequence as the sequential order of Nodes 852 in a sequence may be implied in the structure. An exemplary embodiment of a sequence (i.e. Collection of Sequences 160*a*, Sequence 163, etc.) is described later. Any sequence that can facilitate the functionalities described herein can be used.

In another example shown in Model B, the disclosed systems, devices, and methods may include a graph or graph-like data structure (i.e. tree, neural network, etc.). As such, machine learning, knowledge structuring, knowledge representation, purpose representation, decision making, reasoning, and/or other artificial intelligence functionalities may include Nodes 852 (also referred to as vertices or points, etc.) and Connections 853 (also referred to as edges, arrows, lines, arcs, etc.) organized as a graph. In general, any Node 852 in a graph can be connected to any other Node 852. A Connection 853 may include unordered pair of Nodes 852 in an undirected graph or ordered pair of Nodes 852 in a directed graph. Nodes 852 can be part of the graph structure or external entities represented by indices or references. Nodes 852, Connections 853, and/or other elements or operations of a graph may include any features, functionalities, and/or embodiments of the aforementioned Nodes 852, Connections 853, and/or other elements or operations of a sequence, and vice versa. An exemplary embodiment of a graph (i.e. Graph or Neural Network 160*b*, etc.) is described later. Any graph that can facilitate the functionalities described herein can be used.

In another example shown in Model C, the disclosed systems, devices, and methods may include a neural network (also referred to as artificial neural network, etc.). As such, machine learning, knowledge structuring, knowledge representation, purpose representation, decision making, reasoning, and/or other artificial intelligence functionalities may include a network of Nodes 852 (also referred to as neurons, etc.) and Connections 853 similar to that of a brain. Node 852 may include any data, object, data structure, and/or other item, or reference thereto. Node 852 may also include a function for transforming or manipulating any data, object, data structure, and/or other item. Examples of such transformation functions include mathematical functions (i.e. addition, subtraction, multiplication, division, sin, cos, log, derivative, integral, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. Connection 853 may include or be associated with a value such as a symbolic label (i.e. text, etc.) or numeric attribute (i.e. weight, cost, capacity, length, etc.). Connection 853 may also include or be associated with a function. A computational model can be implemented to compute values from inputs based on a pre-programmed or learned function or method. For example, a neural network may include one or more input neurons that can be activated by inputs. Activations of these neurons can then be passed on, weighted, and transformed by a function to other neurons. Neural networks may range from those with only one layer of single direction logic to multi-layer of multi-directional feedback loops. A neural network can learn by input from its environment or from self-teaching using written-in rules. A neural network can use weights to change the parameters of the network's throughput. In some aspects, neural network may use back propagation of errors or other information that adjust values in nodes and/or weights in one or more iterations. In other aspects, neural network may include a convolutional neural network that includes one or more convolution layers. One or more convolution layers may be connected with one or more fully connected layers. In further aspects, neural network may include a recurrent neural network that includes nodes connected in a directed sequence that can be used in processing sequences of data or temporal data. Nodes 852, Connections 853, and/or other elements or operations of a neural network may include any features, functionalities, and/or embodiments of the aforementioned Nodes 852, Connections 853, and/or other elements or operations of a sequence and/or graph, and vice versa. In some aspects, a neural network may be a graph or a subset of a graph, hence, neural network may include any features, functionalities, and/or embodiments of a graph. Any neural network that can facilitate the functionalities described herein can be used.

In a further example shown in Model D, the disclosed systems, devices, and methods may include a tree or tree-like data structure. As such, machine learning, knowledge structuring, knowledge representation, purpose representation, decision making, reasoning, and/or other artificial intelligence functionalities may include Nodes 852 and Connections 853 (also referred to as references, edges, etc.) organized as a tree. In general, a Node 852 in a tree can be connected to any number (i.e. including zero, etc.) of child Nodes 852. Nodes 852, Connections 853, and/or other elements or operations of a tree may include any features, functionalities, and/or embodiments of the aforementioned Nodes 852, Connections 853, and/or other elements or operations of a sequence, graph, and/or neural network, and vice versa. Any tree that can facilitate the functionalities described herein can be used.

In yet another example, the disclosed systems, devices, and methods may include a search-based model and/or technique. As such, machine learning, knowledge structuring, knowledge representation, purpose representation, decision making, reasoning, and/or other artificial intelligence functionalities may include searching through a collection of possible solutions. For instance, a search method can search through a sequence, graph, neural network, tree, or other data structure that includes data elements of interest. A search may use heuristics to limit the search for solutions by eliminating choices that are unlikely to lead to the goal. Heuristic techniques may provide a best guess solution. A search can also include optimization. For example, a search may begin with a guess and then refine the guess incrementally until no more refinements can be made. In a further example, the disclosed systems, devices, and methods may include logic-based model and/or technique. As such, machine learning, knowledge structuring, knowledge representation, purpose representation, decision making, reasoning, and/or other artificial intelligence functionalities can use formal or other type of logic. Logic based models may involve making inferences or deriving conclusions from a set of premises. As such, a logic based system can extend existing knowledge or create new knowledge automatically using inferences. Examples of the types of logic that can be utilized include propositional or sentential logic that comprises logic of statements which can be true or false; first-order logic that allows the use of quantifiers and predicates that can express facts about objects, their properties, and their relations with each other; fuzzy logic that allows degrees of truth to be represented as a value between 0 and 1 rather than simply 0 (false) or 1 (true), which can be used for uncertain reasoning; subjective logic that comprises a type of probabilistic logic that may take uncertainty and belief into account, which can be suitable for modeling and analyzing situations involving uncertainty, incomplete knowledge and different world views; and/or other types of logic. In a further example, the disclosed systems, devices, and methods may include a probabilistic model and/or technique. As such, machine learning, knowledge structuring, knowledge representation, purpose representation, decision making, reasoning, and/or other artificial intelligence functionalities can be implemented to operate with incomplete or uncertain information where probabilities may affect outcomes. Bayesian network, among other models, is an example of a probabilistic tool used for purposes such as reasoning, learning, planning, perception, and/or others. Examples of other artificial intelligence models and/or techniques that can be used in the disclosed systems, devices, and methods include deep learning, supervised learning, unsupervised learning, neural networks (i.e. convolutional neural network, recurrent neural network, deep neural network, spiking neural network, etc.), search-based, logic and/or fuzzy logic-based, optimization-based, any data structure-based, hierarchical, symbolic and/or sub-symbolic, evolutionary, genetic, multi-agent, deterministic, probabilistic, statistical, and/or other models and/or techniques. One of ordinary skill in art will understand that an intelligent system may solve a specific problem by using any model and/or technique that works such as, for example, some systems can be symbolic and logical, some can be sub-symbolic neural networks, some can be deterministic or probabilistic, some can be hierarchical, some may include searching techniques, some may include optimization techniques, while others may use other or a combination of models and/or techniques. Therefore, the disclosed systems, devices, and methods are independent of the artificial intelligence model and/or technique used and any model and/or technique can be used to facilitate the functionalities described herein. One of ordinary skill in art will understand that the aforementioned artificial intelligence models and/or techniques are described merely as examples of a variety of possible implementations, and that while all possible artificial intelligence models and/or techniques are too voluminous to describe, other artificial intelligence models and/or techniques are within the scope of this disclosure.

Figure 28A:
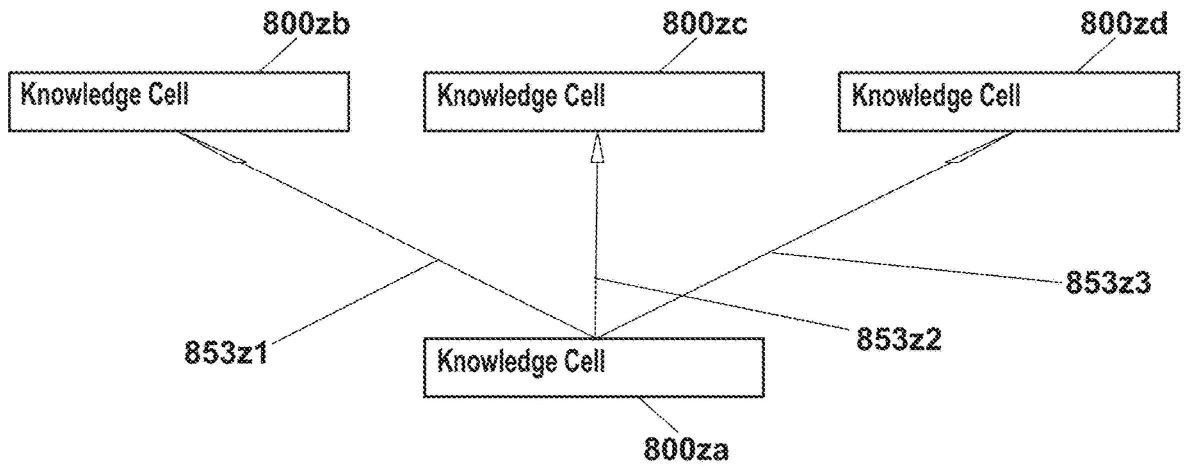
FIG. 28A-28C illustrate some embodiments of connected Knowledge Cells 800.
Figure 28B:
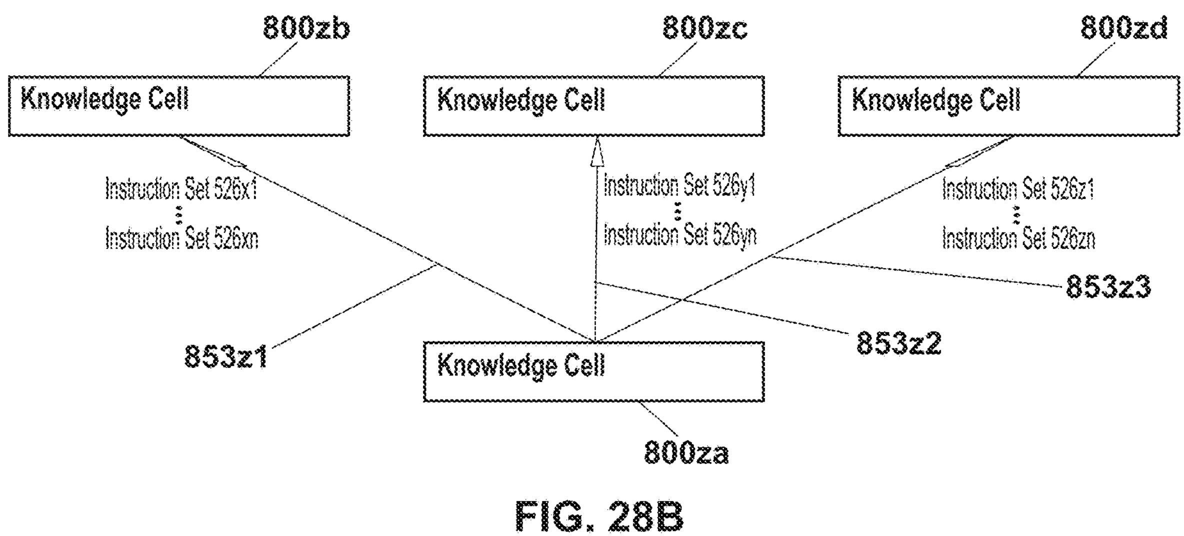
Figure 28C:
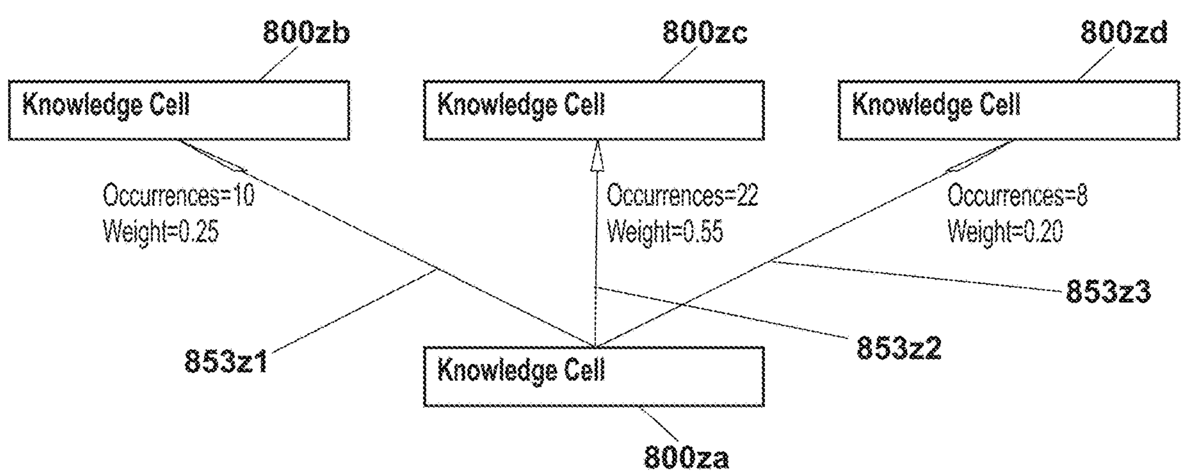

Referring to FIG. 28A-28C, some embodiments of connected Knowledge Cells 800 are illustrated. Such connected Knowledge Cells 800 can be used in any Knowledge Structure 160 (i.e. Collection of Sequences 160*a*, Graph or Neural Network 160*b*, Collection of Knowledge Cells [not shown], etc.). In an embodiment shown in FIG. 28A, Knowledge Cell 800*za* may be connected with Knowledge Cell 800*zb*, Knowledge Cell 800*zc*, and Knowledge Cell 800*zd* by Connections 853*z*1, 853*z*2, and 853*z*3, respectively. In such embodiments, Knowledge Cells 800*za*-800*zd* may include one or more Collections of Object Representations 525 correlated with any Instruction Sets 526, for example, as previously described. In an embodiment shown in FIG. 28B, Knowledge Cells 800*za*-800*zd* may include one or more Collections of Object Representations 525 whereas Connections 853*z*1-853*z*3 may include or be associated with Instruction Sets 526, for example, as previously described. In an embodiment shown in FIG. 28C, Connections 853*z*1-853*z*3 may include or be associated with occurrence count, weight, and/or other parameter or data. In some aspects, occurrence count may track or store the number of observations that a Knowledge Cell 800 was followed by another Knowledge Cell 800 indicating a connection or relationship between them. Weight can be calculated or determined as the number of occurrences of a Connection 853 divided by the sum of occurrences of all Connections 853 originating from a Knowledge Cell 800. Therefore, the sum of weights of Connections 853 originating from a Knowledge Cell 800 may equal to 1 or 100%. Knowledge Cells 800, Connections 853, and/or other elements that make up Knowledge Structure 160 may include or be associated with other additional elements, or some of the elements can be excluded, or a combination thereof can be utilized in alternate embodiments. Any features, functionalities, and/or embodiments described with respect to Knowledge Cells 800, Connections 853, and/or other elements in Knowledge Structure 160 can similarly be used with respect to Purpose Representations 162, Connections 853, and/or other elements in Purpose Structure 161.

Figure 29:
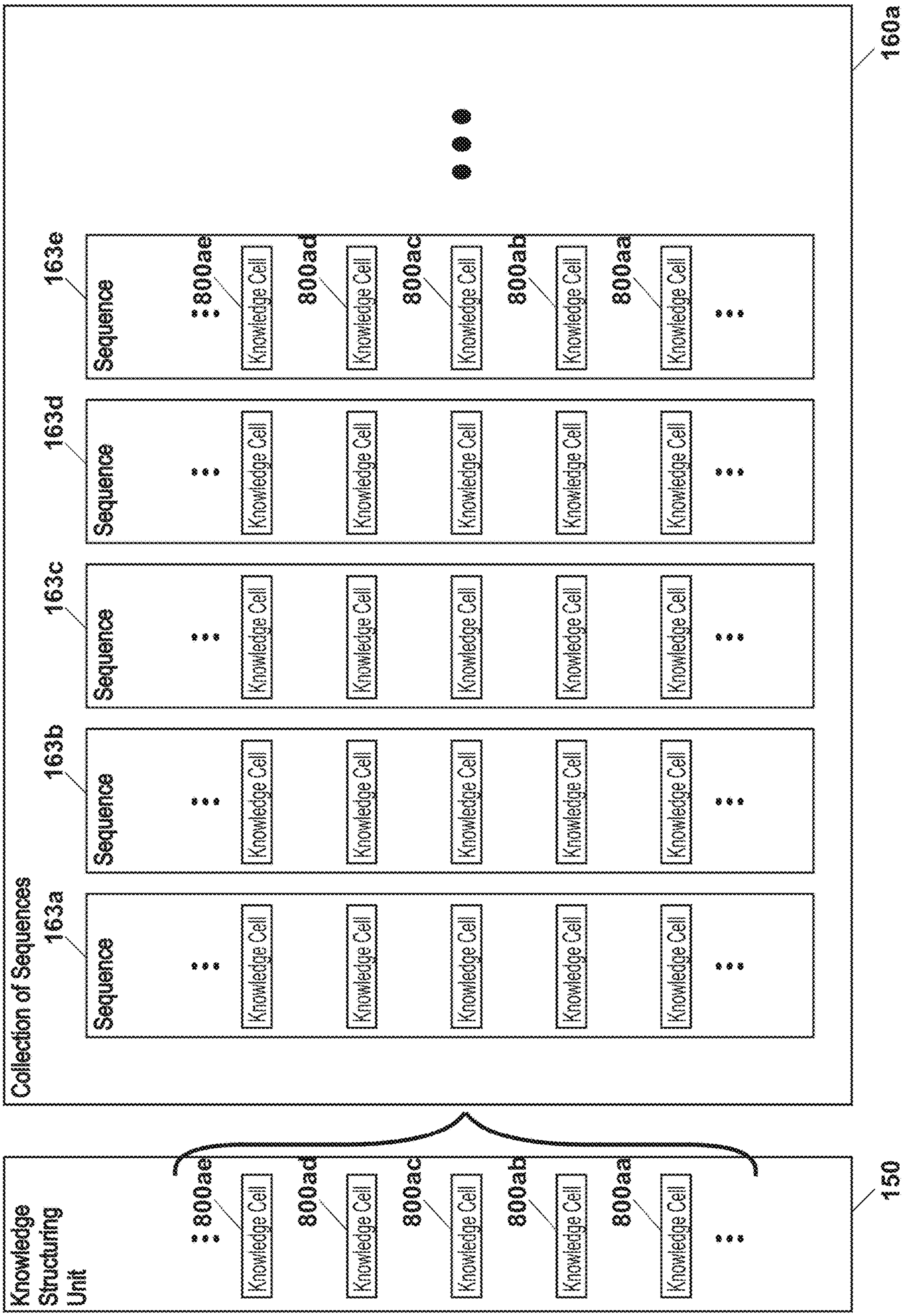
FIG. 29 illustrates an embodiment of utilizing Collection of Sequences 160*a* in learning manipulations.

Referring to FIG. 29, an embodiment of utilizing Collection of Sequences 160*a* in learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616 is illustrated. Collection of Sequences 160*a* may include one or more Sequences 163. Sequence 163 may include any number of Knowledge Cells 800 and/or other elements. In some aspects, Sequence 163 may include Knowledge Cells 800 relating to a single manipulation of one or more Objects 615 or single manipulation of one or more Objects 616. In other aspects, Sequence 163 may include Knowledge Cells 800 relating to multiple manipulations of one or more Objects 615 or multiple manipulations of one or more Objects 616. In further aspects, Sequence 163 may include Knowledge Cells 800 relating to all manipulations of one or more Objects 615 or all manipulations of one or more Objects 616 in which case Collection of Sequences 160*a* as a distinct element can be optionally omitted. In further aspects, Connections 853 can optionally be used in Sequence 163 to connect Knowledge Cells 800. For example, a Knowledge Cell 800 can be connected not only with a next Knowledge Cell 800 in Sequence 163, but also with any other Knowledge Cell 800 in Sequence 163, thereby creating alternate routes or shortcuts through the Sequence 163. Any number of Connections 853 connecting any Knowledge Cells 800 can be utilized.

In some embodiments, Knowledge Cells 800 can be applied onto Collection of Sequences 160*a* individually or collectively in a learning or training process. For instance, Knowledge Structuring Unit 150 generates Knowledge Cells 800 and the system applies them onto Collection of Sequences 160*a*, thereby implementing learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616. In some aspects, the system can perform Comparisons 725 (later described) of Knowledge Cells 800 from Knowledge Structuring Unit 150 with Knowledge Cells 800 in Sequences 163 of Collection of Sequences 160*a* to find a Sequence 163 comprising Knowledge Cells 800 that at least partially match the Knowledge Cells 800 from Knowledge Structuring Unit 150. If Sequence 163 comprising such at least partially matching Knowledge Cells 800 is not found in Collection of Sequences 160*a*, the system may generate a new Sequence 163 comprising the Knowledge Cells 800 from Knowledge Structuring Unit 150 and insert the new Sequence 163 into Collection of Sequences 160*a*. On the other hand, if Sequence 163 comprising such at least partially matching Knowledge Cells 800 is found in Collection of Sequences 160*a*, the system may optionally omit inserting the Knowledge Cells 800 from Knowledge Structuring Unit 150 into Collection of Sequences 160*a* as inserting a similar Sequence 163 may not add much or any additional knowledge. This approach can save storage resources and limit the number of elements that may later need to be processed or compared. For example, the system can perform Comparisons 725 of Knowledge Cells 800*aa*-800*ae* from Knowledge Structuring Unit 150 with Knowledge Cells 800 from Sequences 163*a*-163*d*, etc. of Collection of Sequences 160*a*. In the case that a Sequence 163 comprising at least partially matching Knowledge Cells 800 is not found in Collection of Sequences 160*a*, the system may create a new Sequence 163*e* comprising Knowledge Cells 800*aa*-800*ae* from Knowledge Structuring Unit 150 and insert the new Sequence 163*e* into Collection of Sequences 160*a*. In some designs, the system can traverse Sequences 163 of Collection of Sequences 160*a* and perform Comparisons 725 of Knowledge Cells 800 from Knowledge Structuring Unit 150 with Knowledge Cells 800 in subsequences of Sequences 163 to find a subsequence comprising Knowledge Cells 800 that at least partially match the Knowledge Cells 800 from Knowledge Structuring Unit 150.

Figure 30:
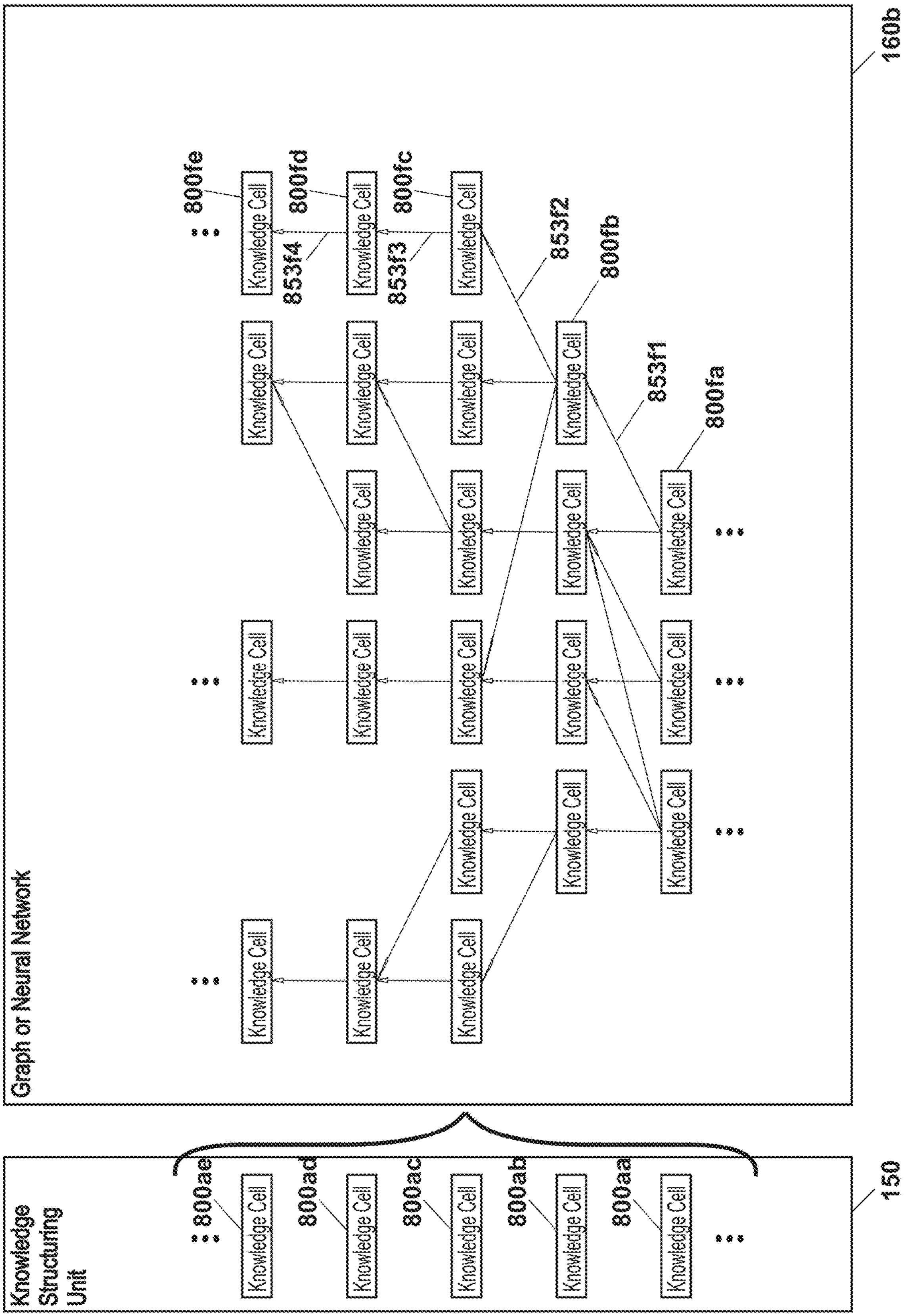
FIG. 30 illustrates an embodiment of utilizing Graph or Neural Network 160*b* in learning manipulations.

Referring to FIG. 30, an embodiment of utilizing Graph or Neural Network 160*b* in learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616 is illustrated. Graph or Neural Network 160*b* may include a number of Nodes 852 (i.e. also may be referred to as nodes, neurons, vertices, or other suitable names or references, etc.) connected by Connections 853. Knowledge Cells 800 are shown instead of Nodes 852 to simplify illustration as Node 852 may include Knowledge Cell 800 and/or other elements or functionalities. Therefore, Knowledge Cells 800 and Nodes 852 can be used interchangeably herein depending on context. In some designs, Graph or Neural Network 160*b* may be or include an unstructured graph where any Knowledge Cell 800 can be connected to any one or more Knowledge Cells 800, and/or itself. In other designs, Graph or Neural Network 160*b* may be or include a directed graph where Knowledge Cells 800 can be connected to other Knowledge Cells 800 using directed Connections 853. In further designs, Graph or Neural Network 160*b* may be or include any type or form of a graph such as unstructured graph, directed graph, undirected graph, cyclic graph, acyclic graph, custom graph, other graph, and/or those known in art. In further designs, Graph or Neural Network 160*b* may be or include any type or form of a neural network such as a feed-forward neural network, a back-propagating neural network, a recurrent neural network, a convolutional neural network, a deep neural network, a spiking neural network, a custom neural network, others, and/or those known in art. Any combination of Knowledge Cells 800, Connections 853, and/or other elements or techniques can be implemented in various embodiments of Graph or Neural Network 160*b*. Graph or Neural Network 160*b* may refer to a graph, a neural network, or any combination thereof. In some aspects, a neural network may be a subset of a general graph as a neural network may include a graph of neurons or nodes.

In some embodiments, Knowledge Cells 800 can be applied onto Graph or Neural Network 160*b* individually or collectively in a learning or training process. For instance, Knowledge Structuring Unit 150 generates Knowledge Cells 800 and the system applies them onto Graph or Neural Network 160*b*, thereby implementing learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616. The system can perform Comparisons 725 (later described) of a Knowledge Cell 800 from Knowledge Structuring Unit 150 with Knowledge Cells 800 in Graph or Neural Network 160*b*. If at least partially matching Knowledge Cell 800 is not found, the system may insert the Knowledge Cell 800 from Knowledge Structuring Unit 150 into Graph or Neural Network 160*b*, and create a Connection 853 to the inserted Knowledge Cell 800 from a prior Knowledge Cell 800. On the other hand, if at least partially matching Knowledge Cell 800 is found, the system may optionally omit inserting the Knowledge Cell 800 from Knowledge Structuring Unit 150 as inserting a similar Knowledge Cell 800 may not add much or any additional knowledge to Graph or Neural Network 160*b*. For example, the system can perform Comparisons 725 of Knowledge Cell 800*aa* from Knowledge Structuring Unit 150 with Knowledge Cells 800 in Graph or Neural Network 160*b*. In the case that at least partial match is determined between Knowledge Cell 800*aa* and Knowledge Cell 800*fa*, the system may perform no action. The system can then perform Comparisons 725 of Knowledge Cell 800*ab* from Knowledge Structuring Unit 150 with Knowledge Cells 800 in Graph or Neural Network 160*b*. In the case that at least partial match is determined between Knowledge Cell 800*ab* and Knowledge Cell 800*fb*, the system may perform no action. The system can then perform Comparisons 725 of Knowledge Cell 800*ac* from Knowledge Structuring Unit 150 with Knowledge Cells 800 in Graph or Neural Network 160*b*. In the case that at least partial match is not determined, the system may insert Knowledge Cell 800*ac* (i.e. the inserted Knowledge Cell 800*ac* may be referred to as Knowledge Cell 800*fc* for clarity and alphabetical order, etc.) into Graph or Neural Network 160*b*. The system may also create Connection 853*f*2 between Knowledge Cell 800*fb* and Knowledge Cell 800*fc*. The system can then perform Comparisons 725 of Knowledge Cell 800*ad* from Knowledge Structuring Unit 150 with Knowledge Cells 800 in Graph or Neural Network 160*b*. In the case that at least partial match is not determined, the system may insert Knowledge Cell 800*ad* (i.e. the inserted Knowledge Cell 800*ad* may be referred to as Knowledge Cell 800*fd* for clarity and alphabetical order, etc.) into Graph or Neural Network 160*b*. The system may also create Connection 853*f*3 between Knowledge Cell 800*fc* and Knowledge Cell 800*fd*. The system can then perform Comparisons 725 of Knowledge Cell 800*ae* from Knowledge Structuring Unit 150 with Knowledge Cells 800 in Graph or Neural Network 160*b*. In the case that at least partial match is not determined, the system may insert Knowledge Cell 800*ae* (i.e. the inserted Knowledge Cell 800*ae* may be referred to as Knowledge Cell 800*fe* for clarity and alphabetical order, etc.) into Graph or Neural Network 160*b*. The system may also create Connection 853*f*4 between Knowledge Cell 800*fd* and Knowledge Cell 800*fe*. Applying any additional Knowledge Cells 800 from Knowledge Structuring Unit 150 onto Graph or Neural Network 160*b* may follow similar logic or process as the above-described.

In some embodiments, Collection of Knowledge Cells (not shown) can be utilized for learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616. Collection of Knowledge Cells may include any number of Knowledge Cells 800. Knowledge Cells 800 in Collection of Knowledge Cells may be unconnected. In some aspects, Knowledge Cells 800 can be applied onto Collection of Knowledge Cells individually or collectively in a learning or training process. For instance, Knowledge Structuring Unit 150 generates Knowledge Cells 800 and the system applies them onto Collection of Knowledge Cells, thereby implementing learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616. The system can perform Comparisons 725 (later described) of a Knowledge Cell 800 from Knowledge Structuring Unit 150 with Knowledge Cells 800 in Collection of Knowledge Cells. If at least partially matching Knowledge Cell 800 is not found in Collection of Knowledge Cells, the system may insert the Knowledge Cell 800 from Knowledge Structuring Unit 150 into the Collection of Knowledge Cells. On the other hand, if at least partially matching Knowledge Cell 800 is found in Collection of Knowledge Cells, the system may optionally omit inserting the Knowledge Cell 800 from Knowledge Structuring Unit 150 as inserting a similar Knowledge Cell 800 may not add much or any additional knowledge to Collection of Knowledge Cells. Any of the previously described and/or other techniques for comparing, inserting, updating, and/or other operations on Knowledge Cells 800 and/or other elements can similarly be utilized in Collection of Knowledge Cells.

The foregoing embodiments provide examples of utilizing various Knowledge Structures 160 (i.e. Collection of Sequences 160*a*, Graph or Neural Network 160*b*, Collection of Knowledge Cells [not shown], etc.), Knowledge Cells 800, Connections 853 where applicable, Comparisons 725, and/or other elements or techniques in learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616. Any of these elements and/or techniques can be omitted, used in a different combination, or used in combination with other elements and/or techniques. In some aspects, the term apply or applying may refer to storing, copying, inserting, updating, or other suitable operation, therefore, these terms may be used interchangeably herein depending on context. In other aspects, Knowledge Cells 800 can be omitted, in which case elements (i.e. Collections of Object Representations 525, Instruction Sets 526, etc.) of Knowledge Cells 800, instead of Knowledge Cells 800 themselves, can be utilized as Nodes 852 in Knowledge Structure 160. In further aspects, although, Extra Info 527 is not shown in some figures for clarity of illustration, it should be noted that any Knowledge Cell 800, Collection of Object Representations 525, Object Representation 625, Instruction Set 526, and/or other element may include or be associated with Extra Info 527 and Extra Info 527 can be used for enhanced decision making and/or other functionalities. In further aspects, Graph or Neural Network 160*b* may optionally include a number of layers or levels each of which may include one or more Knowledge Cells 800. It should be understood that, in some implementations where layered or leveled Graph or Neural Network 160*b* are used, Knowledge Cells 800 in one layer or level of Graph or Neural Network 160*b* need not be connected only with Knowledge Cells 800 in a successive layer or level, but also in any other layer or level, thereby creating shortcut Connections 853 through Graph or Neural Network 160*b*. Shortcut Connections 853 enable a wider variety of Knowledge Cells 800 to be considered when selecting a path through Graph or Neural Network 160*b*. In further aspects, traversing of Knowledge Structures 160, Knowledge Cells 800, and/or other elements can be utilized. In one example, the system can traverse Collection of Sequences 160*a* to find a subsequence of a Sequence 163 comprising Knowledge Cells 800 that at least partially match the Knowledge Cells 800 from Knowledge Structuring Unit 150. In another example, the system can traverse layers or levels of a neural network or layered/leveled Graph or Neural Network 160*b* to find a Knowledge Cell 800 that at least partial matches the Knowledge Cell 800 from Knowledge Structuring Unit 150. Any of the known or other traversing patterns or techniques can be utilized such as linear, divide and conquer, recursive, and/or others. In further aspects, instead of searching for at least partially matching Knowledge Cell 800 in the entire Graph or Neural Network 160*b*, the system may first attempt to find at least partially matching Knowledge Cell 800 in Knowledge Cells 800 connected to a prior at least partially matching Knowledge Cell 800, thereby gaining efficiency.

In further aspects, as history of Knowledge Cells 800, Collections of Object Representations 525, and/or other elements becomes available, the history can be used in collective Comparisons 725. For example, as history of incoming Knowledge Cells 800 from Knowledge Structuring Unit 150 becomes available, the system can perform Comparisons 725 of the history of Knowledge Cells 800 or elements thereof from Knowledge Structuring Unit 150 with Knowledge Cells 800 or elements thereof from Knowledge Structure 160. In further aspects, it should be noted that any Knowledge Cell 800 may include one Collection of Object Representations 525 or a plurality (i.e. stream, etc.) of Collections of Object Representations 525. It should also be noted that any Knowledge Cell 800 may include no Instruction Sets 526, one Instruction Set 526, or a plurality of Instruction Sets 526. In further aspects, various arrangements of Collections of Object Representations 525 and/or other elements in a Knowledge Cell 800 can be utilized. In one example, Knowledge Cell 800 may include one or more Collections of Object Representations 525 correlated with any Instruction Sets 526. In another example, Knowledge Cell 800 may include one or more Collections of Object Representations 525, whereas, any Instruction Sets 526 may be included in or associated with Connections 853 among Knowledge Cells 800 where applicable. In a further example, Knowledge Cell 800 may include a pair of one or more Collections of Object Representations 525 correlated with any Instruction Sets 526. In further aspects, any time that at least partially matching one or more Knowledge Cells 800 or elements thereof are not found in any of the considered Knowledge Cells 800 from Knowledge Structure 160, the system can decide to look for at least partially matching one or more Knowledge Cells 800 or elements thereof in Knowledge Cells 800 elsewhere in Knowledge Structure 160. In further aspects, at least partially matching one or more Knowledge Cells 800 or elements thereof may be found in multiple Knowledge Cells 800 from Knowledge Structure 160, in which case the system may select for consideration Knowledge Cell 800 with highest match index or similarity. In further aspects where at least partially matching one or more Knowledge Cells 800 or elements thereof are found in multiple Knowledge Cells 800, the system may select for consideration some or all of the multiple Knowledge Cells 800. In further aspects, the aforementioned embodiments describe performing multiple (i.e. four, etc.) successive manipulations of one or more Objects 616 using curiosity and applying Knowledge Cells 800 related thereto onto Knowledge Structure 160. It should be noted that any number, including one, of manipulations of one or more Objects 616 using curiosity can be performed and Knowledge Cells 800 related thereto applied onto Knowledge Structure 160. In further aspects, a traditional neural network can be used where Knowledge Cells 800, its elements (i.e. Collections of Object Representations 525, Object Representations 625, Object Properties 630, etc.), and/or other elements are applied to the input nodes, values of nodes and/or connections in hidden layers are assigned and/or adjusted in a learning process, and Instruction Sets 526 are applied to output layers. In further aspects, a convolutional neural network can be used where Knowledge Cells 800, its elements (i.e. Collections of Object Representations 525, Object Representations 625, Object Properties 630, etc.), and/or other elements are applied to the input nodes, values and/or elements are stored in convolution and/or fully connected layers, values of nodes and/or connections in convolution and/or fully connected layers are assigned and/or adjusted in a learning process, and Instruction Sets 526 are applied to output layers. In further aspects, other neural networks (i.e. recurrent neural networks, long-short memory, spiking neural networks, gate neural networks, etc.) and/or data structures (i.e. graphs, trees, etc.) can be used with similar techniques. In further designs, as applicable to neural networks, back-propagation of any data or information can be implemented. In one example, back-propagation of similarity (i.e. match index, etc.) of compared Knowledge Cells 800 can be implemented. In another example, back-propagation of differences can be implemented. In a further example, back-propagation of errors can be implemented. In further aspects, any features, functionalities, and/or embodiments of Comparison 725, importance index (later described), match index (later described), difference index (later described), and/or other elements and/or techniques can be utilized to facilitate determination of at least partial match. In further aspects, Connections 853, where applicable, may optionally include or be associated with occurrence count, weight, and/or other parameter or data. One of ordinary skill in art will understand that the foregoing embodiments are described merely as examples of a variety of possible implementations of learning: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, or (iv) observed manipulations of one or more Objects 616, and that while all of their variations are too voluminous to describe, they are within the scope of this disclosure.

Figure 31A:
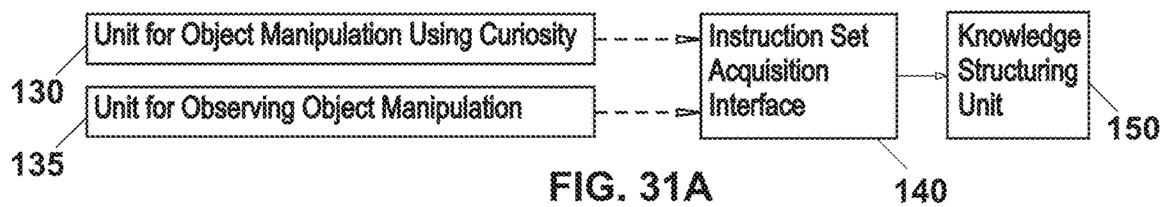
FIG. 31A-31D illustrate some embodiments of Instruction Set Acquisition Interface 140.

Referring to FIG. 31A-31D, some embodiments of Instruction Set Acquisition Interface 140 are illustrated. Referring to FIG. 31A, an embodiment of Instruction Set Acquisition Interface 140 is illustrated. Instruction Set Acquisition Interface 140 comprises functionality for acquiring Instruction Sets 526, data, and/or other information, and/or other functionalities. Such Instruction Sets 526, data, and/or other information may include Instruction Sets 526, data, and/or other information: (i) used or executed in Device's 98 manipulations of one or more Objects 615 (i.e. physical objects, etc.) using curiosity, (ii) determined that would cause Device 98 to perform observed manipulations of one or more Objects 615, (iii) used or executed in Avatar's 605 manipulations of one or more Objects 616 (i.e. computer generated objects, etc.) using curiosity, or (iv) determined that would cause Avatar 605 to perform observed manipulations of one or more Objects 616. In some embodiments where Unit for Object Manipulation Using Curiosity 130 or Unit for Observing Object Manipulation 135 may not be configured to provide or output Instruction Sets 526, data, and/or other information, Instruction Set Acquisition Interface 140 can be utilized to acquire such Instruction Sets 526, data, and/or other information. In one example, as Unit for Object Manipulation Using Curiosity 130 causes Instruction Sets 526 to be executed in: Device's 98 manipulations of one or more Objects 615 using curiosity, or Avatar's 605 manipulations of one or more Objects 616 using curiosity, Instruction Set Acquisition Interface 140 may acquire the Instruction Sets 526. In another example, as Unit for Observing Object Manipulation 135 determines Instruction Sets 526 that would cause: Device 98 to perform observed manipulations of one or more Objects 615, or Avatar 605 to perform observed manipulations of one or more Objects 616, Instruction Set Acquisition Interface 140 may acquire the Instruction Sets 526. In some embodiments, Instruction Set Acquisition Interface 140 can acquire Instruction Sets 526, data, and/or other information from Unit for Object Manipulation Using Curiosity 130 or Unit for Observing Object Manipulation 135. In other embodiments, Instruction Set Acquisition Interface 140 can acquire Instruction Sets 526, data, and/or other information from Application Program 18 as the Instruction Sets 526, data, and/or other information are used or executed in Application Program 18. In further embodiments, Instruction Set Acquisition Interface 140 can acquire Instruction Sets 526, data, and/or other information from Device 98 as the Instruction Sets 526, data, and/or other information are used or executed by Device 98. In further embodiments, Instruction Set Acquisition Interface 140 can acquire Instruction Sets 526, data, and/or other information from Avatar 605 as the Instruction Sets 526, data, and/or other information are used or executed by Avatar 605. In further embodiments, Instruction Set Acquisition Interface 140 can acquire Instruction Sets 526, data, and/or other information from Processor 11 as the Instruction Sets 526, data, and/or other information are used or executed by Processor 11. In general, Instruction Set Acquisition Interface 140 can acquire Instruction Sets 526, data, and/or other information from any processing elements where the Instruction Sets 526, data, and/or other information are used or executed. In one example, Instruction Set Acquisition Interface 140 can access, read, and/or perform other operations on memory, storage, and/or other repository. In another example, Instruction Set Acquisition Interface 140 can access, read, and/or perform other operations on file, object, data structure, and/or other data arrangement. In a further example, Instruction Set Acquisition Interface 140 can access, read, and/or perform other operations on Application Program 18 and/or Avatar 605. In a further example, Instruction Set Acquisition Interface 140 can access, read, and/or perform other operations on Processor 11 registers and/or other Processor 11 components. In a further example, Instruction Set Acquisition Interface 140 can access, read, and/or perform other operations on inputs and/or outputs of Unit for Object Manipulation Using Curiosity 130, Processor 11, and/or other processing element. In a further example, Instruction Set Acquisition Interface 140 can access, read, and/or perform other operations on runtime engine/environment, virtual machine, operating system, compiler, interpreter, translator, execution stack, and/or other computing system elements. In a further example, Instruction Set Acquisition Interface 140 can access, read, and/or perform other operations on functions, methods, procedures, routines, subroutines, and/or other elements of Unit for Object Manipulation Using Curiosity 130, Unit for Observing Object Manipulation 135, or any application program. In a further example, Instruction Set Acquisition Interface 140 can access, read, and/or perform other operations on source code, bytecode, compiled/interpreted/translated code, machine code, and/or other code. In a further example, Instruction Set Acquisition Interface 140 can access, read, and/or perform other operations on values, variables, parameters, and/or other data or information. Instruction Set Acquisition Interface 140 comprises functionality for acquiring Instruction Sets 526, data, and/or other information at runtime. Instruction Set Acquisition Interface 140 further comprises functionality for attaching to or interfacing with Unit for Object Manipulation Using Curiosity 130, Unit for Observing Object Manipulation 135, Device 98, Application Program 18, Avatar 605, Processor 11, and/or other processing element as applicable. Instruction Set Acquisition Interface 140 may include any features, functionalities, and/or embodiments of Instruction Set Implementation Interface 180 (later described), and vice versa. Instruction Set Acquisition Interface 140 may include any hardware, programs, or combination thereof.

In some embodiments, acquiring Instruction Sets 526, data, and/or other information can be implemented at least in part through tracing. Tracing may include acquiring Instruction Sets 526, data, and/or other information from an application program (i.e. some embodiments of Unit for Object Manipulation Using Curiosity 130, some embodiments of Unit for Observing Object Manipulation 135, Application Program 18, Avatar 605, and/or other element, etc.), processor, and/or other processing element. Tracing can be performed at runtime. For example, Instruction Set Acquisition Interface 140 can utilize tracing of Unit for Object Manipulation Using Curiosity 130, Unit for Observing Object Manipulation 135, Application Program 18, Avatar 605, Processor 11, and/or other processing element to acquire Instruction Sets 526, data, and/or other information (i) used or executed in Device's 98 manipulations of one or more Objects 615 (i.e. physical objects, etc.) using curiosity, (ii) determined that would cause Device 98 to perform observed manipulations of one or more Objects 615, (iii) used or executed in Avatar's 605 manipulations of one or more Objects 616 (i.e. computer generated objects, etc.) using curiosity, or (iv) determined that would cause Avatar 605 to perform observed manipulations of one or more Objects 616. In some aspects, Processor 11 or other hardware element can be traced by physically connecting to Processor 11 or other hardware element, or components thereof (later described). In other aspects, Processor 11 or other hardware element can be traced programmatically (later described). In further aspects, an application program such as some embodiments of Unit for Object Manipulation Using Curiosity 130, some embodiments of Unit for Observing Object Manipulation 135, Application Program 18, Avatar 605, and/or other element can be traced by instrumentation. Instrumentation of an application program may include inserting or injecting instrumentation code into the application program. Instrumentation may also sometimes involve overwriting or rewriting existing code, branching to an external code or function, and/or other manipulations of an application program. In some designs, instrumentation can be performed automatically (i.e. automatic instrumentation, etc.). For example, Instruction Set Acquisition Interface 140 can instrument a function call in the source code of Unit for Object Manipulation Using Curiosity 130, Unit for Observing Object Manipulation 135, Application Program 18, Avatar 605, and/or other element by inserting instrumentation code after the function call as follows in a context of a device:

```
Device.arm.push (forward, 0.35);
traceApplication ('Device.arm.push (forward, 0.35);');
```

or as follows in a context of an avatar:

```
Avatar.arm.push (forward, 0.35);
traceApplication ('Avatar.arm.push (forward, 0.35);');
```

Alternatively, instrumentation code can be placed immediately before the function call, or at the beginning, end, or anywhere within the function itself. In response to executing the instrumentation code, Instruction Set Acquisition Interface 140 can acquire trace information (i.e. Instruction Sets 526, data, and/or other information. In other designs, instrumentation can be performed dynamically (i.e. dynamic instrumentation, etc.), which includes a type of automatic instrumentation that is performed at runtime. Dynamic instrumentation may include just-in-time (JIT) instrumentation. In further designs, instrumentation can be performed manually (i.e. manual instrumentation, etc.) by a programmer. Instrumentation may include various techniques depending on implementation. In some implementations, instrumentation can be performed in source code, bytecode, compiled/interpreted/translated code, machine code, and/or other code. In other implementations, instrumentation can be performed at various granularities or code segments such as some or all functions/routines/subroutines, some or all lines of code, some or all statements, some or all instructions or instruction sets, some or all basic blocks, and/or some or all other code segments. In further implementations, instrumentation can be performed at various points of interest in an application program such as function calls, function entries, function exits, object creations, object destructions, event handler calls, and/or other points of interest. In further implementations, instrumentation can be performed in various elements of application program (i.e. some embodiments of Unit for Object Manipulation Using Curiosity 130, some embodiments of Unit for Observing Object Manipulation 135, Application Program 18, Avatar 605, and/or other element, etc.) such as objects, data structures, event handlers, and/or other elements. In further implementations, instrumentation can be performed at various times in an application program's creation or execution such as at source code write/edit time, compile/interpretation/translation time, linking time, loading time, runtime, just-in-time, and/or other times. In further implementations, instrumentation can be performed in various elements of a computing system such as runtime engine/environment, virtual machine, operating system, compiler, interpreter, translator, and/or other elements. In further implementations, instrumentation can be performed in various repositories such as memory, storage, and/or other repositories. In further implementations, instrumentation can be performed in various abstraction layers of a computing system such as in software layer, in virtual machine (if VM is used), in operating system, in processor, and/or in other abstraction layers that may exist in a particular computing system implementation. In general, instrumentation can be performed anywhere where Instruction Sets 526, data, and/or other information are used or executed. Any instrumentation technique known in art can be utilized herein.

In some embodiments, acquiring Instruction Sets 526, data, and/or other information can be implemented at least in part through the .NET platform's tools for application program tracing or profiling. In some aspects, the .NET platform's System.Diagnostics. Trace, System. Diagnostics. TraceSource, System. Diagnostics. Debug, System.Diagnostics.Process, System.Diagnostics.EventLog, System.Diagnostics.PerformanceCounter, and/or other classes enable creation of trace switches that can output an application program's (i.e. some embodiments of Unit for Object Manipulation Using Curiosity 130, some embodiments of Unit for Observing Object Manipulation 135, Application Program 18, Avatar 605, and/or other element, etc.) trace information. The classes also enable creation of a listener that can facilitate receiving the outputted trace information. In other aspects, the .NET platform's Profiling API enables creation of a custom profiler for tracing, instrumentation, monitoring, interfacing with, and/or performing other operations on a profiled application program. The Profiling API provides methods to notify the profiler of events in the profiled application program. The Profiling API also provides methods to enable the profiler to call back into the profiled application program to acquire information about the profiled application program. The Profiling API further provides call stack profiling functionalities. For example, the Profiling API's stack snapshot, shadow stack, FunctionEnter, FunctionLeave, and/or other methods enable acquiring names, arguments, return values, stack frame, and/or other information about active functions of an application program. Other platforms, tools, and/or techniques may provide equivalent or similar functionalities as the above described ones.

In some embodiments, acquiring Instruction Sets 526, data, and/or other information can be implemented at least in part through Java platform's tools for application program (i.e. some embodiments of Unit for Object Manipulation Using Curiosity 130, some embodiments of Unit for Observing Object Manipulation 135, Application Program 18, Avatar 605, and/or other element, etc.) tracing or profiling. In some aspects, Java Virtual Machine Profiling Interface (JVMPI), Java Virtual Machine Tool Interface (JVMTI), and/or other APIs or tools enable tracing, instrumentation, application execution profiling, in memory profiling, and/or other operations on an application program. In one example, JVMTI can be used for dynamic bytecode instrumentation where insertion of instrumentation bytecodes is performed at runtime. The profiler may insert the necessary instrumentation when a selected class is invoked in an application program by using JVMTI's redefineClasses method. In another example, JVMTI can be used for creation of software agents that can extract information from a Java application program such as method calls, variables, fields, classes, and/or other information by using methods such as GetMethodName, GetClassSignature, GetStackTrace, and/or other methods. In other aspects, java.lang. Runtime enables tracing or profiling by using tracemethodcalls, traceinstructions, and/or other methods that prompt the Java virtual machine to output trace information for a method or instruction as it is executed. Other platforms, tools, and/or techniques may provide equivalent or similar functionalities as the above described ones.

In some embodiments, acquiring Instruction Sets 526, data, and/or other information can be implemented at least in part through independent tools for acquiring Instruction Sets 526, data, and/or other information. In addition to the aforementioned tools native to their respective platforms, independent tools may provide similar and additional functionalities across different platforms. Examples of these independent tools include Pin, DynamoRIO, KernInst, DynInst, Kprobes, OpenPAT, DTrace, SystemTap, and/or others. These independent tools may provide a wide range of functionalities such as tracing or profiling, instrumentation, logging application or system messages, outputting custom text messages, outputting objects or data structures, outputting functions/routines/subroutines or their invocations, outputting variable or parameter values, outputting call or other stacks, outputting processor registers, providing runtime memory access, providing inputs and/or outputs, performing live application monitoring, and/or other functionalities. Other platforms, tools, and/or techniques may provide equivalent or similar functionalities as the above described ones.

In some embodiments, acquiring Instruction Sets 526, data, and/or other information can be implemented at least in part through tracing or profiling of the processor on which an application program (i.e. some embodiments of Unit for Object Manipulation Using Curiosity 130, some embodiments of Unit for Observing Object Manipulation 135, Application Program 18, Avatar 605, and/or other element, etc.) runs. For example, some Intel processors provide Intel Processor Trace (i.e. Intel PT, etc.), a low-level tracing feature that enables recording executed instruction sets, and/or other data or information of one or more application programs. Intel PT is facilitated by the Processor Trace Decoder Library along with its related tools. Intel PT offers a low-overhead execution tracing that uses dedicated hardware facilities. The recorded execution/trace information can be buffered internally before being sent to a repository or system where it can be accessed. Other platforms, tools, and/or techniques may provide equivalent or similar functionalities as the above described ones.

In some embodiments, acquiring Instruction Sets 526, data, and/or other information can be implemented at least in part through assembly language. Because of a direct relationship with a computing system's architecture, assembly language can be a powerful tool for tracing or profiling an application program's (i.e. some embodiments of Unit for Object Manipulation Using Curiosity 130, some embodiments of Unit for Observing Object Manipulation 135, Application Program 18, Avatar 605, and/or other element, etc.) execution in processor registers, memory, and/or other computing system elements. In some aspects, assembly language can be used to read, instrument, and/or otherwise manipulate in-memory code of a loaded application program. In other aspects, assembly language can be used to rewrite or overwrite in-memory code of an application program with instrumentation code. In further aspects, assembly language can be used to redirect an application program's execution to an instrumentation routine/subroutine or code segment elsewhere in memory by inserting a jump into the application program's in-memory code, by redirecting program counter, or by other techniques. Some operating systems may use protection from changes to application programs loaded into memory. Operating system, processor, or other low level commands such as Linux mprotect command or similar commands in other operating systems may be used to unprotect the protected locations in memory before the change. In further aspects, assembly language can be used to read, modify, and/or manipulate instruction register, program counter, and/or other registers or components of a processor. In some designs, a high-level programming language can call and/or execute an external assembly language program. In other designs, relatively low-level programming languages such as C may allow embedding assembly language directly in their source code such as by using asm keyword of C. Other platforms, tools, and/or techniques may provide equivalent or similar functionalities as the above described ones.

In further embodiments, acquiring Instruction Sets 526, data, and/or other information can be implemented at least in part through logging. Some logging tools may include nearly full feature sets of tracing or profiling tools. In some aspects, logging functionalities may be provided by a programming language or platform in which an application program (i.e. some embodiments of Unit for Object Manipulation Using Curiosity 130, some embodiments of Unit for Observing Object Manipulation 135, Application Program 18, Avatar 605, and/or other element, etc.) is implemented such as VisualBasic's Microsoft. VisualBasic. Logging namespace, Java's java.util.logging class, and/or other logging capabilities of other programming languages or platforms. In other aspects, logging functionalities may be provided by an operating system on which an application program runs such as Windows NT log service, Windows Wevtutil tool, and/or other logging capabilities of other operating systems. In further aspects, logging functionalities may be provided by independent logging tools that enable logging on different platforms and/or operating systems such as Log4j, Logback, SmartInspect, NLog, log 4net, Microsoft Enterprise Library, ObjectGuy Framework, and/or others. In further embodiments, acquiring Instruction Sets 526, data, and/or other information can be implemented at least in part through tracing or profiling the operating system on which an application program runs. Tracing or profiling the operating system enables generation of low level trace information about an application program. In some aspects, instrumentation code can be inserted into an operating system's source code before kernel compilation. In other aspects, instrumentation code can be inserted into an operating system's executable code through binary rewriting of compiled kernel code. In further aspects, instrumentation code can be inserted into an operating system's executable code dynamically at runtime. Tracing or profiling the operating system may include any features, functionalities, and/or embodiments of the aforementioned tracing, profiling, and/or instrumentation of an application program, and vice versa. In further embodiments, acquiring Instruction Sets 526, data, and/or other information can be implemented at least in part through branch tracing. Branch tracing may include an abbreviated trace in which only the successful branch instruction sets are traced or recorded. In further embodiments, it may be sufficient to acquire inputs, variables, parameters, and/or other data in some application programs. The values of inputs, variables, parameters, and/or other data of interest can be acquired through the aforementioned tracing or profiling, instrumentation, and/or other techniques. Other platforms, tools, and/or techniques may provide equivalent or similar functionalities as the above described ones.

Figure 31B:
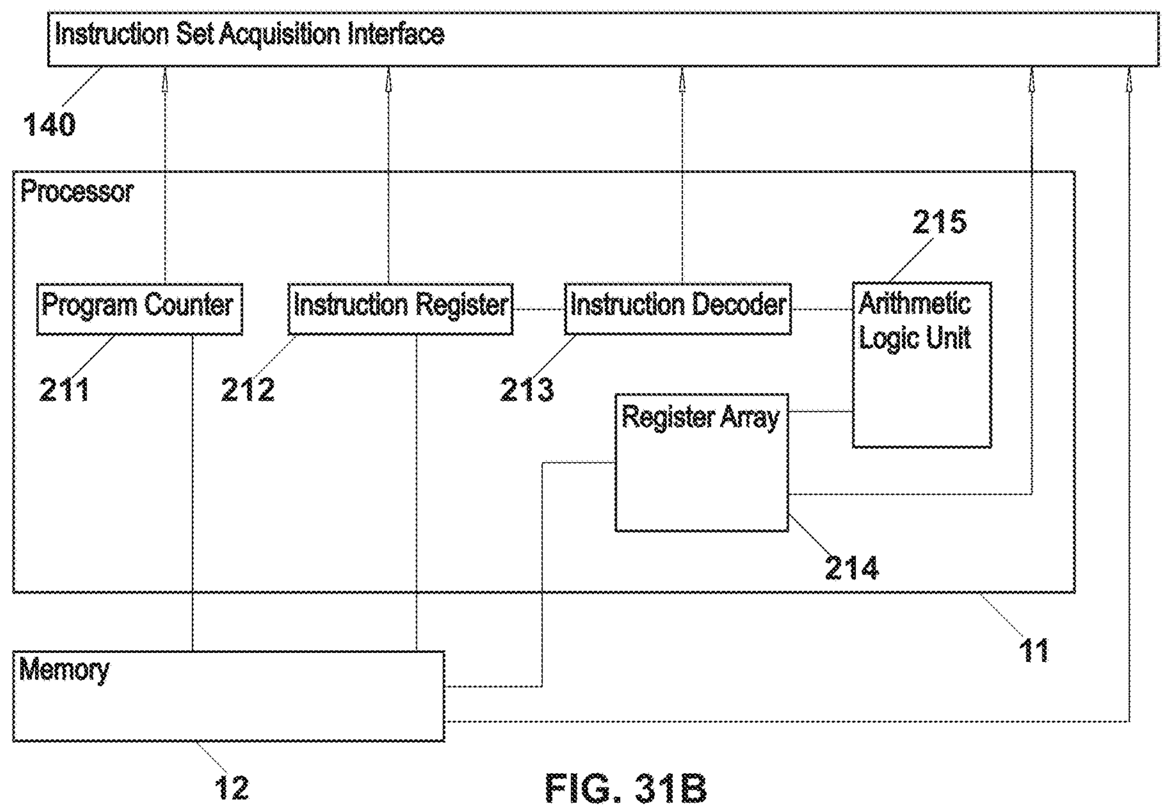

Referring to FIG. 31B, in yet some embodiments, acquiring Instruction Sets 526, data, and/or other information can be implemented at least in part through tracing or profiling of Processor 11 registers, Memory 12, and/or other computing system elements where Instruction Sets 526, data, and/or other information may be stored or used. For example, in an instruction cycle, Instruction Set 526 may be loaded into Instruction Register 212 after Processor 11 fetches it from a location in Memory 12 pointed to by Program Counter 211 (i.e. also referred to as instruction pointer, instruction counter, etc.). Instruction Register 212 may hold Instruction Set 526 while it is decoded by Instruction Decoder 213, prepared, and executed. Data (i.e. operands, etc.) needed for execution may be loaded from Memory 12 into a register within Register Array 214 or loaded directly into Arithmetic Logic Unit 215. In some aspects, as Instruction Sets 526, data, and/or other information pass through Instruction Register 212, Program Counter 211, Memory 12, Register Array 214, and/or other computing system elements during application program's (i.e. some embodiments of Unit for Object Manipulation Using Curiosity 130, some embodiments of Unit for Observing Object Manipulation 135, Application Program 18, Avatar 605, and/or other element, etc.) execution, they can be acquired by Instruction Set Acquisition Interface 140 as shown. In addition to the ones described or shown, examples of other processor components that can be used in an instruction cycle include memory address register (MAR) that may hold the address of a memory block to be read from or written to; memory data register (MDR) that may hold data fetched from memory or data waiting to be stored in memory; data registers that may hold numeric values, characters, small bit arrays, or other data; address registers that may hold addresses used by instruction sets that indirectly access memory; general purpose registers (GPRs) that may store both data and addresses; conditional registers that may hold truth values often used to determine whether some instruction set should or should not be executed; floating point registers (FPRs) that may store floating point numbers;

constant registers that may hold read-only values such as zero, one, or pi; special purpose registers (SPRs) such as status register, program counter, or stack pointer that may hold information on application program state; machine-specific registers that may store data and settings related to a particular processor; Register Array 214 that may include an array of any number of registers; Arithmetic Logic Unit 215 that may perform arithmetic and logic operations; control unit that may direct processor's operation; and/or others. Tracing or profiling of Processor 11 registers, Memory 12, and/or other computing system elements can be implemented in a program, combination of hardware and programs, or purely hardware system. Dedicated hardware can be built to perform tracing or profiling of Processor 11 registers, Memory 12, and/or other computing system elements with marginal or no impact to computing overhead. One of ordinary skill in art will understand that the aforementioned Processor 11 and/or other computing system elements are described merely as an example of a variety of possible implementations, and that while all possible Processors 11 and/or other computing system elements are too voluminous to describe, other Processors 11 and/or computing system elements, and/or those known in art, are within the scope of this disclosure. For example, other additional elements can be included as needed, or some of the disclosed ones can be excluded or altered, or a combination thereof can be utilized in alternate implementations of Processor 11 and/or other computing system elements.

Figure 31C:
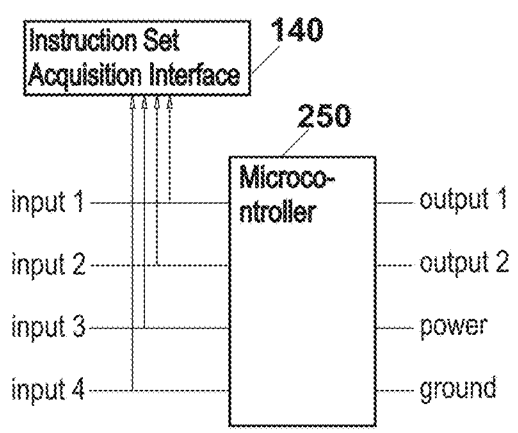
Figure 31D:
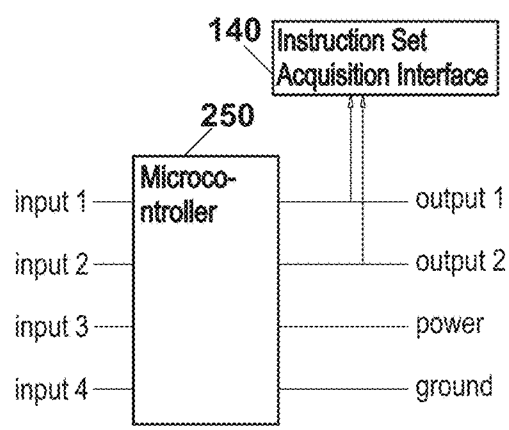

In yet some embodiments, acquiring Instruction Sets 526, data, and/or other information can be implemented at least in part through tracing or profiling of Microcontroller 250, if one is used. While Processor 11 includes any type or embodiment of a microcontroller, Microcontroller 250 is described separately here to offer additional detail on its functioning. Some Devices 98 may not need the processing capabilities of an entire Processor 11, but instead a more tailored Microcontroller 250 that can be used instead of Processor 11. Examples of such Devices 98 include toys, industrial machines, robots, home appliances, audio or video electronics, vehicle systems, and/or others. Microcontroller 250 comprises functionality for performing logic operations. Microcontroller 250 comprises functionality for performing logic operations using inputs and producing outputs based on the logic operations performed on the inputs. Microcontroller 250 may generally be implemented using transistors, diodes, and/or other electronic switches, but can also be constructed using vacuum tubes, electromagnetic relays (relay logic), fluidic logic, pneumatic logic, optics, molecules, or even mechanical elements. In some aspects, Microcontroller 250 may be or include a field-programmable gate array (FPGA), an application-specific integrated circuit (ASIC), and/or other computing circuit or device. In other aspects, Microcontroller 250 may be or include any circuit or device comprising one or more logic gates, one or more transistors, one or more switches, and/or one or more other logic components. In further aspects, Microcontroller 250 may be or include any integrated or other circuit or device that can perform logic operations. Logic may generally refer to Boolean logic utilized in binary operations, but other logics can also be used. Input into Microcontroller 250 may include or refer to a value inputted into the Microcontroller 250, therefore, these terms may be used interchangeably herein depending on context. In one example, Microcontroller 250 may perform some logic operations using four input values and produce two output values. As the four input values are delivered to or received by Microcontroller 250, they can be acquired by Instruction Set Acquisition Interface 140 through the four hardwired connections as shown in FIG. 31C. In another example, Microcontroller 250 may perform some logic operations using four input values and produce two output values. As the two output values are generated by or transmitted out of Microcontroller 250, they can be acquired by Instruction Set Acquisition Interface 140 through the two hardwired connections as shown in FIG. 31D. In a further example, instead of or in addition to acquiring input and/or output values of Microcontroller 250, the state of Microcontroller 250 may be acquired by reading values from one or more Microcontroller's 250 internal components such as registers, memories, buses, and/or others (i.e. similar to the previously described tracing or profiling of Processor 11 or components thereof, etc.). Any of the aforementioned and/or other techniques for tracing or profiling Processor 11 or components thereof can be used for tracing or profiling of Microcontroller 250 or components thereof, and vice versa. In some designs, Instruction Set Acquisition Interface 140 may include clamps and/or other elements to attach Instruction Set Acquisition Interface 140 to inputs (i.e. input wires, etc.) into and/or outputs (i.e. output wires, etc.) from Microcontroller 250. Such clamps and/or attachment elements enable seamless attachment of Instruction Set Acquisition Interface 140 to any circuit or computing device without the need for redesigning or altering the circuit or computing device.

In some embodiments, Instruction Set Acquisition Interface 140 may acquire input values directly from Actuator 91. For example, Processor 11, Microcontroller 250 or other processing element may control Actuator 91 that implements Device's 98 physical or mechanical operations. Actuator 91 may receive one or more input values or control signals from Processor 11, Microcontroller 250, or other processing element directing Actuator 91 to perform specific operations. As one or more input values or control signals are delivered to or received by Actuator 91, they can be acquired by Instruction Set Acquisition Interface 140. Specifically, for instance, one or more input values or control signals into Actuator 91 can be acquired by Instruction Set Acquisition Interface 140 via hardwired or other connections.

One of ordinary skill in art will understand that the aforementioned Microcontroller 250 is described merely as an example of a variety of possible implementations, and that while all possible Microcontrollers 250 are too voluminous to describe, other Microcontrollers 250, and/or those known in art, are within the scope of this disclosure. In one example, any number of input and/or output values can be utilized in alternate implementations. In another example, Microcontroller 250 may include any number and/or combination of logic components to implement any logic operations. In a further example, other additional elements can be included as needed, or some of the disclosed ones can be excluded or altered, or a combination thereof can be utilized in alternate implementations of Microcontroller 250.

Other additional techniques or elements can be utilized as needed for acquiring Instruction Sets 526, data, and/or other information, or some of the disclosed techniques or elements can be excluded, or a combination thereof can be utilized in alternate embodiments.

Referring now to Unit for Object Manipulation Using Artificial Knowledge 170. Unit for Object Manipulation Using Artificial Knowledge 170 comprises functionality for causing Device's 98 manipulations of one or more Objects 615 (i.e. physical objects, etc.) using artificial knowledge, and/or other functionalities. Artificial knowledge (i.e. also referred to as knowledge, learned knowledge, or other suitable name or reference, etc.) may include knowledge stored in Knowledge Structure 160 (i.e. Collection of Sequences 160*a*, Graph or Neural Network 160*b*, Collection of Knowledge Cells [not shown], etc.) as previously described. In some embodiments, one or more Objects 615, their states, and/or their properties can be detected by Sensor 92 and/or Object Processing Unit 115, and provided as one or more Collections of Object Representations 525 to Unit for Object Manipulation Using Artificial Knowledge 170. Unit for Object Manipulation Using Artificial Knowledge 170 may then select or determine Instruction Sets 526 to be used or executed in Device's 98 manipulations of the one or more detected Objects 615 using artificial knowledge. Unit for Object Manipulation Using Artificial Knowledge 170 may provide such Instruction Sets 526 to Instruction Set implementation Interface 180 for execution. Unit for Object Manipulation Using Artificial Knowledge 170 may include any hardware, programs, or combination thereof.

In some embodiments, Unit for Object Manipulation Using Artificial Knowledge 170 may cause Device 98 to perform physical or mechanical manipulations of one or more Objects 615 using artificial knowledge examples of which include touching, pushing, pulling, lifting, dropping, gripping, twisting/rotating, squeezing, moving, and/or others, or a combination thereof. In some aspects, Device's 98 physical or mechanical manipulations may be implemented by one or more Actuators 91 controlled by Unit for Object Manipulation Using Artificial Knowledge 170, and/or other processing element. For example, Unit for Object Manipulation Using Artificial Knowledge 170 may cause Processor 11, Microcontroller 250, and/or other processing element to execute one or more Instruction Sets 526 responsive to which one or more Actuators 91 may implement Device's 98 physical or mechanical manipulations of one or more Objects 615. In other embodiments, Unit for Object Manipulation Using Artificial Knowledge 170 may cause Device 98 to perform electrical, magnetic, or electro-magnetic manipulations of one or more Objects 615 examples of which include stimulating with an electric charge, stimulating with a magnetic field, stimulating with an electro-magnetic signal, stimulating with a radio signal, illuminating with light, and/or others, or a combination thereof. In some aspects, Device's 98 electrical, magnetic, electro-magnetic, and/or other manipulations may be implemented by one or more transmitters (i.e. electric charge transmitter, electromagnet, radio transmitter, laser or other light transmitter, etc.; not shown) or other elements controlled by Unit for Object Manipulation Using Artificial Knowledge 170, and/or other processing element. For example, Unit for Object Manipulation Using Artificial Knowledge 170 may cause Processor 11, Microcontroller 250, and/or other processing element to execute one or more Instruction Sets 526 responsive to which one or more transmitters may implement Device's 98 electrical, magnetic, electro-magnetic, and/or other manipulations of one or more Objects 615. In further embodiments, Unit for Object Manipulation Using Artificial Knowledge 170 may cause Device 98 to perform acoustic manipulations of one or more Objects 615 examples of which include stimulating with sound, and/or others, or a combination thereof. In some aspects, Device's 98 acoustic, and/or other manipulations may be implemented by one or more sound transmitters (i.e. speaker, horn, etc.; not shown) or other elements controlled by Unit for Object Manipulation Using Artificial Knowledge 170, and/or other processing element. For example, Unit for Object Manipulation Using Artificial Knowledge 170 may cause Processor 11, Microcontroller 250, and/or other processing element to execute one or more Instruction Sets 526 responsive to which one or more sound transmitters may implement Device's 98 acoustic and/or other manipulations of one or more Objects 615. In yet further embodiments, simply approaching, retreating, relocating, or moving relative to one or more Objects 615 is considered manipulation of the one or more Objects 615, which Unit for Object Manipulation Using Artificial Knowledge 170 can cause Device 98 to perform. In general, manipulation includes any manipulation, operation, stimulus, and/or effect on any one or more Objects 615 or the environment as previously described.

In some designs, Unit for Object Manipulation Using Artificial Knowledge 170 may work in combination with another system (i.e. Device Control Program 18*a* [later described], any hardware, any programs, any combination of hardware and programs, etc.). The system may be a primary control mechanism to control Device 98 in specific operations. Such system may include logic, algorithms, functions, and/or other elements for causing Device 98 to perform specific operations. Such operations may be advanced by Unit for Object Manipulation Using Artificial Knowledge 170. For example, a system may be configured to control Device 98 in mowing grass in a yard, which may require Device 98 to go through a gate Object 615 to enter the yard. In mowing grass in the yard, the system may utilize Unit for Object Manipulation Using Artificial Knowledge 170 for some operations such as causing Device 98 to open the gate Object 615 when a closed gate Object 615 is detected. Unit for Object Manipulation Using Artificial Knowledge 170 may use artificial knowledge of opening the gate Object 615 stored in Knowledge Structure 160 to open the gate Object 615. Specifically, for instance, Unit for Object Manipulation Using Artificial Knowledge 170 may cause Device's 98 robotic arm Actuator 91 to pull lever of the gate Object 615 and push the gate Object 615 resulting in the gate Object's 615 opening, thereby effecting the gate Object's 615 beneficial state of being open and advancing Device's 98 operations in mowing grass in the yard. In other designs, Unit for Object Manipulation Using Artificial Knowledge 170 may solely control Device 98 in performing various operations, in which case Unit for Object Manipulation Using Artificial Knowledge 170 may include logic, algorithms, functions, and/or other elements for causing Device 98 to perform the various operations. In such designs, Unit for Object Manipulation Using Artificial Knowledge 170 may include any features, functionalities, and/or embodiments of Device Control Program 18*a*.

In some aspects, Unit for Object Manipulation Using Artificial Knowledge 170 comprises functionality for causing Device 98 to reposition itself relative to one or more Objects 615 so that Device 98 is positioned similar to the position when a manipulation of the one or more Objects 615 was learned (i.e. using curiosity, by observing the manipulation, etc.). For example, Unit for Object Manipulation Using Artificial Knowledge 170 may cause Device 98 to circle around, position itself at various distances, or move in other patterns relative to one or more Objects 615 to find a position similar to the position when a manipulation of the one or more Objects 615 was learned. In further aspects, Instruction Sets 526 learned in manipulations of one or more Objects 615 performed by one Device 98 can be adjusted for use in manipulations of one or more Objects 615 using artificial knowledge performed by a different Device 98. Therefore, Unit for Object Manipulation Using Artificial Knowledge 170 can cause manipulations of one or more Objects 615 by one Device 98 using artificial knowledge learned on a different Device 98. This functionality accommodates for differences in Devices 98. For example, Instruction Set 526 Device.Arm.touch (0.1, 0.25, 0.35) used on one Device 98 may be adjusted 0.1 meters in Z value to become Device.Arm.touch (0.1, 0.25, 0.45), thereby accommodating for height difference of 0.1 meters between the two Devices 98. In this example, Instruction Set 526 Device.Arm.touch (X, Y, Z) may be used to cause Device's 98 robotic arm Actuator 91 to extend and touch location in space defined by coordinates X (i.e. lateral offset relative to Device 98, etc.), Y (i.e. depth offset relative to Device 98, etc.), and Z (i.e. vertical offset relative to Device 98, etc.). Any other modifications of Instruction Sets 526 learned on one Device 98 can be made to make the Instruction Sets 526 suitable for use on one or more different Devices 98. In further aspects, Instruction Sets 526 can be adjusted to accommodate variations between situations when the Instruction Sets 526 were learned in manipulations of one or more Objects 615 and situations when the Instruction Sets 526 are used in manipulations of one or more Objects 615 using artificial knowledge. For example, Instruction Set 526 Device.Arm.touch (0.1, 0.25, 0.35) can be adjusted 0.05 meters in Y value to become Device.Arm.touch (0.1, 0.3, 0.45), thereby accommodating for a higher distance of one or more Objects 615 than when the Instruction Set 526 was learned. Any other modifications of Instruction Sets 526 can be made to make the Instruction Sets 526 suitable for use in various situations. In further aspects, Unit for Object Manipulation Using Artificial Knowledge 170 may include any features, functionalities, and/or embodiments of Unit for Object Manipulation Using Curiosity 130, as applicable, and vice versa. In further aspects, Unit for Object Manipulation Using Artificial Knowledge 170 may include any features, functionalities, and/or embodiments of Instruction Set Implementation Interface 180 (later described) depending on design, in which case Instruction Set Implementation Interface 180 can be omitted. In further aspects, Unit for Object Manipulation Using Artificial Knowledge 170 may include any features, functionalities, and/or embodiments of Device Control Program 18*a*. In further aspects, any part of an Object 615 can be recognized as an Object 615 itself or sub-Object 615 as previously described and Unit for Object Manipulation Using Artificial Knowledge 170 can cause Device 98 to manipulate it individually or as part of a main Object 615. In further aspects, Instruction Sets 526 correlated with any one or more Collections of Object Representations 525 that include multiple Object Representations 630 may be used as if the Instruction Sets 526 pertain to all Object Representations 630 or to individual Object Representations 630 of the one or more Collections of Object Representations 525. Therefore, Unit for Object Manipulation Using Artificial Knowledge 170 can cause Device's 98 manipulations of an individual Object 615 using artificial knowledge of Device's 98 manipulations of multiple Objects 615 without having to detect all of the multiple Objects 615 as when the artificial knowledge was learned. In further aspects, incoming one or more Collections of Object Representations 525 from Object Processing Unit 115 do not need to represent exactly the same one or more Objects 615 or state of one or more Objects 615 as when the knowledge of manipulations of the one or more Objects 615 was learned. Unit for Object Manipulation Using Artificial Knowledge 170 can utilize Comparison 725 to determine at least partial match between the incoming one or more Collections of Object Representations 525 from Object Processing Unit 115 and one or more Collections of Object Representations 525 from Knowledge Structure 160. For example, at least partial match can be determined for a similar type Object 615, similarly sized Object 615, similarly shaped Object 615, similarly positioned Object 615, similar condition Object 615, and/or others as defined by the rules or thresholds for at least partial match (later described). Therefore, Unit for Object Manipulation Using Artificial Knowledge 170 can implement manipulations of one or more Objects 615 using artificial knowledge learned from manipulating different one or more Objects 615. Any of the functionalities of Unit for Object Manipulation Using Artificial Knowledge 170 may be performed autonomously.

Unit for Object Manipulation Using Artificial Knowledge 170 may include any logic, functions, algorithms, code, and/or other elements to enable its functionalities. An example of Unit's for Object Manipulation Using Artificial Knowledge 170 code for determining if Knowledge Structure 160 has a representation of a state of Object 615 similar to the current state of Object 615, and executing instructions to cause Device 98 to manipulate Object 615 to cause a subsequent state of Object 615 may include the following code:

```
detectedObjects=detectObjects ( )//detect objects in the
   surrounding and store them in detectedObjects array for
   (int i=0; i<detectedObjects.length; i++) {//process each
   object in detectedObjects array
   similarCurrentState=KnowledgeStructure.
     findSimilarState (detectedObjects [i]);/*determine if
     KnowledgeSturcture has state of object similar to
     current state of detectedObjects [i] object*/
   if (similarCurrentState!=null) {//similar state found
     subsequentState=KnowledgeStructure.find
       SubsequentState (similarCurrentState);/*find sub-
       sequent state of of similar state*/
   if (subsequentState.instSets!=null) {Device.execInst-
     Sets (subsequentState.instSets)};/*execute instruc-
     tion sets correlated with subsequent state to cause a
     device to manipulate detectedObjects [i] object to
     cause subsequent state of detectedObjects [i]
     object*/
   }
   Break;//stop the for loop
}
. . .
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

Still referring to Unit for Object Manipulation Using Artificial Knowledge 170. Unit for Object Manipulation Using Artificial Knowledge 170 comprises functionality for causing Avatar's 605 manipulations of one or more Objects 616 (i.e. computer generated objects, etc.) using artificial knowledge, and/or other functionalities. Artificial knowledge (i.e. also referred to as knowledge, learned knowledge, or other suitable name or reference, etc.) may include knowledge stored in Knowledge Structure 160 (i.e. Collection of Sequences 160*a*, Graph or Neural Network 160*b*, Collection of Knowledge Cells [not shown], etc.) as previously described. In some embodiments, one or more Objects 616, their states, and/or their properties can be detected or obtained in Application Program 18, and provided by Object Processing Unit 115 as one or more Collections of Object Representations 525 to Unit for Object Manipulation Using Artificial Knowledge 170. Unit for Object Manipulation Using Artificial Knowledge 170 may then select or determine Instruction Sets 526 to be used or executed in Avatar's 605 manipulations of the one or more Objects 616 using artificial knowledge. Unit for Object Manipulation Using Artificial Knowledge 170 may provide such Instruction Sets 526 to Instruction Set Implementation Interface 180 for execution.

In some embodiments, Unit for Object Manipulation Using Artificial Knowledge 170 may cause Avatar 605 to perform simulated physical or simulated mechanical manipulations of one or more Objects 616 using artificial knowledge examples of which include simulated touching, simulated pushing, simulated pulling, simulated lifting, simulated dropping, simulated gripping, simulated twisting/rotating, simulated squeezing, simulated moving, and/or others, or a combination thereof. In some aspects, Avatar's 605 simulated physical or simulated mechanical manipulations may be implemented by Avatar 605 and/or its elements controlled by Unit for Object Manipulation Using Artificial Knowledge 170, and/or other processing element. For example, Unit for Object Manipulation Using Artificial Knowledge 170 may cause Processor 11, Application Program 18, and/or other processing element to execute one or more Instruction Sets 526 responsive to which Avatar 605 may implement simulated physical or simulated mechanical manipulations of one or more Objects 616. In other embodiments, Unit for Object Manipulation Using Artificial Knowledge 170 may cause Avatar 605 to perform simulated electrical, simulated magnetic, or simulated electro-magnetic manipulations of one or more Objects 616 examples of which include stimulating with a simulated electric charge, stimulating with a simulated magnetic field, stimulating with a simulated electro-magnetic signal, stimulating with a simulated radio signal, illuminating with simulated light, and/or others, or a combination thereof. In some aspects, Avatar's 605 simulated electrical, simulated magnetic, or simulated electro-magnetic manipulations may be implemented by one or more simulated transmitters (i.e. simulated electric charge transmitter, simulated electromagnet, simulated radio transmitter, simulated laser or other light transmitter, etc.; not shown; previously described) or other elements controlled by Unit for Object Manipulation Using Artificial Knowledge 170, and/or other processing element. For example, Unit for Object Manipulation Using Artificial Knowledge 170 may cause Processor 11, Application Program 18, and/or other processing element to execute one or more Instruction Sets 526 responsive to which one or more simulated transmitters may implement Avatar's 605 simulated electrical, simulated magnetic, or simulated electro-magnetic manipulations of one or more Objects 616. In further embodiments, Unit for Object Manipulation Using Artificial Knowledge 170 may cause Avatar 605 to perform simulated acoustic manipulations of one or more Objects 616 examples of which include stimulating with simulated sound, and/or others, or a combination thereof. In some aspects, Avatar's 605 simulated acoustic manipulations may be implemented by one or more simulated sound transmitters (i.e. simulated speaker, simulated horn, etc.; not shown; previously described) or other elements controlled by Unit for Object Manipulation Using Artificial Knowledge 170, and/or other processing element. For example, Unit for Object Manipulation Using Artificial Knowledge 170 may cause Processor 11, Application Program 18, and/or other processing element to execute one or more Instruction Sets 526 responsive to which one or more simulated sound transmitters may implement Avatar's 605 simulated acoustic manipulations of one or more Objects 616. In yet further embodiments, simply approaching, retreating, relocating, or moving relative to one or more Objects 616 is considered manipulation of the one or more Objects 616, which Unit for Object Manipulation Using Artificial Knowledge 170 can cause Avatar 605 to perform. In general, manipulation includes any manipulation, operation, stimulus, and/or effect on any one or more Objects 616 or the environment as previously described.

In some designs, Unit for Object Manipulation Using Artificial Knowledge 170 may work in combination with another system (i.e. Avatar Control Program 18*b* [later described], Application Program 18, any hardware, any programs, any combination of hardware and programs, etc.). The system may be a primary control mechanism to control Avatar 605 in performing specific operations. Such system may include logic, algorithms, functions, and/or other elements for causing Avatar 605 to perform specific operations. Such operations may be advanced by Unit for Object Manipulation Using Artificial Knowledge 170. For example, a system may be configured to control Avatar 605 in mowing grass in a simulated yard, which may require Avatar 605 to go through a simulated gate Object 616 to enter the simulated yard. In mowing grass in the simulated yard, the system may utilize Unit for Object Manipulation Using Artificial Knowledge 170 for some operations such as causing Avatar 605 to open the simulated gate Object 616 when a closed gate Object 616 is detected or obtained. Unit for Object Manipulation Using Artificial Knowledge 170 may use artificial knowledge of opening the simulated gate Object 616 stored in Knowledge Structure 160 to open the simulated gate Object 616. Specifically, for instance, Unit for Object Manipulation Using Artificial Knowledge 170 may cause Avatar's 605 arm to pull down lever of the simulated gate Object 616 and push the simulated gate Object 616 resulting in the simulated gate Object's 616 opening, thereby effecting the simulated gate Object's 616 beneficial state of being open and advancing Avatar's 605 mowing grass in the simulated yard. In other designs, Unit for Object Manipulation Using Artificial Knowledge 170 may solely control Avatar 605 in performing various operations, in which case Unit for Object Manipulation Using Artificial Knowledge 170 may include logic, algorithms, functions, and/or other elements for causing Avatar 605 to perform the various operations. In such designs, Unit for Object Manipulation Using Artificial Knowledge 170 may include any features, functionalities, and/or embodiments of Avatar Control Program 18*b*.

In some aspects, Unit for Object Manipulation Using Artificial Knowledge 170 comprises functionality for causing Avatar 605 to reposition itself relative to one or more Objects 616 so that Avatar 605 is positioned similar to the position when a manipulation of the one or more Objects 616 was learned (i.e. using curiosity, by observing the manipulation, etc.). For example, Unit for Object Manipulation Using Artificial Knowledge 170 may cause Avatar 605 to circle around, position itself at various distances, or move in other patterns relative to one or more Objects 616 to find a position similar to the position when a manipulation of the one or more Objects 616 was learned. In further aspects, Instruction Sets 526 learned in manipulations of one or more Objects 616 performed by one Avatar 605 can be modified or adjusted for use by a different Avatar 605 in manipulations of one or more Objects 616. Therefore, Unit for Object Manipulation Using Artificial Knowledge 170 can cause manipulations of one or more Objects 616 by one Avatar 605 using artificial knowledge learned on a different Avatar 605. This functionality accommodates for differences in Avatars 605. For example, Instruction Set 526 Avatar.Arm.touch (0.1, 0.25, 0.35) used on one Avatar 605 may be modified or adjusted 0.1 meters in Z value to become Avatar.Arm.touch (0.1, 0.25, 0.45), thereby accommodating for height difference of 0.1 meters between the two Avatars 605. In this example, Instruction Set 526 Avatar.Arm.touch (X, Y, Z) may be used to cause Avatar's 605 arm to extend and touch location in space defined by coordinates X (i.e. lateral offset relative to Avatar 605, etc.), Y (i.e. depth offset relative to Avatar 605, etc.), and Z (i.e. vertical offset relative to Avatar 605, etc.). Any other modifications of Instruction Sets 526 learned on one Avatar 605 can be made to make the Instruction Sets 526 suitable for use on one or more different Avatars 605. In further aspects, Instruction Sets 526 learned in manipulations of one or more Objects 616 performed by one Avatar 605 in one Application Program 18 can be modified or adjusted for use by the same or different Avatar 605 in manipulations of one or more Objects 616 in another Application Program 18. Therefore, Unit for Object Manipulation Using Artificial Knowledge 170 can cause manipulations of one or more Objects 616 by one Avatar 605 in one Application Program 18 using artificial knowledge learned on/by/with the same or different Avatar 605 in another Application Program 18. This functionality accommodates for differences in Application Programs 18 and/or Avatars 605. For example, Instruction Set 526 Avatar.Arm.touch (0.1, 0.25, 0.35) used on/by/with one Avatar 605 in one Application Program 18 may be modified or adjusted 0.1 meters in Z value to become Avatar.Arm.touch (0.1, 0.25, 0.45) in another Application Program 18, thereby accommodating for height difference of 0.1 meters between the two Avatars 605 in the two Application Programs 18. Any other modifications of Instruction Sets 526 learned on one Avatar 605 in one Application Program 18 can be made to make the Instruction Sets 526 suitable for use on one or more same or different Avatars 605 in another Application Program 18. In further aspects, Instruction Sets 526 can be modified or adjusted to accommodate variations between situations when the Instruction Sets 526 were learned in manipulations of one or more Objects 616 and situations when the Instruction Sets 526 are used in manipulations of one or more Objects 616 using artificial knowledge. For example, Instruction Set 526 Avatar.Arm.touch (0.1, 0.25, 0.35) can be modified or adjusted 0.05 meters in Y value to become Avatar.Arm.touch (0.1, 0.3, 0.35), thereby accommodating for a higher distance of one or more Objects 616 than when the Instruction Set 526 was learned. Any other modifications of Instruction Sets 526 can be made to make the Instruction Sets 526 suitable for use in various situations. In further aspects, Unit for Object Manipulation Using Artificial Knowledge 170 may include any features, functionalities, and/or embodiments of Unit for Object Manipulation Using Curiosity 130, as applicable, and vice versa. In further aspects, Unit for Object Manipulation Using Artificial Knowledge 170 may include any features, functionalities, and/or embodiments of Instruction Set Implementation Interface 180 (later described) depending on design, in which case Instruction Set Implementation Interface 180 can be optionally omitted. In further aspects, Unit for Object Manipulation Using Artificial Knowledge 170 may include any features, functionalities, and/or embodiments of Application Program 18. In further aspects, any part of an Object 616 can be recognized as an Object 616 itself or sub-Object 616 as previously described and Unit for Object Manipulation Using Artificial Knowledge 170 can cause Avatar 605 to manipulate it individually or as part of a main Object 616. In further aspects, Instruction Sets 526 correlated with any one or more Collections of Object Representations 525 that include multiple Object Representations 630 may be used as if the Instruction Sets 526 pertain to all Object Representations 630 or to individual Object Representations 630 of the one or more Collections of Object Representations 525. Therefore, Unit for Object Manipulation Using Artificial Knowledge 170 can cause Avatar's 605 manipulations of an individual Object 616 using artificial knowledge of Avatar's 605 manipulations of multiple Objects 616 without having to detect all of the multiple Objects 616 as when artificial knowledge was learned. In further aspects, incoming one or more Collections of Object Representations 525 from Object Processing Unit 115 do not need to represent exactly the same one or more Objects 616 or state of one or more Objects 616 as when the knowledge of manipulations of one or more Objects 616 was learned. Unit for Object Manipulation Using Artificial Knowledge 170 can utilize Comparison 725 to determine at least partial match between the incoming one or more Collections of Object Representations 525 from Object Processing Unit 115 and one or more Collections of Object Representations 525 from Knowledge Structure 160. For example, at least partial match can be determined for a similar type Object 616, similarly sized Object 616, similarly shaped Object 616, similarly positioned Object 616, similar condition Object 616, and/or others as defined by the rules or thresholds for at least partial match (later described). Therefore, Unit for Object Manipulation Using Artificial Knowledge 170 can implement manipulations of one or more Objects 616 using artificial knowledge learned from manipulating different one or more Objects 616.

Figure 32A:
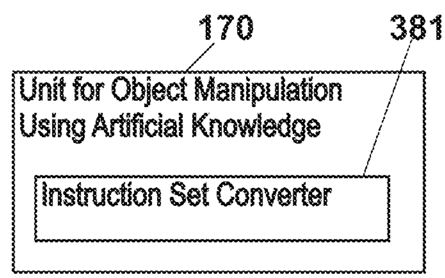
FIG. 32A-32B illustrate some embodiments of Instruction Set Converter 381.
Figure 32B:
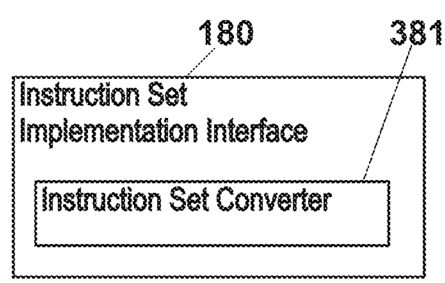

Referring to FIG. 32A-32B, some embodiments of Instruction Set Converter 381 are illustrated. In an embodiment illustrated in FIG. 32A, Instruction Set Converter 381 is included in Unit for Object Manipulation Using Artificial Knowledge 170. In an embodiment illustrated in FIG. 32B, Instruction Set Converter 381 is included in Instruction Set Implementation Interface 180. In general, Instruction Set Converter 381 and/or its functionalities can be included in any of the disclosed or other elements, be a separate or standalone element, or be provided in any other configuration.

Instruction Set Converter 381 comprises functionality for converting or modifying Instruction Sets 526. Instruction Set Converter 381 comprises functionality for converting Instruction Sets 526 learned on/by/for Avatar 605 into Instruction Sets 526 that can be used on/by/for Device 98. Instruction Set Converter 381 comprises functionality for converting Instruction Sets 526 learned in/for Avatar's 605 manipulations of one or more Objects 616 in Application Program 18 into Instruction Sets 526 for Device's 98 manipulations of one or more Objects 615 in physical world. Instruction Set Converter 381 may comprise other functionalities. Instruction Set Converter 381 may include any hardware, programs, or combination thereof.

In some embodiments, Knowledge Structure 160 (i.e. Collection of Sequences 160*a*, Graph or Neural Network 160*b*, Collection of Knowledge Cells [not shown], etc.) includes artificial knowledge of Avatar's 605 manipulations of one or more Objects 616 (i.e. computer generated objects, etc.) using curiosity and/or artificial knowledge of observed manipulations of one or more Objects 616 as previously described. In some designs, one or more Objects 615 (i.e. physical objects, etc.), their states, and/or their properties can be detected by one or more Sensors 92, and provided as one or more Collections of Object Representations 525 to Unit for Object Manipulation Using Artificial Knowledge 170. Unit for Object Manipulation Using Artificial Knowledge 170 may then select or determine Instruction Sets 526 to be used or executed in/for Device's 98 manipulations of the one or more detected Objects 615 using artificial knowledge from Knowledge Structure 160 learned in/for Avatar's 605 manipulations of one or more Objects 616. Unit for Object Manipulation Using Artificial Knowledge 170 and/or elements (i.e. Instruction Set Converter 381, etc.) thereof may convert or modify Instruction Sets 526 learned in/for Avatar's 605 manipulations of one or more Objects 616 into Instruction Sets 526 for Device's 98 manipulations of one or more Objects 615. Unit for Object Manipulation Using Artificial Knowledge 170 and/or elements (i.e. Instruction Set Converter 381, etc.) thereof may provide such converted or modified Instruction Sets 526 to Instruction Set implementation Interface 180 for execution and Device's 98 implementation of the manipulations.

In some designs, Avatar 605 may simulate or resemble Device 98. In such designs, Avatar's 605 size, shape, elements, and/or other properties may resemble Device's 98 size, shape, elements, and/or other properties. In one example, a car Avatar 605 may simulate or resemble a car Device 98, in which case the car Avatar's 605 size (i.e. 4.5 m×1.8 m×1.5 m, etc.), shape (i.e. sedan shape, etc.), elements (i.e. body, wheels, etc.), and/or other properties may resemble the car Device's 98 size (i.e. 4.5 m×1.8 m×1.5 m, etc.), shape (i.e. sedan shape, etc.), elements (i.e. body, wheels, etc.), and/or other properties. In another example, a robot Avatar 605 may simulate or resemble a robot Device 98, in which case the robot Avatar's 605 size (i.e. 0.5 m×0.35 m×0.4 m, etc.), shape (i.e. rectangular body with elongated arm, etc.), elements (i.e. body, wheels, arm, etc.), and/or other properties may resemble the robot Device's 98 size (i.e. 0.5 m×0.35 m×0.4 m, etc.), shape (i.e. rectangular body with elongated arm, etc.), elements (i.e. body, wheels, arm, etc.), and/or other properties. In some aspects, one or more Objects 616 (i.e. computer generated objects, etc.) may similarly simulate or resemble one or more Objects 615 (i.e. physical objects, etc.). In such designs, Object's 616 size, shape, elements, and/or other properties may resemble Object's 615 size, shape, elements, and/or other properties.

In some embodiments where Avatar 605 simulates or resembles Device 98 (i.e. Avatar's 605 size, shape, elements, and/or other properties resemble Device's 98 size, shape, elements, and/or other properties, etc.) and where a reference for Device 98 is used in Instruction Sets 526 for operating Avatar 605, same Instruction Sets 526 learned in/for Avatar's 605 manipulations of one or more Objects 616 (i.e. computer generated objects, etc.) can be used in/for Device's 98 manipulations of one or more Objects 615 (i.e. physical objects, etc.), in which case Instruction Set Converter 381 can be optionally omitted. For example, Instruction Sets 526 Device. Move (1.8, 2.4, 0), Device.Arm.touch (0.1, 0.25, 0.35), Device.Arm.push (forward, 0.15), and/or others learned in/for Avatar's 605 manipulations of one or more Objects 616 can be used in/for Device's 98 manipulations of one or more Objects 615. Although, it refers to Avatar 605, the reference "Device" in Instruction Sets 526 Device. Move (1.8, 2.4, 0), Device.Arm.touch (0.1, 0.25, 0.35), Device.Arm.push (forward, 0.15), and/or others learned in/for Avatar's 605 manipulations of one or more Objects 616 is purposely used so that the Instruction Sets 526 can be readily used in/for Device 98 without needing to be converted or modified. In some embodiments where Avatar 605 simulates or resembles Device 98 (i.e. Avatar's 605 size, shape, elements, and/or other properties resemble Device's 98 size, shape, elements, and/or other properties, etc.) and where a reference for Device 98 is not used in Instruction Sets 526 for operating Avatar 605, a reference for Avatar 605 in Instruction Sets 526 learned in/for Avatar's 605 manipulations of one or more Objects 616 can be replaced with a reference for Device 98 so that the Instruction Sets 526 can be used in/for Device's 98 manipulations of one or more Objects 615. For example, Instruction Sets 526 Avatar. Move (1.8, 2.4, 0), Avatar.Arm.touch (0.1, 0.25, 0.35), Avatar.Arm.push (forward, 0.15), and/or others learned in/for Avatar's 605 manipulations of one or more Objects 616 can be modified to be used as Instruction Set 526 Device.Move (1.8, 2.4, 0), Device.Arm.touch (0.1, 0.25, 0.35), Device.Arm.push (forward, 0.15), and/or others respectively in/for Device's 98 manipulations of one or more Objects 615. For instance, such modification or replacement of references can be implemented using a table (i.e. lookup table, etc.) where one column includes a reference for Avatar 605 and another column includes a reference for Device 98. In some aspects, similar modification or replacement of references can be used with respect to any elements (i.e. arm, leg, antenna, wheel, etc.) of Avatar 605 and/or Device 98, and vice versa. Any other technique for modifying or replacing of references, and/or those known in art, can be used.

In some embodiments where Avatar 605 does not simulate or resemble Device 98 (i.e. Avatar's 605 size, shape, elements, and/or other properties do not resemble Device's 98 size, shape, elements, and/or other properties, etc.), Instruction Set Converter 381 can modify Instruction Sets 526 learned in/for Avatar's 605 manipulations of one or more Objects 616 so that they can be used by any Device 98 and/or any element of Device 98 that can perform the needed manipulations. Such modifying can include or be performed after identifying (i.e. using trial of various elements to find an element that can perform the needed manipulations, using other techniques, etc.) such Device 98 and/or element thereof that can perform the needed manipulations. In one example, Instruction Set 526 Avatar. Move (1.8, 2.4, 0) learned with respect to Avatar 605 that moves on legs can be modified to be used as Instruction Set 526 Device.Move (1.8, 2.4, 0) with respect to Device 98 that moves on wheels. In designs where movement is implemented, robotic devices can move to a particular point in space specified in an Instruction Set 526, whereas, the rotation, steering, movement, and/or other low level operations of their wheels, legs, or other movement actuators are handled automatically by the robotic device and/or its control system. In another example, Instruction Set 526 Avatar.Arm.touch (0.1, 0.25, 0.35) learned in/for Avatar's 605 manipulations of one or more Objects 616 can be modified to be used as Instruction Set 526 Device.Leg.touch (0.1, 0.25, 0.35) in/for Device's 98 manipulations of one or more Objects 615. In designs where a robotic arm, leg, or other extremity is used, robotic arms, legs, or other extremities can position themselves at a particular point in space specified in an Instruction Set 526, whereas, the angles, movement, and/or other low level operations of their elbows are handled automatically by the robotic arm, leg, or other extremity and/or its control system. In a further example, Instruction Set 526 Avatar.Arm.grip ( ) learned in/for Avatar's 605 manipulations of one or more Objects 616 can be modified to be used as Instruction Set 526 Device.Cable.grip ( ) in/for Device's 98 manipulations of one or more Objects 615. In other embodiments where Avatar 605 does not simulate or resemble Device 98 (i.e. Avatar's 605 size, shape, elements, and/or other properties do not resemble Device's 98 size, shape, elements, and/or other properties, etc.), Instruction Set Converter 381 can modify Instruction Sets 526 learned in/for Avatar's 605 manipulations of one or more Objects 616 to account for differences between Avatar 605 and Device 98. For example, Instruction Set 526 Avatar.Arm.touch (0.1, 0.25, 0.35) learned with respect Avatar 605 may be modified or adjusted 0.1 meters in Z value to become Device.Arm.touch (0.1, 0.25, 0.45), thereby accounting for height (i.e. simulated height of Avatar 605 and physical height of Device 98, etc.) difference of 0.1 meters between Avatar 605 and Device 98. In this example, Instruction Set 526 Device.Arm.touch (X, Y, Z) may be used to cause Device's 98 robotic arm Actuator 91 to extend and touch location in space defined by coordinates X (i.e. lateral offset relative to Device 98, etc.), Y (i.e. depth offset relative to Device 98, etc.), and Z (i.e. vertical offset relative to Device 98, etc.). In further embodiments, Instruction Set Converter 381 can modify Instruction Sets 526 learned in/for Avatar's 605 manipulations of one or more Objects 616 to account for variations between situations when the Instruction Sets 526 were learned in/for Avatar's 605 manipulations of one or more Objects 616 and situations when the Instruction Sets 526 are used in/for Device's 98 manipulations of one or more Objects 615. For example, Instruction Set 526 Avatar.Arm.touch (0.1, 0.25, 0.35) can be adjusted 0.05 meters in Y value to become Device.Arm.touch (0.1, 0.3, 0.35), thereby accounting for a higher distance of one or more Objects 615 from Device 98 than when the Instruction Set 526 was learned. Any other modifications of Instruction Sets 526 learned in/for Avatar 605 can be made to make the Instruction Sets 526 suitable for use in/for one or more Devices 98.

In some aspects, Unit for Object Manipulation Using Artificial Knowledge 170 may cause Device 98 to perform physical or mechanical manipulations of one or more Objects 615, electrical, magnetic, or electro-magnetic manipulations of one or more Objects 615, and/or acoustic manipulations of one or more Objects 615 using artificial knowledge learned in/for Avatar 605. In other aspects, Unit for Object Manipulation Using Artificial Knowledge 170 comprises functionality for causing Device 98 to reposition itself relative to one or more Objects 615 (i.e. physical objects, etc.) so that Device 98 is positioned similar to the position when a manipulation of one or more Objects 616 (i.e. computer generated objects, etc.) was learned. For example, Unit for Object Manipulation Using Artificial Knowledge 170 may cause Device 98 to circle around, position itself at various distances, or move in other patterns relative to one or more Objects 615 to find a position similar to the position when a manipulation of one or more Objects 616 was learned. In further aspects, Instruction Sets 526 correlated with any one or more Collections of Object Representations 525 that include multiple Object Representations 630 may be used as if the Instruction Sets 526 pertain to all Object Representations 630 or to individual Object Representations 630 of the one or more Collections of Object Representations 525. Therefore, Unit for Object Manipulation Using Artificial Knowledge 170 can cause Device's 98 manipulations of an individual Object 615 using the artificial knowledge learned in/for Avatar's 605 manipulations of multiple Objects 616 without having to detect all of the multiple Objects 616 as when the artificial knowledge was learned. In further aspects, incoming one or more Collections of Object Representations 525 from Object Processing Unit 115 do not need to represent exactly the same one or more Objects 615/Objects 616 or state of one or more Objects 615/Objects 616 as when the artificial knowledge of manipulations of the one or more Objects 616 was learned. Unit for Object Manipulation Using Artificial Knowledge 170 can utilize Comparison 725 to determine at least partial match between the incoming one or more Collections of Object Representations 525 from Object Processing Unit 115 and one or more Collections of Object Representations 525 from Knowledge Structure 160. For example, at least partial match can be determined for a similar type Object 615 or Object 616, similarly sized Object 615 or Object 616, similarly shaped Object 615 or Object 616, similarly positioned Object 615 or Object 616, similar condition Object 615 or Object 616, and/or others as defined by the rules or thresholds for at least partial match (later described). Therefore, Unit for Object Manipulation Using Artificial Knowledge 170 can implement manipulations of one or more Objects 615 in the physical world using artificial knowledge learned from manipulating different one or more Objects 616 in Application Program 18.

In further embodiments, Instruction Set Converter 381 comprises functionality for converting or modifying Instruction Sets 526. Instruction Set Converter 381 comprises functionality for converting Instruction Sets 526 learned on/by/for Device 98 into Instruction Sets 526 that can be used on/by/for Avatar 605. Instruction Set Converter 381 comprises functionality for converting Instruction Sets 526 learned in/for Device's 98 manipulations of one or more Objects 615 in physical world into Instruction Sets 526 for Avatar's 605 manipulations of one or more Objects 616 in Application Program 18. Instruction Set Converter 381 may comprise other functionalities.

In some embodiments, Knowledge Structure 160 (i.e. Collection of Sequences 160*a*, Graph or Neural Network 160*b*, Collection of Knowledge Cells [not shown], etc.) includes artificial knowledge of Device's 98 manipulations of one or more Objects 615 and/or artificial knowledge of observed manipulations of one or more Objects 615. In some aspects, one or more Objects 616 (i.e. computer generated objects, etc.), their states, and/or their properties can be detected or obtained in Application Program 18, and provided as one or more Collections of Object Representations 525 to Unit for Object Manipulation Using Artificial Knowledge 170. Unit for Object Manipulation Using Artificial Knowledge 170 may then select or determine Instruction Sets 526 to be used or executed in/for Avatar's 605 manipulations of the one or more Objects 616 using artificial knowledge from Knowledge Structure 160 learned in/for Device's 98 manipulations of one or more Objects 615. Unit for Object Manipulation Using Artificial Knowledge 170 and/or elements (i.e. Instruction Set Converter 381, etc.) thereof may convert Instruction Sets 526 learned in/for Device's 98 manipulations of one or more Objects 615 into Instruction Sets 526 for Avatar's 605 manipulations of one or more Objects 616. Unit for Object Manipulation Using Artificial Knowledge 170 and/or elements (i.e. Instruction Set Converter 381, etc.) thereof may provide such converted Instruction Sets 526 to Instruction Set implementation Interface 180 for execution and Avatar's 605 implementation of the manipulations. In some designs, Device 98 may simulate or resemble Avatar 605. In such designs, Device's 98 size, shape, elements, and/or other properties may resemble Avatar's 605 size, shape, elements, and/or other properties. In one example, a car Device 98 may simulate or resemble a car Avatar 605, in which case the car Device's 98 size (i.e. 4.5 m×1.8 m×1.5 m, etc.), shape (i.e. sedan shape, etc.), elements (i.e. body, wheels, etc.), and/or other properties may resemble the car Avatar's 605 size (i.e. 4.5 m×1.8 m×1.5 m, etc.), shape (i.e. sedan shape, etc.), elements (i.e. body, wheels, etc.), and/or other properties. In another example, a robot Device 98 may simulate or resemble a robot Avatar 605, in which case the robot Device's 98 size (i.e. 0.5 m×0.35 m×0.4 m, etc.), shape (i.e. rectangular body with elongated arm, etc.), elements (i.e. body, wheels, arm, etc.), and/or other properties may resemble the robot Avatar's 605 size (i.e. 0.5 m×0.35 m×0.4 m, etc.), shape (i.e. rectangular body with elongated arm, etc.), elements (i.e. body, wheels, arm, etc.), and/or other properties. In some aspects, one or more Objects 615 (i.e. physical objects, etc.) may similarly simulate or resemble one or more Objects 616 (i.e. computer generated objects, etc.). In such designs, Object's 615 size, shape, elements, and/or other properties may resemble Object's 616 size, shape, elements, and/or other properties.

In some embodiments where Device 98 simulates or resembles Avatar 605 (i.e. Device's 98 size, shape, elements, and/or other properties resemble Avatar's 605 size, shape, elements, and/or other properties, etc.) and where a reference for Avatar 605 is used in Instruction Sets 526 for operating Device 98, same Instruction Sets 526 learned in/for Device's 98 manipulations of one or more Objects 615 can be used in/for Avatar's 605 manipulations of one or more Objects 616, in which case Instruction Set Converter 381 can be optionally omitted. For example, Instruction Sets 526 Avatar.Move (1.8, 2.4, 0), Avatar.Arm.touch (0.1, 0.25, 0.35), Avatar.Arm.push (forward, 0.15), and/or others learned in/for Device's 98 manipulations of one or more Objects 615 can be used in/for Avatar's 605 manipulations of one or more Objects 616. Although, it refers to Device 98, the reference "Avatar" in Instruction Sets 526 Avatar.Move (1.8, 2.4, 0), Avatar.Arm.touch (0.1, 0.25, 0.35), Avatar.Arm.push (forward, 0.15), and/or others learned in/for Device's 98 manipulations of one or more Objects 615 is purposely used so that the Instruction Sets 526 can be readily used in/for Avatar 605 without needing to be converted or modified. In some embodiments where Device 98 simulates or resembles Avatar 605 (i.e. Device's 98 size, shape, elements, and/or other properties resemble Avatar's 605 size, shape, elements, and/or other properties, etc.) and where a reference for Avatar 605 is not used in/for Instruction Sets 526 for operating Device 98, a reference for Device 98 in Instruction Sets 526 learned in/for Device's 98 manipulations of one or more Objects 615 can be replaced with a reference for Avatar 605 so that the Instruction Sets 526 can be used in/for Avatar's 605 manipulations of one or more Objects 616. For example, Instruction Sets 526 Device.Move (1.8, 2.4, 0), Device.Arm.touch (0.1, 0.25, 0.35), Device.Arm.push (forward, 0.15), and/or others learned in/for Device's 98 manipulations of one or more Objects 615 can be modified to be used as Instruction Set 526 Avatar. Move (1.8, 2.4, 0), Avatar.Arm.touch (0.1, 0.25, 0.35), Avatar.Arm.push (forward, 0.15), and/or others respectively in/for Avatar's 605 manipulations of one or more Objects 616. For instance, such modification or replacement of references can be implemented using a table (i.e. lookup table, etc.) where one column includes a reference for Device 98 and another column includes a reference for Avatar 605. In some aspects, similar modification or replacement of references can be used with respect to any elements (i.e. arm, leg, antenna, wheel, etc.) of Avatar 605 and/or Device 98. Any other technique for modifying or replacing of references, and/or those known in art, can be used.

In some embodiments where Device 98 does not simulate or resemble Avatar 605 (i.e. Device's 98 size, shape, elements, and/or other properties do not resemble Avatar's 605 size, shape, elements, and/or other properties, etc.), Instruction Set Converter 381 can modify Instruction Sets 526 learned in/for Device's 98 manipulations of one or more Objects 615 so that they can be used by any Avatar 605 and/or any element of Avatar 605 that can perform the needed manipulations. Such modifying can include or be performed after identifying (i.e. using trial of various elements to find an element that can perform the needed manipulations, using other techniques, etc.) such Avatar 605 and/or element of Avatar 605 that can perform the needed manipulations. In one example, Instruction Set 526 Device.Move (1.8, 2.4, 0) learned with respect to Device 98 that moves on legs can be modified to be used as Instruction Set 526 Avatar. Move (1.8, 2.4, 0) with respect Avatar 605 that moves on wheels. In designs where movement is implemented, avatars can move to a particular point in computer generated space specified in an Instruction Set 526, whereas, the rotation, steering, movement, and/or other low level operations of their wheels, legs, or other movement elements are handled automatically by the avatar control system. In another example, Instruction Set 526 Device.Arm.touch (0.1, 0.25, 0.35) learned in/for Device's 98 manipulations of one or more Objects 615 can be modified to be used as Instruction Set 526 Avatar. Leg.touch (0.1, 0.25, 0.35) in/for Avatar's 605 manipulations of one or more Objects 616. In designs where an arm, leg, or other extremity is used, arms, legs, or other extremities can position at a particular point in space specified in an Instruction Set 526, whereas, the angles, movement, and/or other low level operations of their elbows are handled automatically by the arm's, leg's, other extremity's, or avatar's control system. In a further example, Instruction Set 526 Device.Arm.grip ( ) learned in/for Device's 98 manipulations of one or more Objects 615 can be modified to be used as Instruction Set 526 Avatar. Cable.grip ( ) n/for Avatar's 605 manipulations of one or more Objects 616. In other embodiments where Device 98 does not simulate or resemble Avatar 605 (i.e. Device's 98 size, shape, elements, and/or other properties do not resemble Avatar's 605 size, shape, elements, and/or other properties, etc.), Instruction Set Converter 381 can modify Instruction Sets 526 learned in/for Device's 98 manipulations of one or more Objects 615 to account for differences between Device 98 and Avatar 605. For example, Instruction Set 526 Device.Arm.touch (0.1, 0.25, 0.35) learned with respect to Device 98 may be modified or adjusted 0.1 meters in Z value to become Avatar.Arm.touch (0.1, 0.25, 0.45), thereby accounting for height (i.e. physical height of Device 98 and simulated height of Avatar 605, etc.) difference of 0.1 meters between Device 98 and Avatar 605. In this example, Instruction Set 526 Avatar.Arm.touch (X, Y, Z) may be used to cause Avatar's 605 arm to extend and touch location in space defined by coordinates X (i.e. lateral offset relative to Avatar 605, etc.), Y (i.e. depth offset relative to Avatar 605, etc.), and Z (i.e. vertical offset relative to Avatar 605, etc.). In further embodiments, Instruction Set Converter 381 can modify Instruction Sets 526 learned in/for Device's 98 manipulations of one or more Objects 615 to account for variations between situations when the Instruction Sets 526 were learned in/for Device's 98 manipulations of one or more Objects 615 and situations when the Instruction Sets 526 are used in/for Avatar's 605 manipulations of one or more Objects 616. For example, Instruction Set 526 Device.Arm.touch (0.1, 0.25, 0.35) can be adjusted 0.05 meters in Y value to become Avatar.Arm.touch (0.1, 0.3, 0.35), thereby accounting for a higher distance of one or more Objects 616 from Avatar 605 than when the Instruction Set 526 was learned. Any other modifications of Instruction Sets 526 learned in/for Device 98 can be made to make the Instruction Sets 526 suitable for use in/for one or more Avatars 605. In some aspects, Unit for Object Manipulation Using Artificial Knowledge 170 may cause Avatar 605 to perform simulated physical or simulated mechanical manipulations of one or more Objects 616, simulated electrical, simulated magnetic, or simulated electro-magnetic manipulations of one or more Objects 616, and/or simulated acoustic manipulations of one or more Objects 616 using artificial knowledge learned in/for Device 98. In other aspects, Unit for Object Manipulation Using Artificial Knowledge 170 comprises functionality for causing Avatar 605 to reposition itself relative to one or more Objects 616 so that Avatar 605 is positioned similar to the position when a manipulation of one or more Objects 615 was learned. For example, Unit for Object Manipulation Using Artificial Knowledge 170 may cause Avatar 605 to circle around, position itself at various distances, or move in other patterns relative to one or more Objects 616 to find a position similar to the position when a manipulation of the one or more Objects 615 was learned. In further aspects, Instruction Sets 526 correlated with any one or more Collections of Object Representations 525 that include multiple Object Representations 630 may be used as if the Instruction Sets 526 pertain to all Object Representations 630 or to individual Object Representations 630 of the one or more Collections of Object Representations 525. Therefore, Unit for Object Manipulation Using Artificial Knowledge 170 can cause Avatar's 605 manipulations of an individual Object 616 using artificial knowledge learned in/for Device's 98 manipulations of multiple Objects 615 without having to detect or obtain all of the multiple Objects 615 as when the artificial knowledge was learned. In further aspects, incoming one or more Collections of Object Representations 525 from Object Processing Unit 115 do not need to represent exactly the same one or more Objects 616/Objects 615 or state of one or more Objects 616/Objects 615 as when the artificial knowledge of manipulations of the one or more Objects 615 was learned. Unit for Object Manipulation Using Artificial Knowledge 170 can utilize Comparison 725 to determine at least partial match between the incoming one or more Collections of Object Representations 525 from Object Processing Unit 115 and one or more Collections of Object Representations 525 from Knowledge Structure 160. For example, at least partial match can be determined for a similar type Object 616 or Object 615, similarly sized Object 616 or Object 615, similarly shaped Object 616 or Object 615, similarly positioned Object 616 or Object 615, similar condition Object 616 or Object 615, and/or others as defined by the rules or thresholds for at least partial match (later described). Therefore, Unit for Object Manipulation Using Artificial Knowledge 170 can implement manipulations of one or more Objects 616 in Application Program 18 using artificial knowledge learned from manipulating different one or more Objects 615 in the physical world.

One of ordinary skill in art will understand that the aforementioned elements and/or techniques related to Unit for Object Manipulation Using Artificial Knowledge 170 and/or elements (i.e. Instruction Set Converter 381, etc.) thereof are described merely as examples of a variety of possible implementations, and that while all possible elements and/or techniques related to Unit for Object Manipulation Using Artificial Knowledge 170 and/or elements (i.e. Instruction Set Converter 381, etc.) thereof are too voluminous to describe, other elements and/or techniques are within the scope of this disclosure. For example, other additional elements and/or techniques can be included as needed, or some of the disclosed ones can be excluded or altered, or a combination thereof can be utilized in alternate embodiments of Unit for Object Manipulation Using Artificial Knowledge 170 and/or elements (i.e. Instruction Set Converter 381, etc.) thereof.

Figure 33:
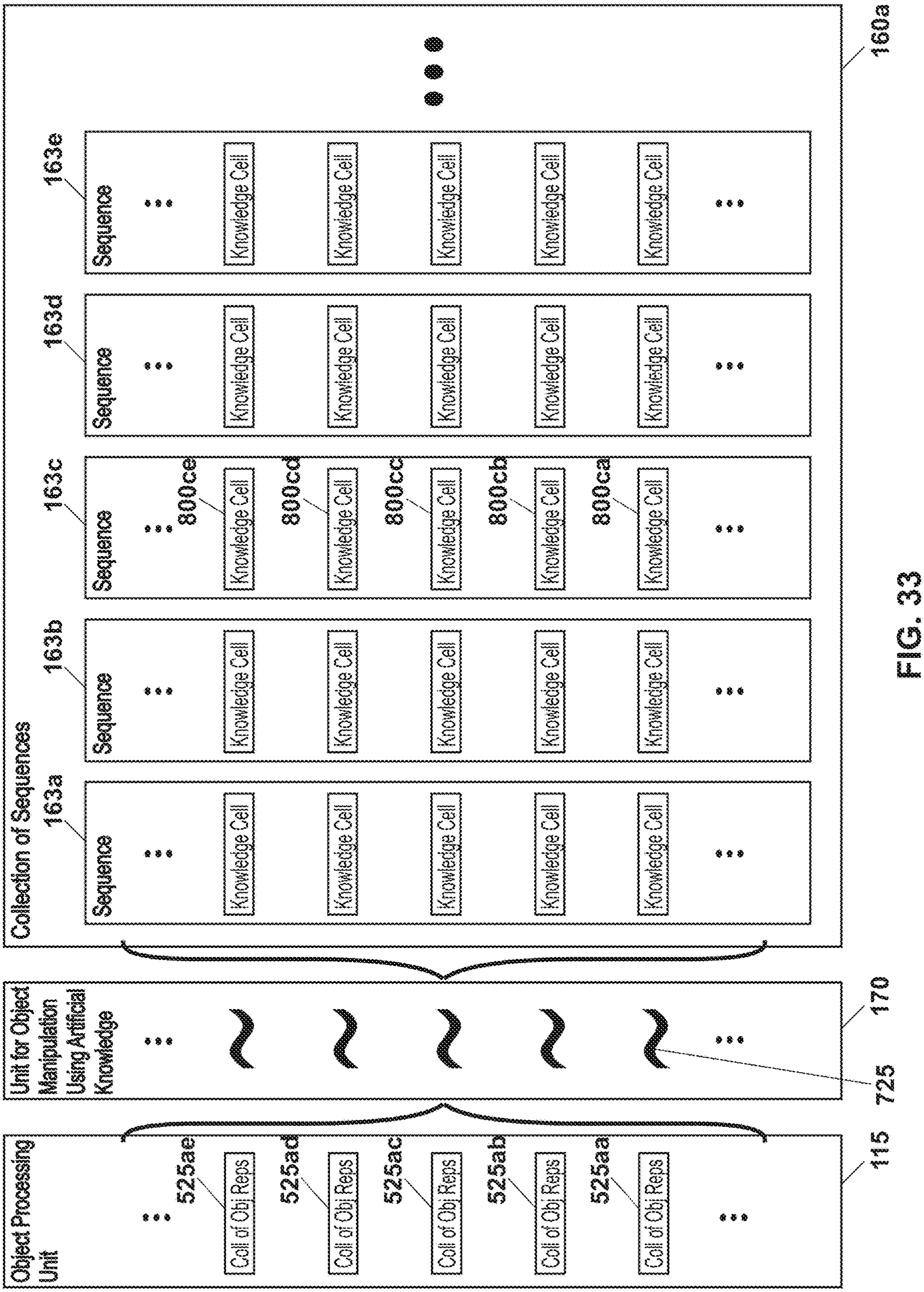
FIG. 33 illustrates an embodiment of utilizing Collection of Sequences 160*a* in manipulations using artificial knowledge.

Referring to FIG. 33, an embodiment of utilizing Collection of Sequences **160*a* in Device's 98 manipulations of one or more Objects 615 (i.e. physical objects, etc.) using artificial knowledge or Avatar's 605 manipulations of one or more Objects 616 (i.e. computer generated objects, etc.) using artificial knowledge is illustrated. Collection of Sequences 160*a* may include knowledge (i.e. Sequences 163 of Knowledge Cells 800 comprising one or more Collections of Object Representations 525 correlated with any Instruction Sets 526, etc.) of: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, and/or observed manipulations of one or more Objects 616 as previously described. In some aspects, Device's 98 manipulations of one or more Objects 615 using Collection of Sequences 160*a* or Avatar's 605 manipulations of one or more Objects 616 using Collection of Sequences 160*a* may include determining or selecting a Sequence 163 of Knowledge Cells 800 or portions (i.e. Collections of Object Representations 525, Instruction Sets 526, sub-sequence, etc.) thereof from Collection of Sequences 160*a***.

In some embodiments, Unit for Object Manipulation Using Artificial Knowledge 170 can perform Comparisons 725 (later described) of incoming one or more Collections of Object Representations 525 or portions (i.e. Object Representations 625, Object Properties 630, etc.) thereof from Object Processing Unit 115 with one or more Collections of Object Representations 525 or portions thereof in Knowledge Cells 800 from Sequences 163 of Collection of Sequences **160*a*. If at least partially matching one or more Collections of Object Representations 525 or portions thereof are found in a Knowledge Cell 800 from a Sequence 163 of Collection of Sequences 160*a*, Unit for Object Manipulation Using Artificial Knowledge 170 can select Instruction Sets 526 correlated with one or more Collections of Object Representations 525 in a subsequent Knowledge Cell 800 from the Sequence 163 to be used or executed in effecting a subsequent (i.e. beneficial, different, resulting, etc.) state of one or more Objects 615 (i.e. physical objects, etc.) or one or more Objects 616 (i.e. computer generated objects, etc.). For example, Unit for Object Manipulation Using Artificial Knowledge 170 can perform Comparisons 725 of Collection of Object Representations 525*aa* or portions thereof from Object Processing Unit 115 with Collections of Object Representations 525 or portions thereof in Knowledge Cells 800 from Sequences 163*a*-163*e*, etc. of Collection of Sequences 160*a*. Unit for Object Manipulation Using Artificial Knowledge 170 can make a first determination that Collection of Object Representations 525*aa* or portions thereof from Object Processing Unit 115 at least partially match Collection of Object Representations 525 or portions thereof in Knowledge Cell 800*ca* from Sequence 163*c*, hence, Unit for Object Manipulation Using Artificial Knowledge 170 may access Collection of Object Representations 525 in subsequent Knowledge Cell 800*cb*. Unit for Object Manipulation Using Artificial Knowledge 170 can optionally make a second determination, by performing Comparisons 725, that Collection of Object Representations 525*aa* or portions thereof from Object Processing Unit 115 differ from Collection of Object Representations 525 or portions thereof in Knowledge Cell 800*cb*. If provided with a collection of object representations representing a beneficial state of one or more Objects 615 or one or more Objects 616, Unit for Object Manipulation Using Artificial Knowledge 170 can optionally make a third determination, by performing Comparisons 725, that the collection of object representations or portions thereof representing the beneficial state of the one or more Objects 615 or one or more Objects 616 at least partially match Collection of Object Representations 525 or portions thereof in Knowledge Cell 800***cb*. In response to at least the first determination, Unit for Object Manipulation Using Artificial Knowledge 170 may select for execution Instruction Sets 526 correlated with Collection of Object Representations 525 in Knowledge Cell 800*cb*, thereby enabling Device's 98 manipulation of one or more Objects 615 using artificial knowledge or Avatar's 605 manipulation of one or more Objects 616 using artificial knowledge. Unit for Object Manipulation Using Artificial Knowledge 170 can then perform Comparison 725 of Collection of Object Representations 525*ab* or portions thereof from Object Processing Unit 115 with Collection of Object Representations 525 or portions thereof in Knowledge Cell 800*cb* from Sequence 163*c* of Collection of Sequences 160*a*. Unit for Object Manipulation Using Artificial Knowledge 170 can make a first determination that Collection of Object Representations 525*ab* or portions thereof from Object Processing Unit 115 at least partially match Collection of Object Representations 525 or portions thereof in Knowledge Cell 800*cb*, hence, Unit for Object Manipulation Using Artificial Knowledge 170 may access Collection of Object Representations 525 in subsequent Knowledge Cell 800*cc*. Unit for Object Manipulation Using Artificial Knowledge 170 can optionally make a second determination, by performing Comparison 725, that Collection of Object Representations 525*ab* or portions thereof from Object Processing Unit 115 differ from Collection of Object Representations 525 or portions thereof in Knowledge Cell 800*cc*. If provided with a collection of object representations representing a beneficial state of one or more Objects 615 or one or more Objects 616, Unit for Object Manipulation Using Artificial Knowledge 170 can optionally make a third determination, by performing Comparison 725, that the collection of object representations or portions thereof representing the beneficial state of the one or more Objects 615 or one or more Objects 616 at least partially match Collection of Object Representations 525 or portions thereof in Knowledge Cell 800*cc*. In response to at least the first determination, Unit for Object Manipulation Using Artificial Knowledge 170 may select for execution Instruction Sets 526 correlated with Collection of Object Representations 525 in Knowledge Cell 800*cc*, thereby enabling Device's 98 manipulation of one or more Objects 615 using artificial knowledge or Avatar's 605 manipulation of one or more Objects 616 using artificial knowledge. Unit for Object Manipulation Using Artificial Knowledge 170 can implement similar logic or process for any additional Collections of Object Representations 525 or portions thereof from Object Processing Unit 115 such as Collections of Object Representations 525*ac*-525*ae*, etc. or portions thereof, as applicable to Knowledge Cells 800*cc*-800*ce*, etc. or portions thereof, and so on.

Figure 34:
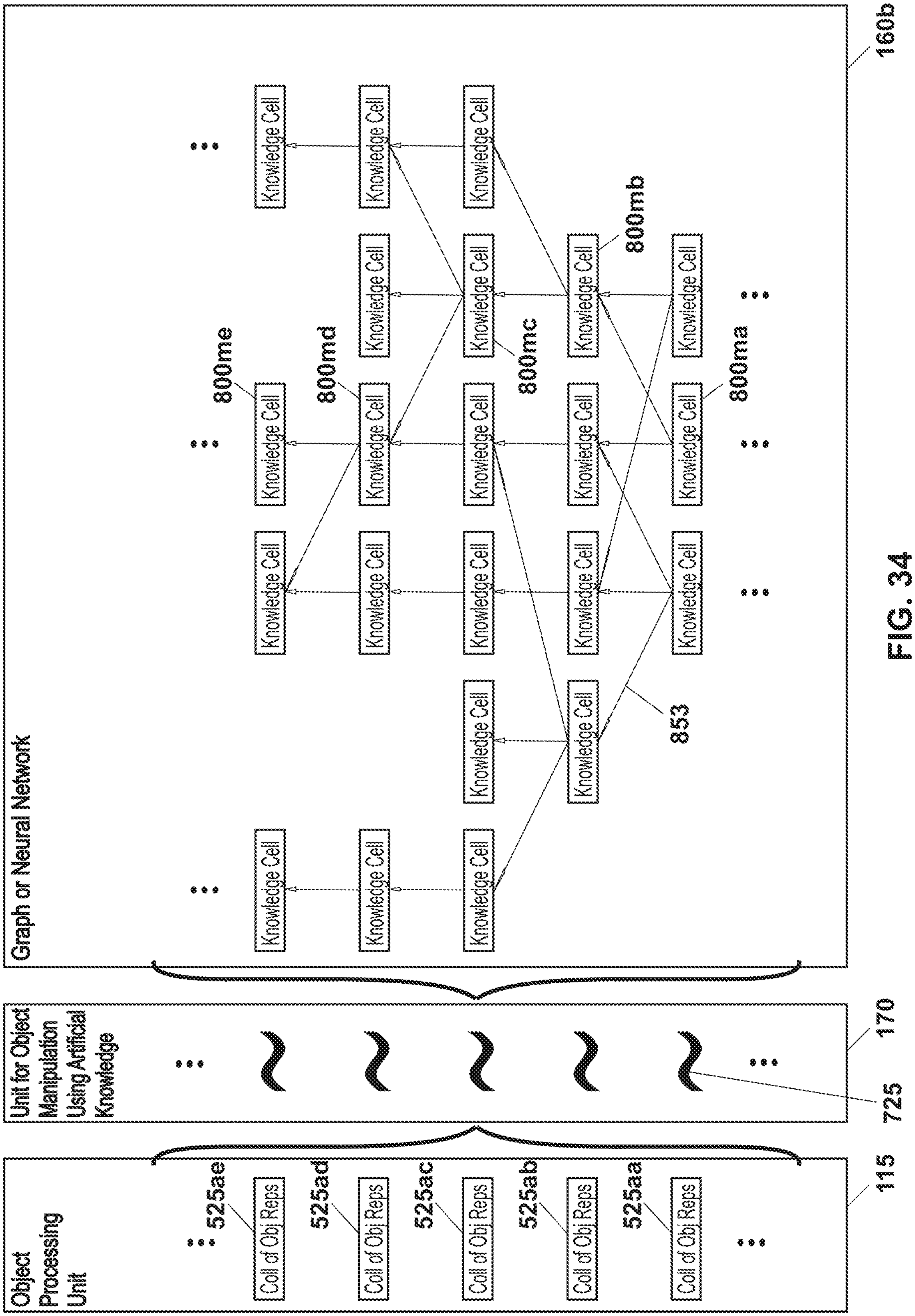
FIG. 34 illustrates an embodiment of utilizing Graph or Neural Network 160*b* in manipulations using artificial knowledge.

Referring to FIG. 34, an embodiment of utilizing Graph or Neural Network 160*b* in Device's 98 manipulations of one or more Objects 615 (i.e. physical objects, etc.) using artificial knowledge or Avatar's 605 manipulations of one or more Objects 616 (i.e. computer generated objects, etc.) using artificial knowledge is illustrated. Graph or Neural Network 160*b* may include knowledge (i.e. connected Knowledge Cells 800 comprising one or more Collections of Object Representations 525 correlated with any Instruction Sets 526, etc.) of: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, and/or observed manipulations of one or more Objects 616 as previously described. In some aspects, Device's 98 manipulations of one or more Objects 615 using Graph or Neural Network 160*b* or Avatar's 605 manipulations of one or more Objects 616 using Graph or Neural Network 160*b* may include determining or selecting a path of Knowledge Cells 800 or portions (i.e. Collections of Object Representations 525, Instruction Sets 526, etc.) thereof through or Neural Network 160*b*.

In some embodiments, Unit for Object Manipulation Using Artificial Knowledge 170 can perform Comparisons 725 of incoming one or more Collections of Object Representations 525 or portions (i.e. Object Representations 625, Object Properties 630, etc.) thereof from Object Processing Unit 115 with one or more Collections of Object Representations 525 or portions thereof in Knowledge Cells 800 from Graph or Neural Network 160*b*. If at least partially matching one or more Collections of Object Representations 525 or portions thereof are found in a Knowledge Cell 800 from Graph or Neural Network 160*b*, Unit for Object Manipulation Using Artificial Knowledge 170 can select Instruction Sets 526 correlated with one or more Collections of Object Representations 525 in a subsequent connected Knowledge Cell 800 to be used or executed in effecting a subsequent (i.e. beneficial, different, resulting, etc.) state of one or more Objects 615 (i.e. physical objects, etc.) or one or more Objects 616 (i.e. computer generated objects, etc.). For example, Unit for Object Manipulation Using Artificial Knowledge 170 can perform Comparisons 725 of Collection of Object Representations 525*aa* or portions thereof from Object Processing Unit 115 with Collection of Object Representations 525 or portions thereof in Knowledge Cells 800 from Graph or Neural Network 160*b*. Unit for Object Manipulation Using Artificial Knowledge 170 can make a first determination that Collection of Object Representations 525*aa* or portions thereof from Object Processing Unit 115 at least partially match Collection of Object Representations 525 or portions thereof in Knowledge Cell 800*ma*, hence, Unit for Object Manipulation Using Artificial Knowledge 170 may access one or more Collections of Object Representations 525 in Knowledge Cells 800 connected with Knowledge Cell 800*ma* by outgoing Connections 853. Unit for Object Manipulation Using Artificial Knowledge 170 can optionally make a second determination, by performing Comparison 725, that Collection of Object Representations 525*aa* or portions thereof from Object Processing Unit 115 differ from Collection of Object Representations 525 or portions thereof in Knowledge Cell 800*mb*. If provided with a collection of object representations representing a beneficial state of one or more Objects 615 or one or more Objects 616, Unit for Object Manipulation Using Artificial Knowledge 170 can optionally make a third determination, by performing Comparison 725, that the collection of object representations or portions thereof representing the beneficial state of the one or more Objects 615 or one or more Objects 616 at least partially match Collection of Object Representations 525 or portions thereof in Knowledge Cell 800*mb*. In response to at least the first determination, Unit for Object Manipulation Using Artificial Knowledge 170 may select for execution Instruction Sets 526 correlated with one or more Collections of Object Representations 525 in Knowledge Cell 800*mb*, thereby enabling Device's 98 manipulation of one or more Objects 615 using artificial knowledge or Avatar's 605 manipulation of one or more Objects 616 using artificial knowledge. Unit for Object Manipulation Using Artificial Knowledge 170 can then perform Comparison 725 of Collection of Object Representations 525*ab* or portions thereof from Object Processing Unit 115 with Collection of Object Representations 525 or portions thereof in Knowledge Cell 800*mb*. Unit for Object Manipulation Using Artificial Knowledge 170 can make a first determination that Collection of Object Representations 525*ab* or portions thereof from Object Processing Unit 115 at least partially match Collection of Object Representations 525 or portions thereof in Knowledge Cell 800*mb*, hence, Unit for Object Manipulation Using Artificial Knowledge 170 may access one or more Collections of Object Representations 525 in Knowledge Cells 800 connected with Knowledge Cell 800*mb* by outgoing Connections 853. Unit for Object Manipulation Using Artificial Knowledge 170 can optionally make a second determination, by performing Comparison 725, that Collection of Object Representations 525*ab* or portions thereof from Object Processing Unit 115 differ from Collection of Object Representations 525 or portions thereof in Knowledge Cell 800*mc*. If provided with a collection of object representations representing a beneficial state of one or more Objects 615 or one or more Objects 616, Unit for Object Manipulation Using Artificial Knowledge 170 can optionally make a third determination, by performing Comparison 725, that the collection of object representations or portions thereof representing the beneficial state of the one or more Objects 615 or one or more Objects 616 at least partially match one or more Collections of Object Representations 525 or portions thereof in Knowledge Cell 800*mc*. In response to at least the first determination, Unit for Object Manipulation Using Artificial Knowledge 170 may select for execution Instruction Sets 526 correlated with Collection of Object Representations 525 in Knowledge Cell 800*mc*, thereby enabling Device's 98 manipulation of one or more Objects 615 using artificial knowledge or Avatar's 605 manipulation of one or more Objects 616 using artificial knowledge. Unit for Object Manipulation Using Artificial Knowledge 170 can implement similar logic or process for any additional Collections of Object Representations 525 or portions thereof from Object Processing Unit 115 such as Collections of Object Representations 525*ac*-525*ae*, etc. or portions thereof, as applicable to Knowledge Cells 800*mc*-800*me*, etc. or portions thereof, and so on.

In some embodiments, Collection of Knowledge Cells (not shown) can be utilized in Device's 98 manipulations of one or more Objects 615 (i.e. physical objects, etc.) using artificial knowledge or Avatar's 605 manipulations of one or more Objects 616 (i.e. computer generated objects, etc.) using artificial knowledge. Collection of Knowledge Cells may include knowledge (i.e. Knowledge Cells 800 comprising one or more Collections of Object Representations 525 or pairs of one or more Collections of Object Representations 525 correlated with any Instruction Sets 526, etc.) of: i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, and/or observed manipulations of one or more Objects 616 as previously described. In some aspects, Device's 98 manipulations of one or more Objects 615 using Collection of Knowledge Cells or Avatar's 605 manipulations of one or more Objects 616 using Collection of Knowledge Cells may include determining or selecting Knowledge Cells 800 or portions (i.e. Collections of Object Representations 525, Instruction Sets 526, etc.) thereof from Collection of Knowledge Cells. In some embodiments where each Knowledge Cell 800 of Collection of Knowledge Cells includes a pair of one or more starting and subsequent (i.e. resulting, etc.) Collections of Object Representations 525 correlated with any Instruction Sets 526, Unit for Object Manipulation Using Artificial Knowledge 170 can perform Comparisons 725 of incoming one or more Collections of Object Representations 525 or portions thereof from Object Processing Unit 115 with one or more starting Collections of Object Representations 525 or portions thereof in Knowledge Cells 800 from Collection of Knowledge Cells. If at least partially matching one or more starting Collections of Object Representations 525 or portions thereof are found in a Knowledge Cell 800 from Collection of Knowledge Cells, Unit for Object Manipulation Using Artificial Knowledge 170 can select Instruction Sets 526 correlated with the pair of one or more starting and subsequent Collections of Object Representations 525 in the Knowledge Cell 800 to be used or executed in effecting a subsequent (i.e. beneficial, different, resulting, etc.) state of one or more Objects 615 or one or more Objects 616, thereby enabling Device's 98 manipulation of one or more Objects 615 using artificial knowledge or Avatar's 605 manipulation of one or more Objects 616 using artificial knowledge.

The foregoing embodiments provide examples of utilizing various Knowledge Structures 160 (i.e. Collection of Sequences 160*a*, Graph or Neural Network 160*b*, Collection of Knowledge Cells [not shown], etc.), Knowledge Cells 800, Connections 853 where applicable, Collections of Object Representations 525, Instruction Sets 526, Comparisons 725, and/or other elements or techniques in Device's 98 manipulations of one or more Objects 615 (i.e. physical objects, etc.) using artificial knowledge or Avatar's 605 manipulations of one or more Objects 616 (i.e. computer generated objects, etc.) using artificial knowledge. It should be understood that any of these elements and/or techniques can be omitted, used in a different combination, or used in combination with other elements and/or techniques. In some aspects, Knowledge Cells 800 can be omitted, in which case portions (i.e. Collections of Object Representations 525, Instruction Sets 526, etc.) of Knowledge Cells 800, instead of Knowledge Cells 800 themselves, can be utilized as Nodes 852 in Knowledge Structure 160. In other aspects, although, Extra Info 527 is not shown in some figures for clarity of illustration, it should be noted that any Knowledge Cell 800, Collection of Object Representations 525, Instruction Set 526, and/or other element may include or be associated with Extra Info 527 and Extra Info 527 can be used for enhanced decision making and/or other functionalities. In further aspects, traversing of Knowledge Structures 160, Knowledge Cells 800, and/or other elements can be utilized. Any traversing patterns or techniques, and/or those known in art, can be utilized such as linear, divide and conquer, recursive, and/or others. In further aspects, as history of Knowledge Cells 800, Collections of Object Representations 525, and/or other elements becomes available, the history can be used in collective Comparisons 725. For example, as history of incoming Collections of Object Representations 525 becomes available from Object Processing Unit 115, Unit for Object Manipulation Using Artificial Knowledge 170 can perform Comparisons 725 of the history of Collections of Object Representations 525 or portions thereof from Object Processing Unit 115 with Collections of Object Representations 525 or portions thereof in one or more Knowledge Cells 800 from Knowledge Structure 160. In further aspects, it should be noted that any Knowledge Cell 800 may include one Collection of Object Representations 525 or a plurality (i.e. stream, etc.) of Collections of Object Representations 525. It should also be noted that any Knowledge Cell 800 may include no Instruction Sets 526, one Instruction Set 526, or a plurality of Instruction Sets 526. In further aspects, various arrangements of Collections of Object Representations 525 and/or other elements in a Knowledge Cell 800 can be utilized. In one example, Knowledge Cell 800 may include one or more Collections of Object Representations 525 correlated with any Instruction Sets 526. In another example, Knowledge Cell 800 may include one or more Collections of Object Representations 525, whereas, any Instruction Sets 526 may be included in or associated with Connections 853 among Knowledge Cells 800 where applicable. In a further example, Knowledge Cell 800 may include a pair of one or more Collections of Object Representations 525 correlated with any Instruction Sets 526. In further aspects, any time that at least partially matching one or more Collections of Object Representations 525 or portions thereof are not found (i.e. by the first determination, etc.) in any of the considered Knowledge Cells 800, Unit for Object Manipulation Using Artificial Knowledge 170 can optionally decide to look for at least partially matching one or more Collections of Object Representations 525 or portions thereof in Knowledge Cells 800 elsewhere in Knowledge Structure 160. In further aspects, concerning at least partial match determination, at least partially matching one or more Collections of Object Representations 525 or portions thereof may be found in multiple Knowledge Cells 800, in which case Unit for Object Manipulation Using Artificial Knowledge 170 may select for consideration Knowledge Cell 800 comprising one or more Collections of Object Representations 525 or portions thereof with highest match index (later described). In further aspects where at least partially matching one or more Collections of Object Representations 525 or portions thereof are found in multiple Knowledge Cells 800, Unit for Object Manipulation Using Artificial Knowledge 170 may select for consideration some or all of the multiple Knowledge Cells 800 comprising at least partially matching one or more Collections of Object Representations 525 or portions thereof. In further aspects, concerning difference determination, different one or more Collections of Object Representations 525 or portions thereof may be found in multiple Knowledge Cells 800, in which case Unit for Object Manipulation Using Artificial Knowledge 170 may select for consideration Knowledge Cell 800 comprising one or more Collections of Object Representations 525 or portions thereof with highest difference index (later described). In further aspects where different one or more Collections of Object Representations 525 or portions thereof are found in multiple Knowledge Cells 800, Unit for Object Manipulation Using Artificial Knowledge 170 may select for consideration some or all of the multiple Knowledge Cells 800 comprising different one or more Collections of Object Representations 525 or portions thereof. In further aspects, Unit for Object Manipulation Using Artificial Knowledge 170 can consider multiple sequences or paths of Knowledge Cells 800 or portions thereof in Knowledge Structure 160. In further aspects, the aforementioned embodiments describe performing multiple (i.e. four, etc.) successive manipulations of one or more Objects 615 (i.e. physical objects, etc.) or one or more Objects 616 (i.e. computer generated objects, etc.) using artificial knowledge. It should be noted that any number, including one, of manipulations of one or more Objects 615 or one or more Objects 616 using artificial knowledge can be performed. In further aspects, any time that one or more determinations of Unit for Object Manipulation Using Artificial Knowledge 170 are not made depending on implementation, Unit for Object Manipulation Using Artificial Knowledge 170 may stop processing a current sequence or path of Knowledge Cells 800 in Knowledge Structure 160 and/or proceed with other (i.e. next, etc.) one or more Collections of Object Representations 525 from Object Processing Unit 115. In further aspects, one or more collections of object representations representing a beneficial state of one or more Objects 615 or one or more Objects 616 that may be used in the third determination of Unit for Object Manipulation Using Artificial Knowledge 170 can be provided by Device Control Program 18*a* or elements (i.e. Use of Artificial Knowledge Logic 236, etc.) thereof, Avatar Control Program 18*b* or elements (i.e. Use of Artificial Knowledge Logic 336, etc.) thereof, and/or other system. Such one or more collections of object representations representing a beneficial state of one or more Objects 615 or one or more Objects 616 can be generated in a variety of data structures, data formats, and/or data arrangements, and including a variety of object representations (i.e. numeric, symbolic, pictographic, modeled, data structures, etc.) that may be different than the structure or format of Collections of Object Representations 525 in Knowledge Structure 160. In such instances, Comparison 725 may use mapping of fields/elements/portions in comparing such asymmetric data structures. In further aspects, instead of automatically processing incoming one or more Collections of Object Representations 525 from Object Processing Unit 115, Unit's for Object Manipulation Using Artificial Knowledge 170 processing or functionalities can be triggered or requested by Device Control Program 18*a*, Avatar Control Program 18*b*, and/or other system. This way, Unit's for Object Manipulation Using Artificial Knowledge 170 processing or functionalities can be performed when requested and artificial knowledge may be made available when needed. In further aspects, Device Control Program 18*a*, Avatar Control Program 18*b*, and/or other system may look for artificial knowledge related to specific one or more Objects 615 (i.e. physical objects, etc.) or one or more Objects 616 (i.e. computer generated objects, etc.), in which case Device Control Program 18*a*, Avatar Control Program 18*b*, and/or other system may provide one or more collections of object representations representing the specific one or more Objects 615 or one or more Objects 616 to Unit for Object Manipulation Using Artificial Knowledge 170. Unit for Object Manipulation Using Artificial Knowledge 170 may then search Knowledge Structure 160 for Collections of Object Representations 525 or portions thereof that at least partially match the one or more collections of object representations or portions thereof representing the specific one or more Objects 615 or one or more Objects 616. In further aspects, Unit for Object Manipulation Using Artificial Knowledge 170 may include any features, functionalities, and/or embodiments of Device Control Program 18*a* or elements (i.e. Use of Artificial Knowledge Logic 236, etc.) thereof, Avatar Control Program 18*b* or elements (i.e. Use of Artificial Knowledge Logic 336, etc.) thereof, and vice versa. In further aspects, in addition to selecting for execution Instruction Sets 526 correlated with one or more Collections of Object Representations 525 from a subsequent Knowledge Cell 800, Unit for Object Manipulation Using Artificial Knowledge 170 can further select for execution Instruction Sets 526 correlated with one or more Collections of Object Representations 525 from further subsequent Knowledge Cells 800 to effect further subsequent (i.e. beneficial, different, resulting, etc.) states of one or more Objects 615 or one or more Objects 616. In further aspects, any features, functionalities, and/or embodiments of Comparison 725, importance index (later described), match index (later described), difference index (later described), and/or other disclosed elements or techniques can be utilized to facilitate any of the aforementioned and/or other determinations of at least partial match and/or difference. In further aspects, Connections 853, where applicable, may optionally include or be associated with occurrence count, weight, and/or other parameter or data, which can be used in any of the comparisons, determinations, decision making, and/or other functionalities. One of ordinary skill in art will understand that the foregoing embodiments are described merely as examples of a variety of possible implementations of Device's 98 manipulations of one or more Objects 615 (i.e. physical objects, etc.) using artificial knowledge and/or Avatar's 605 manipulations of one or more Objects 616 (i.e. computer generated objects, etc.) using artificial knowledge, and that while all of their variations are too voluminous to describe, they are within the scope of this disclosure.

Figure 35:
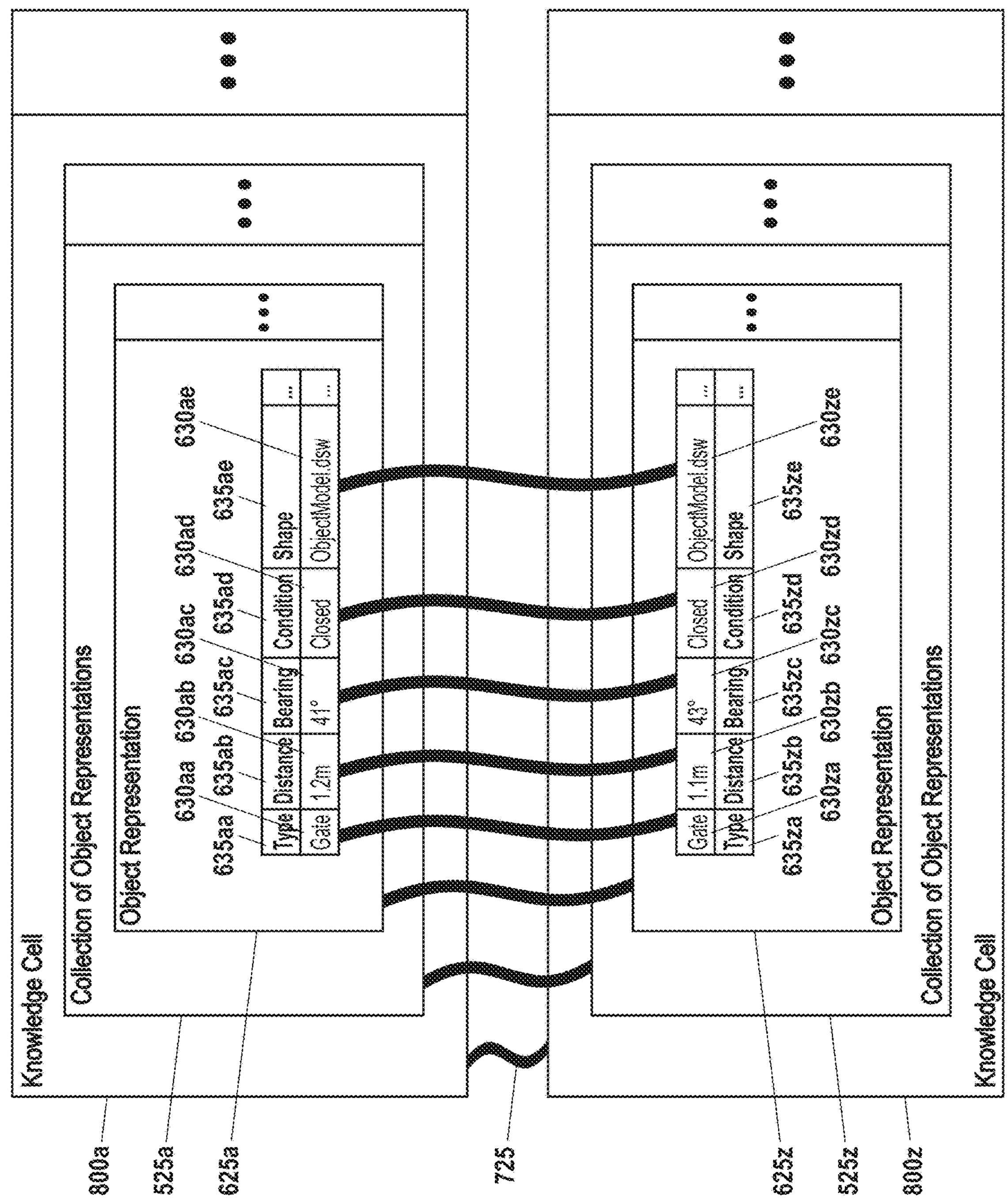
FIG. 35 illustrates an embodiment of utilizing Comparison 725.

Referring to FIG. 35, an embodiment of utilizing Comparison 725 is illustrated. Comparison 725 comprises functionality for comparing elements, and/or other functionalities. In some aspects, Comparison 725 comprises functionality for comparing Knowledge Cells 800 or portions thereof. In other aspects, Comparison 725 comprises functionality for comparing Purpose Representations 162 (later described) or portions thereof. In further aspects, Comparison 725 comprises functionality for comparing Collections of Object Representations 525 or portions thereof. In further aspects, Comparison 725 comprises functionality for comparing streams of Collections of Object Representations 525 or portions thereof. In further aspects, Comparison 725 comprises functionality for comparing Object Representations 625 or portions thereof. In further aspects, Comparison 725 comprises functionality for comparing Object Properties 630 or portions thereof. In further aspects, Comparison 725 comprises functionality for comparing Instruction Sets 526, Extra Info 527, models (i.e. 3D models, 2D models, etc.), pictures (i.e. digital pictures, etc.), text (i.e. characters, words, phrases, etc.), numbers, and/or other elements or portions thereof. Comparison 725 also comprises functionality for determining at least partial match of the compared elements. Comparison 725 also comprises functionality for determining difference of the compared elements. It should be noted that the at least partial match determination functionality of Comparison 725 and the difference determination functionality of Comparison 725 are separate functionalities. For example, the at least partial match determination functionality of Comparison 725 can be used where at least partial match of the compared elements needs to be determined, whereas, the difference determination functionality of Comparison 725 can be used where difference of the compared elements needs to be determined. Comparison 725 may include functions, rules, thresholds, logic, and/or techniques for determining at least partial match and/or difference of the compared elements. In some aspects, at least partial match/at least partially match/at least partially matching and/or other such references may be defined by the rules or thresholds for at least partial match and may include any degree of match or similarity, however high or low. As such, at least partial match may, in some instances, refer to substantial match or substantial similarity depending on implementation. Similarly, in some aspects, difference/different/differ and/or other such references may be defined by the rules or thresholds for difference and may include any degree of difference, however high or low. The rules or thresholds for at least partial match and/or difference can be defined by a user, by system administrator, or automatically by the system based on experience, learning, testing, inquiry, analysis, synthesis, or other techniques, knowledge, or input. One of ordinary skill in art will understand that any rules or thresholds can be used in any of the determinations herein depending on implementation. In some designs, Comparison 725 comprises the functionality to automatically define appropriately strict rules for determining at least partial match and/or difference of the compared elements. Comparison 725 can therefore set, reset, and/or adjust the strictness of the rules for determining at least partial match and/or difference of the compared elements, thereby fine tuning Comparison 725 so that the rules for determining at least partial match and/or difference are appropriately strict. In some designs, since Collection of Object Representations 525 may represent one or more Objects 615 (i.e. physical objects, etc.) or state of one or more Objects 615, Comparison 725 of Collections of Object Representations 525 or portions thereof enables comparing one or more Objects 615 or states of one or more Objects 615 with one or more Objects 615 or states of one or more Objects 615, and determining their at least partial match and/or difference. In other designs, since Collection of Object Representations 525 may represent one or more Objects 616 (i.e. computer generated objects, etc.) or state of one or more Objects 616, Comparison 725 of Collections of Object Representations 525 or portions thereof enables comparing one or more Objects 616 or states of one or more Objects 616 with one or more Objects 616 or states of one or more Objects 616, and determining their at least partial match and/or difference. In one example, the at least partial match determination functionality of Comparison 725 may determine that Object 615 or Object 616 detected or obtained at a distance of 7 m and an angle/bearing of 113° relative to Device 98 or Avatar 605 at least partially matches Object 615 or Object 616 detected or obtained at a distance of 6.8 m and an angle/bearing of 116° relative to Device 98 or Avatar 605. In another example, the at least partial match determination functionality of Comparison 725 may determine that Object 615 or Object 616 detected or obtained at relative coordinates [4.7, 5.4, 0] relative to Device 98 or Avatar 605 at least partially matches Object 615 or Object 616 detected or obtained at relative coordinates [4.6, 5.7, 0] relative to Device 98 or Avatar 605. In a further example, the at least partial match determination functionality of Comparison 725 may determine that Object 615 or Object 616 detected or obtained as a passenger vehicle at least partially matches Object 615 or Object 616 detected or obtained as a sport utility vehicle. In a further example, the difference determination functionality of Comparison 725 may determine that Object 615 or Object 616 detected or obtained at a distance of 3 m and an angle/bearing of 49° relative to Device 98 or Avatar 605 differs from Object 615 or Object 616 detected or obtained at a distance of 3.4 m and an angle/bearing of 46° relative to Device 98 or Avatar 605. In a further example, the difference determination functionality of Comparison 725 may determine that Object 615 or Object 616 detected or obtained at relative coordinates [6.1, 7.8, 0] relative to Device 98 or Avatar 605 differs from Object 615 or Object 616 detected or obtained at relative coordinates [6.2, 7.4, 0] relative to Device 98 or Avatar 605. In a further example, the difference determination functionality of Comparison 725 may determine that Object 615 or Object 616 detected or obtained as a 30% open door differs from Object 615 or Object 616 detected as a 39% open door. In general, any one or more properties (i.e. existence, type, identity, location [i.e. distance and bearing/angle, coordinates, etc.], shape/size, activity, condition, etc.) of one or more Objects 615 or one or more Objects 616 can be utilized for determining at least partial match and/or difference of states of one or more Objects 615 or one or more Objects 616. Comparison 725 provides flexibility in comparing and determining at least partial match and/or difference of a variety of one or more Objects 615 or one or more Objects 616 or states of one or more Objects 615 or one or more Objects 616. Therefore, Comparison 725 enables artificial knowledge learned from manipulating one or more Objects 615 or one or more Objects 616 to be used for manipulating different/other one or more Objects 615 or one or more Objects 616. Comparison 725 may include any hardware, programs, or combination thereof.

In some embodiments, Comparison 725 is used to compare data structures. Comparing data structures may include comparing fields (i.e. data included in or associated with the fields, etc.) and/or portions of the data structures. The compared data structures may include levels of fields and/or portions of the data structure (i.e. one field and/or portion of a data structure includes one or more fields and/or portions of the data structure, etc.). Therefore, comparing data structures may include comparing fields and/or portions at one level (i.e. highest level, etc.), comparing fields and/or portions at a next level, and so on until comparing fields and/or portions at the lowest level. In some aspects, any comparison rules, thresholds, logic, and/or techniques operating on fields and/or portions at one level may apply to fields and/or portions at other levels as applicable. In other aspects, comparison rules, thresholds, logic, and/or techniques operating on fields and/or portions at one level may be different from rules, thresholds, logic, and/or techniques operating on fields and/or portions at other levels. For example, comparing one or more Knowledge Cells 800*a*, etc. with one or more Knowledge Cells 800*z*, etc. may include comparing one or more Collections of Object Representations 525*a*, etc. with one or more Collections of Object Representations 525*z*, etc., comparing one or more Object Representations 625*a*, etc. with one or more Object Representations 625*z*, etc., comparing one or more Object Properties 630*aa*-630*ae*, etc. or portions (i.e. numbers, text, pictures, models, etc.) thereof with one or more Object Properties 630*za*-630*ze*, etc. or portions thereof. A determination of at least partial match and/or difference of fields and/or portions at one level can be used for determination of at least partial match and/or difference of fields and/or portions at a higher level, and so on, until a determination of at least partial match and/or difference is made for the compared data structures. Although, Instruction Sets 526 are not shown in this example for clarity of illustration, any one or more Collections of Object Representations 525 may be correlated with any Instruction Sets 526 as previously described.

In some embodiments where compared Knowledge Cells 800 or Purpose Representations 162 include a single Collection of Object Representations 525, in determining at least partial match and/or difference of Knowledge Cells 800 or Purpose Representations 162, Comparison 725 can compare Collections of Object Representations 525 or portions (i.e. Object Representations 625, Object Properties 630, etc.) thereof. Comparisons of Collections of Object Representations 525 or portions thereof can be performed with respect to any compared elements that involve Collections of Object Representations 525 or portions thereof.

In some embodiments, in determining at least partial match and/or difference of Collections of Object Representations 525, Comparison 725 can compare one or more Object Representations 625 or portions (i.e. Object Properties 630, etc.) thereof from one Collection of Object Representations 525 with one or more Object Representations 625 or portions thereof from another Collection of Object Representations 525. In some designs, Comparison 725 may perform at least partial match determination of the compared Collections of Object Representations 525. In some aspects, at least partial match can be determined using at least partial match rules or thresholds. In one example, at least partial match can be determined when similarity of the compared Collections of Object Representations 525 is less than, equal to, or higher than a threshold (i.e. number threshold, percentage threshold, etc.) depending on implementation. In another example, at least partial match can be determined when most of the Object Representations 625 or portions thereof from the compared Collections of Object Representations 525 at least partially match. In another example, at least partial match can be determined when at least a threshold number (i.e. 1, 2, 4, 7, 18, etc.) or a threshold percentage (i.e. 51%, 62%, 79%, 91%, 100%, etc.) of Object Representations 625 or portions thereof from the compared Collections of Object Representations 525 at least partially match. Similarly, at least partial match can be determined when a number or percentage of at least partially matching Object Representations 625 or portions thereof from the compared Collections of Object Representations 525 exceeds a threshold number (i.e. 1, 2, 4, 7, 18, etc.) or a threshold percentage (i.e. 51%, 62%, 79%, 91%, 100%, etc.). In a further example, at least partial match can be determined when all but a threshold number or a threshold percentage of Object Representations 625 or portions thereof from the compared Collections of Object Representations 525 at least partial match. In other aspects, Comparison 725 can utilize importance (i.e. as indicated by importance index [later described], etc.) of Object Representations 625 or portions thereof for determining at least partial match of Collections of Object Representations 525. For example, at least partial match can be determined when at least partial matches are found with respect to more important Object Representations 625 or portions thereof such as Object Representations 625 representing Objects 615 or Objects 616 on which the system is focusing, Object Representations 625 representing near Objects 615 or Objects 616, Object Representations 625 representing large Objects 615 or Objects 616, etc., thereby tolerating mismatches in less important Object Representations 625 or portions thereof such as Object Representations 625 representing Objects 615 or Objects 616 on which the system is not focusing, Object Representations 625 representing distant Objects 615 or Objects 616, Object Representations 625 representing small Objects 615 or Objects 616, etc. In general, any Object Representation 625 or portion thereof can be assigned higher or lower importance depending on implementation. In further aspects, Comparison 725 can omit some of the Object Representations 625 or portions thereof from the comparison in determining at least partial match of Collections of Object Representations 525. In one example, Object Representations 625 representing all Objects 615 or Objects 616 except the Objects 615 or Objects 616 on which the system is focusing can be omitted from comparison. In another example, Object Representations 625 representing distant Objects 615 or Objects 616 can be omitted from comparison. In a further example, Object Representations 625 representing small Objects 615 or Objects 616 can be omitted from comparison. In general, any Object Representation 625 or portion thereof can be omitted from comparison depending on implementation. In other designs, Comparison 725 may perform difference determination of the compared Collections of Object Representations 525. In some aspects, difference can be determined when the aforementioned at least partial match of the compared Collections of Object Representations 525 is not achieved (i.e. compared Collections of Object Representations 525 are different if they do not at least partially match as defined by rules or thresholds for the at least partial match, etc.). In other aspects, difference can be determined using difference rules or thresholds. In one example, difference can be determined when difference of the compared Collections of Object Representations 525 is less than, equal to, or higher than a threshold (i.e. number threshold, percentage threshold, etc.) depending on implementation. In another example, difference can be determined when most of the Object Representations 625 or portions thereof from the compared Collections of Object Representations 525 differ. In another example, difference can be determined when at least a threshold number (i.e. 1, 3, 5, 9, 15, etc.) or a threshold percentage (i.e. 1%, 22%, 49%, 89%, 100%, etc.) of Object Representations 625 or portions thereof from the compared Collections of Object Representations 525 differ. Similarly, difference can be determined when a number or percentage of different Object Representations 625 or portions thereof from the compared Collections of Object Representations 525 exceeds a threshold number (i.e. 1, 3, 5, 9, 15, etc.) or a threshold percentage (i.e. 1%, 22%, 49%, 89%, 100%, etc.). In a further example, difference can be determined when all but a threshold number or a threshold percentage of Object Representations 625 or portions thereof from the compared Collections of Object Representations 525 differ. In further aspects, the aforementioned importance of Object Representations 625, omission of Object Representations 625, and/or other aspects or techniques relating to Object Representations 625 can similarly be utilized for determining difference of the compared Collections of Object Representations 525.

In some embodiments, in determining at least partial match and/or difference of Object Representations 625 (i.e. Object Representations 625 from the compared Collections of Object Representations 525, etc.), Comparison 725 can compare one or more Object Properties 630 or portions (i.e. numbers, text, models [i.e. 3D models, 2D models, etc.], pictures, etc.) thereof from one Object Representation 625 with one or more Object Properties 630 or portions thereof from another Object Representation 625. In some designs, Comparison 725 may perform at least partial match determination of the compared Object Representations 625. In some aspects, at least partial match can be determined using at least partial match rules or thresholds. In one example, at least partial match can be determined when similarity of the compared Object Representations 625 is less than, equal to, or higher than a threshold (i.e. number threshold, percentage threshold, etc.) depending on implementation. In one example, at least partial match can be determined when most of the Object Properties 630 or portions thereof from the compared Object Representations 625 at least partially match. In another example, at least partial match can be determined when at least a threshold number (i.e. 1, 2, 3, 6, 11, etc.) or a threshold percentage (i.e. 55%, 61%, 78%, 91%, 100%, etc.) of Object Properties 630 or portions thereof from the compared Object Representations 625 at least partially match. Similarly, at least partial match can be determined when a number or percentage of at least partially matching Object Properties 630 or portions thereof from the compared Object Representations 625 exceeds a threshold number (i.e. 1, 2, 3, 6, 11, etc.) or a threshold percentage (i.e. 55%, 61%, 78%, 91%, 100%, etc.). In a further example, at least partial match can be determined when all but a threshold number or a threshold percentage of Object Properties 630 or portions thereof from the compared Object Representations 625 at least partially match. In further aspects, Comparison 725 can utilize Fields 635 associated with Object Properties 630 for determining at least partial match of Object Representations 625. In one example, Object Properties 630 or portions thereof from the compared Object Representations 625 in a same Field 635 may be compared. This way, Object Properties 630 or portions thereof can be compared with their own peers. In one instance, Object Properties 630 or portions thereof from the compared Object Representations 625 in Field 635 "Type" may be compared. In another instance, Object Properties 630 or portions thereof from the compared Object Representations 625 in Field 635 "Distance" may be compared. In another instance, Object Properties 630 or portions thereof from the compared Object Representations 625 in Field 635 "Bearing" may be compared. In another instance, Object Properties 630 or portions thereof from the compared Object Representations 625 in Field 635 "Coordinates" may be compared. In a further instance, Object Properties 630 or portions thereof from the compared Object Representations 625 in Field 635 "Shape" may be compared. In a further instance, Object Properties 630 or portions thereof from the compared Object Representations 625 in Field 635 "Condition" may be compared. In further aspects, Comparison 725 can utilize importance (i.e. as indicated by importance index [later described], etc.) of Object Properties 630 or portions thereof for determining at least partial match of Object Representations 625. For example, at least partial match can be determined when at least partial matches are found with respect to more important Object Properties 630 or portions thereof such as Object Properties 630 or portions thereof in Fields 635 "Type", "Distance", "Bearing", "Coordinates", "Condition", etc., thereby tolerating mismatches in less important Object Properties 630 or portions thereof such as Object Properties 630 or portions thereof in Field 635 "Identity", etc. In general, any Object Property 630 or portion thereof can be assigned higher or lower importance depending on implementation. In further aspects, Comparison 725 can omit some of the Object Properties 630 or portions thereof from the comparison in determining at least partial match of Object Representations 625. In one example, Object Properties 630 or portions thereof in Field 635 "Identity" can be omitted from comparison. In general, any Object Property 630 or portion thereof can be omitted from comparison depending on implementation. In other designs, Comparison 725 may perform difference determination of the compared Object Representations 625. In some aspects, difference can be determined when the aforementioned at least partial match of the compared Object Representations 625 is not achieved (i.e. compared Object Representations 625 are different if they do not at least partially match as defined by rules or thresholds for the at least partial match, etc.). In other aspects, difference can be determined using difference rules or thresholds. In one example, difference can be determined when difference of the compared Object Representations 625 is less than, equal to, or higher than a threshold (i.e. number threshold, percentage threshold, etc.) depending on implementation. In another example, difference can be determined when most of the Object Properties 630 or portions thereof from the compared Object Representations 625 differ. In another example, difference can be determined when at least a threshold number (i.e. 1, 3, 4, 7, 10, etc.) or a threshold percentage (i.e. 1%, 19%, 45%, 77%, 100%, etc.) of Object Properties 630 or portions thereof from the compared Object Representations 625 differ. Similarly, difference can be determined when a number or percentage of different Object Properties 630 or portions thereof from the compared Object Representations 625 exceeds a threshold number (i.e. 1, 3, 4, 7, 10, etc.) or a threshold percentage (i.e. 1%, 19%, 45%, 77%, 100%, etc.). In a further example, difference can be determined when all but a threshold number or a threshold percentage of Object Properties 630 or portions thereof from the compared Object Representations 625 differ. In further aspects, the aforementioned Fields 635 associated with Object Properties 630, importance of Object Properties 630, omission of Object Properties 630, and/or other aspects or techniques relating to Object Properties 630 can similarly be utilized for determining difference of the compared Object Representations 625.

In some embodiments where compared Knowledge Cells 800 include any Instruction Sets 526 (i.e. Instruction Sets 526 correlated with one or more Collections of Object Representations 525, etc.), in determining at least partial match and/or difference of Knowledge Cells 800, Comparison 725 can perform comparison of one or more Instruction Sets 526 or portions (i.e. commands, keywords, object references, symbols, function names, parameters, etc.) thereof in addition to comparing Collections of Object Representations 525 or portions thereof. In some aspects, Instruction Sets 526 can be set to be less, equally, or more important (i.e. as indicated by importance index, etc.) than Collections of Object Representations 525, Extra Info 527, and/or other elements of Knowledge Cell 800 in a comparison of Knowledge Cells 800. Comparisons of Instruction Sets 526 can be performed with respect to any compared elements that involve Instruction Sets 526 or portions thereof.

In some embodiments, in determining at least partial match and/or difference of Instruction Sets 526, Comparison 725 can compare one or more portions (i.e. commands, keywords, object references, symbols, function names, parameters, etc.) from one Instruction Set 526 with one or more portions from another Instruction Set 526. Comparison 725 may include the functionality for disassembling an Instruction Set 526 into its portions. Any parsing or other techniques, and/or those known in art, can be utilized in such disassembling. In one example, Instruction Set 526 may include the following function call: Device.Arm.push (forward, 0.35). Disassembling this Instruction Set 526 may include recognizing object "Device", recognizing symbol ".", recognizing object "Arm", recognizing symbol ".", recognizing function name "push", recognizing symbol "(", recognizing parameter "forward", recognizing symbol ",", recognizing parameter "0.35", and recognizing symbol ")" as portions of Instruction Set 526. One of ordinary skill in art will understand that the aforementioned Instruction Set 526 including a function call is described merely as an example of a variety of possible Instruction Sets 526 and that other types of Instruction Sets 526 may include significantly different portions depending on the programming language, application program, programmers choice of labels, and/or other factors all of which are within the scope of this disclosure. In some designs, Comparison 725 may perform at least partial match determination of the compared Instruction Sets 526. In some aspects, at least partial match can be determined using at least partial match rules or thresholds. In one example, at least partial match can be determined when similarity of the compared Instruction Sets 526 is less than, equal to, or higher than a threshold (i.e. number threshold, percentage threshold, etc.) depending on implementation. In one example, at least partial match can be determined when most of the portions from the compared Instruction Sets 526 at least partially match. In another example, at least partial match can be determined when at least a threshold number (i.e. 1, 2, 3, 5, 8, etc.) or a threshold percentage (i.e. 56%, 69%, 76%, 89%, 100%, etc.) of portions from the compared Instruction Sets 526 at least partially match. Similarly, at least partial match can be determined when a number or percentage of at least partially matching portions from the compared Instruction Sets 526 exceeds a threshold number (i.e. 1, 2, 3, 5, 8, etc.) or a threshold percentage (i.e. 56%, 69%, 76%, 89%, 100%, etc.). In a further example, at least partial match can be determined when all but a threshold number or a threshold percentage of portions from the compared Instruction Sets 526 at least partial match. In some aspects, Comparison 725 can utilize importance (i.e. as indicated by importance index [later described], etc.) of portions of Instruction Sets 526 for determining at least partial match of Instruction Sets 526. For example, at least partial match can be determined when at least partial matches are found with respect to more important portions such as object references, function names, command words/phrases, parameters, etc., thereby tolerating mismatches in less important portions such as some symbols, etc. In general, any portion of Instruction Set 526 can be assigned higher or lower importance depending on implementation. In further aspects, Comparison 725 can omit some of the portions of Instruction Set 526 from the comparison in determining at least partial match of Instruction Sets 526. For example, some symbols can be omitted from comparison. In general, any portion of Instruction Set 526 can be omitted from comparison depending on implementation. In other designs, Comparison 725 may perform difference determination of the compared Instruction Sets 526. In some aspects, difference can be determined when the aforementioned at least partial match of the compared Instruction Sets 526 is not achieved (i.e. compared Instruction Sets 526 are different if they do not at least partially match as defined by rules or thresholds for the at least partial match, etc.). In other aspects, difference can be determined using difference rules or thresholds. In one example, difference can be determined when difference of the compared Instruction Sets 526 is less than, equal to, or higher than a threshold (i.e. number threshold, percentage threshold, etc.) depending on implementation. In one example, difference can be determined when most of the portions from the compared Instruction Sets 526 differ. In another example, difference can be determined when at least a threshold number (i.e. 1, 3, 5, 6, 9, etc.) or a threshold percentage (i.e. 1%, 9%, 33%, 76%, 100%, etc.) of portions from the compared Instruction Sets 526 differ. Similarly, difference can be determined when a number or percentage of different portions from the compared Instruction Sets 526 exceeds a threshold number (i.e. 1, 3, 5, 6, 9, etc.) or a threshold percentage (i.e. 1%, 9%, 33%, 76%, 100%, etc.). In a further example, difference can be determined when all but a threshold number or a threshold percentage of portions from the compared Instruction Sets 526 differ. In further aspects, the aforementioned importance of Instruction Set 526 portions, omission of Instruction Set 526 portions, and/or other aspects or techniques relating to Instruction Set 526 portions can similarly be utilized for determining difference of the compared Instruction Sets 526.

In some embodiments where compared Knowledge Cells 800 or Purpose Representations 162 (later described) include any Extra Info 527 (i.e. time information, location information, computed information, contextual information, etc.), in determining at least partial match and/or difference of Knowledge Cells 800 or Purpose Representations 162, Comparison 725 can perform comparison of one or more Extra Info 527 or portions (i.e. numbers, text, etc.) thereof in addition to comparing Collections of Object Representations 525 or portions thereof and/or Instruction Set 526 or portions thereof. In some aspects, Extra Info 527 can be set to be less, equally, or more important (i.e. as indicated by importance index, etc.) than Collections of Object Representations 525, Instruction Sets 526, and/or other elements in a comparison of Knowledge Cells 800 or Purpose Representations 162. Comparisons of Extra Info 527 can be performed with respect to any compared elements that involve Extra Info 527 or portions thereof. Comparison 725 of Extra Info 527 may include any features, functionalities, and/or embodiments of Comparison 725 of any of the herein-described and/or other elements. In one example, any of the aforementioned thresholds can be utilized in determining at least partial match and/or difference of the compared Extra Info 527. In another example, type, importance (i.e. as indicated by importance index, etc.), omission, order, and/or other techniques described with respect to any of the herein-mentioned portions of the compared elements can be utilized in determining at least partial match and/or difference of the compared Extra Info 527. In further aspects, since Extra Info 527 may include any contextual or other information, Extra Info 527 can optionally be used to enhance comparison of any other elements as applicable.

In some embodiments, Comparison 725 can perform numeric comparisons with respect to any of the compared elements that include numbers. For example, in comparison of Object Properties 630 (i.e. distance, bearing/angle, coordinates, etc.) including numbers, Comparison 725 can compare a number from one Object Property 630 with a number from another Object Property 630. In some designs, Comparison 725 may perform at least partial match determination of numbers in the compared Object Properties 630. In some aspects, at least partial match can be determined using thresholds for acceptable number or percentage difference. In one example, at least partial match of the compared numbers can be determined when their number difference is lower than a threshold for acceptable number difference. Specifically, for instance, a threshold for acceptable number difference (i.e. absolute difference, etc.) can be set at 10. Therefore, 130 at least partially matches 135 because the number difference (i.e. 5 in this example) is lower than the threshold for acceptable number difference (i.e. 10 in this example, etc.). Furthermore, 130 does not at least partially match 143 because the number difference (i.e. 13 in this example) is greater than the threshold for acceptable number difference. Any other threshold for acceptable number difference can be used such as 0.024, 1, 8, 15, 77, 197, 2438, 728322, and/or others. In another example, at least partial match of the compared numbers can be determined when their percentage difference is lower than a threshold for acceptable percentage difference. Specifically, for instance, a threshold for acceptable percentage difference can be set at 10%. Therefore, 100 at least partially matches 106 because the percentage difference (i.e. 6% in this example) is lower than the threshold for acceptable percentage difference (i.e. 10% in this example). Furthermore, 100 does not at least partially match 84 because the percentage difference (i.e. 16% in this example) is higher than the threshold for acceptable percentage difference. Any other threshold for acceptable percentage difference can be used such as 0.68%, 1%, 3%, 11%, 33%, 69%, and/or others. In other designs, Comparison 725 may perform difference determination of numbers in the compared Object Properties 630. In some aspects, difference can be determined when the aforementioned at least partial match of the compared numbers is not achieved (i.e. compared numbers are different if they do not at least partially match as defined by rules or thresholds for the at least partial match, etc.). In other aspects, although, ordinary meaning of difference in compared numbers means that the compared numbers are not equal, difference herein can be determined using thresholds for required number or percentage difference. In one example, difference of the compared numbers can be determined when their number difference exceeds a threshold for required number difference. In another example, difference of the compared numbers can be determined when their percentage difference exceeds a threshold for required percentage difference. In further designs, at least partial match or difference can be determined using mathematical operations or functions such as multiplication, division, addition, subtraction, dot product, and/or others, and/or using number, percentage, or other thresholds. In one example, at least partial match of the compared numbers can be determined when their product, quotient, sum, or difference is lower or higher than a threshold (i.e. number threshold, percentage threshold, etc.) depending on implementation. In another example, difference of the compared numbers can be determined when their product, quotient, sum, or difference is lower of higher than a threshold (i.e. number threshold, percentage threshold, etc.) depending on implementation. In some aspects, multiple mathematical operations can be used when comparing images (i.e. collections of pixel values, etc.), multi-dimensional data, and/or other data. In one example, Comparison 725 may perform multiplication of pixel values from one digital picture and pixel values from another digital picture, perform addition of all multiplied values, and use a number, percentage, or other threshold to determine at least partial match or difference. Any other combination of mathematical operations or functions can be used in any of the comparisons involving numbers. In other aspects, any of the aforementioned data structures (i.e. Knowledge Cells 800, Purpose Representations 162, Collections of Object Representations 525, Object Representations 625, etc.) or portions thereof can be represented by numeric values in which case numeric comparison functionality of Comparison 725 can be used to determine at least partial match or difference. Any other rules, thresholds, and/or techniques, and/or those known in art, for comparing numbers can be utilized herein. Similar numeric comparisons as the above described can be performed with respect to any compared elements that involve numbers.

In some embodiments, Comparison 725 can perform textual comparisons with respect to any of the compared elements that include text. For example, in comparison of Object Properties 630 (i.e. identity, type, condition, etc.) including text, Comparison 725 can compare words, characters, and/or other portions of text from one Object Property 630 with words, characters, and/or other portions of text from another Object Property 630. In some designs, Comparison 725 may perform at least partial match determination of the compared text. In some aspects, at least partial match can be determined using at least partial match rules or thresholds. In one example, at least partial match can be determined when similarity of the compared text is less than, equal to, or higher than a threshold (i.e. number threshold, percentage threshold, etc.) depending on implementation. In one example, at least partial match can be determined when most of the words, characters, and/or other portions of the compared text at least partially match. In another example, at least partial match can be determined when at least a threshold number (i.e. 1, 2, 7, 11, 24, etc.) or a threshold percentage (i.e. 51%, 63%, 77%, 95%, 100%, etc.) of words, characters, and/or other portions of the compared text at least partially match. Similarly, at least partial match can be determined when a number or percentage of at least partially matching words, characters, and/or other portions of the compared text exceeds a threshold number (i.e. 1, 2, 7, 11, 24, etc.) or a threshold percentage (i.e. 51%, 63%, 77%, 95%, 100%, etc.). In a further example, at least partial match can be determined when all but a threshold number or a threshold percentage of words, characters, and/or other portions of the compared text at least partially match. In further aspects, Comparison 725 can utilize importance (i.e. as indicated by importance index [later described], etc.) of words, characters, and/or other portions of text for determining at least partial match of the compared text. For example, at least partial match can be determined when at least partial matches are found with respect to more important words, characters, and/or other portions of text such as longer words, thereby tolerating mismatches in less important words, characters, and/or other portions of text such as shorter words. In general, any word, character, and/or other portion of text can be assigned higher or lower importance depending on implementation. In further aspects, Comparison 725 can utilize order of words, characters, and/or other portions of text for determining at least partial match of the compared text. For example, at least partial match can be determined when at least partial matches are found with respect to front-most words, characters, and/or other portions of text, thereby tolerating mismatches in later words, characters, and/or other portions of text. In further aspects, Comparison 725 can utilize semantic conversion to account for variations of words and/or other portions of text using thesaurus, dictionary, and/or any grammatical analysis or transformation to cover the full scope of word and/or other portions of text variations. In further aspects, Comparison 725 can utilize a language model for understanding or interpreting the concepts contained in the words and/or other portions of text and compare the concepts instead of or in addition to the words and/or other portions of text. Examples of language models include unigram model, n-gram model, neural network language model, bag of words model, and/or others. Any of the techniques for matching of words can similarly be used for matching of concepts. In further aspects, Comparison 725 can omit some of the words, characters, and/or other portions of text from the comparison in determining at least partial match of the compared text. In one example, rear-most words, characters, and/or other portions of text can be omitted from comparison. In another example, shorter words and/or other portions of text can be omitted from comparison. In general, any word, character, and/or other portion of text can be omitted from comparison depending on implementation. In other designs, Comparison 725 may perform difference determination of the compared text. In some aspects, difference can be determined when the aforementioned at least partial match of the compared text is not achieved (i.e. compared text are different if they do not at least partially match as defined by rules or thresholds for the at least partial match, etc.). In other aspects, difference can be determined using difference rules or thresholds. In one example, difference can be determined when difference of the compared text is less than, equal to, or higher than a threshold (i.e. number threshold, percentage threshold, etc.) depending on implementation. In one example, difference can be determined when most of the words, characters, and/or other portions of the compared text differ. In another example, difference can be determined when at least a threshold number (i.e. 1, 5, 9, 13, 29, etc.) or a threshold percentage (i.e. 1%, 14%, 48%, 77%, 100%, etc.) of words, characters, and/or other portions of the compared text differ. Similarly, difference can be determined when a number or percentage of different words, characters, and/or other portions of the compared text exceeds a threshold number (i.e. 1, 5, 9, 13, 29, etc.) or a threshold percentage (i.e. 1%, 14%, 48%, 77%, 100%, etc.). In a further example, difference can be determined when all but a threshold number or a threshold percentage of words, characters, and/or other portions of the compared text differ. In further aspects, the aforementioned importance of words, characters, and/or other portions of text, order of words, characters, and/or other portions of text, semantic conversion of words and/or other portions of text, language model for interpreting the concepts contained in the words and/or other portions of text, omission of words, characters, and/or other portions of text, and/or other aspects or techniques relating to words, characters, and/or other portions of text can similarly be utilized for determining difference of the compared text. Any other rules, thresholds, and/or techniques, and/or those known in art, for comparing text can be utilized herein. Similar textual comparisons as the above described can be performed with respect to any compared elements that involve text or portions thereof.

In some embodiments, Comparison 725 can perform picture comparisons with respect to any of the compared elements that include pictures (i.e. digital pictures, etc.). For example, in comparison of Object Properties 630 (i.e. shape, etc.) including a picture, Comparison 725 can compare regions, features, pixels, and/or other portions of a picture from one Object Property 630 with regions, features, pixels, and/or other portions of a picture from another Object Property 630. Concerning regions, a region may include a collection of pixels depicting one or more objects, portions thereof, and/or other content of interest. A region may be defined using any features, functionalities, and/or embodiments of Picture Recognizer **117*a*, any picture segmentation technique (i.e. thresholding, clustering, region-growing, edge detection, curve propagation, level sets, graph partitioning, model-based segmentation, trainable segmentation [i.e. artificial neural networks, etc.], etc.), any technique for defining arbitrary region comprising any arbitrary content, and/or other techniques, and/or those known in art. Concerning features, a feature may include a collection of pixels depicting a line, edge, ridge, corner, blob, portion thereof, and/or other content of interest. A feature may be defined using Canny, Sobe, Kayyali, Harris & Stephens et al, SUSAN, Level Curve Curvature, FAST, Laplacian of Gaussian, Difference of Gaussians, Determinant of Hessian, MSER, PCBR, Grey-level Blobs, and/or other feature determination techniques, and/or those known in art. In some designs, Comparison 725** may perform at least partial match determination of the compared pictures. In some aspects, at least partial match can be determined using at least partial match rules or thresholds. In one example, at least partial match can be determined when similarity of the compared pictures is less than, equal to, or higher than a threshold (i.e. number threshold, percentage threshold, etc.) depending on implementation. In one example, at least partial match can be determined when most of the regions, features, pixels, and/or other portions of the compared pictures at least partially match. In another example, at least partial match can be determined when at least a threshold number (i.e. 1, 13, 449, 2219, 92229, etc.) or a threshold percentage (i.e.

52%, 71%, 88%, 93%, 100%, etc.) of regions, features, pixels, and/or other portions of the compared pictures at least partially match. Similarly, at least partial match can be determined when a number or percentage of at least partially matching regions, features, pixels, and/or other portions of the compared pictures exceeds a threshold number (i.e. 1, 13, 449, 2219, 92229, etc.) or a threshold percentage (i.e. 52%, 71%, 88%, 93%, 100%, etc.). In a further example, at least partial match can be determined when all but a threshold number or a threshold percentage of regions, features, pixels, and/or other portions of the compared pictures at least partially match. In further aspects, Comparison 725 can utilize the type of regions, features, pixels, and/or other portions of pictures for determining at least partial match of the compared pictures. For example, at least partial match can be determined when at least partial matches are found with respect to more substantive, larger, and/or other regions or features, thereby tolerating mismatches in less substantive, smaller, and/or other regions or features. In further aspects, Comparison 725 can utilize importance (i.e. as indicated by importance index [later described], etc.) of regions, features, pixels, and/or other portions of pictures for determining at least partial match of the compared pictures. For example, at least partial match can be determined when at least partial matches are found with respect to more important regions or features such as the aforementioned more substantive, larger, and/or other regions or features, thereby tolerating mismatches in less important regions or features such as less substantive, smaller, and/or other regions or features. In further aspects, Comparison 725 can omit some of the regions, features, pixels, and/or other portions of pictures from the comparison in determining at least partial match of the compared pictures. In one example, regions, features, pixels, and/or other portions composing the background or any insignificant content can be omitted from comparison. In general, any regions, features, pixels, and/or other portions of a picture can be omitted from comparison. In further aspects, Comparison 725 can focus on regions, features, pixels, and/or other portions of pictures in certain areas of interest in determining at least partial match of the compared pictures. For example, at least partial match can be determined when at least partial matches are found with respect to regions, features, pixels, and/or other portions of a picture comprising persons, large objects, close objects, and/or other content of interest, thereby tolerating mismatches in regions, features, pixels, and/or other portions of a picture comprising the background, insignificant content, and/or other content. In further aspects, Comparison 725 can detect or recognize objects in the compared pictures. Any features, functionalities, and/or embodiments of Picture Recognizer 117*a* can be used in such detection or recognition. Once an object is detected in a picture, Comparison 725 may attempt to detect the object in the compared picture. In one example, at least partial match can be determined when the compared pictures comprise one or more same objects. In further aspects, Comparison 725 can use mathematical operations or functions (i.e. addition, subtraction, multiplication, division, dot product, etc.) in determining at least partial match of the compared pictures as previously described. Any combination of mathematical operations or functions can be used in any of the comparisons involving pictures. In other designs, Comparison 725 may perform difference determination of the compared pictures. In some aspects, difference can be determined when the aforementioned at least partial match of the compared pictures is not achieved (i.e. compared pictures are different if they do not at least partially match as defined by rules or thresholds for the at least partial match, etc.). In other aspects, difference can be determined using difference rules or thresholds. In one example, difference can be determined when difference of the compared pictures is less than, equal to, or higher than a threshold (i.e. number threshold, percentage threshold, etc.) depending on implementation. In one example, difference can be determined when most of the regions, features, pixels, and/or other portions of the compared pictures differ. In another example, difference can be determined when at least a threshold number (i.e. 1, 22, 357, 3299, 82522, etc.) or a threshold percentage (i.e. 1%, 19%, 39%, 76%, 100%, etc.) of regions, features, pixels, and/or other portions of the compared pictures differ. Similarly, difference can be determined when a number or percentage of different regions, features, pixels, and/or other portions of the compared pictures exceeds a threshold number (i.e. 1, 22, 357, 3299, 82522, etc.) or a threshold percentage (i.e. 1%, 19%, 39%, 76%, 100%, etc.). In a further example, difference can be determined when all but a threshold number or a threshold percentage of regions, features, pixels, and/or other portions of the compared pictures differ. In further aspects, the aforementioned type of regions, features, pixels, and/or other portions of pictures, importance of regions, features, pixels, and/or other portions of pictures, omission of regions, features, pixels, and/or other portions of pictures, focus on regions, features, pixels, and/or other portions of pictures, detection of objects in pictures, use of mathematical operations or functions, and/or other aspects or techniques relating to regions, features, pixels, and/or other portions of pictures can similarly be utilized for determining difference of the compared pictures. In some implementations, Comparison 725 can compare individual pixels in any of the comparisons involving pixels. In one example, at least partial match can be determined using any of the aforementioned and/or other rules or thresholds for at least partial match. In another example, difference can be determined using any of the aforementioned and/or other rules or thresholds for difference. As individual pixels are encoded in numbers, Comparison 725 of individual pixels may include any features, functionalities, and/or embodiments of the numeric Comparison 725. In other implementations, Comparison 725 involving pictures may include any features, functionalities, and/or embodiments of Picture Recognizer 117*a*, and vice versa. Any other rules, thresholds, and/or techniques, and/or those known in art, for comparing pictures can be utilized herein. Similar picture comparisons as the above described can be performed with respect to any compared elements that involve pictures or portions thereof.

Furthermore, various aspects or properties of digital pictures or pixels can be taken into account by Comparison 725 in any picture comparison. Examples of such aspects or properties include color adjustment, size adjustment, content manipulation, use of a mask, and/or others. In some implementations, as digital pictures can be captured by various picture-capturing equipment, in various environments, and under various lighting conditions, Comparison 725 can adjust lighting or color of pixels or otherwise manipulate pixels before or during comparison. Lighting or color adjustment (also referred to as gray balance, neutral balance, white balance, etc.) may generally include manipulating or rebalancing the intensities of the colors (i.e. red, green, and/or blue if RGB color scheme is used, etc.) of one or more pixels. For example, Comparison 725 can adjust lighting or color of some or all pixels of one picture to make it more comparable to another picture. Comparison 725 can also incrementally or decrementally adjust the pixels such as increasing or decreasing the red, green, and/or blue pixel values by a certain amount in each cycle of comparisons in order to find an acceptable match at one of the incremental or decremental adjustment levels. Any of the publically available, custom, or other lighting or color adjustment techniques can be utilized such as color filters, color balancing, color correction, and/or others. In other implementations, Comparison 725 can resize or otherwise transform a digital picture before or during comparison. Such resizing or transformation may include increasing or decreasing the number of pixels of a digital picture. For example, Comparison 725 can increase or decrease the size of a digital picture proportionally (i.e. increase or decrease length and/or width keeping aspect ratio constant, etc.) to equate its size with the size of another digital picture. Comparison 725 can also incrementally or decrementally resize a digital picture such as increasing or decreasing the size of the digital picture proportionally by a certain amount in each cycle of comparisons in order to find an acceptable match at one of the incremental or decremental sizes. Any of the publically available, custom, or other digital picture resizing techniques can be utilized such as nearest-neighbor interpolation, bilinear interpolation, bicubic interpolation, and/or others. In further implementations, Comparison 725 can manipulate content (i.e. all pixels, one or more regions, one or more depicted objects, etc.) of a digital picture before or during comparison. Such content manipulation may include moving, centering, aligning, resizing, transforming, and/or otherwise manipulating content of a digital picture. For example, Comparison 725 can move, center, or align content of one picture to make it more comparable to another picture. Any of the publically available, custom, or other digital picture manipulation techniques can be utilized such as pixel moving, warping, distorting, aforementioned interpolations, and/or others. In further implementations, certain regions or subsets of pixels can be ignored or excluded during comparison using a mask. In general, any region or subset of a picture determined to contain no content of interest can be excluded from comparison using a mask. Examples of such regions or subsets include background, transparent or partially transparent regions, regions comprising insignificant content, or any arbitrary region or subset. Comparison 725 can perform any other pre-processing or manipulation of digital pictures or pixels before or during comparison.

In some embodiments, Comparison 725 can perform model comparisons with respect to any of the compared elements that include models (i.e. 3D models, 2D models, any computer models, etc.). For example, in comparison of Object Properties 630 (i.e. shape, etc.) including a model, Comparison 725 can compare geometric shapes (i.e. polygons, circles, irregular shapes, etc.), lines (i.e. straight, curved, etc.), points (i.e. vertices, corners, etc.), voxels, and/or other portions of a model from one Object Property 630 with geometric shapes, lines, points, voxels, and/or other portions of a model from another Object Property 630. A model may include any computer, mathematical, or other representation of one or more Objects 615 (physical objects, etc.) or one or more Objects 616 (i.e. computer generated objects, etc.). A model can be implemented using vector graphics, 3D graphics, voxel graphics, and/or other techniques. In some designs, vector graphics include basic geometric shapes (i.e. primitives, etc.) such as points (i.e. vertices, etc.), lines, curves, circles, ellipses, polygons, and/or other shapes implemented in 2D space. In other designs, 3D graphics may be an extension of or similar to vector graphics implemented in 3D space. For example, 3D graphics may include polygons or other shapes positioned in 3D space to form surfaces of a 3D model of Object 615 or Object 616. Basic 3D models can be combined into more complex models enabling the definition of practically any 3D model. For example, model of a door Object 615 or Object 616 can be formed using a thin rectangular box (i.e. rectangular cuboid, rectangular parallelepiped, etc.) and appropriately positioned and sized sphere representing a doorknob. In further designs, voxel graphics include representation of the volume of Object 615 or Object 616 in addition to its surface. A model can be created using any features, functionalities, and/or embodiments of Object Processing Unit 115 or elements thereof, converting (i.e. vectorizing, image tracing, etc.) one or more digital pictures into a 3D or 2D model, converting (i.e. 3D reconstruction, etc.) a point cloud representation of Object 615 or Object 616 into a 3D, 2D or voxel model, and/or other techniques, and/or those known in art. In some designs, Comparison 725 may perform at least partial match determination of the compared models. In some aspects, at least partial match can be determined using at least partial match rules or thresholds. In one example, at least partial match can be determined when similarity of the compared models is less than, equal to, or higher than a threshold (i.e. number threshold, percentage threshold, etc.) depending on implementation. In one example, at least partial match can be determined when most of the geometric shapes, lines, points, voxels, and/or other portions of the compared models at least partially match. In another example, at least partial match can be determined when at least a threshold number (i.e. 1, 11, 173, 2028, 48663, etc.) or a threshold percentage (i.e. 53%, 65%, 74%, 88%, 100%, etc.) of geometric shapes, lines, points, voxels, and/or other portions of the compared models at least partially match. Similarly, at least partial match can be determined when a number or percentage of at least partially matching geometric shapes, lines, points, voxels, and/or other portions of the compared models exceeds a threshold number (i.e. 1, 11, 173, 2028, 48663, etc.) or a threshold percentage (i.e. 53%, 65%, 74%, 88%, 100%, etc.). In a further example, at least partial match can be determined when all but a threshold number or a threshold percentage of geometric shapes, lines, points, voxels, and/or other portions of the compared models at least partially match. In further aspects, Comparison 725 can utilize the type of geometric shapes, lines, points, voxels, and/or other portions of models for determining at least partial match of the compared models. For example, at least partial match can be determined when at least partial matches are found with respect to larger and/or other geometric shapes or lines, thereby tolerating mismatches in smaller and/or other geometric shapes or lines. In further aspects, Comparison 725 can utilize importance (i.e. as indicated by importance index [later described], etc.) of geometric shapes, lines, points, voxels, and/or other portions of models for determining at least partial match of the compared models. For example, at least partial match can be determined when at least partial matches are found with respect to more important geometric shapes or lines such as the aforementioned larger and/or other geometric shapes or lines, thereby tolerating mismatches in less important geometric shapes or lines such as smaller and/or other geometric shapes or lines. In further aspects, Comparison 725 can omit some of the geometric shapes, lines, points, voxels, and/or other portions of models from the comparison in determining at least partial match of the compared models. In one example, smaller geometric shapes or lines can be omitted from comparison. In general, any geometric shapes, lines, points, voxels, and/or other portions of a model can be omitted from comparison. In other designs, Comparison 725 may perform difference determination of the compared models. In some aspects, difference can be determined when the aforementioned at least partial match of the compared models is not achieved (i.e. compared models are different if they do not at least partially match as defined by rules or thresholds for the at least partial match, etc.). In other aspects, difference can be determined using difference rules or thresholds. In one example, difference can be determined when difference of the compared models is less than, equal to, or higher than a threshold (i.e. number threshold, percentage threshold, etc.) depending on implementation. In one example, difference can be determined when most of the geometric shapes, lines, points, voxels, and/or other portions of the compared models differ. In another example, difference can be determined when at least a threshold number (i.e. 1, 22, 156, 4208, 61648, etc.) or a threshold percentage (i.e. 1%, 31%, 53%, 84%, 100%, etc.) of geometric shapes, lines, points, voxels, and/or other portions of the compared models differ. Similarly, difference can be determined when a number or percentage of different geometric shapes, lines, points, voxels, and/or other portions of the compared models exceeds a threshold number (i.e. 1, 22, 156, 4208, 61648, etc.) or a threshold percentage (i.e. 1%, 31%, 53%, 84%, 100%, etc.). In a further example, difference can be determined when all but a threshold number or a threshold percentage of geometric shapes, lines, points, voxels, and/or other portions of the compared models differ. In further aspects, the aforementioned type of geometric shapes, lines, points, voxels, and/or other portions of models, importance of geometric shapes, lines, points, voxels, and/or other portions of models, omission of geometric shapes, lines, points, voxels, and/or other portions of models, and/or other aspects or techniques relating to geometric shapes, lines, points, voxels, and/or other portions of models can similarly be utilized for determining difference of the compared models. In some implementations, in any of the comparisons involving geometric shapes, lines, points, voxels, and/or other portions of the compared models, Comparison 725 can compare relative position/location, size, shape, color, transparency, and/or other attributes of the geometric shapes, lines, points, voxels, and/or other portions of the compared models. In one example, at least partial match can be determined using any of the aforementioned and/or other rules or thresholds for at least partial match. In another example, difference can be determined using any of the aforementioned and/or other rules or thresholds for difference. As position/location, size, shape, color, transparency, and/or other attributes of the geometric shapes, lines, points, voxels, and/or other portions of the compared models may include numbers, Comparison 725 of geometric shapes, lines, points, voxels, and/or other portions of the compared models may include any features, functionalities, and/or embodiments of the numeric Comparison 725. In other implementations, Comparison 725 can resize or otherwise transform a model before or during comparison. For example, Comparison 725 can increase or decrease the size of a model proportionally to equate its size with a size of another model. Comparison 725 can also incrementally or decrementally resize a model such as increasing or decreasing the size of the model proportionally by a certain amount in each cycle of comparisons in order to find a match at one of the incremental or decremental sizes. Any of the publically available, custom, or other model resizing or transformation techniques can be utilized such as uniform scaling, non-uniform scaling, shearing, rotation, and/or others. In further implementations, Comparison 725 involving models may include any techniques, and/or those known in art, for comparing mathematical functions and/or other mathematical entities. In further implementations, Comparison 725 involving models may include any features, functionalities, and/or embodiments of Object Processing Unit 115 or elements thereof. Any other rules, thresholds, and/or techniques, and/or those known in art, for comparing models can be utilized herein. Similar model comparisons as the above described can be performed with respect to any compared elements that involve models or portions thereof.

In some embodiments where compared Knowledge Cells 800 or Purpose Representations 162 include a stream or other plurality of Collections of Object Representations 525, in determining at least partial match and/or difference of Knowledge Cells 800 or Purpose Representations 162, Comparison 725 can compare streams of Collections of Object Representations 525 or portions (i.e. Collections of Object Representations 525, Object Representations 625, Object Properties 630, etc.) thereof. Comparisons of streams of Collections of Object Representations 525 or portions thereof can be performed with respect to any compared elements that involve streams of Collections of Object Representations 525 or portions thereof.

In some embodiments, in determining at least partial match and/or difference of streams of Collections of Object Representations 525, Comparison 725 can compare one or more Collections of Object Representations 525 or portions (i.e. Object Representations 625, Object Properties 630, etc.) thereof from one stream of Collections of Object Representations 525 with one or more Collections of Object Representations 525 or portions thereof from another stream of Collections of Object Representations 525. In some designs, Comparison 725 may perform at least partial match determination of the compared streams of Collections of Object Representations 525. In some aspects, at least partial match can be determined using at least partial match rules or thresholds. In one example, at least partial match can be determined when similarity of the compared streams of Collections of Object Representations 525 is less than, equal to, or higher than a threshold (i.e. number threshold, percentage threshold, etc.) depending on implementation. In one example, at least partial match can be determined when most of the Collections of Object Representations 525 or portions thereof from the compared streams of Collections of Object Representations 525 at least partially match. In another example, at least partial match can be determined when at least a threshold number (i.e. 1, 2, 9, 33, 138, etc.) or a threshold percentage (i.e. 55%, 68%, 87%, 94%, 100%, etc.) of Collections of Object Representations 525 or portions thereof from the compared streams of Collections of Object Representations 525 at least partially match. Similarly, at least partial match can be determined when a number or percentage of at least partially matching Collections of Object Representations 525 or portions thereof from the compared streams of Collections of Object Representations 525 exceeds a threshold number (i.e. 1, 2, 9, 33, 138, etc.) or a threshold percentage (i.e. 55%, 68%, 87%, 94%, 100%, etc.). In a further example, at least partial match can be determined when all but a threshold number or a threshold percentage of Collections of Object Representations 525 or portions thereof from the compared streams of Collections of Object Representations 525 at least partially match. In some aspects, Comparison 725 can utilize importance (i.e. as indicated by importance index, etc.) of Collections of Object Representations 525 or portions thereof for determining at least partial match of the compared streams of Collections of Object Representations 525. For example, at least partial match can be determined when at least partial matches are found with respect to more important Collections of Object Representations 525 or portions thereof such as more recent Collections of Object Representations 525 or portions thereof, thereby tolerating mismatches in less important Collections of Object Representations 525 or portions thereof such as less recent Collections of Object Representations 525 or portions thereof. In general, any Collection of Object Representations 525 or portion thereof can be assigned higher or lower importance depending on implementation. In other aspects, Comparison 725 can utilize order of Collections of Object Representations 525 or portions thereof for determining at least partial match of streams of Collections of Object Representations 525. For example, at least partial match can be determined when at least partial matches are found in corresponding (i.e. similarly ordered, temporally related, etc.) Collections of Object Representations 525 or portions thereof from the compared streams of Collections of Object Representations 525. In one instance, 7th Collection of Object Representations 525 or portions thereof from one stream of Collections of Object Representations 525 can be compared with 7th Collection of Object Representations 525 or portions thereof from another stream of Collections of Object Representations 525. In another instance, 7th Collection of Object Representations 525 or portions thereof from one stream of Collections of Object Representations 525 can be compared with a number of Collections of Object Representations 525 or portions thereof around (i.e. preceding and/or following) 7th Collection of Object Representations 525 from another stream of Collections of Object Representations 525. This way, flexibility can be implemented in finding at least partially matching Collection of Object Representations 525 or portions thereof if the Collections of Object Representations 525 or portions thereof in the compared streams of Collections of Object Representations 525 are not perfectly aligned. In a further instance, Comparison 725 can utilize Dynamic Time Warping (DTW) and/or other techniques, and/or those known in art, for comparing and/or aligning temporal sequences (i.e. streams of Collections of Object Representations 525 or portions thereof, etc.) that may vary in time or speed. In further aspects, Comparison 725 can omit some of the Collections of Object Representations 525 or portions thereof from the comparison in determining at least partial match of streams of Collections of Object Representations 525. For example, less recent Collections of Object Representations 525 or portions thereof can be omitted from comparison. In general, any Collection of Object Representations 525 or portion thereof can be omitted from comparison depending on implementation. In other designs, Comparison 725 may perform difference determination of the compared streams of Collections of Object Representations 525. In some aspects, difference can be determined when the aforementioned at least partial match of the compared streams of Collections of Object Representations 525 is not achieved (i.e. compared streams of Collections of Object Representations 525 are different if they do not at least partially match as defined by rules or thresholds for the at least partial match, etc.). In other aspects, difference can be determined using difference rules or thresholds. In one example, difference can be determined when difference of the compared streams of Collections of Object Representations 525 is less than, equal to, or higher than a threshold (i.e. number threshold, percentage threshold, etc.) depending on implementation. In one example, difference can be determined when most of the Collections of Object Representations 525 or portions thereof from the compared streams of Collections of Object Representations 525 differ. In another example, difference can be determined when at least a threshold number (i.e. 1, 3, 5, 28, 144, etc.) or a threshold percentage (i.e. 1%, 23%, 45%, 79%, 100%, etc.) of Collections of Object Representations 525 or portions thereof from the compared streams of Collections of Object Representations 525 differ. Similarly, difference can be determined when a number or percentage of different Collections of Object Representations 525 or portions thereof from the compared streams of Collections of Object Representations 525 exceeds a threshold number (i.e. 1, 3, 5, 28, 144, etc.) or a threshold percentage (i.e. 1%, 23%, 45%, 79%, 100%, etc.). In a further example, difference can be determined when all but a threshold number or a threshold percentage of Collections of Object Representations 525 or portions thereof from the compared streams of Collections of Object Representations 525 differ. In further aspects, the aforementioned importance of Collections of Object Representations 525, order of Collections of Object Representations 525, Dynamic Time Warping (DTW) and/or other techniques for comparing and/or aligning streams of Collections of Object Representations 525, omission of Collections of Object Representations 525, and/or other aspects or techniques relating to Collections of Object Representations 525 can similarly be utilized for determining difference of the compared streams of Collections of Object Representations 525.

In some embodiments where sequences or other pluralities of Knowledge Cells 800 are compared, in determining at least partial match and/or difference of sequences or other pluralities of Knowledge Cells 800, Comparison 725 can compare one or more Knowledge Cells 800 or portions (i.e. Collections of Object Representations 525, Object Representations 625, Object Properties 630, etc.) thereof from one sequence of Knowledge Cells 800 with one or more Knowledge Cells 800 or portions thereof from another sequence of Knowledge Cells 800. Similar comparisons of sequences of Knowledge Cells 800 can be performed with respect to any compared elements that involve sequences of Knowledge Cells 800 or portions thereof. In some designs, Comparison 725 may perform at least partial match determination of the compared sequences of Knowledge Cells 800. In some aspects, at least partial match can be determined using at least partial match rules or thresholds. In one example, at least partial match can be determined when similarity of the compared sequences of Knowledge Cells 800 is less than, equal to, or higher than a threshold (i.e. number threshold, percentage threshold, etc.) depending on implementation. In one example, at least partial match can be determined when most of the Knowledge Cells 800 or portions thereof from the compared sequences of Knowledge Cells 800 at least partially match. In another example, at least partial match can be determined when at least a threshold number (i.e. 1, 2, 6, 15, 22, etc.) or a threshold percentage (i.e. 52%, 68%, 77%, 89%, 100%, etc.) of Knowledge Cells 800 or portions thereof from the compared sequences of Knowledge Cells 800 at least partially match. Similarly, at least partial match can be determined when a number or percentage of at least partially matching Knowledge Cells 800 or portions thereof from the compared sequences of Knowledge Cells 800 exceeds a threshold number (i.e. 1, 2, 6, 15, 22, etc.) or a threshold percentage (i.e. 52%, 68%, 77%, 89%, 100%, etc.). In a further example, at least partial match can be determined when all but a threshold number or a threshold percentage of Knowledge Cells 800 or portions thereof from the compared sequences of Knowledge Cells 800 at least partially match. In some aspects, Comparison 725 can utilize importance (i.e. as indicated by importance index, etc.) of Knowledge Cells 800 or portions thereof for determining at least partial match of the compared sequences of Knowledge Cells 800. In one example, at least partial match can be determined when at least partial matches are found with respect to more important Knowledge Cells 800 or portions thereof such as more recent Knowledge Cells 800 or portions thereof, thereby tolerating mismatches in less important Knowledge Cells 800 or portions thereof such as less recent Knowledge Cells 800 or portions thereof. In general, any Knowledge Cell 800 or portion thereof can be assigned higher or lower importance depending on implementation. In other aspects, Comparison 725 can utilize order of Knowledge Cells 800 or portions thereof for determining at least partial match of the compared sequences of Knowledge Cells 800. In one example, at least partial match can be determined when at least partial matches are found in corresponding (i.e. similarly ordered, temporally related, etc.) Knowledge Cells 800 or portions thereof from the compared sequences of Knowledge Cells 800. In one instance, 6th Knowledge Cell 800 or portions thereof from one sequence of Knowledge Cells 800 can be compared with 6th Knowledge Cell 800 or portions thereof from another sequence of Knowledge Cells 800. In another instance, 6th Knowledge Cell 800 or portions thereof from one sequence of Knowledge Cells 800 can be compared with a number of Knowledge Cells 800 or portions thereof around (i.e. preceding and/or following) 6th Knowledge Cell 800 from another sequence of Knowledge Cells 800. This way, flexibility can be implemented in finding at least partially matching Knowledge Cell 800 or portions thereof if the Knowledge Cells 800 or portions thereof in the compared sequences of Knowledge Cells 800 are not perfectly aligned. In a further instance, Comparison 725 can utilize Dynamic Time Warping (DTW) and/or other techniques, and/or those known in art, for comparing and/or aligning temporal sequences (i.e. sequences of Knowledge Cells 800 or portions thereof, etc.) that may vary in time or speed. In further aspects, Comparison 725 can omit some of the Knowledge Cells 800 or portions thereof from the comparison in determining at least partial match of sequences of Knowledge Cells 800. For example, less recent Knowledge Cells 800 or portions thereof can be omitted from comparison. In general, any Knowledge Cells 800 or portions thereof can be omitted from comparison depending on implementation. In other designs, Comparison 725 may perform difference determination of the compared sequences of Knowledge Cells 800. In some aspects, difference can be determined when the aforementioned at least partial match of the compared sequences of Knowledge Cells 800 is not achieved (i.e. compared sequences of Knowledge Cells 800 are different if they do not at least partially match as defined by rules or thresholds for the at least partial match, etc.). In other aspects, difference can be determined using difference rules or thresholds. In one example, difference can be determined when difference of the compared sequences of Knowledge Cells 800 is less than, equal to, or higher than a threshold (i.e. number threshold, percentage threshold, etc.) depending on implementation. In one example, difference can be determined when most of the Knowledge Cells 800 or portions thereof from the compared sequences of Knowledge Cells 800 differ. In another example, difference can be determined when at least a threshold number (i.e. 1, 3, 5, 11, 21, etc.) or a threshold percentage (i.e. 1%, 31%, 52%, 79%, 100%, etc.) of Knowledge Cells 800 or portions thereof from the compared sequences of Knowledge Cells 800 differ. Similarly, difference can be determined when a number or percentage of different Knowledge Cells 800 or portions thereof from the compared sequences of Knowledge Cells 800 exceeds a threshold number (i.e. 1, 3, 5, 11, 21, etc.) or a threshold percentage (i.e. 1%, 31%, 52%, 79%, 100%, etc.). In a further example, difference can be determined when all but a threshold number or a threshold percentage of Knowledge Cells 800 or portions thereof from the compared sequences of Knowledge Cells 800 differ. In further aspects, the aforementioned importance of Knowledge Cells 800, order of Knowledge Cells 800, Dynamic Time Warping (DTW) and/or other techniques for comparing and/or aligning sequences of Knowledge Cells 800, omission of Knowledge Cells 800, and/or other aspects or techniques relating to Knowledge Cells 800 can similarly be utilized for determining difference of the compared sequences of Knowledge Cells 800. Techniques for determining at least partial match or difference of sequences or other pluralities of Knowledge Cells 800 can similarly be utilized for determining at least partial match or difference of sequences or other pluralities of Purpose Representations 162 as applicable.

In some embodiments, an importance index (not shown) can be used in any comparisons or other processing involving elements of different importance. Importance index may include any information indicating importance of the element in which it is included or with which it is associated. For example, importance index may be included in or associated with Knowledge Cell 800, Purpose Representation 162, Collection of Object Representations 525, Object Representation 625, Object Property 630, Instruction Set 526, Extra Info 527, and/or other element. In some aspects, importance index on a scale from 0 to 1 can be utilized, although, any other technique can also be utilized such as any numeric (i.e. 0.3, 1, 17, 58.2, 639, etc.), symbolic (i.e. "high", "medium", "low", etc.), mathematical (i.e. a function, etc.), modeled, and/or others. Importance indexes of various elements can be defined by a user, by system administrator, or automatically by the system based on experience, learning, testing, inquiry, analysis, synthesis, or other techniques, knowledge, or input.

In some embodiments, Comparison 725 may generate a match (i.e. similarity, etc.) index (not shown) for any of the compared elements. Match index indicates how well one element is matched with another element. For example, match index indicates how well a Knowledge Cell 800, Purpose Representation 162, Collection of Object Representations 525, Object Representation 625, Object Property 630, Instruction Set 526, Extra Info 527, and/or other element is matched with a compared element. In some aspects, match index on a scale from 0 to 1 can be utilized, although, any other technique can also be utilized such as any numeric (i.e. 0.3, 1, 17, 58.2, 639, etc.), symbolic (i.e. "high", "medium", "low", etc.), mathematical (i.e. a function, etc.), modeled, and/or others. Match index can be generated by Comparison 725 whether at least partial match of the compared elements is determined or not. In one example, match index can be determined for Object Representation 625 based on a ratio/percentage of at least partially matched Object Properties 630 relative to the number of Object Properties 630 in Object Representation 625. Specifically, for instance, match index of 0.91 is determined if 91% of Object Properties 630 of one Object Representation 625 at least partially match Object Properties 630 of another Object Representation 625.

In some designs, importance (i.e. as indicated by importance index, etc.) of one or more Object Properties 630 can be included in the calculation of a weighted match index. Similar determination of match index can be implemented with Knowledge Cells 800, Purpose Representations 162, Collections of Object Representations 525, Object Properties 630, Instruction Sets 526, Extra Info 527, and/or other elements. Any of the aforementioned techniques of Comparison 725 can be utilized to determine or calculate match index. Any match or similarity ranking technique, and/or those known in art, can be utilized to determine or calculate match index in alternate embodiments. Match (i.e. similarity, etc.) index can be used with the aforementioned number, percentage, and/or other thresholds in a determination of at least partial match and/or difference of compared elements. In some embodiments, Comparison 725 may generate a difference index (not shown) for any of the compared elements. Difference index indicates how different is one element from another element. For example, difference index indicates how different is a Knowledge Cell 800, Purpose Representation 162 (later described), Collection of Object Representations 525, Object Representation 625, Object Property 630, Instruction Set 526, Extra Info 527, and/or other element from a compared element. In some aspects, difference index on a scale from 0 to 1 can be utilized, although, any other technique can also be utilized such as any numeric (i.e. 0.3, 1, 17, 58.2, 639, etc.), symbolic (i.e. "high", "medium", "low", etc.), mathematical (i.e. a function, etc.), modeled, and/or others. Difference index can be generated by Comparison 725 whether difference between the compared elements is determined or not. In one example, difference index can be determined for Object Representation 625 based on a ratio/percentage of different Object Properties 630 relative to the number of Object Properties 630 in Object Representation 625. Specifically, for instance, difference index of 0.18 is determined if 18% of Object Properties 630 of one Object Representation 625 differ from Object Properties 630 of another Object Representation 625. In some designs, importance (i.e. as indicated by importance index, etc.) of one or more Object Properties 630 can be included in the calculation of a weighted difference index. Similar determination of difference index can be implemented with Knowledge Cells 800, Purpose Representations 162, Collections of Object Representations 525, Object Properties 630, Instruction Sets 526, Extra Info 527, and/or other elements. Any of the aforementioned techniques of Comparison 725 can be utilized to determine or calculate difference index. Any difference ranking technique, and/or those known in art, can be utilized to determine or calculate difference index in alternate embodiments. Difference index can be used with the aforementioned number, percentage, and/or other thresholds in a determination of difference and/or at least partial match of compared elements.

The foregoing embodiments of Comparison 725 provide examples of utilizing various elements (i.e. Knowledge Cells 800, Purpose Representations 162, Collections of Object Representations 525, Object Representations 625, Object Properties 630, Instruction Sets 526, Extra Infos 527, numbers, text, pictures, models, etc.) as well as various rules, thresholds, logic, and/or techniques. It should be understood that any of these elements and/or techniques can be omitted, used in a different combination, or used in combination with other elements and/or techniques, and/or those known in art. In some aspects, Comparison 725 can automatically adjust (i.e. increase or decrease) the strictness of the rules for determining at least partial match and/or difference of any compared elements. In one example, Comparison 725 may attempt to find at least partial match in a certain percentage (i.e. 93%, etc.) of portions of the compared elements. If the comparison does not determine at least partial match of the compared elements, Comparison 725 may decide to decrease the strictness of the rules by requiring fewer portions of the compared elements to at least partially match, thereby increasing a chance of finding at least partial match in the compared elements. In another example, Comparison 725 may attempt to find at least partial match in a certain percentage (i.e. 61%, etc.) of portions of the compared elements. If the comparison determines multiple at least partially matching elements, Comparison 725 may decide to increase the strictness of the rules by requiring additional portions of the compared elements to at least partially match, thereby decreasing the number of at least partially matching elements until a best at least partially matching element is found. Similar automatic adjustment of the strictness of the rules can be used in determining difference of any compared elements. In further aspects, Comparison 725 can use match and/or difference indexes of the compared elements or portions thereof in determining at least partial match and/or difference of the elements. In one example, at least partial match of the compared elements can be determined when their match index exceeds a match threshold. In another example, at least partial match of the compared elements can be determined when an average or weighted average (i.e. weights may be assigned based on importance of the portions of the compared elements, etc.) of match indexes of the portions of the compared elements exceeds a match threshold. In a further example, difference of the compared elements can be determined when their difference index exceeds a difference threshold. In a further example, difference of the compared elements can be determined when an average or weighted average of difference indexes of the portions of the compared elements exceeds a difference threshold. Any of the aforementioned or other thresholds can be used in combination with match and/or difference indexes in alternate implementations. One of ordinary skill in art will understand that any of the aforementioned and/or other thresholds can be defined by a user, by system administrator, or automatically by the system based on experience, learning, testing, inquiry, analysis, synthesis, and/or other techniques, knowledge, or input. Specific threshold values are presented merely as examples of a variety of possible values and any threshold values can be defined depending on implementation even where specific examples of threshold values are presented herein. In further aspects, Comparison 725 can compare any variety of data structures, data formats, and/or data arrangements. In one example, Comparison 725 can compare fields/elements/portions of one data structure with same fields/elements/portions of another symmetric data structure as previously described. In another example, Comparison 725 can use field/element/portion mapping to compare fields/elements/portions of one data structure with mapped fields/elements/portions of another asymmetric data structure. One of ordinary skill in art will understand that such mapping can be defined or provided by a user, by system administrator, or automatically by the system based on experience, learning, testing, inquiry, analysis, synthesis, or other techniques, knowledge, or input. In general, Comparison 725 may include any data structure comparison techniques, and/or those known in art. In further aspects, Comparison 725 may include any dot product, data structure (i.e. array, vector, matrix, multi-dimensional data structure, etc.) product, and or other comparisons based on various data structures and/or multiplication, division, addition, subtraction, and/or other mathematical operations or functions. One of ordinary skill in art will understand that the aforementioned techniques for comparing various elements are described merely as examples of a variety of possible implementations, and that while all possible techniques for comparing various elements are too voluminous to describe, other techniques, and/or those known in art, for comparing various elements are within the scope of this disclosure.

Referring now to Instruction Set Implementation Interface 180. Instruction Set Implementation Interface 180 comprises functionality for implementing Instruction Sets 526, and/or other functionalities. Such Instruction Sets 526 may include Instruction Sets 526 to be used or executed in Device's 98 manipulations of one or more Objects 615 (i.e. physical objects, etc.) using artificial knowledge or Avatar's 605 manipulations of one or more Objects 616 (i.e. computer generated objects, etc.) using artificial knowledge. For example, Unit for Object Manipulation Using Artificial Knowledge 170 may provide Instruction Sets 526 to be used or executed in Device's 98 manipulations of one or more Objects 615 using artificial knowledge or Avatar's 605 manipulations of one or more Objects 616 using artificial knowledge to Instruction Set Implementation Interface 180 and Instruction Set Implementation Interface 180 may cause the Instruction Sets 526 to be executed. In some embodiments, Instruction Set Implementation Interface 180 can cause execution of Instruction Sets 526 on Processor 11. In such embodiments, Instruction Set Implementation Interface 180 may use standard process for executing Instruction Sets 526 including causing compilation/interpretation/translation of the Instruction Sets 526 (i.e. if not compiled/interpreted/translated already, etc.) and causing Processor 11 to execute the Instruction Sets 526. In other embodiments, Instruction Set Implementation Interface 180 can cause execution of Instruction Sets 526 on a microcontroller, if one is utilized. In further embodiments, Instruction Set Implementation Interface 180 can cause execution of Instruction Sets 526 in Application Program 18, Avatar 605, Device Control Program 18*a* (later described), Avatar Control Program 18*b* (later described), or other application program. In such embodiments, Instruction Set Implementation Interface 180 may access, modify, and/or perform other manipulations of Application Program 18, Avatar 605, Device Control Program 18*a*, Avatar Control Program 18*b*, or other application program. In further embodiments, Instruction Set Implementation Interface 180 can cause execution of Instruction Sets 526 on/in/by the aforementioned and/or other processing elements. In one example, Instruction Set Implementation Interface 180 can access, modify, and/or perform other manipulations of memory, storage, and/or other repository. In another example, Instruction Set Implementation Interface 180 can access, modify, and/or perform other manipulations of file, object, data structure, and/or other data arrangement. In a further example, Instruction Set Implementation Interface 180 can access, modify, and/or perform other manipulations of Processor 11 registers and/or other Processor 11 components. In a further example, Instruction Set Implementation Interface 180 can access, modify, and/or perform other manipulations of inputs and/or outputs of Processor 11, Microcontroller 250, Application Program 18, Avatar 605, Device Control Program 18*a*, Avatar Control Program 18*b*, other application program, and/or other processing element. In a further example, Instruction Set Implementation Interface 180 can access, modify, and/or perform other manipulations of runtime engine/environment, virtual machine, operating system, compiler, interpreter, translator, execution stack, and/or other computing system elements. In a further example, Instruction Set Implementation Interface 180 can access, create, delete, modify, and/or perform other manipulations of functions, methods, procedures, routines, subroutines, and/or other elements of Application Program 18, Avatar 605, Device Control Program 18*a*, Avatar Control Program 18*b*, or other application program. In a further example, Instruction Set Implementation Interface 180 can access, create, delete, modify, and/or perform other manipulations of source code, bytecode, compiled/interpreted/translated code, machine code, and/or other code. In a further example, Instruction Set Implementation Interface 180 can access, create, delete, modify, and/or perform other manipulations of values, variables, parameters, and/or other data or information. Instruction Set Implementation Interface 180 comprises functionality for attaching to or interfacing with Processor 11, Microcontroller 250, Application Program 18, Avatar 605, Device Control Program 18*a*, Avatar Control Program 18*b*, other application program, and/or other processing element as applicable. In some aspects, Instruction Set Implementation Interface 180 may implement Instruction Sets 526 at runtime. In other aspects, Unit for Object Manipulation Using Artificial Knowledge 170 may itself be configured to implement or cause execution of Instruction Sets 526, in which case Instruction Set Implementation Interface 180 can be optionally omitted. In further aspects, where a reference to implementing Instruction Sets 526 is used herein, it should be understood that implementing Instruction Sets 526 may include executing Instruction Sets 526, and these terms may be used interchangeably herein depending on context. Instruction Set Implementation Interface 180 may include any features, functionalities, and embodiments of Instruction Set Acquisition Interface 140, and vice versa. Instruction Set Implementation Interface 180 may include any hardware, programs, or combination thereof.

In some embodiments, implementing Instruction Sets 526 can be realized at least in part through instrumentation of an application program (i.e. Application Program 18, Avatar 605, Device Control Program 18*a*, Avatar Control Program 18*b*, etc.). Instrumentation of an application program may include inserting or injecting instrumentation code into the application program. Instrumentation may also sometimes involve overwriting or rewriting existing code, branching to an external code or function, and/or other manipulations of an application program. Instrumentation can be performed automatically (i.e. automatic instrumentation, etc.), dynamically (i.e. dynamic instrumentation, at runtime, etc.), or manually (i.e. manual instrumentation, etc.) as previously described. In one example, Instruction Set Implementation Interface 180 can utilize instrumentation to insert Instruction Sets 526 to be executed into Device Control Program 18*a*, thereby implementing the Instruction Sets 526 in Device's 98 manipulations of one or more Objects 615 (i.e. physical objects, etc.). Specifically, for instance, Instruction Set Implementation Interface 180 can instrument Device Control Program 18*a* by inserting instrumentation code into Device Control Program's 18*a* code as follows:

```
Device.move (x, y);//existing instruction set
implementInstructionSets (instructionSets);//instrumentation code
```

Instrumentation code (i.e. "implementInstructionSets (instructionSets)", etc.) can be placed before or after a function call (i.e. "Device.move (x, y)", etc.), or anywhere within the function itself. In another example, Instruction Set Implementation Interface 180 can utilize instrumentation to insert Instruction Sets 526 to be executed into Application Program 18, thereby implementing the Instruction Sets 526 in Avatar's 605 manipulations of one or more Objects 616 (i.e. computer generated objects, etc.). Specifically, for instance, Instruction Set Implementation Interface 180 can instrument Application Program 18 by inserting instrumentation code into Application Program's 18 code as follows: Avatar.move (x, y);//existing instruction set implementInstructionSets (instructionSets);//instrumentation code Instrumentation code (i.e. "implementInstructionSets (instructionSets)", etc.) can be placed before or after a function call (i.e. "Avatar.move (x, y)", etc.), or anywhere within the function itself. In general, one or more instances of instrumentation code can be placed anywhere in an application program's (i.e. Application Program's 18, Avatar's 605, Device Control Program's 18*a*, Avatar Control Program's 18*b*, etc.) code and can be executed at any points in an application program's execution. Instrumentation code may include Unit for Object Manipulation Using Artificial Knowledge 170-determined Instruction Sets 526 or Purpose Implementing Unit 181-determined Instruction Sets 526, etc. to be used or executed in Device's 98 manipulations of one or more Objects 615 using artificial knowledge or Avatar's 605 manipulations of one or more Objects 616 using artificial knowledge. In response to executing the instrumentation code, Device 98 may implement manipulations of one or more Objects 615 using artificial knowledge or Avatar 605 may implement manipulations of one or more Objects 616 using artificial knowledge. Instrumentation may include various techniques depending on implementation. In some implementations, instrumentation can be performed in source code, bytecode, compiled/interpreted/translated code, machine code, and/or other code. In other implementations, instrumentation can be performed at various granularities or code segments such as some or all functions/routines/subroutines, some or all lines of code, some or all statements, some or all instructions or instruction sets, some or all basic blocks, and/or some or all other code segments. In further implementations, instrumentation can be performed at various points of interest in an application program such as function calls, function entries, function exits, object creations, object destructions, event handler calls, and/or other points of interest. In further implementations, instrumentation can be performed in various elements of application program such as objects, data structures, event handlers, and/or other elements. In further implementations, instrumentation can be performed at various times in an application program's creation or execution such as at source code write/edit time, compile/interpretation/translation time, linking time, loading time, runtime, just-in-time, and/or other times. In further implementations, instrumentation can be performed in various elements of a computing system such as runtime engine/environment, virtual machine, operating system, compiler, interpreter, translator, and/or other elements. In further implementations, instrumentation can be performed in various repositories such as memory, storage, and/or other repositories. In further implementations, instrumentation can be performed in various abstraction layers of a computing system such as in software layer, in virtual machine (if VM is used), in operating system, in processor, and/or in other abstraction layers that may exist in a particular computing system implementation. Instrumentation can be performed anywhere where Instruction Sets 526 are used or executed. Any instrumentation techniques, and/or those known in art, can be utilized herein.

In some embodiments, implementing Instruction Sets 526 can be realized at least in part through metaprogramming. Metaprogramming may include application programs (i.e. Application Programs 18, Avatars 605, Device Control Programs 18*a*, Avatar Control Programs 18*b*, etc.) that can self-modify or that can create, modify, and/or manipulate other application programs (i.e. Application Programs 18, Avatars 605, Device Control Programs 18*a*, Avatar Control Programs 18*b*, etc.). Dynamic code, self-modifying code, reflection, and/or other techniques can be used to facilitate metaprogramming. For example, one application program can insert Instruction Sets 526 into another application program by modifying the in-memory code of the target application program. Similarly, a self-modifying application program can modify the in-memory code of itself. In some aspects, metaprogramming is facilitated through a programming language's ability to access and manipulate the internals of the runtime engine/environment directly or via an API. In other aspects, metaprogramming is facilitated through dynamic execution of Instruction Sets 526 (i.e. Unit for Object Manipulation Using Artificial Knowledge 170-determined Instruction Sets 526 or Purpose Implementing Unit 181-determined Instruction Sets 526, etc.) that can be created and/or executed at runtime. In yet other aspects, metaprogramming is facilitated through application program modification tools (i.e. Pin, DynamoRIO, DynInst, etc.), which can perform modifications of an application program regardless of whether the application program's programming language enables metaprogramming capabilities. Other platforms, tools, and/or techniques may provide equivalent or similar functionalities as the above described ones.

In some embodiments, implementing Instruction Sets 526 can be realized at least in part through native capabilities of dynamic, interpreted, and/or scripting programming languages or platforms. Dynamic, interpreted, and/or scripting programming languages or platforms enable dynamic code, self-modifying code, inserting new code, application program extending, and/or other runtime functionalities. Examples of dynamic, interpreted, and/or scripting languages include Lisp, Perl, PHP, JavaScript, Ruby, Python, Smalltalk, Tcl, VBScript, and/or others. Similar functionalities as the aforementioned can be provided in languages such as Java, C, and/or others using reflection. In one example, JavaScript can create and execute new Instruction Sets 526 at runtime by utilizing Function object constructor as follows:

```
myFunc=new Function (arg1, arg2, argN, functionBody);
```

This sample code creates a new function object with the specified arguments and body. The body and/or arguments of the new function object may include new Instruction Sets 526 (i.e. Unit for Object Manipulation Using Artificial Knowledge 170-determined Instruction Sets 526, etc.). The new function can be invoked as any other function in the original code.

In another example, JavaScript can create and execute new Instruction Sets 526 at runtime by utilizing eval method as follows:

```
instrSet= 'Device.Arm.push (forward, 0.35);';
if (instrSet!= "&& instrSet!=null)
{eval(instrSet);}
```

In a further example, JavaScript can create and execute new Instruction Sets 526 at runtime by utilizing eval method as follows:

```
instrSet= 'Avatar.Arm.push (forward, 0.35);';
if (instrSet!= " " && instrSet!=null)
{eval (instrSet);}
```

These sample codes create new Instruction Sets 526 (i.e. Unit for Object Manipulation Using Artificial Knowledge 170-determined Instruction Set 526 or Purpose Implementing Unit 181-determined Instruction Sets 526, etc.), which eval method can then execute. In a further example, similar to JavaScript, Lisp's compile command can create a new Instruction Set 526 at runtime, eval command may parse and evaluate a new Instruction Set 526 at runtime, and/or exec command may execute a new Instruction Set 526 at runtime. Other platforms, tools, and/or techniques may provide equivalent or similar functionalities as the above described ones.

In some embodiments, implementing Instruction Sets 526 can be realized at least in part through dynamic code, dynamic class loading, reflection, and/or other functionalities of a programming language or platform. In one example, dynamic class loading of Java Runtime Environment (JRE) enables a new class to be loaded when an instance of the new class is first invoked or constructed at runtime. The initial invocation of the new class can be implemented by inserting instrumentation code including the new class invocation. The class source code can be created at runtime to include new Instruction Sets 526 (i.e. Unit for Object Manipulation Using Artificial Knowledge 170-determined Instruction Sets 526 or Purpose Implementing Unit 181-determined Instruction Sets 526, etc.). A compiler such as javac, com.sun.tools.javac. Main, javax.tools, javax.tools. JavaCompiler, and/or other packages can be used to compile the class source code at runtime. A provided or custom class loader can then be used to load the compiled class into the runtime engine/environment. Once a dynamic class is created and loaded, reflection in Java enables implementation or execution of the new Instruction Sets 526 from the new class where needed. Reflection can be used to access, examine, execute, and/or manipulate a loaded class and/or its elements. Reflection in Java can be implemented by utilizing a reflection API such as java.lang. Reflect package. The reflection API enables loading or reloading a class, instantiating an instance of a class, determining a class' methods, invoking a class' methods, accessing and/or manipulating a class' fields, methods and constructors, and/or other functionalities. Examples of reflective programming languages and/or platforms include Java, JavaScript, Smalltalk, Lisp, Python,. NET Common Language Runtime (CLR), Tcl, Ruby, Perl, PHP, Scheme, PL/SQL, and/or others. In another example, a tool such as Java Programming Assistant (i.e. Javaassist, etc.) library can be used to enable creation or manipulation of a class at runtime, reflection, and/or other functionalities. In a further example, similar functionalities may be provided in tools such as Apache Commons Byte Code Engineering Library (BCEL), ObjectWeb ASM, Byte Code Generation Library (CGLIB), and/or others. Dynamic code, dynamic class loading, reflection, and/or other functionalities described above with respect to Java are similarly provided in the .NET platform through its tools such as System.CodeDom.Compiler namespace, System. Reflection. Emit namespace, and/or other.NET tools. Other platforms, tools, and/or techniques may provide equivalent or similar functionalities as the above described ones. In some embodiments, implementing Instruction Sets 526 can be realized at least in part through independent tools for implementing or causing execution of Instruction Sets 526. In addition to the aforementioned tools native to their respective platforms, independent tools may provide similar functionalities across different platforms. Examples of these independent tools include Pin, DynamoRIO, KernInst, DynInst, Kprobes, OpenPAT, DTrace, SystemTap, and/or others. In one example, just-in-time (JIT) mode of Pin API enables dynamic instrumentation by taking control of an application program (i.e. Application Program 18, Avatar 605, Device Control Program 18*a*, Avatar Control Program 18*b*, etc.) after it loads into memory where new Instruction Sets 526 (i.e. Unit for Object Manipulation Using Artificial Knowledge 170-determined Instruction Sets 526 or Purpose Implementing Unit 181-determined Instruction Sets 526, etc.) can be inserted where needed. Pin JIT compiler can be used to compile the new Instruction Sets 526 at runtime. In another example, probe mode of Pin API may use trampolines to implement new Instruction Sets 526. Independent tools may also enable a wide range of capabilities such as instrumentation, metaprogramming, dynamic code capabilities, self-modifying code capabilities, branching, code rewriting, code overwriting, hot swapping, accessing and/or modifying objects or data structures, accessing and/or modifying functions/routines/subroutines, accessing and/or modifying variable or parameter values, accessing and/or modifying processor registers, accessing and/or modifying inputs and/or outputs, accessing and/or modifying memory and/or repositories, and/or other capabilities. Other platforms, tools, and/or techniques may provide equivalent or similar functionalities as the above described ones.

In some embodiments, implementing Instruction Sets 526 can be realized at least in part through just-in-time (JIT) compiling. JIT compilation (also known as dynamic translation, dynamic compilation, etc.) includes compilation performed during an application program's (i.e. Application Program's 18, Avatar's 605, Device Control Program's 18*a*, Avatar Control Program's 18*b*, etc.) execution (i.e. runtime, etc.). Using JIT compilation, new Instruction Sets 526 (i.e. Unit for Object Manipulation Using Artificial Knowledge 170-determined Instruction Sets 526 or Purpose Implementing Unit 181-determined Instruction Sets 526, etc.) can be compiled shortly before their execution. In one example, Java, .NET, and/or other languages or platforms enable JIT compilation as their native functionality. In another example, independent tools may include JIT compilation functionalities. For instance, Pin can insert a reference to its JIT compiler into the address space of an application program. Once execution is redirected to it, JIT compiler may compile and execute new Instruction Sets 526. Other platforms, tools, and/or techniques may provide equivalent or similar functionalities as the above described ones.

In some embodiments, implementing Instruction Sets 526 can be realized at least in part through dynamic recompiling. Dynamic recompilation includes recompiling an application program (i.e. Application Program 18, Avatar 605, Device Control Program 18*a*, Avatar Control Program 18*b*, etc.) or part thereof during execution (i.e. runtime). Dynamic recompilation enables new Instruction Sets 526 (i.e. Unit for Object Manipulation Using Artificial Knowledge 170-determined Instruction Sets 526 or Purpose Implementing Unit 181-determined Instruction Sets 526, etc.) to take effect after recompilation. In an example of event driven application program, when an event occurs and an appropriate event handler is called, instrumentation can be used to insert new Instruction Sets 526 into the application program's source code at which point the modified application program's source code can be recompiled and/or executed. In an example of a procedural application program, when a function is called, instrumentation can be used to insert new Instruction Sets 526 into the function's source code at which point the modified function's source code can be recompiled and/or executed. In some aspects, the state of the application program can be saved before recompiling its modified source code or part thereof so that the application program may continue from its prior state. Saving the application program's state can be achieved by saving its variables, data structures, objects, current event, current function, and/or other necessary information in an environmental variable, memory, file, and/or other repository where they can be accessed once the application program or part thereof is recompiled. Other platforms, tools, and/or techniques may provide equivalent or similar functionalities as the above described ones. In some embodiments, implementing Instruction Sets 526 can be realized at least in part through altering or redirecting an application program's (i.e. Application Program's 18, Avatar's 605, Device Control Program's 18*a*, Avatar Control Program's 18*b*, etc.) execution. For example, new Instruction Sets 526 (i.e. Unit for Object Manipulation Using Artificial Knowledge 170-determined Instruction Sets 526 or Purpose Implementing Unit 181-determined Instruction Sets 526, etc.) can be executed by redirecting execution of an application program to the new Instruction Sets 526. Execution of an application program can be redirected by using a branch, jump, or other mechanism. A branch instruction can be inserted into an application program using instrumentation. A branch instruction may include an unconditional branch, which always results in branching, or a conditional branch, which may or may not result in branching depending on a condition. When executing an application program, a computer may fetch and execute instruction sets in sequence until it encounters a branch instruction, at which point the computer may fetch its next instruction set from a new Instruction Set 526 sequence as specified by the branch instruction. After the execution of the new Instruction Set 526 sequence, control can be redirected back to the original branch point or to another point in the application program. New Instruction Sets 526 can be just-in-time (JIT) compiled, JIT interpreted, or otherwise JIT translated before execution. Other platforms, tools, and/or techniques may provide equivalent or similar functionalities as the above described ones.

In some embodiments, implementing Instruction Sets 526 can be realized at least in part through assembly language. Because of a direct relationship with a computing system's architecture, assembly language can be a powerful tool for implementing or causing execution of new Instruction Sets 526 (i.e. Unit for Object Manipulation Using Artificial Knowledge 170-determined Instruction Sets 526 or Purpose Implementing Unit 181-determined Instruction Sets 526, etc.) in memory, processor registers, and/or other computing system elements. In some aspects, assembly language can be used to insert new Instruction Sets 526 into in-memory code of a loaded application program (i.e. Application Program 18, Avatar 605, Device Control Program 18*a*, Avatar Control Program 18*b*, etc.). In other aspects, assembly language can be used to rewrite or overwrite in-memory code of a loaded application program. In further aspects, assembly language can be used to redirect an application program's execution to a function/routine/subroutine comprising new Instruction Sets 526 elsewhere in memory by inserting a branch into the application program's in-memory code, by redirecting program counter, or by other techniques. Some operating systems may implement protection from changes to application programs loaded into memory. Operating system, processor, or other low level commands such as Linux mprotect command or similar commands in other operating systems may be used to unprotect the protected locations in memory before the change. In further aspects, assembly language can be used to read, modify, and/or manipulate instruction register, program counter, and/or other processor components. In further aspects, assembly language can be used to load into memory and cause execution of a dynamically created application program or function/routine/subroutine including new Instruction Sets 526. In some designs, a high-level programming language can call and/or execute an external assembly language program or function. In other designs, relatively low-level programming languages such as C may allow embedding assembly language code directly in their source code such as by using asm keyword of C. Other platforms, tools, and/or techniques may provide equivalent or similar functionalities as the above described ones.

In some embodiments, implementing Instruction Sets 526 can be realized at least in part through binary rewriting. Binary rewriting includes modifying an application program's (i.e. Application Program's 18, Avatar's 605, Device Control Program 18*a*, Avatar Control Program's 18*b*, etc.) executable. Binary rewriting can be used to implement or cause execution of new Instruction Sets 526 (i.e. Unit for Object Manipulation Using Artificial Knowledge 170-determined Instruction Sets 526 or Purpose Implementing Unit 181-determined Instruction Sets 526, etc.) by inserting the new Instruction Sets 526 or reference thereto into an application program's executable code. Binary rewriting may include disassembly, analysis, modification, and/or other operations on an application program's executable. Since binary rewriting works directly on machine code executable, it is independent of source language, compiler, virtual machine (if one is utilized), and/or other abstraction layers. Also, binary rewriting enables application program modifications without access to original source code. Examples of binary rewriting tools include SecondWrite, ATOM, DynamoRIO, Purify, Pin, EEL, DynInst, PLTO, and/or others. Binary rewriting tools include static, dynamic, and/or other rewriters. Static binary rewriters can modify an application program's executable when the executable is not in use (i.e. not running, etc.). Dynamic binary rewriters can modify an application program's executable during its execution (i.e. runtime, etc.). Other platforms, tools, and/or techniques may provide equivalent or similar functionalities as the above described ones.

In some embodiments, implementing Instruction Sets 526 can be realized at least in part through an operating system's native tools or capabilities such as Unix ptrace command. Ptrace includes a system call that enables one process to control another allowing the controller to access, modify, and/or manipulate the target. Ptrace's ability to write into the target application program's memory space enables the controller to modify the running code of the target application program with new Instruction Sets 526 (i.e. Unit for Object Manipulation Using Artificial Knowledge 170-determined Instruction Set 526 or Purpose Implementing Unit 181-determined Instruction Sets 526, etc.). In further embodiments, implementing or causing execution of new Instruction Sets 526 can be implemented at least in part through macros. Macros can be provided by dynamic as well as some non-dynamic languages. Macros include introspection, eval, and/or other capabilities. In some aspects, macros can access inner workings of the compiler, interpreter, virtual machine, runtime engine/environment, and/or other components of the computing platform enabling the definition of language-like constructs and/or generation of a complete program or parts thereof. Other platforms, tools, and/or techniques may provide equivalent or similar functionalities as the above described ones.

Figure 36A:
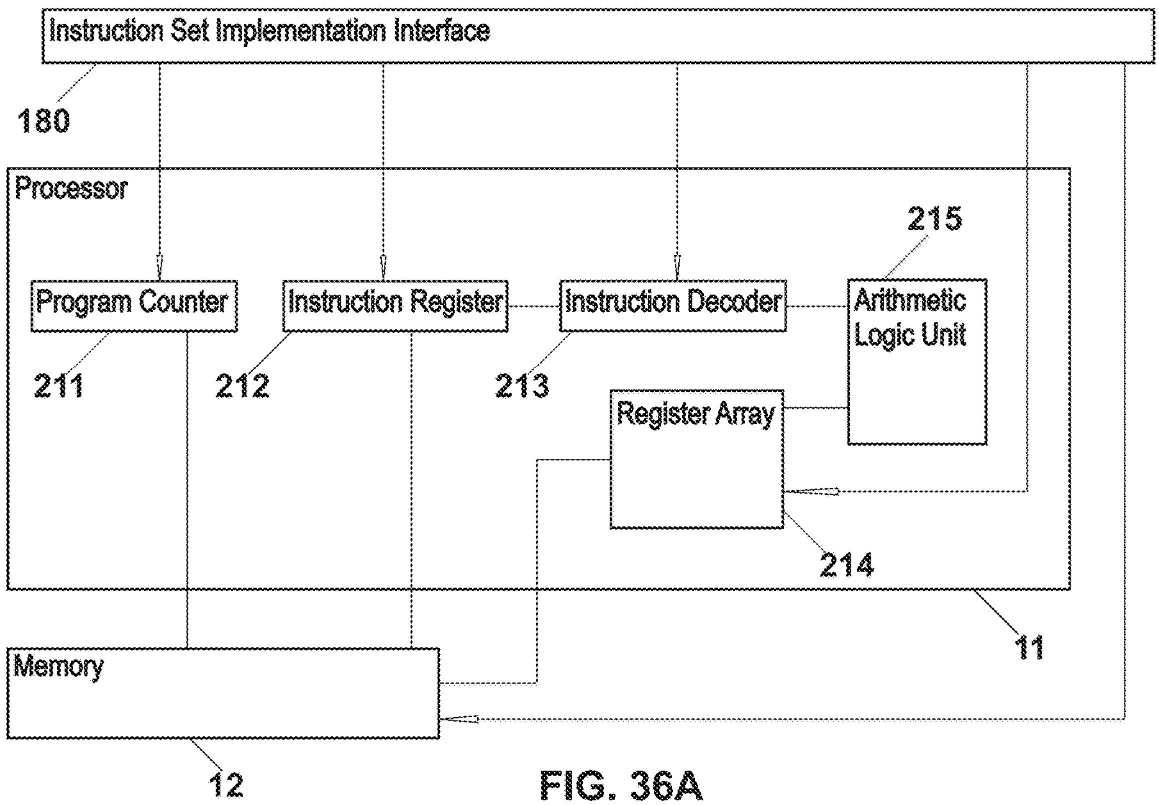
FIG. 36A-36C illustrate some embodiments of Instruction Set Implementation Interface 180.
Figure 36B:
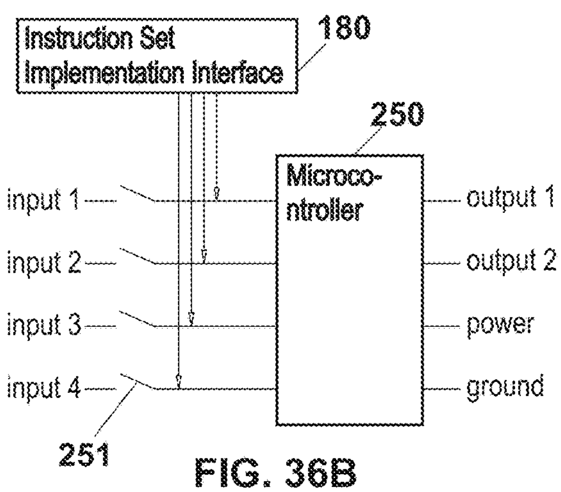
Figure 36C:
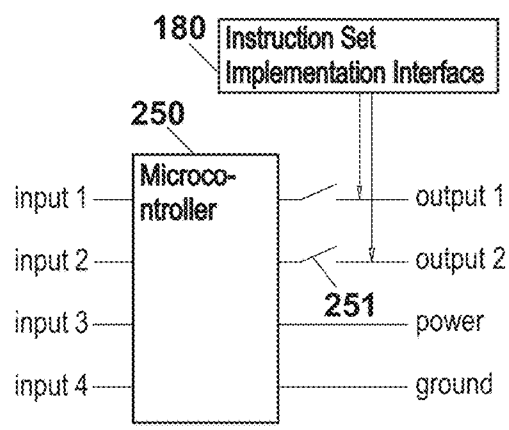

Referring to FIG. 36A-36C, some embodiments of Instruction Set Implementation Interface 180 are illustrated.

In an embodiment illustrated in FIG. 36A, implementing Instruction Sets 526 can be realized at least in part through modification of Processor 11 registers, Memory 12, and/or other computing system elements. In some aspects, implementing or causing execution of new Instruction Sets 526 (i.e. Unit for Object Manipulation Using Artificial Knowledge 170-determined Instruction Set 526 or Purpose Implementing Unit 181-determined Instruction Sets 526, etc.) includes redirecting Processor's 11 execution to the new Instruction Sets 526. In one example, Program Counter 211 may hold or point to a memory address of a next instruction set that will be executed by Processor 11. Unit for Object Manipulation Using Artificial Knowledge 170 or Purpose Implementing Unit 181 may determine new Instruction Sets 526 to be used or executed in Device's 98 manipulations of one or more Objects 615 (i.e. physical objects, etc.) using artificial knowledge or Avatar's 605 manipulations of one or more Objects 616 (i.e. computer generated objects, etc.) using artificial knowledge and store the new instruction sets in Memory 12. Instruction Set Implementation Interface 180 may then change Program Counter 211 to point to the location in Memory 12 where the new Instruction Sets 526 are stored. The new Instruction Sets 526 can then be fetched from the location in Memory 12 pointed to by the modified Program Counter 211 and loaded into Instruction Register 212 for decoding and execution. Once the new Instruction Sets 526 are executed, Instruction Set Implementation Interface 180 may change Program Counter 211 to point to the last instruction set before the redirection or to any other instruction set. In other aspects, new Instruction Sets 526 can be loaded directly into Instruction Register 212. As previously described, examples of other processor or computing system elements that can be used in an instruction cycle include memory address register (MAR), memory data register (MDR), data registers, address registers, general purpose registers (GPRs), conditional registers, floating point registers (FPRs), constant registers, special purpose registers, machine-specific registers, Register Array 214, Arithmetic Logic Unit 215, control unit, and/or others. Any of the aforementioned Processor 11 registers, Memory 12, or other computing system elements can be accessed and/or modified to facilitate the disclosed functionalities. In some implementations, processor interrupt can be issued to facilitate such access and/or modification. In some designs, modification of Processor 11 registers, Memory 12, or other computing system elements can be implemented in a program, combination of programs and hardware, or purely hardware system. Dedicated hardware can be built to perform modification of Processor 11 registers, Memory 12, or other computing system elements with marginal or no impact to computing overhead. Other platforms, tools, and/or techniques may provide equivalent or similar functionalities as the above described ones.

One of ordinary skill in art will understand that the aforementioned Processor 11 and/or other computing system elements are described merely as an example of a variety of possible implementations, and that while all possible Processors 11 and/or other computing system elements are too voluminous to describe, other Processors 11 and/or computing system elements, and/or those known in art, are within the scope of this disclosure. For example, other additional elements can be included as needed, or some of the disclosed ones can be excluded or altered, or a combination thereof can be utilized in alternate implementations of Processor 11 and/or other computing system elements.

In some embodiments, implementing Instruction Sets 526 can be realized at least in part through modification of inputs, outputs, and/or components of Microcontroller 250, if one is used. While Processor 11 includes any type of microcontroller, Microcontroller 250 is described separately herein to offer additional detail on its functioning. Microcontroller 250 comprises functionality for performing logic operations using the circuit's inputs and producing outputs based on the logic operations performed as previously described. In one example, Microcontroller 250 may perform some logic operations using four input values and produce two output values. Implementing or causing execution of new Instruction Sets 526 (i.e. Unit for Object Manipulation Using Artificial Knowledge 170-determined Instruction Sets 526 or Purpose Implementing Unit 181-determined Instruction Sets 526, etc.) may include replacing Microcontroller's 250 input values with new input values. Unit for Object Manipulation Using Artificial Knowledge 170 or Purpose Implementing Unit 181 may determine new input values (i.e. new Instruction Sets 526, etc.) as previously described. Instruction Set Implementation Interface 180 can then transmit the new input values to Microcontroller 250 through the four hardwired connections as shown in FIG. 36B. Instruction Set Implementation Interface 180 may use Switches 251 to prevent delivery of any input values that may be sent to Microcontroller 250 from its usual input source. As such, Instruction Set Implementation Interface 180 may cause Microcontroller 250 to perform its logic operations using the four new input values, thereby implementing new Instruction Sets 526. In another example, Microcontroller 250 may perform some logic operations using four input values and produce two output values. Implementing or causing execution of new Instruction Sets 526 (i.e. Unit for Object Manipulation Using Artificial Knowledge 170-determined Instruction Set 526 or Purpose Implementing Unit 181-determined Instruction Sets 526, etc.) may include replacing Microcontroller's 250 output values with new output values. Unit for Object Manipulation Using Artificial Knowledge 170 or Purpose Implementing Unit 181 may determine new output values (i.e. new Instruction Sets 526, etc.) as previously described. Instruction Set Implementation Interface 180 can then transmit the new output values through the two hardwired connections as shown in FIG. 36C. Instruction Set Implementation Interface 180 may use Switches 251 to prevent delivery of any output values that may be sent by Microcontroller 250. As such, Instruction Set Implementation Interface 180 may bypass Microcontroller 250 and transmit the two new output values to downstream elements, thereby implementing new Instruction Sets 526. In a further example, instead of or in addition to modifying Microcontroller's 250 input and/or output values, implementing or causing execution of new Instruction Sets 526 (i.e. Unit for Object Manipulation Using Artificial Knowledge 170-determined Instruction Set 526 or Purpose Implementing Unit 181-determined Instruction Sets 526, etc.) may include modifying values or signals in one or more Microcontroller's 250 internal components such as registers, memories, buses, and/or others (i.e. similar to the previously described modifying of Processor 11 components, etc.). In some designs, modifying inputs, outputs, and/or components of Microcontroller 250 can be implemented in a program, combination of programs and hardware, or purely hardware system. Dedicated hardware can be built to perform modifying of inputs, outputs, and/or components of Microcontroller 250 with marginal or no impact to computing overhead. Any of the elements and/or techniques for modifying inputs, outputs, and/or components of Microcontroller 250 can similarly be implemented with Processor 11 and/or other processing elements, and vice versa.

In some embodiments, Instruction Set Implementation Interface 180 may directly modify inputs of Actuator 91. For example, Processor 11, Microcontroller 250, or other processing element may control Actuator 91 that enables Device 98 to perform physical, mechanical, and/or other operations. Actuator 91 may receive one or more input values or control signals from Processor 11, Microcontroller 250, or other processing element directing Actuator 91 to perform specific operations. Modifying inputs of Actuator 91 includes replacing Actuator's 91 input values with new input values (i.e. new Instruction Sets 526, etc.) as previously described with respect to replacing input values of Microcontroller 250. Specifically, for instance, Unit for Object Manipulation Using Artificial Knowledge 170 may determine new input values (i.e. new Instruction Sets 526, etc.) as previously described. Instruction Set Implementation Interface 180 can then transmit the new input values to Actuator 91. Instruction Set Implementation Interface 180 may use Switches 251 to prevent delivery of any input values that may be sent to Actuator 91 from its usual input source. As such, Instruction Set Implementation Interface 180 may cause Actuator 91 to perform its operations using the new input values, thereby implementing new Instruction Sets 526.

One of ordinary skill in art will understand that the aforementioned Microcontroller 250 is described merely as an example of a variety of possible implementations, and that while all possible Microcontrollers 250 are too voluminous to describe, other Microcontrollers 250, and/or those known in art, are within the scope of this disclosure. In one example, any number of input and/or output values can be utilized in alternate implementations. In another example, Microcontroller 250 may include any number and/or combination of logic components to implement any logic operations. In a further example, other additional elements can be included as needed, or some of the disclosed ones can be excluded or altered, or a combination thereof can be utilized in alternate implementations of Microcontroller 250.

Other additional techniques or elements can be utilized as needed for implementing Instruction Sets 526, or some of the disclosed techniques or elements can be excluded, or a combination thereof can be utilized in alternate embodiments.

Figure 37A:
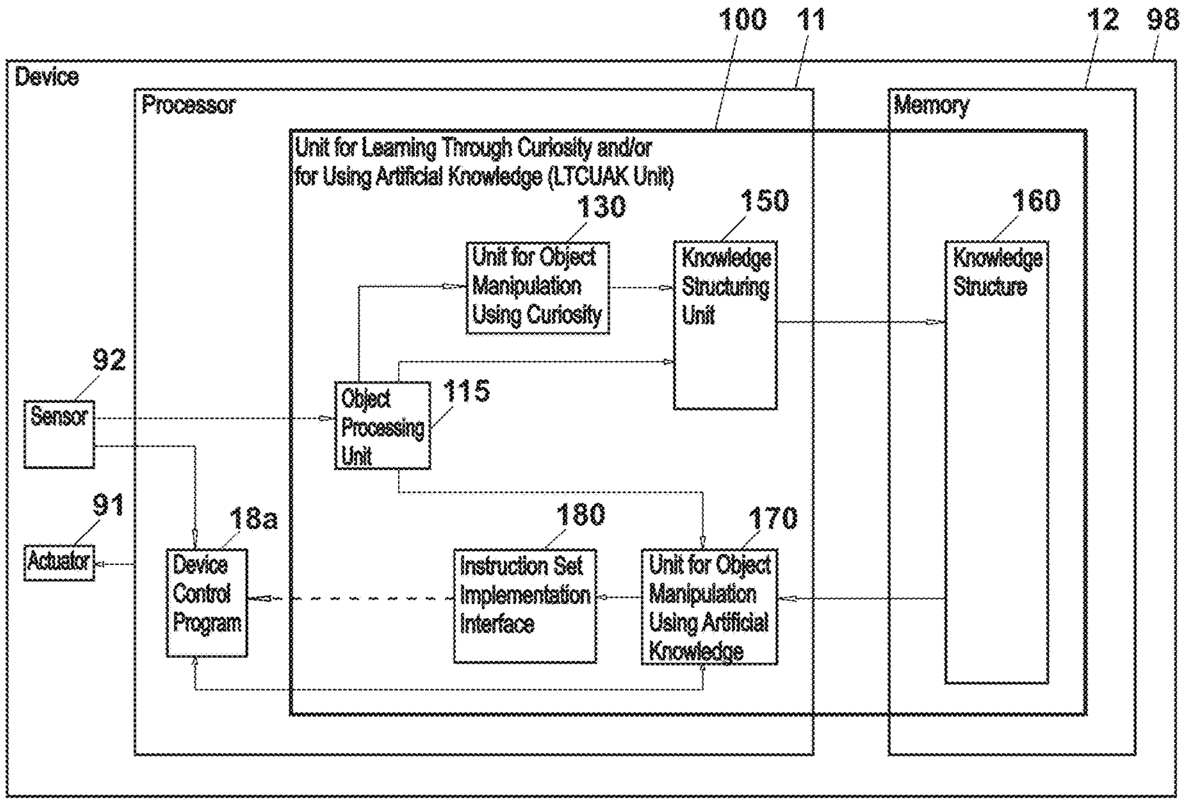
FIG. 37A-37B illustrate some embodiments of Device Control Program 18*a*.
Figure 37B:
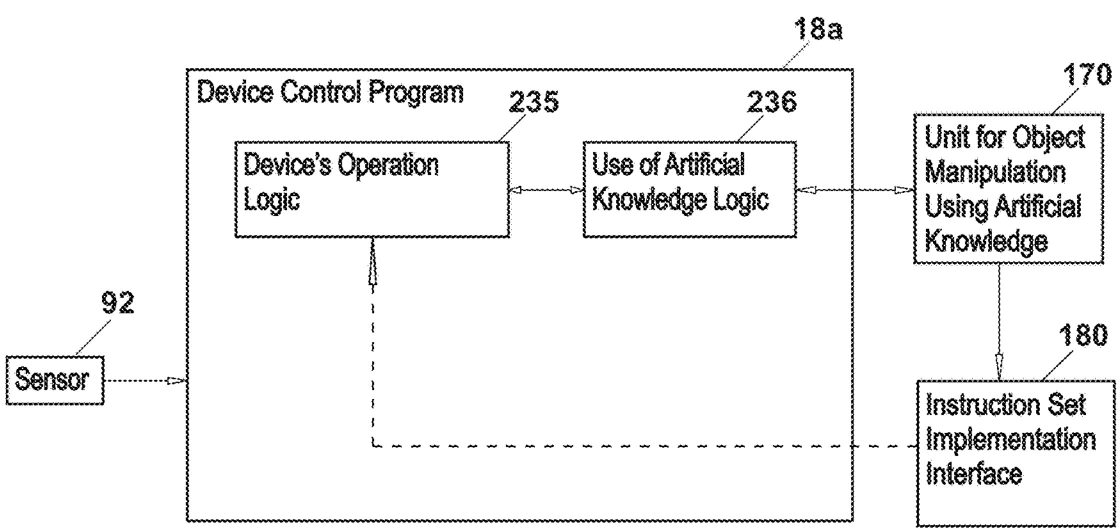

Referring to FIG. 37A-37B, some embodiments of Device Control Program 18*a* are illustrated. In an embodiment illustrated in FIG. 37A, Device Control Program 18*a* may utilize artificial knowledge. Device Control Program 18*a* (also referred to as application for operating device, or other suitable name or reference) comprises functionality for causing Device 98 to perform specific operations, and/or other functionalities. Device Control Program 18*a* may include any logic, functions, algorithms, and/or other elements that enable its functionalities.

In an embodiment illustrated in FIG. 37B, Device Control Program 18*a* may include connected Device's Operation Logic 235 and Use of Artificial Knowledge Logic 236. Device's Operation Logic 235 comprises functionality for causing Device's 98 operations, and/or other functionalities. Device's Operation Logic 235 may include any logic, functions, algorithms, and/or other elements that enable its functionalities. Examples of such logic, functions, algorithms, and/or other elements include navigation, obstacle avoidance, vehicle control, robot or robotic arm control, any device control, and/or others. Specifically, for instance, Device's Operation Logic 235 may include the following code:

```
detectedObjects=detectObjects ( )//detect objects in the
    surrounding and store them in detectedObjects array if
    (detectedObjects.length>0)//there is at least one object
    in detectedObjects array
{Device.doAvoidanceManeuvers (detectedObjects);}//
perform avoidance maneuvers among detected objects
```

One of ordinary skill in art will understand that the aforementioned code is provided merely as an example of a variety of possible implementations of Device's Operation Logic 235, and that while all possible implementations of Device's Operation Logic 235 are too voluminous to describe, other implementations of Device's Operation Logic 235 are within the scope of this disclosure. For example, other additional functions or code can be included as needed, or some of the disclosed ones can be excluded or altered, or a combination thereof can be utilized in alternate examples. Logics, functions, algorithms, and/or other elements used in device control programs for specific operations are known in art and will not be discussed in more detail herein. The disclosed systems, devices, and methods are independent of Device Control Program 18*a* and any Device Control Program 18*a* configured for any operations can be used herein depending on embodiments. Also, any Device Control Program 18*a* can use artificial knowledge in LTCUAK Unit 100 or elements (i.e. Knowledge Structure 160, etc.) thereof.

In some embodiments, Device's 98 operations may be facilitated or advanced by artificial knowledge in LTCUAK Unit 100 or elements thereof. Device Control Program 18*a* may attach to or interface with LTCUAK Unit 100 or elements thereof in order to access and utilize artificial knowledge. In some designs, Device Control Program 18*a* includes Use of Artificial Knowledge Logic 236. Use of Artificial Knowledge Logic 236 comprises functionality for deciding to use artificial knowledge, and/or other functionalities. As such, Use of Artificial Knowledge Logic 236 may serve as an interface between Device Control Program 18*a* or elements (i.e. Device's Operation Logic 235, etc.) thereof and LTCUAK Unit 100 or elements (i.e. Object Manipulation Using Artificial Knowledge 170, Knowledge Structure 160, etc.) thereof. Specifically, in one instance, Use of Artificial Knowledge Logic 236 may include the following code:

```
if (LTCUAK.hasArtificialKnowledge ( )=true)/*if
LTCUAK Unit has artificial knowledge about currently
    detected one or more objects or their state (i.e. if
    LTCUAK Unit has found Collection of Object Repre-
    sentations 525 or portions thereof in Knowledge Struc-
    ture 160 that at least partially match Collection of
    Object Representations 525 or portions thereof repre-
    senting the currently detected one or more Objects
    615)*/{
If (LTCUAK.instSets<>" ") {Device.execInstSets (LTC-
    UAK.instSets);}}/*execute instruction sets from LTC-
    UAK Unit*/
```

In another instance, Use of Artificial Knowledge Logic 236 may include the following code:

```
if (LTCUAK.hasArtificialKnowledge ( )=true AND LTC-
    UAK.hasDifferentState ( )=true)
/* . . . if hasArtificialKnowledge ( ) determination as
    above . . . AND LTCUAK Unit has a different state of
    the one or more detected objects (i.e. if LTCUAK Unit
    has found a subsequent Collection of Object Represen-
    tations 525 or portions thereof in Knowledge Structure
    160 that differ from Collection of Object Representa-
```

tions 525 or portions thereof representing the currently detected one or more Objects 615 or their state)*/

{If (LTCUAK.instSets< > ") {Device.execInstSets (LTCUAK.instSets);}/*execute instruction sets from LTCUAK Unit*/

In a further instance, Use of Artificial Knowledge Logic 236 may include the following code:

if (LTCUAK.hasArtificialKnowledge ( )=true AND LTCUAK.hasBeneficialState (beneficialStateRep)=true)

/* . . . if hasArtificialKnowledge ( ) determination as above . . . AND LTCUAK Unit has the given beneficial state of the one or more detected objects (i.e. if LTCUAK Unit has found a subsequent Collection of Object Representations 525 or portions thereof in Knowledge Structure 160 that at least partially match a collection of object representations or portions thereof representing a beneficial state of the one or more detected objects beneficialStateRep)*/{If (LTCUAK.instSets< > ") {Device.execInstSets (LTCUAK.instSets);}/*execute instruction sets from LTCUAK Unit*/

The foregoing code applicable to Device 98, Objects 615, Device Control Program 18*a*, and/or other elements may similarly be used as an example code applicable to Avatar 605, Objects 616, Avatar Control Program 18*b*, and/or other elements. For instance, references to Device in the foregoing code may be replaced with references to Avatar to implement code for use with respect to Avatar 605, Objects 616, Avatar Control Program 18*b*, and/or other elements.

One of ordinary skill in art will understand that the aforementioned codes are provided merely as examples of a variety of possible implementations of Use of Artificial Knowledge Logic 236, and that while all possible implementations of Use of Artificial Knowledge Logic 236 are too voluminous to describe, other implementations of Use of Artificial Knowledge Logic 236 are within the scope of this disclosure. For example, other additional functions or code can be included as needed, or some of the disclosed ones can be excluded or altered, or a combination thereof can be utilized in alternate examples. The aforementioned codes of Use of Artificial Knowledge Logic 236 may include or be combined with any portion of previously described example code of Unit for Object Manipulation Using Artificial Knowledge 170. It should also be noted that Use of Artificial Knowledge Logic 236 or its functionalities may be included in Device's Operation Logic 235, in which case Use of Artificial Knowledge Logic 236 as a separate element can be omitted. Also, Use of Artificial Knowledge Logic 236 can be an external element serving one or more Device Control Programs 18*a* and/or elements thereof. In general, Use of Artificial Knowledge Logic 236 can be provided in any suitable configuration. One of ordinary skill in art will understand that any features, functionalities, and/or embodiments of Device Control Program 18*a*, Device's Operation Logic 235, Use of Artificial Knowledge Logic 236, and/or other elements can be implemented in programs, hardware, or combination of programs and hardware. Therefore, a reference to Device Control Program 18*a* and/or other elements includes a reference to such programs, hardware, or combination of programs and hardware depending on implementation.

Use of Artificial Knowledge Logic 236 may utilize various techniques in deciding to use artificial knowledge from LTCUAK Unit 100 or elements thereof. In some implementations, when one or more Objects 615 are detected and at least partially matching one or more Collections of Object Representations 525 are found in Knowledge Structure 160, Device's Operation Logic 235 and/or Use of Artificial Knowledge Logic 236 may know a beneficial state of the one or more Objects 615 that advances Device's 98 operations. Such beneficial state of the one or more Objects 615 that advances Device's 98 operations may be learned from a previous encounter with the one or more Objects 615 in which the one or more Objects 615 were in the beneficial state, derived by reasoning, derived from simulation, hard-coded, and/or attained by other techniques. Use of Artificial Knowledge Logic 236 may provide one or more collections of object representations representing the beneficial state of the one or more Objects 615 to Unit for Object Manipulation Using Artificial Knowledge 170. Unit for Object Manipulation Using Artificial Knowledge 170 may find (i.e. using Comparison 725 as previously described, etc.), in Knowledge Structure 160, a subsequent one or more Collections of Object Representations 525 or portions thereof that at least partially match the one or more collections of object representations or portions thereof representing the beneficial state of the one or more Objects 615. Unit for Object Manipulation Using Artificial Knowledge 170 or elements thereof may then select or determine for execution Instruction Sets 526 correlated with the found subsequent one or more Collections of Object Representations 525 as previously described. Execution of such Instruction Sets 526 may cause Device 98 to manipulate the one or more Objects 615 resulting in the beneficial state of the one or more Objects 615. One or more collections of object representations representing a beneficial state of one or more Objects 615 may be generated in a variety of data structures, data formats, and/or data arrangements, and including a variety of object representations that may be different than the format or structure of Collections of Object Representations 525 in Knowledge Structure 160. In some designs, a collection of object representations representing a beneficial state of one or more Objects 615 may include various one or more object representations, object properties, and/or other elements or information. In one example of an Object 615 whose various states may involve various conditions, an object representation of a beneficial state of the Object 615 may include a symbolic or numeric representation such as open, 1, closed, 0, 84% open, 0.84, 73 cm open, 73, 58° open, 58, switched on, 1, switched off, 0, and/or others depending on the Object 615. In another example, an object representation of a beneficial state of an Object 615 may include a pictographic representation such as a picture of the state of the Object 615, and/or others. In a further example, an object representation of a beneficial state of an Object 615 may include a modeled representation such as a 3D model, 2D model, any computer model, and/or others. In an example of an Object 615 whose various states may involve various locations/movements, an object representation of a beneficial state of the Object 615 may include distance from Device 98, bearing/angle relative to Device 98, coordinates (i.e. relative coordinates relative to Device 98, absolute coordinates, etc.), and/or other location indicators. In a further example, an object representation of a beneficial state of an Object 615 may include Collection of Object Representations 525, Object Representation 625, one or more Object Properties 630, and/or others. In general, any object representation of a beneficial state of one or more Objects 615 can be used that can help Unit for Object Manipulation Using Artificial Knowledge 170 and/or other elements identify the beneficial state of the one or more Objects 615. In other implementations, when one or more Objects 615 are detected and at least partially matching one or more Collections of Object Representations 525 are found in Knowledge Structure 160, Device's Operation Logic 235 and/or Use of Artificial Knowledge Logic 236 may not know a beneficial state of the one or more Objects 615 that advances Device's 98 operations. Use of Artificial Knowledge Logic 236 may send a request to Unit for Object Manipulation Using Artificial Knowledge 170 to try to find any state of the one or more Objects 615 that results from the current state of the one or more Objects 615. Use of Artificial Knowledge Logic 236 may optionally request that such state of the one or more Objects 615 that results from the current state of the one or more Objects 615 differs from the current state of the one or more Objects 615. Unit for Object Manipulation Using Artificial Knowledge 170 may find, in Knowledge Structure 160, a subsequent one or more Collections of Object Representations 525 that represent some state of the one or more Objects 615 that results from the current state of the one or more Objects 615. Unit for Object Manipulation Using Artificial Knowledge 170 or elements thereof may then select or determine for execution Instruction Sets 526 correlated with the found subsequent one or more Collections of Object Representations 525 as previously described. Execution of such Instruction Sets 526 may cause Device 98 to manipulate the one or more Objects 615 resulting in a possibly beneficial state of the one or more Objects 615 that may advance Device's 98 operations. In the case that Unit for Object Manipulation Using Artificial Knowledge 170 finds, in Knowledge Structure 160, multiple subsequent one or more Collections of Object Representations 525 that represent states of the one or more Objects 615 that result from the current state of the one or more Objects 615, Unit for Object Manipulation Using Artificial Knowledge 170 may choose which one or more Collections of Object Representations 525 to use. Such choice may be based on a random pick, on an ordered pick (i.e. first found first used, etc.), on weights of Connections 853 among Knowledge Cells 800 comprising the one or more Collections of Object Representations 525, and/or on other factors. Also, a rating procedure can be implemented to rate how well the state of the one or more Objects 615 was anticipated and such rating can be used to improve future choices. In further implementations, when one or more Objects 615 are detected and at least partially matching one or more Collections of Object Representations 525 are found in Knowledge Structure 160, Unit for Object Manipulation Using Artificial Knowledge 170 may find, in Knowledge Structure 160, subsequent one or more Collections of Object Representations 525 that represent states of the one or more Objects 615 that result from the current state of the one or more Objects 615. Unit for Object Manipulation Using Artificial Knowledge 170 may provide the found subsequent one or more Collections of Object Representations 525 to Use of Artificial Knowledge Logic 236 or other elements at which point Use of Artificial Knowledge Logic 236 or other elements can choose to use one or more of the provided Collections of Object Representations 525 to advance Device's 98 operations. Unit for Object Manipulation Using Artificial Knowledge 170 or elements thereof may then select or determine for execution Instruction Sets 526 correlated with the chosen one or more Collections of Object Representations 525. Execution of such Instruction Sets 526 may cause Device 98 to manipulate the one or more Objects 615 resulting in a state of the one or more Objects 615 represented by the chosen one or more Collections of Object Representations 525, which may be beneficial in advancing Device's 98 operations. In general, Use of Artificial Knowledge Logic 236 and/or other elements can use any technique for deciding to use artificial knowledge from LTCUAK Unit 100 or elements thereof.

In some embodiments, Device Control Program **18*a* may be autonomous (i.e. operate without user input, etc.) and may decide when to use the artificial knowledge in LTCUAK Unit 100 or elements thereof. For example, Device's Operation Logic 235 may be configured to cause Device 98 to perform some work (i.e. mowing grass, etc.) in a yard, which may require Device 98 to go through a gate Object 615 to enter the yard. Device 98 may detect a closed gate Object 615 on the way to the yard and Device's Operation Logic 235 may not know how to open the gate Object 615. A beneficial state of the gate Object 615 is to be open and LTCUAK Unit 100 or elements thereof may include knowledge of opening the gate Object 615, which Use of Artificial Knowledge Logic 236 may decide to use to open the gate Object 615. In some implementations, when a closed gate Object 615 is detected, Device's Operation Logic 235 may know that a beneficial state of the gate Object 615 is open. Such knowledge of the open state of the gate Object 615 may be learned from a previous encounter with the gate Object 615 in which the gate Object 615 was in an open state, derived by reasoning, derived from simulation, hard-coded, and/or attained by other techniques. Use of Artificial Knowledge Logic 236 may send a representation (i.e. any symbolic representation [i.e. "open", etc.], any numeric representation [i.e. 1, etc.], any picture, any model, one or more Object Representations 625 or elements thereof, one or more Collections of Object Representations 525 or elements thereof, etc.) of the open state of the gate Object 615 to Unit for Object Manipulation Using Artificial Knowledge 170 for finding an open state of the gate Object 615 in Knowledge Structure 615. In other implementations, when a closed gate Object 615 is detected, Device's Operation Logic 235 may not know that a beneficial state of the gate Object 615 is open. Use of Artificial Knowledge Logic 236 may send a request to Unit for Object Manipulation Using Artificial Knowledge 170 to try to find, in Knowledge Structure 160, any state of the gate Object 615 that results from the current closed state of the gate Object 615. Use of Artificial Knowledge Logic 236 may optionally request that such state of the gate Object 615 be different from the current closed state of the gate Object 615. In further implementations, when a closed gate Object 615 is detected, Unit for Object Manipulation Using Artificial Knowledge 170 may find, in Knowledge Structure 160, one or more states of the gate Object 615 that result from the current closed state of the gate Object 615. Unit for Object Manipulation Using Artificial Knowledge 170 may provide the found states of the gate Object 615 to Use of Artificial Knowledge Logic 236 at which point Use of Artificial Knowledge Logic 236 can choose to use a provided state of the gate Object 615. Once a state of the gate Object 615 to be utilized is decided using the aforementioned and/or other techniques, Unit for Object Manipulation Using Artificial Knowledge 170 or elements thereof may select or determine Instruction Sets 526 to be used or executed in Device's 98 opening the gate Object 615 as previously described. Device Control Program 18*a* may return to its normal Device's Operation Logic 235 after the gate Object 615 is open for Device 98** to proceed to the yard.

In other embodiments, Device Control Program **18*a* may be at least partially directed by a user (not shown) and the user may decide when to use the artificial knowledge in LTCUAK Unit 100 or elements thereof. For example, a user may direct Device Control Program 18*a* to cause Device 98 to perform some work (i.e. mowing grass, etc.) in a yard, which may require Device 98 to go through a gate Object 615 to enter the yard. Device 98 may detect a closed gate Object 615 on the way to the yard and notify the user that knowledge is available in LTCUAK Unit 100 or elements thereof on how to open the gate Object 615 autonomously. User may decide to use the artificial knowledge in LTCUAK Unit 100 or elements thereof to open the gate Object 615 autonomously saving user the effort. Unit for Object Manipulation Using Artificial Knowledge 170 or elements thereof may select or determine Instruction Sets 526 to be used or executed in Device's 98 opening the gate Object 615 as previously described. User may take control of Device Control Program 18***a* after the gate Object 615 is open for the Device 98 to proceed to the yard under the user's control. Knowledge of any other manipulations instead of or in addition to opening a gate Object 615 can be learned and/or available in LTCUAK Unit 100 or elements thereof to automate the work and save user the effort. Also, Knowledge of manipulations of any other one or more Objects 615 instead of or in addition to a gate Object 615 can be learned and/or available in LTCUAK Unit 100 or elements thereof to automate the work and save user the effort. In some designs where a user solely directs the operation of Device 98, Device's Operation Logic 235 and/or Use of Artificial Knowledge Logic 236 may be omitted from Device Control Program 18*a*. A user may include a human user or non-human user. A non-human User 50 may include any device, system, program, and/or other mechanism for facilitating control or operation of Device 98 and/or elements thereof.

In further embodiments, LTCUAK Unit 100 or elements thereof may take control from, share control with, and/or release control to Device Control Program 18*a* and/or other processing element automatically or after prompting a user or other system to allow it. For example, responsive to Device's 98 detecting a closed gate Object 615, LTCUAK Unit 100 may take control from Device Control Program 18*a* to utilize the knowledge of opening the gate Object 615, after which LTCUAK Unit 100 can release control back to Device Control Program 18*a*. Any features, functionalities, and/or embodiments of Instruction Set Implementation Interface 180 can be used for such taking and/or releasing control.

In any of the aforementioned or other embodiments, Instruction Sets 526 selected or determined by Unit for Object Manipulation Using Artificial Knowledge 170 or elements thereof to be used or executed in Device's 98 manipulations of one or more Objects 615 can be implemented by Instruction Set Implementation Interface 180 as previously described. In one example, the Instruction Sets 526 can be executed directly on Processor 11, Microcontroller 250, and/or other processing element. In another example, the Instruction Sets 526 can be inserted into and executed within Device Control Program 18*a* or other application program. In some designs, Device Control Program 18*a* may include any features, functionalities, and/or embodiments of Unit for Object Manipulation Using Artificial Knowledge 170 and/or Instruction Set Implementation Interface 180, in which case Unit for Object Manipulation Using Artificial Knowledge 170 and/or Instruction Set Implementation Interface 180 can be omitted. In such designs, Device Control Program 18*a* may use the artificial knowledge stored in Knowledge Structure 160 directly without intermediate enabling elements. Any features, functionalities, and/or embodiments of Device Control Program 18*a* or elements thereof described with respect to LTCUAK Unit 100 or elements thereof, and vice versa, may similarly apply to Device Control Program 18*a* or elements thereof with respect to LTOUAK Unit 105 or elements thereof, and vice versa. One of ordinary skill in art will understand that the aforementioned Device Control Program 18*a* is described merely as an example of a variety of possible implementations, and that while all possible Device Control Programs 18*a* are too voluminous to describe, other Device Control Programs 18*a*, and/or those known in art, are within the scope of this disclosure. For example, other additional elements can be included as needed, or some of the disclosed ones can be excluded or altered, or a combination thereof can be utilized in alternate embodiments of Device Control Program 18*a*.

Figure 38A:
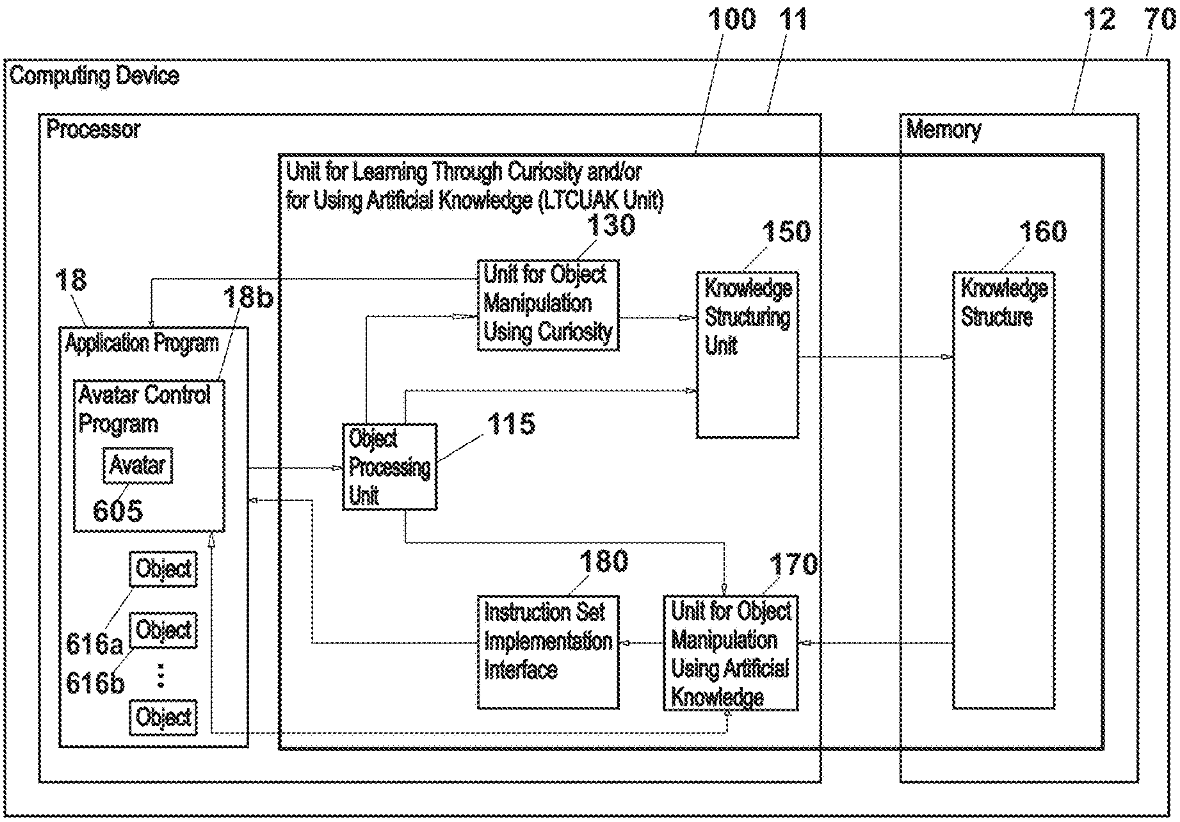
FIG. 38A-38B illustrate some embodiments of Avatar Control Program 18*b*.
Figure 38B:
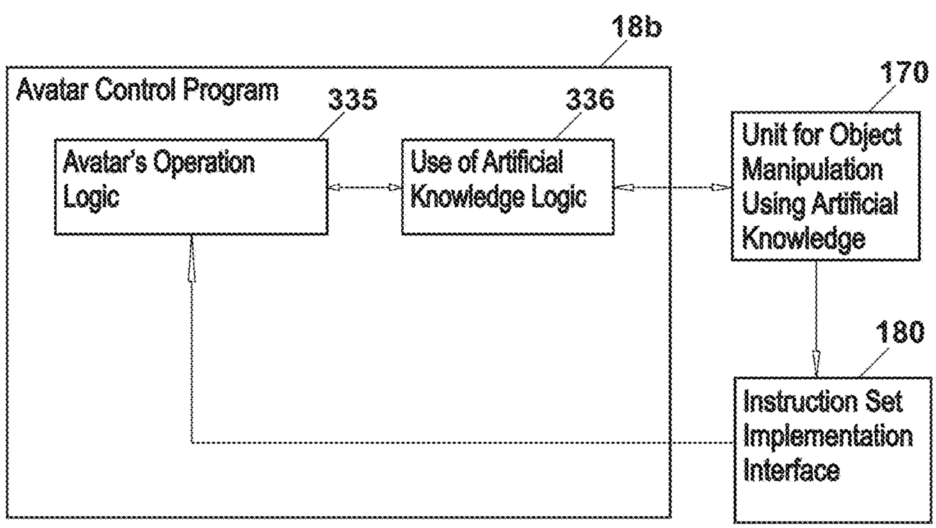

Referring to FIG. 38A-38B, some embodiments of Avatar Control Program 18*b* are illustrated. In an embodiment illustrated in FIG. 38A, Avatar Control Program 18*b* may utilize artificial knowledge. Avatar Control Program 18*b* (also referred to as application for operating avatar, or other suitable name or reference) comprises functionality for causing Avatar 605 to perform specific operations, and/or other functionalities. In some aspects, Avatar Control Program 18*b* includes any logic, functions, algorithms, and/or other elements that enable its functionalities.

In an embodiment illustrated in FIG. 38B, Avatar Control Program 18*b* may include connected Avatar's Operation Logic 335 and Use of Artificial Knowledge Logic 336. Avatar's Operation Logic 335 comprises functionality for causing Avatar's 605 operations, and/or other functionalities. Avatar's Operation Logic 335 may include any logic, functions, algorithms, and/or other elements that enable its functionalities. Examples of such logic, functions, algorithms, and/or other elements include navigation, obstacle avoidance, any avatar and/or element thereof control, and/or others. Specifically, for instance, Avatar's Operation Logic 335 may include the following code: detectedObjects=detectObjects ( )//detect objects in the surrounding and store them in detectedObjects array if (detectedObjects.length>0)//there is at least one object in detectedObjects array {Avatar.doAvoidanceManeuvers (detectedObjects);}//perform avoidance maneuvers among detected objects One of ordinary skill in art will understand that the aforementioned code is provided merely as an example of a variety of possible implementations of Avatar's Operation Logic 335, and that while all possible implementations of Avatar's Operation Logic 335 are too voluminous to describe, other implementations of Avatar's Operation Logic 335 are within the scope of this disclosure. For example, other additional functions or code can be included as needed, or some of the disclosed ones can be excluded or altered, or a combination thereof can be utilized in alternate examples. Logics, functions, algorithms, and/or other elements used in avatar control programs for specific operations are known in art and will not be discussed in more detail herein. The disclosed systems, devices, and methods are independent of Avatar Control Program 18*b* and any Avatar Control Program 18*b* configured for any operations can be used herein depending on embodiments. Also, any Avatar Control Program 18*b* can use the artificial knowledge in LTCUAK Unit 100 or elements (i.e. Knowledge Structure 160, etc.) thereof.

In some embodiments, Avatar's 605 operations may be facilitated or advanced by artificial knowledge in LTCUAK Unit 100 or elements thereof. Avatar Control Program 18*b* may attach to or interface with LTCUAK Unit 100 or elements thereof in order to access and utilize artificial knowledge. In some designs, Avatar Control Program 18*b* includes Use of Artificial Knowledge Logic 336. Use of Artificial Knowledge Logic 336 comprises functionality for deciding to use artificial knowledge, and/or other functionalities. As such, Use of Artificial Knowledge Logic 336 may serve as an interface between Avatar Control Program 18*b* or elements (i.e. Avatar's Operation Logic 335, etc.) thereof and LTCUAK Unit 100 or elements (i.e. Object Manipulation Using Artificial Knowledge 170, Knowledge Structure 160, etc.) thereof.

It should be noted that Use of Artificial Knowledge Logic 336 or its functionalities may be included in Avatar's Operation Logic 335, in which case Use of Artificial Knowledge Logic 336 as a separate element can be optionally omitted. Also, Use of Artificial Knowledge Logic 336 can be an external element serving one or more Avatar Control Programs 18*b* and/or elements thereof. In general, Use of Artificial Knowledge Logic 336 can be provided in any suitable configuration. One of ordinary skill in art will understand that any features, functionalities, and/or embodiments of Avatar Control Program 18*b*, Avatar's Operation Logic 335, Use of Artificial Knowledge Logic 336, and/or other elements can be implemented in programs, hardware, or combination of programs and hardware. Therefore, a reference to Avatar Control Program 18*b* and/or other elements includes a reference to such programs, hardware, or combination of programs and hardware depending on implementation. Avatar Control Program 18*b*, Avatar's Operation Logic 335, and/or Use of Artificial Knowledge Logic 336 may include any features, functionalities, and/or embodiments of Device Control Program 18*a*, Device's Operation Logic 235, and/or Use of Artificial Knowledge Logic 236, and vice versa.

Use of Artificial Knowledge Logic 336 may utilize various techniques in deciding to use artificial knowledge from LTCUAK Unit 100 or elements (i.e. Knowledge Structure 160, etc.) thereof. In some implementations, when one or more Objects 616 are detected or obtained, and at least partially matching one or more Collections of Object Representations 525 are found in Knowledge Structure 160, Avatar's Operation Logic 335 and/or Use of Artificial Knowledge Logic 336 may know a beneficial state of the one or more Objects 616 that advances Avatar's 605 operations. Such beneficial state of the one or more Objects 616 that advances Avatar's 605 operations may be learned from a previous encounter with the one or more Objects 616 in which the one or more Objects 616 were in the beneficial state, derived by reasoning, derived from simulation, hardcoded, and/or attained by other techniques. Use of Artificial Knowledge Logic 336 may provide one or more collections of object representations representing the beneficial state of the one or more Objects 616 to Unit for Object Manipulation Using Artificial Knowledge 170. Unit for Object Manipulation Using Artificial Knowledge 170 may find (i.e. using Comparison 725 as previously described, etc.), in Knowledge Structure 160, a subsequent one or more Collections of Object Representations 525 or portions thereof that at least partially match the one or more collections of object representations or portions thereof representing the beneficial state of the one or more Objects 616. Unit for Object Manipulation Using Artificial Knowledge 170 or elements thereof may then select or determine for execution Instruction Sets 526 correlated with the found subsequent one or more Collections of Object Representations 525 as previously described. Execution of such Instruction Sets 526 may cause Avatar 605 to manipulate the one or more Objects 616 resulting in the beneficial state of the one or more Objects 616. One or more collections of object representations representing a beneficial state of one or more Objects 616 may be generated in a variety of data structures, data formats, and/or data arrangements, and including a variety of object representations that may be different than the format or structure of Collections of Object Representations 525 in Knowledge Structure 160. In some designs, a collection of object representations representing a beneficial state of one or more Objects 616 may include various one or more object representations, object properties, and/or other elements or information. In one example of an Object 616 whose various states may involve various conditions, an object representation of a beneficial state of the Object 616 may include a symbolic or numeric representation such as open, 1, closed, 0, 84% open, 0.84, 73 cm open, 73, 58° open, 58, switched on, 1, switched off, 0, and/or others depending on the Object 616. In another example, an object representation of a beneficial state of an Object 616 may include a pictographic representation such as a picture of the state of the Object 616, and/or others. In a further example, an object representation of a beneficial state of an Object 616 may include a modeled representation such as a 3D model, 2D model, any computer model, and/or others. In an example of an Object 616 whose various states may involve various locations/movements, an object representation of a beneficial state of the Object 616 may include coordinates (i.e. relative coordinates relative to Avatar 605, absolute coordinates, etc.), distance from Avatar 605, bearing/angle relative to Avatar 605, and/or other location indicators. In a further example, an object representation of a beneficial state of an Object 616 may include Collection of Object Representations 525, Object Representation 625, one or more Object Properties 630, and/or others. In general, any object representation of a beneficial state of one or more Objects 616 can be used that can help Unit for Object Manipulation Using Artificial Knowledge 170 and/or other elements identify the beneficial state of the one or more Objects 616. In other implementations, when one or more Objects 616 are detected or obtained, and at least partially matching one or more Collections of Object Representations 525 are found in Knowledge Structure 160, Avatar's Operation Logic 335 and/or Use of Artificial Knowledge Logic 336 may not know a beneficial state of the one or more Objects 616 that advances Avatar's 605 operations. Use of Artificial Knowledge Logic 336 may send a request to Unit for Object Manipulation Using Artificial Knowledge 170 to try to find any state of the one or more Objects 616 that results from the current state of the one or more Objects 616. Use of Artificial Knowledge Logic 336 may optionally request that such state of the one or more Objects 616 that results from the current state of the one or more Objects 616 differs from the current state of the one or more Objects 616. Unit for Object Manipulation Using Artificial Knowledge 170 may find, in Knowledge Structure 160, a subsequent one or more Collections of Object Representations 525 that represent some state of the one or more Objects 616 that results from the current state of the one or more Objects 616. Unit for Object Manipulation Using Artificial Knowledge 170 or elements thereof may then select or determine for execution Instruction Sets 526 correlated with the found subsequent one or more Collections of Object Representations 525 as previously described. Execution of such Instruction Sets 526 may cause Avatar 605 to manipulate the one or more Objects 616 resulting in a possibly beneficial state of the one or more Objects 616 that may advance Avatar's 605 operations. In the case that Unit for Object Manipulation Using Artificial Knowledge 170 finds, in Knowledge Structure 160, multiple subsequent one or more Collections of Object Representations 525 that represent states of the one or more Objects 616 that result from the current state of the one or more Objects 616, Unit for Object Manipulation Using Artificial Knowledge 170 may choose which one or more Collections of Object Representations 525 to use. Such choice may be based on a random pick, on an ordered pick (i.e. first found first used, etc.), on weights of Connections 853 among Knowledge Cells 800 comprising the one or more Collections of Object Representations 525, and/or on other factors. Also, a rating procedure can be implemented to rate how well the state of the one or more Objects 616 was anticipated and such rating can be used to improve future choices. In further implementations, when one or more Objects 616 are detected or obtained, and at least partially matching one or more Collections of Object Representations 525 are found in Knowledge Structure 160, Unit for Object Manipulation Using Artificial Knowledge 170 may find, in Knowledge Structure 160, subsequent one or more Collections of Object Representations 525 that represent states of the one or more Objects 616 that result from the current state of the one or more Objects 616. Unit for Object Manipulation Using Artificial Knowledge 170 may provide the found subsequent one or more Collections of Object Representations 525 to Use of Artificial Knowledge Logic 336 or other elements at which point Use of Artificial Knowledge Logic 336 or other elements can choose to use one or more of the provided Collections of Object Representations 525 to advance Avatar's 605 operations. Unit for Object Manipulation Using Artificial Knowledge 170 or elements thereof may then select or determine for execution Instruction Sets 526 correlated with the chosen one or more Collections of Object Representations 525. Execution of such Instruction Sets 526 may cause Avatar 605 to manipulate the one or more Objects 616 resulting in a state of the one or more Objects 616 represented by the chosen one or more Collections of Object Representations 525, which may be beneficial in advancing Avatar's 605 operations. In general, Use of Artificial Knowledge Logic 336 and/or other elements can use any technique for deciding to use artificial knowledge from LTCUAK Unit 100 or elements thereof.

In some embodiments, Avatar Control Program **18*b* may be autonomous (i.e. operate without user input, etc.) and may decide when to use the artificial knowledge in LTCUAK Unit 100 or elements (i.e. Knowledge Structure 160, etc.) thereof. For example, Avatar's Operation Logic 335 may be configured to cause Avatar 605 to perform some work (i.e. simulated mowing grass, etc.) in a simulated yard, which may require Avatar 605 to go through a gate Object 616 to enter the simulated yard. Avatar 605 may detect a closed gate Object 616 on the way to the simulated yard and Avatar's Operation Logic 335 may not know how to open the gate Object 616. A beneficial state of the gate Object 616 is to be open and LTCUAK Unit 100 or elements thereof may include knowledge of opening the gate Object 616, which Use of Artificial Knowledge Logic 336 may decide to use to open the gate Object 616. In some implementations, when a closed gate Object 616 is detected or obtained, Avatar's Operation Logic 335 may know that a beneficial state of the gate Object 616 is open. Such knowledge of the open state of the gate Object 616 may be learned from a previous encounter with the gate Object 616 in which the gate Object 616 was in an open state, derived by reasoning, derived from simulation, hardcoded, and/or attained by other techniques. Use of Artificial Knowledge Logic 336 may send a representation (i.e. any symbolic representation [i.e. "open", etc.], any numeric representation [i.e. 1, etc.], any picture, any model, one or more Object Representations 625 or elements thereof, one or more Collections of Object Representations 525 or elements thereof, etc.) of the open state of the gate Object 616 to Unit for Object Manipulation Using Artificial Knowledge 170 for finding an open state of the gate Object 616 in Knowledge Structure 615. In other implementations, when a closed gate Object 616 is detected or obtained, Avatar's Operation Logic 335 may not know that a beneficial state of the gate Object 616 is open. Use of Artificial Knowledge Logic 336 may send a request to Unit for Object Manipulation Using Artificial Knowledge 170 to try to find, in Knowledge Structure 160, any state of the gate Object 616 that results from the current closed state of the gate Object 616. Use of Artificial Knowledge Logic 336 may optionally request that such state of the gate Object 616 be different from the current closed state of the gate Object 616. In further implementations, when a closed gate Object 616 is detected or obtained, Unit for Object Manipulation Using Artificial Knowledge 170 may find, in Knowledge Structure 160, one or more states of the gate Object 616 that result from the current closed state of the gate Object 616. Unit for Object Manipulation Using Artificial Knowledge 170 may provide the found states of the gate Object 616 to Use of Artificial Knowledge Logic 336 at which point Use of Artificial Knowledge Logic 336 can choose to use a provided state of the gate Object 616. Once a state of the gate Object 616 to be utilized is decided using the aforementioned and/or other techniques, Unit for Object Manipulation Using Artificial Knowledge 170 or elements thereof may select or determine Instruction Sets 526 to be used or executed in Avatar's 605 opening the gate Object 616 as previously described. Avatar Control Program 18*b* may return to its normal Avatar's Operation Logic 335 after the gate Object 616 is open for Avatar 605** to proceed to the simulated yard.

In other embodiments, Avatar Control Program **18*b* may be at least partially directed by a user (not shown) and the user may decide when to use the artificial knowledge in LTCUAK Unit 100 or elements (i.e. Knowledge Structure 160, etc.) thereof. For example, a user may direct Avatar Control Program 18*b* to cause Avatar 605 to perform some work (i.e. simulated mowing grass, etc.) in a simulated yard, which may require Avatar 605 to go through a gate Object 616 to enter the simulated yard. Avatar 605 may detect a closed gate Object 616 on the way to the simulated yard and notify the user that knowledge is available in LTCUAK Unit 100 or elements thereof on how to open the gate Object 616 autonomously. User may decide to use the artificial knowledge in LTCUAK Unit 100 or elements thereof to open the gate Object 616 autonomously saving user the effort. Unit for Object Manipulation Using Artificial Knowledge 170 or elements thereof may select or determine Instruction Sets 526 to be used or executed in Avatar's 605 opening the gate Object 616 as previously described. User may take control of Avatar Control Program 18*b* after the gate Object 616 is open for the Avatar 605 to proceed to the simulated yard under the user's control. Artificial knowledge of any other manipulations instead of or in addition to opening a gate Object 616 can be learned and/or available in LTCUAK Unit 100 or elements thereof to automate the work and save user the effort. Also, artificial knowledge of manipulations of any other one or more Objects 616 instead of or in addition to a gate Object 616 can be learned and/or available in LTCUAK Unit 100 or elements thereof to automate the work and save user the effort. In some designs where a user solely directs the operation of Avatar 605, Avatar's Operation Logic 335 and/or Use of Artificial Knowledge Logic 336 may be optionally omitted from Avatar Control Program 18*b*. A user may include a human user or non-human user. A non-human User 50 may include any device, system, program, and/or other mechanism for facilitating control or operation of Avatar 605 and/or elements thereof. In further embodiments, LTCUAK Unit 100 or elements thereof may take control from, share control with, and/or release control to Avatar Control Program 18***b* and/or other processing element automatically or after prompting a user or other system to allow it. For example, responsive to Avatar's 605 detecting a closed gate Object 616, LTCUAK Unit 100 may take control from Avatar Control Program 18*b* to utilize the knowledge of opening the gate Object 616, after which LTCUAK Unit 100 can release control back to Avatar Control Program 18*b*. Any features, functionalities, and/or embodiments of Instruction Set Implementation Interface 180 can be used for such taking and/or releasing control.

In any of the aforementioned or other embodiments, Instruction Sets 526 selected or determined by Unit for Object Manipulation Using Artificial Knowledge 170 or elements thereof to be used or executed in Avatar's 605 manipulations of one or more Objects 616 can be implemented by Instruction Set Implementation Interface 180 as previously described. In one example, the Instruction Sets 526 can be executed directly on Processor 11, and/or other processing element. In another example, the Instruction Sets 526 can be inserted into and executed within Avatar Control Program 18*b* or other application program. In some implementations, similar to how Avatar Control Program 18*b* may control Avatar's 605 operation within Application Program 18, an object control program or algorithm may be used to control Object's 616 operation or behavior within Application Program 18. In some designs, Avatar Control Program 18*b* may include any features, functionalities, and/or embodiments of Unit for Object Manipulation Using Artificial Knowledge 170 and/or Instruction Set Implementation Interface 180, in which case Unit for Object Manipulation Using Artificial Knowledge 170 and/or Instruction Set Implementation Interface 180 can be optionally omitted. In such designs, Avatar Control Program 18*b* may use the artificial knowledge stored in Knowledge Structure 160 directly without intermediate enabling elements. Any features, functionalities, and/or embodiments of Avatar Control Program 18*b* or elements thereof described with respect to LTCUAK Unit 100 or elements thereof, and vice versa, may similarly apply to Avatar Control Program 18*b* or elements thereof with respect to LTOUAK Unit 105 or elements thereof, and vice versa. One of ordinary skill in art will understand that the aforementioned Avatar Control Program 18*b* is described merely as an example of a variety of possible implementations, and that while all possible Avatar Control Programs 18*b* are too voluminous to describe, other Avatar Control Programs 18*b*, and/or those known in art, are within the scope of this disclosure. For example, other additional elements can be included as needed, or some of the disclosed ones can be excluded or altered, or a combination thereof can be utilized in alternate embodiments of Avatar Control Program 18*b*.

Figure 39A:
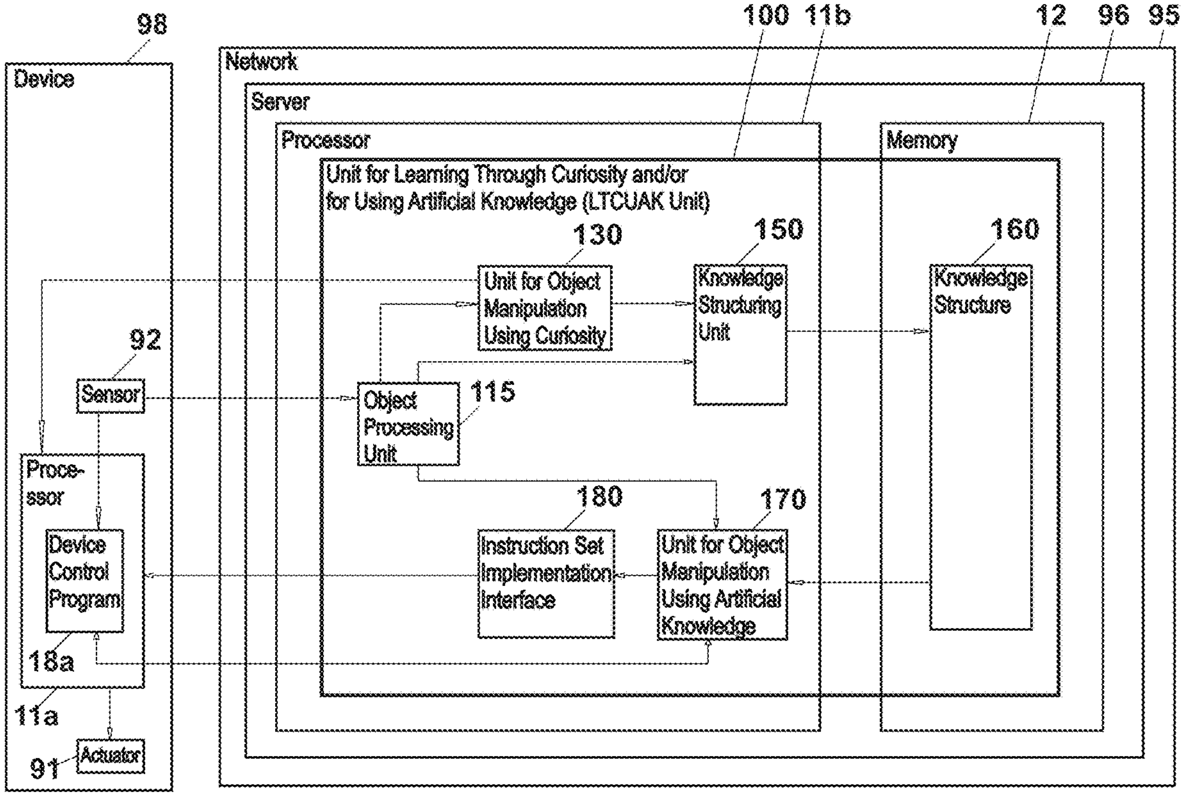
FIG. 39A-39B illustrate some embodiments where LTCUAK Unit 100 resides on Server 96.
Figure 39B:
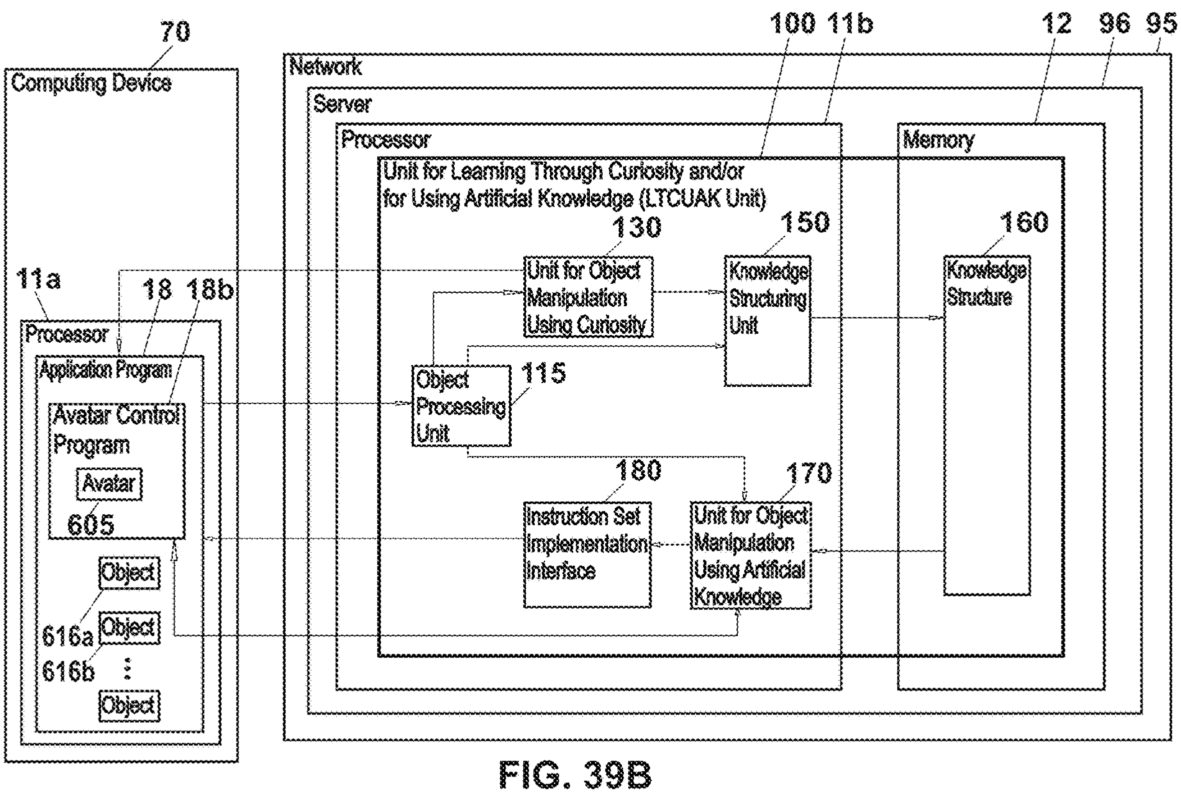

Referring to FIG. 39A-39B, some embodiments where LTCUAK Unit 100 resides on Server 96 accessible over Network 95 is illustrated. In an embodiment illustrated in FIG. 39A, Device 98 uses LTCUAK Unit 100 that resides on Server 96 accessible over Network 95. In an embodiment illustrated in FIG. 39B, Avatar 605 uses LTCUAK Unit 100 that resides on Server 96 accessible over Network 95. Any features, functionalities, and/or embodiments of LTCUAK Unit 100 and/or elements thereof that may reside on Server 96 may similarly apply to LTOUAK Unit 105 and/or elements thereof that may reside on Server 96, and/or other elements that may reside on a server. Any number of Devices 98 and/or Avatars 605 may connect to such remote LTCUAK Unit 100 and/or elements thereof, remote LTOUAK Unit 105 and/or elements thereof, and/or other remote elements to use their functionalities. Also, any number of Devices 98 and/or Avatars 605 can utilize artificial knowledge in a remote LTCUAK Unit 100 and/or elements thereof, remote LTOUAK Unit 105 and/or elements thereof, and/or other remote elements. In some aspects, a remote LTCUAK Unit 100 and/or elements thereof, remote LTOUAK Unit 105 and/or elements thereof, and/or other remote elements can be offered as a network service (i.e. online application, cloud application, etc.) on the Internet and be available to all the world's Devices 98 and/or Avatars 605 configured to utilize the remote LTCUAK Unit 100 and/or elements thereof, remote LTOUAK Unit 105 and/or elements thereof, and/or other remote elements. In one example, multiple Devices 98 and/or Avatars 605 can be controlled by a remote LTCUAK Unit 100 and/or elements thereof, remote LTOUAK Unit 105 and/or elements thereof, and/or other remote elements in their learning of manipulations of one or more Objects 615 and/or one or more Objects 616 using curiosity or their learning of observed manipulations of one or more Objects 615 and/or one or mor Objects 616. In another example, multiple Devices 98 and/or Avatars 605 can be controlled by a remote LTCUAK Unit 100 and/or elements thereof, remote LTOUAK Unit 105 and/or elements thereof, and/or other remote elements in their manipulations of one or more Objects 615 and/or one or more Objects 616 using artificial knowledge. Therefore, in some aspects, remote LTCUAK Unit 100 and/or elements thereof, remote LTOUAK Unit 105 and/or elements thereof, and/or other remote elements enable learning and/or using collective knowledge of manipulating one or more Objects 615 and/or one or more Objects 616 on/by/for multiple Devices 98 and/or Avatars 605. Any of the disclosed or other elements can reside on Device 98/Computing Device 70 or Server 96 depending on implementation. In one example, Object Processing Unit 115 can reside on Device 98 or Computing Device 70 while the rest of the elements of LTCUAK Unit 100 or LTOUAK Unit 105 can reside on Server 96. In another example, Unit for Object Manipulation Using Curiosity 130 can reside on Device 98 or Computing Device 70 while the rest of the elements of LTCUAK Unit 100 can reside on Server 96. In a further example, Unit for Observing Object Manipulation 135 can reside on Device 98 or Computing Device 70 while the rest of the elements of LTOUAK Unit 105 can reside on Server 96. In a further example, Unit for Object Manipulation Using Artificial Knowledge 170 and/or Instruction Set Implementation Interface 180 can reside on Device 98 or Computing Device 70 while the rest of the elements of LTCUAK Unit 100 or LTOUAK Unit 105 can reside on Server 96. In a further example, Knowledge Structure 160 can reside on Server 96 and the rest of the elements of LTCUAK Unit 100 or LTOUAK Unit 105 can reside on Device 98 or Computing Device 70. In a further example, Device Control Program 18*a* can reside on Device 98 while LTCUAK Unit 100 or LTOUAK Unit 105 can reside on Server 96. In a further example, Avatar Control Program 18*b* can reside on Computing Device 70 while LTCUAK Unit 100 or LTOUAK Unit 105 can reside on Server 96. In a further example, Device 98 or Computing Device 70 may include Processor 11*a* while Server 96 may include Processor 11*b*. Any other combination of local and remote elements can be used in alternate implementations. Server 96 may be or include any type or form of a remote computing device such as an application server, a network service server, a cloud server, a cloud, and/or other remote computing device. Server 96 may include any features, functionalities, and/or embodiments of Computing Device 70. It should be understood that Server 96 does not have to be a separate or remote computing device and that Server 96, its elements, or its functionalities can be implemented on a single device. Network 95 may include any of the previously described or other networks, connection types, protocols, interfaces, APIs, and/or other elements or techniques, and/or those known in art, all of which are within the scope of this disclosure.

Figure 40A:
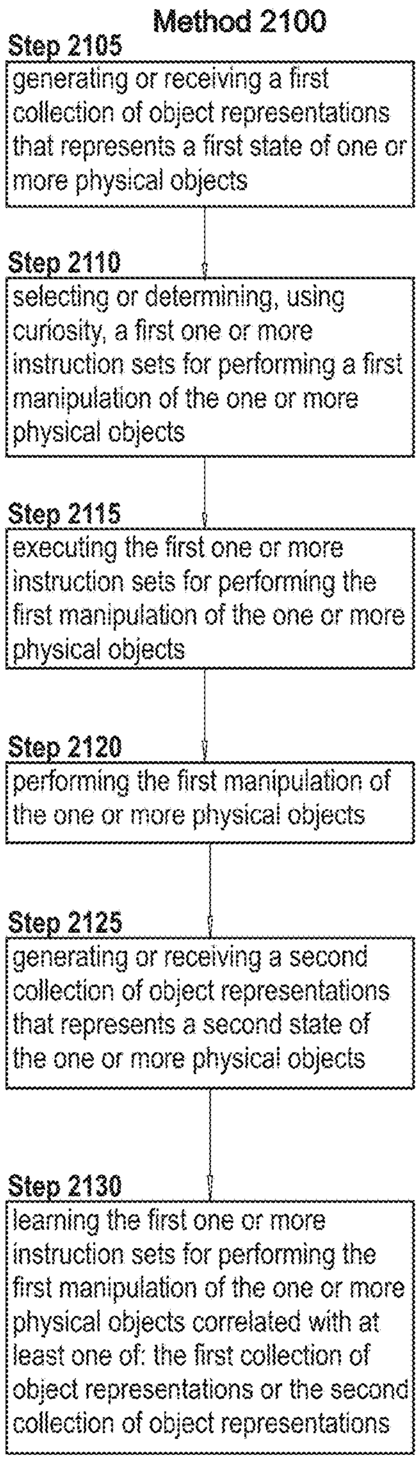
FIG. 40A illustrates an embodiment of method 2100.

Referring to FIG. 40A, an embodiment of method 2100 for learning manipulations of one or more physical objects using curiosity is illustrated.

At step 2105, a first collection of object representations that represents a first state of one or more physical objects is generated or received. In some aspects, a collection of object representations (i.e. the first collection of object representations, etc.) may represent a state of one or more physical objects (i.e. the first state of one or more physical objects, etc.) before the one or more physical objects are manipulated. A collection of object representations may include an electronic representation of one or more physical objects or state of one or more physical objects. In some designs, a collection of object representations (i.e. Collection of Object Representations 525, etc.) may include one or more object representations (i.e. Object Representations 625, etc.), and/or other elements or information. In some aspects, state of a physical object includes the physical object's mode of being. As such, state of a physical object may include or be defined at least in part by one or more object's properties (i.e. Object Properties 630, etc.) such as existence, location, shape, condition, and or other properties or attributes. An object representation that represents a physical object or state of the physical object, hence, may include one or more object properties. In general, an object representation may include any information related to a physical object. In some aspects, a collection of object representations includes one or more object representations, and/or other elements or information related to one or more physical objects detected in a device's (i.e. Device's 98, etc.) surrounding at a particular time. As such, a collection of object representations may represent one or more physical objects or state of one or more physical objects at a particular time. In some embodiments, a stream of collections of object representations may be used instead of a collection of object representations, and vice versa, in which case any features, functionalities, and/or embodiments described with respect to a collection of object representations can be used on/by/with/in a stream of collections of object representations. Therefore, the terms collection of object representations and stream of collections of object representations may be used interchangeably herein depending on context. A stream of collections of object representations may include one collection of object representations or a group, sequence, or other plurality of collections of object representations. In some aspects, a stream of collections of object representations includes one or more collections of object representations, and/or other elements or information related to one or more physical objects detected in a device's surrounding over time or during a time period. As such, a stream of collections of object representations may represent one or more physical objects or state of one or more physical objects over time or during a time period. In other embodiments, an object representation may be used instead of a collection of object representations (i.e. where representation of a single physical object is needed, etc.), in which case any features, functionalities, operations, and/or embodiments described with respect to a collection of object representations may similarly apply to an object representation. Therefore, the terms collection of object representations and object representation may be used interchangeably herein depending on context. In some aspects, an object representation includes one or more object properties, and/or other elements or information related to a physical object detected in a device's surrounding at a particular time. As such, an object representation may represent a physical object or state of a physical object at a particular time. In further embodiments, a stream of object representations may be used instead of a collection of object representations (i.e. where representation of a single physical object is needed, etc.), in which case any features, functionalities, operations, and/or embodiments described with respect to a collection of object representations may similarly apply to a stream of object representations. Therefore, the terms collection of object representations and stream of object representations may be used interchangeably herein depending on context. A stream of object representations may include one object representation or a group, sequence, or other plurality of object representations. In some aspects, a stream of object representations includes one or more object representations, and/or other elements or information related to a physical object detected in a device's surrounding over time or during a time period. As such, a stream of object representations may represent a physical object or state of a physical object over time or during a time period. Examples of physical objects include biological objects (i.e. persons, animals, vegetation, etc.), nature objects (i.e. rocks, bodies of water, etc.), manmade objects (i.e. buildings, streets, ground/aerial/aquatic vehicles, devices, etc.), and/or others. In some aspects, any part of a physical object may be detected as an object itself or sub-object. In general, a physical object may include any physical object or sub-object that can be detected. Examples of physical object properties include existence of a physical object, type of a physical object (i.e. person, cat, vehicle, building, street, tree, rock, etc.), identity of a physical object (i.e. name, identifier, etc.), location of a physical object (i.e. distance and bearing/angle from a known/reference point or object, relative or absolute coordinates, etc.), condition of a physical object (i.e. open, closed, 34% open, 23 mm open, switched on, switched off, etc.), shape/size of a physical object (i.e. height, width, depth, computer model, point cloud, etc.), activity of a physical object (i.e. motion, gestures, etc.), and/or other properties of a physical object. In general, a physical object property may include any attribute of a physical object (i.e. existence, type, identity, shape/size, etc.), any relationship of a physical object with a device, other objects, or the environment (i.e. location, friend/foe relationship, etc.), and/or other information related to a physical object. Physical objects, their states, and/or their properties can be detected by one or more sensors (i.e. Sensors 92, etc.) and/or an object processing unit (i.e. Object Processing Unit 115, etc.). In some aspects, an object processing unit may generate or create a collection of object representations, stream of collections of object representations, object representation, stream of object representations, and/or other elements. In some embodiments, a collection of object representations, stream of collections of object representations, object representation, and/or stream of object representations may be provided by an outside element or another element, in which case the collection of object representations, stream of collections of object representations, object representation, and/or stream of object representations may be received from the outside element or another element. Generating or receiving comprises any action or operation by or for a Collection of Object Representations 525, stream of Collections of Object Representations 525, Object Representation 625, stream of Object Representations 625, Object Property 630, Sensor 92, Camera 92*a*, Microphone 92*b*, Lidar 92*c*, Radar 92*d*, Sonar 92*e*, Object Processing Unit 115, Picture Recognizer 117*a*, Sound Recognizer 117*b*, Lidar Processing Unit 117*c*, Radar Processing Unit 117*d*, Sonar Processing Unit 117*e*, and/or other elements.

At step 2110, a first one or more instruction sets for performing a first manipulation of the one or more physical objects are selected or determined using curiosity. As curiosity includes an interest or desire to learn or know about something (i.e. as defined in English dictionary, etc.), the disclosure enables a device with an interest or desire to learn its surrounding including physical objects in the surrounding. In some aspects, selecting or determining, using curiosity, one or more instruction sets for performing a manipulation of one or more physical objects may include selecting or determining one or more instruction sets that can cause a device to perform curious, experimental, inquisitive, and/or other manipulation of the one or more physical objects. In other aspects, selecting or determining, using curiosity, one or more instruction sets for performing a manipulation of one or more physical objects may include selecting or determining one or more instruction sets randomly, in some order (i.e. instruction sets stored/received first are used first, instruction sets for physical/mechanical manipulations are used first, etc.), in some pattern, or using other techniques. In further aspects, selecting or determining, using curiosity, one or more instruction sets for performing a manipulation of one or more physical objects may include selecting or determining one or more instruction sets that can cause a device to perform a manipulation of the one or more physical objects that is not programmed or pre-determined to be performed on the one or more physical objects. In further aspects, selecting or determining, using curiosity, one or more instruction sets for performing a manipulation of one or more physical objects may include selecting or determining one or more instruction sets that can cause a device to perform a manipulation of the one or more physical objects to discover an unknown state of the one or more physical objects. In general, selecting or determining, using curiosity, one or more instruction sets for performing a manipulation of one or more physical objects may include selecting or determining one or more instruction sets that can cause a device to perform a manipulation of the one or more physical objects to enable learning of how the one or more physical objects can be used, how the one or more physical objects can be manipulated, how the one or more physical objects react to manipulations, and/or other aspects or information related to the one or more physical objects. Therefore, selecting or determining, using curiosity, one or more instruction sets for performing a manipulation of one or more physical objects enables learning a device's manipulations of the one or more physical objects and/or knowledge related thereto. In one example, one or more instruction sets for performing a manipulation of one or more physical objects may include one or more instruction sets for touching, pushing, pulling, lifting, dropping, gripping, twisting/rotating, squeezing, moving, and/or performing other physical/mechanical manipulations of the one or physical more objects. In another example, one or more instruction sets for performing a manipulation of one or more physical objects may include one or more instruction sets for stimulating with an electric charge, stimulating with a magnetic field, stimulating with an electro-magnetic signal, stimulating with a radio signal, illuminating with light, and/or performing other electrical, magnetic, or electro-magnetic manipulations of the one or more physical objects. In a further example, one or more instruction sets for performing a manipulation of one or more physical objects may include one or more instruction sets for stimulating with a sound signal, and/or performing other acoustic manipulations of the one or more physical objects. In a further example, one or more instruction sets for performing a manipulation of one or more physical objects may include one or more instruction sets for approaching, retreating, relocating, or moving relative to one or more physical objects, which are, in some aspects, considered manipulations of the one or more physical objects. In some aspects, one or more instruction sets for performing a manipulation of one or more physical objects may be selected or determined using no knowledge of how the one or more physical objects can be used and/or manipulated, using some knowledge of how certain physical objects can be used and/or manipulated, or using general information of how certain types of physical objects can be used and/or manipulated. In general, one or more instruction sets may be selected or determined using any information that can help in deciding which manipulations to implement. Selecting or determining comprises any action or operation by or for Unit for Object Manipulation Using Curiosity 130, Manipulation Logic 230, Physical/mechanical Manipulation Logic 230*a*, Electrical/magnetic/electro-magnetic Manipulation Logic 230*b*, Acoustic Manipulation Logic 230*c*, Instruction Set 526, and/or other elements.

At step 2115, the first one or more instruction sets for performing the first manipulation of the one or more physical objects are executed. Executing of one or more instruction sets for performing a manipulation of one or more physical objects may be performed in response to the aforementioned selecting or determining, using curiosity, of the one or more instruction sets for performing the manipulation of the one or more physical objects. In some aspects, one or more instruction sets may be executed by a processor (i.e. Processor 11, etc.), a microcontroller (i.e. Microcontroller 250, etc.), and/or other processing element. In other aspects, one or more instruction sets may be executed in/by an application, and/or other processing element. Executing comprises any action or operation by or for a Processor 11, Microcontroller 250, Application Program 18, Device Control Program 18*a*, Instruction Set Implementation Interface 180, and/or other elements.

At step 2120, the first manipulation of the one or more physical objects is performed. A manipulation of one or more physical objects may be performed by a device, one or more actuators (i.e. Actuators 21, etc.), one or more transmitters, and/or other elements. A manipulation of one or more objects may be performed in response to the aforementioned executing of one or more instruction sets for performing the manipulation of the one or more physical objects. In one example, a processor, microcontroller, and/or other processing element may be caused to execute one or more instruction sets responsive to which one or more actuators may implement a device's physical or mechanical manipulations of one or more physical objects. In another example, a processor, microcontroller, and/or other processing element may be caused to execute one or more instruction sets responsive to which one or more transmitters (i.e. electric charge transmitter, electromagnet, radio transmitter, laser or other light transmitter, etc.; not shown) may implement a device's electrical, magnetic, electro-magnetic, and/or other manipulations of one or more physical objects. In a further example, a processor, microcontroller, and/or other processing element may be caused to execute one or more instructions sets responsive to which one or more sound transmitters (i.e. speaker, horn, etc.; not shown) may implement a device's acoustic and/or other manipulations of one or more physical objects. In general, a manipulation includes any manipulation, operation, stimulus, and/or effect on any one or more physical objects or the environment. A manipulation may include one or more manipulations as, in some aspects, the manipulation may be a combination of simpler or other manipulations. Performing comprises any action or operation by or for Device 98, Actuator 21, any transmitter, and/or other elements.

At step 2125, a second collection of object representations that represents a second state of the one or more physical objects is generated or received. In some aspects, a collection of object representations (i.e. the second collection of object representations, etc.) may represent a state of one or more physical objects (i.e. the second state of the one or more physical objects, etc.) after the one or more physical objects are manipulated (i.e. in the first manipulation, etc.). Step 2125 may include any action or operation described in Step 2105 as applicable.

At step 2130, the first one or more instruction sets for performing the first manipulation of the one or more physical objects correlated with at least one of: the first collection of object representations or the second collection of object representations are learned. Learning may include correlating one or more elements. In some aspects, one or more instruction sets can be correlated with one or more collections of object representations. In other aspects, one or more instruction sets can be correlated with one or more object representations. In further aspects, one or more instruction sets can be correlated with one or more streams of collections of object representations. In further aspects, one or more instruction sets can be correlated with one or more streams of object representations. One or more instruction sets may temporally correspond with the correlated one or more collections of object representations, one or more object representations, one or more streams of collections of object representations, and/or one or more streams of object representations. In further aspects, one or more instruction sets can be correlated with one or more connections among one or more collections of object representations, one or more object representations, one or more streams of collections of object representations, and/or one or more streams of object representations. In further aspects, one or more collections of object representations, one or more object representations, one or more streams of collections of object representations, and/or one or more streams of object representations may not be correlated (i.e. uncorrelated, etc.) with any instruction sets. Learning may also include storing one or more elements. In some aspects, a knowledge cell (i.e. Knowledge Cell 800, etc.) may be generated that includes or stores one or more collections of object representations (or one or more references thereto), one or more object representations (or one or more references thereto), one or more streams of collections of object representations (or one or more references thereto), and/or one or more streams of object representations (or one or more references thereto) correlated or uncorrelated with any (i.e. zero, one or more, etc.) instruction sets. A knowledge cell may include any data structure or arrangement that can facilitate such storing. Knowledge cells can be used in/as neurons, nodes, vertices, or other elements in a knowledge structure (i.e. Knowledge Structure 160, Collection of Sequences 160*a*, Graph or Neural Network 160*b*, Collection of Knowledge Cells [not shown], etc.). Knowledge cells may be connected, associated, related, or linked into knowledge structures using statistical, artificial intelligence, machine learning, and/or other models or techniques. In general, a knowledge structure may be or include any data structure or arrangement capable of storing and/or organizing artificial knowledge disclosed herein. A knowledge structure can be used for enabling a device's manipulations of one or more physical objects using artificial knowledge. In some implementations, any knowledge cell, collection of object representations, object representation, stream of collections of object representations, stream of object representations, instruction set, and/or other element may include or be associated with extra information (i.e. Extra Info 527, etc.) that may optionally be used to facilitate enhanced decision making and/or other functionalities where applicable. Examples of extra information include time information, location information, computed information, contextual information, and/or other information. Learning comprises any action or operation by or for a Knowledge Structuring Unit 150, Knowledge Cell 800, Node 852, Connection 853, Knowledge Structure 160, Collection of Sequences 160*a*, Sequence 163, Graph or Neural Network 160*b*, Collection of Knowledge Cells (not shown), Comparison 725, Memory 12, Storage 27, and/or other disclosed elements.

Figure 40B:
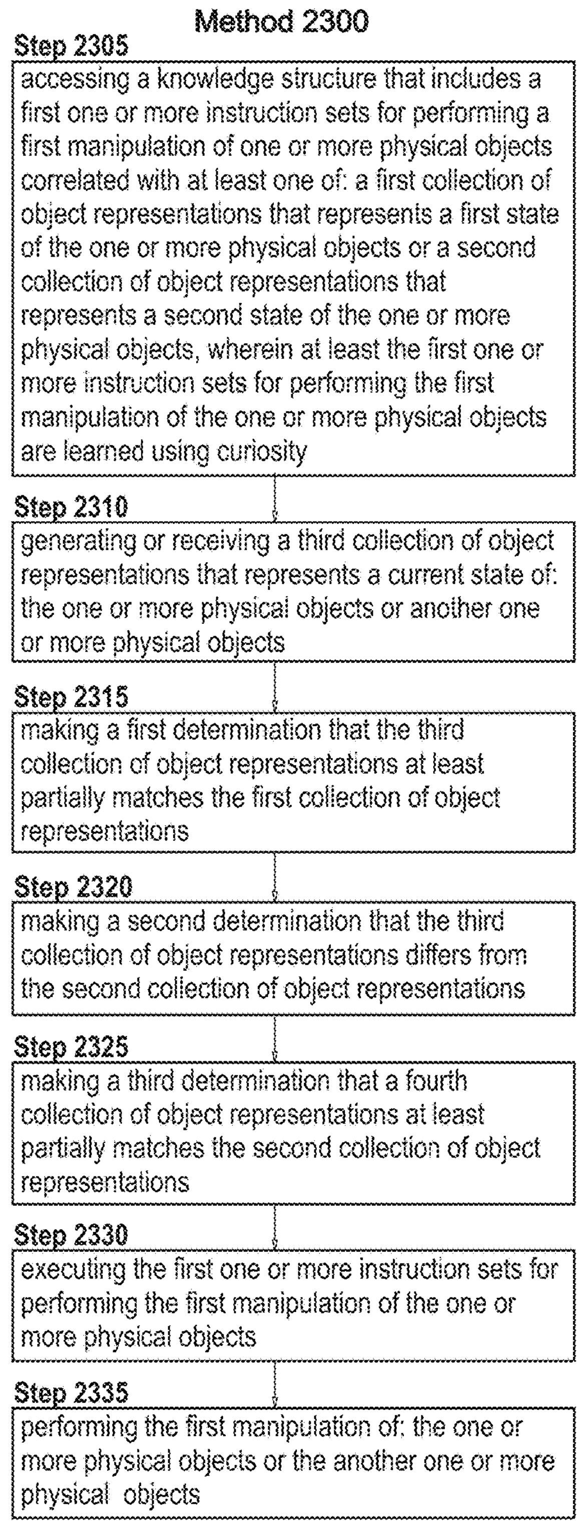
FIG. 40B illustrates an embodiment of method 2300.

Referring to FIG. 40B, an embodiment of method 2300 for manipulations of one or more physical objects using artificial knowledge is illustrated.

At step 2305, a knowledge structure that includes a first one or more instruction sets for performing a first manipulation of one or more physical objects correlated with at least one of: a first collection of object representations that represents a first state of the one or more physical objects or a second collection of object representations that represents a second state of the one or more physical objects is accessed, wherein at least the first one or more instruction sets for performing the first manipulation of the one or more physical objects are learned using curiosity. In some aspects, the knowledge structure and/or elements/portions thereof may be caused, generated, and/or learned by any action or operation described in steps 2105-2130 of method 2100 as applicable. As such, the knowledge structure and/or elements/portions thereof comprise any features, functionalities, and/or embodiments of the knowledge structure and/or elements/portions thereof described in method 2100 as applicable. Accessing comprises any action or operation by or for Knowledge Structure 160, Knowledge Cell 800, Collection of Object Representations 525, Instruction Set 526, and/or other elements.

At step 2310, a third collection of object representations that represents a current state of: the one or more physical objects or another one or more physical objects is generated or received. Step 2310 may include any action or operation described in Step 2105 of method 2100 as applicable.

At step 2315, a first determination is made that the third collection of object representations at least partially matches the first collection of object representations. In some embodiments, a collection of object representations (i.e. the third collection of object representations, etc.) representing a current state of one or more physical objects can be searched in a knowledge structure by comparing (i.e. using Comparison 725, etc.) the collection of object representations or portions thereof with collections of object representations or portions thereof from the knowledge structure. A determination may be made that the collection of object representations or portions thereof representing the current state of the one or more physical objects at least partially matches a collection of object representations (i.e. the first collection of object representations, etc.) or portions thereof from the knowledge structure. In some designs, determining at least partial match between compared collections of object representations includes determining that their match or similarity is less than, equal to, or higher than a threshold (i.e. number threshold, percentage threshold, etc.) depending on implementation. In other designs, determining at least partial match between compared collections of object representations includes determining that a number or a percentage of at least partially matching portions of one collection of object representations and portions of another collection of object representations exceeds a threshold number or a threshold percentage. A portion of a collection of object representations may include an object representation, an object property, a number, a text, a picture, a model, and/or others. In further designs, concerning streams of collections of object representations, determining at least partial match between compared streams of collections of object representations includes determining that their match or similarity is less than, equal to, or higher than a threshold (i.e. number threshold, percentage threshold, etc.) depending on implementation. In further designs, concerning streams of collections of object representations, determining at least partial match between compared streams of collections of object representations includes determining that a number or a percentage of at least partially matching portions of one stream of collections of object representations and portions of another stream of collections of object representations exceeds a threshold number or a threshold percentage. A portion of a stream of collections of object representations may include a collection of object representations, an object representation, an object property, a number, a text, a picture, a model, and/or others. In some designs, concerning object representations, determining at least partial match between compared object representations includes determining that their match or similarity is less than, equal to, or higher than a threshold (i.e. number threshold, percentage threshold, etc.) depending on implementation. In other designs, determining at least partial match between compared object representations includes determining that a number or a percentage of at least partially matching portions of one object representation and portions of another object representation exceeds a threshold number or a threshold percentage. A portion of an object representation may include an object property, a number, a text, a picture, a model, and/or others. In further designs, concerning streams of object representations, determining at least partial match between compared streams of object representations includes determining that their match or similarity is less than, equal to, or higher than a threshold (i.e. number threshold, percentage threshold, etc.) depending on implementation. In further designs, concerning streams of object representations, determining at least partial match between compared streams of object representations includes determining that a number or a percentage of at least partially matching portions of one stream of object representations and portions of another stream of object representations exceeds a threshold number or a threshold percentage. A portion of a stream of object representations may include an object representation, an object property, a number, a text, a picture, a model, and/or others. Determining may include accounting for importance, type, order, omission, and/or other aspects or techniques relating to portions of collections of object representations, object representations, streams of collections of object representations, or streams of object representations. Determining may include any data and/or data structure comparison techniques, and/or those known in art. Determining may include any rules, thresholds, logic, and/or techniques, and/or those known in art, for comparing various elements. Determining comprises any action or operation by or for Comparison 725, Unit for Object Manipulation Using Artificial Knowledge 170, Use of Artificial Knowledge Logic 236, and/or other elements.

At step 2320, a second determination is made that the third collection of object representations differs from the second collection of object representations. In some embodiments, assuming that a state other than the current state of the one or more physical objects may potentially be beneficial (i.e. a device is willing to try any state of the one or more physical objects other than the current state, etc.), a knowledge structure can be searched for a collection of object representations representing any state of the one or more physical objects that results from the current state of the one or more physical objects and that is different from (i.e. other than, etc.) the current state of the one or more physical objects. A collection of object representations (i.e. the third collection of object representations, etc.) or portions thereof representing the current state of the one or more physical objects can be compared (i.e. using Comparison 725, etc.) with collections of object representations or portions thereof from the knowledge structure. A determination may be made that one or more considered collections of object representations (i.e. the second collection of object representations, etc.) or portions thereof from the knowledge structure differ from the collection of object representations or portions thereof representing the current state of the one or more objects. In other embodiments, one or more collections of object representations representing states of the one or more physical objects that result from the current state of the one or more objects and that are determined to differ from the current state of the one or more physical objects may be provided to a receiver (i.e. application, system, etc.) at which point the receiver may decide to use one or more of the provided collections of object representations. In some designs, determining difference of compared collections of object representations includes determining that their difference or dissimilarity is less than, equal to, or higher than a threshold (i.e. number threshold, percentage threshold, etc.) depending on implementation. In other designs, determining difference of compared collections of object representations includes determining that a number or a percentage of different portions of one collection of object representations and portions of another collection of object representations exceeds a threshold number or a threshold percentage. In further designs, concerning streams of collections of object representations, determining difference of compared streams of collections of object representations includes determining that their difference or dissimilarity is less than, equal to, or higher than a threshold (i.e. number threshold, percentage threshold, etc.) depending on implementation. In further designs, concerning streams of collections of object representations, determining difference of compared streams of collections of object representations includes determining that a number or a percentage of different portions of one stream of collections of object representations and portions of another stream of collections of object representations exceeds a threshold number or a threshold percentage. In further designs, concerning object representations, determining difference of compared object representations includes determining that their difference or dissimilarity is less than, equal to, or higher than a threshold (i.e. number threshold, percentage threshold, etc.) depending on implementation. In further designs, concerning object representations, determining difference of compared object representations includes determining that a number or a percentage of different portions of one object representation and portions of another object representation exceeds a threshold number or a threshold percentage. In further designs, concerning streams of object representations, determining difference of compared streams of object representations includes determining that their difference or dissimilarity is less than, equal to, or higher than a threshold (i.e. number threshold, percentage threshold, etc.) depending on implementation. In further designs, concerning streams of object representations, determining difference of compared streams of object representations includes determining that a number or a percentage of different portions of one stream of object representations and portions of another stream of object representations exceeds a threshold number or a threshold percentage. Determining may include accounting for importance, type, order, omission, and/or other aspects or techniques relating to portions of collections of object representations, object representations, streams of collections of object representations, or streams of object representations. Determining may include any data and/or data structure comparison techniques, and/or those known in art. Determining may include any rules, thresholds, logic, and/or techniques, and/or those known in art, for comparing various elements. Determining comprises any action or operation by or for Comparison 725, Unit for Object Manipulation Using Artificial Knowledge 170, Use of Artificial Knowledge Logic 236, and/or other elements. Step 2320 may be optionally omitted depending on implementation.

At step 2325, a third determination is made that a fourth collection of object representations at least partially matches the second collection of object representations. In some embodiments, a collection of object representations (i.e. the fourth collection of object representations, etc.) may represent a beneficial or desirable state of the one or more physical objects. Such beneficial or desirable state of the one or more physical objects may advance or facilitate a device's operations. A collection of object representations representing a beneficial state of one or more physical objects may be learned or generated from a previous encounter with the one or more objects in which the one or more physical objects were in the beneficial state. A collection of object representations representing a beneficial state of one or more physical objects may also be derived by reasoning, derived from simulation, hardcoded, and/or attained by other techniques. In some aspects, a collection of object representations representing a beneficial state of one or more objects may be provided by a device control program (i.e. Device Control Program 18*a*, etc.) or elements thereof, and/or other systems or elements. As such, a collection of object representations (i.e. the fourth collection of object representations, etc.) may be generated in a variety of data structures, data formats, and/or data arrangements, and including a variety of object representations that may be different than the format or structure of collections of object representations in the knowledge structure. In general, a collection of object representations representing a beneficial state of one or more objects may include any one or more object representations, object properties, and/or other elements or information that enable representing or identifying a beneficial state of one or more physical objects. A knowledge structure can be searched for a collection of object representations representing a beneficial state of one or more physical objects by comparing (i.e. using Comparison 725, etc.) the collection of object representations or portions thereof with collections of object representations or portions thereof from the knowledge structure. A determination may be made that a collection of object representations or portions thereof from the knowledge structure at least partially matches the collection of object representations or portions thereof representing the beneficial state of the one or more physical objects. In some embodiments, an object representation representing a beneficial state of a physical object can be used instead of a collection of object representations representing a beneficial state of one or more physical objects. In other embodiments, a stream of collections of object representations representing a beneficial state of one or more physical objects can be used instead of a collection of object representations representing a beneficial state of one or more physical objects. In further embodiments, a stream of object representations representing a beneficial state of a physical object can be used instead of a collection of object representations representing a beneficial state of one or more physical objects. Any features, functionalities, operations, and/or embodiments described with respect to a collection of object representations may similarly apply to an object representation, stream of collections of object representations, or stream of object representations. Determining may include any action or operation described in Step 2315 as applicable. Determining comprises any action or operation by or for Comparison 725, Unit for Object Manipulation Using Artificial Knowledge 170, Use of Artificial Knowledge Logic 236, and/or other elements. Step 2325 may be optionally omitted depending on implementation.

At step 2330, the first one or more instruction sets for performing the first manipulation of the one or more physical objects are executed. In some aspects, Step 2330 may be performed in response to at least the first determination in Step 2315, and optionally the second determination in Step 2320 and/or optionally the third determination in Step 2325. Step 2330 may include any action or operation described in Step 2115 of method 2100 as applicable.

At step 2335, the first manipulation of: the one or more physical objects or the another one or more physical objects is performed. Step 2335 may include any action or operation described in Step 2120 of method 2100 as applicable.

Figure 41A:
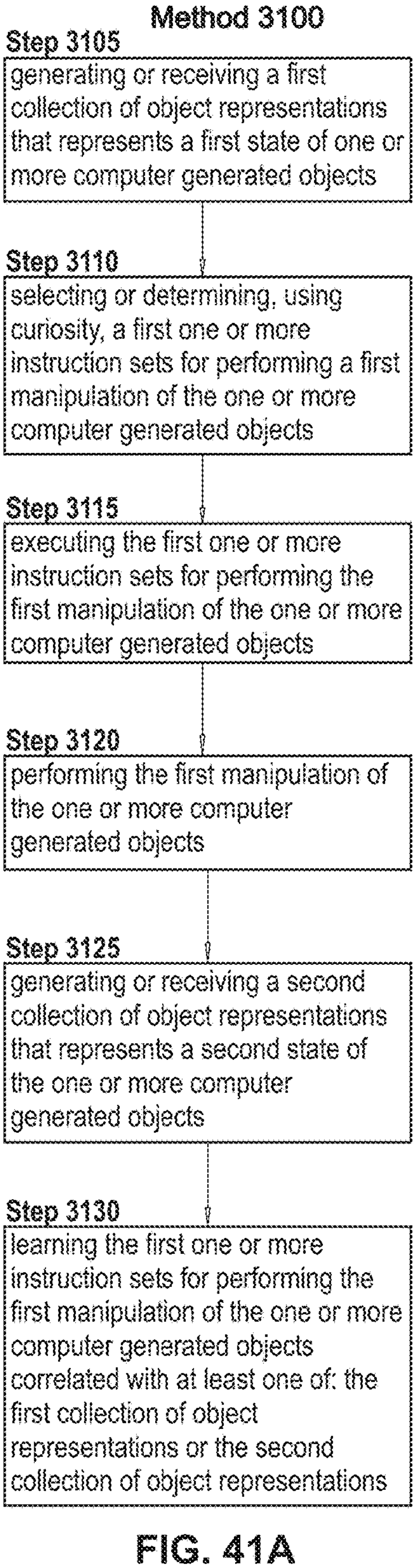
FIG. 41A illustrates an embodiment of method 3100.

Referring to FIG. 41A, an embodiment of method 3100 for learning manipulations of one or more computer generated objects using curiosity is illustrated.

At step 3105, a first collection of object representations that represents a first state of one or more computer generated objects is generated or received. In some aspects, a collection of object representations (i.e. the first collection of object representations, etc.) may represent a state of one or more computer generated objects (i.e. the first state of one or more computer generated objects, etc.) before the one or more computer generated objects are manipulated. A collection of object representations may include an electronic representation of one or more computer generated objects or state of one or more computer generated objects. In some designs, a collection of object representations (i.e. Collection of Object Representations 525, etc.) may include one or more object representations (i.e. Object Representations 625, etc.), and/or other elements or information. In some aspects, state of a computer generated object includes the object's mode of being. As such, state of a computer generated object may include or be defined at least in part by one or more object's properties (i.e. Object Properties 630, etc.) such as existence, location, shape, condition, and or other properties or attributes. An object representation that represents a computer generated object or state of the computer generated object, hence, may include one or more object properties. In general, an object representation may include any information related to a computer generated object. In some implementations, an object representation may include or be replaced with a computer generated object itself, in which case the object representation as an element can be optionally omitted. In some aspects, a collection of object representations includes one or more object representations, and/or other elements or information related to one or more computer generated objects detected or obtained in a avatar's (i.e. Avatar's 605, etc.) surrounding at a particular time. As such, a collection of object representations may represent one or more computer generated objects or state of one or more computer generated objects at a particular time. In some embodiments, a collection of object representations may include or be substituted with a stream of collections of object representations, and vice versa, in which case any features, functionalities, and/or embodiments described with respect to a collection of object representations can be used on/by/with/in a stream of collections of object representations. Therefore, the terms collection of object representations and stream of collections of object representations may be used interchangeably herein depending on context. A stream of collections of object representations may include one collection of object representations or a group, sequence, or other plurality of collections of object representations. In some aspects, a stream of collections of object representations includes one or more collections of object representations, and/or other elements or information related to one or more computer generated objects detected or obtained in an avatar's surrounding over time or during a time period. As such, a stream of collections of object representations may represent one or more computer generated objects or state of one or more computer generated objects over time or during a time period. Examples of objects include computer generated biological objects (i.e. computer generated persons, computer generated animals, computer generated vegetation, etc.), computer generated nature objects (i.e. computer generated rocks, computer generated bodies of water, etc.), computer generated manmade objects (i.e. computer generated buildings, computer generated streets, computer generated ground/aerial/aquatic vehicles, computer generated robots, computer generated devices, etc.), and/or others. More generally, examples of objects include a 2D model, a 3D model, a 2D shape (i.e. point, line, square, rectangle, circle, triangle, etc.), a 3D shape (i.e. cube, sphere, irregular shape, etc.), a graphical user interface (GUI) element, a form element (i.e. text field, radio button, push button, check box, etc.), a data or database element, a spreadsheet element, a link, a picture, a text (i.e. character, word, etc.), a number, and/or others in a context of a 3D application, 2D application, web browser application, a media application, a word processing application, a spreadsheet application, a database application, a forms-based application, an operating system application, a device/system control application, and/or others. In some aspects, any part of a computer generated object may be detected as an object itself or sub-object. In general, a computer generated object may include any object or sub-object that can be detected or obtained. Examples of object properties include existence of a computer generated object, type of a computer generated object (i.e. computer generated person, computer generated cat, computer generated vehicle, computer generated building, computer generated street, computer generated tree, computer generated rock, etc.), identity of a computer generated object (i.e. name, identifier, etc.), location of a computer generated object (i.e. relative or absolute coordinates, distance and bearing/angle from a known/reference point or object, etc.), condition of a computer generated object (i.e. open, closed, 34% open, 73 mm open, switched on, switched off, etc.), shape/size of a computer generated object (i.e. height, width, depth, computer model, point cloud, picture, etc.), activity of a computer generated object (i.e. motion, gestures, etc.), orientation of a computer generated object (i.e. East, West, North, South, SSW, 9.3 degrees NE, relative orientation, absolute orientation, etc.), and/or other properties of a computer generated object. In general, an object property may include any attribute of a computer generated object (i.e. existence, type, identity, shape/size, etc.), any relationship of a computer generated object with an avatar, other computer generated objects, or the environment (i.e. coordinates of an object, distance and bearing/angle, friend/foe relationship, etc.), and/or other information related to a computer generated object. In some designs, computer generated objects, their states, and/or their properties can be obtained from an engine, environment, or other system used to implement an application (i.e. 3D application, 2D application, etc.). For instance, computer generated objects and/or their properties can be obtained by utilizing functions for providing properties or other information about objects of an engine, environment, or other system used to implement an application. Examples of such engines, environments, or other systems include Unity 3D Engine, Unreal Engine, Torque 3D Engine, and/or others. In other designs, computer generated objects and/or their properties can be obtained by accessing and/or reading a scene graph or other data structure used for organizing objects in a particular application, or in an engine, environment, or other system used to implement an application. In other designs, computer generated objects and/or their properties can be detected or recognized using any features, functionalities, and/or embodiments of Picture Renderer 476/Picture Recognizer 117*a*, Sound Renderer 477/Sound Recognizer 117*b*, aforementioned simulated lidar/Lidar Processing Unit 117*c*, aforementioned simulated radar/Radar Processing Unit 117*d*, aforementioned simulated sonar/Sonar Processing Unit 117*e*, their combinations, and/or other elements or techniques, and/or those known in art. In some embodiments, a collection of object representations, object representation, stream of collections of object representations, or stream of object representations may be provided by an outside element or another element, in which case the collection of object representations, object representation, stream of collections of object representations, or stream of object representations may be received from the outside element or another element. In some aspects, a computer generated object may be or include an object of an application (i.e. Application Program 18, etc.). Generating or receiving comprises any action or operation by or for an Object 616, Collection of Object Representations 525, stream of Collections of Object Representations 525, Object Representation 625, stream of Object Representations 625, Object Property 630, Object Processing Unit 115, Picture Renderer 476, Picture Recognizer 117*a*, Sound Renderer 477, Sound Recognizer 117*b*, aforementioned simulated lidar, Lidar Processing Unit 117*c*, aforementioned simulated radar, Radar Processing Unit 117*d*, aforementioned simulated sonar, Sonar Processing Unit 117*e*, and/or other disclosed elements. Step 3105 may include any action or operation described in Step 2105 of method 2100 as applicable, and vice versa.

At step 3110, a first one or more instruction sets for performing a first manipulation of the one or more computer generated objects are selected or determined using curiosity. As curiosity includes an interest or desire to learn or know about something (i.e. as defined in English dictionary, etc.), the disclosure enables an avatar with an interest or desire to learn its surrounding including objects in the surrounding. In some aspects, selecting or determining, using curiosity, one or more instruction sets for performing a manipulation of one or more computer generated objects may include selecting or determining one or more instruction sets that can cause an avatar to perform curious, experimental, inquisitive, and/or other manipulation of the one or more computer generated objects. In other aspects, selecting or determining, using curiosity, one or more instruction sets for performing a manipulation of one or more computer generated objects may include selecting or determining one or more instruction sets randomly, in some order (i.e. instruction sets stored/received first are used first, instruction sets for simulated physical/mechanical manipulations are used first, etc.), in some pattern, or using other techniques. In further aspects, selecting or determining, using curiosity, one or more instruction sets for performing a manipulation of one or more computer generated objects may include selecting or determining one or more instruction sets that can cause an avatar to perform a manipulation of the one or more computer generated objects that is not programmed or predetermined to be performed on the one or more computer generated objects. In further aspects, selecting or determining, using curiosity, one or more instruction sets for performing a manipulation of one or more computer generated objects may include selecting or determining one or more instruction sets that can cause an avatar to perform a manipulation of the one or more computer generated objects to discover an unknown state of the one or more computer generated objects. In general, selecting or determining, using curiosity, one or more instruction sets for performing a manipulation of one or more computer generated objects may include selecting or determining one or more instruction sets that can cause an avatar to perform a manipulation of the one or more computer generated objects to enable learning of how the one or more computer generated objects can be used, how the one or more computer generated objects can be manipulated, how the one or more computer generated objects react to manipulations, and/or other aspects or information related to the one or more computer generated objects. Therefore, selecting or determining, using curiosity, one or more instruction sets for performing a manipulation of one or more computer generated objects enables learning an avatar's manipulations of the one or more computer generated objects and/or knowledge related thereto. In one example, one or more instruction sets for performing a manipulation of one or more computer generated objects may include one or more instruction sets for simulated touching, simulated pushing, simulated pulling, simulated lifting, simulated dropping, simulated gripping, simulated twisting/rotating, simulated squeezing, simulated moving, and/or performing other simulated physical/mechanical manipulations of the one or more computer generated objects. In another example, one or more instruction sets for performing a manipulation of one or more computer generated objects may include one or more instruction sets for stimulating with a simulated electric charge, stimulating with a simulated magnetic field, stimulating with a simulated electro-magnetic signal, stimulating with a simulated radio signal, illuminating with simulated light, and/or performing other simulated electrical, magnetic, or electro-magnetic manipulations of the one or more computer generated objects. In a further example, one or more instruction sets for performing a manipulation of one or more computer generated objects may include one or more instruction sets for stimulating with a simulated sound, and/or performing other simulated acoustic manipulations of the one or more computer generated objects. In a further example, one or more instruction sets for performing a manipulation of one or more computer generated objects may include one or more instruction sets for simulated approaching, simulated retreating, simulated relocating, or simulated moving relative to one or more computer generated objects, which are, in some aspects, considered manipulations of the one or more computer generated objects. In some aspects, one or more instruction sets for performing a manipulation of one or more computer generated objects may be selected or determined using no knowledge of how the one or more computer generated objects can be used and/or manipulated, using some knowledge of how certain computer generated objects can be used and/or manipulated, or using general information of how certain types of computer generated objects can be used and/or manipulated. In general, one or more instruction sets may be selected or determined using any information that can help in deciding which manipulations to implement. Selecting or determining comprises any action or operation by or for Unit for Object Manipulation Using Curiosity 130, Manipulation Logic 231, Simulated Physical/mechanical Manipulation Logic 231*a*, Simulated Electrical/magnetic/electro-magnetic Manipulation Logic 231*b*, Simulated Acoustic Manipulation Logic 231*c*, Instruction Set 526, and/or other elements. Step 3110 may include any action or operation described in Step 2110 of method 2100, and vice versa.

At step 3115, the first one or more instruction sets for performing the first manipulation of the one or more computer generated objects are executed. Executing one or more instruction sets for performing a manipulation of one or more computer generated objects may be performed in response to the aforementioned selecting or determining, using curiosity, of the one or more instruction sets for performing the manipulation of the one or more computer generated objects. In some aspects, one or more instruction sets may be executed by a processor (i.e. Processor 11, etc.), and/or other processing element. In other aspects, one or more instruction sets may be executed in/by an application (i.e. Application Program 18, Avatar Control Program 18*b*, etc.), and/or other processing element. Executing comprises any action or operation by or for Processor 11, Application Program 18, Avatar Control Program 18*b*, Instruction Set Implementation Interface 180, and/or other elements. Step 3115 may include any action or operation described in Step 2115 of method 2100 as applicable, and vice versa.

At step 3120, the first manipulation of the one or more computer generated objects is performed. A manipulation of one or more computer generated objects may be performed by an avatar, one or more avatar elements, one or more simulated transmitters, and/or other elements. An avatar may be or include an object of an application (Application Program 18, etc.). A manipulation of one or more computer generated objects may be performed in response to the aforementioned executing of one or more instruction sets for performing the manipulation of the one or more computer generated objects. In one example, a processor, application (i.e. Application Program 18, Avatar Control Program 18*b*, etc.), and/or other processing element may be caused to execute one or more instruction sets responsive to which an avatar and/or one or more avatar elements may implement the avatar's simulated physical or mechanical manipulations of one or more computer generated objects. In another example, a processor, application, and/or other processing element may be caused to execute one or more instruction sets responsive to which a simulated electric charge transmitter, a simulated electromagnet, a simulated radio transmitter, or a simulated laser or other simulated light transmitter may implement an avatar's simulated electrical, simulated magnetic, and/or simulated electro-magnetic manipulations of one or more computer generated objects. In a further example, a processor, application, and/or other processing element may be caused to execute one or more instructions sets responsive to which a simulated speaker, or simulated horn may implement an avatar's simulated acoustic manipulations of one or more computer generated objects. In general, a manipulation includes any simulated manipulation, simulated operation, simulated stimulus, and/or simulated effect on any one or more computer generated objects. A manipulation may include one or more manipulations as, in some aspects, the manipulation may be a combination of simpler or other manipulations. Performing comprises any action or operation by or for Avatar 605, any simulated transmitter, and/or other elements. Step 3120 may include any action or operation described in Step 2120 of method 2100 as applicable, and vice versa.

At step 3125, a second collection of object representations that represents a second state of the one or more computer generated objects is generated. In some aspects, a collection of object representations (i.e. the second collection of object representations, etc.) may represent a state of one or more computer generated objects (i.e. the second state of the one or more computer generated objects, etc.) after the one or more computer generated objects are manipulated (i.e. after the first manipulation, etc.). Step 3125 may include any action or operation described in Step 3105 as applicable. Step 3125 may include any action or operation described in Step 2125 of method 2100 as applicable, and vice versa.

At step 3130, the first one or more instruction sets for performing the first manipulation of the one or more computer generated objects correlated with at least one of: the first collection of object representations or the second collection of object representations are learned. Learning may include correlating one or more elements. In some aspects, one or more instruction sets can be correlated with one or more collections of object representations. In other aspects, one or more instruction sets can be correlated with one or more object representations. In further aspects, one or more instruction sets can be correlated with one or more streams of collections of object representations. In further aspects, one or more instruction sets can be correlated with one or more streams of object representations. One or more instruction sets may temporally correspond with the correlated one or more collections of object representations, one or more object representations, one or more streams of collections of object representations, and/or one or more streams of object representations. In further aspects, one or more instruction sets can be correlated with one or more connections among one or more collections of object representations, one or more object representations, one or more streams of collections of object representations, and/or one or more streams of object representations. In further aspects, one or more collections of object representations, one or more object representations, one or more streams of collections of object representations, and/or one or more streams of object representations may not be correlated (i.e. uncorrelated, etc.) with any instruction sets. Learning may also include storing one or more elements. In some aspects, a knowledge cell (i.e. Knowledge Cell 800, etc.) may be generated that includes or stores one or more collections of object representations (or one or more references thereto), one or more object representations (or one or more references thereto), one or more streams of collections of object representations (or one or more references thereto), and/or one or more streams of object representations (or one or more references thereto) correlated or uncorrelated with any (i.e. zero, one or more, etc.) instruction sets. A knowledge cell may include any data structure or arrangement that can facilitate such storing. Knowledge cells can be used in/as neurons, nodes, vertices, or other elements in a knowledge structure (i.e. Knowledge Structure 160, Collection of Sequences 160*a*, Graph or Neural Network 160*b*, Collection of Knowledge Cells [not shown], etc.). Knowledge cells may be connected, associated, related, or linked into knowledge structures using statistical, artificial intelligence, machine learning, and/or other models or techniques. In general, a knowledge structure may be or include any data structure or arrangement capable of storing and/or organizing artificial knowledge disclosed herein. A knowledge structure can be used for enabling an avatar's manipulations of one or more computer generated objects using artificial knowledge. In some implementations, any knowledge cell, collection of object representations, object representation, stream of collections of object representations, stream of object representations, instruction set, and/or other element may include or be associated with extra information (i.e. Extra Info 527, etc.) that may optionally be used to facilitate enhanced decision making and/or other functionalities where applicable. Examples of extra information include time information, location information, computed information, contextual information, and/or other information. Learning comprises any action or operation by or for a Knowledge Structuring Unit 150, Knowledge Cell 800, Node 852, Connection 853, Knowledge Structure 160, Collection of Sequences 160*a*, Sequence 163, Graph or Neural Network 160*b*, Collection of Knowledge Cells (not shown), Comparison 725, Memory 12, Storage 27, and/or other disclosed elements. Step 3130 may include any action or operation described in Step 2130 of method 2100 as applicable, and vice versa.

Figure 41B:
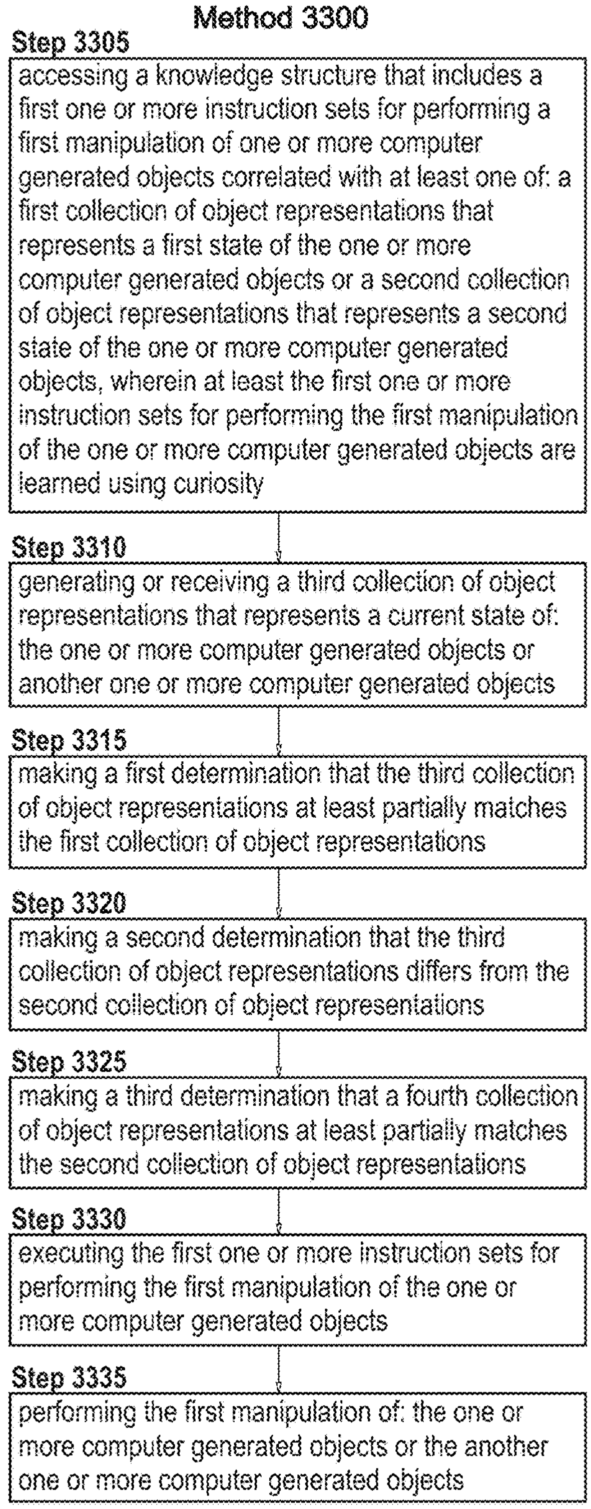
FIG. 41B illustrates an embodiment of method 3300.

Referring to FIG. 41B, an embodiment of method 3300 for manipulations of one or more computer generated objects using artificial knowledge is illustrated.

At step 3305, a knowledge structure that includes a first one or more instruction sets for performing a first manipulation of one or more computer generated objects correlated with at least one of: a first collection of object representations that represents a first state of the one or more computer generated objects or a second collection of object representations that represents a second state of the one or more computer generated objects is accessed, wherein at least the first one or more instruction sets for performing the first manipulation of the one or more computer generated objects are learned using curiosity. In some aspects, the knowledge structure and/or elements/portions thereof may be caused, generated, and/or learned by any action or operation described in steps 3105-3130 of method 3100. As such, the knowledge structure and/or elements/portions thereof comprise any features, functionalities, and/or embodiments of the knowledge structure and/or elements/portions thereof described in method 3100 as applicable. Step 3305 may include any action or operation described in Step 2305 of method 2300 as applicable, and vice versa. Accessing comprises any action or operation by or for Knowledge Structure 160, Knowledge Cell 800, Collection of Object Representations 525, Instruction Set 526, and/or other elements.

At step 3310, a third collection of object representations that represents a current state of: the one or more computer generated objects or another one or more computer generated objects is generated or received. In some designs, generating a collection of object representations may include generating a collection of object representations that represents a state of one or more computer generated objects of another application so that artificial knowledge learned on one or more computer generated objects in one application can be used on one or more computer generated objects in another application. Step 3310 may include any action or operation described in Step 3105 of method 3100 as applicable. Step 3310 may include any action or operation described in Step 2310 of method 2300 as applicable, and vice versa.

At step 3315, a first determination is made that the third collection of object representations at least partially matches the first collection of object representations. In some embodiments, a collection of object representations (i.e. the third collection of object representations, etc.) representing a current state of one or more computer generated objects can be searched in a knowledge structure by comparing (i.e. using Comparison 725, etc.) the collection of object representations or portions thereof with collections of object representations or portions thereof from the knowledge structure. A determination may be made that the collection of object representations or portions thereof representing the current state of the one or more computer generated objects at least partially matches a collection of object representations (i.e. the first collection of object representations, etc.) or portions thereof from the knowledge structure. Determining comprises any action or operation by or for Comparison 725, Unit for Object Manipulation Using Artificial Knowledge 170, Use of Artificial Knowledge Logic 336, and/or other elements. Step 3315 may include any action or operation described in Step 2315 of method 2300 as applicable, and vice versa.

At step 3320, a second determination is made that the third collection of object representations differs from the second collection of object representations. In some embodiments, assuming that a state other than the current state of one or more computer generated objects may potentially be beneficial (i.e. an avatar is willing to try any state of one or more computer generated objects other than the current state, etc.), a knowledge structure can be searched for a collection of object representations representing any state of the one or more computer generated objects that results from the current state of the one or more computer generated objects and that is different from (i.e. other than, etc.) the current state of the one or more computer generated objects. A collection of object representations (i.e. the third collection of object representations, etc.) or portions thereof representing a current state of one or more computer generated objects can be compared (i.e. using Comparison 725, etc.) with collections of object representations or portions thereof from the knowledge structure. A determination may be made that one or more considered collections of object representations (i.e. the second collection of object representations, etc.) or portions thereof from the knowledge structure differ from the collection of object representations or portions thereof representing the current state of the one or more computer generated objects. In other embodiments, one or more collections of object representations representing states of one or more computer generated objects that result from a current state of one or more computer generated objects and that are determined to differ from the current state of the one or more computer generated objects may be provided to a receiver (i.e. application, system, etc.) at which point the receiver may decide to use one or more of the provided collections of object representations. Determining comprises any action or operation by or for a Comparison 725, Unit for Object Manipulation Using Artificial Knowledge 170, Use of Artificial Knowledge Logic 336, and/or other elements. Step 3320 may be optionally omitted depending on implementation. Step 3320 may include any action or operation described in Step 2320 of method 2300 as applicable, and vice versa.

At step 3325, a third determination is made that a fourth collection of object representations at least partially matches the second collection of object representations. In some embodiments, a collection of object representations (i.e. the fourth collection of object representations, etc.) may represent a beneficial or desirable state of one or more computer generated objects. Such beneficial or desirable state of one or more computer generated objects may advance or facilitate an avatar's operations. A collection of object representations representing a beneficial state of one or more computer generated objects may be learned or generated from a previous encounter with the one or more computer generated objects in which the one or more computer generated objects were in the beneficial state. A collection of object representations representing a beneficial state of one or more computer generated objects may also be derived by reasoning, derived from simulation, hardcoded, and/or attained by other techniques. In some aspects, a collection of object representations representing a beneficial state of one or more computer generated objects may be provided by an avatar control program (i.e. Avatar Control Program **18*b*, etc.) or elements thereof, and/or other systems or elements. As such, a collection of object representations (i.e. the fourth collection of object representations, etc.) may be generated or received in a variety of data structures, data formats, and/or data arrangements, and including a variety of object representations that may be different than the format or structure of collections of object representations in the knowledge structure. In general, a collection of object representations representing a beneficial state of one or more computer generated objects may include any one or more object representations, object properties, and/or other elements or information that enable representing or identifying a beneficial state of one or more computer generated objects. A knowledge structure can be searched for a collection of object representations representing a beneficial state of one or more computer generated objects by comparing (i.e. using Comparison 725, etc.) the collection of object representations or portions thereof with collections of object representations or portions thereof from the knowledge structure. A determination may be made that a collection of object representations or portions thereof from the knowledge structure at least partially matches the collection of object representations or portions thereof representing the beneficial state of the one or more computer generated objects. Such comparisons and/or determination may include any action or operation described in Step 3315 as applicable. Determining comprises any action or operation by or for Comparison 725, Unit for Object Manipulation Using Artificial Knowledge 170, Use of Artificial Knowledge Logic 336, and/or other elements. Step 3325 may be optionally omitted depending on implementation. Step 3325 may include any action or operation described in Step 2325 of method 2300** as applicable, and vice versa.

At step 3330, the first one or more instruction sets for performing the first manipulation of the one or more computer generated objects are executed. In some aspects, Step 3330 may be performed in response to at least the first determination in Step 3315, and optionally the second determination in Step 3320 and/or optionally the third determination in Step 3325. Step 3330 may include any action or operation described in Step 3115 of method 3100 as applicable. Step 3330 may include any action or operation described in Step 2330 of method 2300 as applicable, and vice versa.

At step 3335, the first manipulation of: the one or more computer generated objects or the another one or more computer generated objects is performed. In some designs, manipulating one or more computer generated objects may include manipulating one or more computer generated objects of another application so that artificial knowledge learned on one or more computer generated objects in one application can be used on one or more computer generated objects in another application. Step 3335 may include any action or operation described in Step 3120 of method 3100 as applicable. Step 3335 may include any action or operation described in Step 2335 of method 2300 as applicable, and vice versa.

Figure 42A:
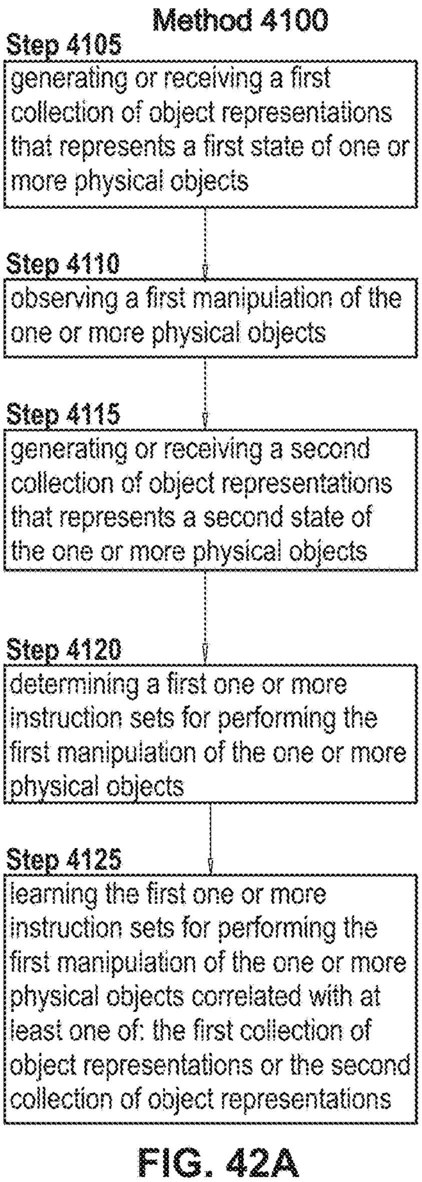
FIG. 42A illustrates an embodiment of method 4100.

Referring to FIG. 42A, an embodiment of method 4100 for learning observed manipulations of one or more physical objects is illustrated.

At step 4105, a first collection of object representations that represents a first state of one or more physical objects is generated or received. In some aspects, a collection of object representations (i.e. the first collection of object representations, etc.) may represent a state of one or more physical objects (i.e. the first state of one or more physical objects, etc.) before the one or more physical objects are manipulated. In one example, a collection of object representations includes one or more object representations representing one or more manipulated physical object (i.e. Object 615, etc.). In another example, a collection of object representations includes object representations representing a manipulating physical object and one or more manipulated physical objects. In general, a collection of object representations may include any number of object representations representing any number of physical objects, and/or other elements or information. Step 4105 may include any action or operation described in Step 2105 of method 2100 as applicable.

At step 4110, a first manipulation of the one or more physical objects is observed. In some embodiments, a manipulation of one or more objects may be performed or caused by a manipulating physical object. Therefore, the one or more physical objects whose manipulation is observed may be referred to as one or more manipulated physical object and the physical object that is performing or causing the manipulation may be referred to as manipulating physical object. In other embodiments, a manipulation of a physical object may be performed or caused by the object itself (i.e. self-manipulating object, object that moves/transforms/changes on its own, etc.) without being manipulated by a manipulating physical object. In some embodiments, observing a manipulation of one or more physical objects includes causing a device and/or its one or more sensors to observe the manipulation of the one or more physical objects. In other embodiments, observing a manipulation of one or more physical objects includes causing a device and/or its one or more sensors to move or traverse the device's surrounding to find the one or more physical objects and/or the manipulation of the one or more physical objects. In further embodiments, observing a manipulation of one or more physical objects includes causing a device and/or its one or more sensors to position itself/themselves to observe the one or more physical objects and/or the manipulation of the one or more physical objects. In further embodiments, observing a manipulation of one or more physical objects includes causing a device and/or its one or more sensors to perform various movements, actions, and/or operations relative to the one or more physical objects to optimize observation of the one or more physical objects and/or the manipulation of the one or more physical objects. The one or more physical objects whose manipulation is observed may be part of one or more physical objects of interest, which may include one or more physical objects that are in a manipulating relationship or may potentially enter into a manipulating relationship. Therefore, performance of any movements, actions, and/or operations relative to one or more physical objects to optimize observation of the one or more physical objects may similarly apply to optimizing observation of one or more physical objects of interest. In further embodiments, observing a manipulation of one or more physical objects includes identifying the one or more physical objects among objects that are in contact or may potentially come in contact with one another. In further embodiments, observing a manipulation of one or more physical objects includes identifying the one or more physical objects (i.e. one or more manipulated physical objects, etc.) as inactive one or more physical objects and/or identifying a manipulating physical object as a moving, transforming, and/or otherwise changing physical object prior to contact. In further designs, observing a manipulation of one or more physical objects includes identifying the one or more physical objects using object affordances. Observing comprises any action or operation by or for Unit for Observing Object Manipulation 135, Positioning Logic 445, Manipulating and Manipulated Object Identification Logic 446, Device 98, Sensor 92, Object Processing Unit 115, Digital Picture 750, 3D Application Program 18, Device Control Program 18*a*, and/or other elements.

At step 4115, a second collection of object representations that represents a second state of the one or more physical objects is generated or received. In some aspects, a collection of object representations (i.e. the second collection of object representations, etc.) may represent a state of one or more physical objects (i.e. the second state of the one or more physical objects, etc.) after the one or more physical objects are manipulated (i.e. after the first manipulation, etc.). Step 4115 may include any action or operation described in Step 4105 and/or Step 2105 of method 2100 as applicable.

At step 4120, a first one or more instruction sets for performing the first manipulation of the one or more physical objects are determined. In some embodiments, determining instruction sets (i.e. Instruction Sets 526, etc.) for performing a manipulation of one or more physical objects includes determining instruction sets for performing, by a device, the manipulation of the one or more physical objects. In other embodiments, determining instruction sets for performing a manipulation of one or more physical objects includes observing or examining a manipulating physical object's operations in manipulating the one or more manipulated physical objects. In some aspects, instruction sets can be determined that would cause a device to move into a location of a manipulating physical object. In other aspects, instruction sets can be determined that would cause a device and/or its actuator (i.e. Actuator 91 [i.e. robotic arm Actuator 91, etc.], etc.) to move to a point of contact between a manipulating physical object and the one or more manipulated physical objects. In further aspects, instruction sets can be determined that would cause a device and/or its actuator to replicate the manipulating physical object's operations in manipulating the one or more manipulated physical objects. In further embodiments, determining instruction sets for performing a manipulation of one or more physical objects includes observing or examining the one or more manipulated physical object's change of states (i.e. movement [i.e. change of location, etc.], change of condition, transformation [i.e. change of shape or form, etc.], etc.). In some aspects, instruction sets can be determined that would cause a device to move into a reach point so that a manipulated physical object is within reach of the device's actuator. In other aspects, instruction sets can be determined that would cause a device and/or its actuator to move to a point of contact with the one or more manipulated physical objects. In further aspects, instruction sets can be determined that would cause a device and/or its actuator to perform operations that replicate the one or more manipulated physical object's change of states. In further embodiments, determining instruction sets for performing a manipulation of one or more physical objects includes observing or examining the one or more manipulated physical object's starting and/or ending states. In some aspects, instruction sets can be determined that would cause a device to: move into a reach point so that the one or more manipulated physical objects are within reach of the device's actuator, move to a point of contact with the one or more manipulated physical objects, and perform operations that replicate the one or more manipulated physical object's starting and/or ending states. Examples of determining instruction sets for performing a manipulation of one or more physical objects include determining instruction sets for performing a continuous touch manipulation of one or more physical objects; determining instruction sets for performing a brief touch manipulation of one or more physical objects, which may include determining a retreat point; determining instruction sets for performing a push manipulation of one or more physical objects, which may include determining a push point; determining instruction sets for performing a grip/attach/grasp, move, and release manipulations of one or more physical objects, which may include determining one or more move points; determining and/or estimating one or more physical object's trajectory and determining instruction sets for replicating the one or more physical object's trajectory, which may include move points that the physical object traveled from starting to ending positions; determining one or more physical object's reasoned trajectory (i.e. straight line, curved line, etc.) and determining instruction sets for moving the one or more physical objects in the reasoned trajectory, which may include move points that the one or more physical objects may need to travel from starting to ending positions; and/or determining instruction sets for performing a pull, a lift, a drop, a grip/attach/grasp, a twist/rotate, a squeeze, a move, and/or other manipulations of one or more physical objects. In some designs, determining instruction sets for performing a manipulation of one or more physical objects includes recognizing the manipulation of the one or more physical objects and finding one or more instruction sets for performing the recognized manipulation of the one or more physical objects. Such finding may utilize a lookup table or other lookup mechanism/technique that includes a collection of references to manipulations associated with instruction sets for performing the manipulations. Determining comprises any action or operation by or for Unit for Observing Object Manipulation 135, Manipulating and Manipulated Object Identification Logic 446, Instruction Set Determination Logic 447, Object Processing Unit 115, Digital Picture 750, 3D Application Program 18, and/or other elements.

At step 4125, the first one or more instruction sets for performing the first manipulation of the one or more physical objects correlated with at least one of: the first collection of object representations or the second collection of object representations are learned. Step 4125 may include any action or operation described in Step 2130 of method 2100 as applicable.

Figure 42B:
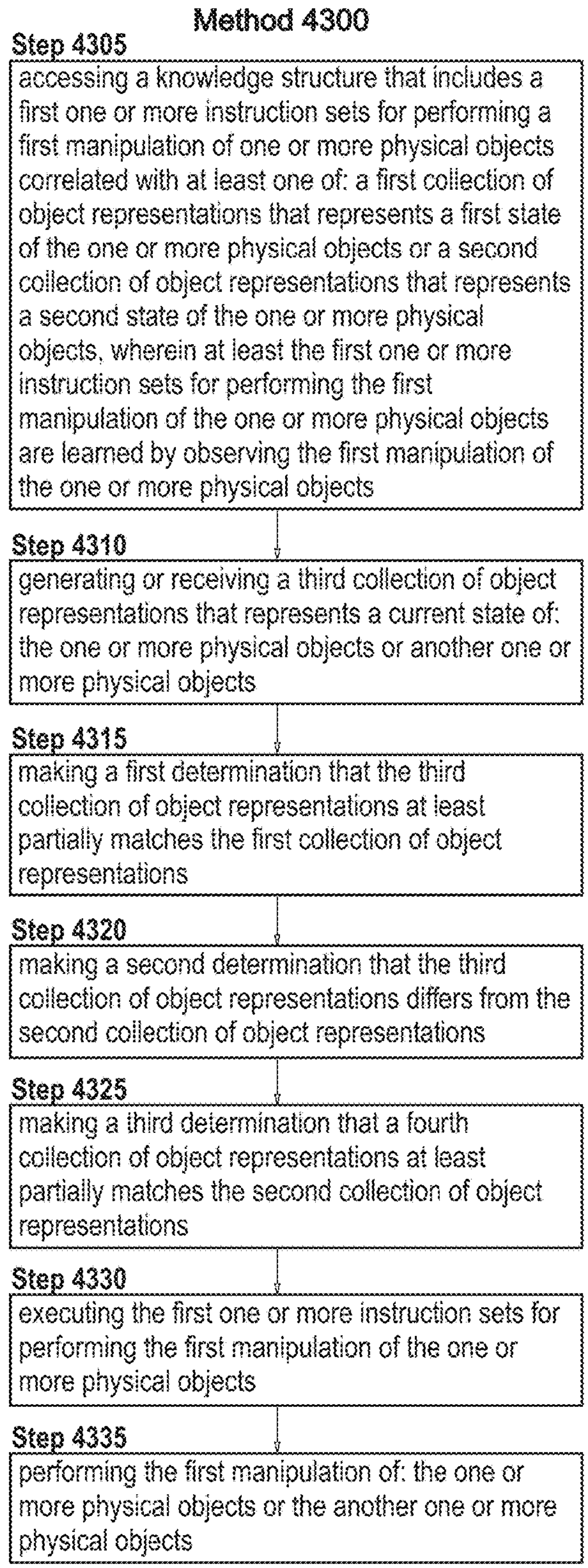
FIG. 42B illustrates an embodiment of method 4300.

Referring to FIG. 42B, an embodiment of method 4300 for manipulations of one or more physical objects using artificial knowledge is illustrated.

At step 4305, a knowledge structure that includes a first one or more instruction sets for performing a first manipulation of one or more physical objects correlated with at least one of: a first collection of object representations that represents a first state of the one or more physical objects or a second collection of object representations that represents a second state of the one or more physical objects is accessed, wherein at least the first one or more instruction sets for performing the first manipulation of the one or more physical objects are learned by observing the first manipulation of the one or more physical objects. In some aspects, the knowledge structure and/or elements/portions thereof may be caused, generated, and/or learned by any action or operation described in steps 4105-4125 of method 4100 as applicable. As such, the knowledge structure and/or elements/portions thereof comprise any features, functionalities, and/or embodiments of the knowledge structure and/or elements/portions thereof described in method 4100 as applicable. Accessing comprises any action or operation by or for Knowledge Structure 160, Knowledge Cell 800, Collection of Object Representations 525, Instruction Set 526, and/or other elements.

At step 4310, a third collection of object representations that represents a current state of: the one or more physical objects or another one or more physical objects is generated or received. Step 4310 may include any action or operation described in Step 4105 of method 4100 and/or step 2105 of method 2100 as applicable.

At step 4315, a first determination is made that the third collection of object representations at least partially matches the first collection of object representations. Step 4315 may include any action or operation described in Step 2315 of method 2300 as applicable.

At step 4320, a second determination is made that the third collection of object representations differs from the second collection of object representations. Step 4320 may include any action or operation described in Step 2320 of method 2300 as applicable. Step 4320 may be optionally omitted depending on implementation.

At step 4325, a third determination is made that a fourth collection of object representations at least partially matches the second collection of object representations. Step 4325 may include any action or operation described in Step 2325 of method 2300 as applicable. Step 4325 may be optionally omitted depending on implementation.

At step 4330, the first one or more instruction sets for performing the first manipulation of the one or more physical objects are executed. In some aspects, Step 4330 may be performed in response to at least the first determination in Step 4315, and optionally the second determination in Step 4320 and/or optionally the third determination in Step 4325. Step 4330 may include any action or operation described in Step 2115 of method 2100 and/or Step 2330 of method 2300 as applicable.

At step 4335, the first manipulation of: the one or more physical objects or the another one or more physical objects is performed. Step 4335 may include any action or operation described in Step 2120 of method 2100 and/or Step 2335 of method 2300 as applicable.

Figure 43A:
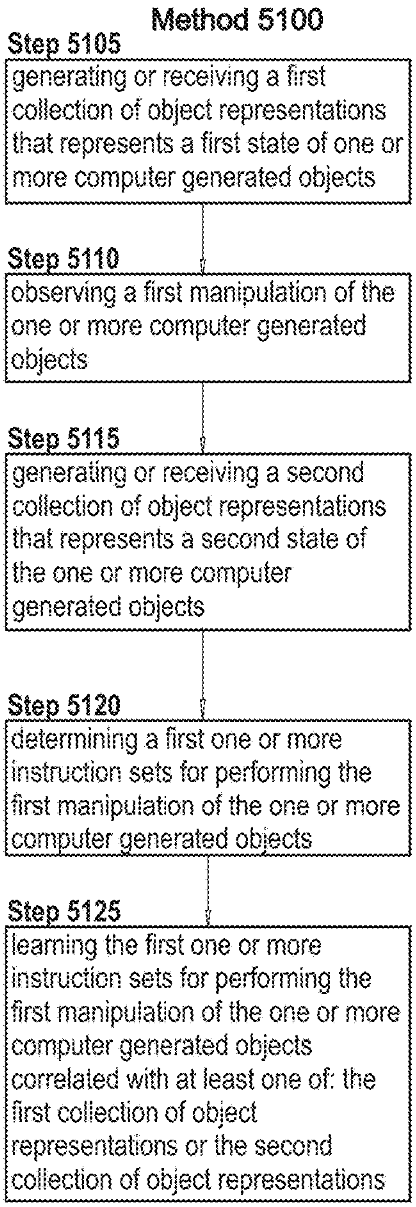
FIG. 43A illustrates an embodiment of method 5100.

Referring to FIG. 43A, an embodiment of method 5100 for learning observed manipulations of one or more computer generated objects is illustrated.

At step 5105, a first collection of object representations that represents a first state of one or more computer generated objects is generated or received. In some aspects, a collection of object representations (i.e. the first collection of object representations, etc.) may represent a state of one or more computer generated objects (i.e. the first state of the one or more computer generated object, etc.) before the one or more computer generated objects are manipulated. In one example, a collection of object representations includes one or more object representations representing one or more manipulated computer generated objects (i.e. Object 616, etc.). In another example, a collection of object representations includes object representations representing a manipulating computer generated object and one or more manipulated computer generated objects. In general, a collection of object representations may include any number of object representations representing any number of computer generated objects, and/or other elements or information. Step 5105 may include any action or operation described in Step 3105 of method 3100 as applicable.

At step 5110, a first manipulation of the one or more computer generated objects is observed. In some embodiments, a manipulation of one or more computer generated objects may be performed or caused by another computer generated object. Therefore, the one or more computer generated objects whose manipulation is observed may be referred to as one or more manipulated computer generated objects and the computer generated object that is performing or causing the manipulation may be referred to as manipulating computer generated object. In other embodiments, a manipulation of a computer generated object may be performed or caused by the computer generated object itself (i.e. self-manipulating object, object that moves/transforms/changes on its own, etc.) without being manipulated by a manipulating computer generated object. In some embodiments, observing a manipulation of one or more computer generated objects includes traversing an application (i.e. 3D Application Program 18, 3D space, etc.) or a portion thereof to find the one or more computer generated objects and/or the manipulation of the one or more computer generated objects. In other embodiments, observing a manipulation of one or more computer generated objects includes causing an observation of the manipulation of the one or more computer generated objects from an observation point. In further embodiments, observing a manipulation of one or more computer generated objects includes positioning an observation point to observe the manipulation of the one or more computer generated objects. In further embodiments, observing a manipulation of one or more computer generated objects includes positioning an observation point in various locations relative to the one or more computer generated objects to optimize observation of the one or more computer generated objects and/or the manipulation of the one or more computer generated objects. The one or more computer generated objects whose manipulation is observed may be part of one or more computer generated objects of interest, which may include one or more computer generated objects that are in a manipulating relationship or may potentially enter into a manipulating relationship. Therefore, positioning an observation point relative to one or more computer generated objects to optimize observation of the one or more computer generated objects may similarly apply to optimizing observation of one or more computer generated objects of interest. In further embodiments, observing a manipulation of one or more computer generated objects includes identifying the one or more computer generated objects among objects that are in contact or may potentially come in contact with one another. In further embodiments, observing a manipulation of one or more computer generated objects includes identifying the one or more computer generated objects as inactive one or more computer generated objects and/or identifying a manipulating computer generated object as a moving, transforming, and/or otherwise changing computer generated object prior to contact. In further designs, observing a manipulation of one or more computer generated objects includes identifying the one or more computer generated objects using object affordances. Observing comprises any action or operation by or for Unit for Observing Object Manipulation 135, Positioning Logic 445, Manipulating and Manipulated Object Identification Logic 446, Picture Renderer 476, Picture Recognizer 117*a*, Sound Renderer 477, Sound Recognizer 117*b*, aforementioned simulated lidar, Lidar Processing Unit 117*c*, aforementioned simulated radar, Radar Processing Unit 117*d*, aforementioned simulated sonar, Sonar Processing Unit 117*e*, Object Processing Unit 115, Digital Picture 750, 3D Application Program 18, Avatar Control Program 18*b*, and/or other elements.

At step 5115, a second collection of object representations that represents a second state of the one or more computer generated objects is generated or received. In some aspects, a collection of object representations (i.e. the second collection of object representations, etc.) may represent a state of one or more computer generated objects (i.e. the second state of the one or more computer generated object, etc.) after the one or more computer generated objects are manipulated (i.e. after the first manipulation, etc.). Step 5115 may include any action or operation described in Step 5105 and/or Step 3105 of method 3100 as applicable.

At step 5120, a first one or more instruction sets for performing the first manipulation of the one or more computer generated objects are determined. In some embodiments, determining instruction sets (i.e. Instruction Sets 526, etc.) for performing a manipulation of one or more computer generated objects includes determining instruction sets for performing, by an avatar, the manipulation of the one or more computer generated objects. In other embodiments, determining instruction sets for performing a manipulation of one or more computer generated objects includes observing or examining a manipulating computer generated object's operations in manipulating the one or more manipulated computer generated objects. In some aspects, instruction sets can be determined that would cause an avatar to move into a location of a manipulating computer generated object. In other aspects, instruction sets can be determined that would cause an avatar's part (i.e. arm, etc.) to move to a point of contact between a manipulating computer generated object and one or more manipulated computer generated objects. In further aspects, instruction sets can be determined that would cause an avatar and/or its part to replicate the manipulating computer generated object's operations in manipulating the one or more manipulated computer generated objects. In further embodiments, determining instruction sets for performing a manipulation of one or more computer generated objects includes observing or examining the one or more manipulated computer generated object's change of states (i.e. movement [i.e. change of location, etc.], change of condition, transformation [i.e. change of shape or form, etc.], etc.). In some aspects, instruction sets can be determined that would cause an avatar to move into a reach point so that one or more manipulated computer generated objects are within reach of the avatar's part (i.e. arm, etc.). In other aspects, instruction sets can be determined that would cause an avatar and/or its part to move to a point of contact with the one or more manipulated computer generated objects. In further aspects, instruction sets can be determined that would cause an avatar and/or its part to perform operations that replicate the one or more manipulated computer generated object's change of states. In further embodiments, determining instruction sets for performing a manipulation of one or more computer generated objects includes observing or examining the one or more manipulated computer generated object's starting and/or ending states. In some aspects, instruction sets can be determined that would cause an avatar to: move into a reach point so that the one or more manipulated computer generated objects are within reach of the avatar's part (i.e. arm, etc.), move to a point of contact with the one or more manipulated computer generated objects, and perform operations that replicate the one or more manipulated computer generated object's starting and/or ending states. Examples of determining instruction sets for performing a manipulation of one or more computer generated objects include determining instruction sets for performing a simulated continuous touch manipulation of one or more computer generated objects; determining instruction sets for performing a simulated brief touch manipulation of one or more computer generated objects, which may include determining a retreat point; determining instruction sets for performing a simulated push manipulation of one or more computer generated objects, which may include determining a push point; determining instruction sets for performing a simulated grip/attach/grasp, move, and release manipulations of one or more computer generated objects, which may include determining one or more move points; determining and/or estimating one or more computer generated object's trajectory and determining instruction sets for replicating the one or more computer generated object's trajectory, which may include move points that the one or more computer generated objects traveled from starting to ending positions; determining one or more computer generated object's reasoned trajectory (i.e. straight line, curved line, etc.) and determining instruction sets for simulated moving the one or more computer generated objects in the reasoned trajectory, which may include move points that the one or more computer generated objects may need to travel from starting to ending positions; determining instruction sets for performing a simulated pull, a simulated lift, a simulated drop, a simulated grip/attach/grasp, a simulated twist/rotate, a simulated squeeze, a simulated move, and/or other manipulations of the one or more computer generated objects. In some designs, determining instruction sets for performing a manipulation of one or more computer generated objects includes recognizing the manipulation of the one or more computer generated objects and finding one or more instruction sets for performing the recognized manipulation of the one or more computer generated objects. Such finding may utilize a lookup table or other lookup mechanism/technique that includes a collection of references to manipulations associated with instruction sets for performing the manipulations. Determining comprises any action or operation by or for Unit for Observing Object Manipulation 135, Manipulating and Manipulated Object Identification Logic 446, Instruction Set Determination Logic 447, Object Processing Unit 115, Digital Picture 750, 3D Application Program 18, and/or other elements.

At step 5125, the first one or more instruction sets for performing the first manipulation of the one or more computer generated objects correlated with at least one of: the first collection of object representations or the second collection of object representations are learned. Step 5125 may include any action or operation described in Step 3130 of method 3100 as applicable.

Figure 43B:
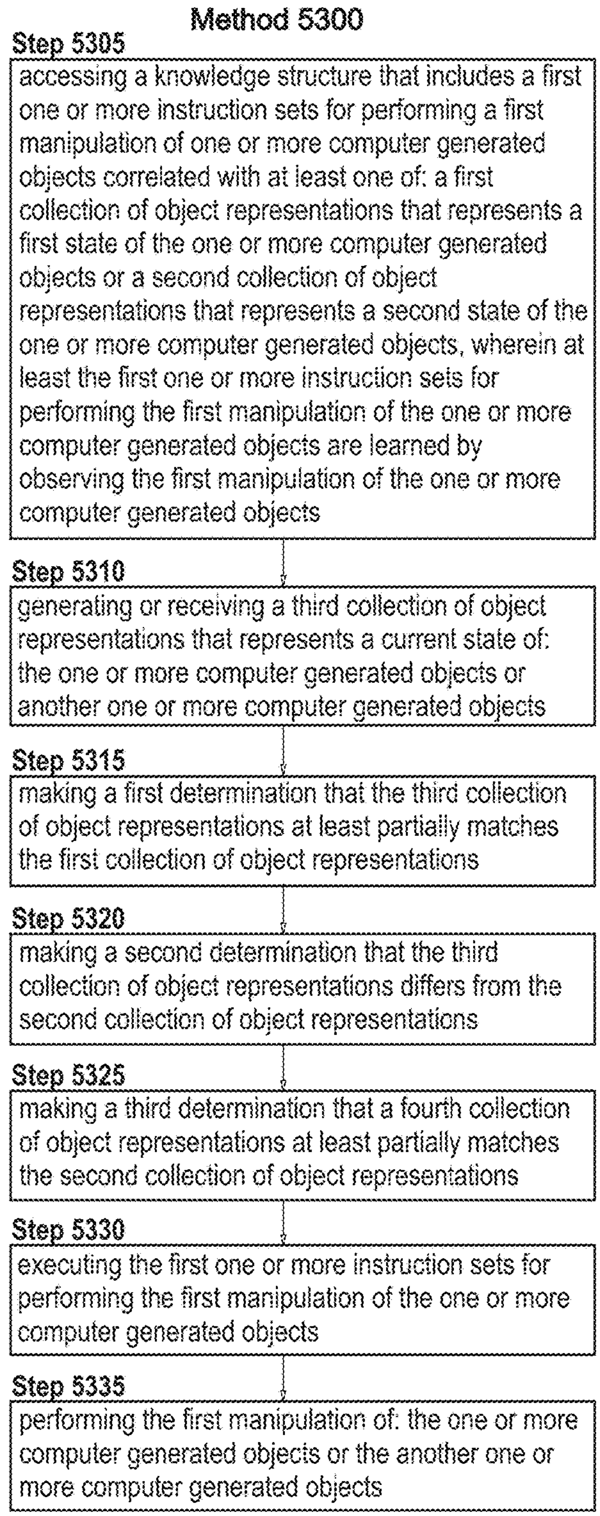
FIG. 43B illustrates an embodiment of method 5300.

Referring to FIG. 43B, an embodiment of method 5300 for manipulations of one or more computer generated objects using artificial knowledge is illustrated.

At step 5305, a knowledge structure that includes a first one or more instruction sets for performing a first manipulation of one or more computer generated objects correlated with at least one of: a first collection of object representations that represents a first state of the one or more computer generated objects or a second collection of object representations that represents a second state of the one or more computer generated objects is accessed, wherein at least the first one or more instruction sets for performing the first manipulation of the one or more computer generated objects are learned by observing the first manipulation of the one or more computer generated objects. In some aspects, the knowledge structure and/or elements/portions thereof may be caused, generated, and/or learned by any action or operation described in steps 5105-5125 of method 5100 as applicable. As such, the knowledge structure and/or elements/portions thereof comprise any features, functionalities, and/or embodiments of the knowledge structure and/or elements/portions thereof described in method 5100 as applicable. Accessing comprises any action or operation by or for Knowledge Structure 160, Knowledge Cell 800, Collection of Object Representations 525, Instruction Set 526, and/or other elements.

At step 5310, a third collection of object representations that represents a current state of: the one or more computer generated objects or another one or more computer generated objects is generated or received. Step 5310 may include any action or operation described in Step 5105 of method 5100 and/or Step 3105 of method 3100 as applicable.

At step 5315, a first determination is made that the third collection of object representations at least partially matches the first collection of object representations. Step 5315 may include any action or operation described in Step 3315 of method 3300 as applicable.

At step 5320, a second determination is made that the third collection of object representations differs from the second collection of object representations. Step 5320 may include any action or operation described in Step 3320 of method 3300 as applicable. Step 5320 may be optionally omitted depending on implementation.

At step 5325, a third determination is made that a fourth collection of object representations at least partially matches the second collection of object representations. Step 5325 may include any action or operation described in Step 3325 of method 3300 as applicable. Step 5325 may be optionally omitted depending on implementation.

At step 5330, the first one or more instruction sets for performing the first manipulation of the one or more computer generated objects are executed. In some aspects, Step 5330 may be performed in response to at least the first determination in Step 5315, and optionally the second determination in Step 5320 and/or optionally the third determination in Step 5325. Step 5330 may include any action or operation described in Step 3330 of method 3300 and/or Step 3115 of method 3100 as applicable.

At step 5335, the first manipulation of: the one or more computer generated objects or the another one or more computer generated objects is performed. Step 5335 may include any action or operation described in Step 3335 of method 3300 and/or Step 3120 of method 3100 as applicable.

Figure 44A:
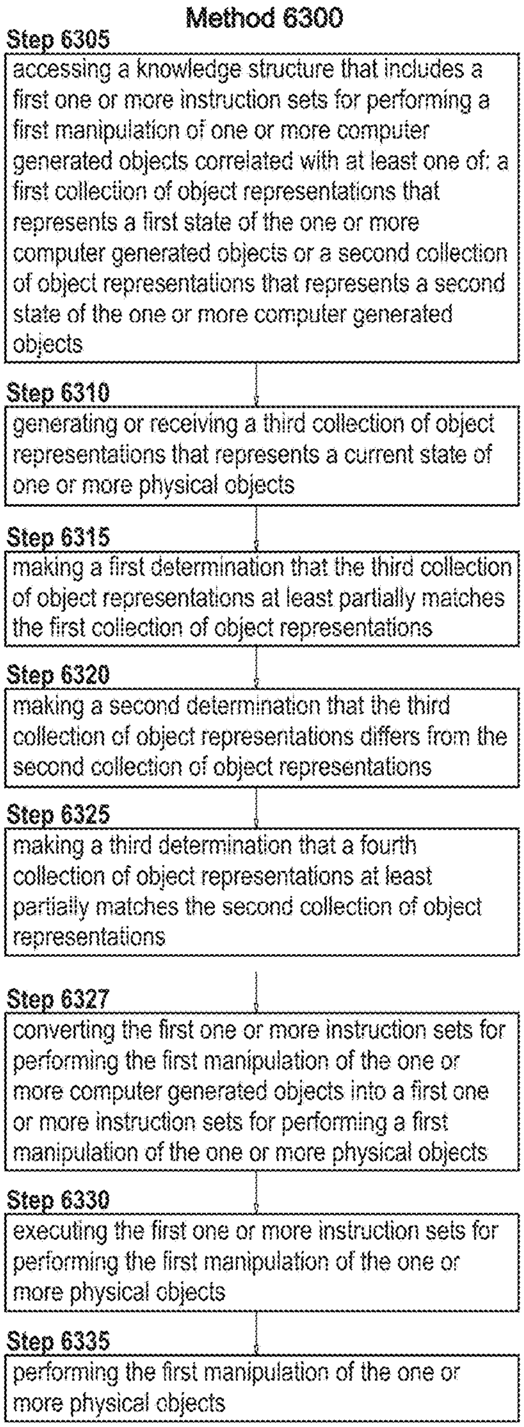
FIG. 44A illustrates an embodiment of method 6300.

Referring to FIG. 44A, an embodiment of method 6300 for manipulations of one or more physical objects using artificial knowledge learned from manipulations of one or more computer generated objects or learned by observing manipulations of one or more computer generated objects is illustrated.

At step 6305, a knowledge structure that includes a first one or more instruction sets for performing a first manipulation of one or more computer generated objects correlated with at least one of: a first collection of object representations that represents a first state of the one or more computer generated objects or a second collection of object representations that represents a second state of the one or more computer generated objects is accessed. In some embodiments, one or more instruction sets (i.e. the first one or more instruction sets, etc.) for performing a manipulation of one or more computer generated objects are learned using curiosity. In other embodiments, one or more instruction sets (i.e. the first one or more instruction sets, etc.) for performing a manipulation of one or more computer generated objects are learned by observing the manipulation of the one or more computer generated objects. In some aspects, the knowledge structure and/or elements/portions thereof may be caused, generated, and/or learned by any action or operation described in steps 3105-3125 of method 3100 and/or described in steps 5105-5125 of method 5100 as applicable. As such, the knowledge structure and/or elements/portions thereof comprise any features, functionalities, and/or embodiments of the knowledge structure and/or elements/portions thereof described in method 3100 and/or method 5100 as applicable. Step 6305 may include any action or operation described in Step 3305 of method 3300 and/or Step 5305 of method 5300 as applicable.

At step 6310, a third collection of object representations that represents a current state of one or more physical objects is generated or received. Step 6310 may include any action or operation described in Step 2310 of method 2300 as applicable.

At step 6315, a first determination is made that the third collection of object representations at least partially matches the first collection of object representations. Step 6315 may include any action or operation described in Step 2315 of method 2300 and/or Step 3315 of method 3300 as applicable.

At step 6320, a second determination is made that the third collection of object representations differs from the second collection of object representations. Step 6320 may include any action or operation described in Step 2320 of method 2300 and/or Step 3320 of method 3300 as applicable.

At step 6325, a third determination is made that a fourth collection of object representations at least partially matches the second collection of object representations. In some aspects, a collection of object representations (i.e. the fourth collection of object representations, etc.) may represent a beneficial or desirable state of one or more physical objects. Step 6325 may include any action or operation described in Step 2325 of method 2300 and/or Step 3325 of method 3300 as applicable.

At step 6327, the first one or more instruction sets for performing the first manipulation of the one or more computer generated objects are converted into a first one or more instruction sets for performing a first manipulation of the one or more physical objects. Converting may enable converting instruction sets learned on/by an avatar into instruction sets that can be used on/by a device. Converting may enable converting instruction sets learned in an avatar's manipulations of one or more objects of an application into instruction sets for a device's manipulations of one or more objects in the physical world. Converting may enable a device's manipulations of one or more physical objects using artificial knowledge learned in an avatar's manipulations of one or more computer generated objects. In some designs, an avatar may simulate or resemble a device such that an avatar's size, shape, elements, and/or other properties may resemble a device's size, shape, elements, and/or other properties. In other designs, one or more computer generated objects may similarly simulate or resemble one or more physical objects such that a computer generated object's size, shape, elements, behaviors, and/or other properties may resemble a physical object's size, shape, elements, behaviors, and/or other properties. In some embodiments where an avatar simulates or resembles a device and where a reference for the device is used in instruction sets for operating the avatar, same instruction sets learned in the avatar's manipulations of one or more computer generated objects can be used in the device's manipulations of one or more physical objects, in which case Step 6327 can be optionally omitted. In some embodiments where an avatar simulates or resembles a device and where a reference for the device is not used in instruction sets for operating the avatar, a reference for the avatar in instruction sets learned in the avatar's manipulations of one or more computer generated objects can be replaced with a reference for the device so that the instruction sets can be used in the device's manipulations of one or more physical objects. In some aspects, similar modification or replacement of references can be used with respect to any elements (i.e. arm, leg, antenna, wheel, etc.) of an avatar and/or device, and vice versa. Any other technique for modifying or replacing of references, and/or those known in art, can be used. In some embodiments where an avatar does not simulate or resemble a device, instruction sets learned in the avatar's manipulations of one or more computer generated objects can be modified so that they can be used by any device and/or any element of a device that can perform the needed manipulations. In other embodiments where an avatar does not simulate or resemble a device, instruction sets learned in an avatar's manipulations of one or more computer generated objects can be modified to account for differences between the avatar and a device. In further embodiments, instruction sets learned in an avatar's manipulations of one or more computer generated objects can be modified to account for variations between situations when the instruction sets were learned in the avatar's manipulations of one or more computer generated objects and situations when the instruction sets are used in a device's manipulations of one or more physical objects. Any other modifications of instruction sets learned on/by an avatar can be made to make the instruction sets suitable for use on/by one or more devices. Converting comprises any action or operation by or for Instruction Set Converter 381, and/or other elements. Step 6327 may be optionally omitted depending on implementation.

At step 6330, the first one or more instruction sets for performing the first manipulation of the one or more physical objects are executed. Step 6330 may include any action or operation described in Step 2330 of method 2300 as applicable.

At step 6335, the first manipulation of the one or more physical objects is performed. Step 6335 may include any action or operation described in Step 2335 of method 2300 as applicable.

Figure 44B:
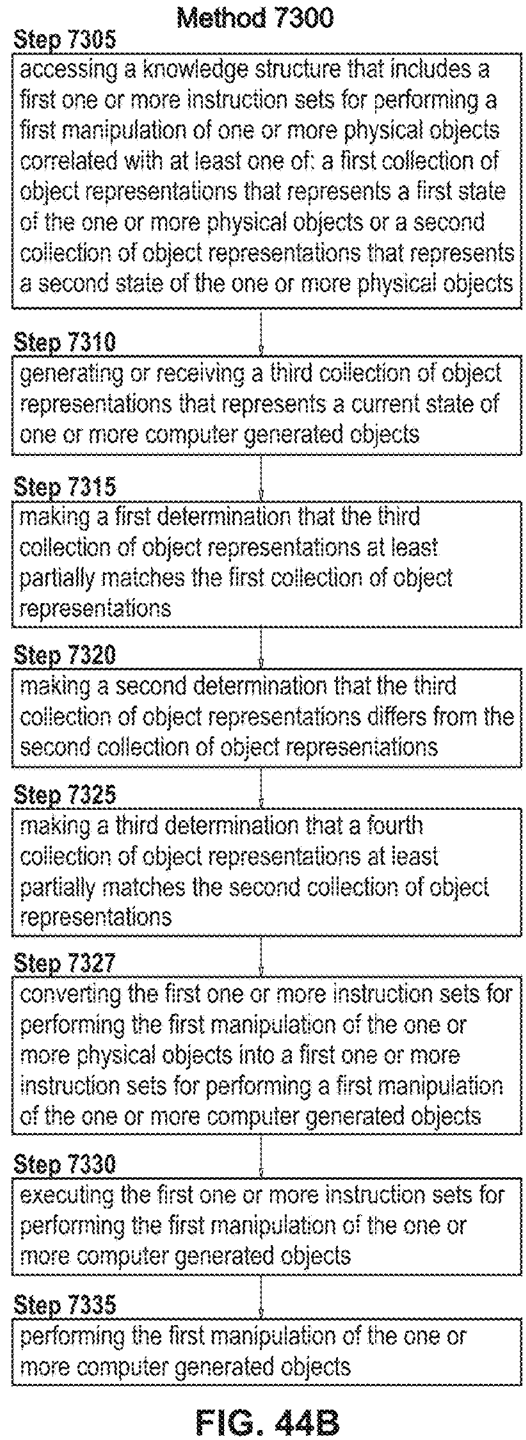
FIG. 44B illustrates an embodiment of method 7300.

Referring to FIG. 44B, an embodiment of method 7300 for manipulations of one or more computer generated objects using artificial knowledge learned from manipulations of one or more physical objects or learned by observing manipulations of one or more physical objects is illustrated.

At step 7305, a knowledge structure that includes a first one or more instruction sets for performing a first manipulation of one or more physical objects correlated with at least one of: a first collection of object representations that represents a first state of the one or more physical objects or a second collection of object representations that represents a second state of the one or more physical objects is accessed. In some aspects, one or more instruction sets (i.e. the first one or more instruction sets, etc.) for performing a manipulation of one or more physical objects are learned using curiosity. In other aspects, one or more instruction sets (i.e. the first one or more instruction sets, etc.) for performing a manipulation of one or more physical objects are learned by observing the manipulation of the one or more physical objects. In some aspects, the knowledge structure and/or elements/portions thereof may be caused, generated, and/or learned by any action or operation described in steps 2105-2125 of method 2100 or described in steps 4105-4125 of method 4100 as applicable. As such, the knowledge structure and/or elements/portions thereof comprise any features, functionalities, and/or embodiments of the knowledge structure and/or elements/portions thereof described in method 2100 and/or method 4100 as applicable. Step 7305 may include any action or operation described in Step 2305 of method 2300 and/or Step 4305 of method 4300 as applicable.

At step 7310, a third collection of object representations that represents a current state of one or more computer generated objects is generated or received. Step 7310 may include any action or operation described in Step 3310 of method 3300 as applicable.

At step 7315, a first determination is made that the third collection of object representations at least partially matches the first collection of object representations. Step 7315 may include any action or operation described in Step 2315 of method 2300 and/or Step 3315 of method 3300 as applicable.

At step 7320, a second determination is made that the third collection of object representations differs from the second collection of object representations. Step 7320 may include any action or operation described in Step 2320 of method 2300 and/or Step 3320 of method 3300 as applicable.

At step 7325, a third determination is made that a fourth collection of object representations at least partially matches the second collection of object representations. In some embodiments, a collection of object representations (i.e. the fourth collection of object representations, etc.) may represent a beneficial or desirable state of one or more computer generated objects. Step 7325 may include any action or operation described in Step 2325 of method 2300 and/or Step 3325 of method 3300 as applicable.

At step 7327, the first one or more instruction sets for performing the first manipulation of the one or more physical objects are converted into a first one or more instruction sets for performing a first manipulation of the one or more computer generated objects. Converting may enable converting instruction sets learned on/by a device into instruction sets that can be used on/by an avatar. Converting may enable converting instruction sets learned in a device's manipulations of one or more objects in the physical world into instruction sets for an avatar's manipulations of one or more objects in an application. Converting may enable an avatar's manipulations of one or more computer generated objects using artificial knowledge learned in a device's manipulations of one or more physical objects. In some designs, a device may simulate or resemble an avatar such that a device's size, shape, elements, and/or other properties may resemble an avatar's size, shape, elements, and/or other properties. In other designs, one or more physical objects may similarly simulate or resemble one or more computer generated objects such that a physical object's size, shape, elements, behaviors, and/or other properties may resemble a computer generated object's size, shape, elements, behaviors, and/or other properties. In some embodiments where a device simulates or resembles an avatar and where a reference for the avatar is used in instruction sets for operating the device, same instruction sets learned in the device's manipulations of one or more physical objects can be used in the avatar's manipulations of one or more computer generated objects, in which case Step 7327 can be optionally omitted. In some embodiments where a device simulates or resembles an avatar and where a reference for the avatar is not used in instruction sets for operating the device, a reference for the device in instruction sets learned in the device's manipulations of one or more physical objects can be replaced with a reference for the avatar so that the instruction sets can be used in the avatar's manipulations of one or more computer generated objects. In some aspects, similar modification or replacement of references can be used with respect to any elements (i.e. arm, leg, antenna, wheel, etc.) of a device and/or avatar, and vice versa. Any other technique for modifying or replacing of references, and/or those known in art, can be used. In some embodiments where a device does not simulate or resemble an avatar, instruction sets learned in the device's manipulations of one or more physical objects can be modified so that they can be used by any avatar and/or any element of an avatar that can perform the needed manipulations. In other embodiments where a device does not simulate or resemble an avatar, instruction sets learned in a device's manipulations of one or more physical objects can be modified to account for differences between the device and an avatar. In further embodiments, instruction sets learned in a device's manipulations of one or more physical objects can be modified to account for variations between situations when the instruction sets were learned in the device's manipulations of one or more physical objects and situations when the instruction sets are used in an avatar's manipulations of one or more computer generated objects. Any other modifications of instruction sets learned on/by a device can be made to make the instruction sets suitable for use on/by one or more avatars. Converting comprises any action or operation by or for an Instruction Set Converter 381, and/or other elements. Step 7327 may be optionally omitted depending on implementation.

At step 7330, the first one or more instruction sets for performing the first manipulation of the one or more computer generated objects are executed. Step 7330 may include any action or operation described in Step 3330 of method 3300 as applicable.

At step 7335, the first manipulation of the one or more computer generated objects is performed. Step 7335 may include any action or operation described in Step 3335 of method 3300 as applicable.

Referring to FIG. 45A, an embodiment of method 8100 for learning observed manipulations of one or more physical objects is illustrated.

At step 8105, at least one of: a first collection of object representations that represents a first state of one or more manipulated physical objects or a second collection of object representations that represents a first state of one or more manipulating physical objects are generated or received. Step 8105 may include any action or operation described in Step 2105 of method 2100 as applicable.

At step 8110, a first manipulation of the one or more manipulated physical objects is observed. Step 8110 may include any action or operation described in Step 4110 of method 4100 as applicable.

At step 8115, at least one of: a third collection of object representations that represents a second state of the one or more manipulated physical objects or a fourth collection of object representations that represents a second state of the one or more manipulating physical objects are generated or received. Step 8115 may include any action or operation described in Step 8105 and/or Step 2105 of method 2100 as applicable.

At step 8120, at least one of: the first collection of object representations, the second collection of object representations, the third collection of object representations, or the fourth collection of object representations are learned. Step 8120 may include any action or operation described in Step 2130 of method 2100 as applicable.

Referring to FIG. 45B, an embodiment of method 8300 for manipulations of one or more physical objects using artificial knowledge to determine the manipulations is illustrated.

At step 8305, a knowledge structure that includes at least one of: a first collection of object representations that represents a first state of one or more manipulated physical objects, a second collection of object representations that represents a first state of one or more manipulating physical objects, a third collection of object representations that represents a second state of the one or more manipulated physical objects, or a fourth collection of object representations that represents a second state of the one or more manipulating physical objects is accessed. Step 8305 may include any action or operation described in Step 2305 of method 2300 and/or Step 4305 of method 4300 as applicable.

At step 8310, a fifth collection of object representations that represents a current state of: the one or more manipulated physical objects or one or more other physical objects is generated or received. Step 8310 may include any action or operation described in Step 2105 of method 2100 and/or Step 2310 of method 2300 as applicable.

At step 8315, a first determination is made that the fifth collection of object representations at least partially matches the first collection of object representations. Step 8315 may include any action or operation described in Step 2315 of method 2300 as applicable.

At step 8320, a second determination is made that the fifth collection of object representations differs from the third collection of object representations. Step 8320 may include any action or operation described in Step 2320 of method 2300 as applicable. Step 8320 may be optionally omitted depending on implementation.

At step 8325, a third determination is made that a sixth collection of object representations at least partially matches the third collection of object representations. Step 8325 may include any action or operation described in Step 2325 of method 2300 as applicable. Step 8325 may be optionally omitted depending on implementation.

At step 8328, a first one or more instruction sets for performing a first manipulation of the one or more manipulated physical objects that would cause the one or more manipulated physical objects' change from the first state of the one or more manipulated physical objects to the second state of the one or more manipulated physical objects are determined. In some aspects, Step 8328 may be performed in response to at least the first determination in Step 8315, and optionally the second determination in Step 8320 and/or optionally the third determination in Step 8325. Step 8328 may include any action or operation described in Step 4120 of method 4100 as applicable.

At step 8330, the first one or more instruction sets for performing the first manipulation of the one or more manipulated physical objects are executed. Step 8330 may include any action or operation described in Step 2330 of method 2300 as applicable.

At step 8335, the first manipulation of: the one or more manipulated physical objects or the one or more other physical objects is performed. Step 8335 may include any action or operation described in Step 2335 of method 2300 as applicable.

Figure 46A:
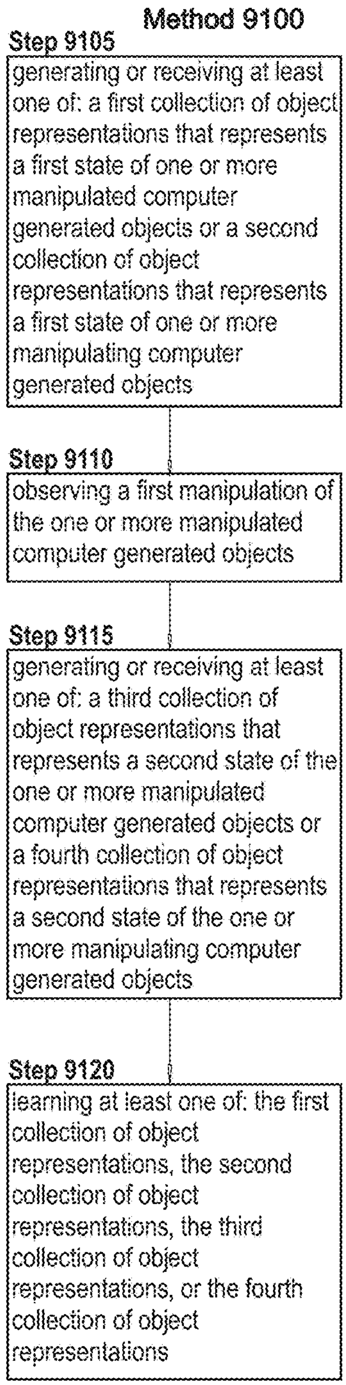
FIG. 46A illustrates an embodiment of method 9100.

Referring to FIG. 46A, an embodiment of method 9100 for learning observed manipulations of one or more computer generated objects is illustrated.

At step 9105, at least one of: a first collection of object representations that represents a first state of one or more manipulated computer generated objects or a second collection of object representations that represents a first state of one or more manipulating computer generated objects are generated or received. Step 9105 may include any action or operation described in Step 3105 of method 3100 as applicable.

At step 9110, a first manipulation of the one or more manipulated computer generated objects is observed. Step 9110 may include any action or operation described in Step 5110 of method 5100 as applicable.

At step 9115, at least one of: a third collection of object representations that represents a second state of the one or more manipulated computer generated objects or a fourth collection of object representations that represents a second state of the one or more manipulating computer generated objects are generated or received. Step 9115 may include any action or operation described in Step 9105 and/or Step 3105 of method 3100 as applicable.

At step 9120, at least one of: the first collection of object representations, the second collection of object representations, the third collection of object representations, or the fourth collection of object representations are learned. Step 9120 may include any action or operation described in Step 3130 of method 3100 as applicable.

Figure 46B:
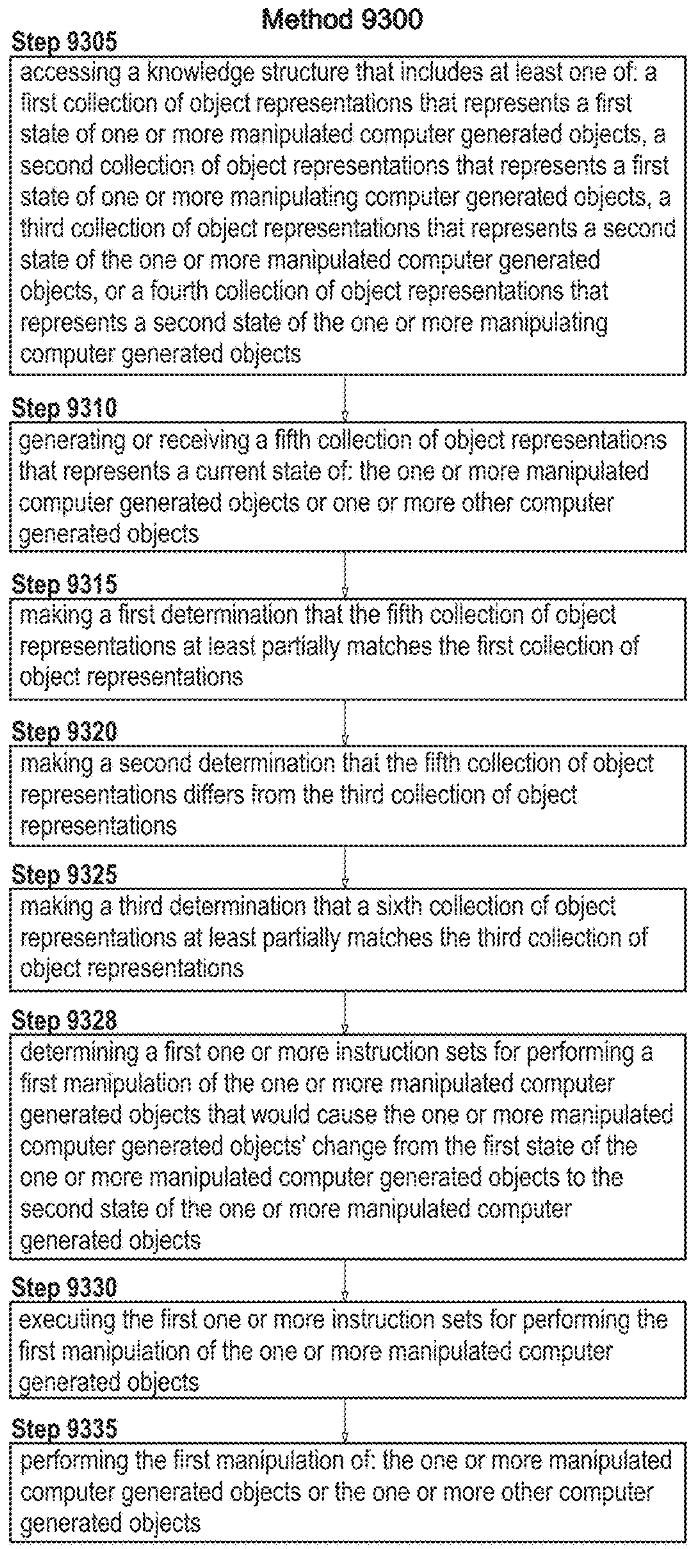
FIG. 46B illustrates an embodiment of method 9300.

Referring to FIG. 46B, an embodiment of method 9300 for manipulations of one or more computer generated objects using artificial knowledge to determine the manipulations is illustrated.

At step 9305, a knowledge structure that includes at least one of: a first collection of object representations that represents a first state of one or more manipulated computer generated objects, a second collection of object representations that represents a first state of one or more manipulating computer generated objects, a third collection of object representations that represents a second state of the one or more manipulated computer generated objects, or a fourth collection of object representations that represents a second state of the one or more manipulating computer generated objects is accessed. Step 9305 may include any action or operation described in Step 3305 of method 3300 and/or Step 5305 of method 5300 as applicable.

At step 9310, a fifth collection of object representations that represents a current state of: the one or more manipulated computer generated objects or one or more other computer generated objects is generated or received. Step 9310 may include any action or operation described in Step 3310 of method 3300 as applicable.

At step 9315, a first determination is made that the fifth collection of object representations at least partially matches the first collection of object representations. Step 9315 may include any action or operation described in Step 3315 of method 3300 as applicable.

At step 9320, a second determination is made that the fifth collection of object representations differs from the third collection of object representations. Step 9320 may include any action or operation described in Step 3320 of method 3300 as applicable. Step 9320 may be optionally omitted depending on implementation.

At step 9325, a third determination is made that a sixth collection of object representations at least partially matches the third collection of object representations. Step 9325 may include any action or operation described in Step 3325 of method 3300 as applicable. Step 9325 may be optionally omitted depending on implementation.

At step 9328, a first one or more instruction sets for performing a first manipulation of the one or more manipulated computer generated objects that would cause the one or more manipulated computer generated objects' change from the first state of the one or more manipulated computer generated objects to the second state of the one or more manipulated computer generated objects are determined. In some aspects, Step 9328 may be performed in response to at least the first determination in Step 9315, and optionally the second determination in Step 9320 and/or optionally the third determination in Step 9325. Step 9328 may include any action or operation described in Step 5120 of method 5100 as applicable.

At step 9330, the first one or more instruction sets for performing the first manipulation of the one or more manipulated computer generated objects are executed. Step 9330 may include any action or operation described in Step 3330 of method 3300 as applicable.

At step 9335, the first manipulation of: the one or more manipulated computer generated objects or the one or more other computer generated objects is performed. Step 9335 may include any action or operation described in Step 3335 of method 3300 as applicable.

In some embodiments, other methods can be implemented by combining one or more steps of the disclosed methods. In one example, a method for learning a device's manipulations of one or more physical objects using curiosity and using artificial knowledge for a device's manipulations of one or more physical objects may be implemented by combining one or more steps 2105-2130 of method 2100 and one or more steps 2305-2335 of method 2300. In another example, a method for learning an avatar's manipulations of one or more computer generated objects using curiosity and using artificial knowledge for an avatar's manipulations of one or more computer generated objects may be implemented by combining one or more steps 3105-3130 of method 3100 and one or more steps 3305-3335 of method 3300. In a further example, a method for learning a device's manipulations of one or more physical objects by observing the manipulations of one or more physical objects and using artificial knowledge for a device's manipulations of one or more physical objects may be implemented by combining one or more steps 4105-4130 of method 4100 and one or more steps 4305-4335 of method 4300. In another example, a method for learning an avatar's manipulations of one or more computer generated objects by observing the manipulations of one or more computer generated objects and using artificial knowledge for an avatar's manipulations of one or more computer generated objects may be implemented by combining one or more steps 5105-5130 of method 5100 and one or more steps 5305-5335 of method 5300. Any other combination of the disclosed methods and/or their steps can be implemented in various embodiments.

Figure 47A:
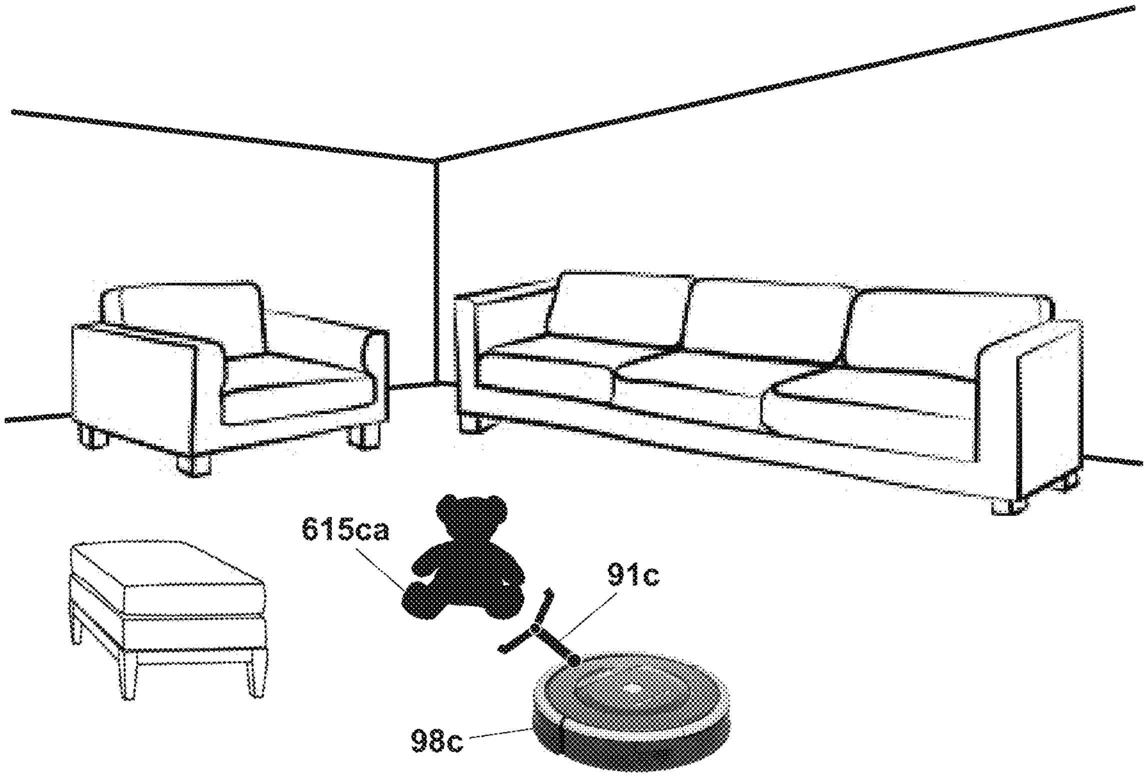
FIG. 47A-47B illustrate an exemplary embodiment of Automatic Vacuum Cleaner 98*c* learning using curiosity and using artificial knowledge.
Figure 47B:
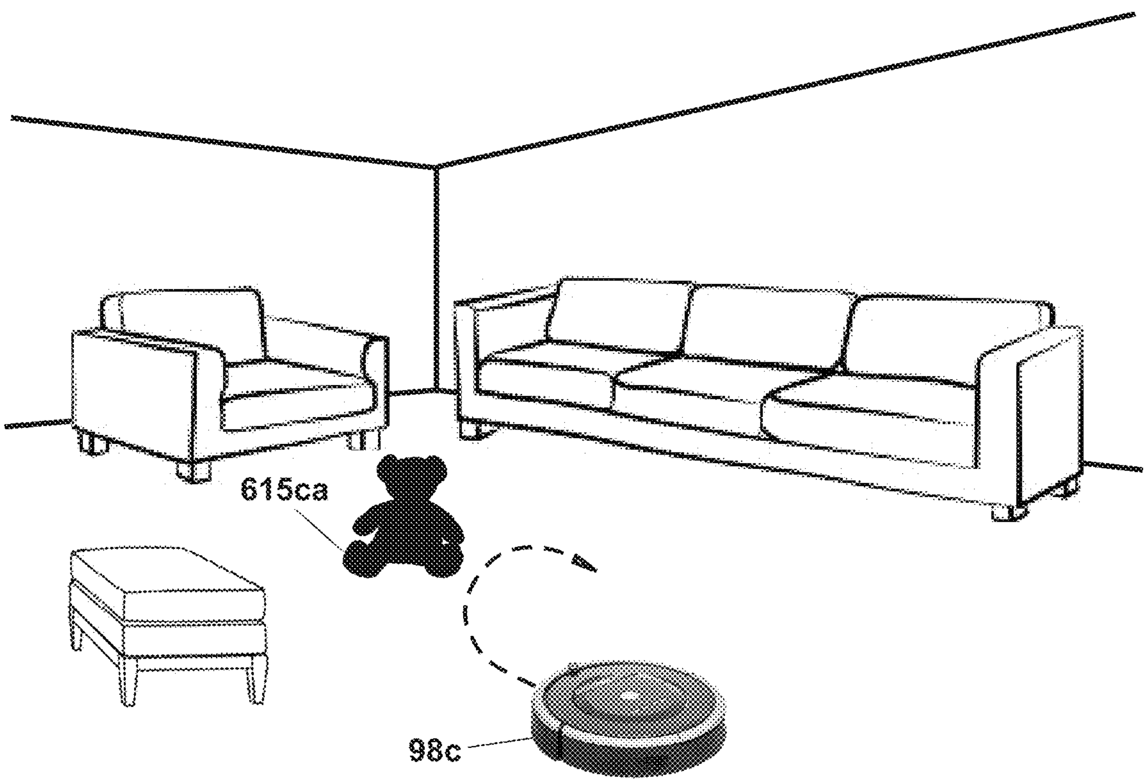

Referring to FIG. 47A-47B, in some exemplary embodiments, Device 98 may be or include Automatic Vacuum Cleaner 98*c*. Automatic Vacuum Cleaner 98*c* may include or be coupled to one or more Sensors 92 and/or Object Processing Unit 115 that can detect one or more Objects 615 or states of one or more Objects 615 in Automatic Vacuum Cleaner's 98*c* surrounding. Object Processing Unit 115 may generate one or more Collections of Object Representations 525 representing the one or more Objects 615 or states of one or more Objects 615. As shown for example in FIG. 47A, Automatic Vacuum Cleaner 98*c* in a learning mode may detect a toy Object 615*ca* in a state of being 0.2 meters in front of (i.e. zero degrees bearing/angle, etc.) Automatic Vacuum Cleaner 98*c*. LTCUAK Unit 100 or elements (i.e. Unit for Object Manipulation Using Curiosity 130, etc.) thereof may cause Automatic Vacuum Cleaner 98*c* to perform various experimental or inquisitive manipulations of the toy Object 615*ca* using curiosity including causing Automatic Vacuum Cleaner's 98*c* robotic arm Actuator 91*c* to extend forward 0.4 meters to push the toy Object 615*ca* resulting in the toy Object 615*ca* moving to a subsequent state of being 0.4 meters in front of Automatic Vacuum Cleaner 98*c*. LTCUAK Unit 100 or elements thereof may, thereby, learn that the toy Object 615*ca* can be moved when pushed by learning one or more Instruction Sets 526 used or executed in pushing the toy Object 615*ca* correlated with: one or more Collections of Object Representations 525 representing the subsequent (i.e. moved, etc.) state of the toy Object 615*ca* and/or one or more Collections of Object Representations 525 representing the state of the toy Object 615*ca* before the move. Any Extra Info 527 related to Automatic Vacuum Cleaner's 98*c* manipulation can also optionally be learned. LTCUAK Unit 100 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 47B, Automatic Vacuum Cleaner 98*c* in a normal mode may be operated or controlled by Device Control Program 18*a* that can cause Automatic Vacuum Cleaner 98*c* to operate (i.e. move, maneuver, suction, etc.) in vacuuming a room. Automatic Vacuum Cleaner 98*c* in the normal mode may detect a toy Object 615*ca*. The toy Object 615*ca* may need to be moved so that Automatic Vacuum Cleaner 98*c* can vacuum the place where the toy Object 615*ca* resides. Device Control Program 18*a* may not know how to move the toy Object 615*ca*. LTCUAK Unit 100 or elements (i.e. Unit for Object Manipulation Using Artificial Knowledge 170, Knowledge Structure 160, etc.) thereof may include knowledge of moving a toy Object 615*ca* or another similar Object 615, which Device Control Program 18*a* may decide to use to move the toy Object 615 by switching to the use of artificial knowledge mode. Automatic Vacuum Cleaner 98*c* in the use of artificial knowledge mode may use the artificial knowledge in LTC- UAK Unit 100 or elements thereof to move the toy Object 615*ca* by comparing incoming one or more Collections of Object Representations 525 representing a current state of the toy Object 615*ca* with previously learned one or more Collections of Object Representations 525 representing previously learned states of one or more Objects 615. If at least partial match is determined in a previously learned one or more Collections of Object Representations 525, Instruction Sets 526 correlated with a previously learned one or more Collections of Object Representations 525 representing a subsequent (i.e. moved, etc.) state of the toy Object 615*ca* can be executed to cause Automatic Vacuum Cleaner's 98*c* robotic arm Actuator 91*c* to push the toy Object 615*ca*, thereby effecting the toy Object's 615*ca* state of being moved. Such moved state of the toy Object 615*ca* may advance Automatic Vacuum Cleaner's 98*c* vacuuming the room. Any previously learned Extra Info 527 related to Automatic Vacuum Cleaner's 98*c* manipulations may also optionally be used for enhanced decision making and/or other functionalities. Once the toy Object 615*ca* is moved using artificial knowledge, Automatic Vacuum Cleaner 98*c* can return to its normal mode of being operated or controlled by Device Control Program 18*a* to vacuum the place where the toy Object 615*ca* resided prior to being moved and/or vacuum the rest of the room. In some aspects, Automatic Vacuum Cleaner 98*c* may push the toy Object 615*ca* by its body in which case robotic arm Actuator 91*c* can be optionally omitted.

Figure 48A:
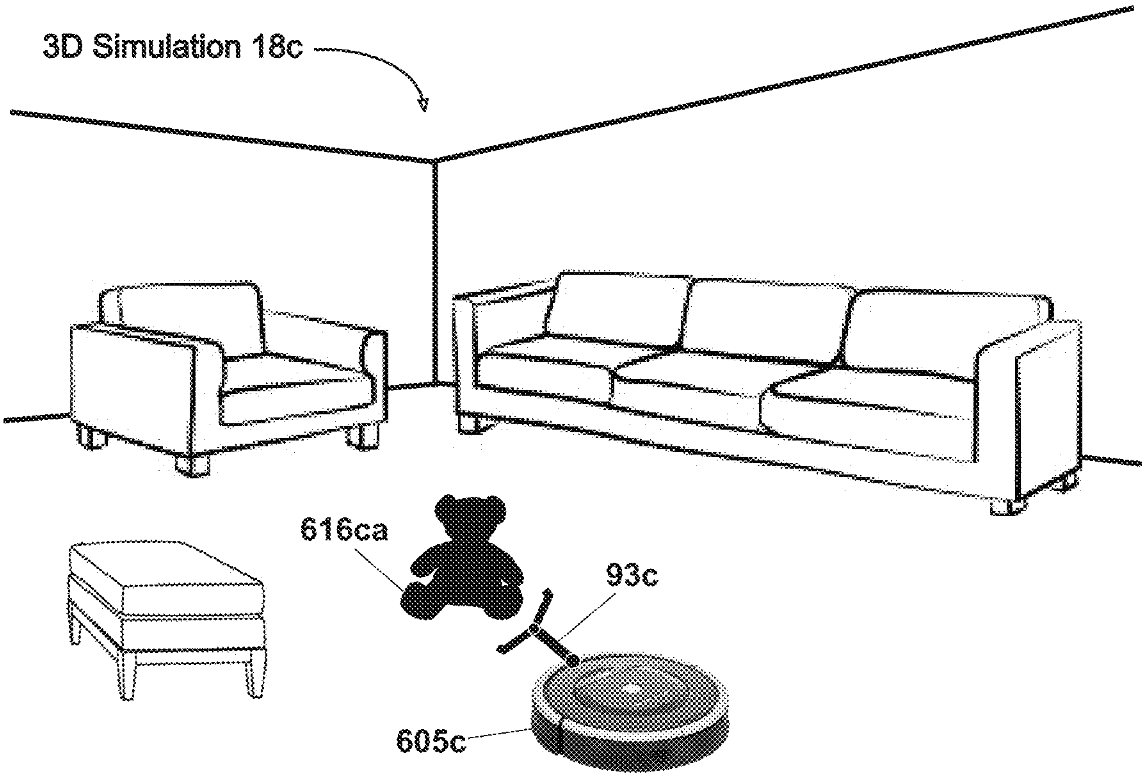
FIG. 48A-48B illustrate an exemplary embodiment of Simulated Automatic Vacuum Cleaner 605*c* learning using curiosity and using artificial knowledge.
Figure 48B:
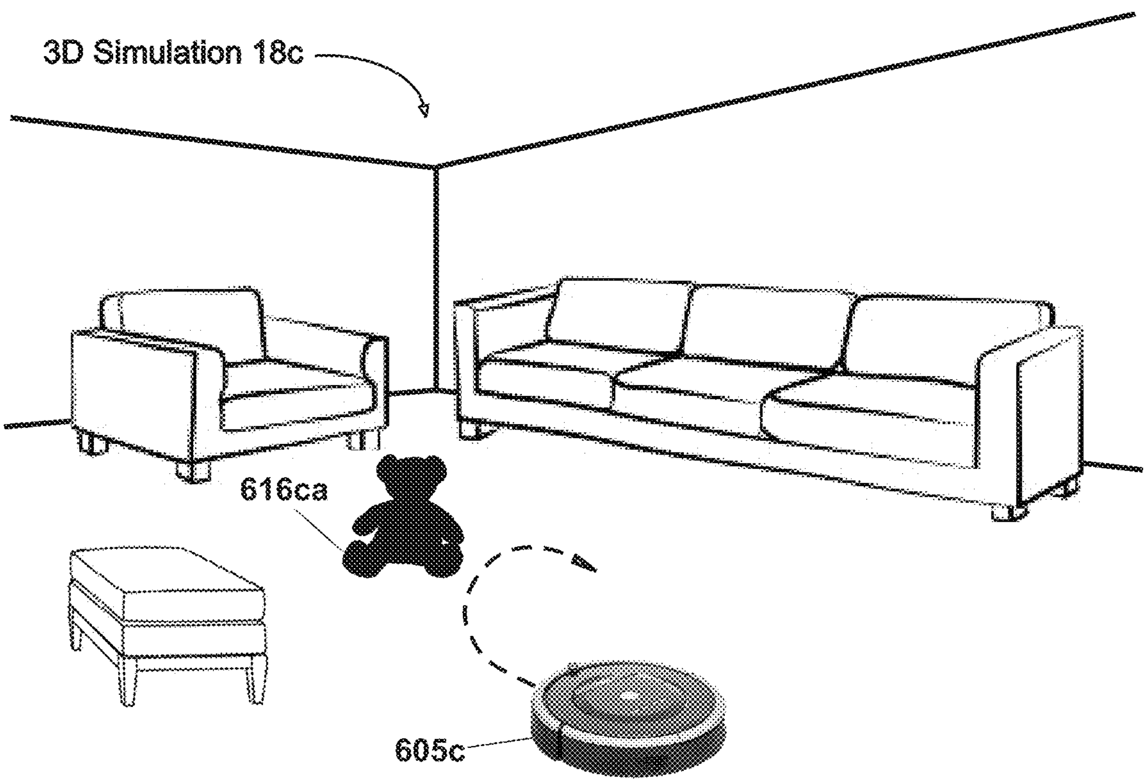

Referring to FIG. 48A-48B, in some exemplary embodiments, Application Program 18 may be or include a 3D Simulation 18*c* (i.e. robot or device simulation application, etc.). Avatar 605 may be or include Simulated Automatic Vacuum Cleaner 605*c*. Object Processing Unit 115 may detect or obtain one or more Objects 616 or states of one or more Objects 616 in Simulated Automatic Vacuum Cleaner's 605*c* surrounding. Object Processing Unit 115 may generate one or more Collections of Object Representations 525 representing the one or more Objects 616 or states of the one or more Objects 616. As shown for example in FIG. 48A, Simulated Automatic Vacuum Cleaner 605*c* in a learning mode may be operated or controlled by LTCUAK Unit 100 or elements thereof to detect or obtain a simulated toy Object 616*ca* in a state of being 0.2 meters in front of Simulated Automatic Vacuum Cleaner 605*c* and perform various experimental or inquisitive manipulations of the simulated toy Object 616*ca* using curiosity including extending Arm 93*c* forward 0.4 meters to push the simulated toy Object 616*ca*, thereby learning that the simulated toy Object 616*ca* can be moved when pushed as described in the preceding exemplary embodiment with respects to Automatic Vacuum Cleaner 98*c*, robotic arm Actuator 91*c*, toy Object 615*ca*, Device Control Program 18*a*, LTCUAK Unit 100 or elements thereof, and/or other elements. As shown for example in FIG. 48B, Simulated Automatic Vacuum Cleaner 605*c* in a normal mode may be operated or controlled by Avatar Control Program 18*b* that can cause Simulated Automatic Vacuum Cleaner 605*c* to operate (i.e. move, maneuver, suction, etc.) in vacuuming a simulated room. Simulated Automatic Vacuum Cleaner 605*c* in a use of artificial knowledge mode may be operated or controlled by LTCUAK Unit 100 or elements thereof to move the simulated toy Object 616*ca* or another similar Object 616 that may advance Simulated Automatic Vacuum Cleaner's 605*c* vacuuming a simulated room as described in the preceding exemplary embodiment with respects to Automatic Vacuum Cleaner 98*c*, robotic arm Actuator 91*c*, toy Object 615*ca*, Device Control Program 18*a*, LTCUAK Unit 100 or elements thereof, and/or other elements.

Figure 49A:
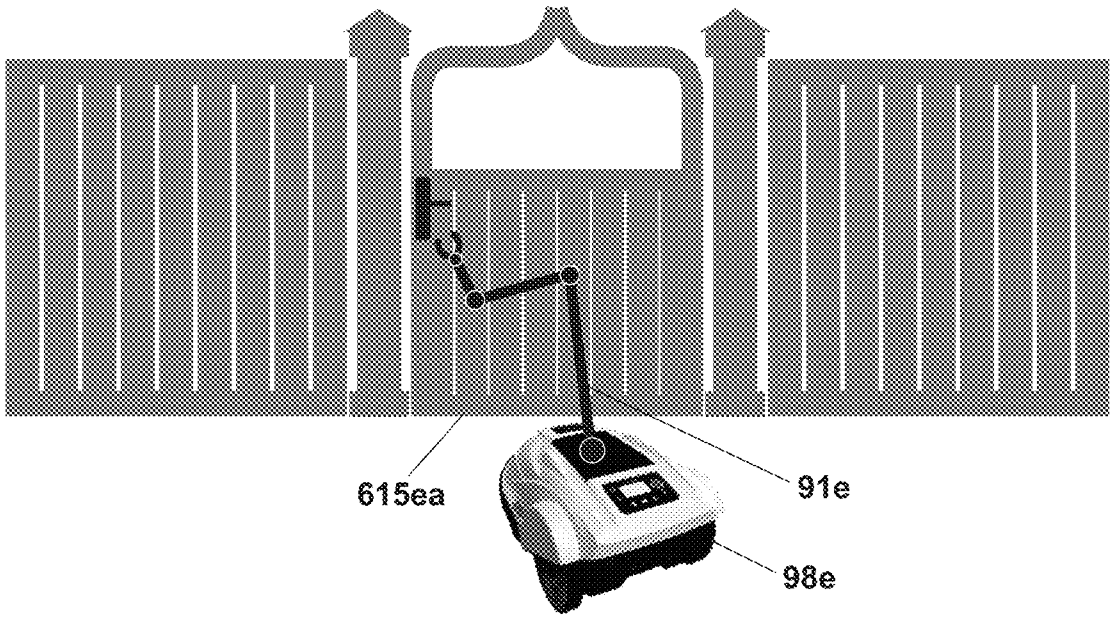
FIG. 49A-49B illustrate an exemplary embodiment of Automatic Lawn Mower 98*e* learning using curiosity and using artificial knowledge.
Figure 49B:
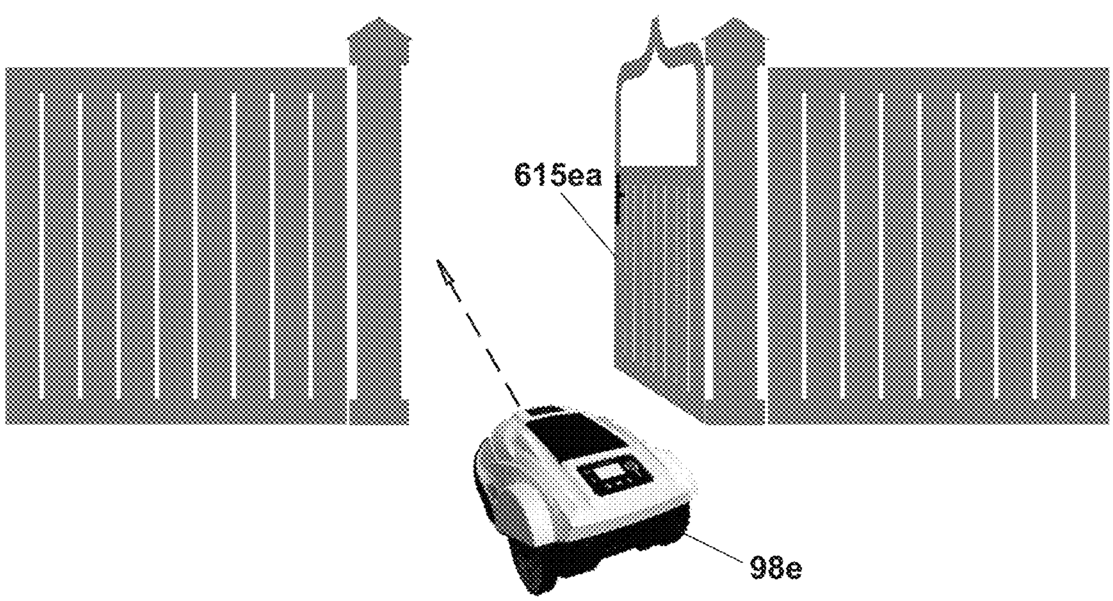

Referring to FIG. 49A-49B, in some exemplary embodiments, Device 98 may be or include Automatic Lawn Mower 98*e*. Automatic Lawn Mower 98*e* may include or be coupled to one or more Sensors 92 and/or Object Processing Unit 115 that can detect one or more Objects 615 or states of one or more Objects 615 in Automatic Lawn Mower's 98*e* surrounding. Object Processing Unit 115 may generate one or more Collections of Object Representations 525 representing the one or more Objects 615 or states of the one or more Objects 615. As shown for example in FIG. 49A, Automatic Lawn Mower 98*e* in a learning mode may detect a gate Object 615*ea* in a closed state. LTCUAK Unit 100 or elements (i.e. Unit for Object Manipulation Using Curiosity 130, etc.) thereof may cause Automatic Lawn Mower 98*e* to perform various experimental or inquisitive manipulations of the gate Object 615*ea* or its elements (i.e. sub-objects, etc.) using curiosity including causing Automatic Lawn Mower's 98*e* robotic arm Actuator 91*e* to grip the lever and pull it down, and push the gate Object 615*ea* resulting in the gate Object's 615*ea* subsequent open state. LTCUAK Unit 100 or elements thereof may, thereby, learn that the gate Object 615*ea* can be opened when its lever is gripped and pulled down, and the gate Object 615*ea* pushed by learning one or more Instruction Sets 526 used or executed in opening the gate Object 615*aa* correlated with: one or more Collections of Object Representations 525 representing the subsequent (i.e. open, etc.) state of the gate Object 615*aa* and/or one or more Collections of Object Representations 525 representing the state (i.e. closed, etc.) of the gate Object 615*aa* before the opening. Any Extra Info 527 related to Automatic Lawn Mower's 98*e* manipulation can also optionally be learned. LTCUAK Unit 100 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 49B, Automatic Lawn Mower 98*e* in a normal mode may be operated or controlled by Device Control Program 18*a* that can cause Automatic Lawn Mower 98*e* to operate (i.e. move, maneuver, mow, etc.) in mowing grass in a yard. Automatic Lawn Mower 98*e* in the normal mode may detect a closed gate Object 615*ea* on the way to the yard. The gate Object 615*ea* may need to be opened so that Automatic Lawn Mower 98*e* can enter the yard. Device Control Program 18*a* may not know how to open the gate Object 615*ea*. LTCUAK Unit 100 or elements (i.e. Unit for Object Manipulation Using Artificial Knowledge 170, Knowledge Structure 160, etc.) thereof may include knowledge of opening the gate Object 615*ea* or another similar Object 615, which Device Control Program 18*a* may decide to use to open the gate Object 615*ea* by switching to the use of artificial knowledge mode. Automatic Lawn Mower 98*e* in the use of artificial knowledge mode may use the artificial knowledge in LTCUAK Unit 100 or elements thereof to open the gate Object 615*ea* by comparing incoming one or more Collections of Object Representations 525 representing a current state of the gate Object 615*ea* with previously learned one or more Collections of Object Representations 525 representing previously learned states of one or more Objects 615. If at least partial match is determined in a previously learned one or more Collections of Object Representations 525, Instruction Sets 526 correlated with a previously learned one or more Collections of Object Representations 525 representing a subsequent (i.e. open, etc.) state of the gate Object 615*ea* can be executed to cause Automatic Lawn Mower's 98*e* robotic arm Actuator 91*e* to grip the lever and pull it down, and push the gate Object 615*ea*, thereby effecting the gate Object's 615*ea* state of being open. Such open state of the gate Object 615*ea* may advance Automatic Lawn Mower's 98*e* mowing grass in the yard. Any previously learned Extra Info 527 related to Automatic Lawn Mower's 98*e* manipulations may also optionally be used for enhanced decision making and/or other functionalities. Once the gate Object 615*ea* is open using artificial knowledge, Automatic Lawn Mower 98*e* can return to its normal mode of being operated or controlled by Device Control Program 18*a* to enter the yard and mow grass in the yard. In some embodiments of a gate Object 615*ea* with a knob, similar to gripping a lever and pulling it down, and pushing the gate Object 615*ea*, Device 98 may grip the knob and twist/rotate it, and push the gate Object 615*ea* to open the gate Object 615*ea*.

Figure 50A:
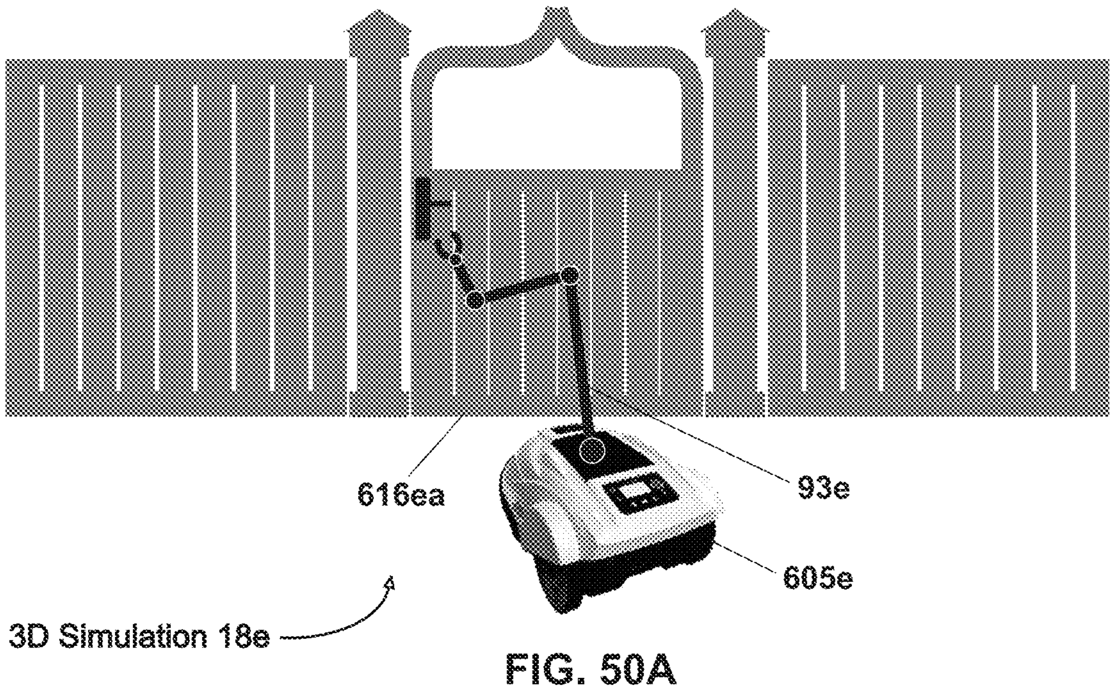
FIG. 50A-50B illustrate an exemplary embodiment of Simulated Automatic Lawn Mower 605*e* learning using curiosity and using artificial knowledge.
Figure 50B:
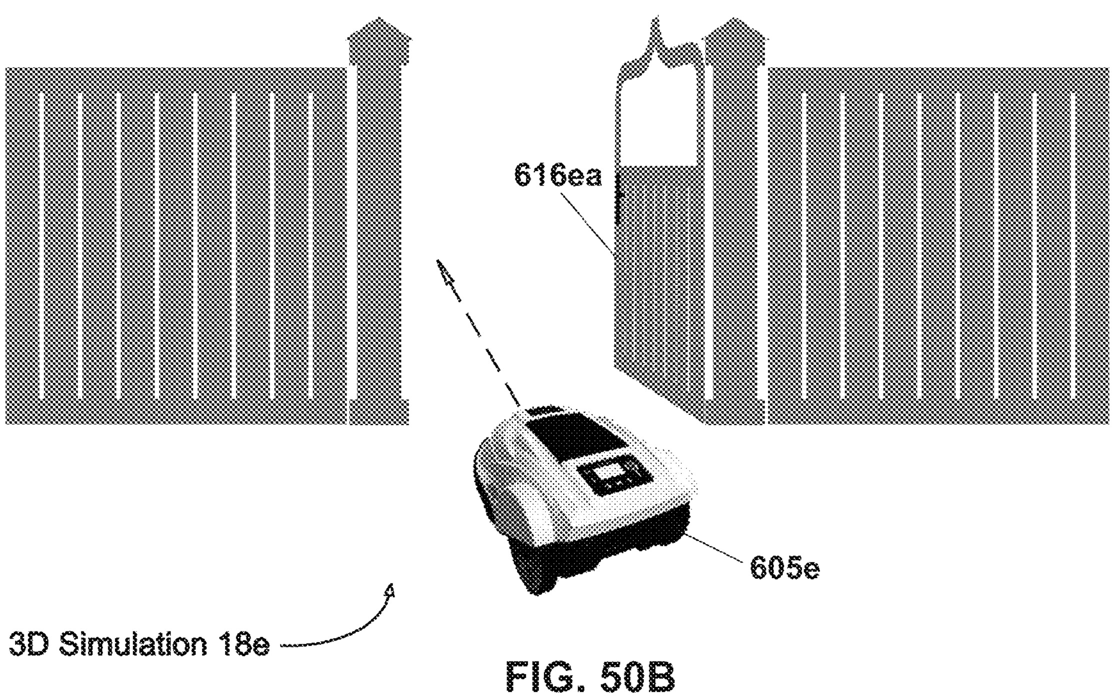

Referring to FIG. 50A-50B, in some exemplary embodiments, Application Program 18 may be or include a 3D Simulation 18*e* (i.e. robot or device simulation application, etc.). Avatar 605 may be or include Simulated Automatic Lawn Mower 605*e*. Object Processing Unit 115 may detect or obtain one or more Objects 616 or states of one or more Objects 616 in Simulated Automatic Lawn Mower's 605*e* surrounding. Object Processing Unit 115 may generate one or more Collections of Object Representations 525 representing the one or more Objects 616 or states of the one or more Objects 616. As shown for example in FIG. 50A, Simulated Automatic Lawn Mower 605*e* in a learning mode may be operated or controlled by LTCUAK Unit 100 or elements thereof to detect or obtain a simulated gate Object 616*ea* in a closed state and perform various experimental or inquisitive manipulations of the simulated gate Object 616*ea* using curiosity including using Arm 93*e* to grip the simulated lever and pull it down, and push the simulated gate Object 616*ea*, thereby learning that the simulated gate Object 616*ea* can be opened when its lever is gripped and pulled down, and the simulated gate Object 616*ea* pushed as described in the preceding exemplary embodiment with respects to Automatic Lawn Mower 98*e*, robotic arm Actuator 91*e*, gate Object 615*ea*, Device Control Program 18*a*, LTCUAK Unit 100 or elements thereof, and/or other elements. As shown for example in FIG. 50B, Simulated Automatic Lawn Mower 605*e* in a normal mode may be operated or controlled by Avatar Control Program 18*b* that can cause Simulated Automatic Lawn Mower 605*e* to operate (i.e. move, maneuver, mow, etc.) in mowing grass in a simulated yard. Simulated Automatic Lawn Mower 605*e* in a use of artificial knowledge mode may be operated or controlled by LTCUAK Unit 100 or elements thereof to open the simulated gate Object 616*ea* or another similar Object 616 that may advance Simulated Automatic Lawn Mower's 605*e* mowing grass in a simulated yard as described in the preceding exemplary embodiment with respects to Automatic Lawn Mower 98*e*, robotic arm Actuator 91*e*, gate Object 615*ea*, Device Control Program 18*a*, LTCUAK Unit 100 or elements thereof, and/or other elements.

Figure 51A:
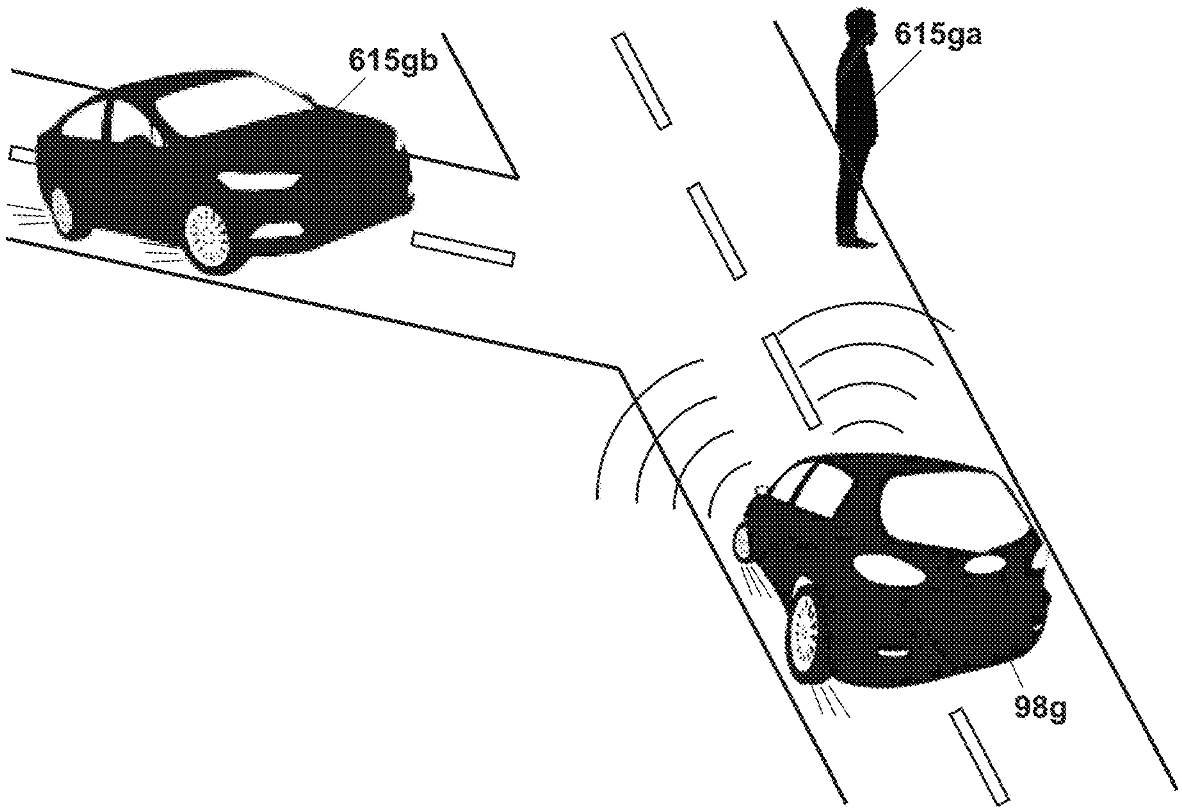
FIG. 51A-51B illustrate an exemplary embodiment of Autonomous Vehicle 98*g* learning using curiosity and using artificial knowledge.
Figure 51B:
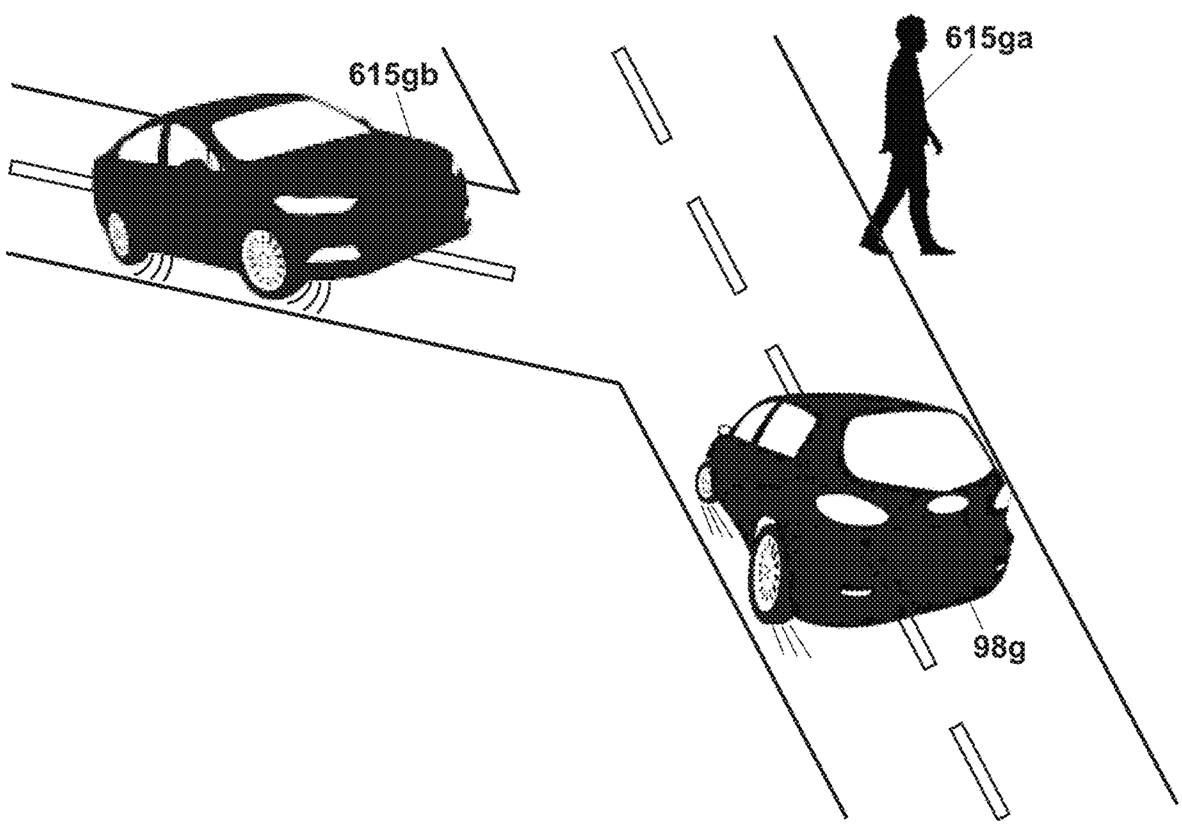

Referring to FIG. 51A-51B, in some exemplary embodiments, Device 98 may be or include Autonomous Vehicle 98*g*. Autonomous Vehicle 98*g* may include or be coupled to one or more Sensors 92 and/or Object Processing Unit 115 that can detect one or more Objects 615 or states of one or more Objects 615 in Autonomous Vehicle's 98*g* surrounding. Object Processing Unit 115 may generate one or more Collections of Object Representations 525 representing the one or more Objects 615 or states of the one or more Objects 615. As shown for example in FIG. 51A, Autonomous Vehicle 98*g* in a learning mode may detect a person Object 615*ga* on a road in a stationary state and a vehicle Object 615*gb* in a moving state. LTCUAK Unit 100 or elements (i.e. Unit for Object Manipulation Using Curiosity 130, etc.) thereof may cause Autonomous Vehicle 98*g* to perform various experimental or inquisitive manipulations of the person Object 615*ga* and/or vehicle Object 615*gb* using curiosity including causing Autonomous Vehicle's 98*g* speaker/horn (not shown) to emit a sound signal toward the person Object 615*ga* and vehicle Object 615*gb* resulting in the person Object's 615*ga* subsequent state of being moved from the road and the vehicle Object's 615*ga* subsequent state of being stationary. LTCUAK Unit 100 may, thereby, learn that the person Object 615*ga* can be moved and vehicle Object 615*gb* can be stopped when stimulated by the sound signal by learning one or more Instruction Sets 526 used or executed in emitting the sound signal correlated with: one or more Collections of Object Representations 525 representing the subsequent (i.e. moved and stationary, etc.) states of the person Object 615*ga* and vehicle Object 615*gb* and/or one or more Collections of Object Representations 525 representing the states of the person Object 615*ga* and vehicle Object 615*gb* before the emission of the sound signal. Any Extra Info 527 related to Autonomous Vehicle's 98*g* manipulation can also optionally be learned. LTCUAK Unit 100 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 51B, Autonomous Vehicle 98*g* in a normal mode may be operated or controlled by Device Control Program 18*a* that can cause Autonomous Vehicle 98*g* to operate (i.e. move, maneuver, etc.) in driving on a road. Autonomous Vehicle 98*g* in the normal mode may detect a stationary person Object 615*ga* on the road and/or moving vehicle Object 615*gb*. The person Object 615*ga* may need to move away and/or vehicle Object 615*gb* may need to stop so that Autonomous Vehicle 98*g* can drive on the road safe and/or unobstructed. Device Control Program 18*a* may not know how to get the person Object 615*ga* to move away and/or vehicle Object 615*gb* to stop. LTCUAK Unit 100 or elements (i.e. Unit for Object Manipulation Using Artificial Knowledge 170, Knowledge Structure 160, etc.) thereof may include knowledge of getting the person Object 615*ga* or another similar Object 615 to move away and/or vehicle Object 615*gb* or another similar Object 615 to stop, which Device Control Program 18*a* may decide to use to get the person Object 615*ga* to move away and/or vehicle Object 615*gb* to stop by switching to the use of artificial knowledge mode. Autonomous Vehicle 98*g* in the use of artificial knowledge mode may use the artificial knowledge in LTCUAK Unit 100 or elements thereof to get the person Object 615*ga* to move away and/or vehicle Object 615*gb* to stop by comparing incoming one or more Collections of Object Representations 525 representing current states of the person Object 615*ga* and/or vehicle Object 615*gb* with previously learned one or more Collections of Object Representations 525 representing previously learned states of one or more Objects 615. If at least partial match is determined in a previously learned one or more Collections of Object Representations 525, Instruction Sets 526 correlated with a previously learned one or more Collections of Object Representations 525 representing subsequent (i.e. moved and/or stationary, etc.) states of the person Object 615*ga* and/or vehicle Object 615*gb* can be executed to cause Autonomous Vehicle's 98*g* speaker/horn to emit the sound signal, thereby effecting the person Object's 615*ga* and/or vehicle Object's

615*cc* states of being moved away and/or stationary, respectively. Such moved away state of the person Object 615*ga* and/or stationary state of the vehicle Object 615*gb* may advance Autonomous Vehicle's 98*g* driving on the road safe and/or unobstructed. Any previously learned Extra Info 527 related to Autonomous Vehicle's 98*g* manipulations may also optionally be used for enhanced decision making and/or other functionalities. Once the person Object 615*ga* moves away and/or vehicle Object 615*gb* becomes stationary using artificial knowledge, Autonomous Vehicle 98*g* can return to its normal mode of being operated or controlled by Device Control Program 18*a* in driving on the road.

Figure 52A:
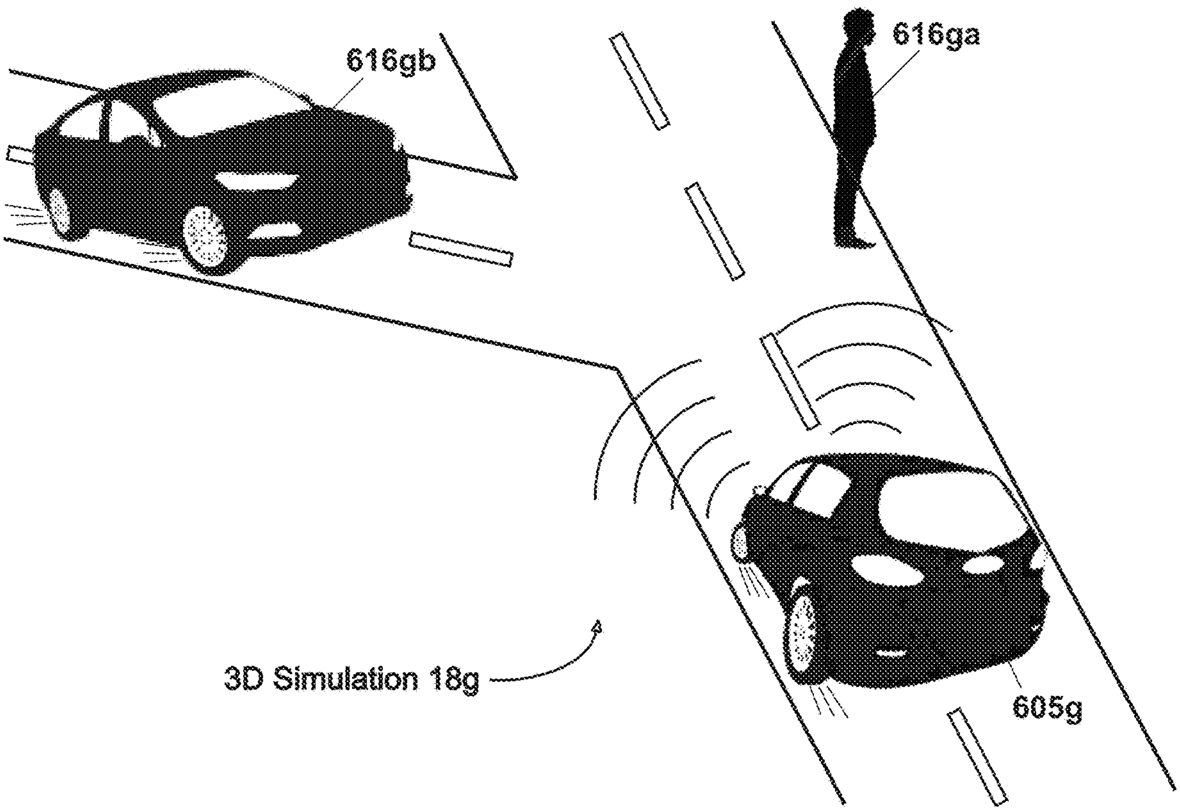
FIG. 52A-52B illustrate an exemplary embodiment of Simulated Vehicle 605*g* learning using curiosity and using artificial knowledge.
Figure 52B:
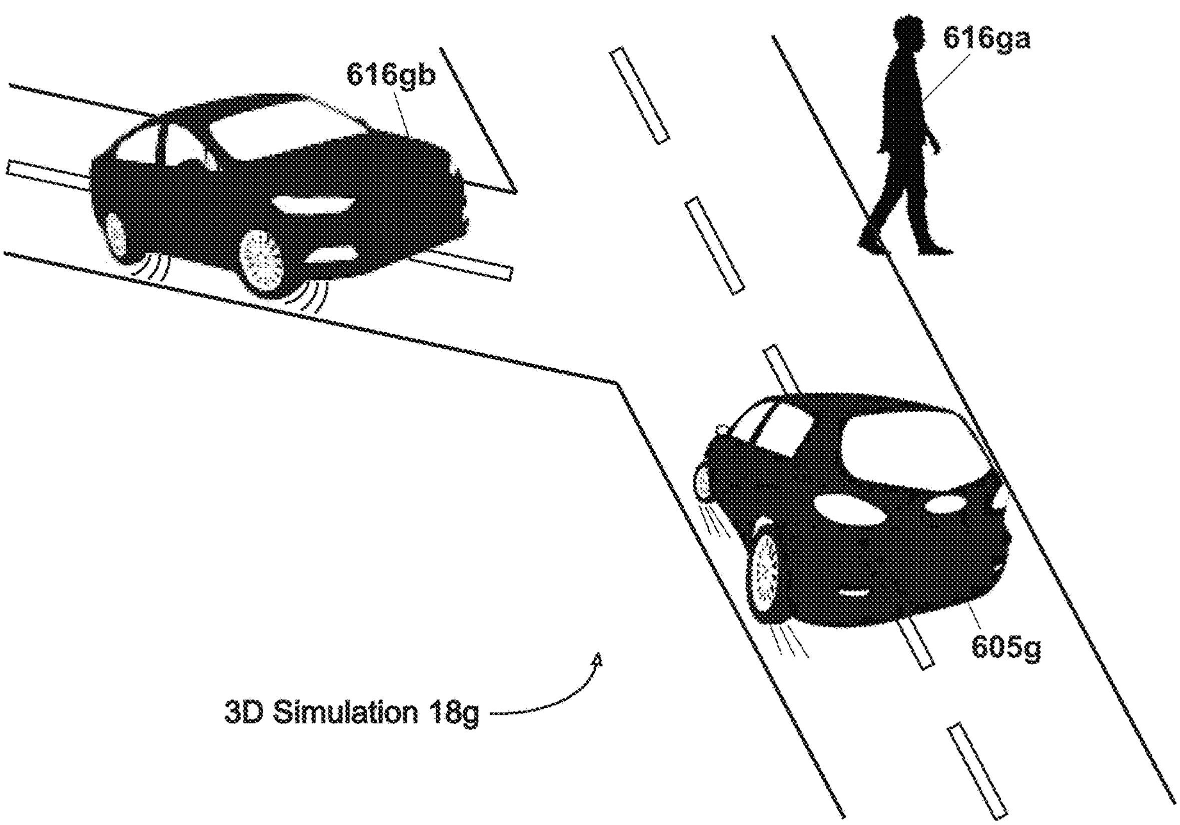

Referring to FIG. 52A-52B, in some exemplary embodiments, Application Program 18 may be or include a 3D Simulation 18*g* (i.e. vehicle simulation, etc.). Avatar 605 may be or include Simulated Vehicle 605*g*. Object Processing Unit 115 may detect or obtain one or more Objects 616 or states of one or more Objects 616 in Simulated Vehicle's 605*g* surrounding. Object Processing Unit 115 may generate one or more Collections of Object Representations 525 representing the one or more Objects 616 or states of the one or more Objects 616. As shown for example in FIG. 52A, Simulated Vehicle 605*g* in a learning mode may be operated or controlled by LTCUAK Unit 100 or elements thereof to detect or obtain a stationary simulated person Object 616*ga* on a simulated road and/or moving simulated vehicle Object 616*gb*, and perform various experimental or inquisitive manipulations of the simulated person Object 616*ga* and/or simulated vehicle Object 616*gb* using curiosity including emitting a simulated sound by a simulated horn, thereby learning that the simulated person Object 616*ga* moves away and/or simulated vehicle Object 616*gb* stops when stimulated by a simulated sound as described in the preceding exemplary embodiment with respects to Autonomous Vehicle 98*g*, speaker/horn, person Object 615*ga*, vehicle Object 615*gb*, Device Control Program 18*a*, LTCUAK Unit 100 or elements thereof, and/or other elements. As shown for example in FIG. 52B, Simulated Vehicle 605*g* in a normal mode may be operated or controlled by Avatar Control Program 18*b* that can cause Simulated Vehicle 605*g* to operate (i.e. move, maneuver, etc.) in driving on a simulated road. Simulated Vehicle 605*g* in a use of artificial knowledge mode may be operated or controlled by LTCUAK Unit 100 or elements thereof to cause the simulated person Object 616*ga* or another similar Object 616 to move away and/or simulated vehicle Object 616*gb* or another similar Object 616 to stop that may advance Simulated Vehicle's 605*g* driving on a simulated road as described in the preceding exemplary embodiment with respects to Autonomous Vehicle 98*g*, speaker/horn, person Object 615*ga*, vehicle Object 615*gb*, Device Control Program 18*a*, LTCUAK Unit 100 or elements thereof, and/or other elements.

Figure 53A:
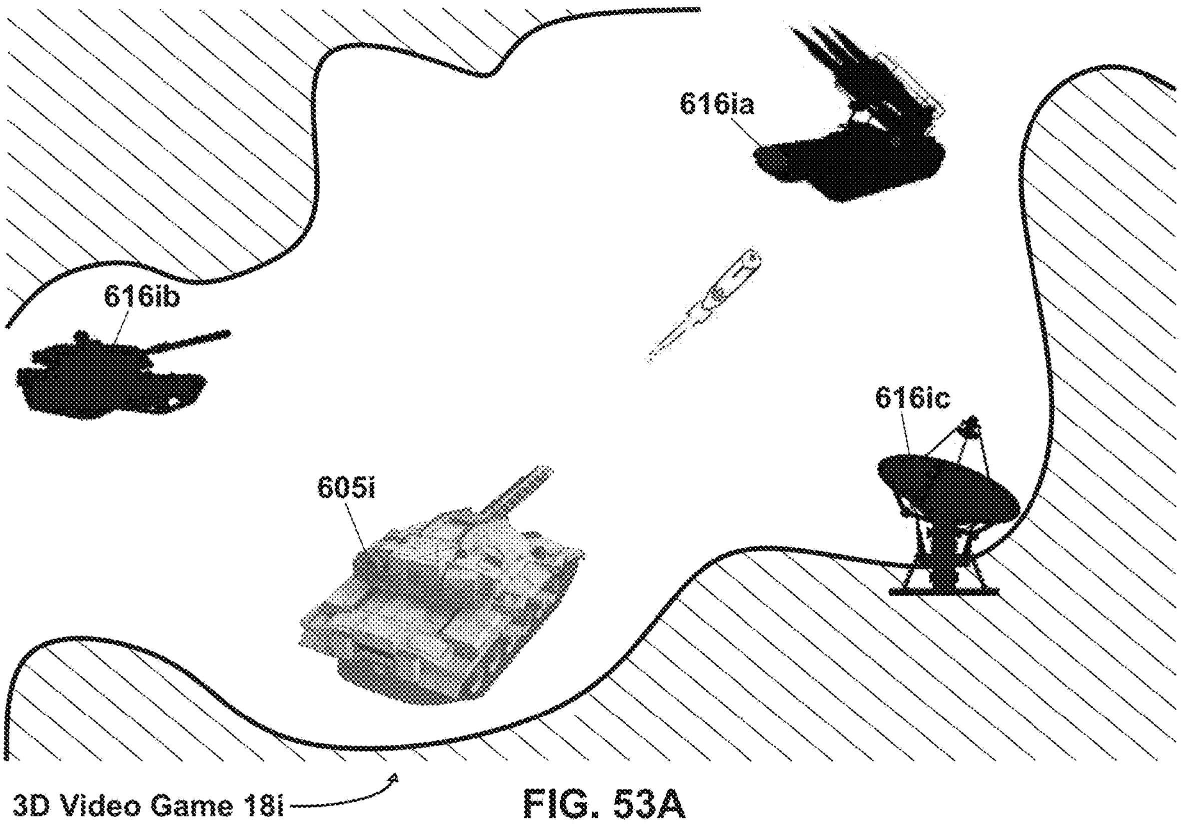
FIG. 53A-53B illustrate an exemplary embodiment of Simulated Tank 605*i* learning using curiosity and using artificial knowledge.
Figure 53B:
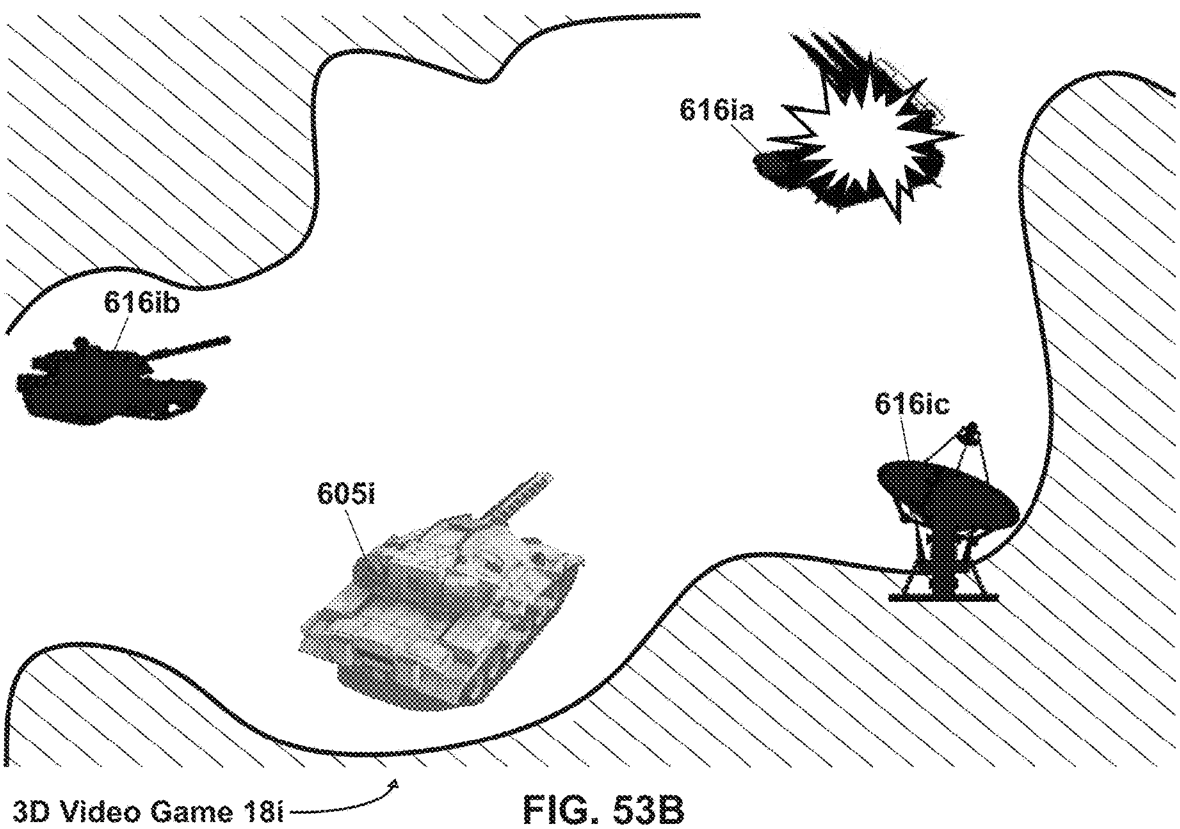

Referring to FIG. 53A-53B, in some exemplary embodiments, Application Program 18 may be or include a 3D Video Game 18*i*. Examples of 3D Video Game 18*i* include a strategy game, a driving simulation, a virtual world, a shooter game, a flight simulation, and/or others. Avatar 605 may be or include Simulated Tank 605*i*. Object Processing Unit 115 may detect or obtain one or more Objects 616 or states of one or more Objects 616 in Simulated Tank's 605*i* surrounding. Object Processing Unit 115 may generate one or more Collections of Object Representations 525 representing the one or more Objects 616 or states of the one or more Objects 616. As shown for example in FIG. 53A, Simulated Tank 605*i* in a learning mode may detect or obtain a simulated rocket launcher Object 616*ia*, a simulated tank Object 616*ib*, and a simulated communication center Object 616*ic*. LTCUAK Unit 100 or elements (i.e. Unit for Object Manipulation Using Curiosity 130, etc.) thereof may cause Simulated Tank 605*i* to perform various experimental or inquisitive manipulations of the simulated rocket launcher Object 616*ia* using curiosity including causing Simulated Tank 605*i* to shoot a projectile at the simulated rocket launcher Object 616*ia* resulting in the simulated rocket launcher Object 616*ia* being destroyed. LTCUAK Unit 100 or elements thereof may, thereby, learn that the simulated rocket launcher Object 616*ia* can be destroyed by learning one or more Instruction Sets 526 used or executed in shooting the projectile at the simulated rocket launcher Object 616*ia* correlated with: one or more Collections of Object Representations 525 representing the subsequent (i.e. destroyed, etc.) state of the simulated rocket launcher Object 616*ia* and/or one or more Collections of Object Representations 525 representing the state of the simulated rocket launcher Object 616*ia* before being hit by the projectile. Any Extra Info 527 related to Simulated Tank's 605*i* manipulation can also optionally be learned. LTCUAK Unit 100 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 53B, Simulated Tank 605*i* in a normal mode may be operated or controlled by Avatar Control Program 18*b* that can cause Simulated Tank 605*i* to operate (i.e. move, maneuver, shoot, etc.) in patrolling an area. Simulated Tank 605*i* in the normal mode may detect or obtain a simulated rocket launcher Object 616*ia*. The simulated rocket launcher Object 616*ia* may need to be destroyed. Avatar Control Program 18*b* may not know how to destroy the simulated rocket launcher Object 616*ia*. LTCUAK Unit 100 or elements (i.e. Unit for Object Manipulation Using Artificial Knowledge 170, Knowledge Structure 160, etc.) thereof may include knowledge of destroying the simulated rocket launcher Object 616*ia* or another similar Object 616, which Avatar Control Program 18*b* may decide to use to destroy the simulated rocket launcher Object 616*ia* by switching to the use of artificial knowledge mode. Simulated Tank 605*i* in the use of artificial knowledge mode may use the artificial knowledge in LTCUAK Unit 100 or elements thereof to destroy the simulated rocket launcher Object 616*ia* by comparing incoming one or more Collections of Object Representations 525 representing a current state of the simulated rocket launcher Object 616*ia* with previously learned one or more Collections of Object Representations 525 representing previously learned states of one or more Objects 616. If at least partial match is determined in a previously learned one or more Collections of Object Representations 525, Instruction Sets 526 correlated with a previously learned one or more Collections of Object Representations 525 representing a subsequent (i.e. destroyed, etc.) state of the simulated rocket launcher Object 616*ia* can be executed to cause Simulated Tank 605*i* to shoot a projectile at the simulated rocket launcher Object 616*ia*, thereby effecting the simulated rocket launcher Object's 616*ia* state of being destroyed. Such destroyed state of the simulated rocket launcher Object 616*ia* may advance Simulated Tank's 605*i* destroying opponent Objects 616. Any previously learned Extra Info 527 related to Simulated Tank's 605*i* manipulations may also optionally be used for enhanced decision making and/or other functionalities. In some embodiments, once the simulated rocket launcher Object 616*ia* is destroyed using artificial knowledge, Simulated Tank 605*i* can proceed with destroying other opponent Objects 616 such as simulated tank Object

616*ib* and/or simulated communication center Object 616*ic*. In other embodiments, once the simulated rocket launcher Object 616*ia* is destroyed using artificial knowledge, Simulated Tank 605*i* can return to its normal mode of being operated or controlled by Avatar Control Program 18*b* to patrol the area. In some aspects, the projectile itself may be an Object 616, be represented by one or more Collections of Object Representations 525 or elements (i.e. one or more Object Representations 625, etc.) thereof, and/or be part of the learning and/or other functionalities. Any features, functionalities, and/or embodiments described with respect to Simulated Tank 605*i*, simulated projectile, simulated rocket launcher Object 616*ia*, simulated tank Object 616*ib*, simulated communication center Object 616*ic*, and/or other simulated elements in the aforementioned simulation example may similarly apply to physical tanks, physical projectile, physical rocket launcher, physical communication center, and/or other physical elements in a physical world example.

In some aspects, similar features, functionalities, and/or embodiments described with respect to Automatic Vacuum Cleaner 98*c*, Automatic Lawn Mower 98*e*, Autonomous Vehicle 98*g*, and/or other Devices 98 as well as Simulated Automatic Vacuum Cleaner 605*c*, Simulated Automatic Lawn Mower 605*e*, Simulated Vehicle 605*g*, Simulated Tank 605*i*, and/or other Avatars 605 can be realized in many other Devices 98, Avatars 605, and/or applications some examples of which are the following. In one example, LTCUAK-enabled Device 98 or LTCUAK-enabled Avatar 605 may learn that gripping an edge of a sliding door Object 615 (not shown) or Object 616 (not shown) and pulling the door Object 615 or Object 616 results in the door Object 615 or Object 616 opening (i.e. similar to a cat learning to grip an edge of a sliding door by its paw and pulling the door to open it, etc.). Similarly, LTCUAK-enabled Device 98 or LTCUAK-enabled Avatar 605 may learn that gripping and pulling a knob of a drawer Object 615 (not shown) or Object 616 (not shown) results in the drawer Object 615 or Object 616 opening. In another example, LTCUAK-enabled Device 98 or LTCUAK-enabled Avatar 605 may learn that, when in need of going through a closed door Object 615 (not shown) or Object 616 (not shown), emitting a sound results in a person or other device coming and opening the door Object 615 or Object 616 (i.e. similar to a cat meowing to have a door open for the cat, etc.). In a further example, LTCUAK-enabled Device 98 or LTCUAK-enabled Avatar 605 may learn that pushing a pet door Object 615 (not shown) or Object 616 (not shown) results in the pet door Object 615 or Object 616 opening (i.e. similar to a cat learning to push a pet door to open it, etc.). In a further example, LTCUAK-enabled Device 98 or LTCUAK-enabled Avatar 605 may learn that pushing a ball, chair, box, and/or other Object 615 (not shown) or Object 616 (not shown) results in the ball, chair, box, and/or other Object 615 or Object 616 rolling or moving in the direction of being pushed. In another example, LTCUAK-enabled Device 98 or LTCUAK-enabled Avatar 605 may learn that pushing, squeezing, and/or performing other manipulations of a pillow Object 615 (not shown) or Object 616 (not shown) results in the pillow Object 615 or Object 616 caving in or deforming. In a further example, LTCUAK-enabled Device 98 or LTCUAK-enabled Avatar 605 may learn that pushing one or more Objects 615 or one or more Objects 616 of a system of Objects 615 or Objects 616 results in one or more Objects 615 or one or more Objects 616 of the system moving and interacting with each other. Specifically, for instance, LTCUAK-enabled Device 98 or LTCUAK-enabled Avatar 605 may learn that pushing one of three aligned toy Objects 615 or Objects 616 results in the three toy Objects 615 or Objects 616 pushing each other and moving in the direction of being pushed. In a further example, LTCUAK-enabled Device 98 or LTCUAK-enabled Avatar 605 may learn that dropping a toy Object 615 or Object 616 results in the toy Object 615 or Object 616 falling on the ground. Similarly, LTCUAK-enabled Device 98 or LTCUAK-enabled Avatar 605 may learn that dropping a ball Object 615 or Object 616 results in the ball Object 615 or Object 616 bouncing off the ground. In a further example, LTCUAK-enabled Device 98 (i.e. artificial pet configured to entertain people, etc.) or LTCUAK-enabled Avatar 605 may learn that rolling on a floor, lifting a paw, and/or performing other tricks near one or more person Objects 615 or Objects 616 results in the one or more person Objects 615 or Objects 616 becoming joyful or smiling. In a further example, LTCUAK-enabled Device 98 or LTCUAK-enabled Avatar 605 may learn that compressing a spring Object 615 (not shown) or Object 616 (not shown) results in the spring contracting. Similarly, LTCUAK-enabled Device 98 or LTCUAK-enabled Avatar 605 may learn that releasing a compressed spring Object 615 or Object 616 results in the spring expanding. In a further example, LTCUAK-enabled Device 98 or LTCUAK-enabled Avatar 605 (i.e. pest control device, etc.) may learn that stimulating a pest Object 615 or Object 616 (i.e. bug, rat, etc.; not shown) with an electric charge results in the pest Object 615 or Object 616 moving/running away. In a further example, LTCUAK-enabled Device 98 or LTCUAK-enabled Avatar 605 (i.e. assembly machine, etc.) may learn that stimulating a metal Object 615 (not shown) or Object 616 (not shown) with a magnetic field (i.e. using electromagnet, etc.) results in the metal Object 615 or Object 616 being pulled toward and/or attached to Device 98 or Avatar 605. In a further example, LTCUAK-enabled Device 98 or LTCUAK-enabled Avatar 605 may learn that illuminating an Object 615 or Object 616 with light results in the Object 615 or Object 616 becoming visible or more visible. In a further example, LTCUAK-enabled Device 98 or Object 616 (i.e. mine defusing machine, etc.) may learn that touching a mine Object 615 (not shown) or Object 616 (not shown) or parts thereof results in the mine exploding. Assuming that the exploding mine Object 615 or Object 616 destroys the mine defusing machine, the knowledge of the touching manipulation resulting in the exploding mine Object 615 or Object 616 can be stored on Server 96 making the knowledge available to multiple mine defusing machines even after the mine defusing machine is destroyed. Similarly, LTCUAK-enabled Device 98 or LTCUAK-enabled Avatar 605 (i.e. mine defusing machine, etc.) may learn that inserting a pin into a certain part of a mine Object 615 or Object 616 results in the mine Object 615 defusing. In a further example, LTCUAK-enabled Device 98 or LTCUAK-enabled Avatar 605 may learn that moving on a road Object 615 (not shown) or Object 616 (not shown) results in the road Object 615 or Object 616 advancing. Similarly, LTCUAK-enabled Device 98 or LTCUAK-enabled Avatar 605 may learn that climbing a stair of a stairway Object 615 (not shown) or Object 616 (not shown) results in the stairway Object 615 or Object 616 advancing. In a further example where one Object 615 or Object 616 controls or affects another Object 615 or Object 616, LTCUAK-enabled Device 98 or LTCUAK-enabled Avatar 605 may learn that manipulating one Object 615 or Object 616 results in another Object 615 or Object 616 changing its state. Specifically, for instance, LTCUAK-enabled Device 98 or LTCUAK-enabled Avatar 605 may learn that pressing or moving a switch Object 615 (not shown) or Object 616 (not shown) results in a light bulb Object 615 (not shown) or Object 616 (not shown) lighting up. In another instance, LTCUAK-enabled Device 98 or LTCUAK-enabled Avatar 605 may learn that twisting/rotating a valve Object 615 (not shown) or Object 616 (not shown) on a faucet Object 615 (not shown) or Object 616 (not shown) results in the faucet Object 615 or Object 616 opening up. In a further example where Device 98 or Avatar 605 itself is treated as an Object 615 or Object 616, LTCUAK-enabled Device 98 or LTCUAK-enabled Avatar 605 may learn that emitting a sound signal results in Device 98 or Avatar 605 changing its state. Specifically, for instance, LTCUAK-enabled Device 98 or LTCUAK-enabled Avatar 605 may learn that, when in need of maintenance, emitting a sound signal results in a person or other device coming and performing maintenance on Device 98 or Avatar 605 (i.e. similar to a baby crying to be fed or cleaned, etc.). In general, LTCUAK-enabled Device 98 or LTCUAK-enabled Avatar 605 may use this functionality when in need of any assistance. In a further instance, LTCUAK-enabled Device 98 or LTCUAK-enabled Avatar 605 may learn that moving over an edge Object 615 or Object 616 (i.e. of a stairway, etc.; not shown) results in Device 98 or Avatar 605 falling over the edge Object 615 or Object 616. In a further example of Objects 615 or Objects 616 that do not change states in response to certain manipulations, LTCUAK-enabled Device 98 or LTCUAK-enabled Avatar 605 may learn that manipulating an Object 615 or Object 616 results in the Object 615 or Object 616 not changing its state. Specifically, for instance, LTCUAK-enabled Device 98 or LTCUAK-enabled Avatar 605 may learn that touching, pushing, and/or performing other manipulations of a wall or other rigid/immobile Object 615 (not shown) or Object 616 (not shown) results in the wall or other rigid/immobile Object 615 or Object 616 not changing its state (i.e. not moving, not deforming, not opening, etc.).

Figure 54A:
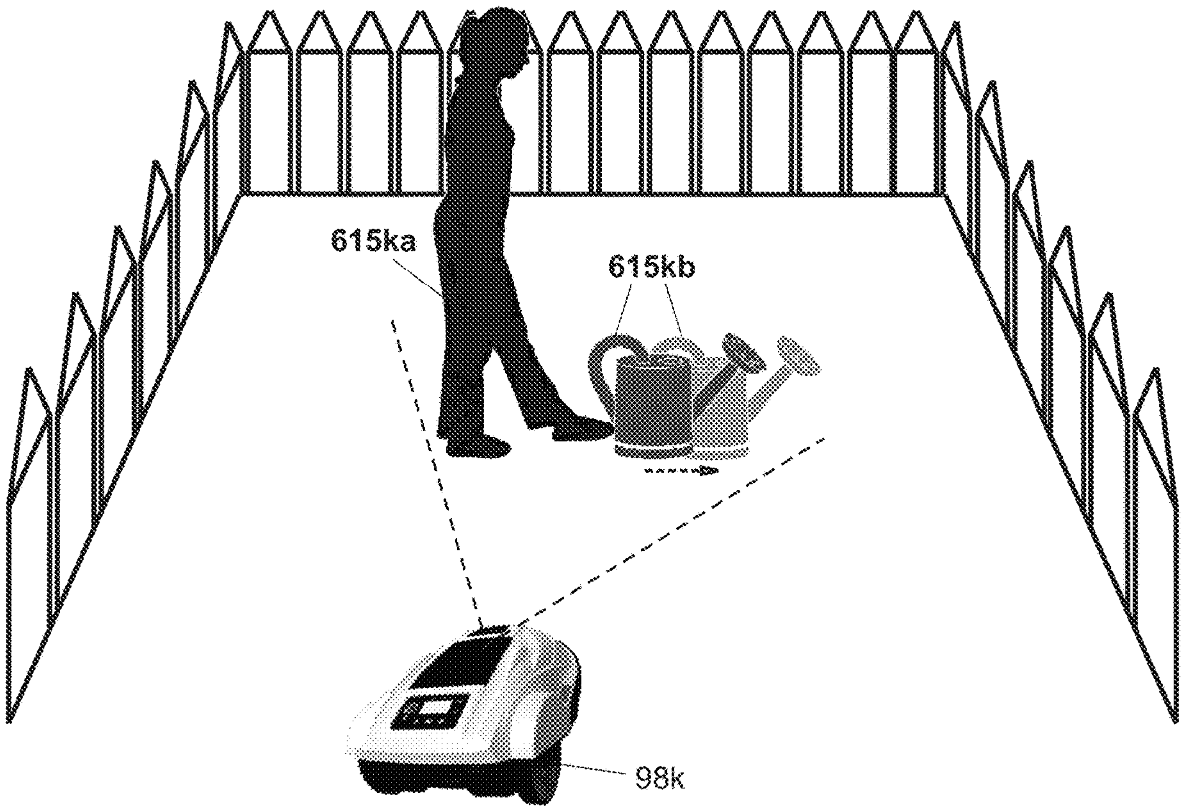
FIG. 54A-54B illustrate an exemplary embodiment of Automatic Lawn Mower 98*k* learning through observation and using artificial knowledge.
Figure 54B:
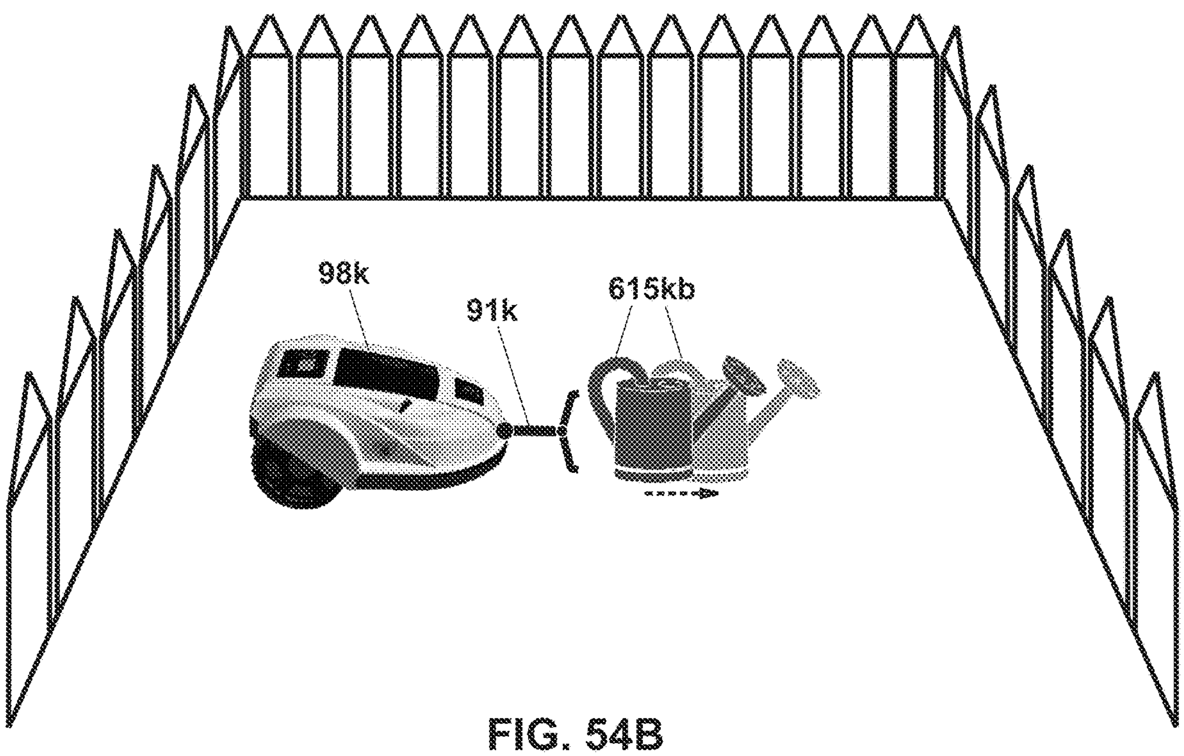

Referring to FIG. 54A-54B, in some exemplary embodiments, Device 98 may be or include Automatic Lawn Mower 98*k*. Automatic Lawn Mower 98*k* may include or be coupled to one or more Sensors 92 and/or Object Processing Unit 115 that can detect one or more Objects 615 or states of one or more Objects 615 in Automatic Lawn Mower's 98*k* surrounding. Object Processing Unit 115 may generate one or more Collections of Object Representations 525 representing the one or more Objects 615 or states of the one or more Objects 615. As shown for example in FIG. 54A, Automatic Lawn Mower 98*k* in a learning mode may detect a person Object 615*ka* and a watering can Object 615 kb. LTOUAK Unit 105 or elements (i.e. Unit for Observing Object Manipulation 135, etc.) thereof may cause Automatic Lawn Mower 98*k* to observe (i.e. as indicated by the dashed lines, etc.) the person Object's 615*ka* push manipulation of the watering can Object 615 kb resulting in the watering can Object 615 kb moving (i.e. as indicated by the dashed arrow, etc.) to a subsequent moved state. LTOUAK Unit 105 or elements thereof may determine one or more Instruction Sets 526 that can be used or executed to cause Automatic Lawn Mower 98*k* to perform the pushing of the watering can Object 615 kb. LTOUAK Unit 105 or elements thereof may, thereby, learn that the watering can Object 615 kb can be moved when pushed by learning one or more Instruction Sets 526 that can be used or executed to cause Automatic Lawn Mower 98*k* to push the watering can Object 615 kb correlated with: one or more Collections of Object Representations 525 representing the subsequent (i.e. moved, etc.) state of the watering can Object 615 kb and/or one or more Collections of Object Representations 525 representing the state of the watering can Object 615 kb before the move. Any Extra Info 527 related to the manipulation of the watering can Object 615 kb can also optionally be learned. LTOUAK Unit 105 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 54B, Automatic Lawn Mower 98*k* in a normal mode may be operated or controlled by Device Control Program 18*a* that can cause Automatic Lawn Mower 98*k* to operate (i.e. move, maneuver, mow, etc.) in mowing grass in a yard. Automatic Lawn Mower 98*k* in the normal mode may detect a watering can Object 615 kb. The watering can Object 615 kb may need to be moved so that Automatic Lawn Mower 98*k* can mow grass at the place where the watering can Object 615 kb resides. Device Control Program 18*a* may not know how to move the watering can Object 615 kb. LTOUAK Unit 105 or elements (i.e. Unit for Object Manipulation Using Artificial Knowledge 170, Knowledge Structure 160, etc.) thereof may include knowledge of moving a watering can Object 615 kb or another similar Object 615, which Device Control Program 18*a* may decide to use to move the watering can Object 615 kb by switching to the use of artificial knowledge mode. Automatic Lawn Mower 98*k* in the use of artificial knowledge mode may use the artificial knowledge in LTOUAK Unit 105 or elements thereof to move the watering can Object 615 kb by comparing incoming one or more Collections of Object Representations 525 representing a current state of the watering can Object 615 kb with previously learned one or more Collections of Object Representations 525 representing previously learned states of one or more Objects 615. If at least partial match is determined in previously learned one or more Collections of Object Representations 525, Instruction Sets 526 correlated with previously learned one or more Collections of Object Representations 525 representing a subsequent (i.e. moved, etc.) state of the watering can Object 615 kb can be executed to cause Automatic Lawn Mower's 98*k* robotic arm Actuator 91*k* to push the watering can Object 615 kb (i.e. as indicated by the dashed arrow, etc.), thereby effecting the watering can Object's 615 kb state of being moved. Such moved state of the watering can Object 615 kb may advance Automatic Lawn Mower's 98*k* mowing grass in the yard. Any previously learned Extra Info 527 related to manipulations of a watering can Object 615 kb may also optionally be used for enhanced decision making and/or other functionalities. Once the watering can Object 615 kb is moved using artificial knowledge, Automatic Lawn Mower 98*k* can return to its normal mode of being operated or controlled by Device Control Program 18*a* to mow grass at the place where the watering can Object 615 kb resided prior to being moved and/or mow grass in the rest of the yard. In some aspects, Automatic Lawn Mover 98*k* may push the watering can Object 615 kb by its body in which case robotic arm Actuator 91*k* can be optionally omitted.

Figure 55A:
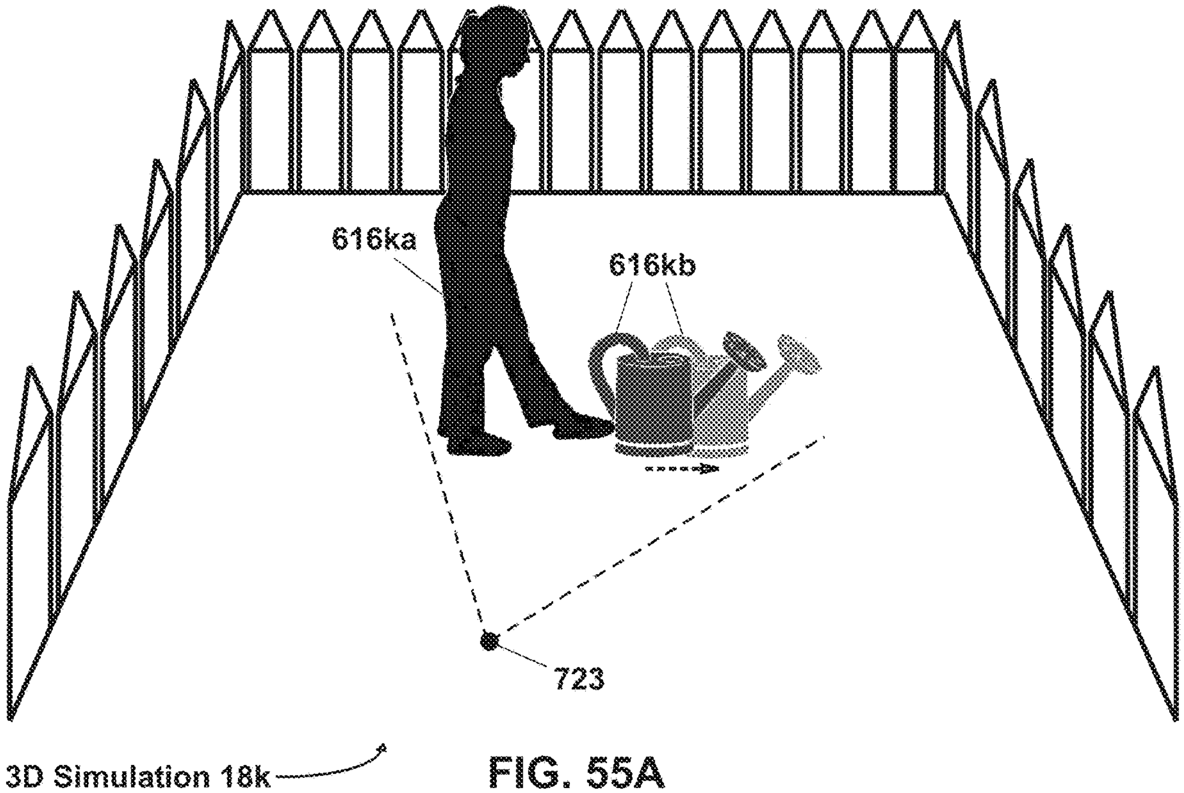
FIG. 55A-55B illustrate an exemplary embodiment of learning through observation in 3D Simulation 18*k* and Simulated Automatic Lawn Mower 605*k* using artificial knowledge.
Figure 55B:
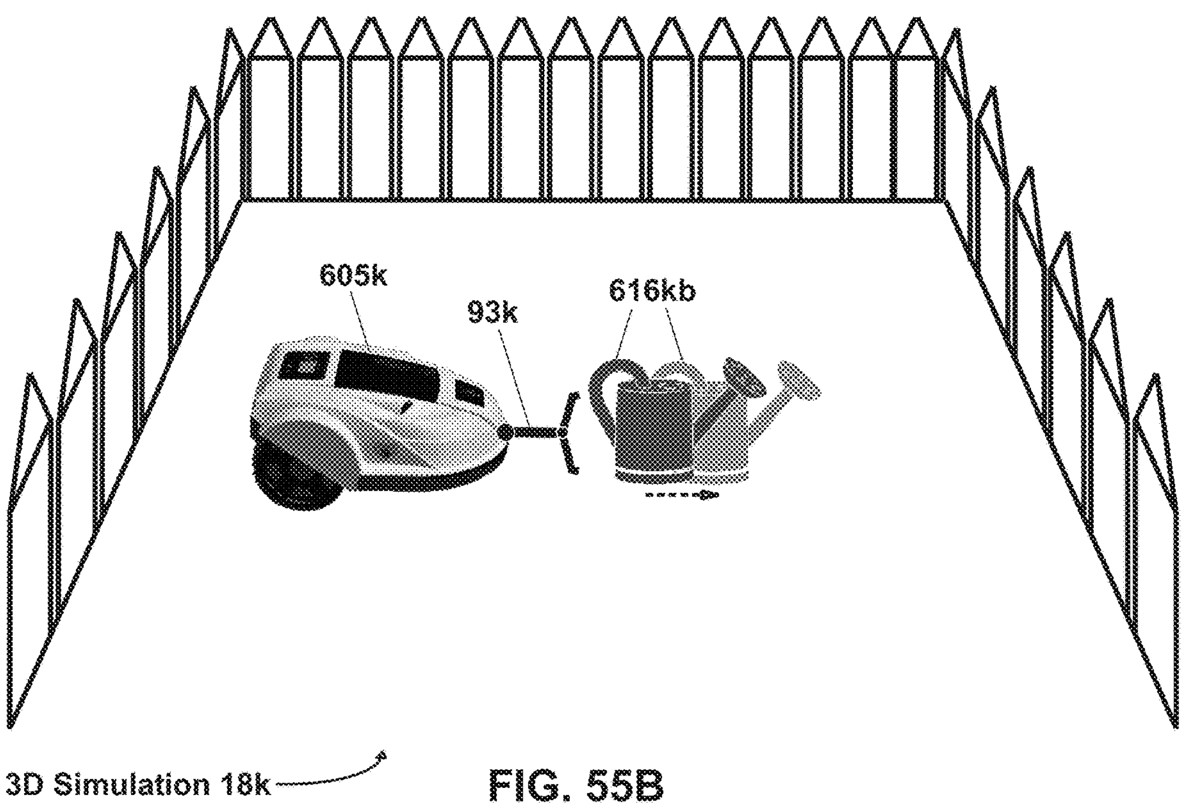

Referring to FIG. 55A-55B, in some exemplary embodiments, Application Program 18 may be or include 3D Simulation 18*k* (i.e. robot or device simulation application, etc.). Avatar 605 may be or include Simulated Automatic Lawn Mower 605*k*. Object Processing Unit 115 may detect or obtain one or more Objects 616 or states of one or more Objects 616 in 3D Simulation 18*k*. Object Processing Unit 115 may generate one or more Collections of Object Representations 525 representing the one or more Objects 616 or states of the one or more Objects 616. As shown for example in FIG. 55A, LTOUAK Unit 105 or elements thereof in a learning mode may position Observation Point 723 to observe a simulated person Object's 616*ka* push manipulation of a simulated watering can Object 616 kb resulting in the simulated watering can Object 616 kb moving to a subsequent moved state, thereby learning that the simulated watering can Object 616 kb can be moved when pushed as described in the preceding exemplary embodiment with respects to Automatic Lawn Mower 98*k*, person Object 615*ka*, watering can Object 615 kb, LTOUAK Unit 105 or elements thereof, and/or other elements. As shown for example in FIG. 55B, Simulated Automatic Lawn Mower 605*k* in a normal mode may be operated or controlled by Avatar Control Program 18*b* that can cause Simulated Automatic Lawn Mower 605*k* to operate (i.e. move, maneuver, mow, etc.) in mowing grass in a simulated yard. Simulated Automatic Lawn Mower 605*k* in a use of artificial knowledge mode may be operated or controlled by LTOUAK Unit 105 or elements thereof to move the simulated watering can Object 616 kb or another similar Object 616 that may advance Simulated Automatic Lawn Mower's 605*k* mowing grass in a simulated yard as described in the preceding exemplary embodiment with respects to Automatic Lawn Mower 98*k*, robotic arm Actuator 91*k*, person Object 615*ka*, watering can Object 615 kb, Device Control Program 18*a*, LTOUAK Unit 105 or elements thereof, and/or other elements.

Figure 56A:
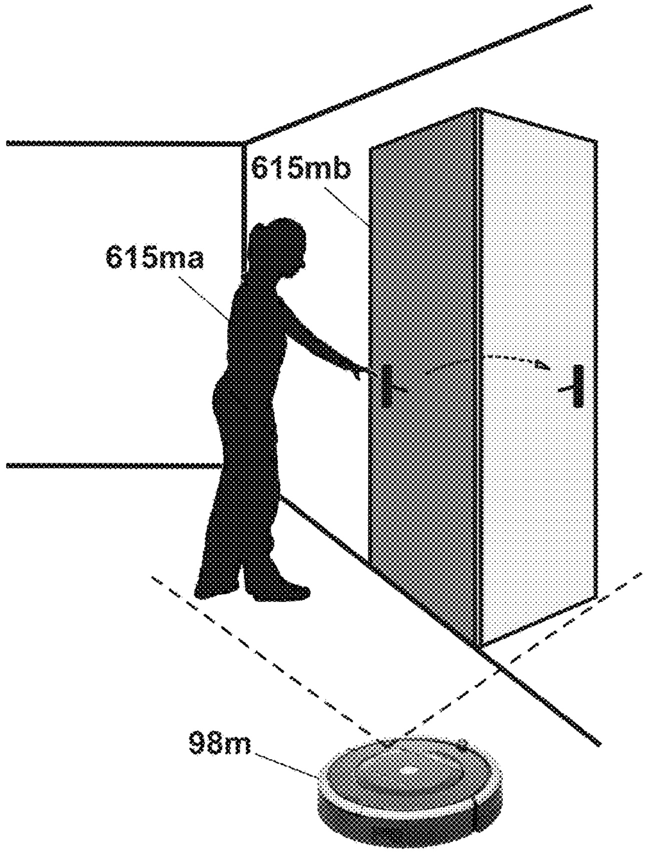
FIG. 56A-56B illustrate an exemplary embodiment of Automatic Vacuum Cleaner 98*m* learning through observation and using artificial knowledge.
Figure 56B:
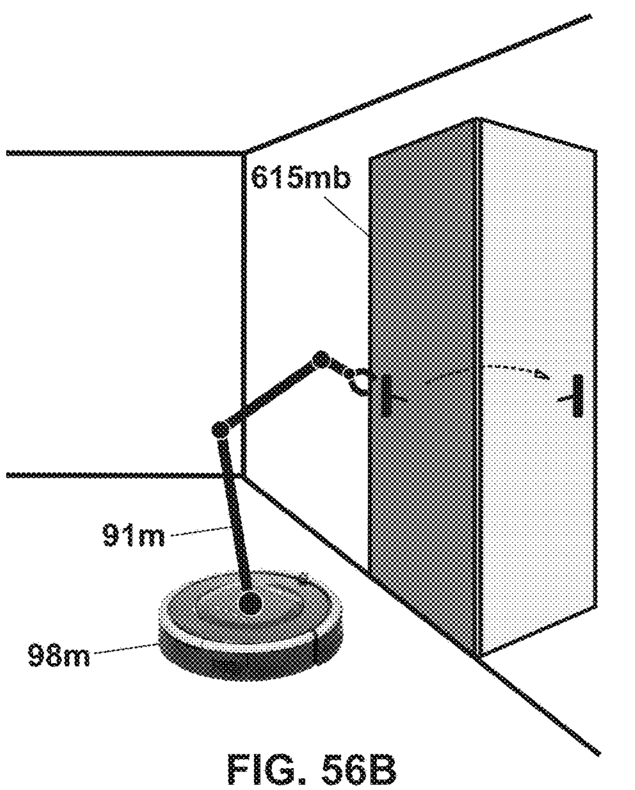

Referring to FIG. 56A-56B, in some exemplary embodiments, Device 98 may be or include Automatic Vacuum Cleaner 98*m*. Automatic Vacuum Cleaner 98*m* may include or be coupled to one or more Sensors 92 and/or Object Processing Unit 115 that can detect one or more Objects 615 or states of one or more Objects 615 in Automatic Vacuum Cleaner's 98*m* surrounding. Object Processing Unit 115 may generate one or more Collections of Object Representations 525 representing the one or more Objects 615 or states of the one or more Objects 615. As shown for example in FIG. 56A, Automatic Vacuum Cleaner 98*m* in a learning mode may detect a person Object 615*ma* and a door Object 615*mb* in a closed state. LTOUAK Unit 105 or elements (i.e. Unit for Observing Object Manipulation 135, etc.) thereof may cause Automatic Vacuum Cleaner 98*m* to observe (i.e. as indicated by the dashed lines, etc.) the person Object 615*ma* grip and pull down the lever of the door Object 615*mb* and push the door Object 615*mb* (i.e. as indicated by the dashed arrow, etc.) resulting in the door Object's 615*mb* subsequent open state. LTOUAK Unit 105 or elements thereof may determine one or more Instruction Sets 526 that can be used or executed to cause Automatic Vacuum Cleaner 98*m* to perform the gripping and pulling down the lever of the door Object 615*mb* and pushing the door Object 615*mb*. LTOUAK Unit 105 or elements thereof may, thereby, learn that the door Object 615*mb* can be opened when its lever is gripped and pulled down and the door Object 615*mb* is pushed by learning one or more Instruction Sets 526 that can be used or executed to cause Automatic Vacuum Cleaner 98*m* to open the door Object 615*mb* correlated with: one or more Collections of Object Representations 525 representing the subsequent (i.e. open, etc.) state of the door Object 615*mb* and/or one or more Collections of Object Representations 525 representing the state (i.e. closed, etc.) of the door Object 615*mb* before the opening. Any Extra Info 527 related to the manipulation of the door Object 615*mb* can also optionally be learned. LTOUAK Unit 105 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 56B, Automatic Vacuum Cleaner 98*m* in a normal mode may be operated or controlled by Device Control Program 18*a* that can cause Automatic Vacuum Cleaner 98*m* to operate (i.e. move, maneuver, suction, etc.) in vacuuming a room. Automatic Vacuum Cleaner 98*m* in the normal mode may detect a closed door Object 615*mb* on the way to the room. The door Object 615*mb* may need to be opened so that Automatic Vacuum Cleaner 98*m* can enter the room. Device Control Program 18*a* may not know how to open the door Object 615*mb*. LTOUAK Unit 105 or elements (i.e. Unit for Object Manipulation Using Artificial Knowledge 170, Knowledge Structure 160, etc.) thereof may include knowledge of opening the door Object 615*mb* or another similar Object 615, which Device Control Program 18*a* may decide to use to open the door Object 615*mb* by switching to the use of artificial knowledge mode. Automatic Vacuum Cleaner 98*m* in the use of artificial knowledge mode may use the artificial knowledge in LTOUAK Unit 105 or elements thereof to open the door Object 615*mb* by comparing incoming one or more Collections of Object Representations 525 representing a current state of the door Object 615*mb* with previously learned one or more Collections of Object Representations 525 representing previously learned states of one or more Objects 615. If at least partial match is determined in previously learned one or more Collections of Object Representations 525, Instruction Sets 526 correlated with previously learned one or more Collections of Object Representations 525 representing a subsequent (i.e. open, etc.) state of the door Object 615*mb* can be executed to cause Automatic Vacuum Cleaner's 98*m* robotic arm Actuator 91*b* to grip and pull down the lever of the door Object 615*mb* and push the door Object 615*mb*, thereby effecting the door Object's 615*mb* state of being open. Such open state of the door Object 615*mb* may advance Automatic Vacuum Cleaner's 98*m* vacuuming the room. Any previously learned Extra Info 527 related to manipulations of a door Object 615*mb* may also optionally be used for enhanced decision making and/or other functionalities. Once the door Object 615*mb* is open using artificial knowledge, Automatic Vacuum Cleaner 98*m* can return to its normal mode of being operated or controlled by Device Control Program 18*a* to enter the room and vacuum the room. In some embodiments of a door Object 615*mb* with a knob, similar to gripping and pulling down a lever of the door Object 615*mb* and pushing the door Object 615*mb*, Automatic Vacuum Cleaner 98*m* may grip and twist/rotate the knob of the door Object 615*mb* and push the door Object 615*mb* to open the door Object 615*mb*.

Figure 57A:
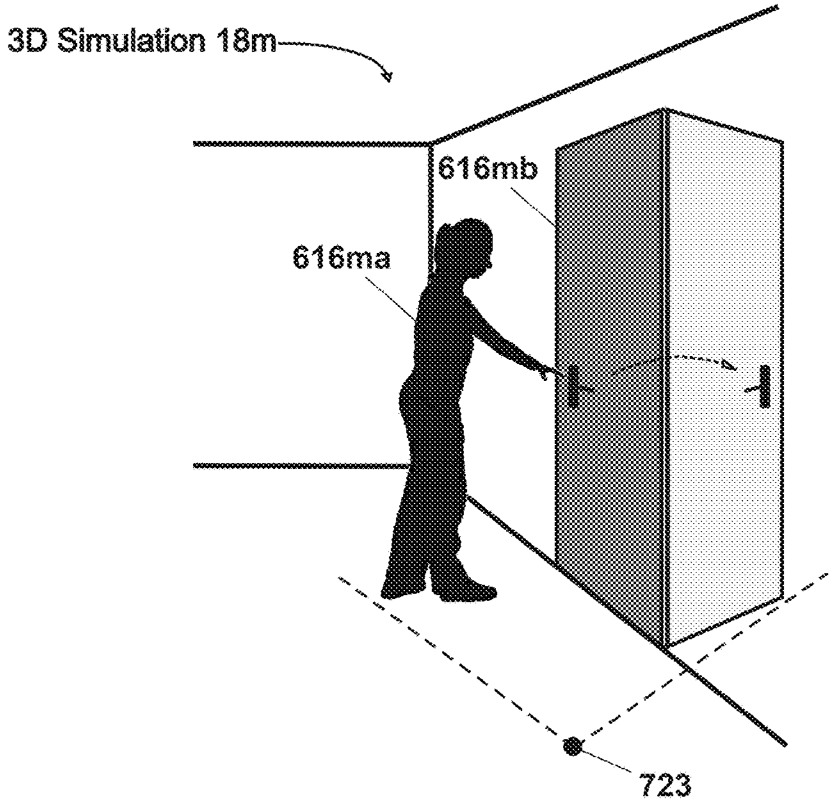
FIG. 57A-57B illustrate an exemplary embodiment of learning through observation in 3D Simulation 18*m* and Simulated Automatic Vacuum Cleaner 605*m* using artificial knowledge.
Figure 57B:
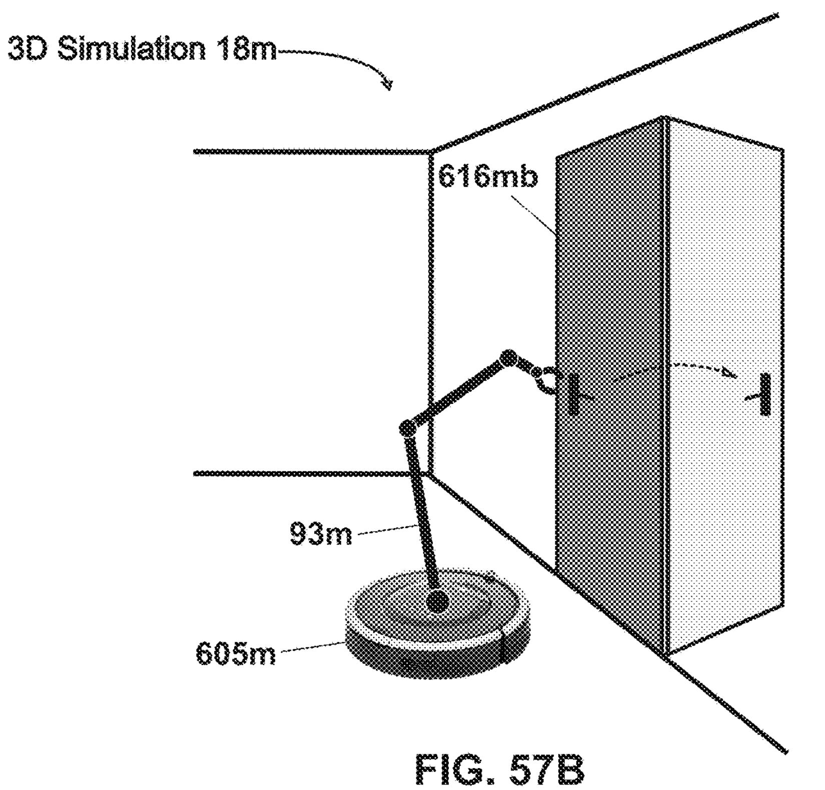

Referring to FIG. 57A-57B, in some exemplary embodiments, Application Program 18 may be or include 3D Simulation 18*m* (i.e. robot or device simulation application, etc.). Avatar 605 may be or include Simulated Automatic Vacuum Cleaner 605*m*. Object Processing Unit 115 may detect or obtain one or more Objects 616 or states of one or more Objects 616 in 3D Simulation 18*m*. Object Processing Unit 115 may generate one or more Collections of Object Representations 525 representing the one or more Objects 616 or states of the one or more Objects 616. As shown for example in FIG. 57A, LTOUAK Unit 105 or elements thereof in a learning mode may position Observation Point 723 to observe a simulated person Object's 616*ma* griping the simulated lever and pulling it down, and pushing a simulated door Object 616*mb* resulting in the simulated door Object 616*mb* subsequent open state, thereby learning that the simulated door Object 616*mb* can be opened when its lever is gripped and pulled down, and the door Object 615*mb* pushed as described in the preceding exemplary embodiment with respects to Automatic Vacuum Cleaner

98*m*, person Object 615*ma*, door Object 615*mb*, LTOUAK Unit 105 or elements thereof, and/or other elements. As shown for example in FIG. 57B, Simulated Automatic Vacuum Cleaner 605*m* in a normal mode may be operated or controlled by Avatar Control Program 18*b* that can cause Simulated Automatic Vacuum Cleaner 605*m* to operate (i.e. move, maneuver, mow, etc.) in vacuuming a simulated room. Simulated Automatic Vacuum Cleaner 605*m* in a use of artificial knowledge mode may be operated or controlled by LTOUAK Unit 105 or elements thereof to open the door Object 616*mb* or another similar Object 616 that may advance Simulated Automatic Vacuum Cleaner's 605*m* vacuuming a simulated room as described in the preceding exemplary embodiment with respects to Automatic Vacuum Cleaner 98*m*, robotic arm Actuator 91*m*, person Object 615*ma*, door Object 615*mb*, Device Control Program 18*a*, LTOUAK Unit 105 or elements thereof, and/or other elements.

Figure 58A:
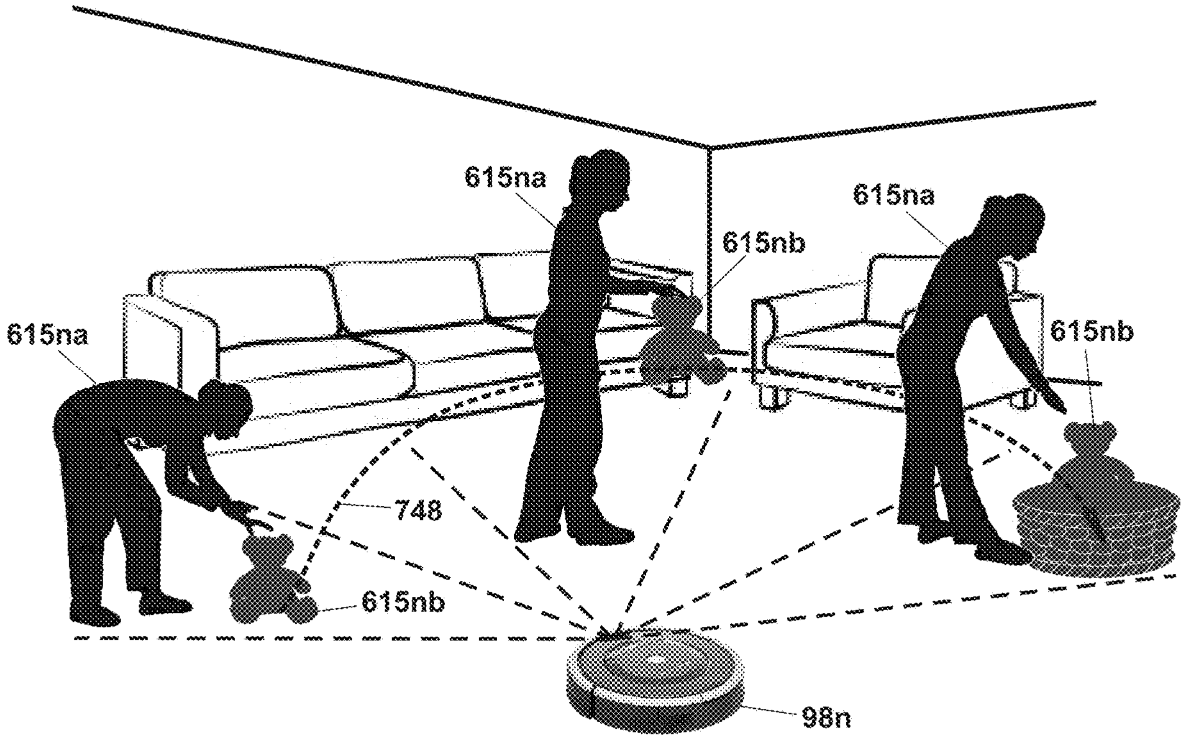
FIG. 58A-58B illustrate an exemplary embodiment of Automatic Vacuum Cleaner 98*n* learning through observation and using artificial knowledge.
Figure 58B:
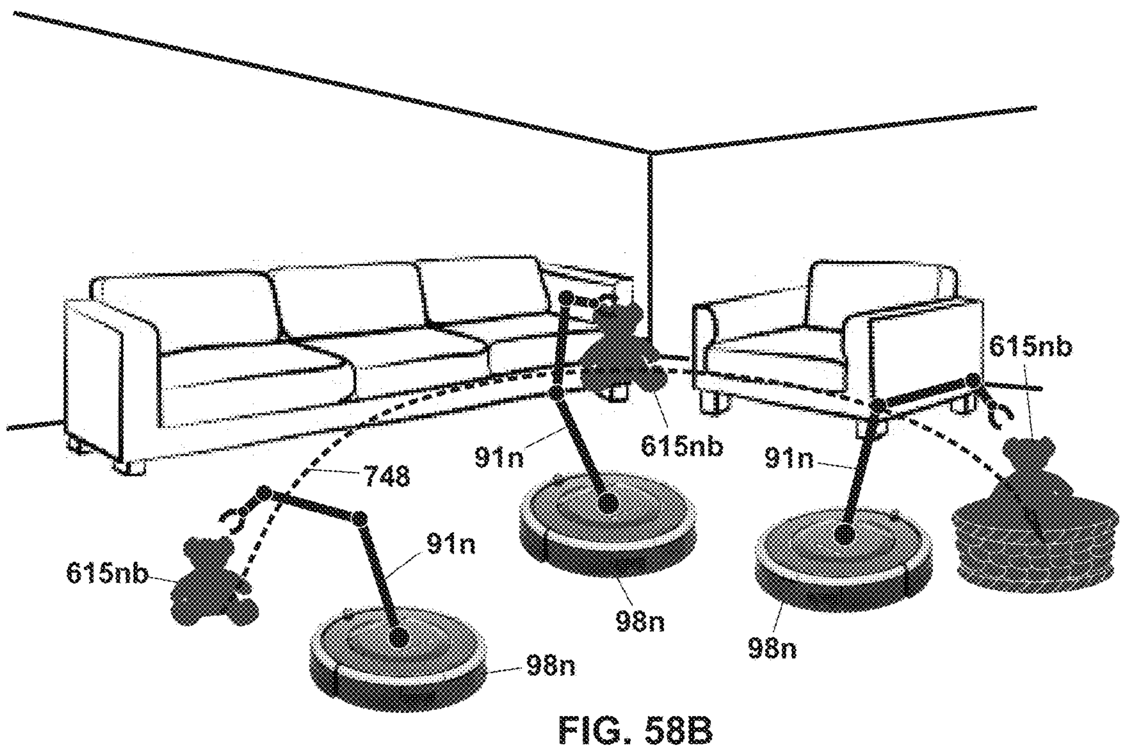

Referring to FIG. 58A-58B, in some exemplary embodiments, Device 98 may be or include Automatic Vacuum Cleaner 98*n*. Automatic Vacuum Cleaner 98*n* may include or be coupled to one or more Sensors 92 and/or Object Processing Unit 115 that can detect one or more Objects 615 or states of one or more Objects 615 in Automatic Vacuum Cleaner's 98*n* surrounding. Object Processing Unit 115 may generate one or more Collections of Object Representations 525 representing the one or more Objects 615 or states of the one or more Objects 615. As shown for example in FIG. 58A, Automatic Vacuum Cleaner 98*n* in a learning mode may detect a person Object 615*na* and a toy Object 615*nb*. LTOUAK Unit 105 or elements (i.e. Unit for Observing Object Manipulation 135, etc.) thereof may cause Automatic Vacuum Cleaner 98*n* to observe (i.e. as indicated by the dashed lines, etc.) the person Object's 615*na* move manipulation (i.e. that may include grip/attach/grasp, move, and/or release manipulations, etc.) of the toy Object 615*nb* resulting in the toy Object 615*nb* moving in Trajectory 748 to one or more subsequent moved states. LTOUAK Unit 105 or elements thereof may determine one or more Instruction Sets 526 that can be used or executed to cause Automatic Vacuum Cleaner 98*n* to perform the moving of the toy Object 615*nb* in Trajectory 748. LTOUAK Unit 105 or elements thereof may, thereby, learn that the toy Object 615*nb* can be moved in Trajectory 748 by learning one or more Instruction Sets 526 that can be used or executed to cause Automatic Vacuum Cleaner 98*n* to move the toy Object 615*nb* in Trajectory 748 correlated with: one or more Collections of Object Representations 525 representing one or more subsequent (i.e. moved, etc.) states of the toy Object 615*nb* and/or one or more Collections of Object Representations 525 representing the state of the toy Object 615*nb* before the move. Any Extra Info 527 related to the manipulation of the toy Object 615*nb* can also optionally be learned. LTOUAK Unit 105 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 58B, Automatic Vacuum Cleaner 98*n* in a normal mode may be operated or controlled by Device Control Program 18*a* that can cause Automatic Vacuum Cleaner 98*n* to operate (i.e. move, maneuver, suction, etc.) in vacuuming a room. Automatic Vacuum Cleaner 98*n* in the normal mode may detect a toy Object 615*nb*. The toy Object 615*nb* may need to be moved so that Automatic Vacuum Cleaner 98*n* can vacuum the place where the toy Object 615*nb* resides. Device Control Program 18*a* may not know how to move the toy Object 615*nb*. LTOUAK Unit 105 or elements (i.e. Unit for Object Manipulation Using Artificial Knowledge 170, Knowledge Structure 160, etc.) thereof may include knowledge of moving a toy Object 615*nb* or another similar Object 615, which Device Control Program 18*a* may decide to use to move the toy Object 615*nb* by switching to the use of artificial knowledge mode. Automatic Vacuum Cleaner 98*n* in the use of artificial knowledge mode may use the artificial knowledge in LTOUAK Unit 105 or elements thereof to move the toy Object 615*nb* by comparing incoming one or more Collections of Object Representations 525 representing a current state of the toy Object 615*nb* with previously learned one or more Collections of Object Representations 525 representing previously learned states of one or more Objects 615. If at least partial match is determined in previously learned one or more Collections of Object Representations 525, Instruction Sets 526 correlated with previously learned one or more Collections of Object Representations 525 representing a subsequent (i.e. moved, etc.) state of the toy Object 615*nb* can be executed to cause Automatic Vacuum Cleaner's 98*n* robotic arm Actuator 91*n* to move the toy Object 615*nb* in Trajectory 748, thereby effecting the toy Object's 615*nb* state of being moved. Such moved state of the toy Object 615*nb* may advance Automatic Vacuum Cleaner's 98*n* vacuuming the room as well as achieve a desirable effect of organizing the room by moving the toy Object 615*nb* into a basket. Any previously learned Extra Info 527 related to manipulations of a toy Object 615*nb* may also optionally be used for enhanced decision making and/or other functionalities. Once the toy Object 615*nb* is moved using artificial knowledge, Automatic Vacuum Cleaner 98*n* can return to its normal mode of being operated or controlled by Device Control Program 18*a* to vacuum the place where the toy Object 615*nb* resided prior to being moved and/or vacuum the rest of the room. In some aspects, Automatic Vacuum Cleaner's 98*n* may be configured to organize the room in addition to or instead of vacuuming the room, and artificial knowledge of moving the toy Object 615*nb* into a basket can be used to advance this operation. In some designs, move points on Trajectory 748 may be considered separate manipulations (i.e. manipulations to move the toy Object 615*nb* from one move point to another move point on Trajectory 748, etc.), in which case the move points can be learned and/or implemented using artificial knowledge as separate manipulations.

Figure 59A:
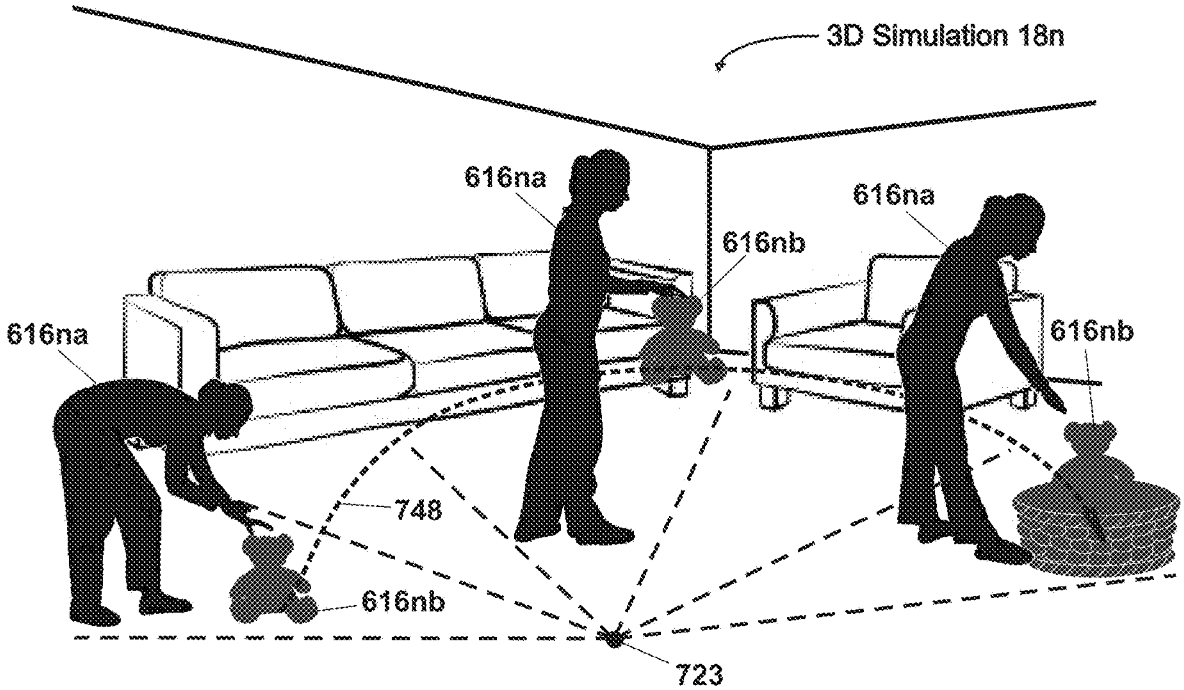
FIG. 59A-59B illustrate an exemplary embodiment of learning through observation in 3D Simulation 18*n* and Simulated Automatic Vacuum Cleaner 605*n* using artificial knowledge.
Figure 59B:
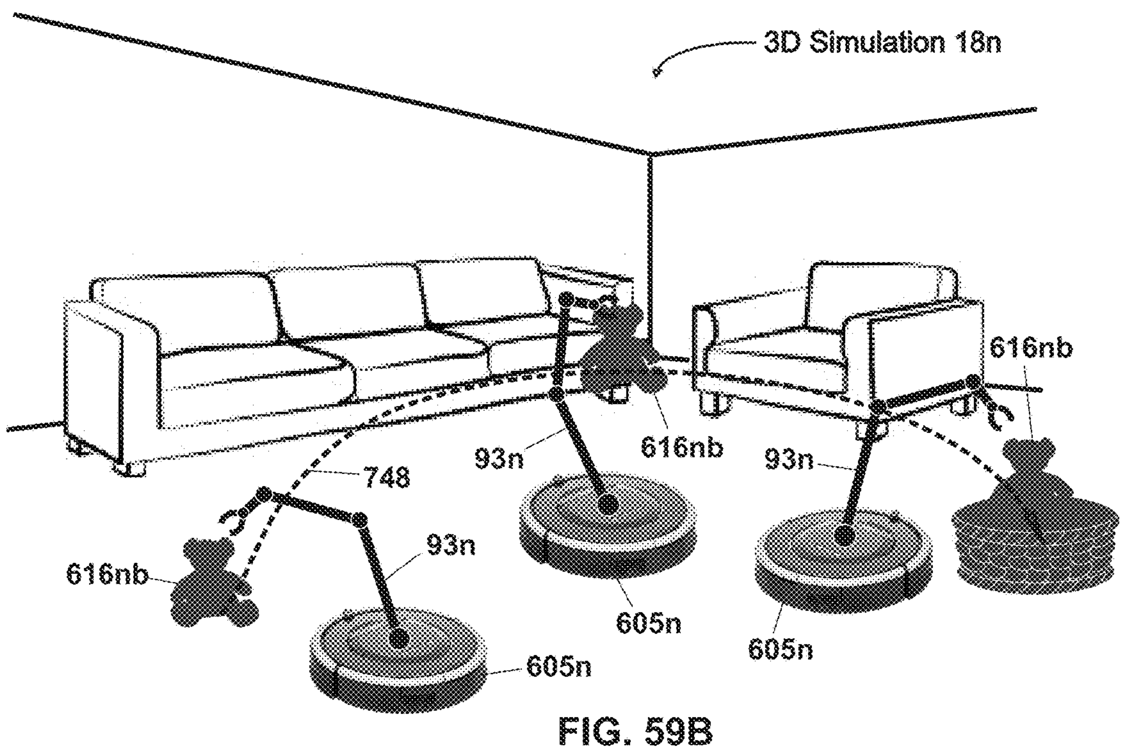

Referring to FIG. 59A-59B, in some exemplary embodiments, Application Program 18 may be or include 3D Simulation 18*n* (i.e. robot or device simulation application, etc.). Avatar 605 may be or include Simulated Automatic Vacuum Cleaner 605*n*. Object Processing Unit 115 may detect or obtain one or more Objects 616 or states of one or more Objects 616 in 3D Simulation 18*n*. Object Processing Unit 115 may generate one or more Collections of Object Representations 525 representing the one or more Objects 616 or states of the one or more Objects 616. As shown for example in FIG. 59A, LTOUAK Unit 105 or elements thereof in a learning mode may position Observation Point 723 to observe a simulated person Object's 616*na* move manipulation (i.e. that may include grip/attach/grasp, move, and/or release manipulations, etc.) of a simulated toy Object 616*nb* resulting in the simulated toy Object's 616*nb* subsequent moved state, thereby learning that the simulated toy Object 616*nb* can be moved as described in the preceding exemplary embodiment with respects to Automatic Vacuum Cleaner 98*n*, person Object 615*na*, toy Object 615*nb*, LTOUAK Unit 105 or elements thereof, and/or other elements. As shown for example in FIG. 59B, Simulated Automatic Vacuum Cleaner 605*n* in a normal mode may be operated or controlled by Avatar Control Program 18*b* that can cause Simulated Automatic Vacuum Cleaner 605*n* to operate (i.e. move, maneuver, suction, etc.) in vacuuming a simulated room. Simulated Automatic Vacuum Cleaner 605*n* in a use of artificial knowledge mode may be operated or controlled by LTOUAK Unit 105 or elements thereof to move the toy Object 616*nb* or another similar Object 616 that may advance Simulated Automatic Vacuum Cleaner's 605*n* vacuuming a simulated room as described in the preceding exemplary embodiment with respects to Automatic Vacuum Cleaner 98*n*, robotic arm Actuator 91*n*, person Object 615*na*, toy Object 615*nb*, Device Control Program 18*a*, LTOUAK Unit 105 or elements thereof, and/or other elements.

Figure 60A:
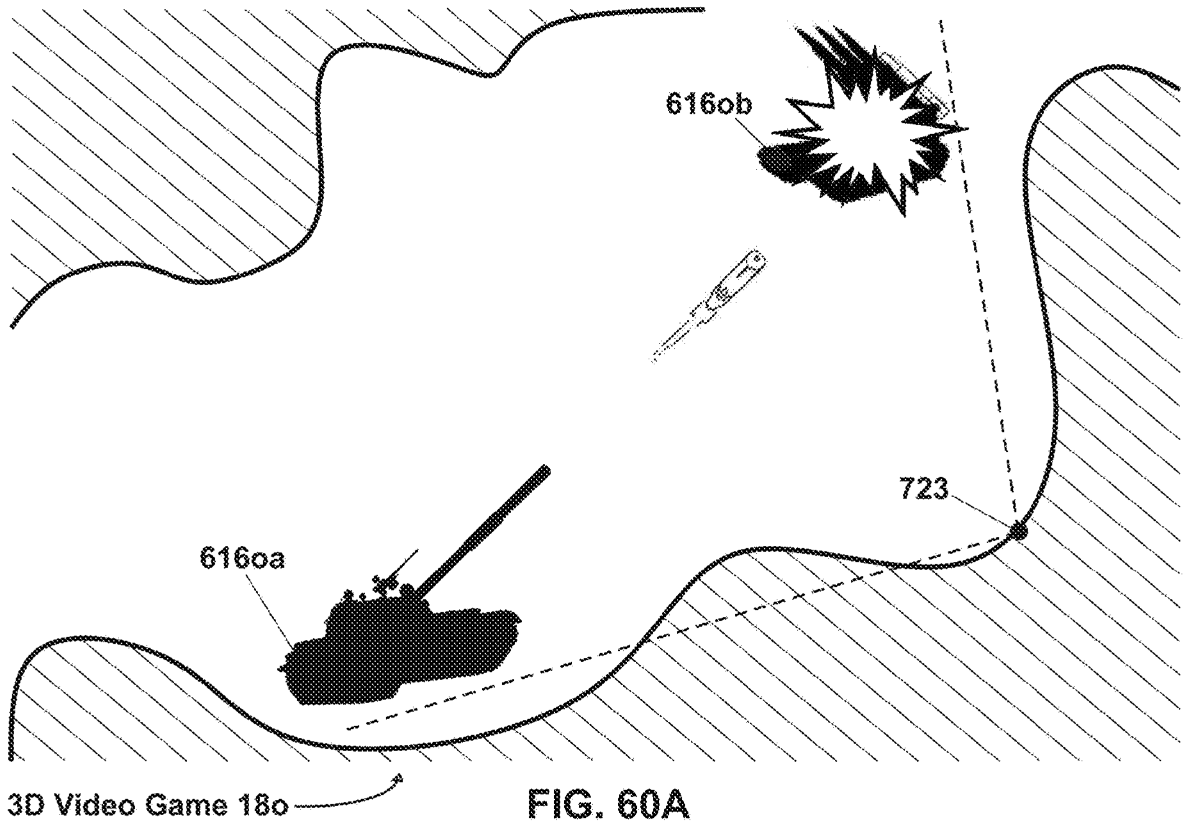
FIG. 60A-60B illustrate an exemplary embodiment of learning through observation in 3D Video Game 18*o* and Simulated Tank 605*o* using artificial knowledge.
Figure 60B:
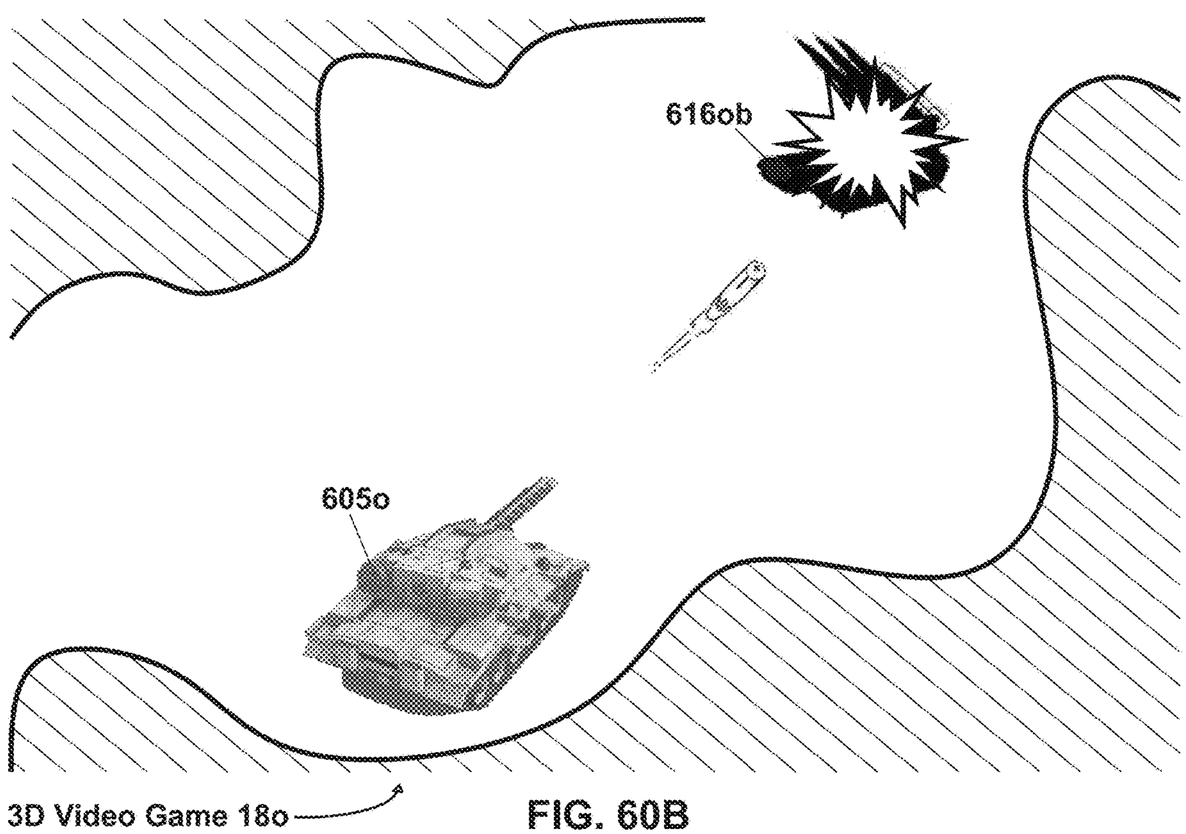

Referring to FIG. 60A-60B, in some exemplary embodiments, Application Program 18 may be or include 3D Video Game 18*o* (i.e. strategy game, driving simulation, virtual world, shooter game, flight simulation, etc.). Avatar 605 may be or include Simulated Tank 6050. Object Processing Unit 115 may detect or obtain one or more Objects 616 or states of one or more Objects 616 in 3D Video Game 18*o*. Object Processing Unit 115 may generate one or more Collections of Object Representations 525 representing the one or more Objects 616 or states of the one or more Objects 616. As shown for example in FIG. 60A, LTOUAK Unit 105 or elements (i.e. Unit for Observing Object Manipulation 135, etc.) thereof in a learning mode may detect or obtain a simulated tank Object 616*oa* and a simulated rocket launcher Object 616*ob*. LTOUAK Unit 105 or elements thereof may position Observation Point 723 to observe (i.e. as indicated by the dashed lines, etc.) the simulated tank Object's 616*oa* shooting a projectile at the simulated rocket launcher Object 616*ob* resulting in the simulated rocket launcher Object 616*ob* being in a subsequent destroyed state. LTOUAK Unit 105 or elements thereof may determine one or more Instruction Sets 526 that can be used or executed to cause Simulated Tank 605*o* to perform the shooting of a projectile at the simulated rocket launcher Object 616*ob*. LTOUAK Unit 105 or elements thereof may, thereby, learn that the simulated rocket launcher Object 616*ob* can be destroyed when a projectile is shot at it by learning one or more Instruction Sets 526 that can be used or executed to cause Simulated Tank 605*o* to shoot a projectile at the simulated rocket launcher Object 616*ob* correlated with: one or more Collections of Object Representations 525 representing the subsequent (i.e. destroyed, etc.) state of the simulated rocket launcher Object 616*ob* and/or one or more Collections of Object Representations 525 representing the state of the simulated rocket launcher Object 616*ob* before being destroyed. Any Extra Info 527 related to the manipulation of the simulated rocket launcher Object 616*ob* can also optionally be learned. LTOUAK Unit 105 or elements thereof may store this knowledge into Knowledge Structure 160 (i.e. Collection of Sequences 160*a*, Graph or Neural Network 160*b*, Collection of Knowledge Cells [not shown], etc.). As shown for example in FIG. 60B, Simulated Tank 605*o* in a normal mode may be operated or controlled by Avatar Control Program 18*b* that can cause Simulated Tank 605*o* to operate (i.e. move, maneuver, patrol, etc.) in patrolling an area. Simulated Tank 605*o* in a normal mode may detect or obtain a simulated rocket launcher Object 616*ob*. The simulated rocket launcher Object 616*ob* may need to be destroyed. Avatar Control Program 18*b* may not know how to destroy the simulated rocket launcher Object 616*ob*. LTOUAK Unit 105 or elements (i.e. Unit for Object Manipulation Using Artificial Knowledge 170, Knowledge Structure 160, etc.) thereof may include knowledge of destroying a simulated rocket launcher Object 616*ob* or another similar Object 616, which Avatar Control Program 18*b* may decide to use to destroy the simulated rocket launcher Object 616*ob* by switching to the use of artificial knowledge mode. Simulated Tank 605*o* in the use of artificial knowledge mode may be operated or controlled by LTOUAK Unit 105 and/or may use the artificial knowledge in LTOUAK Unit 105 or elements thereof to destroy the simulated rocket launcher Object 616*ob* by comparing incoming one or more Collections of Object Representations 525 representing a current state of the simulated rocket launcher Object 616*ob* with previously learned one or more Collections of Object Representations 525 representing previously learned states of one or more Objects 616. If at least partial match is determined in previously learned one or more Collections of Object Representations 525, Instruction Sets 526 correlated with previously learned one or more Collections of Object Representations 525 representing at least a subsequent (i.e. destroyed, etc.) state of the simulated rocket launcher Object 616*ob* can be executed to cause Simulated Tank 605*o* to shoot a projectile at the simulated rocket launcher Object 616*ob*, thereby effecting the simulated rocket launcher Object's 616*ob* state of being destroyed. Such destroyed state of the simulated rocket launcher Object 616*ob* may advance Simulated Tank's 6050 destroying opponent Objects 616. Any previously learned Extra Info 527 related to manipulations of a simulated rocket launcher Object 616*ob* may also optionally be used for enhanced decision making and/or other functionalities. Once the simulated rocket launcher Object 616*ob* is destroyed using artificial knowledge, Simulated Tank 605*o* can return to its normal mode of being operated or controlled by Avatar Control Program 18*b* to patrol the area. In some aspects, the projectile itself may be an Object 616, be represented by one or more Collections of Object Representations 525 or elements (i.e. one or more Object Representations 625, etc.) thereof, and/or be part of the learning and/or other functionalities. Any features, functionalities, and/or embodiments described with respect to Simulated Tank 6050, simulated projectile, simulated tank Object 616*oa*, simulated rocket launcher Object 616*ob*, and/or other simulated elements in the aforementioned simulation example may similarly apply to physical tanks, physical projectile, physical rocket launcher, and/or other physical elements in a physical world example.

In some aspects, similar features, functionalities, and/or embodiments described with respect to Automatic Lawn Mower 98*k*, Automatic Vacuum Cleaner 98*m*, Automatic Vacuum Cleaner 98*n*, and/or other Devices 98 as well as Simulated Automatic Lawn Mower 605*k*, Simulated Automatic Vacuum Cleaner 605*m*, Simulated Automatic Vacuum Cleaner 605*n*, Simulated Tank 6050, and/or other Avatars 605 can be realized in many other Devices 98, Avatars 605, and/or applications some examples of which are the following. In one example, LTOUAK Unit 105-enabled Device 98 or LTOUAK Unit 105-enabled Avatar 605 may learn to open a sliding door Object 615 (not shown) or Object 616 (not shown) by observing a person Object 615 or Object 616 gripping an edge of the sliding door Object 615 or Object 616 and pulling the sliding door Object 615 or Object 616. Similarly, LTOUAK Unit 105-enabled Device 98 or LTOUAK Unit 105-enabled Avatar 605 may learn to open a drawer Object 615 (not shown) or Object 616 (not shown) by observing a person Object 615 or Object 616 gripping and pulling a knob of the drawer Object 615 or Object 616. In a further example, LTOUAK Unit 105-enabled Device 98 or LTOUAK Unit 105-enabled Avatar 605 may learn to open a pet door Object 615 (not shown) or Object 616 (not shown) by observing a cat Object 615 or Object 616 pushing the pet door Object 615 or Object 616. In a further example, LTOUAK Unit 105-enabled Device 98 or LTOUAK Unit 105-enabled Avatar 605 may learn to deform a pillow Object 615 (not shown) or Object 616 (not shown) by observing a person Object 615 or Object 616 pressing, squeezing, and/or performing other manipulations of the pillow Object 615 or Object 616. In a further example, LTOUAK Unit 105-enabled Device 98 or LTOUAK Unit 105-enabled Avatar 605 may learn to remove an obstacle Object 615 (i.e. stone, piece of wood, etc.; not shown) or Object 616 (not shown) by observing a person Object 615 or Object 616 removing the obstacle Object 615 or Object 616. In a further example, LTOUAK Unit 105-enabled Device 98 or LTOUAK Unit 105-enabled Avatar 605 may learn to wash a plate Object 615 (not shown) or Object 616 (not shown) by observing a person Object 615 or Object 616 washing the plate Object 615 or Object 616. In a further example, LTOUAK Unit 105-enabled Device 98 or LTOUAK Unit 105-enabled Avatar 605 may learn to screw a screw Object 615 (not shown) or Object 616 (not shown) by observing a person Object 615 or Object 616 screwing the screw Object 615 or Object 616. In a further example, LTOUAK Unit 105-enabled Device 98 or LTOUAK Unit 105-enabled Avatar 605 may learn to collect, transport, and unload a material Object 615 (not shown) or Object 616 (not shown) by observing a loader Object 615 or Object 616 collecting, transporting, and unloading the material Object 615 (i.e. collecting material from a pile of material, moving the material to a truck, and unloading the material into the truck, etc.) or Object 616. In a further example, LTOUAK Unit 105-enabled Device 98 or LTOUAK Unit 105-enabled Avatar 605 may learn to place a grocery Object 615 (not shown) or Object 616 (not shown) into a bag Object 615 (not shown) or Object 616 (not shown) by observing a person Object 615 or Object 616 placing the grocery Object 615 or Object 616 into the bag Object 615 or Object 616. In a further example, LTOUAK Unit 105-enabled Device 98 or LTOUAK Unit 105-enabled Avatar 605 may learn to pick a fruit Object 615 (not shown) or Object 616 (not shown) from a tree Object 615 (not shown) or Object 616 (not shown) by observing a person Object 615 or Object 616 picking the fruit Object 615 or Object 616 from the tree Object 615 or Object 616. In a further example, LTOUAK Unit 105-enabled Device 98 or LTOUAK Unit 105-enabled Avatar 605 may learn to perform a lift, pull, roll, move, and/or other manipulations of an Object 615 or Object 616 by observing a person Object 615 or Object 616 lifting, pulling, rolling, moving, and/or performing other manipulations of the Object 615 or Object 616. In a further example, LTOUAK Unit 105-enabled Device 98 or LTOUAK Unit 105-enabled Avatar 605 may learn to push one or more Objects 615 or one or more Objects 616 of a system of Objects 615 or Objects 616 by observing a person Object 615 or Object 616 pushing one or more Objects 615 or one or more Objects 616 of the system of Objects 615 or Objects 616. Specifically, for instance, LTOUAK Unit 105-enabled Device 98 or LTOUAK Unit 105-enabled Avatar 605 may observe and learn that person Object's 615 or Object's 616 pushing one of three aligned toy Objects 615 or Objects 616 results in the three toy Objects 615 or Object 616 pushing each other and moving in the direction of being pushed. In a further example, LTOUAK Unit 105-enabled Device 98 or LTOUAK Unit 105-enabled Avatar 605 may learn to drop or lower a toy Object 615 or Object 616 to the ground by observing a person Object 615 or Object 616 dropping or lowering the toy Object 615 or Object 616. Similarly, LTOUAK Unit 105-enabled Device 98 or LTOUAK Unit 105-enabled Avatar 605 may learn to bounce a ball Object 615 (not shown) or Object 616 (not shown) off the ground by observing a person Object 615 or Object 616 dropping a ball Object 615 or Object 616 that bounces off the ground. In a further example, LTOUAK Unit 105-enabled Device 98 or LTOUAK Unit 105-enabled Avatar 605 may learn to contract a spring Object 615 (not shown) or Object 616 (not shown) by observing a person Object 615 or Object 616 compressing a spring Object 615 or Object 616. Similarly, LTOUAK Unit 105-enabled Device 98 or LTOUAK Unit 105-enabled Avatar 605 may learn to expand a spring Object 615 or Object 616 by observing a person Object 615 or Object 616 releasing a compressed spring Object 615 or Object 616. In a further example, LTOUAK Unit 105-enabled Device 98 or LTOUAK Unit 105-enabled Avatar 605 may learn to explode a mine Object 615 (not shown) or Object 616 (not shown) by observing a pole Object 615 (not shown) or Object 616 (not shown) touching a mine Object 615 or Object 616 or parts thereof. In a further example where one Object 615 or Object 616 controls or affects another Object 615 or Object 616, LTOUAK Unit 105-enabled Device 98 or LTOUAK Unit 105-enabled Avatar 605 may learn to change a state of one Object 615 or Object 616 by observing a manipulation of another Object 615 or Object 616. Specifically, for instance, LTOUAK Unit 105-enabled Device 98 or LTOUAK Unit 105-enabled Avatar 605 may learn to light up a light bulb Object 615 (not shown) or Object 616 (not shown) by observing a person Object 615 or Object 616 pressing or moving a switch Object 615 (not shown) or Object 616 (not shown). In another instance, LTOUAK Unit 105-enabled Device 98 or LTOUAK Unit 105-enabled Avatar 605 may learn to open up a faucet Object 615 (not shown) or Object 616 (not shown) by observing a person Object 615 or Object 616 twisting/rotating a valve Object 615 (not shown) or Object 616 (not shown). In a further example of Objects 615 or Objects 616 that do not change states in response to certain manipulations, LTOUAK Unit 105-enabled Device 98 or LTOUAK Unit 105-enabled Avatar 605 may learn that an Object 615 or Object 616 does not change its state by observing manipulations of the Object 615 or Object 616. Specifically, for instance, LTOUAK Unit 105-enabled Device 98 or LTOUAK Unit 105-enabled Avatar 605 may learn that a wall or other rigid/immobile Object 615 (not shown) or Object 616 (not shown) does not change its state (i.e. does not move, does not deform, does not open, etc.) by observing a person or cat Object 615 or Object 616 touching and/or performing other manipulations of a wall or other rigid/immobile Object 615 or Object 616.

The foregoing exemplary embodiments provide examples of utilizing LTCUAK Unit 100 or elements thereof, LTOUAK Unit 105 or elements thereof, various Devices 98 (i.e. Automatic Vacuum Cleaner 98, Automatic Lawn Mower 98, Autonomous Vehicle 98, etc.) or elements thereof, various Objects 615 (i.e. toy Object 615, gate Object 615, person Object 615, vehicle Object 615, door Object 615, etc.), various Avatars 605 (i.e. Simulated Automatic Vacuum Cleaner 605, Simulated Automatic Lawn Mower 605, Simulated Vehicle 605, Simulated Tank 605, etc.) or elements thereof, various Objects 616 (i.e. simulated toy Object 616, simulated gate Object 616, simulated person Object 616, simulated vehicle Object 616, simulated door Object 616, simulated rocket launcher Object 616, simulated tank Object 616, simulated communication center Object 616, etc.), various modes (i.e. normal mode, learning mode, use of artificial knowledge mode, etc.), and/or other elements or techniques. It should be understood that any of these elements and/or techniques can be omitted, used in a different combination, or used in combination with other elements and/or techniques. In some aspects, the normal, learning, and use of artificial knowledge modes are not mutually exclusive and more than one mode can be used simultaneously. In one example, Autonomous Vehicle 98 or Simulated Vehicle 605 may learn in a learning mode while driving in a normal mode. In another example, Automatic Vacuum Cleaner 98 may learn in a learning mode while operating in a normal mode. In further aspects, learning can be realized by observing not only persons (i.e. physical or simulated, etc.) manipulating Objects 615 or Object 616, but also from observing animals or other Objects 615 or Objects 616 manipulating Objects 615 or Objects 616. In further aspects, learning can be realized by observing self-manipulating Objects 615 or Objects 616 (i.e. Objects 615 or Objects 616 that manipulate [i.e. move, transform, change, etc.] themselves without being manipulated by other Objects 615 or Objects 616, etc.). In further aspects, any manipulation of any of the previously described and/or other Objects 615 or Objects 616 instead of or in addition to the aforementioned pushing, opening, moving, and/or destroying can similarly be learned and/or implemented such as touching, pulling, lifting, dropping, gripping/attaching to/grasping, releasing, twisting/rotating, squeezing, moving, closing, switching on, switching off, and/or others. Robotic arm Actuator 91 or Arm 93 is not shown in some illustrations as it may be retracted into Device 98 or Avatar 605. In further aspects, the aforementioned functionalities described with respect to Devices 98, Avatars 605, and/or applications can similarly be applied on any physical device, computer generated avatar or object, and/or other application such as a home or other appliance, a toy, a robot, an aircraft, a vessel, a submarine, a ground vehicle, an aerial vehicle, an aquatic vehicle, a bulldozer, an excavator, a crane, a forklift, a truck, a construction machine, an assembly machine, an object handling machine, a sorting machine, a restocking machine, an industrial machine, an agricultural machine, a harvesting machine, and/or others. In general, the aforementioned features, functionalities, and/or embodiments can be applied on any physical device, computer generated avatar or object, or other application that can implement and/or benefit from the functionalities described herein. One of ordinary skill in art will understand that the aforementioned applications of the disclosed systems, devices, and methods are described merely as examples of a variety of possible implementations, and that while all possible applications are too voluminous to describe, other applications are within the scope of this disclosure.

Any of the examples or exemplary embodiments above-described with respect to LTCUAK Unit 100, LTOUAK Unit 105, and/or other elements may be used in learning a purpose or implementing a purpose.

Figure 61:
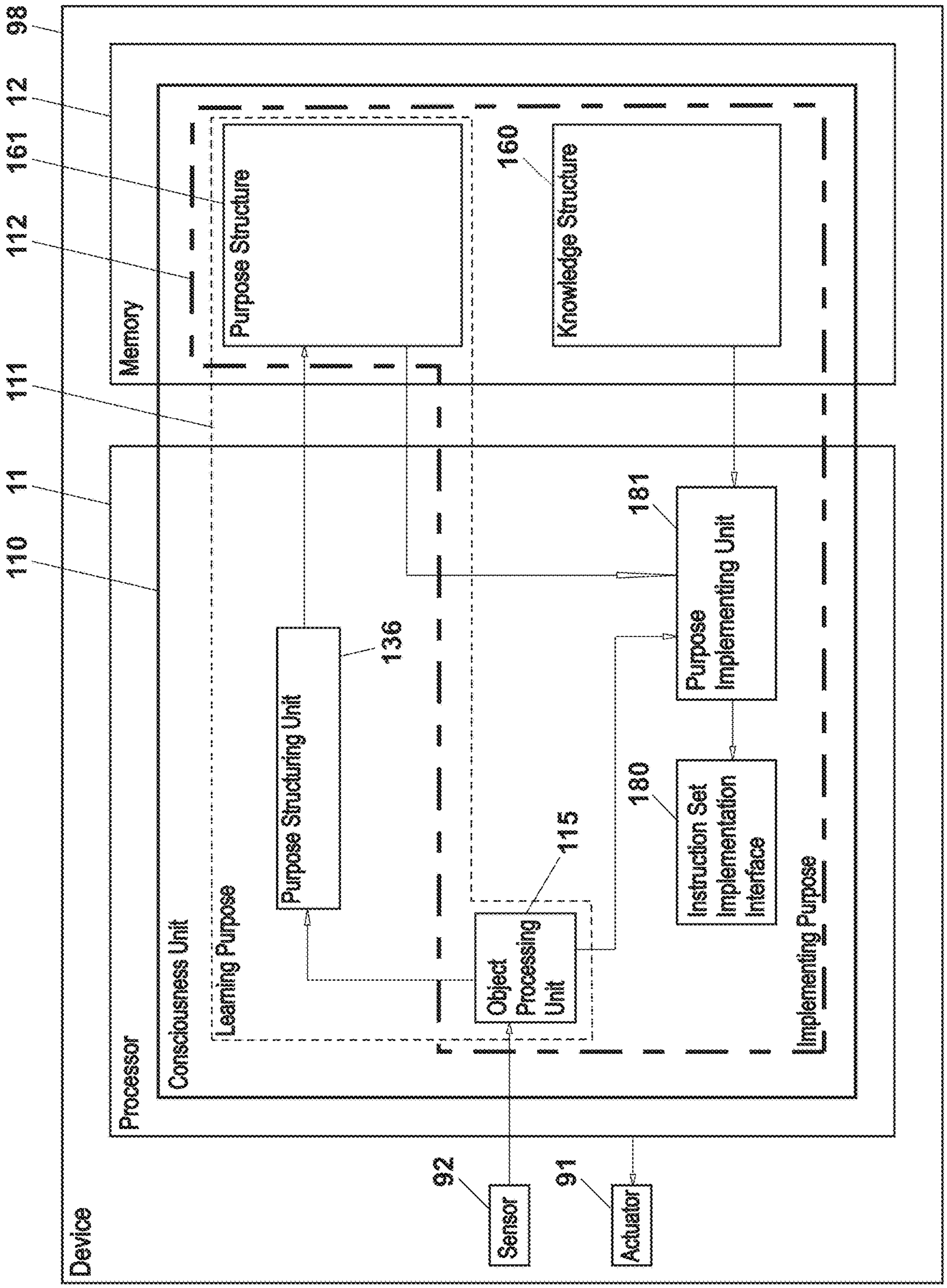
FIG. 61 illustrates an embodiment of Consciousness Unit 110 providing its functionalities to Device 98.

Referring to FIG. 61, an embodiment of Device 98 comprising Consciousness Unit 110 is illustrated. Consciousness Unit 110 (also may be referred to as artificial intelligence unit and/or other suitable name or reference, etc.) comprises functionality for learning one or more purposes of Device 98. Consciousness Unit 110 comprises functionality for implementing or using one or more purposes of Device 98. Consciousness Unit 110 comprises functionality for learning one or more purposes of a system. Consciousness Unit 110 comprises functionality for implementing or using one or more purposes of a system. Consciousness Unit 110 may comprise other functionalities. In some designs, Consciousness Unit 110 comprises connected Object Processing Unit 115, Purpose Structuring Unit 136, Purpose Structure 161, Knowledge Structure 160, Purpose Implementing Unit 181, Instruction Set Implementation Interface 180, and/or other elements. Other additional elements can be included as needed, or some of the disclosed ones can be excluded or altered, or a combination thereof can be utilized in alternate embodiments of Consciousness Unit 110. In some aspects and only for illustrative purposes, Learning Purpose 111 grouping may include elements indicated in the thin dotted line and/or other elements that may be used in purpose learning functionalities of Consciousness Unit 110. In other aspects and only for illustrative purposes, Implementing Purpose 112 grouping may include elements indicated in the thick dotted line and/or other elements that may be used in purpose implementing functionalities of Consciousness Unit 110. Any combination of Learning Purpose 111 grouping or elements thereof and Implementing Purpose 112 grouping or elements thereof, and/or other elements, can be used in various embodiments. Consciousness Unit 110 and/or its elements comprise any hardware, programs, or a combination thereof.

In some aspects, Consciousness Unit's 110 learning and/or implementing one or more purposes of Device 98 or system may resemble purpose learning and/or purpose implementing of a child. For example, a child may learn knowledge of objects (i.e. states of objects, properties of objects, manipulations of objects, etc.) through curiosity and/or observation as previously mentioned. However, the child also needs one or more purposes to drive the use of the knowledge. Like the knowledge of objects, a child's one or more purposes are not encoded into the child's DNA. Instead, a child learns its one or more purposes. Therefore, in some aspects, a conscious Device 98 or system may be or include a device or system that comprises one or more purposes and knowledge of one or more physical objects so that Device 98 or system can manipulate physical objects to achieve its one or more purposes. In some designs, such one or more purposes and knowledge of one or more physical objects may be learned.

Figure 62:
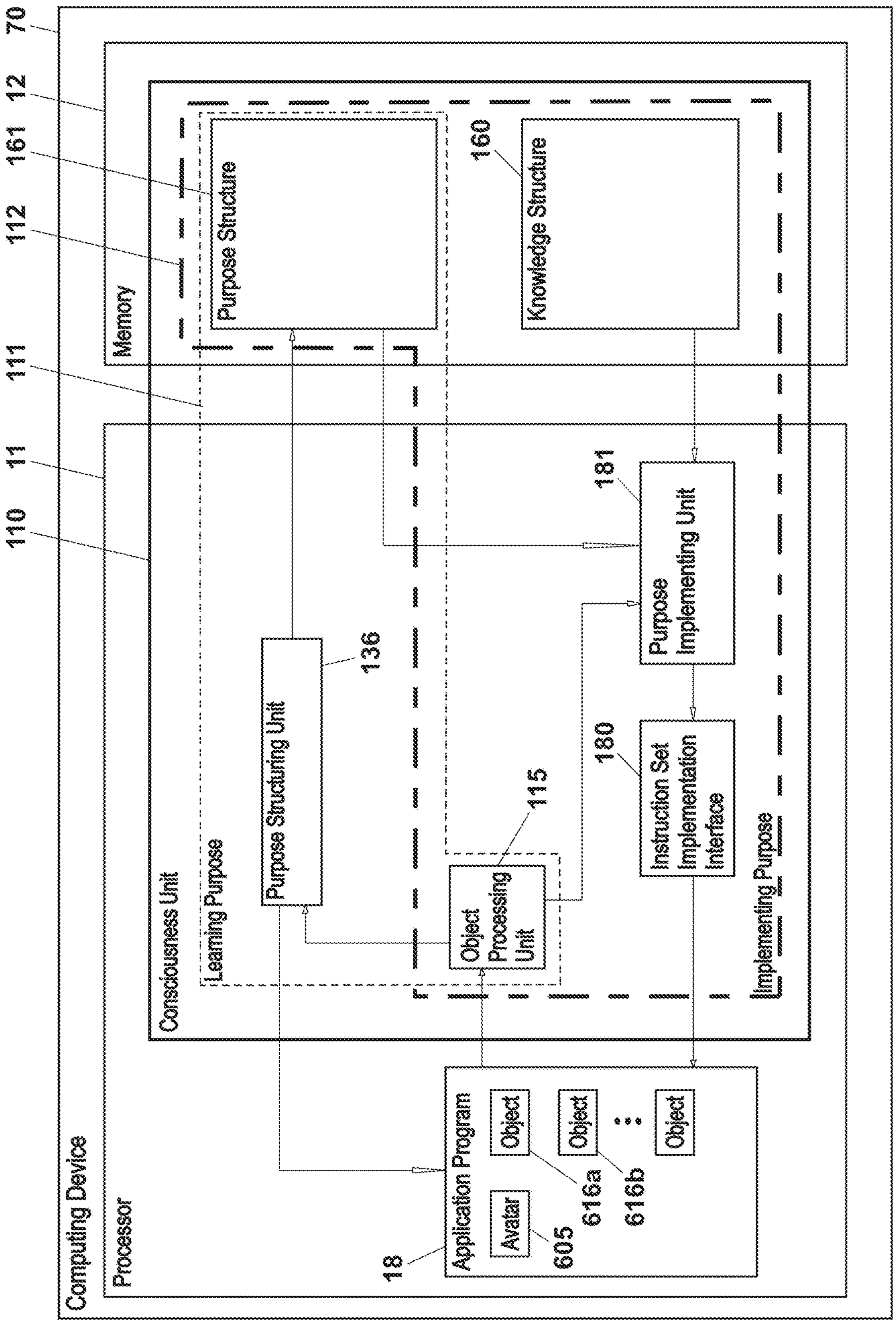
FIG. 62 illustrates an embodiment of Consciousness Unit 110 providing its functionalities to Application Program 18 and/or elements (i.e. Avatar 605, etc.) thereof.

Referring to FIG. 62, an embodiment of Computing Device 70 comprising Consciousness Unit 110 is illustrated. Computing Device 70 further comprises Processor 11 and Memory 12. Processor 11 includes or executes Application Program 18 comprising Avatar 605 and/or one or more Objects 616 (i.e. computer generated objects, etc.). Although not shown for clarity of illustration, any portion of Application Program 18, Avatar 605, Objects 616, and/or other elements can be stored in Memory 12. Consciousness Unit 110 comprises functionality for learning one or more purposes of Avatar 605. Consciousness Unit 110 comprises functionality for implementing or using one or more purposes of Avatar 605. Consciousness Unit 110 comprises functionality for learning one or more purposes of an application. Consciousness Unit 110 comprises functionality for implementing or using one or more purposes of an application. Consciousness Unit 110 may comprise other functionalities.

In some aspects, Consciousness Unit's 110 learning and/or implementing one or more purposes of Avatar 605 or application may resemble purpose learning and/or purpose implementing of a child as previously mentioned. Therefore, in some aspects, a conscious Avatar 605 or application may be or include an avatar or application that comprises one or more purposes and knowledge of one or more computer generated objects so that Avatar 605 or application can manipulate computer generated objects to achieve its one or more purposes. In some designs, such one or more purposes and knowledge of one or more computer generated objects may be learned.

Figure 63:
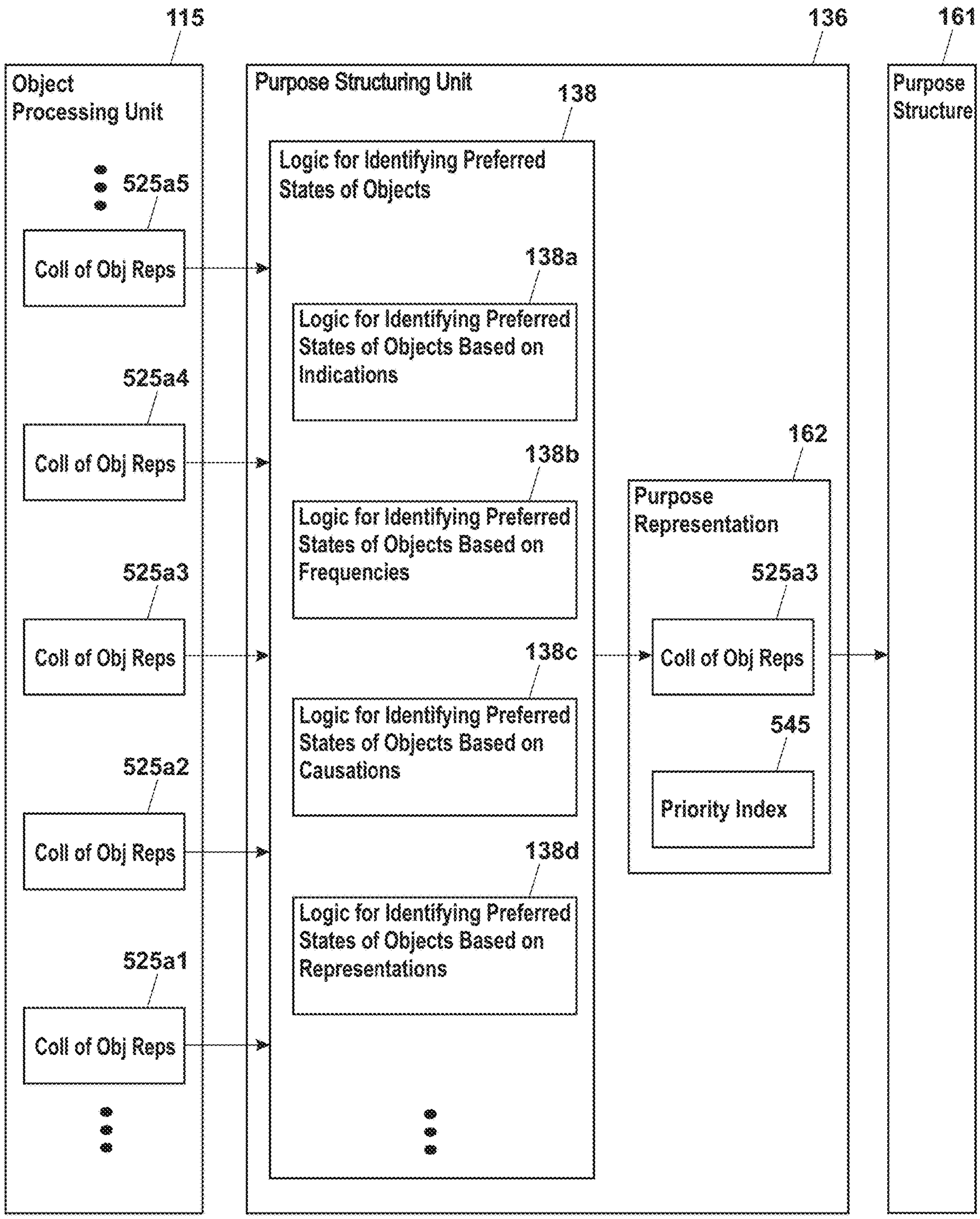
FIG. 63 illustrates an embodiment of Purpose Structuring Unit 136.

Referring to FIG. 63, an embodiment of Purpose Structuring Unit 136 is illustrated. Purpose Structuring Unit 136 comprises functionality for identifying or determining one or more purposes of Device 98, Avatar 605, system, or application. Purpose Structuring Unit 136 comprises functionality for structuring one or more purposes of Device 98, Avatar 605, system, or application. Purpose Structuring Unit 136 comprises functionality for generating or creating Purpose Representations 162 and storing one or more Collections of Object Representations 525, Priority Index 545, any Extra Info 527, and/or other elements, or references thereto, into Purpose Representation 162. As such, Purpose Representation 162 comprises functionality for storing one or more Collections of Object Representations 525, Priority Index 545, any Extra Info 527, and/or other elements, or references thereto. Purpose Representation 162 may include any data structure that can facilitate such storing. Purpose Representation 162 may include any features, functionalities, and/or embodiments of Knowledge Cell 800, and vice versa. Purpose Structuring Unit 136 may comprise other functionalities. In some embodiments, Purpose Structuring Unit 136 may receive one or more Collections of Object Representations 525 from Object Processing Unit 115, identify or determine that the one or more Collections of Object Representations 525 represent a preferred state of one or more Objects 615 or one or more Objects 616, and generate Purpose Representation 162 including the one or more Collections of Object Representations 525 and/or other elements. Purpose Structuring Unit 136 may include any hardware, programs, or combination thereof.

Purpose Structuring Unit 136 may include any features, functionalities, and/or embodiments of Positioning Logic 445 for causing Device 98, Sensor 92, Avatar 605, simulated sensor, and/or other elements to position itself/themselves to observe one or more Objects 615 or one or more Objects 616.

Logic for Identifying Preferred States of Objects 138 comprises functionality for identifying preferred states of one or more Objects 615 or one or more Objects 616, and/or other functionalities. In some aspects, Logic for Identifying Preferred States of Objects 138 may identify which of the incoming Collections of Object Representations 525 from Object Processing Unit 115 represent preferred states of one or more Objects 615 or one or more Objects 616. In other aspects, Logic for Identifying Preferred States of Objects 138 may identify which one or more Object Representations 625 of the incoming Collections of Object Representations 525 from Object Processing Unit 115 represent preferred states of one or more Objects 615 or one or more Objects 616. Logic for Identifying Preferred States of Objects 138 may include Logic for Identifying Preferred States of Objects Based on Indications **138*a* (i.e. also may be referred to as Logic for Identifying Preferred States of Objects 138*a* and/or other suitable name or reference), Logic for Identifying Preferred States of Objects Based on Frequencies 138*b* (i.e. also may be referred to as Logic for Identifying Preferred States of Objects 138*b* and/or other suitable name or reference), Logic for Identifying Preferred States of Objects Based on Causations 138*c* (i.e. also may be referred to as Logic for Identifying Preferred States of Objects 138*c* and/or other suitable name or reference), Logic for Identifying Preferred States of Objects Based on Representations 138*d* (i.e. also may be referred to as Logic for Identifying Preferred States of Objects 138*d*** and/or other suitable name or reference), and/or other elements.

In some embodiments, Logic for Identifying Preferred States of Objects Based on Indications **138*a* may receive Collections of Object Representations 525 from Object Processing Unit 115. Logic for Identifying Preferred States of Objects Based on Indications 138*a* may also receive and/or determine an indication that a state of one or more Objects 615 or one or more Objects 616 represented in a particular Collection of Object Representations 525 or one or more Object Representations 625 thereof may be a preferred state. Logic for Identifying Preferred States of Objects Based on Indications 138*a* may provide a similar functionality to Device 98, Avatar 605, system, or application as a child's learning its purpose by receiving an indication about a preferred state of child's environment (i.e. one or more objects in the environment, etc.) from a parent, teacher, and/or others. In some aspects, an indication may be or include a gesture, physical movement, or other physical indication. In one example, a person Object's 615 or Object's 616 making a gesture (i.e. pointing, making a head nod, extending both arms, etc.) toward a closed bathroom door Object 615 or Object 616, etc. may indicate that a preferred state of the bathroom door Object 615 or Object 616 is closed. In another example, a person Object's 615 or Object's 616 making a gesture (i.e. pointing, making a head nod, extending both arms, etc.) toward a toy Object 615 or Object 616 in a toy basket may indicate that a preferred state of the toy Object 615 or Object 616 is in the toy basket so that the room is organized. In a further example, a person Object's 615 or Object's 616 making a gesture (i.e. pointing, making a head nod, extending both arms, etc.) toward Device 98 or Avatar 605 in a charger may indicate that a preferred state of Device 98 or Avatar 605 is in the charger so that Device 98 or Avatar 605 is charged. In some designs, a physical indication may be received from Camera 92*a* and/or other Sensor 92. In other designs, a physical indication may be recognized and/or determined by processing shape Object Property 630 (i.e. 3D model, digital picture, etc.) of Object Representation 625 of Collection of Object Representations 525 that represents person Object 615 or Object 616 as previously described. For example, digital picture or 3D model of a person Object 615 or Object 616 in shape Object Property 630 may be compared with stored digital pictures or 3D models of known gestures to determine the gesture. Any features, functionalities, and/or embodiments of Object Processing Unit 115, Picture Recognizer 117*a*, Picture Renderer 476, Comparison 725, and/or other elements can be used in recognizing and/or determining a physical indication. In general, a physical indication may be recognized or determined by any picture, 3D model, and/or other processing techniques, and/or those known in art. In other aspects, an indication may be or include sound or other audio indication. In one example, a person Object's 615 or Object's 616 making a sound including recognizable speech (i.e. "this is how I want the door", "please keep the door closed", "door should be shut", etc.) may indicate that a preferred state of a bathroom door Object 615 or Object 616 is closed. In another example, a person Object's 615 or Object's 616 making a sound including recognizable speech (i.e. "put the toy in the toy basket", "toy should be in the toy basket", etc.) may indicate that a preferred state of a toy Object 615 or Object 616 is in a toy basket so that a room is organized. In a further example, a person Object's 615 or Object's 616 making a sound including recognizable speech (i.e. "charge yourself", "you should be in the charger", etc.) may indicate that a preferred state of Device 98 or Avatar 605 is in a charger so that Device 98 or Avatar 605 is charged. In some designs, an audio indication may be received from Microphone 92***b* and/or other Sensor 92. In other designs, an audio indication may be recognized and/or determined by processing sound Object Property 630 of Object Representation 625 of Collection of Object Representations 525 that represents person Object 615 or Object 616 as previously described. For example, digital sound or speech of a person Object 615 or Object 616 in sound Object Property 630 may be compared with stored known digital sounds or speech to determine the audio indication. Any features, functionalities, and/or embodiments of Object Processing Unit 115, Sound Recognizer 117*b*, Sound Renderer 477, Comparison 725, and/or other elements can be used in recognizing and/or determining an audio indication. In general, an audio indication may be recognized or determined by any sound, speech, and/or other processing techniques, and/or those known in art. In further aspects, an indication may be or include an electrical signal (i.e. a stream of electrons through a wire or other medium, etc.), radio signal, light signal, and/or other electrical, magnetic, or electromagnetic indication. In one example, a device Object's 615 or Object's 616 radio signal including an encoded command or other electronic instruction may indicate that a preferred state of a bathroom door Object 615 or Object 616 is closed. In another example, a device Object's 615 or Object's 616 light signal may indicate that a preferred state of a toy Object 615 or Object 616 is in a toy basket so that a room is organized. In a further example, a device Object's 615 or Object's 616 electrical signal may indicate that a preferred state of Device 98 or Avatar 605 is in a charger so that Device 98 or Avatar 605 is charged. In some designs, an electrical, magnetic, or electromagnetic indication may be received from Camera 92*a*, Radar 92*c*, Lidar 92*d*, and/or other Sensor 92. In other designs, an electrical, magnetic, or electromagnetic indication may be recognized and/or determined by processing Object Property 630 of Object Representation 625 of Collection of Object Representations 525 that represents the device Object 615 or Object 616. For example, a representation (i.e. digital, etc.) of electrical, magnetic, or electromagnetic signal of a device Object 615 or Object 616 in Object Property 630 may be compared with stored representations (i.e. digital, etc.) of known electrical, magnetic, or electromagnetic signals to determine the electrical, magnetic, or electromagnetic indication. Any features, functionalities, and/or embodiments of Object Processing Unit 115, Picture Recognizer 117*a*, Picture Renderer 476, Radar Processing Unit 117*d*, Lidar Processing Unit 117*c*, Comparison 725, and/or other elements can be used in recognizing and/or determining an electrical, magnetic, or electromagnetic indication. In general, an electrical, magnetic, or electromagnetic indication may be recognized or determined by any electrical, magnetic, electromagnetic, and/or other processing techniques, and/or those known in art. In some designs, Device 98, Avatar 605, system, or application may receive an indication that a state of Device 98, Avatar 605, system, or application is its own preferred state that Logic for Identifying Preferred States of Objects Based on Indications 138*a* may then identify as a preferred state of Device 98, Avatar 605, system, or application. In other designs, any of the aforementioned indications may be received in response to Device 98, Avatar 605, system, or application requesting an indication from another Object 615 or Object 616. In general, an indication of a preferred state of one or more Objects 615 or one or more Objects 616 may include any one or more aforementioned and/or other indications.

As an illustrative example, in processing Collections of Object Representations 525*a*1-525*a*5, etc. from Object Processing Unit 115, Logic for Identifying Preferred States of Objects Based on Indications 138*a* may determine that none of the Objects 615 or Objects 616 represented in Collection of Object Representations 525*a*1 is making an indication of a preferred state of other one or more Objects 615 or one or more Objects 616. Logic for Identifying Preferred States of Objects Based on Indications 138*a* may further determine that none of the Objects 615 or Objects 616 represented in Collection of Object Representations 525*a*2 is making an indication of a preferred state of other one or more Objects 615 or one or more Objects 616. Logic for Identifying Preferred States of Objects Based on Indications 138*a* may further determine that Object 615 or Object 616 represented in Collection of Object Representations 525*a*3 is making an indication of a preferred state of other one or more Objects 615 or one or more Objects 616. In response, Purpose Structuring Unit 136 may generate Purpose Representation 162 that includes Collection of Object Representations 525*a*3, one or more Object Representations 625 of Collection of Object Representations 525*a*3, and/or other elements. Such Purpose Representation 162 may then be provided to Purpose Structure 161, thereby enabling Device 98, Avatar 605, system, or application to learn a purpose. Processing of Collections of Object Representations 525*a*4-525*a*5, etc. may follow a similar process as described with respect to Collections of Object Representations 525*a*1-525*a*2.

Logic for Identifying Preferred States of Objects Based on Indications 138*a* may include any logic, functions, algorithms, code, and/or other elements to enable its functionalities. An example of Logic's for Identifying Preferred States of Objects Based on Indications 138*a* code for recognizing a pointing gesture by one Object 615 or Object 616, finding another Object 615 or Object 616 to which the one Object 615 or Object 616 is pointing, and identifying the state of the another Object 615 or Object 616 as a preferred state of the another Object 615 or Object 616 that may be learned as a purpose may include the following code:

```
detectedObjects=detectObjects ( )//detect objects in the
  surrounding and store them in detectedObjects array for
  (int i=0; i<detectedObjects.length; i++) {//process each
  object in detectedObjects array
  if (detectedObjects [i]. Gesture= "pointing gesture")
    {/*determine if detectedObjects [i] object is making
    pointing gesture*/pointedObject =findPointedObject
    (detectedObjects [i], detectedObjects);/*find object
    in detectedObjects array to which detectedObjects [i]
    object is pointing*/preferredStateOfObject =point-
    edObject;//preferred state of object is pointedObject
    for purpose learning Break;//stop the for loop
  }
  }
. . .
```

In some embodiments, Logic for Identifying Preferred States of Objects Based on Frequencies 138*b* may receive Collections of Object Representations 525 from Object Processing Unit 115. Logic for Identifying Preferred States of Objects Based on Frequencies 138*b* may determine that a state of one or more Objects 615 or one or more Objects 616 represented in a particular Collection of Object Representations 525 or one or more Object Representations 625 thereof is frequently occurring to indicate being a preferred state. Logic for Identifying Preferred States of Objects Based on Frequencies 138*b* may provide a similar functionality to Device 98, Avatar 605, system, or application as a child's learning its purpose by observing frequently occurring situations in its environment (i.e. one or more objects in the environment, etc.). In some aspects, Logic for Identifying Preferred States of Objects Based on Frequencies **138*b* may determine that a preferred state of one or more Objects 615 or one or more Objects 616 is a state of the one or more Objects 615 or one or more Objects 616 that occurs higher than a frequency threshold. The frequency threshold can be defined by a user, by a system administrator, or automatically by the system based on experience, learning, testing, inquiry, analysis, synthesis, and/or other techniques, knowledge, input, etc. In one example, frequently observing a closed state of a bathroom door Object 615 or Object 616 may indicate that a preferred state of the bathroom door Object 615 or Object 616 is closed. In another example, frequently observing a toy Object 615 or Object 616 in a toy basket may indicate that a preferred state of toy Object 615 or Object 616 is in the toy basket so that a room is organized. In another example, Device 98 or Avatar 605 frequently observing itself in a charger may indicate that a preferred state of Device 98 or Avatar 605 is in the charger so that Device 98 or Avatar 605 is charged. Logic for Identifying Preferred States of Objects Based on Frequencies 138*b* may utilize a frequency distribution table or other technique to represent and/or keep track of a frequency of states of one or more Objects 615 or one or more Objects 616. For example, such frequency distribution table may include a column comprising Collections of Object Representations 525 or references thereto, Object Representations 625 or references thereto, or other representations of observed states of one or more Objects 615 or one or more Objects 616, and a column comprising a count of the observed states or a time duration of the observed states. In some designs, the frequency distribution table may include frequency of states of one or more Objects 615 or one or more Objects 616 in a recent time period (i.e. hours, days, months, years, etc.) thereby ignoring less recent states of one or more Objects 615 or one or more Objects 616. Such frequency distribution table enables preferential consideration of recently observed states of one or more Objects 615 or one or more Objects 616. In other designs, Logic for Identifying Preferred States of Objects Based on Frequencies 138*b* may determine a preferred state of one or more Objects 615 or one or more Objects 616 from among the most frequent states of one or more Objects 615 or one or more Objects 616 represented in the frequency distribution table. In further designs, frequency of states of one or more Objects 615 or one or more Objects 616 may include frequency of similar states of one or more Objects 615 or one or more Objects 616 as determined by Comparison 725 of Collections of Object Representations 525 representing the states of one or more Objects 615 or one or more Objects 616. In further designs, Device 98, Avatar 605, system, or application may observe its own frequent state that Logic for Identifying Preferred States of Objects Based on Frequencies 138*b* may then identify as a preferred state of Device 98, Avatar 605**, system, or application.

As an illustrative example, in processing Collections of Object Representations **525*a*1-525*a*5, etc. from Object Processing Unit 115, Logic for Identifying Preferred States of Objects Based on Frequencies 138*b* may determine that a state of one or more Objects 615 or one or more Objects 616 represented in Collection of Object Representations 525*a*1 has not occurred with a frequency that is greater than a threshold. Logic for Identifying Preferred States of Objects Based on Frequencies 138*b* may further determine that a state of one or more Objects 615 or one or more Objects 616 represented in Collection of Object Representations 525*a*2 has not occurred with a frequency that is greater than a threshold. Logic for Identifying Preferred States of Objects Based on Frequencies 138*b* may further determine that a state of one or more Objects 615 or one or more Objects 616 represented in Collection of Object Representations 525*a*3 has occurred with a frequency that is greater than a threshold. In response, Purpose Structuring Unit 136 may generate Purpose Representation 162 that includes Collection of Object Representations 525*a*3, one or more Object Representations 625 of Collection of Object Representations 525*a*3, and/or other elements. Such Purpose Representation 162 may then be provided to Purpose Structure 161, thereby enabling Device 98, Avatar 605, system, or application to learn a purpose. Processing of Collections of Object Representations 525*a*4-525*a*5, etc. may follow a similar process as described with respect to Collections of Object Representations 525*a*1-525*a*2**.

Logic for Identifying Preferred States of Objects Based on Frequencies **138*b* may include any logic, functions, algorithms, code, and/or other elements to enable its functionalities. An example of Logic's for Identifying Preferred States of Objects Based on Frequencies 138*b* code for identifying, based on a frequency being higher than a threshold, a state of Object 615 or Object 616 as a preferred state of the Object 615 or Object 616** that may be learned as a purpose may include the following code:

```
frequencyThreshold=10;//frequency threshold defined
detectedObjects=detectObjects ( )//detect objects in the
   surrounding and store them in detectedObjects array for
   (int i=0; i<detectedObjects.length; i++) {//process each
   object in detectedObjects array
   if (detectedObjects [i]. Frequency>frequency Thresh-
      old) {/*determine if frequency of detectedObjects [i]
      object's state is higher than frequency threshold*/
      preferredStateOfObject =detectedObjects [i];//pre-
      ferred state of object is detectedObjects [i] for pur-
      pose learning Break;//stop the for loop
   }
}
. . .
```

In some embodiments, Logic for Identifying Preferred States of Objects Based on Causations **138*c* may receive Collections of Object Representations 525 from Object Processing Unit 115. Logic for Identifying Preferred States of Objects Based on Causations 138*c* may determine that a state of one or more Objects 615 or one or more Objects 616 represented in a particular Collection of Object Representations 525 or one or more Object Representations 625 thereof may be caused by (i.e. by manipulation, etc.) another one or more Objects 615 or one or more Objects 616 represented in the Collection of Object Representations 525 or one or more Object Representations 625 thereof. Logic for Identifying Preferred States of Objects Based on Causations 138*c* may determine that such state of one or more Objects 615 or one or more Objects 616 caused by another one or more Objects 615 or one or more Objects 616 may be a preferred state of the one or more Objects 615 or one or more Objects 616. Logic for Identifying Preferred States of Objects Based on Causations 138*c* may provide a similar functionality to Device 98, Avatar 605, system, or application as a child's learning its purpose by imitating a trusted, related, affiliated, associated, and/or other objects (i.e. parents, friends, family, teachers, other objects, etc.) in its environment. In one example, a person Object 615 or Object 616 closing a bathroom door Object 615 or Object 616 may indicate that a preferred state of the bathroom door Object 615 or Object 616 is closed. In another example, a person Object 615 or Object 616 moving a toy Object 615 or Object 616 into a toy basket may indicate that a preferred state of the toy Object 615 or Object 616 is in the toy basket so that a room is organized. In a further example, a person Object 615 or Object 616 placing Device 98 or Avatar 605 into a charger may indicate that a preferred state of Device 98 or Avatar 605 is in the charger so that Device 98 or Avatar 605 is charged. In some aspects, Object 615 or Object 616 that causes a state of another one or more Objects 615 may be or include an Object 615 or Object 616 that occurs frequently in Device's 98 or Avatar's 605 surrounding. The frequently occurring Object 615 or Object 616 may be determined based on it occurring at least a threshold number of times or at least a threshold duration of time. The threshold can be defined by a user, by a system administrator, or automatically by the system based on experience, learning, testing, inquiry, analysis, synthesis, or other techniques, knowledge, input, etc. In other aspects, Object 615 or Object 616 that causes a state of another one or more Objects 615 may be or include a trusted object. In some designs, Object 615 or Object 616 trusted by Device 98 or Avatar 605 may be or include Object 615 or Object 616 that provides a benefit to Device 98 or Avatar 605 (i.e. charges Device 98 or Avatar 605, maintains Device 98 or Avatar 605, repairs Device 98 or Avatar 605, etc.). In other designs, Object 615 or Object 616 trusted by Device 98 or Avatar 605 may be or include Object 615 or Object 616 that Device 98 or Avatar 605 recognizes to be a teacher to Device 98 or Avatar 605 (i.e. any object that manipulates other objects that may show to Device 98 or Avatar 605 their resulting states, etc.). Any features, functionalities, and/or embodiments of Picture Recognizer 117***a* and/or other object recognition techniques, and/or those known in art, can be used in such recognizing. In further designs, Object 615 or Object 616 trusted by Device 98 or Avatar 605 may be or include Object 615 or Object 616 that is related, affiliated, or in any other way associated with Device 98 or Avatar 605 (i.e. based on hardcoding/predetermined, an object with a similar identifier, an object observed to be of a similar type, frequently occurring object, object observed performing similar operations or functions, an object in communication with Device 98 or Avatar 605, based on receiving an indication of a relationship with Device 98 or Avatar 605 from the object, another object, or another source, an object in any relationship with Device 98 or Avatar 605, etc.). For example, Device 98 or Avatar 605 may determine that a particular person Object 615 or Object 616 is a trusted Object 615 or Object 616 based on the person Object 615 or Object 616 teaching Device 98 or Avatar 605 preferred states of one or more Object 615 or one or more Object 616. In further aspects, Device 98, Avatar 605, system, or application may observe Object 615 or Object 616 causing itself to be in a state that Logic for Identifying Preferred States of Objects Based on Causations 138*c* may then identify as a preferred state of Device 98, Avatar 605, system, or application. For example, Device 98 or Avatar 605 observing another device or avatar of a same type placing itself into a charger may indicate that a preferred state of Device 98 or Avatar 605 is in a charger. In other designs, Device 98 or Avatar 605 may observe Object 615 or Object 616 causing Device 98 or Avatar 605 to be in a state that Logic for Identifying Preferred States of Objects Based on Causations 138*c* may then identify as a preferred state of Device 98 or Avatar 605.

As an illustrative example, in processing Collections of Object Representations 525*a*1-525*a*5, etc. from Object Processing Unit 115, Logic for Identifying Preferred States of Objects Based on Causations 138*c* may determine that a state of one or more Objects 615 or one or more Objects 616 represented in Collection of Object Representations 525*a*1 was not caused by another Object 615 or Object 616. Logic for Identifying Preferred States of Objects Based on Causations 138*c* may further determine that a state of one or more Objects 615 or one or more Objects 616 represented in Collection of Object Representations 525*a*2 was not caused by another Object 615 or Object 616. Logic for Identifying Preferred States of Objects Based on Causations 138*c* may further determine that a state of one or more Objects 615 or one or more Objects 616 represented in Collection of Object Representations 525*a*3 was caused by another Objects 615 or Objects 616. In response, Purpose Structuring Unit 136 may generate Purpose Representation 162 that includes Collection of Object Representations 525*a*3, one or more Object Representations 625 of Collection of Object Representations 525*a*3, and/or other elements. Such Purpose Representation 162 may then be provided to Purpose Structure 161, thereby enabling Device 98, Avatar 605, system, or application to learn a purpose. Processing of Collections of Object Representations 525*a*4-525*a*5, etc. may follow a similar process as described with respect to Collections of Object Representations 525*a*1-525*a*2. Logic for Identifying Preferred States of Objects Based on Causations 138*c* may include any logic, functions, algorithms, code, and/or other elements to enable its functionalities. An example of Logic's for Identifying Preferred States of Objects Based on Causations 138*c* code for recognizing one Object 615 or Object 616 causing (i.e. by manipulation, etc.) a state of another Object 615 or Object 616, and identifying the state of the another Object 615 or Object 616 as a preferred state of the another Object 615 or Object 616 that may be learned as a purpose may include the following code:

```
detectedObjects = detectObjects( ); //detect objects in the surrounding and store them in detectedObjects array
for (int i = 0; i < detectedObjects. length; i++) { //process each object in detectedObjects array
  if (detectedObjects[i].ChangedState = true) { /*determine if detectedObjects[i] object changed state and
                                                        is therefore manipulated object*/
    manipulatingObject = findManipulatingObject(detectedObjects[i], detectedObjects); /*find if another object
                        in detectedObjects array caused change of state of detectedObjects[i] object*/
    if (manipulatingObject != null) { //manipulating object found
      preferredStateOfObject = detectedObjects[i]; /*preferred state of object is detectedObjects[i]
                                                        for purpose learning*/
    Break; //stop the for loop
    }
  }
}
...
```

In some embodiments, Logic for Identifying Preferred States of Objects Based on Representations 138*d* may receive Collections of Object Representations 525 from Object Processing Unit 115. One or more Collections of Object Representations 525 may include Object Representation 625 representing Object 615 (i.e. picture, display, magazine, etc.) or Object 616 (i.e. simulated picture, simulated display, simulated magazine, etc.) that itself includes one or more representations of one or more Objects 615 or one or more Objects 616. Logic for Identifying Preferred States of Objects Based on Representations 138*d* may use Object Processing Unit 115 or elements thereof to process the one or more representations of the one or more Objects 615 or one or more Objects 616 and generate one or more derivative Collections of Object Representations 525 representing the one or more Objects 615 or one or more Objects 616. Logic for Identifying Preferred States of Objects Based on Representations 138*d* may determine that a state of one or more Objects 615 or one or more Objects 616 represented in a derivative Collection of Object Representations 525 or one or more Object Representations 625 thereof may be a preferred state of the one or more Objects 615 or one or more Objects 616. Logic for Identifying Preferred States of Objects Based on Representations 138*d* may provide a similar functionality to Device 98, Avatar 605, system, or application as a child's learning its purpose from descriptive material (i.e. pictures, video, video games, text, verbal descriptions, sound, etc.) instead of personally witnessing states of one or more objects. In some aspects, Logic for Identifying Preferred States of Objects Based on Representations 138*d* may provide a derivative Collection of Object Representations 525 to Logic for Identifying Preferred States of Objects Based on Indications 138*a* that may identify a preferred state of one or more Objects 615 or one or more Objects 616 represented in the derivative Collection of Object Representations 525 by receiving an indication of the preferred state of the one or more Objects 615 or one or more Objects 616 from: an Object 615 or Object 616 represented in the derivative Collection of Object Representations 525, or an Object 615 or Object 616 in Device's 98 or Avatar's 605 surrounding. In one example, a person Object 615 or Object 616, observed in Device's 98 or Avatar's 605 surrounding, making a gesture (i.e. pointing, making a head nod, extending both arms, etc.) toward a closed bathroom door Object 615 or Object 616, observed in a video on the display, may indicate that a preferred state of the bathroom door Object 615 or Object 616 is closed. In another example, a person Object 615 or Object 616, heard in a video on the display, making a sound including recognizable speech (i.e. "put the toy in the toy basket", "toy should be in the toy basket", etc.) may indicate that a preferred state of a toy Object 615 or Object 616, observed in the video on the display, is in a toy basket so that a room is organized. In a further example, a device Object's 615 or Object's 616, observed in Device's 98 or Avatar's 605 surrounding, electrical/magnetic/electromagnetic signal may indicate that a preferred state of Device 98 or Avatar 605, observed in a picture, is in a charger so that Device 98 or Avatar 605 is charged. In further examples, similar functionalities apply to other physical, audio, and/or electrical/magnetic/electromagnetic indications. In other aspects, Logic for Identifying Preferred States of Objects Based on Representations 138*d* may provide a derivative Collection of Object Representations 525 to Logic for Identifying Preferred States of Objects Based on Frequencies 138*b* that may identify a preferred state of one or more Objects 615 or one or more Objects 616 represented in the derivative Collection of Object Representations 525 by identifying frequently occurring states of the one or more Objects 615 or one or more Objects 616. In one example, frequently observing, in a video on a display, a closed bathroom door Object 615 or Object 616 may indicate that a preferred state of the bathroom door Object 615 or Object 616 is closed. In another example, frequently observing, in one or more pictures, a toy Object 615 or Object 616 in a toy basket may indicate that a preferred state of toy Object 615 or Object 616 is in the toy basket so that a room is organized. In another example, frequently observing, in a magazine, Device 98 or Avatar 605 in a charger may indicate that a preferred state of Device 98 or Avatar 605 is in the charger so that Device 98 or Avatar 605 is charged. In other aspects, Logic for Identifying Preferred States of Objects Based on Representations 138*d* may provide a derivative Collection of Object Representations 525 to Logic for Identifying Preferred States of Objects Based on Causations 138*c* that may identify a preferred state of one or more Objects 615 or one or more Objects 616 represented in the derivative Collection of Object Representations 525 by identifying a state of the one or more Objects 615 or one or more Objects 616 caused by another Object 615 or Object 616. In one example, a person Object 615 or Object 616, observed in a video on a display, may close a bathroom door Object 615 or Object 616, observed in the video on the display, indicating that a preferred state of the bathroom door Object 615 or Object 616 is closed. In another example, a person Object 615 or Object 616, observed in a video on a display, moving a toy Object 615 or Object 616, observed in the video on the display, into a toy basket may indicate that a preferred state of the toy Object 615 or Object 616 is in the toy basket so that a room is organized. In a further example, a person Object 615 or Object 616, observed in a video on a display, placing Device 98 or Avatar 605, observed in the video on the display, into a charger may indicate that a preferred state of Device 98 or Avatar 605 is in the charger so that Device 98 or Avatar 605 is charged.

As an illustrative example, in processing Collections of Object Representations 525*a*1-525*a*5, etc. from Object Processing Unit 115, Logic for Identifying Preferred States of Objects Based on Representations 138*d* may determine that Collection of Object Representations 525*a*1 does not include Object Representation 625 representing Object 615 or Object 616 that itself includes one or more representations of one or more Objects 615 or one or more Objects 616. Logic for Identifying Preferred States of Objects Based on Representations 138*d* may further determine that Collection of Object Representations 525*a*2 does not include Object Representation 625 representing Object 615 or Object 616 that itself includes one or more representations of one or more Objects 615 or one or more Objects 616. Logic for Identifying Preferred States of Objects Based on Representations 138*d* may further determine that Collection of Object Representations 525*a*3 includes Object Representation 625 representing Object 615 or Object 616 that itself includes one or more representations of one or more Objects 615 or one or more Objects 616. In response, Purpose Structuring Unit 136 may generate Purpose Representation 162 that includes the one or more representations of one or more Objects 615 or one or more Objects 616, and/or other elements. Such Purpose Representation 162 may then be provided to Purpose Structure 161, thereby enabling Device 98, Avatar 605, system, or application to learn a purpose. Processing of Collections of Object Representations 525*a*4-

**525*a*5, etc. may follow a similar process as described with respect to Collections of Object Representations 525*a*1-525*a*2**.

Logic for Identifying Preferred States of Objects Based on Representations **138*d* may include any logic, functions, algorithms, code, and/or other elements to enable its functionalities. An example of Logic's for Identifying Preferred States of Objects Based on Representations 138*d* code for recognizing a pointing gesture by one Object 615 or Object 616, finding another Object 615 or Object 616 that includes a representation of a derivative Object 615 or Object 616 to which the one Object 615 or Object 616 is pointing, and identifying the state of the derivative Object 615 or Object 616 as a preferred state of the derivative Object 615 or Object 616** that may be learned as a purpose may include the following code:

```
detectedObjects = detectObjects( ); //detect objects in the surrounding and store them in detectedObjects array
for (int i = 0; i < detectedObjects.length; i++) { //process each object in detectedObjects array
  if (detectedObjects[i]. Gesture = "pointing gesture") { /*determine if detectedObjects [i] object is
                                                                        making pointing gesture*/
    pointedObject = findPointedObject(detectedObjects[i], detectedObjects); /*find object in detectedObjects array
                                                              to which detectedObjects[i] object is pointing*/
    derivative DetectedObjects = detectDerivativeObjects(pointedObject); /*detect derivative objects represented in
                                               the pointedObject and store them in derivativeDetectedObjects array*/
    derivativePointedObject = findDerivativePointedObject(detectedObjects[i], derivativeDetectedObjects); /*find
                                object in derivativeDetectedObjects array to which detectedObjects[i] object is pointing*/
    preferredStateOfObject = derivativePointedObject; /*preferred state of object is derivativePointedObject
                                                                                    for purpose learning*/
    Break; //stop the for loop
  }
}
...
```

In some embodiments, Priority Index 545 (i.e. may also be referred to as priority, priority information, and/or other suitable name or reference, etc.) can be used in processing elements of different priority. Priority Index 545 comprises functionality for storing any information indicating a priority, importance, and/or other ranking of the element in which it is included or with which it is associated. Priority Index 545 may comprise other functionalities. In one example, Priority Index 545 may be included in or associated with Purpose Representation 162. In another example, Priority Index 545 may be included in or associated with Collection of Object Representations 525, Object Representation 625, Object Property 630, Instruction Set 526, Extra Info 527, and/or other element. In some aspects, Priority Index 545 on a scale from 0 to 1 can be utilized, although, any other technique can also be utilized such as any numeric (i.e. 0.3, 1, 17, 58.2, 639, etc.), symbolic (i.e. high, medium, low, etc.), mathematical (i.e. a function, etc.), modeled, and/or others. Priority Index 545 of various elements can be defined by a user, by system administrator, or automatically by the system based on experience, learning, testing, inquiry, analysis, synthesis, or other techniques, knowledge, or input. Priority Index 545 may include any features, functionalities, and/or embodiments of the previously described importance index, and vice versa.

In some embodiments, Priority Index 545 can be determined or defined based on which Logic for Identifying Preferred States of Objects **138*a*-138*d* identified a preferred state of one or more Objects 615 or one or more Objects 616. In one example, a preferred state of one or more Objects 615 or one or more Objects 616 identified by Logic for Identifying Preferred States of Objects Based on Indications 138*a* (i.e. receiving an indication of a preferred state of one or more Objects 615 or one or more Objects 616, etc.) may indicate a high Priority Index 545 that can be included in or associated with Purpose Representation 162. In another example, a preferred state of one or more Objects 615 or one or more Objects 616 identified by Logic for Identifying Preferred States of Objects Based on Causations 138*c* (i.e. a trusted Object 615 or Object 616 causing a preferred state of one or more Objects 615 or one or more Objects 616, etc.) may indicate a medium Priority Index 545 that can be included in or associated with Purpose Representation 162. In general, any Priority Index 545 can be determined or defined based on a preferred state of one or more Objects 615 or one or more Objects 616 being identified by any of the Logics for Identifying Preferred States of Objects 138*a*-138*d*, etc. In other embodiments, Logic for Identifying Preferred States of Objects Based on Indications 138*a* comprises the functionality to determine or define Priority Index 545 based on an indication of priority from Object 615 or Object 616. For example, Object's 615 (i.e. person Object's 615, mechanical Object's 615, electronic Object's 615, etc.) or Object's 616 (i.e. simulated person Object's 616, simulated mechanical Object's 616, simulated electronic Object's 616, etc.) recognized speech (i.e. "this is high priority", "this is important", etc.), gesture (i.e. thumb up, etc.), electrical/magnetic/electromagnetic signal, or other indication may indicate a certain Priority Index 545 that can be included in or associated with Purpose Representation 162. In further embodiments, Logic for Identifying Preferred States of Objects Based on Frequencies 138*b* comprises the functionality to determine or define Priority Index 545 based on a frequency of a preferred state of one or more Objects 615 or one or more Objects 616. Given that Logic for Identifying Preferred States of Objects Based on Frequencies 138*b* may have already identified a preferred state of one or Objects 615 or one or more Objects 616 based on that state's frequency, Logic for Identifying Preferred States of Objects Based on Frequencies 138*b* may use the frequency information in Priority Index 545 determination. For example, a very frequently occurring preferred state of one or more Objects 615 or one or more Objects 616 may indicate a high Priority Index 545 that can be included in or associated with Purpose Representation 162. In another example, an infrequently occurring preferred state of one or more Objects 615 or one or more Objects 616 may indicate a low Priority Index 545 that can be included in or associated with Purpose Representation 162. In further embodiments, Logic for Identifying Preferred States of Objects Based on Causations 138*c* comprises the functionality to determine or define Priority Index 545 based on Object 615 or Object 616 causing a preferred state of one or more Objects 615 or one or more Objects 616. For example, a trusted, related, affiliated, associated, frequently occurring, or other Object 615 or Object 616 causing a preferred state of one or more Objects 615 or one or more Objects 616 may indicate a medium Priority Index 545 that can be included in or associated with Purpose Representation 162. In further embodiments, Logic for Identifying Preferred States of Objects Based on Representations 138***d* comprises the functionality to determine or define Priority Index 545 based a representation of priority of a preferred state of one or more Objects 615 or one or more Objects 616. For example, a number (i.e. 0.2, 0.7, 1, 33, 927.4, etc.) Object 615 or Object 616, symbol (i.e. exclamation point, arrow, alphanumeric symbol, text, etc.) Object 615 or Object 616, Object 615 or Object 616 colored in a particular color (i.e. red, blue, orange, green, etc.), Object 615 or Object 616 emitting an audio indication of priority, or other Object 615 or Object 616 may indicate a certain Priority Index 545 that can be included in or associated with Purpose Representation 162. In general, Priority Index 545 can be determined or defined using on any techniques, and/or those known in art. Priority Index 545 can be optionally omitted.

The foregoing embodiments provide examples of utilizing Logics for Identifying Preferred States of Objects 138*a*-138*d*, Purpose Representations 162, Priority Index 545, Collection of Object Representations 525, Object Representations 625, and/or other elements or techniques. It should be understood that any of these elements and/or techniques can be omitted, used in a different combination, or used in combination with other elements and/or techniques. In some aspects, although it is illustrated that Purpose Representation 162 includes Collection of Object Representations 525*a*3, it should be noted that Purpose Representation 162 may include one or more Object Representations 625 of Collection of Object Representations 525*a*3 (i.e. instead of Collection of Object Representations 525*a*3, etc.) that represent preferred states of one or more Objects 615 or one or more Objects 616 in alternate embodiments. This way, the system can focus on preferred states of specific one or more Objects 615 or one or more Objects 616 instead of an entire Collection of Object Representations 525 in the purpose learning and/or other functionalities. In other aspects, Device 98 or Avatar 605 may learn a purpose through positive or negative reinforcement (i.e. a child getting a candy reward from a parent for putting a toy in a toy basket or getting punished for not putting the toy in the toy basket). In general, any technique for identifying a preferred state of one or more objects can be used in alternate embodiments. One of ordinary skill in art will understand that the aforementioned techniques for determining, identifying, and/or learning one or more purposes of Device 98, Avatar 605, system, or application are described merely as examples of a variety of possible implementations, and that while all possible techniques for determining, identifying, and/or learning one or more purposes of Device 98, Avatar 605, system, or application are too voluminous to describe, other techniques, and/or those known in art, for determining, identifying, and/or learning one or more purposes of Device 98, Avatar 605, system, or application are within the scope of this disclosure.

Figure 64A:
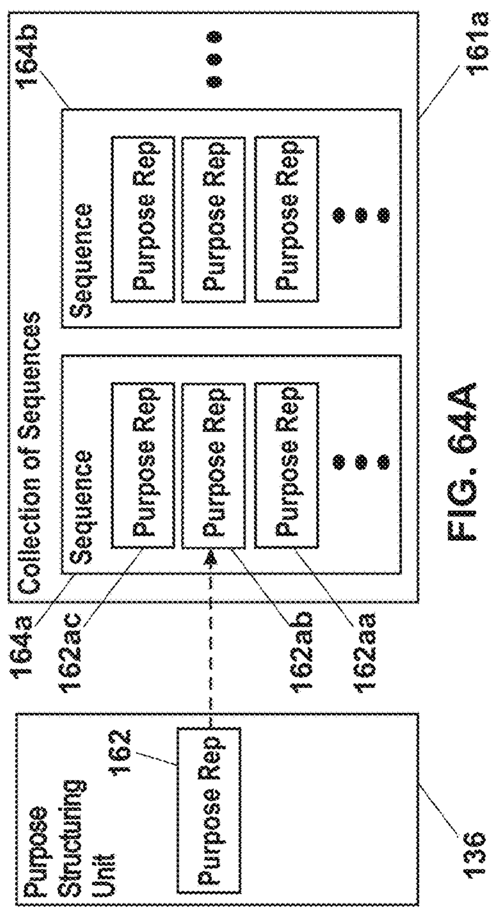
FIG. 64A illustrates an embodiment of utilizing Collection of Sequences 161*a* in learning a purpose.
Figure 64B:
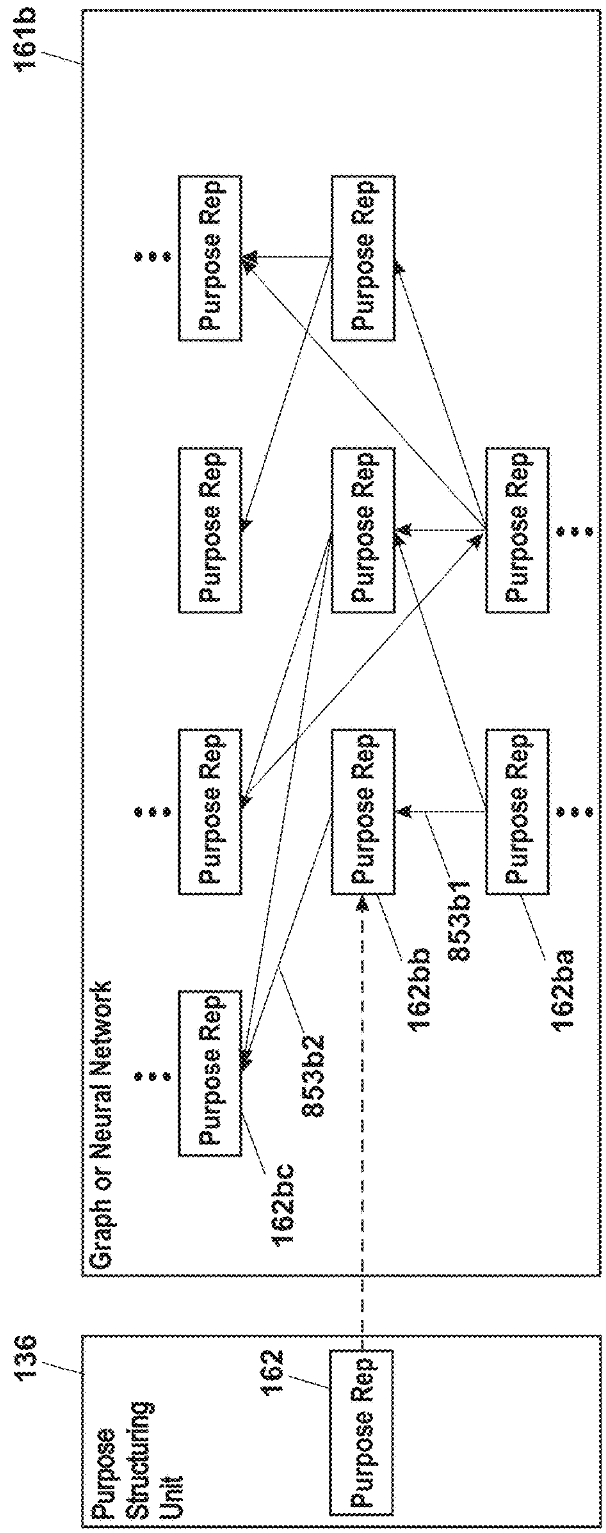
FIG. 64B illustrates an embodiment of utilizing Graph or Neural Network 161*b* in learning a purpose.

Referring to FIG. 64A-64B, some embodiments of Purpose Structure 161 are illustrated. Purpose Structure 161 comprises functionality for storing one or more purposes of Device 98, Avatar 605, system, or application, and/or other functionalities. Purpose Structure 161 comprises functionality for storing Purpose Representations 162, Collections of Object Representations 525, Object Representations 625, Priority Indices 545, Extra Info 527, and/or other elements or combination thereof. Such elements may be connected within Purpose Structure 161. In some designs, Purpose Structure 161 may store connected Purpose Representations 162 each including one or more Collections of Object Representations 525, Priority Index 545, and/or other elements. In other designs, Collections of Object Representations 525, Priority Index 545, and/or other elements of Purpose Representations 162 can be stored directly within Purpose Structure 161 without using Purpose Representations 162 as the intermediary holders, in which case Purpose Representations 162 can be optionally omitted. In some embodiments, Purpose Structure 161 may be or include Collection of Sequences 161*a* (later described). In other embodiments, Purpose Structure 161 may be or include Graph or Neural Network 161*b* (later described). In further embodiments, Purpose Structure 161 may be or include Collection of Purpose Representations (not shown, later described). In further embodiments, any Purpose Structure 161 (i.e. Collection of Sequences 161*a*, Graph or Neural Network 161*b*, Collection of Purpose Representations, etc.) can be used alone, in combination with other Purpose Structures 161, or in combination with other elements. In general, Purpose Structure 161 may be or include any data structure or data arrangement that can enable storing one or more purposes of Device 98, Avatar 605, system, or application. Purpose Structure 161 may reside locally on Device 98, Computing Device 70, or other local element, or remotely (i.e. remote Purpose Structure 161, etc.) on a remote computing device (i.e. server, cloud, etc.) accessible over a network or interface. In some aspects, Purpose Representations 162 and/or elements thereof stored in Purpose Structure 161 may be referred to as purposes, artificial purposes, or other suitable name or reference. In some aspects, Purpose Representation 162 may be referred to as node, vertex, element, or other similar name, and vice versa, therefore, the two may be used interchangeably herein depending on context. Purpose Structure 161 may include any hardware, programs, or combination thereof.

In some embodiments, Purpose Structure 161 from one Device 98, Avatar 605, or Consciousness Unit 110 can be used by one or more other Devices 98, Avatars 605, or Consciousness Units 110. Therefore, one or more purposes from one Device 98, Avatar 605, or Consciousness Unit 110 can be transferred to one or more other Devices 98, Avatars 605, or Consciousness Units 110. In one example, Purpose Structure 161 can be copied or downloaded to a file or other repository from one Device 98, Avatar 605, or Consciousness Unit 110 and used in/by another Device 98, Avatar 605, or Consciousness Unit 110. In a further example, Purpose Structure 161 or Purpose Representations 162 therein from one or more Device 98, Avatar 605, or Consciousness Unit 110 can be available on a server, cloud, or other system accessible by other Devices 98, Avatars 605, and/or Consciousness Units 110 over a network or interface. Once loaded into or accessed by a receiving Device 98, Avatar 605, or Consciousness Unit 110, the receiving Device 98, Avatar 605, or Consciousness Unit 110 can then implement one or more purposes from the originating Device 98, Avatar 605, and/or Consciousness Unit 110.

In some embodiments, multiple Purpose Structures 161 from multiple different Devices 98, Avatars 605, Consciousness Units 110, and/or other elements can be combined to accumulate collective purposes. In one example, one Purpose Structure 161 can be appended to another Purpose Structure 161 such as appending one Collection of Purpose Representations 161 to another Collection of Purpose Representations, appending one Collection of Sequences 161*a* to another Collection of Sequences 161*a*, appending one Sequence 164 to another Sequence 164, and/or appending other data structures or elements thereof. In another example, one Purpose Structure 161 can be copied into another Purpose Structure 161 such as copying one Collection of Purpose Representations into another Collection of Purpose Representations, copying one Collection of Sequences 161*a* into another Collection of Sequences 161*a*, copying one Sequence 164 into another Sequence 164, and/or copying other data structures or elements thereof. In a further example, in the case of Purpose Structure 161 being or including Graph or Neural Network 161*b* or graph-like data structure (i.e. neural network, tree, etc.), a union can be utilized to combine two or more Graphs or Neural Networks 161*b* or graph-like data structures. For instance, a union of two Graphs or Neural Networks 161*b* or graph-like data structures may include a union of their vertex (i.e. node, etc.) sets and their edge (i.e. connection, etc.) sets. Any other operations or combination thereof on graphs or graph-like data structures can be utilized to combine Graphs or Neural Networks 161*b* or graph-like data structures. In a further example, one Purpose Structure 161 can be combined with another Purpose Structure 161 through previously described learning processes where Purpose Representations 162 or elements thereof from Purpose Structuring Unit 136 may be applied onto Purpose Structure 161. In such implementations, instead of Purpose Representations 162 or elements thereof provided by Purpose Structuring Unit 136, the learning process may utilize Purpose Representations 162 or elements thereof from one Purpose Structure 161 to apply them onto another Purpose Structure 161. Any other techniques known in art including custom techniques for combining data structures can be utilized for combining Purpose Structures 161 in alternate implementations. In any of the aforementioned and/or other combining techniques, determining at least partial match of elements (i.e. nodes/vertices, edges/connections, etc.) can be utilized in determining whether an element from one Purpose Structure 161 matches an element from another Purpose Structure 161, and at least partially matching or otherwise acceptably similar elements may be considered a match for combining purposes in some designs. Any features, functionalities, and/or embodiments of Comparison 725 can be used in such match determinations. A combined Purpose Structure 161 can be offered as a network service (i.e. online application, cloud application, etc.), downloadable file, or other repository to all Devices 98, Avatars 605, Consciousness Units 110, and/or other devices or applications configured to utilize the combined Purpose Structure 161. In one example, Device 98 including or interfaced with Consciousness Unit 110 having access to a combined Purpose Structure 161 can use the collective Purpose Representations 162 therein as one or more purposes of Device 98. In another example, Avatar 605 including or interfaced with Consciousness Unit 110 having access to a combined Purpose Structure 161 can use the collective Purpose Representations 162 therein as one or more purposes of Avatar 605.

Referring to FIG. 64A, an embodiment of utilizing Collection of Sequences 161*a* in learning a purpose is illustrated. Collection of Sequences 161*a* may include one or more Sequences 164 such as Sequence 164*a*, Sequence 164*b*, etc. Sequence 164 may include any number of Purpose Representations 162 and/or other elements. In some aspects, Sequence 164 may include related Purpose Representations 162. In other aspects, Sequence 164 may include all Purpose Representations 162 in which case Collection of Sequences 161*a* as a distinct element can be optionally omitted. In further aspects, Connections 853 can optionally be used to connect Purpose Representations 162 in Sequence 164. For example, one Purpose Representation 162 can be connected not only with a next Purpose Representation 162 in Sequence 164, but also with any other Purpose Representation 162 in Sequence 164, thereby creating alternate routes or shortcuts through Sequence 164. Any number of Connections 853 connecting any Purpose Representations 162 can be utilized.

In some embodiments, Purpose Representations 162 can be applied onto Collection of Sequences 161*a* in a learning or training process. For instance, Purpose Structuring Unit 136 generates Purpose Representation 162 and the system applies it onto Collection of Sequences 161*a*, thereby implementing learning Device's 98, Avatar's 605, system's, or application's purpose. In some aspects, the system can perform Comparisons 725 of the incoming Purpose Representation 162 from Purpose Structuring Unit 136 with Purpose Representations 162 in Sequences 164 of Collection of Sequences 161*a* to find Sequence 164 that comprises Purpose Representation 162 that at least partially matches the incoming Purpose Representation 162. If such at least partially matching Purpose Representation 162 is not found in any Sequence 164, the system may insert Purpose Representation 162 from Purpose Structuring Unit 136 into: one of the Sequences 164, or a newly generated Sequence 164. On the other hand, if such at least partially matching Purpose Representation 162 is found in any Sequence 164, the system may optionally omit inserting Purpose Representation 162 from Purpose Structuring Unit 136 into Collection of Sequences 161*a* as inserting a similar Purpose Representation 162 may not add much or any additional purpose. This approach can save storage resources and limit the number of elements that may later need to be processed or compared. For example, the system can perform Comparisons 725 of an incoming Purpose Representation 162 from Purpose Structuring Unit 136 with Purpose Representations 162 from Sequences 164*a*-164*b*, etc. of Collection of Sequences 161*a*. In the case that at least partially matching Purpose Representation 162 is not found in Collection of Sequences 161*a*, the system may insert the incoming Purpose Representation 162 (i.e. the inserted Purpose Representation 162 may be referred to as Purpose Representation 162*ab* for clarity and alphabetical order, etc.) into Sequence 164*a*. In some aspects, the system may select Sequence 164*a* and/or a place within Sequence 164*a* for inserting the incoming Purpose Representation 162 based on Sequence 164*a* including Purpose Representations 162 related to the incoming Purpose Representation 162. In other aspects, the system may select Sequence 164*a* and/or a place within Sequence 164*a* for inserting the incoming Purpose Representation 162 based on Sequence 164*a* including Purpose Representations 162 whose Collections of Object Representations 525 represent similar one or more Objects 615 or one or more Objects 616 as one or more Objects 615 or one or more Objects 616 represented in Collection of Object Representations 525 included in the incoming Purpose Representation 162. In further aspects, the system may select Sequence 164*a* and/or a place within Sequence 164*a* for inserting the incoming Purpose Representation 162 based on a causal relationship (later described) between the incoming Purpose Representation 162 and Purpose Representations 162 in Sequence 164*a*. In further aspects, the system may select a place within Sequence 164*a* for inserting the incoming Purpose Representation 162 based on Priority Indices 545 of the incoming Purpose Representation 162 and Purpose Representations 162 in Sequence 164*a*. Specifically, for instance, the system may insert the incoming Purpose Representation 162 as Purpose Representation 162*ab* in between Purpose Representation 162*aa* with a lower Priority Index 545 and Purpose Representation 162*ac* with a higher Priority Index 545. In further aspects, the incoming Purpose Representation 162 from Purpose Structuring Unit 136 can be inserted in any Sequence 164 and/or a place within Sequence 164 where it may advance a higher priority, longer term, or other purpose. In general, the incoming Purpose Representation 162 from Purpose Structuring Unit 136 can be inserted in any Sequence 164 and/or a place within Sequence 164. In a further case where at least partially matching Purpose Representation 162 from Purpose Structuring Unit 136 is not found in Collection of Sequences 161*a*, the system may generate a new Sequence 164 and insert the incoming Purpose Representation 162 into the new Sequence 164.

Referring to FIG. 64B, an embodiment of utilizing Graph or Neural Network 161*b* in learning a purpose is illustrated. Graph or Neural Network 161*b* may include a number of Nodes 852 (i.e. also may be referred to as nodes, neurons, vertices, or other suitable names or references, etc.) connected by Connections 853. Purpose Representations 162 are shown instead of Nodes 852 to simplify illustration as Node 852 may include Purpose Representation 162 and/or other elements or functionalities. Therefore, Purpose Representations 162 and Nodes 852 can be used interchangeably herein depending on context. In some designs, Graph or Neural Network 161*b* may be or include an unstructured graph where any Purpose Representation 162 can be connected to any one or more Purpose Representations 162, and/or itself. In other designs, Graph or Neural Network 161*b* may be or include a directed graph where Purpose Representations 162 can be connected to other Purpose Representations 162 using directed Connections 853. In further designs, Graph or Neural Network 161*b* may be or include any type or form of a graph such as unstructured graph, directed graph, undirected graph, cyclic graph, acyclic graph, custom graph, other graph, and/or those known in art. In further designs, Graph or Neural Network 161*b* may be or include any type or form of a neural network such as a feed-forward neural network, a back-propagating neural network, a recurrent neural network, a convolutional neural network, a deep neural network, a spiking neural network, a custom neural network, others, and/or those known in art. Any combination of Purpose Representations 162, Connections 853, and/or other elements or techniques can be implemented in various embodiments of Graph or Neural Network 161*b*. Graph or Neural Network 161*b* may refer to a graph, a neural network, or any combination thereof. In some aspects, a neural network may be a subset of a general graph as a neural network may include a graph of neurons or nodes. In other aspects, Connections 853 in Graph or Neural Network 161*b* may indicate priority or order in which purposes may be implemented.

In some embodiments, Purpose Representations 162 can be applied onto Graph or Neural Network 161*b* in a learning or training process. For instance, Purpose Structuring Unit 136 generates Purpose Representation 162 and the system applies it onto Graph or Neural Network 161*b*, thereby implementing learning Device's 98, Avatar's 605, system's, or application's purpose. In some aspects, the system can perform Comparisons 725 of an incoming Purpose Representation 162 from Purpose Structuring Unit 136 with Purpose Representations 162 in Graph or Neural Network 161*b* to find Purpose Representation 162 that at least partially matches the incoming Purpose Representation 162. If such at least partially matching Purpose Representation 162 is not found in Graph or Neural Network 161*b*, the system may insert the incoming Purpose Representation 162 into Graph or Neural Network 161*b* and connect the inserted Purpose Representation 162 to a preceding and/or subsequent Purpose Representations 162 in Graph or Neural Network 161*b*. On the other hand, if such at least partially matching Purpose Representation 162 is found in Graph or Neural Network 161*b*, the system may optionally omit inserting the incoming Purpose Representation 162 into Graph or Neural Network 161*b* as inserting a similar Purpose Representation 162 may not add much or any additional purpose. For example, the system can perform Comparisons 725 of an incoming Purpose Representation 162 from Purpose Structuring Unit 136 with Purpose Representations 162 from Graph or Neural Network 161*b*. In the case that at least partially matching Purpose Representation 162 is not found in Graph or Neural Network 161*b*, the system may insert the incoming Purpose Representation 162 (i.e. the inserted Purpose Representation 162 may be referred to as Purpose Representation 162*bb* for clarity and alphabetical order, etc.) into Graph or Neural Network 161*b*. The system may also connect the inserted Purpose Representation 162*bb* to Purpose Representation 162*ba* with Connection 853*b*1 and connect the inserted Purpose Representation 162*bb* to Purpose Representation 162*bc* with Connection 853*b*2. In some aspects, the system may connect the incoming Purpose Representation 162 with Purpose Representations 162 in Graph or Neural Network 161*b* based on Purpose Representations 162 in Graph or Neural Network 161*b* being related to the incoming Purpose Representation 162. In other aspects, the system may connect the incoming Purpose Representation 162 with Purpose Representations 162 in Graph or Neural Network 161*b* based on Purpose Representations 162 in Graph or Neural Network 161*b* whose Collections of Object Representations 525 represent similar one or more Objects 615 or one or more Objects 616 as one or more Objects 615 or one or more Objects 616 represented in Collection of Object Representations 525 included in the incoming Purpose Representation 162. In further aspects, the system may connect the incoming Purpose Representation 162 with Purpose Representations 162 in Graph or Neural Network 161*b* based on a causal relationship (later described) between the incoming Purpose Representation 162 and Purpose Representations 162 in Graph or Neural Network 161*b*. In further aspects, the system may connect the incoming Purpose Representation 162 with Purpose Representations 162 in Graph or Neural Network 161*b* based on Priority Indices 545 of the incoming Purpose Representation 162 and Purpose Representations 162 in Graph or Neural Network 161*b*. Specifically, for instance, the system may connect the inserted Purpose Representation 162*bb* with Purpose Representation 162*ba* having a lower Priority Index 545 and Purpose Representation 162*bc* having a higher Priority Index 545. In further aspects, the incoming Purpose Representation 162 can be inserted and/or connected with one or more Purpose Representations 162 in any path in Graph or Neural Network 161*b* where it may advance a higher priority, longer term, or other purpose. In general, the incoming Purpose Representation 162 from Purpose Structuring Unit 136 can be inserted anywhere in Graph or Neural Network 161*b*.

In some embodiments, Graph or Neural Network 161*b* may include a number of priority levels (not shown). In such embodiments, Purpose Representations 162 may be organized or grouped in the priority levels. In some aspects, the priority levels may relate to Priority Indices 545, and vice versa, where each priority level may include Purpose Representations 162 having a certain Priority Index 545 or a range of Priority Indices 545. In one example, Purpose Representation 162 at one priority level of Graph or Neural Network 161*b* may be connected to Purpose Representation 162 in a higher priority level of Graph or Neural Network 161*b* by an outgoing Connection 853, and so on, indicating an order of purpose priorities in a path through Graph or Neural Network 161*b*. In another example, Purpose Representation 162 in one priority level of Graph or Neural Network 161*b* may be connected to Purpose Representation 162 in a lower priority level of Graph or Neural Network 161*b* by an outgoing Connection 853 indicating that some purposes may be repeated after being previously implemented or may be purposes to which the system returns in the absence of higher priority purposes or for other reasons. Specifically, for instance, a purpose may be for Device 98 or Avatar 605 to charge in a charger, a purpose then may be for Device 98 or Avatar 605 to open a door Object 615 or Object 616 to enter a room, a purpose then may be for Device 98 or Avatar 605 to move various toy Objects 615 or Object 616 into a toy basket to organize the room, and, after being energy-depleted, a purpose then may be for Device 98 or Avatar 605 to again charge in the charger. In some designs, purpose priorities and/or priority levels can be re-prioritized, re-sorted, or otherwise rearranged based on the status of Device 98 or Avatar 605, situation, and/or other information. Furthermore, in an example of a purpose learning or training process involving Graph or Neural Network 161*b* that includes priority levels, the system can perform Comparisons 725 of an incoming Purpose Representation 162 from Purpose Structuring Unit 136 with Purpose Representations 162 at a similar priority level (i.e. based on similar Priority Indices 545, etc.) in Graph or Neural Network 161*b*. In the case that at least partially matching Purpose Representation 162 is not found at the similar priority level in Graph or Neural Network 161*b*, the system may insert the incoming Purpose Representation 162 into Graph or Neural Network 161*b* at the similar level of priority as its Priority Index 545 and connect the inserted Purpose Representation 162 to Purpose Representations 162 in other priority levels of Graph or Neural Network 161*b*. In other embodiments, priority levels can be omitted.

In some embodiments, Collection of Purpose Representations (not shown) can be utilized for learning a purpose. Collection of Purpose Representations may include any number of Purpose Representations 162. Purpose Representations 162 in Collection of Purpose Representations may be unconnected. In some designs, Purpose Representations 162 can be applied onto Collection of Purpose Representations in a learning or training process. For instance, Purpose Structuring Unit 136 generates Purpose Representation 162 and the system applies it onto Collection of Purpose Representations, thereby implementing learning Device's 98, Avatar's 605, system's, or application's purpose. In some aspects, the system can perform Comparisons 725 of the incoming Purpose Representation 162 from Purpose Structuring Unit 136 with Purpose Representations 162 in Collection of Purpose Representations to find Purpose Representation 162 that at least partially matches the incoming Purpose Representation 162. If such at least partially matching Purpose Representation 162 is not found in Collection of Purpose Representations, the system may insert the incoming Purpose Representation 162 into Collection of Purpose Representations. On the other hand, if such at least partially matching Purpose Representation 162 is found in Collection of Purpose Representations, the system may optionally omit inserting the incoming Purpose Representation 162 into Collection of Purpose Representations as inserting a similar Purpose Representation 162 may not add much or any additional purpose.

In some embodiments, a causal relationship between an incoming Purpose Representation 162 from Purpose Structuring Unit 136 and Purpose Representations 162 in Purpose Structure 161 (i.e. Collection of Sequences 161*a*, Graph or Neural Network 161*b*, Collection of Purpose Representations, etc.) can be based on a similar one or more Objects 615 or one or more Objects 616 represented in their Collections of Object Representations 525. For example, Purpose Representation 162 from Purpose Structuring Unit 136 and Purpose Representation 162 from Purpose Structure 161 may both include Collection of Object Representations 525 representing a state of a door Object 615 or Object 616, thereby being related in a causal relationship. In other embodiments, a causal relationship between an incoming Purpose Representation 162 from Purpose Structuring Unit 136 and Purpose Representations 162 in Purpose Structure 161 can be based on a proximity (i.e. based on location Object Properties 630 and a proximity threshold, etc.) of one or more Objects 615 or one or more Objects 616 represented in their Collections of Object Representations 525. For example, a Purpose Representation 162 from Purpose Structuring Unit 136 may include Collection of Object Representations 525 representing Device 98 or Avatar 605 being in a room and Purpose Representation 162 from Purpose Structure 161 may include Collection of Object Representations 525 representing an open door Object 615 or Object 616 for that room, thereby the two being related in a causal relationship. In further embodiments, a causal relationship between an incoming Purpose Representation 162 from Purpose Structuring Unit 136 and Purpose Representations 162 in Purpose Structure 161 can be based on a physical connection among one or more Objects 615 or one or more Objects 616 represented in their Collections of Object Representations 525. For example, Purpose Representation 162 from Purpose Structuring Unit 136 may include Collection of Object Representations 525 representing an organized room and Purpose Representation 162 from Purpose Structure 161 may include Collection of Object Representations 525 representing an open door Object 615 or Object 616 for that room, thereby the two being related in a causal relationship. In further embodiments, a causal relationship between an incoming Purpose Representation 162 from Purpose Structuring Unit 136 and Purpose Representations 162 in Purpose Structure 161 can be based on affordances of one or more Objects 615 or one or more Objects 616 represented in their Collections of Object Representations 525. For example, Purpose Representation 162 from Purpose Structuring Unit 136 may include Collection of Object Representations 525 representing Device 98 or Avatar 605 being in a room (i.e. corresponding to Device's 98 or Avatar's 605 affordance of being able to be in the room, etc.) and Purpose Representation 162 from Purpose Structure 161 may include Collection of Object Representations 525 representing an open door Object 615 or Object 616 for that room (i.e. corresponding to the door object's affordance of being able to be opened, etc.), thereby the two being related in a causal relationship. In further embodiments, a causal relationship between an incoming Purpose Representation 162 from Purpose Structuring Unit 136 and Purpose Representations 162 in Purpose Structure 161 can be based on states of one or more Objects 615 or one or more Objects 616 represented in their Collections of Object Representations 525 being prerequisite to one another. For example, Purpose Representation 162 from Purpose Structuring Unit 136 may include Collection of Object Representations 525 representing Device 98 or Avatar 605 being in a room and Purpose Representation 162 from Purpose Structure 161 may include Collection of Object Representations 525 representing an open door Object 615 or Object 616 for that room, thereby the two being related in a causal relationship (i.e. door object must be opened for Device 98 or Avatar 605 to enter the room, etc.). In general, a causal relationship between an incoming Purpose Representation 162 from Purpose Structuring Unit 136 and Purpose Representations 162 in Purpose Structure 161 can be based on any other technique, and/or those known in art.

In some embodiments, grouped or related Devices 98 or Avatars 605 may communicate their Purpose Structures 161 or Purpose Representations 161 therein with each other to enable collective consciousness of the grouped or related Devices 98 or Avatars 605. This functionality may enable grouped or related Devices 98 or Avatars 605 to: aggregate individually learned purposes into collective purposes, prioritize their individual purposes in group context, operate for a purpose that brings highest benefit to the group, or the like. In some aspects, a highest priority Purpose Representation 162 from grouped or related Devices 98 or Avatars 605 may be selected as a purpose of the group. In other aspects, Purpose Representations 162 from particular Devices 98 or Avatars 605 (i.e. more important Devices 98 or Avatars 605, leaders, etc.) of grouped or related Devices 98 or Avatars 605 may be prioritized as purposes of the group. In further aspects, any Purpose Representation 162 from grouped or related Devices 98 or Avatars 605 may be selected as a purpose of the group. In some designs, the system may assign a same Purpose Representation 162 to all Devices 98 or Avatars 605 in grouped or related Devices 98 or Avatars 605 to implement a collective purpose. Such grouped or related Devices 98 or Avatars 605 may, therefore, perform same or similar operations according to their assigned same Purpose Representation 162. In other designs, the system may assign different Purpose Representation 162 to one or more Devices 98 or Avatars 605 in grouped or related Devices 98 or Avatars 605 to organize and/or coordinate Devices 98 or Avatars 605 in the group to most optimally implement a collective one or more purposes (i.e. swarms, wolf packs, hives, delegating specialized jobs, etc.). Such grouped or related Devices 98 or Avatars 605 may perform different operations according to their assigned different Purpose Representations 162.

The foregoing embodiments provide examples of utilizing various Purpose Structures 161, Purpose Representations 162, Nodes 852, Connections 853, and/or other elements or techniques. It should be understood that any of these elements and/or techniques can be omitted, used in a different combination, or used in combination with other elements and/or techniques. In some aspects, multiple simpler purposes may make up a longer or more complex purpose. Therefore, a longer or more complex purpose may be implemented by implementing the multiple simpler purposes. Purpose Representations 162 in Purpose Structure 161 may therefore be ordered, connected, grouped, arranged, or otherwise structured in various data structures. In other aspects, Purpose Representations 162 may include multiple (i.e. nested, grouped, etc.) Purpose Representations 162. For example, one Purpose Representation 162 may include its one or more Collections of Object Representations 525 as well as one or more other Purpose Representations 162 and/or their Collections of Object Representations 525. Specifically, for instance, Purpose Representation 162 representing a clean state of a beach Object 615 or Object 616, may include one or more Purpose Representations 162 representing states of garbage Objects 615 or Objects 616 being in a trash bin Object 615 or Object 616. In further aspects, once Device 98 or Avatar 605 implements a high priority purpose, Device 98 or Avatar 605 may pursue a lower priority purpose, and so on until the lowest priority purpose is implemented. When the lowest priority purpose is implemented, Device 98 or Avatar 605 may: (i) look for a purpose in its Purpose Structure 161 to repeat, (ii) look for a new purpose to learn, (iii) look to learn additional knowledge of Object 615 or Object 616 manipulations using curiosity or observation as previously described, or (iv) perform other operations. In some aspects, Purpose Representations 162 may be hardcoded into Purpose Structure 161, in which case Purpose Structuring Unit 136 can be optionally omitted. Such hardcoding can be performed by a user, system administrator, another system, another device, and/or another entity. Graph or Neural Network **161*b* may include any features, functionalities, and/or embodiments of Graph or Neural Network 160*b*, and vice versa. One of ordinary skill in art will understand that the aforementioned techniques for learning and/or storing one or more purposes of Device 98, Avatar 605, system, or application are described merely as examples of a variety of possible implementations, and that while all possible techniques for learning and/or storing one or more purposes of Device 98, Avatar 605, system, or application are too voluminous to describe, other techniques, and/or those known in art, for learning and/or storing one or more purposes of Device 98, Avatar 605**, system, or application are within the scope of this disclosure.

Referring now to Purpose Implementing Unit 181. Purpose Implementing Unit 181 comprises functionality for implementing (i.e. also may be referred to as achieving, accomplishing, pursuing, advancing, and/or other suitable name or reference, etc.) Device's 98, Avatar's 605, system's, or application's one or more purposes. Purpose Implementing Unit 181 comprises functionality for determining or selecting a purpose to implement. In some aspects, implementing a purpose may include effecting a preferred state of one or more Objects 615 or one or more Objects 616. Therefore, Purpose Implementing Unit 181 comprises functionality for effecting preferred states of Objects 615 (i.e. physical objects, etc.) or Objects 616 (i.e. computer generated objects, etc.). Purpose Implementing Unit 181 may comprise other functionalities. In some embodiments, one or more Objects 615 or one or more Objects 616, their states, and/or their properties may be detected or obtained, and provided by Object Processing Unit 115 as one or more Collections of Object Representations 525 to Purpose Implementing Unit 181. Purpose Implementing Unit 181 may determine or select Purpose Representation 162 from Purpose Structure 161 whose represented purpose to implement or pursue. In one example, such determination may be based on Purpose Representation 162 having a highest priority or highest Priority Index 545. In another example, such determination may be based on Purpose Representation 162 being at a highest priority level (i.e. if priority levels are used, etc.). In a further example, such determination may be based on Purpose Representation 162 being next in Sequence 164 of Purpose Representations 162. In a further example, such determination may be based on Purpose Representation 162 being connected with a previously implemented Purpose Representation 162. In a further example, such determination may be based on Purpose Representation 162 having a similar (i.e. as determined by Comparison 725, etc.) Collection of Object Representations

525 or portions (i.e. Object Representations 625, Object Properties 630, etc.) thereof to an incoming Collection of Object Representations 525 or portions thereof from Object Processing Unit 115 (i.e. this functionality enables opportunistic selection of purposes based on objects in the current situation or environment, etc.). In a further example, such determination may be based on a random selection of Purpose Representation 162. In general, Purpose Implementing Unit's 181 determination or selection of Purpose Representation 162 from Purpose Structure 161 whose represented purpose to implement or pursue may be based on any technique, and/or those known in art. Purpose Implementing Unit 181 may select or determine Instruction Sets 526 to be used or executed in Device's 98 or Avatar's 605 manipulations of one or more Objects 615 or one or more Objects 616 to effect a preferred state of the one or more Objects 615 or one or more Objects 616, thereby implementing a purpose. Purpose Implementing Unit 181 may provide such Instruction Sets 526 to Instruction Set implementation Interface 180 for execution. Purpose Implementing Unit 181 may include any features, functionalities, and/or embodiments of Unit for Object Manipulation Using Artificial Knowledge 170, and vice versa. Purpose Implementing Unit 181 may include any hardware, programs, or combination thereof.

Figure 65:
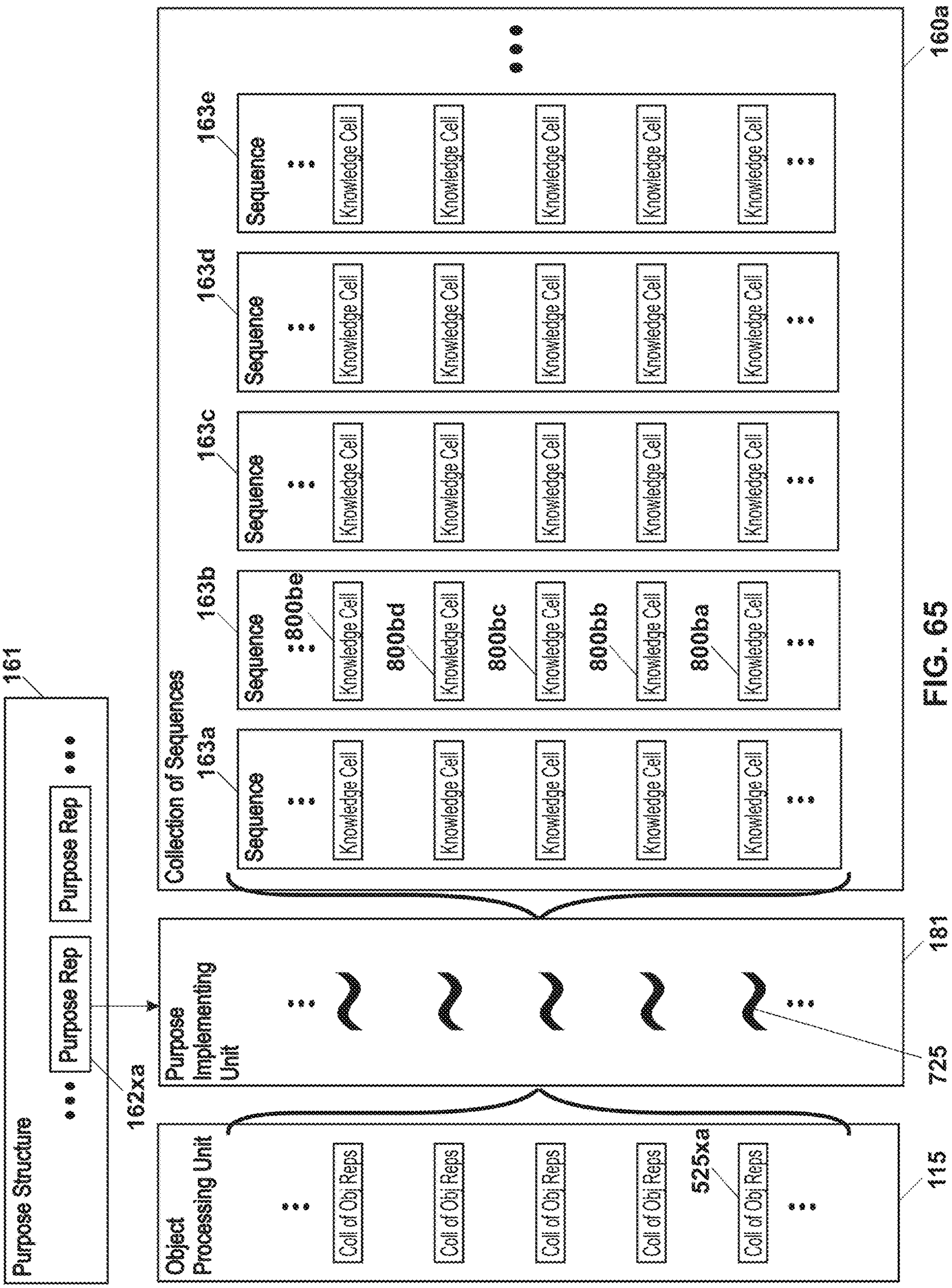
FIG. 65 illustrates an embodiment of utilizing Collection of Sequences 160*a* in implementing a purpose.

Referring to FIG. 65, an embodiment of utilizing Collection of Sequences 160*a* in implementing a purpose is illustrated. Collection of Sequences 160*a* may include knowledge (i.e. Sequences 163 of Knowledge Cells 800 comprising one or more Collections of Object Representations 525 correlated with any Instruction Sets 526, etc.) of: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, and/or observed manipulations of one or more Objects 616 as previously described. In some aspects, Device's 98 manipulations of one or more Objects 615 using Collection of Sequences 160*a* to effect their preferred state or Avatar's 605 manipulations of one or more Objects 616 using Collection of Sequences 160*a* to effect their preferred state may include determining or selecting a Sequence 163 of Knowledge Cells 800 or portions (i.e. Collections of Object Representations 525, Instruction Sets 526, sub-sequence, etc.) thereof from Collection of Sequences 160*a*.

In some embodiments, Purpose Implementing Unit 181 can perform Comparisons 725 of incoming one or more Collections of Object Representations 525 or portions (i.e. Object Representations 625, Object Properties 630, etc.) thereof from Object Processing Unit 115 with one or more Collections of Object Representations 525 or portions thereof in Knowledge Cells 800 from Sequences 163 of Collection of Sequences 160*a*. If at least partially matching one or more Collections of Object Representations 525 or portions thereof are found in a Knowledge Cell 800 from a Sequence 163 of Collection of Sequences 160*a*, the found Knowledge Cell 800 (i.e. also may be referred to as the current-state Knowledge Cell 800, etc.) may represent an initial Knowledge Cell 800 in a path for effecting a preferred state of one or more Objects 615 (i.e. implementing Device's 98 purpose, etc.) or one or more Objects 616 (i.e. implementing Avatar's 605 purpose, etc.). Furthermore, Purpose Implementing Unit 181 can perform Comparisons 725 of one or more Collections of Object Representations 525 or portions (i.e. Object Representations 625, Object Properties 630, etc.) thereof in Purpose Representation 162 from Purpose Structure 161 with one or more Collections of Object Representations 525 or portions thereof in Knowledge Cells 800 from the same Sequence 163 that includes the current-state Knowledge Cell 800. If at least partially matching one or more Collections of Object Representations 525 or portions thereof are found in a Knowledge Cell 800 from the same Sequence 163, the found Knowledge Cell 800 (i.e. also may be referred to as the preferred-state Knowledge Cell 800, etc.) may represent a final Knowledge Cell 800 in the path for effecting a preferred state of one or more Objects 615 (i.e. implementing Device's 98 purpose, etc.) or one or more Objects 616 (i.e. implementing Avatar's 605 purpose, etc.). Furthermore, Purpose Implementing Unit 181 may then determine a path between the current-state Knowledge Cell 800 and the preferred-state Knowledge Cell 800, and determine Instruction Sets 526 from Knowledge Cells 800 in the path, that when executed, effect the preferred state of the one or more Objects 615 or one or more Objects 616. For example, Purpose Implementing Unit 181 can perform Comparisons 725 of Collection of Object Representations 525*xa* or portions thereof from Object Processing Unit 115 with Collections of Object Representations 525 or portions thereof in Knowledge Cells 800 from Sequences 163*a*-163*e*, etc. of Collection of Sequences 160*a*. Purpose Implementing Unit 181 can make a first determination that Collection of Object Representations 525*xa* or portions thereof at least partially match Collection of Object Representations 525 or portions thereof in Knowledge Cell 800*ba* from Sequence 163*b*. Furthermore, Purpose Implementing Unit 181 may select Purpose Representation 162*xa* from Purpose Structure 161 to implement and may perform Comparisons 725 of Collection of Object Representations 525 or portions thereof in Purpose Representation 162*xa* with Collection of Object Representations 525 or portions thereof in Knowledge Cells 800 from Sequence 163*b*. Purpose Implementing Unit 181 can make a second determination, by performing Comparisons 725, that Collection of Object Representations 525 or portions thereof in Purpose Representation 162*xa* at least partially match Collection of Object Representations 525 or portions thereof in Knowledge Cell 800*be* from Sequence 163*b*. Furthermore, Purpose Implementing Unit 181 can make a third determination of a path of Knowledge Cells 800 between Knowledge Cell 800*ba* and Knowledge Cell 800*be*. In response to at least the first, the second, and/or the third determinations, Purpose Implementing Unit 181 may select for execution Instruction Sets 526 correlated with Collections of Object Representations 525 in Knowledge Cells 800*ba*-800*be* in Sequence 163*b*, thereby enabling Device 98 to effect a preferred state of one or more Objects 615 and implement the purpose represented by Purpose Representation 162*xa* or enabling Avatar 605 to effect a preferred state of one or more Objects 616 and implement the purpose represented by Purpose Representation 162*xa*. Purpose Implementing Unit 181 can implement similar logic or process for any additional one or more Purpose Representations 162 from Purpose Structure 161, and so on.

Figure 66:
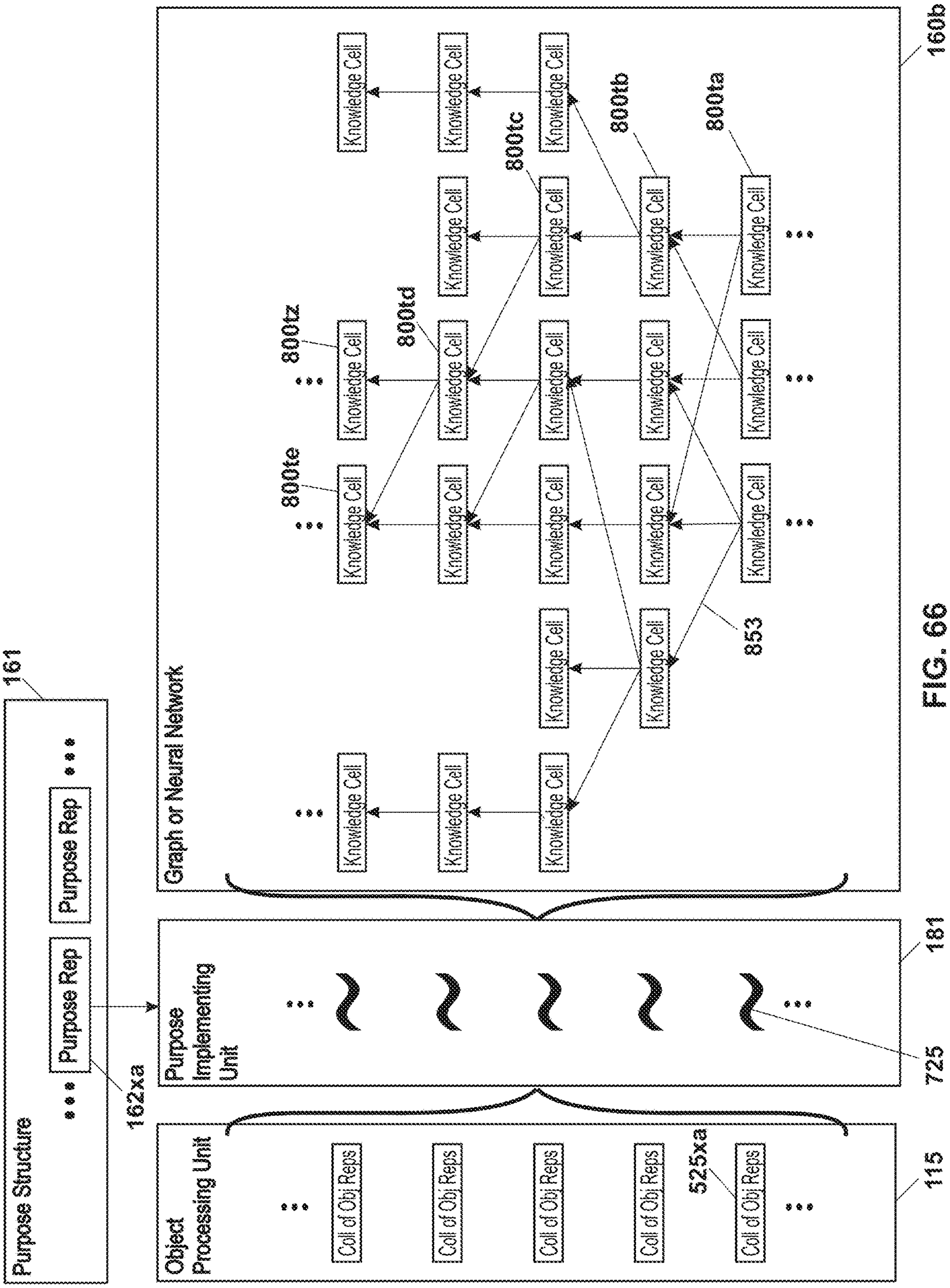
FIG. 66 illustrates an embodiment of utilizing Graph or Neural Network 160*b* in implementing a purpose.

Referring to FIG. 66, an embodiment of utilizing Graph or Neural Network 160*b* in implementing a purpose is illustrated. Graph or Neural Network 160*b* may include knowledge (i.e. connected Knowledge Cells 800 comprising one or more Collections of Object Representations 525 correlated with any Instruction Sets 526, etc.) of: (i) Device's 98 manipulations of one or more Objects 615 (i.e. physical objects, etc.) using curiosity, (ii) observed manipulations of one or more Objects 615, (iii) Avatar's 605 manipulations of one or more Objects 616 (i.e. computer generated objects, etc.) using curiosity, and/or observed manipulations of one or more Objects 616 as previously described. In some aspects, Device's 98 manipulations of one or more Objects 615 using Graph or Neural Network 160*b* to effect their preferred state or Avatar's 605 manipulations of one or more Objects 616 using Graph or Neural Network 160*b* to effect their preferred state may include determining or selecting a path of Knowledge Cells 800 or portions (i.e. Collections of Object Representations 525, Instruction Sets 526, etc.) thereof through Graph or Neural Network 160*b*.

In some embodiments, Purpose Implementing Unit 181 can perform Comparisons 725 of incoming one or more Collections of Object Representations 525 or portions (i.e. Object Representations 625, Object Properties 630, etc.) thereof from Object Processing Unit 115 with one or more Collections of Object Representations 525 or portions thereof in Knowledge Cells 800 from Graph or Neural Network 160*b*. If at least partially matching one or more Collections of Object Representations 525 or portions thereof are found in a Knowledge Cell 800 from Graph or Neural Network 160*b*, the found Knowledge Cell 800 (i.e. also may be referred to as the current-state Knowledge Cell 800, etc.) may represent an initial Knowledge Cell 800 in a path for effecting a preferred state of one or more Objects 615 (i.e. implementing Device's 98 purpose, etc.) or one or more Objects 616 (i.e. implementing Avatar's 605 purpose, etc.). Furthermore, Purpose Implementing Unit 181 can perform Comparisons 725 of one or more Collections of Object Representations 525 or portions (i.e. Object Representations 625, Object Properties 630, etc.) thereof in Purpose Representation 162 from Purpose Structure 161 with one or more Collections of Object Representations 525 or portions thereof in Knowledge Cells 800 from Graph or Neural Network 160*b*. If at least partially matching one or more Collections of Object Representations 525 or portions thereof are found in a Knowledge Cell 800 from Graph or Neural Network 160*b*, the found Knowledge Cell 800 (i.e. also may be referred to as the preferred-state Knowledge Cell 800, etc.) may represent a final Knowledge Cell 800 in the path for effecting a preferred state of one or more Objects 615 (i.e. implementing Device's 98 purpose, etc.) or one or more Objects 616 (i.e. implementing Avatar's 605 purpose, etc.). Furthermore, Purpose Implementing Unit 181 may then determine a path between the current-state Knowledge Cell 800 and the preferred-state Knowledge Cell 800, and determine Instruction Sets 526 from Knowledge Cells 800 in the path, that when executed, effect the preferred state of the one or more Objects 615 or one or more Objects 616. For example, Purpose Implementing Unit 181 can perform Comparisons 725 of Collection of Object Representations 525*xa* or portions thereof from Object Processing Unit 115 with Collections of Object Representations 525 or portions thereof in Knowledge Cells 800 from Graph or Neural Network 160*b*. Purpose Implementing Unit 181 can make a first determination that Collection of Object Representations 525*xa* or portions thereof at least partially match Collection of Object Representations 525 or portions thereof in Knowledge Cell 800*ta* from Graph or Neural Network 160*b*. Furthermore, Purpose Implementing Unit 181 may select Purpose Representation 162*xa* from Purpose Structure 161 to implement and may perform Comparisons 725 of Collection of Object Representations 525 or portions thereof in Purpose Representation 162*xa* with Collections of Object Representations 525 or portions thereof in Knowledge Cells 800 from Graph or Neural Network 160*b*. Purpose Implementing Unit 181 can make a second determination, by performing Comparisons 725, that Collection of Object Representations 525 or portions thereof in Purpose Representation 162*xa* at least partially match Collection of Object Representations 525 or portions thereof in Knowledge Cell 800*te* from Graph or Neural Network 160*b*. Furthermore, Purpose Implementing Unit 181 can make a third determination of a path of Knowledge Cells 800 between Knowledge Cell 800*ta* and Knowledge Cell 800*te*. Determining a path of Knowledge Cells 800 between Knowledge Cell 800*ta* and Knowledge Cell 800*te* may include following Connections 853 among Knowledge Cells 800 between Knowledge Cell 800*ta* and Knowledge Cell 800*te*. For example, determining a path of Knowledge Cells 800 between of Knowledge Cell 800*ta* and Knowledge Cell 800*te* may include determining Knowledge Cells 800 connected by outgoing Connections 853 with Knowledge Cell 800*ta*, then determining Knowledge Cells 800 connected by outgoing Connections 853 with those Knowledge Cells 800, and so on until Knowledge Cell 800*te* is reached. In general, any technique such as Dijkstra's algorithm, recursive algorithm, and/or those known in art, can be used in determining a path through a graph, neural network, or other data structure. In response to at least the first, the second, and/or the third determinations, Purpose Implementing Unit 181 may select for execution Instruction Sets 526 correlated with Collections of Object Representations 525 in Knowledge Cells 800*ta*-800*te* in Graph or Neural Network 160*b*, thereby enabling Device 98 to effect a preferred state of one or more Objects 615 and implement the purpose represented by Purpose Representation 162*xa* or enabling Avatar 605 to effect a preferred state of one or more Objects 616 and implement the purpose represented by Purpose Representation 162*xa*. Purpose Implementing Unit 181 can implement similar logic or process for any additional one or more Purpose Representations 162 from Purpose Structure 161, and so on.

In some embodiments, in instances in which the current-state Knowledge Cell 800 is found and the preferred-state Knowledge Cell 800 is not found using initial Comparisons 725, Purpose Implementing Unit 181 can look for, by performing Comparisons 725, a Knowledge Cell 800 in Graph or Neural Network 160*b* that includes Collection of Object Representations 525 that is next most similar to Collection of Object Representations 525 in a Purpose Representation 162 from Purpose Structure 161. The found Knowledge Cell 800 (i.e. also may be referred to as next most similar to preferred-state Knowledge Cell 800, etc.) may represent the final Knowledge Cell 800 in a path of Knowledge Cells 800 for effecting a state of one or more Objects 615 or one or more Objects 616 that is next most similar to preferred state of one or more Objects 615 or one or more Objects 616. Such state of one or more Objects 615 or one or more Objects 616 may need to be adjusted to implement a preferred state of the one or more Objects 615 or one or more Objects 616. For example, Purpose Implementing Unit 181 can make a first determination, by performing Comparisons 725, that Collection of Object Representations 525*xa* or portions thereof from Object Processing Unit 115 at least partially match Collection of Object Representations 525 or portions thereof in Knowledge Cell 800*ta*. Furthermore, after not finding an acceptably similar Collection of Object Representations 525 or portions thereof from Purpose Representation 162*xa* in any Knowledge Cell 800 from Graph or Neural Network 160*b*, Purpose Implementing Unit 181 can make a second determination, by performing Comparisons 725 using less strict rules, that Collection of Object Representations 525 or portions thereof in Purpose Representation 162*xa* from Purpose Structure 161 at least partially match Collection of Object Representations 525 or portions thereof in Knowledge Cell 800_tz_, making it a next most similar Knowledge Cell 800. Furthermore, Purpose Implementing Unit 181 can make a third determination of a path of Knowledge Cells 800 between Knowledge Cell 800_ta_ and Knowledge Cell 800_tz_ as previously described. In response to at least the first, the second, and/or the third determinations, Purpose Implementing Unit 181 may select for execution Instruction Sets 526 correlated with Collections of Object Representations 525 in the path of Knowledge Cells 800_ta_-800_tz_, thereby enabling Device 98 to effect a state of one or more Objects 615 next most similar to the preferred state of one or more Objects 615 or enabling Avatar 605 to effect a state of one or more Objects 616 next most similar to the preferred state of one or more Objects 616. Furthermore, Purpose Implementing Unit 181 can make a fourth determination of additional Instruction Sets 526 that would cause Device 98 or Avatar 605 to bridge a difference between the preferred state of the one or more Objects 615 or one or more Objects 616 and the state next most similar to the preferred state of the one or more Objects 615 or one or more Objects 616 represented in Knowledge Cell 800_tz_. Such difference between the states may be determined by determining differences between the states using Comparison 725, using Object Properties 630 from Collections of Object Representations 525 representing the preferred state of one or more Objects 615 or one or more Objects 616 and next most similar state of one or more Objects 615 or one or more Objects 616, and/or using other techniques. Some examples of differences between the states include differences in locations of one or more Objects 615 or one or more Objects 616, differences in conditions of one or more Objects 615 or one or more Objects 616, differences in shape of one or more Objects 615 or one or more Objects 616, differences in orientation of one or more Objects 615 or one or more Objects 616, and/or other differences of one or more Objects 615 or one or more Objects 616. In one example, after determining a difference between a current location (i.e. state next most similar to the preferred state, etc.) of Device 98 or Avatar 605 and a preferred location of Device 98 or Avatar 605, Instruction Set 526 Device.Move (0.8, 1.3, 0) or Avatar. Move (0.8, 1.3, 0) can be used to move Device 98 or Avatar 605 from the current location to the preferred location, thereby bridging the difference in states. In another example, after determining a difference between a current location (i.e. state next most similar to the preferred state, etc.) of Device's 98 Arm Actuator 91 or Avatar's 605 arm and the preferred location of Device's 98 Arm Actuator 91 or Avatar's 605 arm, Instruction Set 526 Device.Arm. Touch (0.1, 0.3, 0.15) or Avatar.Arm. Touch (0.1,0.3,0.15) can be used to move Device's 98 Arm Actuator 91 or Avatar's 605 arm from the current location to a preferred location, thereby bridging the difference in states. In a further example, after determining a difference between a current location (i.e. state next most similar to the preferred state, etc.) of a toy Object 615 or Object 616 and a preferred location of the toy Object 615 or Object 616, Instruction Sets 526 Device.Arm.Grip ( ) Device.Arm.Move ( ) and Device.Arm. Release ( ) OR Avatar.Arm. Grip ( ) Avatar.Arm.Move ( ) and Avatar. Arm. Release ( ) can be used to move the toy Object 615 or Object 616 from the current location to the preferred location, thereby bridging the difference in states. In a further example, after determining a difference between a partially open (i.e. state next most similar to the preferred state, etc.) door Object 615 or Object 616 and a fully open (i.e. the preferred state, etc.) door Object 615 or Object 616, Instruction Sets 526 Device.Arm.Push ( ) or Avatar. Arm.Push ( ) can be used to fully open the partially open door Object 615 or Object 616, thereby bridging the difference in states. Any of the previously described techniques for determining or modifying Instruction Sets 526 to account for variations in situations can be used in various implementations. In general, any technique, and/or those known in art, can be used to bridge a difference between one state of one or more Objects 615 or one or more Objects 616 and another state of one or more Objects 615 or one or more Objects 616.

Purpose Implementing Unit 181 may include any logic, functions, algorithms, code, and/or other elements to enable its functionalities. An example of Purpose Implementing Unit's 181 code for obtaining a representation of a preferred state of Object 615 from Purpose Structure 161, determining if Knowledge Structure 160 has a representation of a state of Object 615 similar to the current state of Object 615, determining if Knowledge Structure 160 has a representation of a state of Object 615 similar to the preferred state of Object 615, finding a path between the representation of the current state of Object 615 and the representation of the preferred state of Object 615, and executing instructions in the path to cause Device 98 to manipulate Object 615 to cause the preferred state of Object 615 may include the following code:

```
preferredState = PurposeSturcture.getPreferredState( ); //get preferred state of object representing purpose
detectedObjects = detectObjects( ); //detect objects in the surrounding and store them in detectedObjects array
for (int i = 0; i < detectedObjects.length; i++) { //process each object in detectedObjects array
  similarCurrentState = KnowledgeStructure.findSimilarState(detectedObjects[i]); /*determine if KnowledgeSturcture
                                        has state of object similar to current state of detectedObjects[i] object*/
  if (similarCurrentState != null) { //similar state found
    preferredState = KnowledgeStructure.findSimilarState(preferredState); /*determine if
                                                KnowledgeSturcture has state of object similar to preferred state*/
    if (preferredState != null) { //similar state found
      path = findPath(similarCurrentState, preferredState); /*find path between state of
        object similar to current state of detectedObjects[i] object AND state of object similar to preferred state*/
      Device.execInstSets(path.instSets); //execute instruction sets in found path to effect preferred state
    }
  }
  Break; //stop the for loop
}
...
```

The foregoing code applicable to Device 98, Objects 615, and/or other elements may similarly be used as an example code applicable to Avatar 605, Objects 616, and/or other elements. For instance, references to Device in the foregoing code may be replaced with references to Avatar to implement code for use with respect to Avatar 605, Objects 616, and/or other elements.

The foregoing embodiments provide examples of utilizing Purpose Implementing Unit 181, various Purpose Structures 161, Purpose Representations 162, various Knowledge Structures 160, Knowledge Cells 800, Collections of Object Representations 525 and/or portions thereof, Connections 853, and/or other elements or techniques. It should be understood that any of these elements and/or techniques can be omitted, used in a different combination, or used in combination with other elements and/or techniques. In some aspects, although, the shown Purpose Structure 161 shows a Collection of Purpose of Representations, any Purpose Structure 161 can be used in implementing a purpose including Collection of Sequences 161*a*, Graph or Neural Network 161*b*, and/or others. One of ordinary skill in art will understand that the aforementioned techniques for implementing one or more purposes of Device 98, Avatar 605, system, or application are described merely as examples of a variety of possible implementations, and that while all possible techniques for implementing one or more purposes of Device 98, Avatar 605, system, or application are too voluminous to describe, other techniques, and/or those known in art, for implementing one or more purposes of Device 98, Avatar 605, system, or application are within the scope of this disclosure.

Figure 67A:
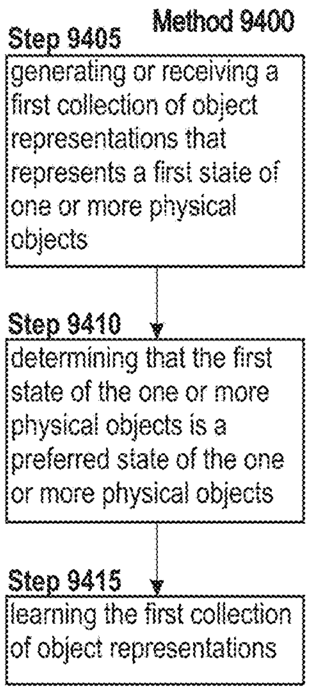
FIG. 67A illustrates an embodiment of method 9400.

Referring to FIG. 67A, an embodiment of method 9400 for learning a purpose is illustrated.

At step 9405, a first collection of object representations that represents a first state of one or more physical objects is generated or received. Step 9405 may include any action or operation described in Step 2105 of method 2100 as applicable.

At step 9410, a determination is made that the first state of the one or more physical objects is a preferred state of the one or more physical objects. In some designs, determining that a state of one or more physical objects (i.e. Objects 615, etc.) is a preferred state of the one or more physical objects may include identifying that an incoming one or more collections of object representations (i.e. Collections of Object Representations 525, etc.) or portions (i.e. Object Representations 625, etc.) thereof represent a preferred state of the one or more physical objects. In some embodiments, determining a preferred state of one or more physical objects may be based on an indication of the preferred state of the one or more physical objects. In some aspects, an indication may be or include a gesture, physical movement, or other physical indication. In other aspects, an indication may be or include sound, speech, or other audio indication. In further aspects, an indication may be or include an electrical signal, radio signal, light signal, and/or other electrical, magnetic, or electromagnetic indication. In further aspects, an indication may be or include a positive or negative reinforcement. In other embodiments, determining a preferred state of one or more physical objects may be based on a frequently occurring state of the one or more physical objects. In some aspects, a preferred state of one or more physical objects may be a state of the one or more physical objects that occurs with at least a particular frequency threshold. In further embodiments, determining a preferred state of one or more physical objects may be based on a state of one or more physical objects caused by another physical object. In some aspects, the physical object that causes a state of one or more physical objects may be or include a trusted physical object, a physical object that occurs frequently, or other physical object. In further embodiments, determining a preferred state of one or more physical objects may be based on a representation of a preferred state of one or more physical objects. In some aspects, one or more collections of object representations may include an object representation (i.e. Object Representation 625, etc.) representing an object (i.e. picture, display, magazine, etc.) that itself includes one or more representations of one or more objects and/or their states. A determination may be made that a state of one or more objects represented in the one or more representations is a preferred state of one or more objects based on the aforementioned indication, frequency of occurrence, causing by another object, and/or other techniques. Determining comprises any action or operation by or for Purpose Structuring Unit 136, Logic for Identifying Preferred States of Objects 138, Logic for Identifying Preferred States of Objects Based on Indications 138*a*, Logic for Identifying Preferred States of Objects Based on Frequencies 138*b*, Logic for Identifying Preferred States of Objects Based on Causations 138*c*, Logic for Identifying Preferred States of Objects Based on Representations 138*d*, and/or other elements.

At step 9415, the first collection of object representations is learned. In some embodiments, instead of a collection of object representations (i.e. the first collection of object representations, etc.), one or more object representations, one or more streams of collections of object representations, or one or more streams of object representations may be learned. Any features, functionalities, operations, and/or embodiments described with respect to a collection of object representations may similarly apply to an object representation, stream of collections of object representations, or stream of collections of object representations. In some designs, learning a collection of object representations (i.e. the first collection of object representations, etc.) includes generating a purpose representation (i.e. Purpose Representation 162, etc.) that includes the collection of object representations or a reference thereto. A purpose representation may include any data structure or arrangement that can facilitate such functionality. Purpose representations can be used in/as neurons, nodes, vertices, or other elements in a purpose structure (i.e. Purpose Structure 161, etc.). Purpose representations may be connected, associated, related, or linked into purpose structures using statistical, artificial intelligence, machine learning, and/or other models or techniques. In general, a purpose structure may be or include any data structure or arrangement capable of storing and/or organizing purposes and/or their representations. A purpose structure can be used for enabling device's (i.e. Device's 98, etc.) or system's manipulations of one or more physical objects to effect their preferred states and to implement one or more purposes. In some aspects, a purpose representation or other element may include or be associated with a priority index (i.e. Priority Index 545, etc.) that indicates a priority, importance, and/or other ranking of the purpose representation or other element. In other aspects, a purpose representation or other element may include or be associated with extra information (i.e. Extra Info 527; time information, location information, computed information, contextual information, and/or other information, etc.) that may optionally be used to facilitate enhanced decision making and/or other functionalities where applicable. Learning comprises any action or operation by or for Purpose Structuring Unit 136, Purpose Structure 161, Collection of Sequences 161*a*, Graph or Neural Network 161*b*, Collection of Purpose Representations, Purpose Representation 162, Priority Index 545, Extra Info 527, Node 852, Connection 853, Comparison 725, Memory 12, Storage 27, and/or other elements.

Figure 67B:
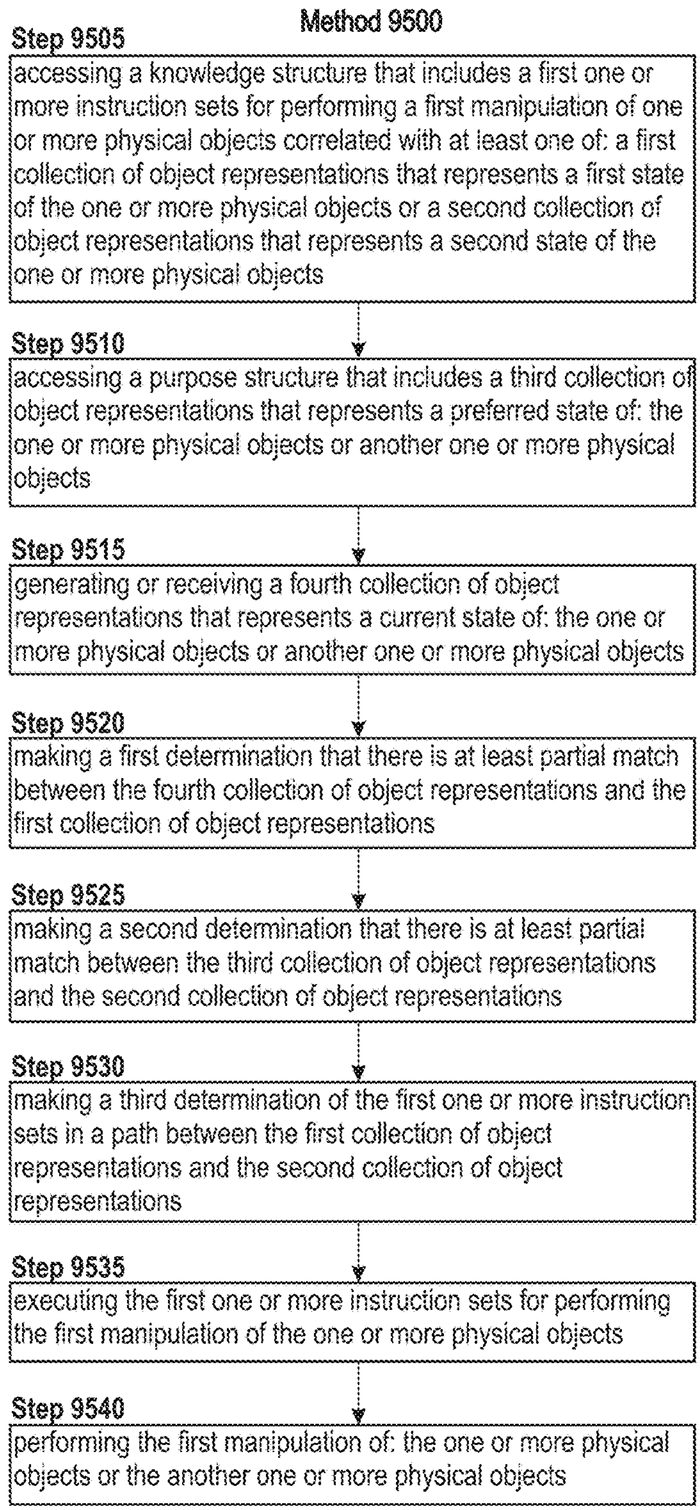
FIG. 67B illustrates an embodiment of method 9500.

Referring to FIG. 67B, an embodiment of method 9500 for implementing a purpose is illustrated.

At step 9505, a knowledge structure that includes a first one or more instruction sets for performing a first manipulation of one or more physical objects correlated with at least one of: a first collection of object representations that represents a first state of the one or more physical objects or a second collection of object representations that represents a second state of the one or more physical objects is accessed. In some aspects, the knowledge structure and/or elements/portions thereof may be caused, generated, and/or learned by any action or operation described in steps 2105-2130 of method 2100 and/or steps 4105-4125 of method 4100 as applicable. As such, the knowledge structure and/or elements/portions thereof comprise any features, functionalities, and/or embodiments of the knowledge structure and/or elements/portions thereof described in method 2100 and/or method 4100 as applicable. Accessing comprises any action or operation by or for Knowledge Structure 160, Knowledge Cell 800, Collection of Object Representations 525, Instruction Set 526, and/or other elements.

At step 9510, a purpose structure that includes a third collection of object representations that represents a preferred state of: the one or more physical objects or another one or more physical objects is accessed. In some aspects, the purpose structure and/or elements/portions thereof may be caused, generated, and/or learned by any action or operation described in steps 9405-9415 of method 9400 as applicable. As such, the purpose structure and/or elements/portions thereof comprise any features, functionalities, and/or embodiments of the purpose structure and/or elements/portions thereof described in method 9400 as applicable. Accessing comprises any action or operation by or for Purpose Structure 161, Purpose Representation 162, Collection of Object Representations 525, and/or other elements.

At step 9515, a fourth collection of object representations that represents a current state of: the one or more physical objects or another one or more physical objects is generated or received. Step 9515 may include any action or operation described in Step 2105 of method 2100 as applicable.

At step 9520, a first determination is made that there is at least partial match between the fourth collection of object representations and the first collection of object representations. Step 9520 may include any action or operation described in Step 2315 of method 2300 as applicable.

At step 9525, a second determination is made that there is at least partial match between the third collection of object representations and the second collection of object representations. In some embodiments, an initial comparison (i.e. Comparison 725, etc.) may find at least partial match between a collection of object representations (i.e. the third collection of object representations, etc.) representing a preferred state of one or more physical objects and a collection of object representations (i.e. the second collection of object representations, etc.) representing a state of one or more physical objects. In other embodiments in which at least partial match is not found in the initial comparison, a comparison using less strict or different rules may find at least partial match between a collection of object representations representing a preferred state of one or more physical objects and a collection of object representations representing a next most similar state of one or more physical objects. Determining comprises any action or operation by or for Comparison 725, Purpose Structure 161, Purpose Representation 162, Knowledge Structure 160, Knowledge Cell 800, Collection of Object Representations 525, and/or other elements. Step 9525 may include any action or operation described in Step 2325 of method 2300 as applicable with respect to a collection of object representations representing a beneficial state of one or more physical objects and/or as applicable generally.

At step 9530, a third determination is made of the first one or more instruction sets in a path between the first collection of object representations and the second collection of object representations. In some embodiments, a path between one collection of object representations (i.e. the first collection of object representations, etc.) and another collection of object representations (i.e. the second collection of object representations, etc.) may include collections of object representations correlated with any instruction sets (i.e. the first one or more instruction sets for performing the first manipulation of the one or more physical objects, etc.). Such instructions sets may cause manipulations of one or more physical objects that cause states of the one or more physical objects represented by the correlated collections of object representations. Therefore, in some aspects, determining instruction sets in a path between one collection of object representations and another collection of object representations may include determining instruction sets correlated with collections of object representations in a path between the one collection of object representations and the another collection of object representations. In some designs, collections of object representations correlated with any instruction sets may be included in knowledge cells (i.e. Knowledge Cells 800, etc.) stored in a knowledge structure (i.e. Knowledge Structure 160, etc.). In the case of a sequence (i.e. Sequence 163, etc.) of a collection of sequences (i.e. Collection of Sequences 160*a*, etc.), collections of object representations correlated with any instruction sets in a path between one collection of object representations and another collection of object representations may be apparent in the order of collections of object representations correlated with any instruction sets in the sequence. In the case of a graph or neural network (i.e. Graph or Neural Network 160*b*, etc.), collections of object representations correlated with any instruction sets in a path between one collection of object representations and another collection of object representations may be determined by: following connections (i.e. Connections 853, etc.) between the one collection of object representations and the another collection of object representations using Dijkstra's algorithm, using a recursive algorithm, using other techniques, and/or those known in art. Similar techniques can be used in other knowledge structures or data structures. In some embodiments in which at least partially matching collection of object representations representing a preferred state of one or more physical objects is not found, at least partially matching next most similar collection of object representations may be found. In such embodiments, a determination can be made of additional instruction sets for performing manipulations of one or more physical objects that would bridge a difference between the preferred state of the one or more physical objects and the state next most similar to the preferred state of the one or more physical objects. Such difference between the states may be determined by determining differences (i.e. differences in locations, differences in conditions, differences in shape, differences in orientation, etc.) between the states of one or more physical objects and determining instruction sets for manipulating one or more physical objects to bridge the differences in states. Any of the previously described techniques for determining or modifying instruction sets to account for variations in situations can be used in such functionalities. Determining comprises any action or operation by or for Comparison 725, Knowledge Structure 160, Knowledge Cell 800, Collection of Object Representations 525, Instruction Set 526, Connection 853, and/or other elements.

At step 9535, the first one or more instruction sets for performing the first manipulation of the one or more physical objects are executed. In some aspects, Step 9535 may be performed in response to at least the first determination in Step 9520, the second determination in Step 9525, and/or the third determination in Step 9530. Step 9535 may include any action or operation described in Step 2115 of method 2100 as applicable.

At step 9540, the first manipulation of: the one or more physical objects or the another one or more physical objects is performed. In some aspects, a manipulation (i.e. the first manipulation, etc.) may cause a current state of one or more physical objects to change to a preferred state of the one or physical objects. In some embodiments, one or more manipulations can be performed by a device (i.e. Device 98, etc.) on one or more physical objects. In other embodiments, one or more manipulations can be performed by a device on itself. Step 9540 may include any action or operation described in Step 2120 of method 2100 as applicable.

Figure 68A:
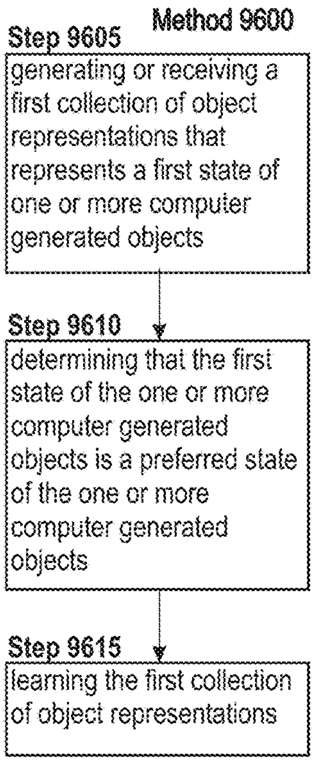
FIG. 68A illustrates an embodiment of method 9600.

Referring to FIG. 68A, an embodiment of method 9600 for learning a purpose is illustrated.

At step 9605, a first collection of object representations that represents a first state of one or more computer generated objects is generated or received. Step 9605 may include any action or operation described in Step 3105 of method 3100 as applicable. Step 9605 may include any action or operation described in Step 9405 of method 9400 as applicable, and vice versa.

At step 9610, a determination is made that the first state of the one or more computer generated objects is a preferred state of the one or more computer generated objects. In some designs, determining that a state of one or more computer generated objects (i.e. Objects 616, etc.) is a preferred state of the one or more computer generated objects may include identifying that an incoming one or more collections of object representations (i.e. Collections of Object Representations 525, etc.) or portions (i.e. Object Representations 625, etc.) thereof represent a preferred state of the one or more computer generated objects. In some embodiments, determining a preferred state of one or more computer generated objects may be based on an indication of the preferred state of the one or more computer generated objects. In some aspects, an indication may be or include a gesture, simulated movement, or other simulated indication. In other aspects, an indication may be or include simulated sound or other simulated audio indication. In further aspects, an indication may be or include a simulated electrical signal, simulated radio signal, simulated light signal, and/or other simulated electrical, simulated magnetic, or simulated electromagnetic indication. In further aspects, an indication may be or include a positive or negative reinforcement. In other embodiments, determining a preferred state of one or more computer generated objects may be based on a frequently occurring state of the one or more computer generated objects. In some aspects, a preferred state of one or more computer generated objects may be a state of the one or more computer generated objects that occurs with at least a particular frequency threshold. In further embodiments, determining a preferred state of one or more computer generated objects may be based on a state of the one or more computer generated objects caused by another computer generated object. In some aspects, the computer generated object that causes a state of one or more computer generated objects may be or include a trusted computer generated object, a computer generated object that occurs frequently, or other computer generated object. In further embodiments, a preferred state of one or more computer generated objects may be based on a representation of a preferred state of the one or more computer generated objects. In some aspects, one or more collections of object representations may include an object representation (i.e. Object Representation 625, etc.) representing an object (i.e. picture, display, magazine, etc.) that itself includes one or more representations of one or more objects and/or their states. A determination may be made that a state of one or more objects represented in the one or more representations is a preferred state of one or more objects based on the aforementioned indication, frequency of occurrence, causing by another object, and/or other techniques. Determining comprises any action or operation by or for Purpose Structuring Unit 136, Logic for Identifying Preferred States of Objects 138, Logic for Identifying Preferred States of Objects Based on Indications 138*a*, Logic for Identifying Preferred States of Objects Based on Frequencies 138*b*, Logic for Identifying Preferred States of Objects Based on Causations 138*c*, Logic for Identifying Preferred States of Objects Based on Representations 138*d*, and/or other elements. Step 9610 may include any action or operation described in Step 9410 of method 9400 as applicable, and vice versa.

At step 9615, the first collection of object representations is learned. In some embodiments, instead of a collection of object representations (i.e. the first collection of object representations, etc.), one or more object representations, one or more streams of collections of object representations, or one or more streams of object representations may be learned. Any features, functionalities, operations, and/or embodiments described with respect to a collection of object representations may similarly apply to an object representation, stream of collections of object representations, or stream of collections of object representations. In some designs, learning a collection of object representations (i.e. the first collection of object representations, etc.) includes generating a purpose representation (i.e. Purpose Representation 162, etc.) that includes the collection of object representations or a reference thereto. A purpose representation may include any data structure or arrangement that can facilitate such functionality. Purpose representations can be used in/as neurons, nodes, vertices, or other elements in a purpose structure (i.e. Purpose Structure 161, etc.). Purpose representations may be connected, associated, related, or linked into purpose structures using statistical, artificial intelligence, machine learning, and/or other models or techniques. In general, a purpose structure may be or include any data structure or arrangement capable of storing and/or organizing purposes and/or their representations. A purpose structure can be used for enabling a avatar's (i.e. Avatar's 605) or application's manipulations of one or more computer generated objects to effect their preferred states and to implement one or more purposes. In some aspects, a purpose representation or other element may include or be associated with a priority index (i.e. Priority Index 545, etc.) that indicates a priority, importance, and/or other ranking of the purpose representation or other element. In other aspects, a purpose representation or other element may include or be associated with extra information (i.e. Extra Info 527; time information, location information, computed information, contextual information, and/or other information, etc.) that may optionally be used to facilitate enhanced decision making and/or other functionalities where applicable. Learning comprises any action or operation by or for Purpose Structuring Unit 136, Purpose Structure 161, Collection of Sequences 161*a*, Graph or Neural Network 161*b*, Collection of Purpose Representations, Purpose Representation 162, Priority Index 545, Extra Info 527, Node 852, Connection 853, Comparison 725, Memory 12, Storage 27, and/or other elements. Step 9615 may include any action or operation described in Step 9415 of method 9400 as applicable, and vice versa.

Figure 68B:
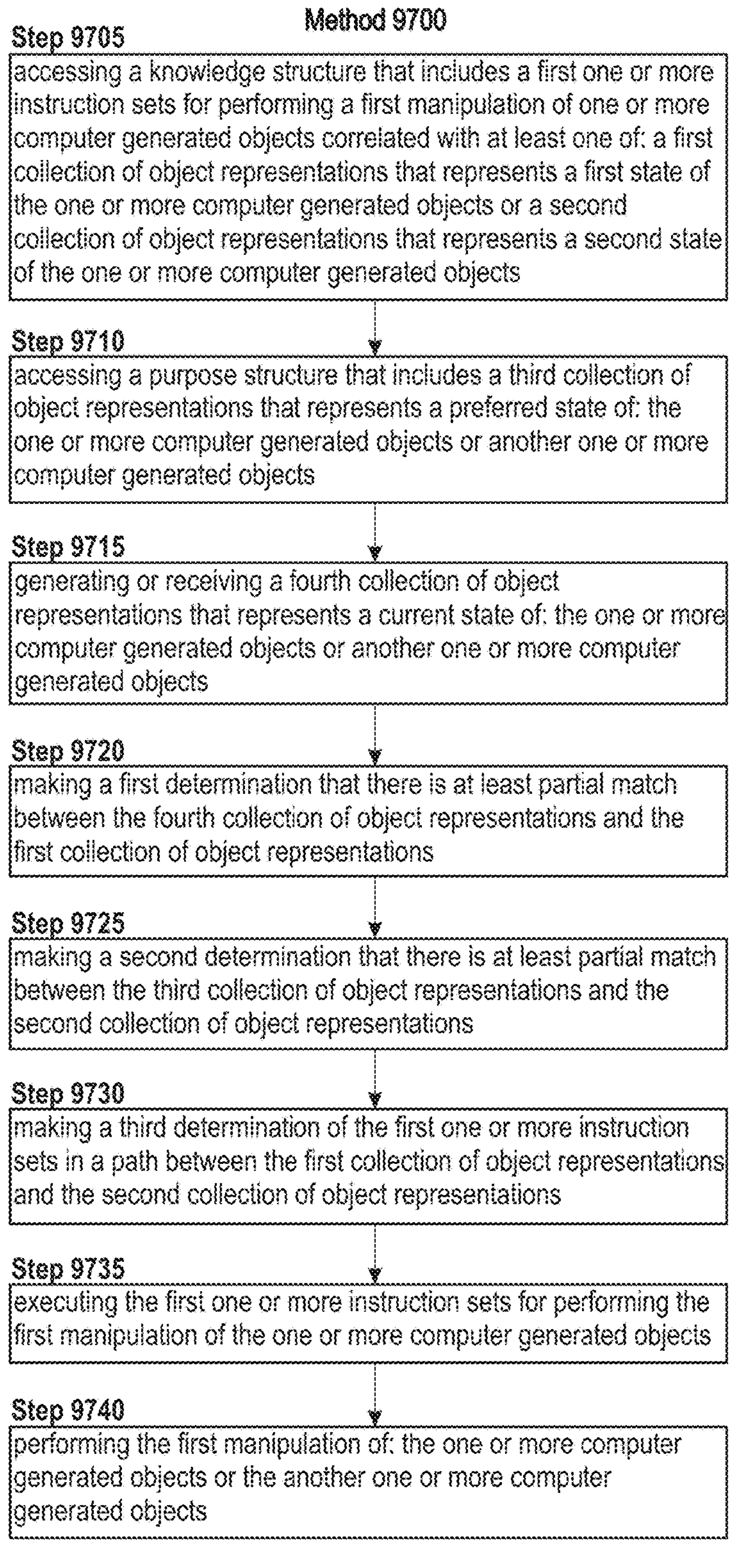
FIG. 68B illustrates an embodiment of method 9700.

Referring to FIG. 68B, an embodiment of method 9700 for implementing a purpose is illustrated.

At step 9705, a knowledge structure that includes a first one or more instruction sets for performing a first manipulation of one or more computer generated objects correlated with at least one of: a first collection of object representations that represents a first state of the one or more computer generated objects or a second collection of object representations that represents a second state of the one or more computer generated objects is accessed. In some aspects, the knowledge structure and/or elements/portions thereof may be caused, generated, and/or learned by any action or operation described in steps 3105-3130 of method 3100 and/or steps 5105-5125 of method 5100 as applicable. As such, the knowledge structure and/or elements/portions thereof comprise any features, functionalities, and/or embodiments of the knowledge structure and/or elements/portions thereof described in method 3100 and/or method 5100 as applicable. Accessing comprises any action or operation by or for Knowledge Structure 160, Knowledge Cell 800, Collection of Object Representations 525, Instruction Set 526, and/or other elements. Step 9705 may include any action or operation described in Step 9505 of method 9500 as applicable, and vice versa.

At step 9710, a purpose structure that includes a third collection of object representations that represents a preferred state of: the one or more computer generated objects or another one or more computer generated objects is accessed. In some aspects, the purpose structure and/or elements/portions thereof may be caused, generated, and/or learned by any action or operation described in steps 9605-9615 of method 9600 as applicable. As such, the purpose structure and/or elements/portions thereof comprise any features, functionalities, and/or embodiments of the purpose structure and/or elements/portions thereof described in method 9600 as applicable. Accessing comprises any action or operation by or for Purpose Structure 161, Purpose Representation 162, Collection of Object Representations 525, and/or other elements. Step 9710 may include any action or operation described in Step 9510 of method 9500 as applicable, and vice versa.

At step 9715, a fourth collection of object representations that represents a current state of: the one or more computer generated objects or another one or more computer generated objects is generated or received. Step 9715 may include any action or operation described in Step 3105 of method 3100 as applicable. Step 9715 may include any action or operation described in Step 9515 of method 9500 as applicable, and vice versa.

At step 9720, a first determination is made that there is at least partial match between the fourth collection of object representations and the first collection of object representations. Step 9720 may include any action or operation described in Step 3315 of method 3300 as applicable. Step 9720 may include any action or operation described in Step 9520 of method 9500 as applicable, and vice versa.

At step 9725, a second determination is made that there is at least partial match between the third collection of object representations and the second collection of object representations. In some embodiments, an initial comparison (i.e. Comparison 725, etc.) may find at least partial match between a collection of object representations (i.e. the third collection of object representations, etc.) representing a preferred state of one or more computer generated objects and a collection of object representations (i.e. the second collection of object representations, etc.) representing a state of one or more computer generated objects. In other embodiments in which at least partial match is not found in the initial comparison, a comparison using less strict or different rules may find at least partial match between a collection of object representations representing a preferred state of one or more computer generated objects and a collection of object representations representing a next most similar state of one or more computer generated objects. Determining comprises any action or operation by or for Comparison 725, Purpose Structure 161, Purpose Representation 162, Knowledge Structure 160, Knowledge Cell 800, Collection of Object Representations 525, and/or other elements. Step 9725 may include any action or operation described in Step 3325 of method 3300 as applicable with respect to a collection of object representations representing a beneficial state of one or more computer generated objects and/or as applicable generally. Step 9725 may include any action or operation described in Step 9525 of method 9500 as applicable, and vice versa.

At step 9730, a third determination is made of the first one or more instruction sets in a path between the first collection of object representations and the second collection of object representations. In some embodiments, a path between one collection of object representations (i.e. the first collection of object representations, etc.) and another collection of object representations (i.e. the second collection of object representations, etc.) may include collections of object representations correlated with any instruction sets (i.e. the first one or more instruction sets for performing the first manipulation of the one or more computer generated objects, etc.). Such instructions sets may cause manipulations of one or more computer generated objects that cause states of the one or more computer generated objects represented by the correlated collections of object representations. Therefore, in some aspects, determining instruction sets in a path between one collection of object representations and another collection of object representations may include determining instruction sets correlated with collections of object representations in a path between the one collection of object representations and the another collection of object representations. In some designs, collections of object representations correlated with any instruction sets may be included in knowledge cells (i.e. Knowledge Cells 800, etc.) stored in a knowledge structure (i.e. Knowledge Structure 160, etc.). In the case of a sequence (i.e. Sequence 163, etc.) of a collection of sequences (i.e. Collection of Sequences 160*a*, etc.), collections of object representations correlated with any instruction sets in a path between one collection of object representations and another collection of object representations may be apparent in the order of collections of object representations correlated with any instruction sets in the sequence. In the case of a graph or neural network (i.e. Graph or Neural Network 160*b*, etc.), collections of object representations correlated with any instruction sets in a path between one collection of object representations and another collection of object representations may be determined by: following connections (i.e. Connections 853, etc.) between the one collection of object representations and the another collection of object representations, using Dijkstra's algorithm, using a recursive algorithm, using other techniques, and/or those known in art. Similar techniques can be used in other knowledge structures or data structures. In some embodiments in which at least partially matching collection of object representations representing a preferred state of one or more computer generated objects is not found, at least partially matching next most similar collection of object representations may be found. In such embodiments, a determination can be made of additional instruction sets for performing manipulations of one or more computer generated objects that would bridge a difference between the preferred state of the one or more computer generated objects and the state next most similar to the preferred state of the one or more computer generated objects. Such difference between the states may be determined by determining differences (i.e. differences in locations, differences in conditions, differences in shape, differences in orientation, etc.) between the states of one or more computer generated objects and determining instruction sets for manipulating one or more computer generated objects to bridge the differences in states. Any of the previously described techniques for determining or modifying instruction sets to account for variations in situations can be used in such functionalities. Determining comprises any action or operation by or for Comparison 725, Knowledge Structure 160, Knowledge Cell 800, Collection of Object Representations 525, Instruction Set 526, Connection 853, and/or other elements. Step 9730 may include any action or operation described in Step 9530 of method 9500 as applicable, and vice versa.

At step 9735, the first one or more instruction sets for performing the first manipulation of the one or more computer generated objects are executed. In some aspects, Step 9735 may be performed in response to at least the first determination in Step 9720, the second determination in Step 9725, and/or the third determination in Step 9730. Step 9735 may include any action or operation described in Step 3115 of method 3100 as applicable. Step 9735 may include any action or operation described in Step 9535 of method 9500 as applicable, and vice versa.

At step 9740, the first manipulation of: the one or more computer generated objects or the another one or more computer generated objects is performed. In some aspects, a manipulation (i.e. the first manipulation, etc.) may cause a current state of one or more computer generated objects to change to a preferred state of the one or computer generated objects. In some embodiments, one or more manipulations can be performed by an avatar (i.e. Avatar 605, etc.) on one or more computer generated objects. In other embodiments, one or more manipulations can be performed by a avatar on itself. Step 9740 may include any action or operation described in Step 3120 of method 3100 as applicable. Step 9740 may include any action or operation described in Step 9540 of method 9500 as applicable, and vice versa.

Figure 69A:
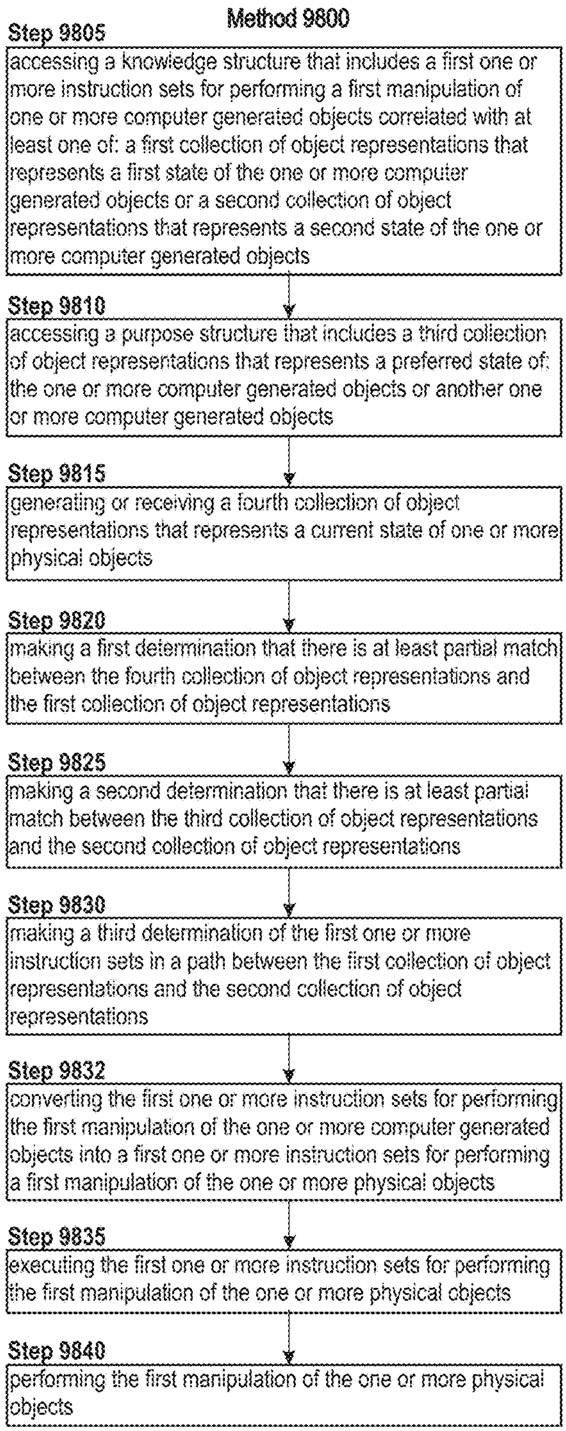
FIG. 69A illustrates an embodiment of method 9800.

Referring to FIG. 69A, an embodiment of method 9800 for implementing a purpose on one or more physical objects, such purpose learned on one or more computer generated objects is illustrated.

At step 9805, a knowledge structure that includes a first one or more instruction sets for performing a first manipulation of one or more computer generated objects correlated with at least one of: a first collection of object representations that represents a first state of the one or more computer generated objects or a second collection of object representations that represents a second state of the one or more computer generated objects is accessed. Step 9805 may include any action or operation described in Step 9705 of method 9700 as applicable.

At step 9810, a purpose structure that includes a third collection of object representations that represents a preferred state of: the one or more computer generated objects or another one or more computer generated objects is accessed. Step 9810 may include any action or operation described in Step 9710 of method 9700 as applicable.

At step 9815, a fourth collection of object representations that represents a current state of one or more physical objects is generated or received. Step 9815 may include any action or operation described in Step 2105 of method 2100 as applicable.

At step 9820, a first determination is made that there is at least partial match between the fourth collection of object representations and the first collection of object representations. Step 9820 may include any action or operation described in Step 2315 of method 2300 and/or Step 3315 of method 3300 as applicable.

At step 9825, a second determination is made that there is at least partial match between the third collection of object representations and the second collection of object representations. Step 9825 may include any action or operation described in Step 9725 of method 9700 as applicable.

At step 9830, a third determination is made of the first one or more instruction sets in a path between the first collection of object representations and the second collection of object representations. Step 9830 may include any action or operation described in Step 9730 of method 9700 as applicable.

At step 9832, the first one or more instruction sets for performing the first manipulation of the one or more computer generated objects are converted into a first one or more instruction sets for performing a first manipulation of the one or more physical objects. Step 9832 may include any action or operation described in Step 6327 of method 6300 as applicable.

At step 9835, the first one or more instruction sets for performing the first manipulation of the one or more physical objects are executed. In some aspects, Step 9835 may be performed in response to at least the first determination in Step 9820, the second determination in Step 9825, and/or the third determination in Step 9830. Step 9835 may include any action or operation described in Step 2115 of method 2100 and/or Step 9535 of method 9500 as applicable.

At step 9840, the first manipulation of the one or more physical objects is performed. Step 9840 may include any action or operation described in Step 2120 of method 2100 and/or Step 9540 of method 9500 as applicable.

Figure 69B:
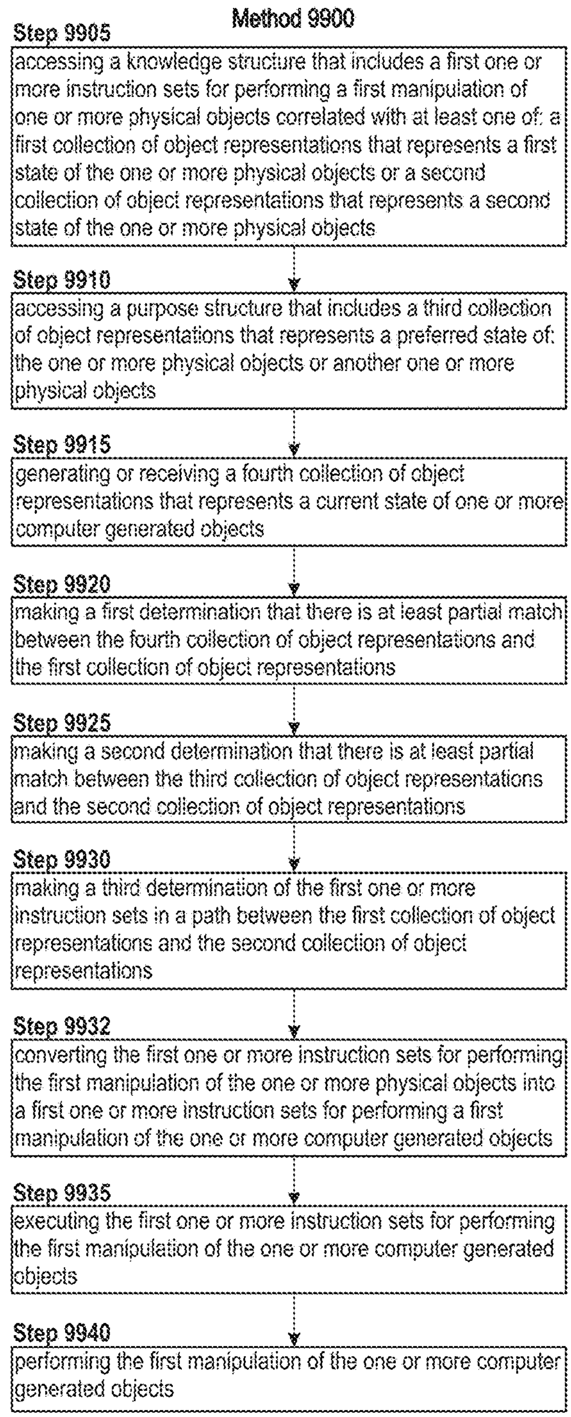
FIG. 69B illustrates an embodiment of method 9900.

Referring to FIG. 69B, an embodiment of method 9900 for implementing a purpose on one or more computer generated objects, such purpose learned on one or more physical objects.

At step 9905, a knowledge structure that includes a first one or more instruction sets for performing a first manipulation of one or more physical objects correlated with at least one of: a first collection of object representations that represents a first state of the one or more physical objects or a second collection of object representations that represents a second state of the one or more physical objects is accessed. Step 9905 may include any action or operation described in Step 9505 of method 9500 as applicable.

At step 9910, a purpose structure that includes a third collection of object representations that represents a preferred state of: the one or more physical objects or another one or more physical objects is accessed. Step 9910 may include any action or operation described in Step 9510 of method 9500 as applicable.

At step 9915, a fourth collection of object representations that represents a current state of one or more computer generated objects is generated or received. Step 9915 may include any action or operation described in Step 3105 of method 3100 as applicable.

At step 9920, a first determination is made that there is at least partial match between the fourth collection of object representations and the first collection of object representations. Step 9920 may include any action or operation described in Step 2315 of method 2300 and/or Step 3315 of method 3300 as applicable.

At step 9925, a second determination is made that there is at least partial match between the third collection of object representations and the second collection of object representations. Step 9925 may include any action or operation described in Step 9525 of method 9500 as applicable.

At step 9930, a third determination is made of the first one or more instruction sets in a path between the first collection of object representations and the second collection of object representations. Step 9930 may include any action or operation described in Step 9530 of method 9500 as applicable.

At step 9932, the first one or more instruction sets for performing the first manipulation of the one or more physical objects are converted into a first one or more instruction sets for performing a first manipulation of the one or more computer generated objects. Step 9932 may include any action or operation described in Step 7327 of method 7300 as applicable.

At step 9935, the first one or more instruction sets for performing the first manipulation of the one or more computer generated objects are executed. In some aspects, Step 9935 may be performed in response to at least the first determination in Step 9920, the second determination in Step 9925, and/or the third determination in Step 9930. Step 9935 may include any action or operation described in Step 3115 of method 3100 and/or Step 9735 of method 9700 as applicable.

At step 9940, the first manipulation of the one or more computer generated objects is performed. Step 9940 may include any action or operation described in Step 3120 of method 3100 and/or Step 9740 of method 9700 as applicable.

In some embodiments, other methods can be implemented by combining one or more steps of the disclosed methods. In one example, a method for learning a device's or system's purpose and implementing a device's or system's purpose may be implemented by combining one or more steps 9405-9415 of method 9400 and one or more steps 9505-9540 of method 9500. In another example, a method for learning an avatar's or application's purpose and implementing an avatar's or application's purpose may be implemented by combining one or more steps 9605-9615 of method 9600 and one or more steps 9705-9740 of method 9700. Any other combination of the disclosed methods and/or their steps can be implemented in various embodiments.

Figure 70A:
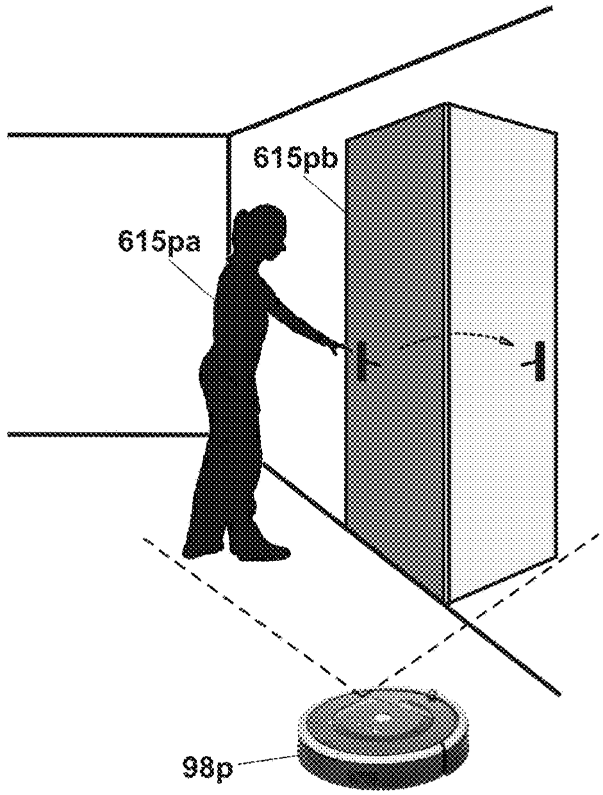
FIG. 70A-70B illustrate an exemplary embodiment of Automatic Vacuum Cleaner 98*p* learning purposes.
Figure 70B:
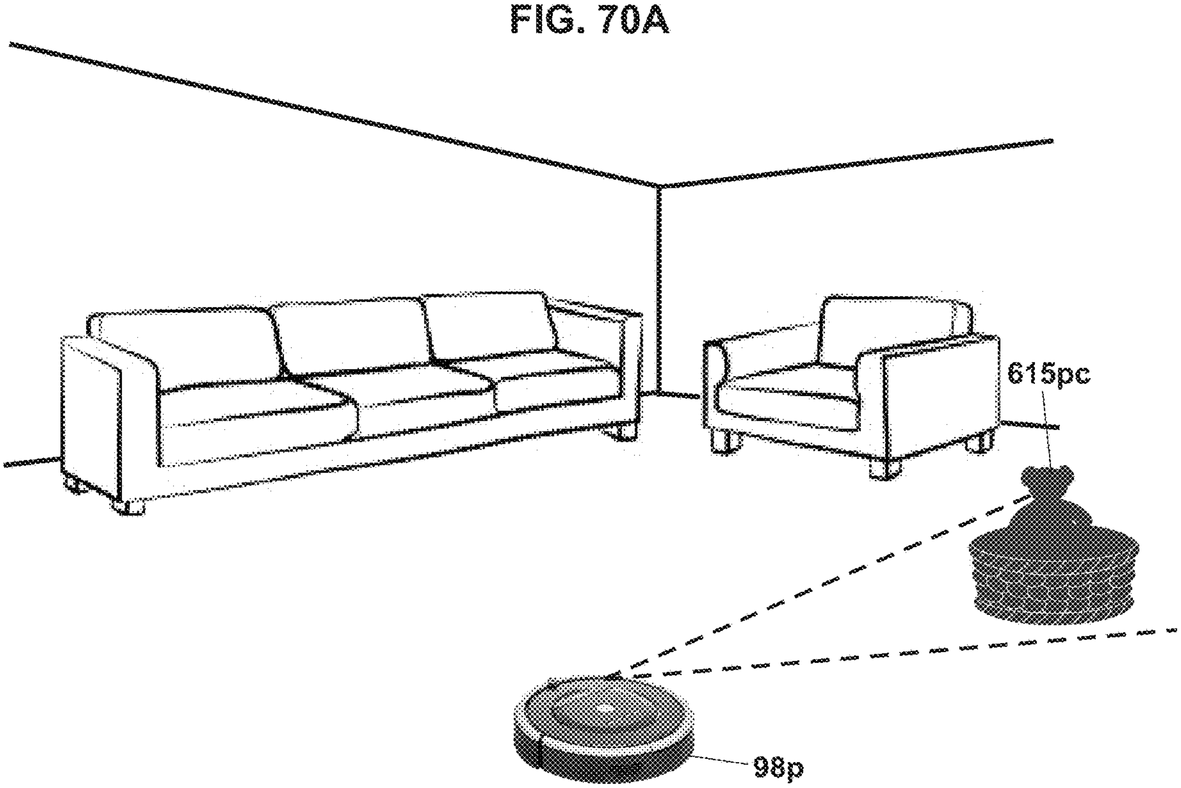
Figure 71:
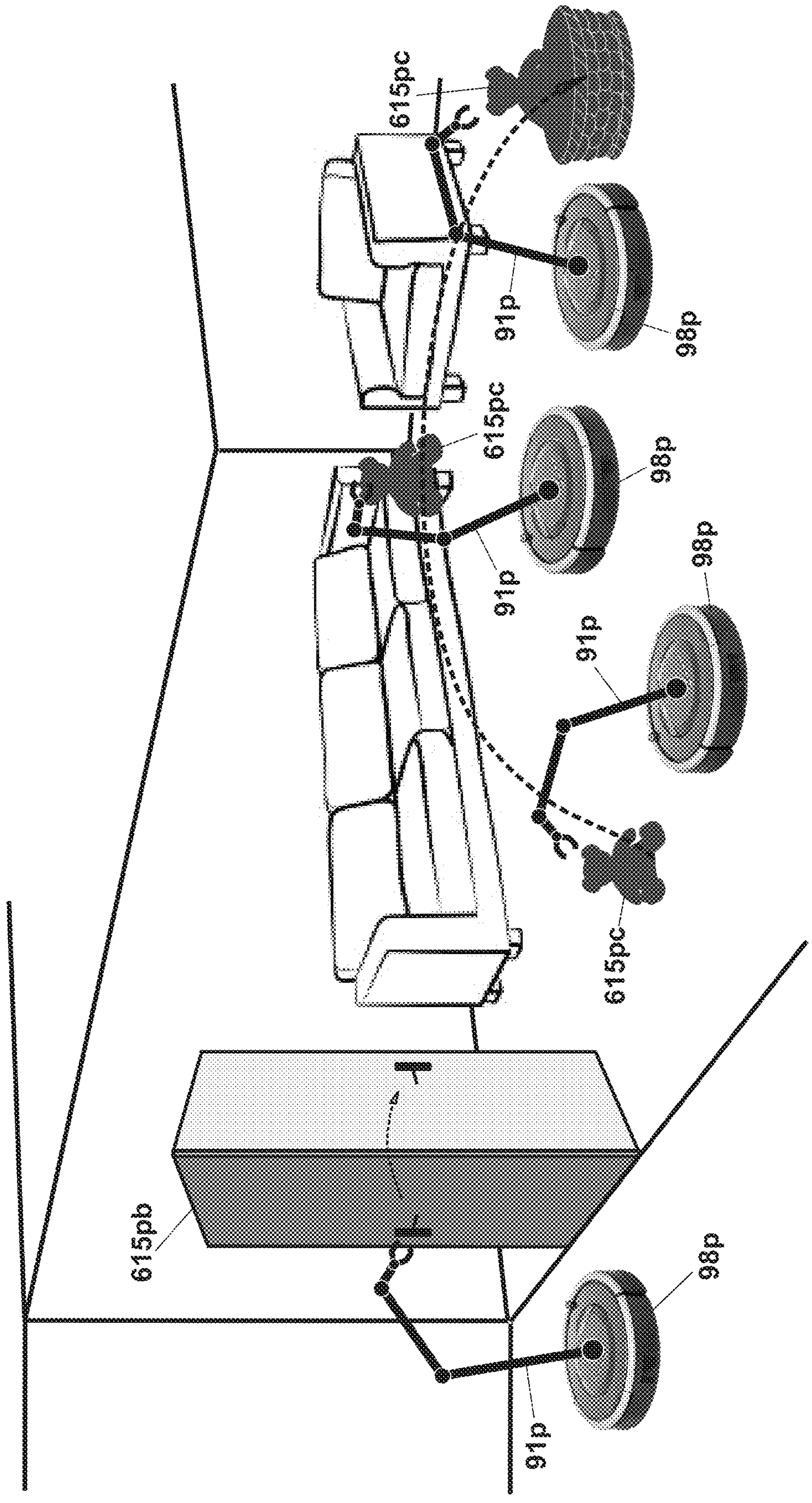
FIG. 71 illustrates an exemplary embodiment of Automatic Vacuum Cleaner 98*p* implementing purposes.

Referring to FIGS. 70A, 70B, and 71, in some exemplary embodiments, Device 98 may be or include Automatic Vacuum Cleaner 98*p*. Object Processing Unit 115 may generate one or more Collections of Object Representations 525 representing detected one or more Objects 615 or states of one or more Objects 615 and/or Automatic Vacuum Cleaner 98*p* or states of Automatic Vacuum Cleaner 98*p*. As shown for example in FIG. 70A, Automatic Vacuum Cleaner 98*p* in a purpose-learning mode may detect a person Object 615*pa* and a door Object 615*pb*. Consciousness Unit 110 or elements (i.e. Purpose Structuring Unit 136, Logic for Identifying Preferred States of Objects Based on Causations 138*c*, etc.) thereof may cause Automatic Vacuum Cleaner 98*p* to observe (i.e. as indicated by the dashed lines, etc.) the person Object's 615*pa* opening of the door Object 615*pb* and identify the open state of the door Object 615*pb* as being a preferred state of the door Object 615*pb*. Consciousness Unit 110 or elements thereof may thereby learn the resulting open state of the door Object 615*pb* as a purpose of Automatic Vacuum Cleaner 98*p* by learning Collection of Object Representations 525 that represents the open state of the door Object 615*pb*. Any Extra Info 527 can also optionally be learned. Consciousness Unit 110 or elements thereof may store the Collection of Object Representations 525 and/or other elements into Purpose Structure 161 (i.e. Collection of Sequences 161*a*, Graph or Neural Network 161*b*, Collection of Purpose Representations, etc.). As shown for example in FIG. 70B, Automatic Vacuum Cleaner 98*p* in a purpose-learning mode may detect a toy Object 615*pc*. Consciousness Unit 110 or elements (i.e. Purpose Structuring Unit 136, Logic for Identifying Preferred States of Objects Based on Frequencies 138*b*, etc.) thereof may cause Automatic Vacuum Cleaner 98*p* to observe (i.e. as indicated by the dashed lines, etc.) the toy Object 615*pc* frequently being in a toy basket and identify the state of the toy Object 615*pc* in the toy basket as being a preferred state of the toy Object 615*pc*. Consciousness Unit 110 or elements thereof may thereby learn the state of the toy Object 615*pc* being in a toy basket as a purpose of Automatic Vacuum Cleaner 98*p* by learning Collection of Object Representations 525 that represents the state of the toy Object 615*pc* being in the toy basket. Any Extra Info 527 can also optionally be learned. Consciousness Unit 110 or elements thereof may store the Collection of Object Representations 525 and/or other elements into Purpose Structure 161. As shown for example in FIG. 71, Automatic Vacuum Cleaner 98*p* in a purpose-implementing mode may detect a door Object 615*pb* in a closed state. One of Automatic Vacuum Cleaner's 98*p* purposes may be to open the door Object 615*pb* (i.e. to enter a room and organize it, to see what is in the room, etc.). Consciousness Unit 110 or elements (i.e. Purpose Implementing Unit 181, Knowledge Structure 160, Purpose Structure 161, etc.) thereof may include purpose and knowledge of opening the door Object 615*pb* or another similar Object 615, which Automatic Vacuum Cleaner 98*p* may use to open the door Object 615*pb*. Consciousness Unit 110 or elements thereof may compare incoming Collection of Object Representations 525 representing the current state of the door Object 615*pb* with Collections of Object Representations 525 in Knowledge Structure 160 representing previously learned states of one or more Objects 615. If found, at least partially matching Collection of Object Representations 525 in Knowledge Structure 160 may be an initial Collection of Object Representations 525 in a path for effecting the preferred open state of the door Object 615*pb*. Furthermore, Consciousness Unit 110 or elements thereof may compare Collection of Object Representations 525 from Purpose Structure 161 representing the preferred open state of the door Object 615*pb* with Collections of Object Representations 525 in Knowledge Structure 160 representing previously learned states of one or more Objects 615. If found, at least partially matching Collection of Object Representations 525 in Knowledge Structure 160 may be a final Collection of Object Representations 525 in a path for effecting the preferred open state of the door Object 615*pb*. Furthermore, Instruction Sets 526 correlated with one or more Collections of Object Representations 525 in the path from the initial Collection of Object Representations 525 to the final Collection of Object Representations 525 can be executed to cause Automatic Vacuum Cleaner 98*p* and/or its robotic arm Actuator 91*p* to open the door Object 615*pb*, thereby implementing Automatic Vacuum Cleaner's 98*p* purpose of opening the door Object 615*pb*. After opening the door Object 615*pb*, Automatic Vacuum Cleaner 98*p* in a purpose-implementing mode may detect a toy Object 615*pc* on the floor a room. One of Automatic Vacuum Cleaner's 98*p* purposes may be to move the toy Object 615*pc* into a toy basket (i.e. to organize the room, etc.). Consciousness Unit 110 or elements (i.e. Purpose Implementing Unit 181, Knowledge Structure 160, Purpose Structure 161, etc.) thereof may include purpose and knowledge of moving the toy Object 615*pc* or another similar Object 615 into the toy basket, which Automatic Vacuum Cleaner 98*p* may use to move the toy Object 615*pc* into the toy basket. Consciousness Unit 110 or elements thereof may compare incoming Collection of Object Representations 525 representing the current state of the toy Object 615*pc* with Collections of Object Representations 525 in Knowledge Structure 160 representing previously learned states of one or more Objects 615. If found, at least partially matching Collection of Object Representations 525 in Knowledge Structure 160 may be an initial Collection of Object Representations 525 in a path for effecting the preferred moved state of the toy Object 615*pc*. Furthermore, Consciousness Unit 110 or elements thereof may compare Collection of Object Representations 525 from Purpose Structure 161 representing the preferred moved state of the toy Object 615*pc* with Collections of Object Representations 525 in Knowledge Structure 160 representing previously learned states of one or more Objects 615. If found, at least partially matching Collection of Object Representations 525 in Knowledge Structure 160 may be a final Collection of Object Representations 525 in a path for effecting the preferred moved state of the toy Object 615*pc*. Furthermore, Instruction Sets 526 correlated with one or more Collections of Object Representations 525 in the path from the initial Collection of Object Representations 525 to the final Collection of Object Representations 525 can be executed to cause Automatic Vacuum Cleaner 98*p* and/or its robotic arm Actuator 91*p* to move the toy Object 615*pc*, thereby implementing Automatic Vacuum Cleaner's 98*p* purpose of moving the toy Object 615*pc* into the toy basket. Any previously learned Extra Info 527 may optionally be used for enhanced decision making and/or other functionalities. Once Automatic Vacuum Cleaner 98*p* implements the purposes of opening the door Object 615*pb* and moving the toy Object 615*pc* into the toy basket, Automatic Vacuum Cleaner 98*p* can look for other purposes to pursue or implement as previously described.

Figure 72A:
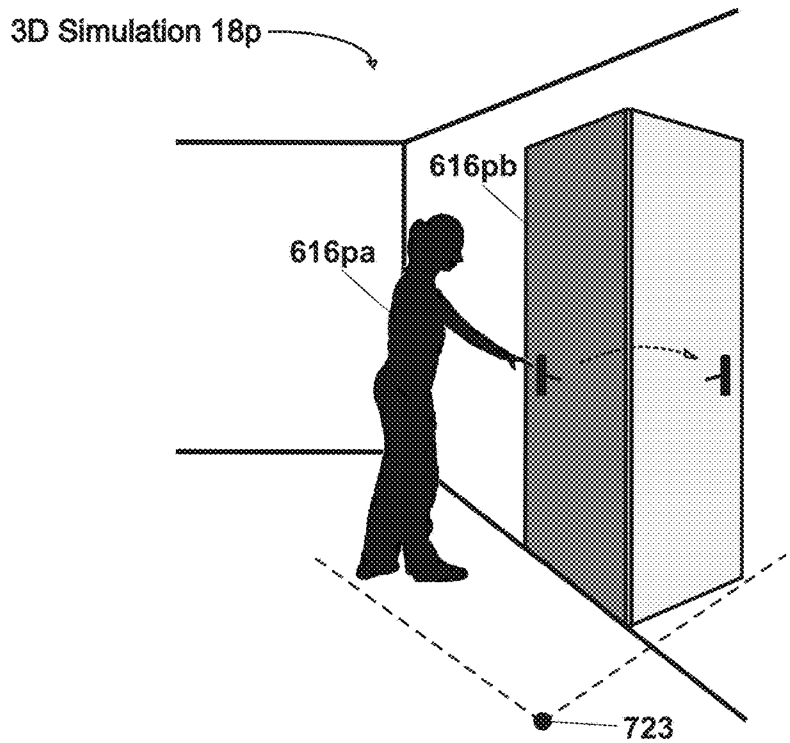
FIG. 72A-72B illustrate an exemplary embodiment of learning purposes in 3D Simulation 18*p*.
Figure 72B:
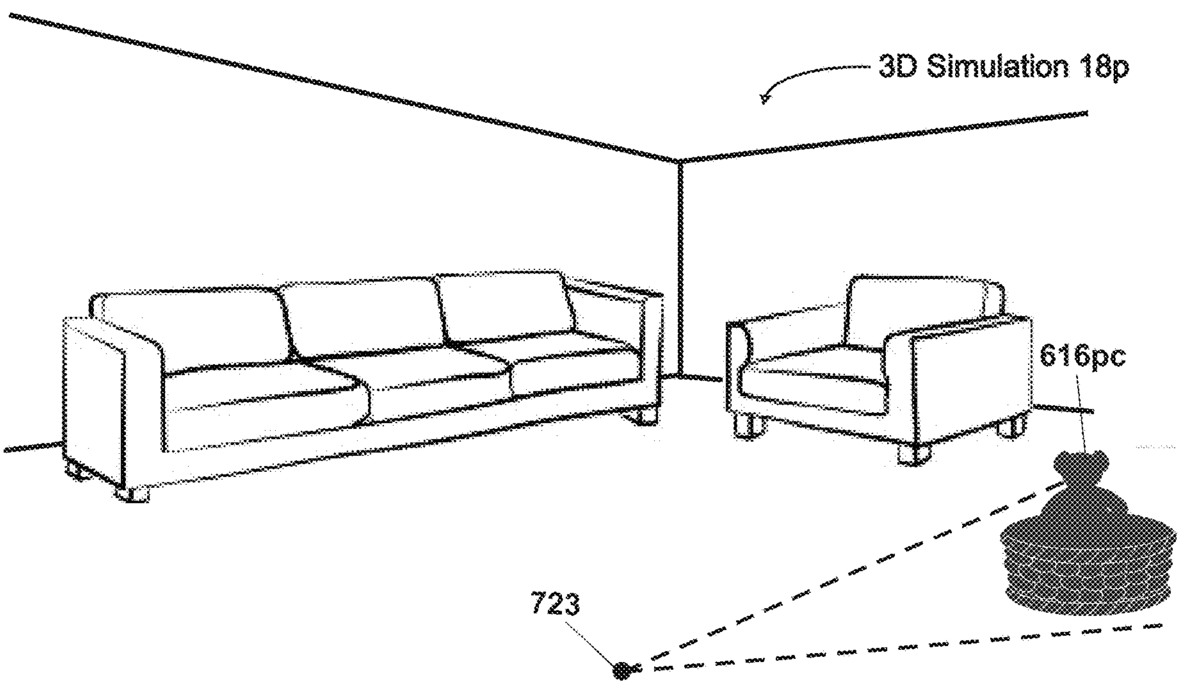
Figure 73:
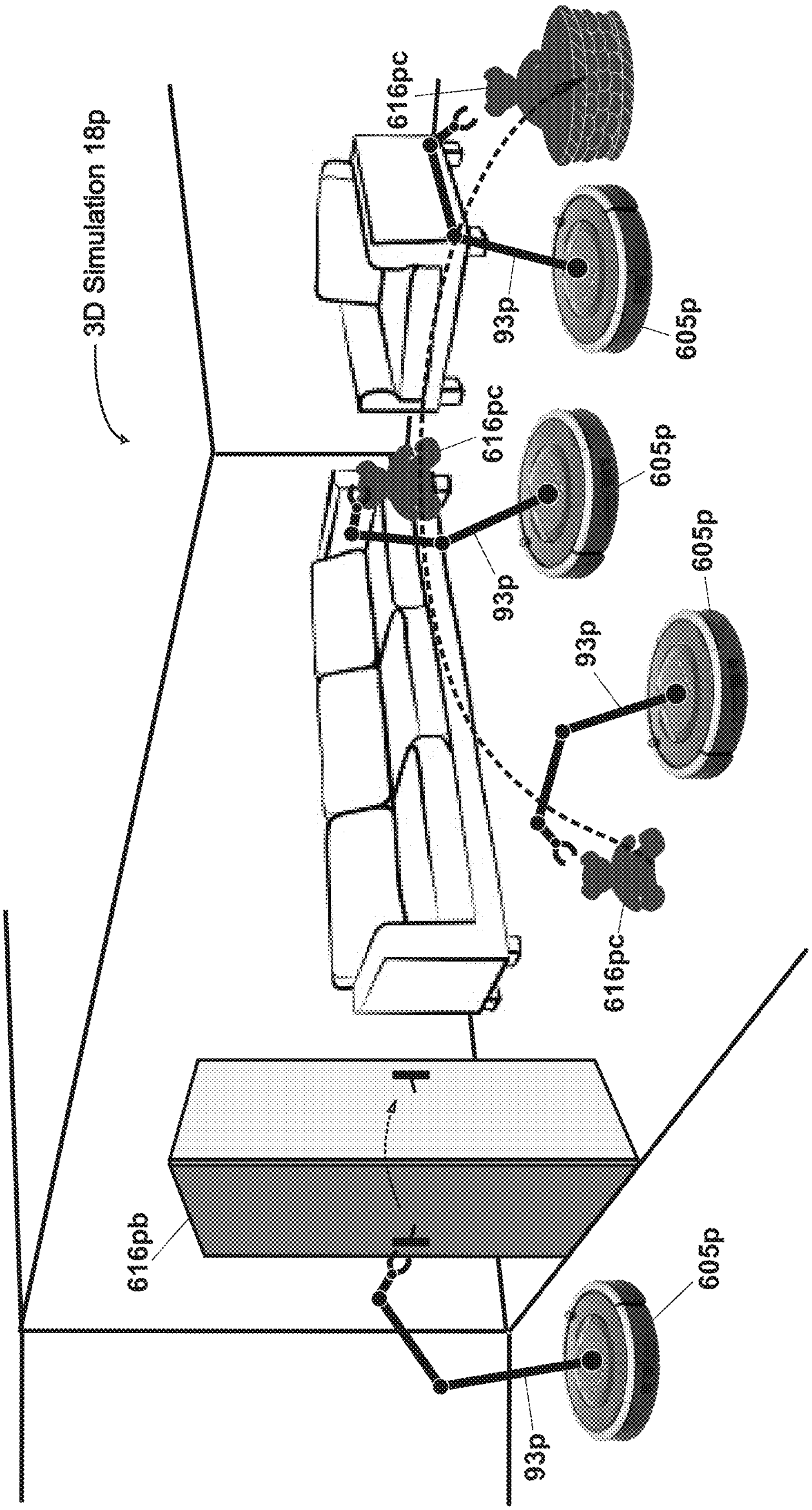
FIG. 73 illustrates an exemplary embodiment of Simulated Automatic Vacuum Cleaner 605*p* implementing purposes.

Referring to FIGS. 72A, 72B, and 73, in some exemplary embodiments, Application Program 18 may be or include 3D Simulation 18*p* (i.e. robot or device simulation, etc.). Avatar 605 may be or include Simulated Automatic Vacuum Cleaner 605*p*. Object Processing Unit 115 may generate one or more Collections of Object Representations 525 representing detected or obtained one or more Objects 616 or states of the one or more Objects 616 and/or Simulated Automatic Vacuum Cleaner 605*p* or states of Simulated Automatic Vacuum Cleaner 605*p*. As shown for example in FIG. 72A, Consciousness Unit 110 or elements thereof in a purpose-learning mode may detect, from Observation Point 723 (i.e. as indicated by the dashed lines, etc.), a simulated person Object 616*pa* opening a simulated door Object 616*pb*, thereby learning the resulting open state of the simulated door Object 616*pb* as a preferred state of the simulated door Object 616*pb* and a purpose of Simulated Automatic Vacuum Cleaner 605*p* as previously described with respect to Automatic Vacuum Cleaner 98*p*, person Object 615*pa*, door Object 615*pb*, Consciousness Unit 110, Purpose Structuring Unit 136, etc. in FIG. 70A. As shown for example in FIG. 72B, Consciousness Unit 110 or elements thereof in a purpose-learning mode may detect, from Observation Point 723 (i.e. as indicated by the dashed lines, etc.), a simulated toy Object 616*pc* frequently being in a toy basket, thereby learning the state of the simulated toy Object 616*pc* being in the toy basket as a preferred state of the simulated toy Object 616*pc* and a purpose of Simulated Automatic Vacuum Cleaner 605*p* as previously described with respect to Automatic Vacuum Cleaner 98*p*, toy Object 615*pc*, Consciousness Unit 110, Purpose Structuring Unit 136, etc. in FIG. 70B. As shown for example in FIG. 73, Simulated Automatic Vacuum Cleaner 605*p* in a purpose-implementing mode may detect a closed simulated door Object 616*pb* and use purpose and knowledge of opening the simulated door Object 616*pb*, thereby effecting the open state of the simulated door Object 616*pb* as previously described with respect to Automatic Vacuum Cleaner 98*p*, robotic arm Actuator 91*p*, door Object 615*pb*, Consciousness Unit 110, Purpose Implementing Unit 181, Knowledge Structure 160, Purpose Structure 161, etc. in FIG. 71. Furthermore, after opening the simulated door Object 616*pb*, Simulated Automatic Vacuum Cleaner 605*p* in a purpose-implementing mode may detect a simulated toy Object 616*pc* on the floor and use purpose and knowledge of moving the simulated toy Object 616*pc*, thereby effecting the state of the simulated toy Object 616*pc* being in a toy basket as previously described with respect to Automatic Vacuum Cleaner 98*p*, robotic arm Actuator 91*p*, toy Object 615*pc*, Consciousness Unit 110, Purpose Implementing Unit 181, Knowledge Structure 160, Purpose Structure 161, etc. in FIG. 71.

Figure 74A:
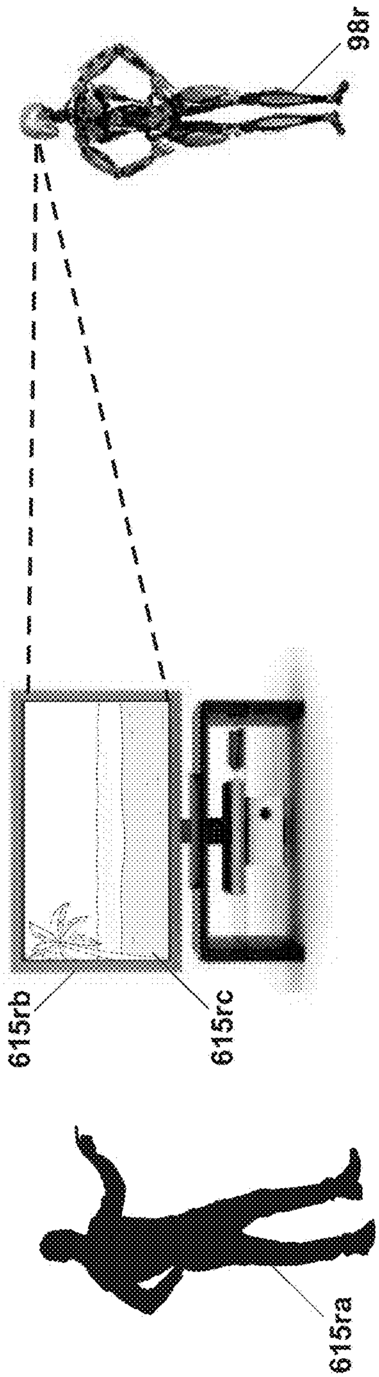
FIG. 74A-74B illustrate an exemplary embodiment of Robot 98*r* learning and implementing a purpose.
Figure 74B:
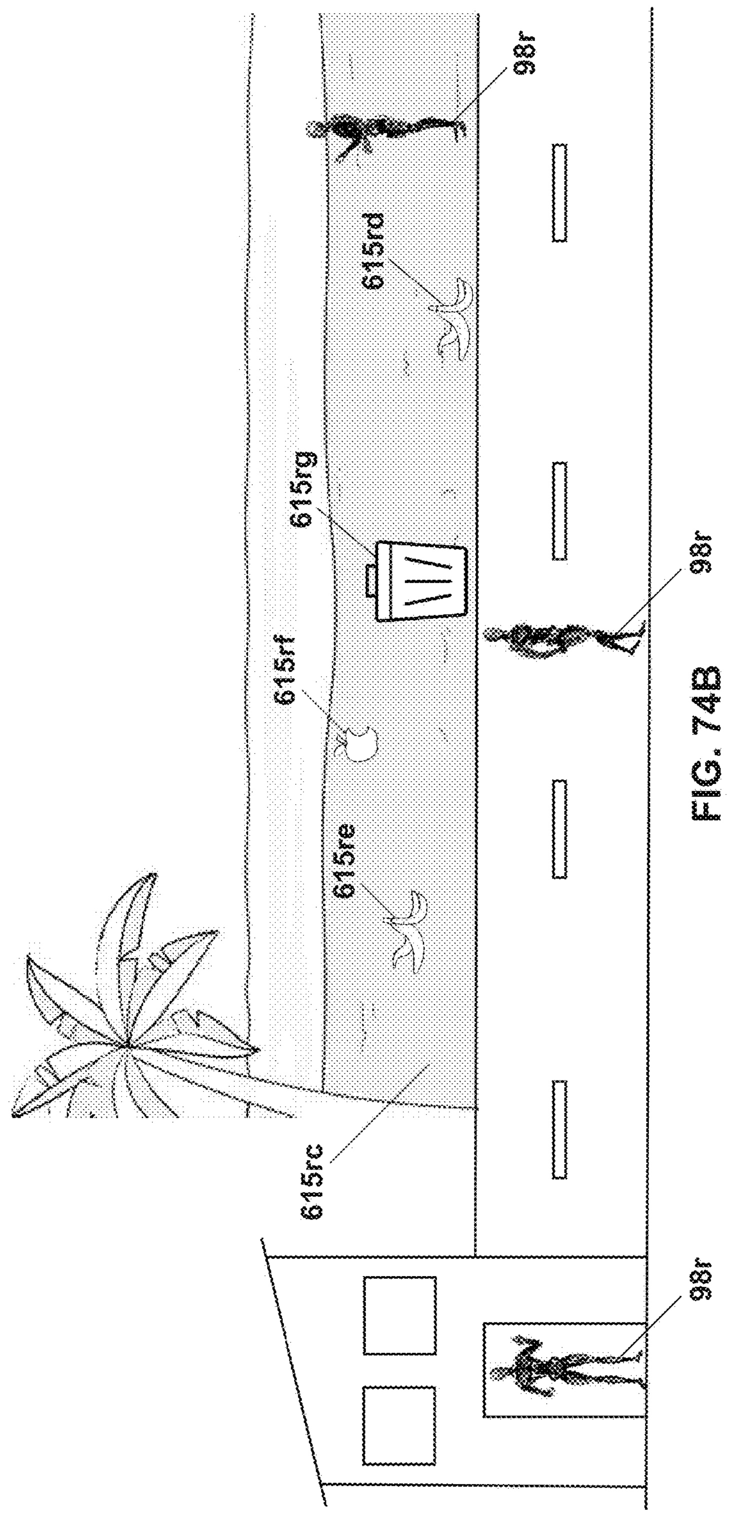

Referring to FIGS. 74A and 74B, in some exemplary embodiments, Device 98 may be or include Robot 98*r*. Object Processing Unit 115 may generate one or more Collections of Object Representations 525 representing detected one or more Objects 615 or states of one or more Objects 615 and/or Robot 98*r* or states of Robot 98*r*. As shown for example in FIG. 74A, Robot 98*r* in a purpose-learning mode may detect a person Object 615*ra* and a television Object 615*rb*. Consciousness Unit 110 or elements (i.e. Purpose Structuring Unit 136, Logic for Identifying Preferred States of Objects Based on Representations 138*d*, etc.) thereof may cause Robot 98*r* to observe (i.e. as indicated by the dashed lines, etc.) the person Object 615*ra* pointing (i.e. pointing gesture indication, etc.) to the television Object 615*rb* that shows a clean beach Object 615*rc* and identify the clean state of the beach Object 615*rc* as being a preferred state of the beach Object 615*rc*. Consciousness Unit 110 or elements thereof may thereby learn the clean state of the beach Object 615*rc* as a purpose of Robot 98*r* by learning Collection of Object Representations 525 that represents the clean state of the beach Object 615*rc*. Any Extra Info 527 can also optionally be learned. Consciousness Unit 110 or elements thereof may store the Collection of Object Representations 525 and/or other elements into Purpose Structure 161 (i.e. Collection of Sequences 161*a*, Graph or Neural Network 161*b*, Collection of Purpose Representations, etc.). As shown for example in FIG. 74B, Robot 98*r* in a purpose-implementing mode may detect or be aware of a nearby beach Object 615*rc*. One of Robot's 98*r* purposes may be to move to the beach Object 615*rc* (i.e. to inspect it, to clean it, etc.). Consciousness Unit 110 or elements (i.e. Purpose Implementing Unit 181, Knowledge Structure 160, Purpose Structure 161, etc.) thereof may include purpose and knowledge of moving Robot 98*r* to the beach Object 615*rc*, which Robot 98*r* may use to move from a current state of being in a house to a state of being at the beach Object 615*rc*. Consciousness Unit 110 or elements thereof may compare incoming Collection of Object Representations 525 representing the current state of Robot 98*r* with Collections of Object Representations 525 in Knowledge Structure 160 representing previously learned states of Robot 98*r*. If found, at least partially matching Collection of Object Representations 525 in Knowledge Structure 160 may be an initial Collection of Object Representations 525 in a path for effecting the preferred state of Robot 98*r* of being at the beach Object 615*rc*. Furthermore, Consciousness Unit 110 or elements thereof may compare Collection of Object Representations 525 from Purpose Structure 161 representing the preferred state of Robot 98*r* of being at the Beach Object 615*rc* with Collections of Object Representations 525 in Knowledge Structure 160 representing previously learned states of Robot 98*r*. If found, at least partially matching Collection of Object Representations 525 in Knowledge Structure 160 may be a final Collection of Object Representations 525 in a path for effecting the preferred state of Robot 98*r* of being at the beach Object 615*rc*. Furthermore, Instruction Sets 526 correlated with one or more Collections of Object Representations 525 in the path from the initial Collection of Object Representations 525 to the final Collection of Object Representations 525 can be executed to move Robot 98*r* to the beach Object 615*rc*, thereby implementing Robot's 98*r* purpose of being at the beach Object 615*rc*. Such Instruction Sets 526 may include Instruction Sets 526 for opening the house door as previously described and/or performing other manipulations of Objects 615. After moving to the beach Object 615*rc*, Robot 98*r* may detect the beach Object 615*rc* in a littered state (i.e. littered with garbage Objects 615*rd*-615*rf*, etc.). One of Robot's 98*r* purposes may be to clean the beach Object 615*rc*. Consciousness Unit 110 or elements (i.e. Purpose Implementing Unit 181, Knowledge Structure 160, Purpose Structure 161, etc.) thereof may include purpose and knowledge of cleaning the beach Object 615*rc* (i.e. collecting and/or moving garbage Objects 615*rd*-615*rf*, etc.), which Robot 98*r* can use to clean the beach Object 615*rc*. Consciousness Unit 110 or elements thereof may compare incoming Collection of Object Representations 525 representing the current state of the beach Object 615*rc* with Collections of Object Representations 525 in Knowledge Structure 160 representing previously learned states of one or more Objects 615. If found, at least partially matching Collection of Object Representations 525 in Knowledge Structure 160 may be an initial Collection of Object Representations 525 in a path for effecting the preferred clean state of the beach Object 615*rc*. Furthermore, Consciousness Unit 110 or elements thereof may compare Collection of Object Representations 525 from Purpose Structure 161 representing the preferred clean state of the beach Object 615*rc* with Collections of Object Representations 525 in Knowledge Structure 160 representing previously learned states of one or more Objects 615. If found, at least partially matching Collection of Object Representations 525 in Knowledge Structure 160 may be a final Collection of Object Representations 525 in a path for effecting the preferred clean state of the beach Object 615*rc*. Furthermore, Instruction Sets 526 correlated with one or more Collections of Object Representations 525 in the path from the initial Collection of Object Representations 525 to the final Collection of Object Representations 525 can be executed to cause Robot 98*r* to clean the beach Object 615*rc*, thereby implementing Robot's 98*r* purpose of cleaning the beach Object 615*rc*. Such Instruction Sets 526 may include Instruction Sets 526 for collecting each of the garbage Objects 615*rd*-615*rf* and/or moving each of the garbage Objects 615*rd*-615*rf* into a garbage bin Object 615*rg* as previously described and/or performing other manipulations of Objects 615. Any previously learned Extra Info 527 may optionally be used for enhanced decision making and/or other functionalities. Once Robot 98*r* implements the purposes of moving to the beach Object 615*rc* and cleaning the beach Object 615*rc*, Robot 98*r* can look for other purposes to pursue or implement as previously described.

Figure 75A:
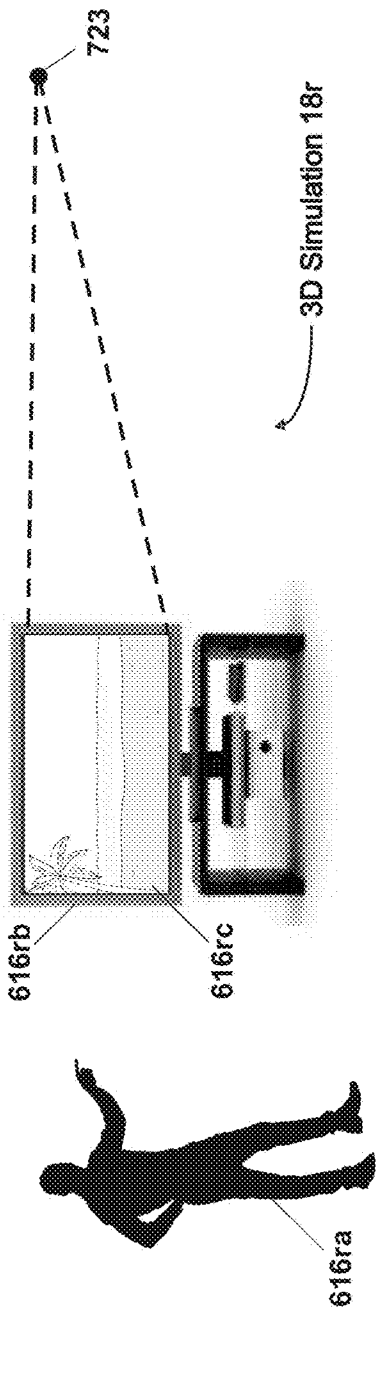
FIG. 75A-75B illustrate an exemplary embodiment of learning a purpose in 3D Simulation 18*r* and Simulated Robot 605*r* implementing a purpose.
Figure 75B:
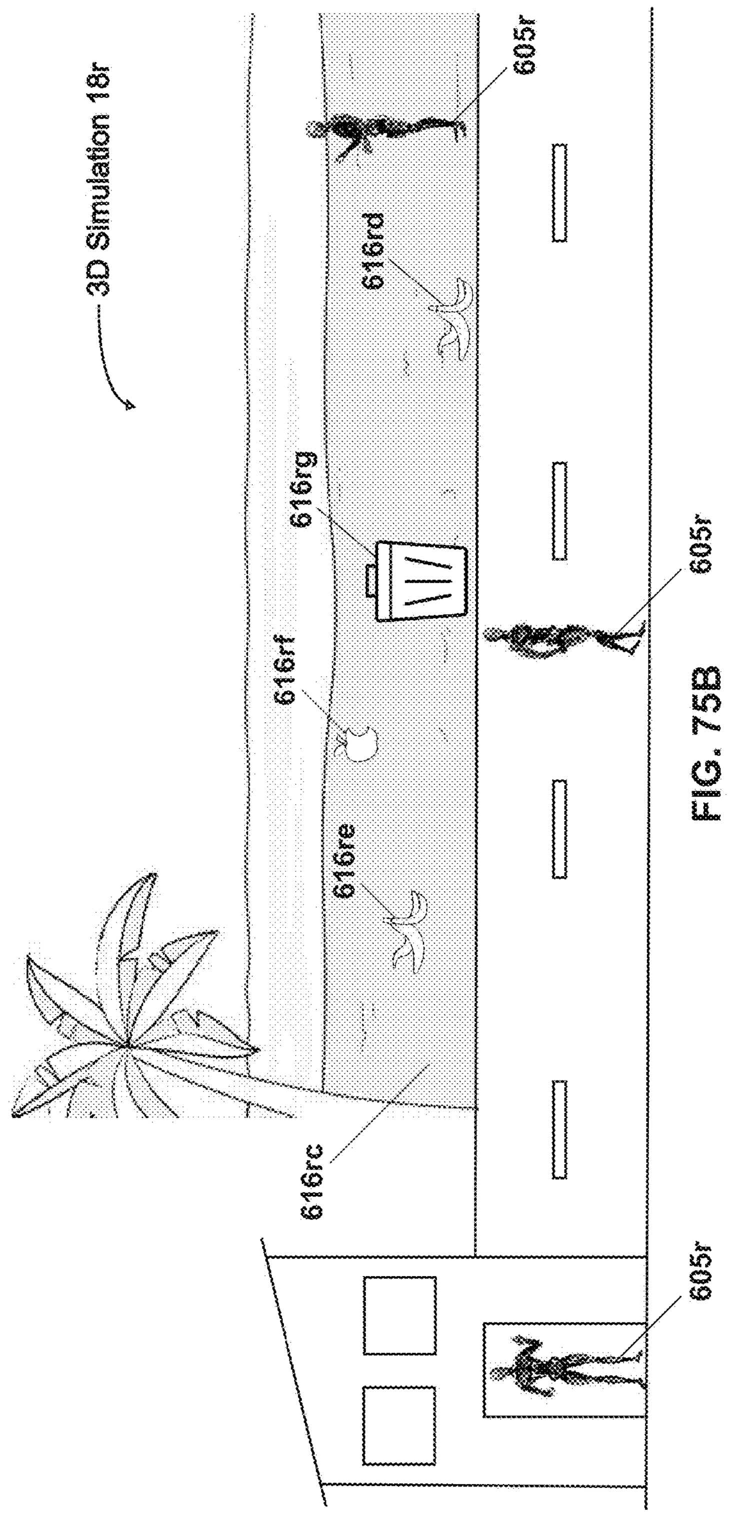

Referring to FIGS. 75A and 75B, in some exemplary embodiments, Application Program 18 may be or include 3D Simulation 18*r* (i.e. robot or device simulation, etc.). Avatar 605 may be or include Simulated Robot 605*r*. Object Processing Unit 115 may generate one or more Collections of Object Representations 525 representing detected or obtained one or more Objects 616 or states of one or more Objects 616 and/or Simulated Robot 605*r* or states of Simulated Robot 605*r*. As shown for example in FIG. 75A, Consciousness Unit 110 or elements thereof in a purpose-learning mode may detect, from Observation Point 723 (i.e. as indicated by the dashed lines, etc.), a simulated person Object 616*ra* pointing (i.e. pointing gesture indication, etc.) to a simulated television Object 616*rb* that shows a clean simulated beach Object 616*rc*, thereby learning the clean state of the simulated beach Object 616*rc* as a preferred state of the simulated beach Object 616*rc* and a purpose of Simulated Robot 605*r* as previously described with respect to Robot 98*r*, person Object 615*ra*, television Object 615*rb*, beach Object 615*rc*, Consciousness Unit 110, Purpose Structuring Unit 136, etc. in FIG. 74A. As shown for example in FIG. 75B, Simulated Robot 605*r* in a purpose-implementing mode may detect or be aware of a nearby simulated beach Object 616*rc* and use purpose and knowledge of moving to the simulated beach Object 616*rc*, thereby effecting the state of being at the simulated beach Object 616*rc* as previously described with respect to Robot 98*r*, beach Object 615*rc*, Consciousness Unit 110, Purpose Implementing Unit 181, Knowledge Structure 160, Purpose Structure 161, etc. in FIG. 74B. Furthermore, after moving to the simulated beach Object 616*rc*, Simulated Robot 605*r* in a purpose-implementing mode may detect a littered simulated beach Object 616*rc* and use purpose and knowledge of cleaning the simulated beach Object 616*rc*, thereby effecting the clean state of the simulated beach Object 616*rc* as previously described with respect to Robot 98*r*, beach Object 615*rc*, garbage Objects 615*rd*-615*rf*, garbage bin Object 615*rg*, Consciousness Unit 110, Purpose Implementing Unit 181, Knowledge Structure 160, Purpose Structure 161, etc. in FIG. 74B.

Figure 76A:
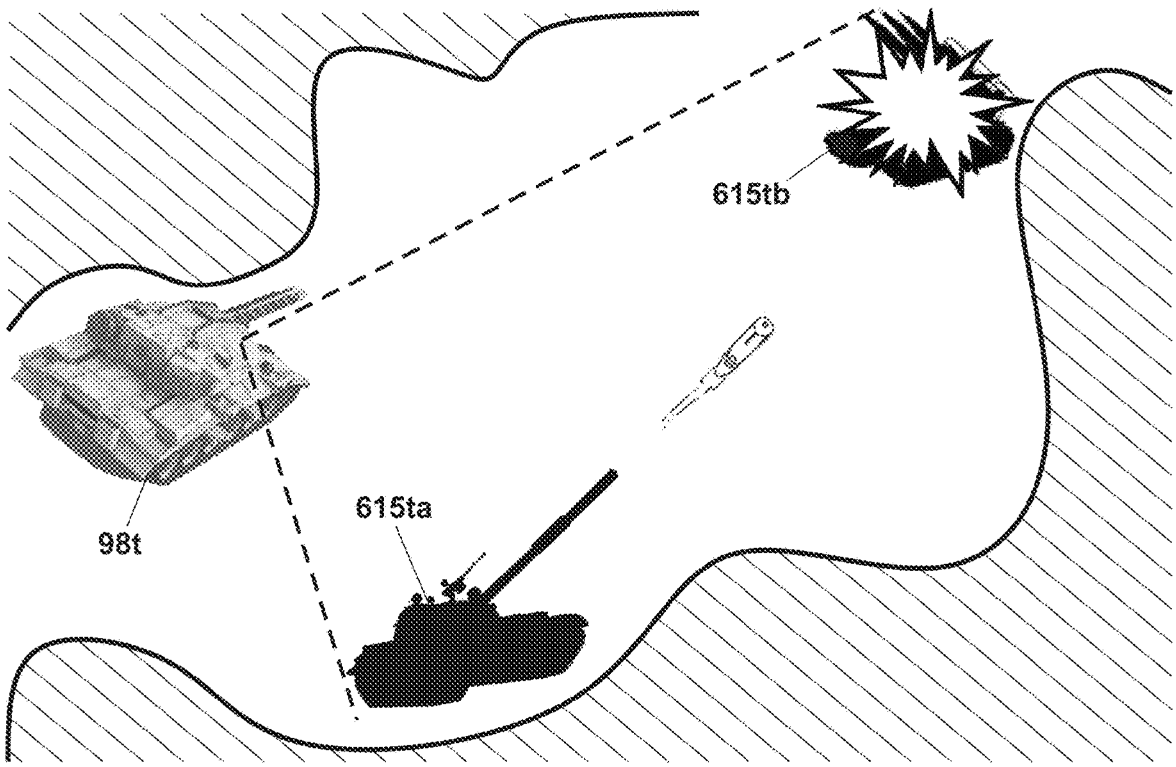
FIG. 76A-76B illustrate an exemplary embodiment of Tank 98*t* learning and implementing a purpose.
Figure 76B:
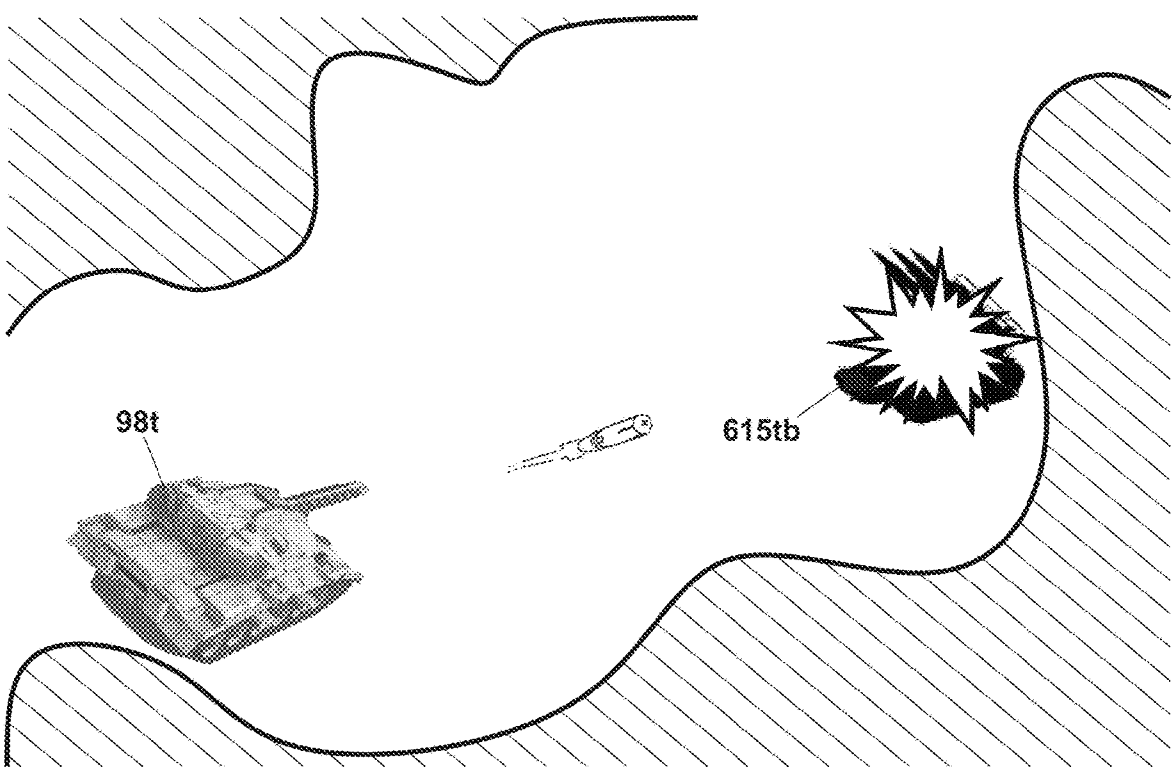

Referring to FIGS. 76A and 76B, in some exemplary embodiments, Device 98 may be or include Tank 98*t*. Object Processing Unit 115 may generate one or more Collections of Object Representations 525 representing detected one or more Objects 615 or states of one or more Objects 615 and/or Tank 98*t* or states of Tank 98*t*. As shown for example in FIG. 76A, Tank 98*t* in a purpose-learning mode may detect a tank Object 615*ta* and rocket launcher Object 615*tb*. Consciousness Unit 110 or elements (i.e. Purpose Structuring Unit 136, Logic for Identifying Preferred States of Objects Based on Causations 138*c*, etc.) thereof may cause Tank 98*t* to observe (i.e. as indicated by the dashed lines, etc.) the tank Object 615*ta* shooting a projectile at the rocket launcher Object 615*tb* and identify the resulting destroyed state of the rocket launcher Object 615*tb* as being a preferred state of the rocket launcher Object 615*tb*. Consciousness Unit 110 or elements thereof may thereby learn the destroyed state of the rocket launcher Object 615*tb* as a purpose of Tank 98*t* by learning Collection of Object Representations 525 that represents the destroyed state of the rocket launcher Object 615*tb*. Any Extra Info 527 can also optionally be learned. Consciousness Unit 110 or elements thereof may store the Collection of Object Representations 525 and/or other elements into Purpose Structure 161 (i.e. Collection of Sequences 161*a*, Graph or Neural Network 161*b*, Collection of Purpose Representations, etc.). As shown for example in FIG. 76B, Tank 98*t* in a purpose-implementing mode may detect a rocket launcher Object 615*tb* in a non-destroyed state. One of Tank's 98*t* purposes may be to destroy the rocket launcher Object 615*tb*. Consciousness Unit 110 or elements (i.e. Purpose Implementing Unit 181, Knowledge Structure 160, Purpose Structure 161, etc.) thereof may include purpose and knowledge of destroying (i.e. by shooting a projectile, etc.) the rocket launcher Object 615*tb* or another similar Object 615, which Tank 98*t* may use to destroy the rocket launcher Object 615*tb*. Consciousness Unit 110 or elements thereof may compare incoming Collection of Object Representations 525 representing the current state of the rocket launcher Object 615*tb* with Collections of Object Representations 525 in Knowledge Structure 160 representing previously learned states of one or more Objects 615. If found, at least partially matching Collection of Object Representations 525 in Knowledge Structure 160 may be an initial Collection of Object Representations 525 in a path for effecting the preferred destroyed state of the rocket launcher Object 615*tb*. Furthermore, Consciousness Unit 110 or elements thereof may compare Collection of Object Representations 525 from Purpose Structure 161 representing the preferred destroyed state of the rocket launcher Object 615*tb* with Collections of Object Representations 525 in Knowledge Structure 160 representing previously learned states of one or more Objects 615. If found, at least partially matching Collection of Object Representations 525 in Knowledge Structure 160 may be a final Collection of Object Representations 525 in a path for effecting the preferred destroyed state of the rocket launcher Object 615*tb*. Furthermore, Instruction Sets 526 correlated with one or more Collections of Object Representations 525 in the path from the initial Collection of Object Representations 525 to the final Collection of Object Representations 525 can be executed to cause Tank 98*t* to shoot a projectile at the rocket launcher Object 615*tb*, thereby implementing Tank's 98*t* purpose of destroying the rocket launcher Object 615*tb*. Also, if needed in some aspects, the Instruction Sets 526 may be modified or additional Instruction Sets 526 may be executed to account for the difference between locations of tank Object 615*ta* and/or the rocket launcher Object 615*tb* when the purpose of destroying the rocket launcher Object 615*tb* was learned and locations of Tank 98*t* and/or the rocket launcher Object 615*tb* when the purpose of destroying the rocket launcher Object 615*tb* is implemented as previously described. Any previously learned Extra Info 527 may optionally be used for enhanced decision making and/or other functionalities. Once Tank 98*t* implements the purpose of destroying the rocket launcher Object 615*tb*, Tank 98*t* can look for other purposes to pursue or implement as previously described.

Figure 77A:
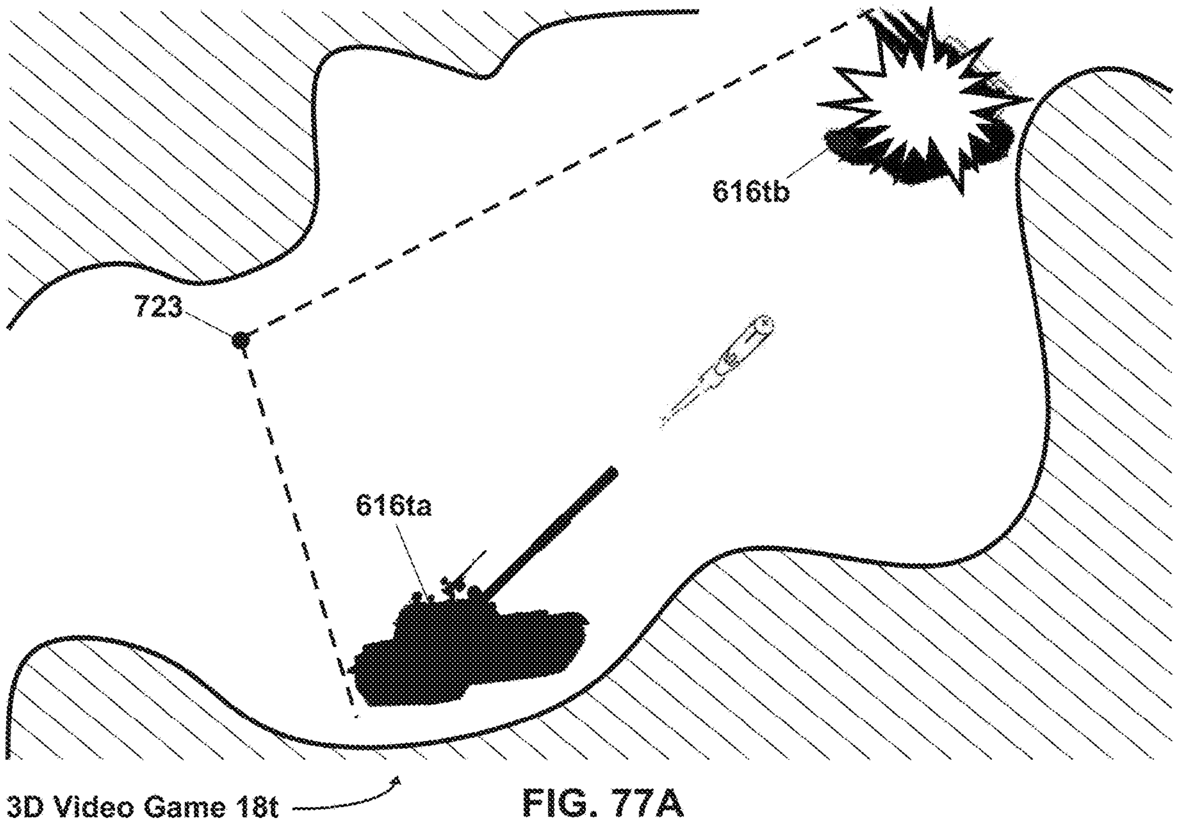
FIG. 77A-77B illustrate an exemplary embodiment of learning a purpose in 3D Video Game 18*t* and Simulated Tank 605*t* implementing a purpose.
Figure 77B:
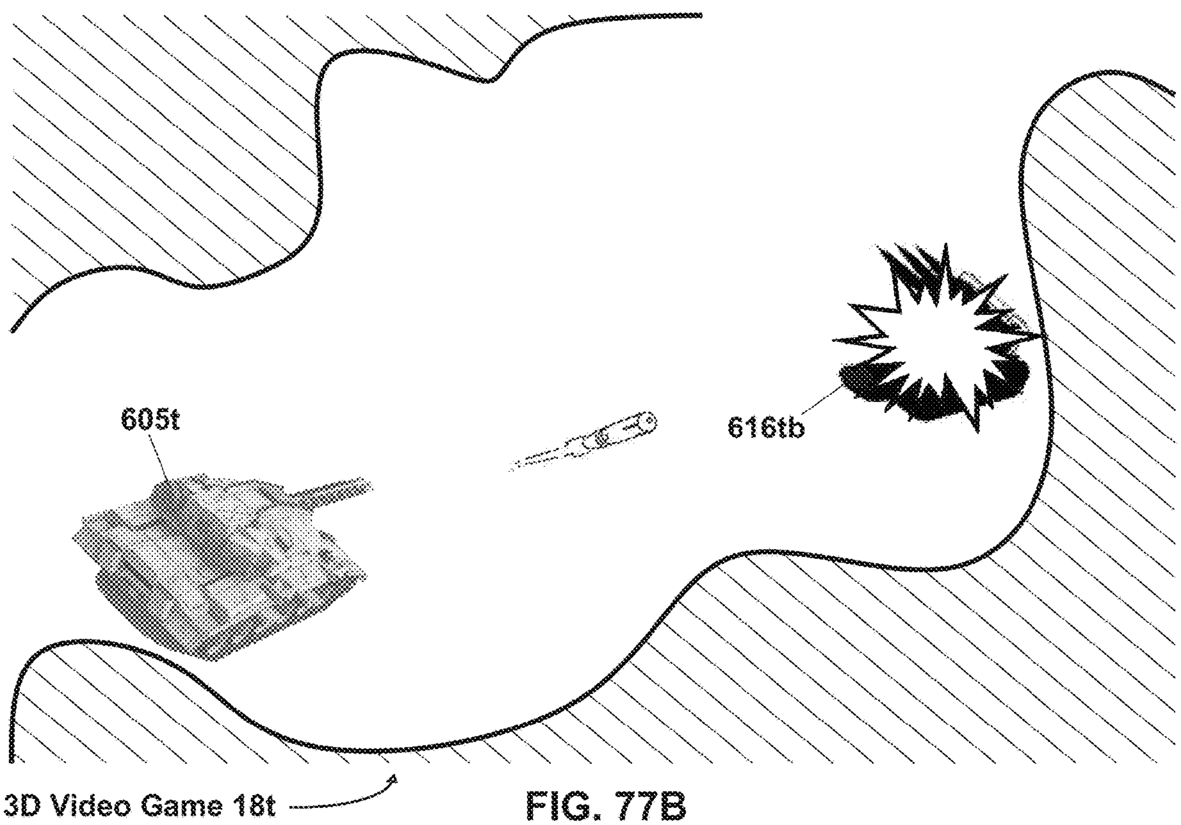

Referring to FIGS. 77A and 77B, in some exemplary embodiments, Application Program 18 may be or include 3D Video Game 18*t*. Avatar 605 may be or include Simulated Tank 605*t*. Object Processing Unit 115 may generate one or more Collections of Object Representations 525 representing detected or obtained one or more Objects 616 or states of one or more Objects 616 and/or Simulated Tank 605*t* or states of Simulated Tank 605*t*. As shown for example in FIG. 77A, Consciousness Unit 110 or elements thereof in a purpose-learning mode may detect, from Observation Point 723 (i.e. as indicated by the dashed lines, etc.), a simulated tank Object 616*ta* shooting a projectile at a simulated rocket launcher Object 616*tb*, thereby learning the resulting destroyed state of the simulated rocket launcher Object 616*tb* as a preferred state of the simulated rocket launcher Object 616*tb* and a purpose of Simulated Tank 605*t* as previously described with respect to Tank 98*t*, tank Object 615*ta*, rocket launcher Object 615*tb*, Consciousness Unit 110, Purpose Structuring Unit 136, etc. in FIG. 76A. As shown for example in FIG. 77B, Simulated Tank 605*t* in a purpose-implementing mode may detect a non-destroyed simulated rocket launcher Object 616*tb* and use purpose and knowledge of destroying the simulated rocket launcher Object 616*tb*, thereby effecting the destroyed state of the simulated rocket launcher Object 616*tb* as previously described with respect to Tank 98*t*, tank Object 615*ta*, rocket launcher Object 615*tb*, Consciousness Unit 110, Purpose Implementing Unit 181, Knowledge Structure 160, Purpose Structure 161, etc. in FIG. 76B.

Any of the examples and/or exemplary embodiments previously described with respect to LTCUAK Unit 100, LTOUAK Unit 105, and/or other elements may be used in learning a purpose or implementing a purpose.

Where a reference to a singular form "a", "an", and "the" is used herein, it should be understood that the singular form "a", "an", and "the" includes a plural referent unless the context clearly dictates otherwise.

Where a reference to a specific file or file type is used herein, other files or file types can be used instead.

Where a reference to a data structure is used herein, it should be understood that any variety of data structures can be used such as, for example, array, list, linked list, doubly linked list, queue, tree, heap, graph, grid, matrix, multi-dimensional matrix, table, database, database management system (DBMS), neural network, and/or any other type or form of a data structure including a custom data structure. A data structure may include one or more fields or data fields that are part of or associated with the data structure. A field or data field may include a data, an object, a data structure, and/or any other element or a reference/pointer thereto. A data structure can be stored in one or more memories, files, or other repositories. A data structure and/or elements thereof, when stored in a memory, file, or other repository, may be stored in a different arrangement than the arrangement of the data structure and/or elements thereof. For example, a sequence of elements can be stored in an arrangement other than a sequence in a memory, file, or other repository.

Where a reference to a repository is used herein, it should be understood that the repository may be or include one or more files or file systems, one or more storage locations or structures, one or more storage systems, one or more memory locations or structures, and/or other file, storage, or memory arrangements.

Where a reference to an interface is used herein, it should be understood that the interface comprises any hardware, device, system, program, method, or combination thereof that enable direct or operative coupling, connection, and/or interaction of the elements between which the interface is indicated. A line or arrow shown in the figures between any of the depicted elements comprises such interface. Examples of an interface include a direct connection, an operative connection, a wired connection (i.e. wire, cable, etc.), a wireless connection, a device, a circuit, a network, a bus, a program, a function/routine/subroutine, a driver, an application programming interface (API), a bridge, a socket, a handle, a firmware, a combination thereof, and/or others.

Where a reference to an element coupled or connected to another element is used herein, it should be understood that the element may be in communication or other interactive relationship with the other element. Terms coupled, connected, interfaced, or other such terms may be used interchangeably herein depending on context.

Where a reference to an element matching another element is used herein, it should be understood that the element may be equivalent or similar to the other element. Therefore, the term match, matched, or matching can refer to total equivalence or similarity depending on context.

Where a reference to a device is used herein, it should be understood that the device may include or be referred to as a system, and vice versa depending on context, since a device may include a system of elements and a system may be embodied in a device.

Where a reference to a collection of elements is used herein, it should be understood that the collection of elements may include one element or a plurality of elements. In some aspects or contexts, a reference to a collection of elements does not imply that the collection is an element itself.

Where a reference to an object is used herein, it should be understood that the object may be a physical object (i.e. object detected in a device's surrounding, etc.), an electronic object (i.e. computer generated object in a 3D application, computer generated object in a 2D application, object in an object oriented application program, etc.), and/or other object depending on context.

Where a reference to generating is used herein, it should be understood that generating may include creating, and vice versa, hence, these terms may be used interchangeably herein depending on context.

Where a reference to a threshold is used herein, it should be understood that the threshold can be defined by a user, by system administrator, or automatically by the system based on experience, learning, testing, inquiry, analysis, synthesis, or other techniques, knowledge, or input. Specific threshold values are presented merely as examples of a variety of possible values and any threshold values can be used depending on implementation even where specific examples of threshold values are presented herein.

Where a reference to determining is used herein, it should be understood that determining may include estimating or approximating depending on context.

Where a reference to Object 615/Object 616 is used herein, it should be understood that Object 615/Object 616 may include Object 615 or Object 616 depending on context.

Where a reference to Device 98/Avatar 605 is used herein, it should be understood that Device 98/Avatar 605 may include Device 98 or Avatar 605 depending on context.

Where a reference to an element is used herein, it should be understood that a reference to the element may include a reference to a portion of the element depending on context.

Where a reference to correlate, correlated, or correlating is used herein, it should be understood that a reference to correlate, correlated, or correlating may include a reference to associate, associated, associating, relate, related, relating, or other such word or phrase indicating an association or relation.

Where a mention of an element correlated with another element is used herein, it should be understood that the element correlated with the another element can be referred to as a correlation.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

Where a specific computer code is presented herein, one of ordinary skill in art will understand that the code is provided merely as an example of a variety of possible implementations, and that while all possible implementations are too voluminous to describe, other implementations are within the scope of this disclosure. For example, other additional functions or code can be included as needed, or some of the disclosed ones can be excluded or altered, or a combination thereof can be utilized in alternate implementations. One or ordinary skill in art will also understand that any of the aforementioned code can be implemented in programs, hardware, or combination of programs and hardware. The aforementioned code is presented in a short version that portrays one or more concepts, thereby avoiding extraneous detail that one of ordinary skill in art knows how to implement. As such, the aforementioned code include references to functions that may include more detailed code or functions for implementing a particular operation that one or ordinary skill in art knows how to implement.

LTCUAK Unit 100 or elements thereof, LTOUAK Unit 105 or elements thereof, Consciousness Unit 110 or elements thereof, and/or other disclosed elements comprise learning, decision making, reasoning, use of artificial knowledge, automation, and/or other functionalities. Statistical, artificial intelligence, machine learning, and/or other models or techniques are utilized to implement some embodiments of LTCUAK Unit 100 or elements thereof, LTOUAK Unit 105 or elements thereof, Consciousness Unit 110 or elements thereof, and/or other disclosed elements. LTCUAK Unit 100 or elements thereof, LTOUAK Unit 105 or elements thereof, Consciousness Unit 110 or elements thereof, and/or other disclosed elements include any hardware, programs, or combination thereof. In one example, LTCUAK Unit 100 or an element thereof, LTOUAK Unit 105 or an element thereof, Consciousness Unit 110 or an element thereof, and/or other disclosed element is a hardware element or circuit embedded, integrated, or built into Processor 11, Microcontroller 250, and/or other processing element. In another example, LTCUAK Unit 100 or an element thereof, LTOUAK Unit 105 or an element thereof, Consciousness Unit 110 or an element thereof, and/or other disclosed element is a hardware element coupled with or working in combination with Processor 11, Microcontroller 250, and/or other processing element. In a further example, LTCUAK Unit 100 or an element thereof, LTOUAK Unit 105 or an element thereof, Consciousness Unit 110 or an element thereof, and/or other disclosed element itself is a special purpose processor, microcontroller, and/or other processing element. In a further example, LTCUAK Unit 100 or an element thereof, LTOUAK Unit 105 or an element thereof, Consciousness Unit 110 or an element thereof, and/or other disclosed element is a program operating on Processor 11, Microcontroller 250, and/or other processing element. In a further example, LTCUAK Unit 100 or an element thereof, LTOUAK Unit 105 or an element thereof, Consciousness Unit 110 or an element thereof, and/or other disclosed element is a program embedded, integrated, or built into Application Program 18, Device Control Program 18*a*, Avatar Control Program 18*b*, Avatar 605, and/or other program. In a further example, LTCUAK Unit 100 or an element thereof, LTOUAK Unit 105 or an element thereof, Consciousness Unit 110 or an element thereof, and/or other disclosed element is a program coupled with or working in combination with Application Program 18, Device Control Program 18*a*, Avatar Control Program 18*b*, Avatar 605, and/or other program. In a further example, some elements of LTCUAK Unit 100, LTOUAK Unit 105, Consciousness Unit 110, and/or other disclosed elements are implemented in hardware while others are implemented in one or more programs. LTCUAK Unit 100 or elements thereof, LTOUAK Unit 105 or elements thereof, Consciousness Unit 110 or elements thereof, and/or other disclosed elements include firmware. Any other hardware, programs, or combination thereof can be utilized in alternate implementations.

The disclosed methods 2100, 2300, 3100, 3300, 4100, 4300, 5100, 5300, 6300, 7300, 8100, 8300, 9100, 9300, 9400, 9500, 9600, 9700, 9800, 9900, and/or others may include any step, action, and/or operation of any of the other disclosed method 2100, 2300, 3100, 3300, 4100, 4300, 5100, 5300, 6300, 7300, 8100, 8300, 9100, 9300, 9400, 9500, 9600, 9700, 9800, 9900, and/or others. Additional steps, actions, and/or operations can be included in any of the disclosed methods. One or more steps, actions, and/or operations can be optionally omitted, altered, repeated, combined, and/or implemented in a different order in alternate embodiments of any of the disclosed methods. Each step, action, and/or operation of any method may be implemented once or more than once before implementing a subsequent step, action, and/or operation of the method. In addition, a method may terminate upon implementation of the last step, action, or operation or the method may continue by implementing additional steps, actions, and/or operations (i.e. such as steps, actions, and/or operations not shown, returning to a first step, action, and/or operation, implementing steps, actions, and/or operations of the method or another method, etc.).

A number of embodiments have been described herein. While this disclosure contains many specific implementation details, these should not be construed as limitations on the scope of the disclosure or of what may be claimed, but rather as descriptions of features specific to particular embodiments. It should be understood that various modifications can be made without departing from the spirit and scope of the disclosure. The logic flows depicted in the figures do not require the particular order shown, or sequential order, to achieve desirable results. Other or additional elements and/or techniques, and/or those known in art, can be included, or some of the elements and/or techniques can be excluded or altered, or a combination thereof can be utilized in alternate implementations. Although, some elements and/or techniques are specifically indicated as optionally omissible or optionally includable, any element and/or technique may be optionally omissible or optionally includable depending on implementation even if such optional omission or inclusion is not specifically indicated. Further, the various aspects of the disclosed systems, devices, and methods can be combined in whole or in part with each other to produce additional implementations. Moreover, separation of various components in the embodiments described herein should not be understood as requiring such separation in all embodiments, and it should be understood that the described components can generally be integrated together in a single product or packaged into multiple products. Accordingly, other embodiments are within the scope of the following claims.

The invention claimed is:

1. A system comprising: one or more processors configured to perform at least: accessing a knowledge structure that includes a first knowledge cell that comprises a first one or more instruction sets for performing a first manipulation of one or more objects correlated with at least one of: a first one or more object representations that represent a first state of the one or more objects, or a second one or more object representations that represent a second state of the one or more objects; accessing a purpose structure that includes a first purpose representation that comprises a third one or more object representations that represent a preferred state of: the one or more objects, or another one or more objects; generating or receiving a fourth one or more object representations that represent a current state of: the one or more objects, the another one or more objects, or an additional one or more objects; making a first determination that there is at least partial match between the fourth one or more of object representations and the first one or more object representations; making a second determination that there is at least partial match between the third one or more object representations and the second one or more object representations; and at least in response to the first determination and the second determination, causing the first manipulation of the one or more objects, the another one or more objects, or the additional one or more objects represented by the fourth one or more object representations, wherein the causing includes executing the first one or more instruction sets for performing the first manipulation of the one or more objects.

2. The system of claim 1, wherein each object representation of the first one or more object representations includes: a label indicating object type, coordinates indicating object location, and a computer model indicating object size, wherein each object representation of the second one or more object representations includes: a label indicating object type, coordinates indicating object location, and a computer model indicating object size, wherein each object representation of the third one or more object representations includes: a label indicating object type, coordinates indicating object location, and a computer model indicating object size, wherein each object representation of the fourth one or more object representations includes: a label indicating object type, coordinates indicating object location, and a computer model indicating object size.

3. The system of claim 1, wherein the first one or more object representations include one or more three dimensional object representations, wherein the second one or more object representations include one or more three dimensional object representations, wherein the third one or more object representations include one or more three dimensional object representations, wherein the fourth one or more object representations include one or more three dimensional object representations.

4. The system of claim 1, wherein the one or more objects, the another one or more objects, or the additional one or more objects represented by the fourth one or more object representations are one or more physical objects.

5. The system of claim 4, wherein the first manipulation of the one or more objects, the another one or more objects, or the additional one or more objects represented by the fourth one or more object representations is performed by a physical device.

6. The system of claim 1, wherein the one or more objects, the another one or more objects, or the additional one or more objects represented by the fourth one or more object representations are one or more computer generated objects.

7. The system of claim 6, wherein the first manipulation of the one or more objects, the another one or more objects, or the additional one or more objects represented by the fourth one or more object representations is performed by a computer generated avatar.

8. The system of claim 7, wherein the one or more computer generated objects and the computer generated avatar is an object are objects of a computer application.

9. The system of claim 1, wherein the first one or more instruction sets for performing the first manipulation of the one or more objects include one or more instruction sets for manipulating the one or more objects from the first state to the second state.

10. A method comprising: accessing a knowledge structure that includes a first knowledge cell that comprises a first one or more instruction sets for performing a first manipulation of one or more objects correlated with at least one of: a first one or more object representations that represent a first state of the one or more objects, or a second one or more object representations that represent a second state of the one or more objects; accessing a purpose structure that includes a first purpose representation that comprises a third one or more object representations that represent a preferred state of: the one or more objects, or another one or more objects; generating or receiving a fourth one or more object representations that represent a current state of: the one or more objects, the another one or more objects, or an additional one or more objects; making a first determination that there is at least partial match between the fourth one or more of object representations and the first one or more object representations; making a second determination that there is at least partial match between the third one or more object representations and the second one or more object representations; and at least in response to the first determination and the second determination, performing the first manipulation of the one or more objects, the another one or more objects, or the additional one or more objects represented by the fourth one or more object representations at least by executing the first one or more instruction sets for performing the first manipulation of the one or more objects.

11. The method of claim 10, wherein each object representation of the first one or more object representations includes: a label indicating object type, coordinates indicating object location, and a computer model indicating object size, wherein each object representation of the second one or more object representations includes: a label indicating object type, coordinates indicating object location, and a computer model indicating object size, wherein each object representation of the third one or more object representations includes: a label indicating object type, coordinates indicating object location, and a computer model indicating object size, wherein each object representation of the fourth one or more object representations includes: a label indicating object type, coordinates indicating object location, and a computer model indicating object size.

12. The method of claim 10, wherein the first one or more object representations include one or more three dimensional object representations, wherein the second one or more object representations include one or more three dimensional object representations, wherein the third one or more object representations include one or more three dimensional object representations, wherein the fourth one or more object representations include one or more three dimensional object representations.

13. The method of claim 10, wherein the one or more objects, the another one or more objects, or the additional one or more objects represented by the fourth one or more object representations are one or more physical objects.

14. The method of claim 13, wherein the first manipulation of the one or more objects, the another one or more objects, or the additional one or more objects represented by the fourth one or more object representations is performed by a physical device.

15. The method of claim 10, wherein the one or more objects, the another one or more objects, or the additional one or more objects represented by the fourth one or more object representations are one or more computer generated objects.

16. The method of claim 15, wherein the first manipulation of the one or more objects, the another one or more objects, or the additional one or more objects represented by the fourth one or more object representations is performed by a computer generated avatar.

17. The method of claim 16, wherein the one or more computer generated objects and the computer generated avatar are objects of a computer application.

18. The method of claim 10, wherein the first one or more instruction sets for performing the first manipulation of the one or more objects include one or more instruction sets for manipulating the one or more objects from the first state to the second state.

19. A system comprising: a knowledge structure that includes a first knowledge cell that comprises a first one or more instruction sets for performing a first manipulation of one or more objects correlated with at least one of: a first one or more object representations that represent a first state of the one or more objects, or a second one or more object representations that represent a second state of the one or more objects; a purpose structure that includes a first purpose representation that comprises a third one or more object representations that represent a preferred state of: the one or more objects, or another one or more objects; means for generating or receiving a fourth one or more object representations that represent a current state of: the one or more objects, the another one or more objects, or an additional one or more objects; means for making a first determination that there is at least partial match between the fourth one or more of object representations and the first one or more object representations; means for making a second determination that there is at least partial match between the third one or more object representations and the second one or more object representations; and means for causing, at least in response to the first determination and the second determination, the first manipulation of the one or more objects, the another one or more objects, or the additional one or more objects represented by the fourth one or more object representations, wherein the causing includes executing the first one or more instruction sets for performing the first manipulation of the one or more objects.

20. The system of claim 19, wherein the means for the generating or the receiving includes one or more processors, and wherein the means for the making the first determination includes one or more processors, and wherein the means for the making the second determination includes one or more processors, and wherein the means for the causing includes one or more processors.

* * * * *